US011707837B2

(12) United States Patent
Oleynik

(10) Patent No.: US 11,707,837 B2
(45) Date of Patent: Jul. 25, 2023

(54) ROBOTIC END EFFECTOR INTERFACE SYSTEMS

(71) Applicant: MBL LIMITED, Jersey (JE)

(72) Inventor: Mark Oleynik, Monaco (MC)

(73) Assignee: MBL Limited, Saint Helier (JE)

( * ) Notice: Subject to any disclaimer, the term of this patent is extended or adjusted under 35 U.S.C. 154(b) by 272 days.

(21) Appl. No.: 16/571,162

(22) Filed: Sep. 15, 2019

(65) Prior Publication Data

US 2020/0030971 A1 Jan. 30, 2020

Related U.S. Application Data

(63) Continuation of application No. 14/829,579, filed on Aug. 18, 2015, now Pat. No. 10,518,409, and a (Continued)

(51) Int. Cl.
*G06F 17/00* (2019.01)
*B25J 9/16* (2006.01)
(Continued)

(52) U.S. Cl.
CPC ............. *B25J 9/163* (2013.01); *A47J 36/321* (2018.08); *B25J 3/04* (2013.01); *B25J 9/0018* (2013.01);
(Continued)

(58) Field of Classification Search
CPC ... B25J 9/163; B25J 3/04; B25J 9/0018; B25J 9/0087; B25J 11/009; B25J 13/02;
(Continued)

(56) References Cited

U.S. PATENT DOCUMENTS 6,459,526 B1 10/2002 Minelly et al.
6,738,691 B1 5/2004 Colgate
(Continued)

FOREIGN PATENT DOCUMENTS

EP 1128503 A2 8/2001

OTHER PUBLICATIONS

V3A019 TM Robt-TM Robot Frying Fries; You tube May 8, 2018 (Year: 2018).*
(Continued)

*Primary Examiner* — Ronnie M Mancho
(74) *Attorney, Agent, or Firm* — Peter Su; Radlo & Su

(57) ABSTRACT

Embodiments of the present disclosure are directed to methods, computer program products, and computer systems of a robotic apparatus with robotic instructions replicating a food preparation recipe. In one embodiment, a robotic control platform, comprises one or more sensors; a mechanical robotic structure including one or more end effectors, and one or more robotic arms; an electronic library database of minimanipulations; a robotic planning module configured for real-time planning and adjustment based at least in part on the sensor data received from the one or more sensors in an electronic multi-stage process file, the electronic multi-stage process recipe file including a sequence of minimanipulations and associated timing data; a robotic interpreter module configured for reading the minimanipulation steps from the minimanipulation library and converting to a machine code; and a robotic execution module configured for executing the minimanipulation steps by the robotic platform to accomplish a functional result.

29 Claims, 366 Drawing Sheets

Related U.S. Application Data continuation-in-part of application No. 14/627,900, filed on Feb. 20, 2015, now Pat. No. 9,815,191.

(51) Int. Cl.

| | |
|---|---|
| ***B25J 9/00*** | (2006.01) |
| ***B62D 57/032*** | (2006.01) |
| ***G05B 19/42*** | (2006.01) |
| ***B25J 13/02*** | (2006.01) |
| ***B25J 11/00*** | (2006.01) |
| ***B25J 19/02*** | (2006.01) |
| ***B25J 3/04*** | (2006.01) |
| ***A47J 36/32*** | (2006.01) |
| ***B25J 15/00*** | (2006.01) |

(52) U.S. Cl.

CPC .......... *B25J 9/0087* (2013.01); *B25J 11/009* (2013.01); *B25J 13/02* (2013.01); *B25J 15/0095* (2013.01); *B25J 19/02* (2013.01); *B62D 57/032* (2013.01); *G05B 19/42* (2013.01); *G05B 2219/36184* (2013.01); *G05B 2219/40116* (2013.01); *G05B 2219/40391* (2013.01); *G05B 2219/40395* (2013.01); *Y10S 901/01* (2013.01); *Y10S 901/03* (2013.01); *Y10S 901/28* (2013.01)

(58) Field of Classification Search

CPC ...... B25J 15/0095; B25J 19/02; A47J 36/321; B62D 57/032; G05B 19/42; G05B 2219/36184; G05B 2219/40116; G05B 2219/40391; G05B 2219/40395; G05B 19/04; Y10S 901/01; Y10S 901/03; Y10S 901/28

USPC .......................................................... 414/783

See application file for complete search history.

(56) References Cited

U.S. PATENT DOCUMENTS

| | | | | |
|---|---|---|---|---|
| 7,673,916 | B2 | 3/2010 | Greenhill et al. | |
| 8,483,880 | B2 | 7/2013 | De La Rosa Tames et al. | |
| 8,660,695 | B2 | 2/2014 | De La Rosa Tames et al. | |
| 8,882,783 | B2 | 11/2014 | Oostman, Jr. | |
| 8,958,912 | B2 | 2/2015 | Blumberg et al. | |
| 10,206,539 | B2 | 2/2019 | Freas, II | |
| 2003/0074238 | A1 | 4/2003 | Hoffman et al. | |
| 2003/0080297 | A1 | 5/2003 | Bales et al. | |
| 2003/0173926 | A1 | 9/2003 | Hattori | |
| 2004/0172380 | A1 | 9/2004 | Zhang | |
| 2005/0193901 | A1 | 2/2005 | Buehler | |
| 2005/0111078 | A1 | 5/2005 | Qiao et al. | |
| 2005/0122574 | A1 | 6/2005 | Kakui | |
| 2006/0030922 | A1 | 2/2006 | Dolan | |
| 2007/0137633 | A1 | 6/2007 | McFadden | |
| 2009/0030922 | A1 | 1/2009 | Chen et al. | |
| 2010/0092321 | A1 | 4/2010 | Kim et al. | |
| 2011/0040408 | A1 | 2/2011 | De La Rosa Tames et al. | |
| 2012/0017718 | A1 | 1/2012 | Greenhill | |
| 2012/0277914 | A1 | 11/2012 | Crow | |
| 2013/0204435 | A1 | 8/2013 | Moon et al. | |
| 2013/0245823 | A1 | 9/2013 | Kimura et al. | |
| 2013/0345873 | A1 | 12/2013 | Blumberg et al. | |
| 2015/0114236 | A1 | 4/2015 | Roy | |
| 2015/0127155 | A1 | 5/2015 | Passot et al. | |
| 2015/0199561 | A1 | 7/2015 | Jeong et al. | |
| 2015/0290795 | A1* | 10/2015 | Oleynik ................ | A47J 36/321 700/257 |

OTHER PUBLICATIONS

PCT International Search Report, PCT/IB2015/000379, dated Jan. 28, 2016.

PCT International Preliminary Report on Patentability, PCT/IB2015/000379, dated Aug. 28, 2016.

PCT International Search Report, PCT/IB2015/001704, dated Feb. 12, 2016.

PCT International Search Report, PCT/IB2015/001704, dated Mar. 7, 2017.

Bollini et al., Interpreting and Executing Recipes with a Cooking Robot, 2013, Springer Nature, pp. 1-15.

Iwata et al., Design of Human Symbiotic Robot Twendy-One, 2009 IEEE International Conference on Robotics and Automation, May 12-19, 2009, pp. 580-586.

* cited by examiner

394

Calculating Probability of Desired Result for Multi-Step Cooking Operations probability of success = product of the probabilities of success at all stages probability of success at each stage = probability that any alternative works for that stage $$P(S) = \prod_{S_i \in S} P(s_i | A(s_i))$$

$$P(s_i | A(s_i)) = 1 - \prod_{a_j \in A(s_i)} (1 - P\,(s_i | a_j)$$

| Non-Standard | Standard |
|---|---|
| 0.9 | 0.99 |
| 0.81 | 0.9801 |
| 0.729 | 0.970299 |
| 0.6561 | 0.96059601 |
| 0.59049 | 0.95099005 |
| 0.531441 | 0.941480149 |
| 0.4782969 | 0.932065348 |
| 0.43046721 | 0.922744694 |
| 0.387420489 | 0.913517247 |
| 0.34867844 | 0.904382075 |
| 0.313810596 | 0.895338254 |
| 0.282429536 | 0.886384872 |
| 0.254186583 | 0.877521023 |
| 0.228767925 | 0.868745813 |
| 0.205891132 | 0.860058355 |

550 Chef Robot Recorder Devices

580

580

72

Database Structure of Minimanipulation (MM) library

| name of MM | code of MM | code(s) of standardized equipment and tools associated with the performance of MM | initial position and orientation of the manipulated (standard or non-standard) objects (ingredients and tools) in a robotic hand | parameters/Variable defined by user (or taking from recorded recipe during execution): | | | | Sequence of robotic hand movements (control signals for all servos) and connecting feedback parameters (from any sensors or video recognizing system) of MM on the timeline. The variables are an initial data information for the sequence. |
|---|---|---|---|---|---|---|---|---|
| | | | | MM Starting coordinate XYZ in the volume of the standardized kitchen module | MM speed | MM object size (may be non-standard) | MM object shape (may non-standard) | |
| | | | | | | | | |
| | | | | | | | | |
| | | | | | | | | |
| | | | | | | | | |

| name of objects | image of object | code of object | virtual 3D model with full dimensions of object in matrix of (XYZ coordinates matrix) (resolution preferably be defined) | virtual vector model of the object (if available) | definition and marking of the working elements of the object (the elements, which may be in contact with hands and other objects for manipulation) | initial standard orientation of object for each specific manipulations |
|---|---|---|---|---|---|---|
| | | | | | | |
| | | | | | | |
| | | | | | | |
| | | | | | | |

Robotic Kitchen Module Software Platform Recipe Filters (pie charts, rotating filters)

Robotic Kitchen Module Software Platform Ingredients Filters

My Account and Social Network

Personal Partner Page

Shopping Cart and My Purchases

Information on the Purchased Recipes

Create A Recipe

50

50

50 robotic kitchen prototype

50

50

50

50

50

50

1356

1358

1362
dimension - section

86
Storage Station Containers Elevation View (one example)

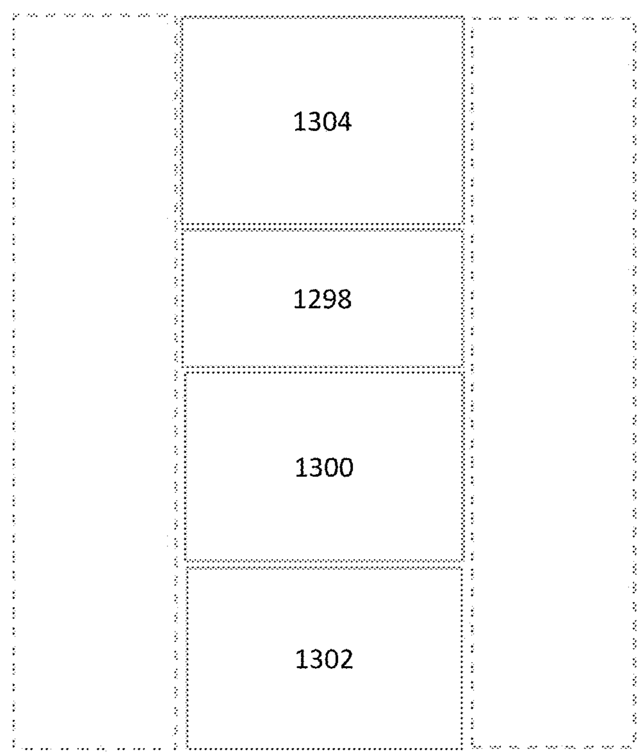

storage (where temperature, humidity, oxygen and other room conditions can be monitored and control).

different setting levels:

1304 pantry/ dry storage 1298 ripening level (12 ~ 14°C) for tropical fruits and tubers vegetables such as potatoes and wine cell level (7 ~ 18°C)

1300 chill level(2 ~ -4°C) for fresh produce, fruit, and meat to confer optimal shelf life 1302 frozen level (-16 ~ -20°C) for frozen meat, bakery and deep freeze level (-28~-30°C): example, for seafood and ice cream

FIG. 48

1380
Ingredient Access Containers 1382 ingredient quality monitoring dashboard 1384 scanning, detector, camera, scale 1386 countertop with auto-shelf and rack for check-In, drop off and check-out 1388 recycling access 1390
Ingredient Quality Monitoring Dashboard

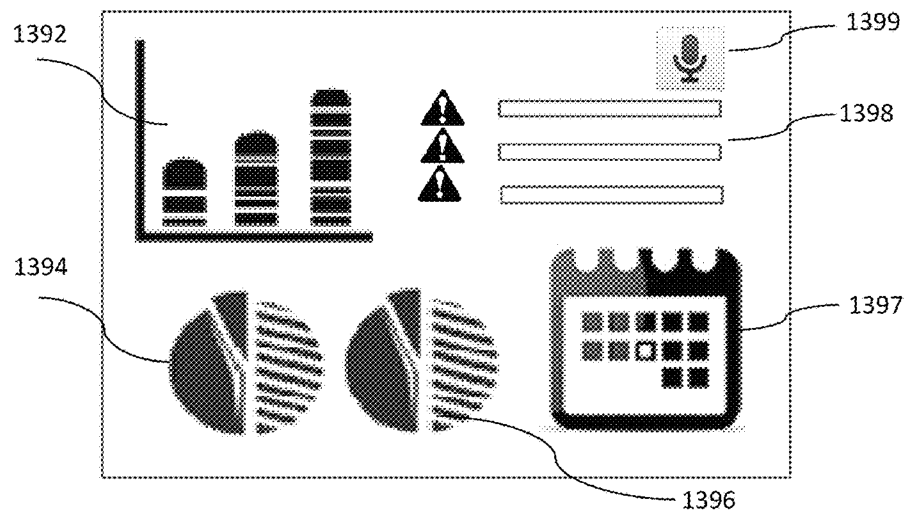

1392 ingredients inventory overview (e.g.
(dairy, eggs, fruits, legume – meat, seasonings, sweeteners, vegetables & mushrooms)

1394 ingredient nutrition distribution 1396 storage Utilization and allocation 1397 expiration, fulfillment schedule 1398 alerts: decays, abnormal temperature, capacity overloading 1399 voice command for query or ingredient check-in/check-out

1672g
types of meals breakfast
brunch
starters
mains
deserts
drinks
sauces
sides
snacks 1672h
special diet low-calories
low-carbohydrate
low-fat
low-protein
low-sodium
hi-fiber
diabetic-friendly
vegetarian
vegan
dairy-free
wheat/gluten-free
...

1672i
exclusion ingredient (user to select recipe without certain non-main ingredients for preferences, health/allergy/nutrition concern, availability reasons)
...

1672j
dish types and cooking methods antipastas
brewing
cakes & tea treats
canning curries
deep fried
drinks
grilling
no-cook
pasta & risottos
pies & pastries
pizzas
pressure
deserts
roasts
salads
sandwiches/wraps
sauces /condiments
slow cooking
soups
steam
stews
stir-fry
vegetable sides
water bath
...

1672k
occasions & seasons purim
ramadan
rosh hashanah
hanukkah
passover
easter
thanksgiving
christmas
parties and gatherings
spring
summer
fall
winter
...

1672l
reviews and suggestions pairing recipes, which are usually purchased /ordered together with, similar recipes, same ingredient recipes 1672m
ranking (best selling, most positive reviews)

| type of product | product | container # | length x width x height mm / volume ml |
|---|---|---|---|
| large, bulky products (used by the piece) | white cabbage, red cabbage, savoy cabbage, turnips, cauliflower, beet, rutabaga, kohlrabi, pak choi, chinese cabbage, cabbage Romanesco, pumpkin, watermelon, melon, pineapple, coconut, mango | №1 | 380x200x150 |
| small fraction solids (small amount of use) | cocoa, coffee powder, baking soda, citric acid (crystals), poppy dried, powdered sugar, baking powder dough, anise, star anise, vanilla, cardamom, black cardamom, black cumin, coriander, cumin whole, dry dill, coriander seed, slices of dried onions, fennel seeds, dry yeast, sumac, cumin whole, dry thyme, garlic, dry mustard powder, minced cherries, rosehip powder, glucose, baking dough, egg powder, caramel syrup, dried parsley, gelatin food, basil dry, saffron, galangal, oregano, pepper (allspice, black, white, red, sweet, red hot chili, cayenne), cloves, cinnamon, coriander, salt-(carbon ammonium, sea), minced cloves, ginger dry powder, cardamom, coriander, cumin powder, curry, turmeric, powdered cinnamon, nutmeg powder, parsley | №2 | 100x50x30 / 150 ml |
| small fraction solids (large amount of use) | flour (wheat, pancake, corn, rye, barley, oat, rice, pea, buckwheat, soybean), starch (corn, potato), semolina, millet, rice, oats, barley, corn, breadcrumbs, sugar | №3 | 70x100x150 / 1000 ml |
| large fraction solids (large amount of use) | rice (wild, basmati rice, long-grain, polished, brushed crushed), lentils, buckwheat, unground, unground quickly preparing, slipped quickly preparing, cereal-(pea quickly preparing, corn ground, large corn for flakes, corn fine, wheat poltava, artek wheat, wheat quickly preparing, buckwheat, oats not crushed, oat rolled, crushed barley, crushed barley quickly preparing), oatmeal, oat flakes, millet polished, millet polished quickly preparing, pea (shelled, shelled split), beans (white, red), dried onion slices, dried parsley, food gelatins | №3 | 70x100x150 / 1000 ml |
| large fraction solids by piece (large amount of use) | pasta (linguine, spaghetti, lasagna, foam, feathers, scrap macaroni, vermicelli (round, square, elliptical), noodles (smooth, serrated, with straight, helical or sawtooth edges), pasta, pretzels, and noodles may be in the form of nests and coils, curly, stamped, pressed), gelatin leaf, sugar-dough (mastic) | №4 | 250x180x100 |
| salad and spinach vegetables | salad, nettles, chard, spinach, quinoa, sorrel, etc., spicy vegetables - fennel, coriander, cumin, parsley, savory, calendula, basil, tarragon, lavender, lemon balm, thyme, rosemary, lovage, marjoram, etc., dessert vegetables (rhubarb, asparagus, artichoke, leek, onion, shallot, shallots; leek, rhubarb, sorrel) | №4 | 250x180x100 |
| small size food products | tomatoes, onions, garlic, brussels sprouts, root and tuber vegetables (carrot, radish, black radish, horseradish, European radish, parsnip, daikon, celery, beets, potatoes, Jerusalem artichokes, sweet potatoes, yams); Pumpkin vegetables (cucumbers, marrow squash, zucchini, squash); herbaceous plants (corn on the cob, eggplant, capers, loofah, peppers (bell), fennel); fillets treated, bird (turkey, chicken, duck, partridge, quail, hazel grouse); seafood (shrimp (tiger), crab, squid, langouste, langoustines, lobster, mussels, scallops, octopus, oyster, cuttlefish); meat (pork, beef, rabbit, mutton, lamb, veal, goat meat, horse meat, hare, venison, wild boar meat); fish (ide, pike, hake, trout, tuna, silver carp, cod, perch, sterlet, jack mackerel, catfish, mackerel, whitefish, salmon, herring, sardines, baltic herring, Common carp, roach, haddock, halibut, sturgeon, perch, hake, redfish, capelin, pollock, bluefish, bream, smelt, mullet, chum salmon, carp, crucian, flounder, catfish, dorado, pink salmon, chub, red mullet, anchovy, shark, sea bass); mushrooms (cep, oyster, table mushroom, partabello, milk mushroom, chanterelle, suillus, xercomus, armillaria, birch bolete, red-capped scaber stalk, truffle, shiitake); chicken egg; fruits, apple, pear, pomegranate, peach, plum, cherry, orange, lemon, grapes, apricots, kiwi, strawberry, banana, feyhua, grapefruit, lychee, rambutan, mangosteen, carambola, guava, passion fruit, avocado, papaya, pomelo, figs, pawpaw, quince, barberry, cranberries | №4 | 250x180x100 |
| large fraction solids by piece (small amount of use) | dried apricots, raisins, (dark, light), prunes, almond shavings, seeds (sunflower, pumpkin, white), dates, figs, dried cherry, dried, dried plums, dried rosehip, dried apricots pitted, dried papaya, dried apricots, kiwi dried, candied pineapple, quail eggs, blueberries, strawberries, blackberries, currants (red / white / black), cranberry viburnum, buckthorn, gooseberry, butter | №5 | 150x100x50 |
| large fraction solids by piece (small amount of use) | nuts (nutmeg, pecans, pine nuts, macadamia, cola, chilim, chestnut, Brazil, peanuts, walnuts, almonds, cashews, pistachios, pine, hazelnuts), coffee grain, sugar (cane, white refined) grains for milling | №6 | [illegible] |
| Spaghetti | spaghetti | №7 | tube 100x100x350 |
| Liquids (large amount of use) | milk, cream (pastry, vegetable), liquid dairy products (fermented baked milk, yogurt, kefir, tan), olive oil, vegetable oil, frying, duck fat, stewed fruit, fruit-drink, juice, beer, wine | №8 | 1200 ml |
| Liquids (small amount of use) | balsamic cream, vinegar (balsamic, (light, dark), wine-(white, red), apple, table), soy sauce, citric acid, Tabasco, Red Devil, Worcestershire sauce, oil (pumpkin, flax, sesame) | №9 | 100 ml |
| Pasty (pastelike) products and semi-finished products (small amount of use) | sour cream, mayonnaise, softened butter, whipped cream, cheese (mascarpone, ricotta), tomato paste, mustard, horseradish paste | №10 | 300 ml |

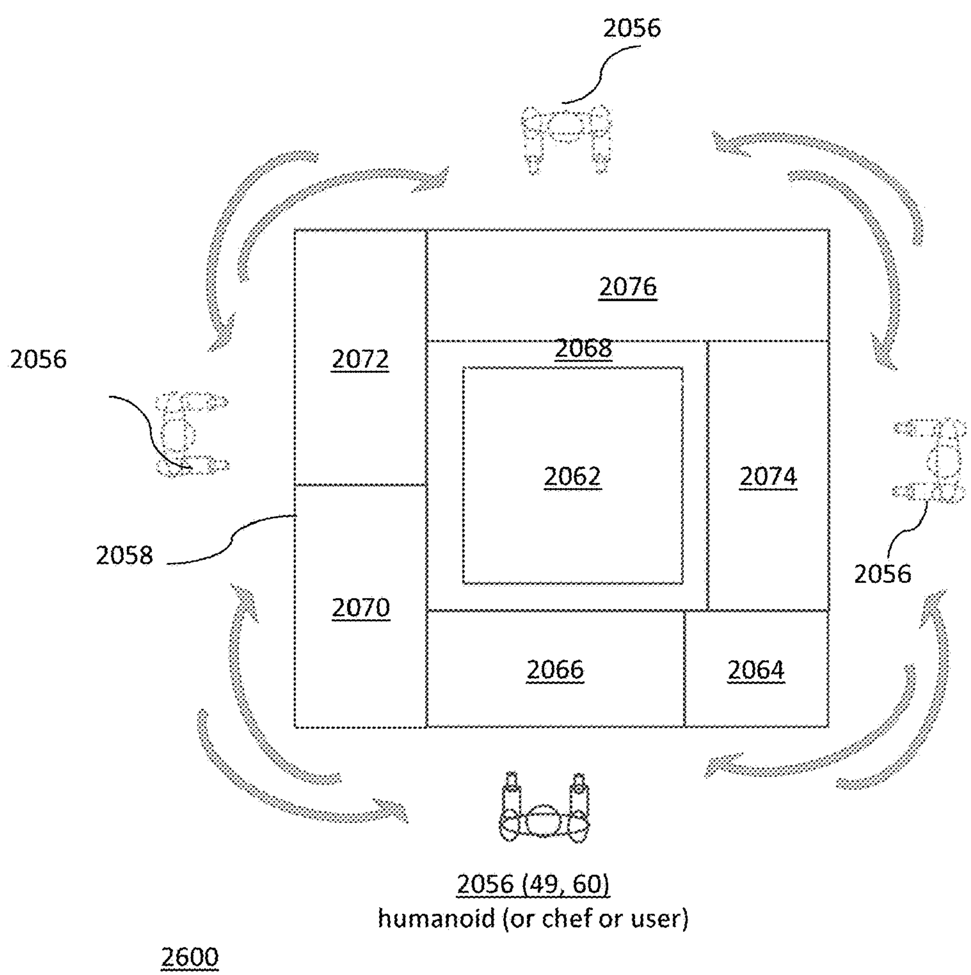

FIG. 87B 2064 user/chef console: interface to schedule dish(es) and have personal setting, overview, and manage recipe 2066 ingredient access station (scanner, camera, sensor, packing line, recycling to inspect, identify, pack and dispose food/ingredient, and move item to designated storage zone)

2062 storage station: different storage areas with different temperature sensors and control (e.g. deep freeze, frozen, chill and other setting for humidity, pressure, light, oxygen, sterilization control and best stability on food/ingredient)

2068 automatic shelf station (for cookware's, bake ware's, container, packing material, table ware, serving ware, dinning ware to be moved automatically for easy access)

2070 wash/cleaning station; control sink, dishwasher, appliance self-cleaning 2072 technique tooling station (to use blade, knife, paddle, whisker, juicer, opener, shear and apply cooking techniques with tooling assembly)

2076 cooking appliance station (oven, stove, griller, steamer, fryer, microwave, dehydrator, range/cooker, blender)

2074 serving station (warmer, cooler, airy)

2220
Emotion detection and analysis
A person's emotional state can be detected by monitoring and analyzing the person's physiological signs, under a defined condition with internal and/or external stimulus, how these physiological signs change over a certain timeline.. There are nine key physiological sign parameters to be measured in order to build a person's emotion profile 2221
Sets of hormones, which are secreted internally and trigger various biochemical pathways that cause certain effects. e.g. Adrenalin and insulin are hormones 2223
micro expression, which is a brief, involuntary facial expression shown on the face of humans according to emotions experienced.

2225
sweat(and goose bumps) e.g. a person's heart rate increases, face blushes and palms get sweaty in the state of being excited or nervous.

| | | time line 1 | line 2 |
|---|---|---|---|
| | sets of emotion parameters | Score | Score |
| 1 | sets of hormone | 10 | 4.5 |
| 2 | sets of pheromones | 9.5 | 4.2 |
| 3 | microexpression | 7 | 2.5 |
| 4 | heart rate | 8 | 1.9 |
| 5 | sweat | 8 | 3.1 |
| 6 | pupil dialator | 4.3 | 2 |
| 7 | reflex movement | 3.6 | 4.3 |
| 8 | body temperature | 2.5 | 3.6 |
| 9 | pressure | 6.2 | 9.5 |
| 9 | pressure | | |

| | | time line 40 |
|---|---|---|
| | sets of emotion parameters | Score |
| 1 | sets of hormone | 3.6 |
| 2 | sets of pheromones | 2.5 |
| 3 | microexpression | 1.9 |
| 4 | heart rate | 3.8 |
| 5 | sweat | 3.5 |
| 6 | pupil dialator | 2 |
| 7 | reflex movement | 7 |
| 8 | body temperature | 5.5 |
| 9 | pressure | 3.8 |

2222
Sets of pheromones, which are secreted externally, and have an effect on another creature in similar ways. e.g. androstenol, androstenone and androstadienone 2224
heart rate (and blood vessel)

2226
pupil dilator(and iris sphincter, biliary muscle), e.g. pupil dilation for a short time in response to feelings of fear.

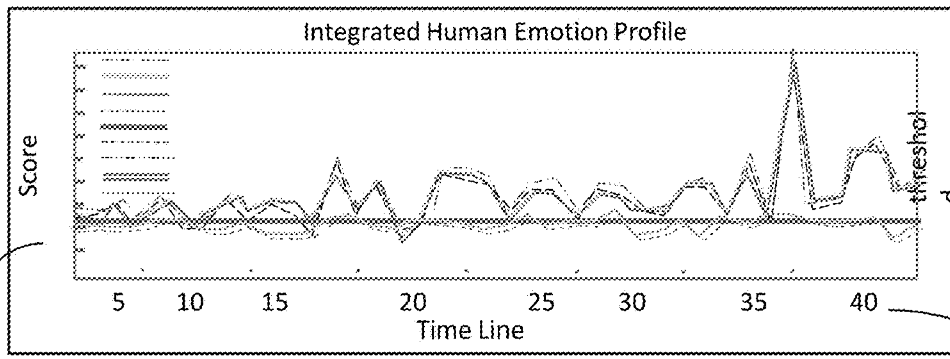

2229
reflex movement, which is the movement/action primarily controlled by the spinal arc, as a response to an external stimulus, e.g. jaw jerk reflex 2230
The analysis of parameter changes over a certain time line establish a person's integrated emotion profile.

2231
Time Line
(e.g. by hours, days, weeks...)

FIG. 92A

When measuring the physiological signs change, the monitoring can also be managed manually as well, e.g. a user can touch a button with a first tag on the time in which the change of emotion has started and touch the button again with a second tag when the emotion change has concluded. Also user should describe the emotion he feels. Using this process computer can learn how all emotion parameters change when user feels definite emotion. With data/information collected from mass amount of users computer classifies all changes associated with each emotion and mathematically finds the significant and specific parameters changes, which are connected with this particular emotion.

Whenever uses experiences emotional or mood swing – with a port connecting to his body, above the skin and directly to the vein, physiological parameters such as hormone, heart rate, sweat, pheromones can be detected and recorded. The start and end of the mood change can be judged by the person himself as the emotion or state change starts or no longer exists. . e.g. a person initiated 4 manual emotion cycles and creates 4 timelines within a week, as determined by the person, the first one lasts 2.8 hour from he tags the start till he tags the end. The second cycle last for 2 hours, the third one last for 0.8 hours, the fourth one last for 1.6 hours

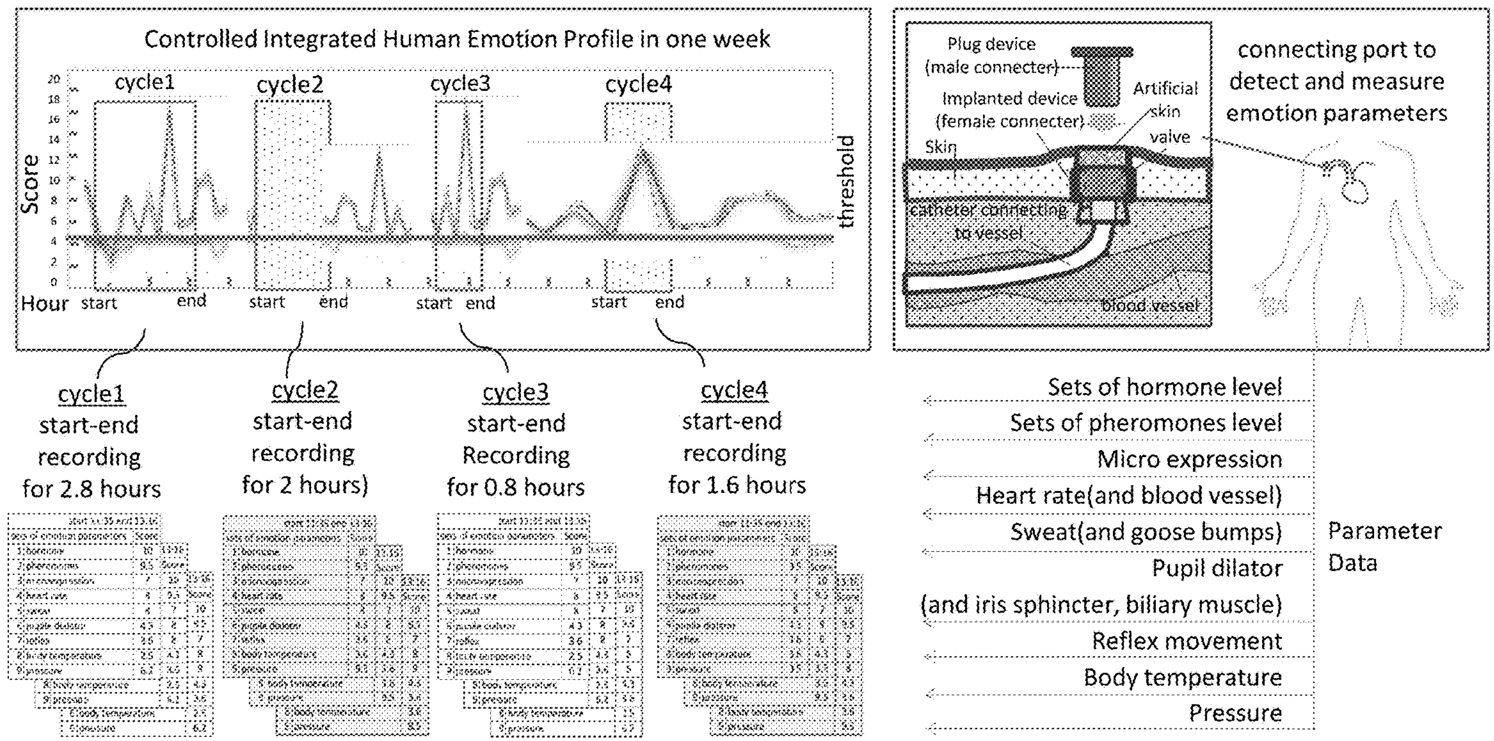

2230

FIG. 93 personal emotion detection and recording using connecting port device

Robotic Intelligence System

Robotic Human Nursing Care System Process

3210

A pair of robotic arms with five-fingered hands

Subject expert function result and
minimanipulation library example: making Sushi

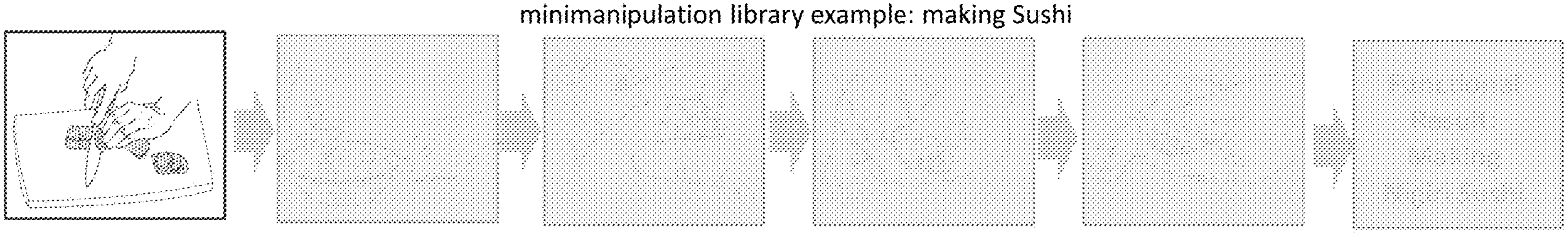

minimanipulation and parameters: Take the whole piece of fish filet from container and lay on cutting board 3351a

| Parameter(variable) value as initially captured in cooking process or defined by creator, or obtaining from three-dimensional volume scanning real time process, or predefined parameters | | | | Application parameters (generated from 3D vision), or predefined parameters |
|---|---|---|---|---|
| Time | (Right)<br>Hand and fingers | (Left)<br>Hand and fingers | Temporary non-standard object library | Standard object |
| Starting and ending | XYZ position and orientation pressure to take out whole fish fillet and put on cutting board | XYZ position and orientation pressure to hold container to keep from moving | <u>Fish fillet</u>:<br>-Size, shape, weight<br>-XYZ position and orientation in container<br>-XYZ position and orientation on the cutting board | <u>Fish fillet container</u>:<br>XYZ position and orientation<br><u>Cutting board</u>:<br>XYZ position and orientation |

minimanipulation and parameters: slice fish and set aside on cutting board 3351b

| | | | | |
|---|---|---|---|---|
| Starting and ending | XYZ position and orientation to hold knife<br>pressure, angle to cut fish and to move each sliced piece aside on the cutting board | XYZ position and orientation pressure on fish fillet to keep from moving | <u>Fish piece</u>:<br>-size, shape, thickness, weight of sliced fish<br>-XYZ position and orientation on the cutting board | <u>Knife</u>:<br>XYZ position and orientation,<br><u>cutting board</u>:<br>XYZ position and orientation |

Subject expert function result and mini-manipulation library example: making Sushi

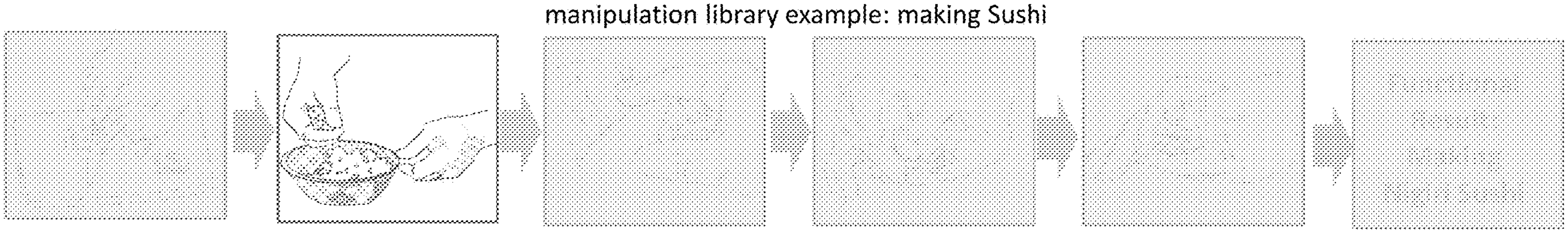

minimanipulation and parameters: Take rice from container 3352a

| Parameter(variable) value as initially captured in cooking process or defined by creator | | | | Pre-defined parameter |
|---|---|---|---|---|
| Time | (Right) Hand and fingers | (Left) Hand and fingers | Temporary non-standard object library | Standard object |
| Starting and ending | -XYZ position and orientation<br>-Pressure to take out rice from container and hold the rice piece | -XYZ position and orientation<br>-Pressure to hold the rice container to keep from moving | rice:<br>-XYZ position in the container<br>-Amount to take | rice container:<br>XYZ position and orientation |

minimanipulation and parameters: press rice to stick together and shape into a rice log 3352b

| | | | |
|---|---|---|---|
| Starting and ending | -XYZ position and orientation<br>-Pressure to hold and press the rice | -XYZ position and orientation<br>-Pressure to hold and press the rice | Rice log:<br>-Size and shape<br>-XYZ position and orientation |

Subject expert function result and mini-manipulation library example: making Sushi

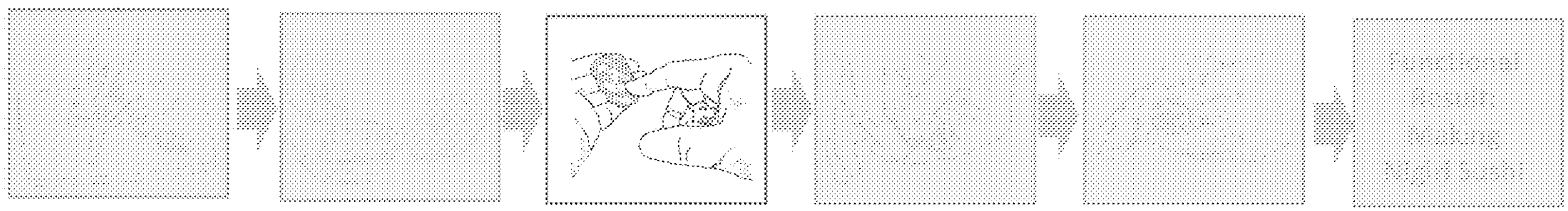

minimanipulation and parameters: Pick up a piece of fish 3353a

| Parameter(variable) value as initially captured in cooking process or defined by creator | | | | Pre-defined parameter |
|---|---|---|---|---|
| Time | (Right) Hand and fingers | (Left) Hand and fingers | Temporary non-standard object library | Standard object |
| Starting and ending | -XYZ position and orientation<br>-Pressure to hold the rice log | -XYZ position and orientation<br>-Pressure to take targeted fish piece from cutting board | Rice log:<br>XYZ position and orientation in right hand .<br>Fish piece:<br>-XYZ position and orientation on cutting board.<br>-XYZ position and orientation in left hand. | Wasabi container:<br>XYZ position and orientation |

minimanipulation and parameters: Swipe wasabi into the fish piece 3353b

| | | | | |
|---|---|---|---|---|
| Starting and ending | -XYZ position and orientation<br>-pressure to hold the rice log<br>-Pressure to take wasabi piece | -XYZ position and orientation<br>-Pressure to hold fish piece | Wasabi piece :<br>XYZ position and orientation with premeasured amount in container, or take a certain amount in real time<br>Fish piece:<br>-XYZ position and orientation in left hand<br>-Spot of XYZ position to swipe wasabi into. | Wasabi container:<br>XYZ position and orientation |

FIG. 125

Subject expert function result and mini-manipulation library example: making Sushi

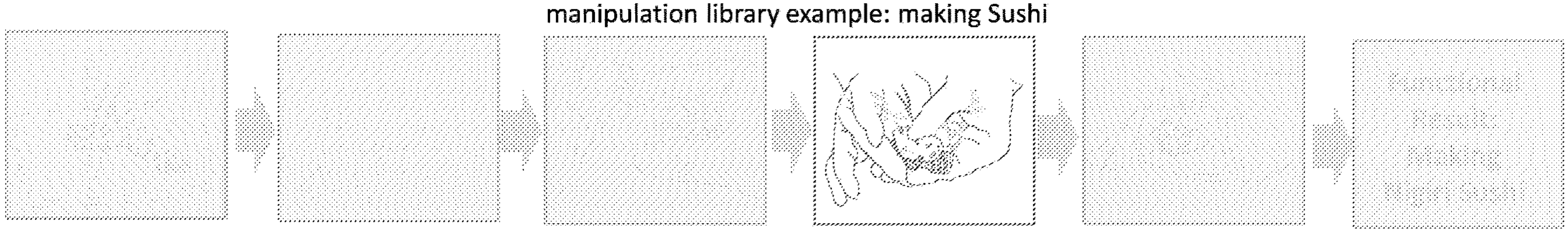

minimanipulation and parameters:
Place the rice log on top of fish and firm up assembled rice/fish to a rectangular shape of hump

3354

| Parameter (variable) value as initially captured in cooking process or defined by creator | | | | Pre-defined parameter |
|---|---|---|---|---|
| Time | (Right) Hand and fingers | (Left) Hand and fingers | Temporary non-standard object library | Standard object |
| Starting and ending | -XYZ position and orientation<br>-Pressure to press rice log to fish piece | -XYZ position and orientation<br>-Pressure to take targeted fish piece from cutting board | Rice log:<br>XYZ position and orientation in right hand<br>Fish piece:<br>XYZ position and orientation in left hand. | Wasabi container:<br>XYZ position and orientation |

FIG. 126

Subject expert function result and mini-manipulation library example: making Sushi

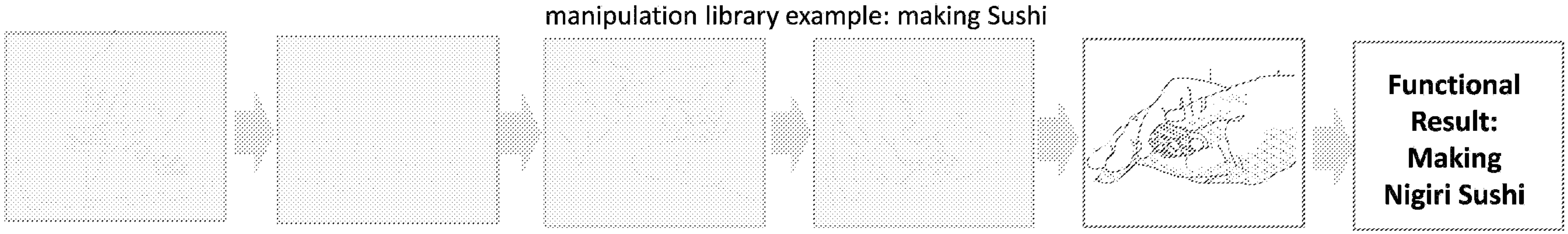

minimanipulation and parameters: :
Flip the assembled rice/fish piece (nigiri) over and press fish to hug the rice 3355

| Parameter (variable) value as initially captured in cooking process | | | Parameter (variable) value as initially captured in cooking process or defined by creator |
|---|---|---|---|
| Time | (Right) Hand and fingers | (Left) Hand and fingers | Temporary non-standard object library |
| Starting and ending | -XYZ position and orientation<br>-Pressure to press and shape assembled rice/fish piece(nigiri) | -XYZ position and orientation<br>-Pressure to press and shape assembled rice/fish piece(nigiri) | <u>Assembled fish/rice piece (nigiri)</u>:<br>-XYZ position and orientation in hands<br>-Shape, dimension |

FIG. 127

Subject expert function result and minimanipulation library example: Playing piano musical composition

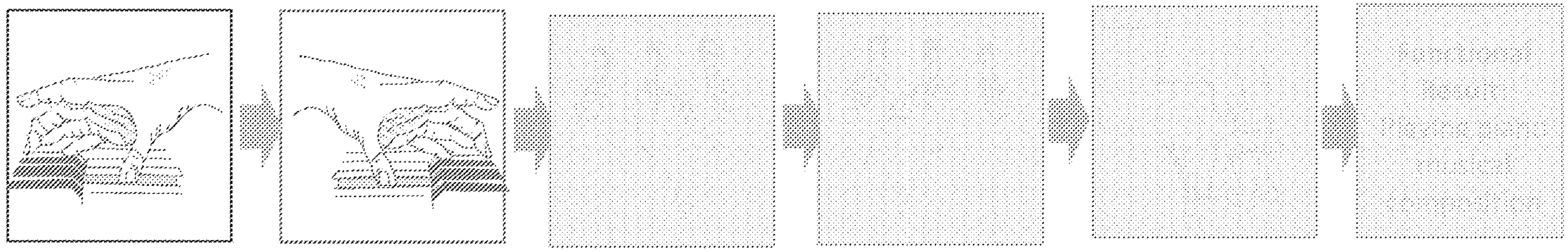

minimanipulation and parameters: Successfully press keys according playing technique 1… n by right hand

| Parameter (variable) value as initially captured in piano playing process or defined by creator | | Pre-defined parameter |
|---|---|---|
| Time | (Right) Hand and fingers | Standard object |
| Time each finger pressing starting and ending period | Define the number of pressing technique for each time period (one time pressing key period, or holding time) – a particular time cycle, where the time cycle could be the same time duration or different time duration | <u>Piano keys</u>: Assign each finger to exact key |

minimanipulation and parameters: Successfully press keys according playing technique 1… n by left hand

| parameter(variable) value as initially captured in piano playing process or defined by creator | | pre-defined parameter |
|---|---|---|
| Time | (Left) Hand and fingers | Standard object |
| Time each finger pressing starting and ending period | Define the number of pressing technique for each time period (one time pressing key period, or holding time) | <u>Piano keys</u>: Assign each finger to exact key |

FIG. 129

Subject expert function result and minimanipulation library example: Playing piano musical composition

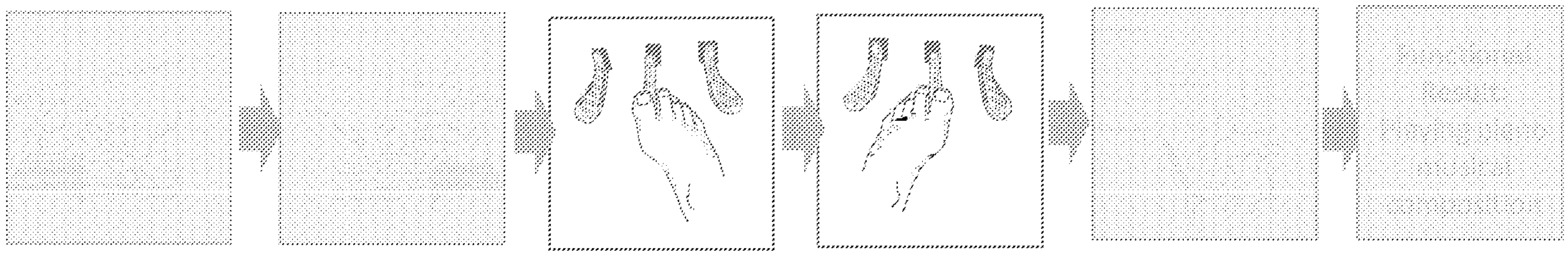

minimanipulation and parameters: Successfully press piano pedal by right foot

| Parameter (variable) value as initially captured in piano playing process or defined by creator | | Pre-defined parameter |
|---|---|---|
| Time | (Right) Foot | Standard object |
| Time each foot pressing starting and ending period | Define the number of pressing technique for each time period (one time pressing key period, or holding time) | Piano pedals: Assigning each feet to sufficient pedal |

minimanipulation and parameters: Successfully press piano pedal by left foot

| Parameter (variable) value as initially captured in piano playing process or defined by creator | | Pre-defined parameter |
|---|---|---|
| Time | (Left) Foot | Standard object |
| Time each foot pressing starting and ending period | Define the number of pressing technique for each time period (one time pressing key period, or holding time) | Piano pedals: Assigning each feet to sufficient pedal |

FIG. 130

Subject expert function result and minimanipulation library example: Playing piano musical composition

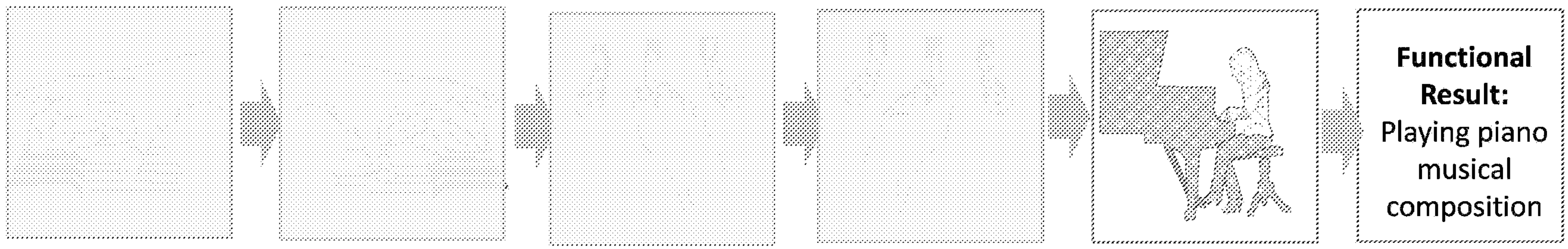

minimanipulation and parameters: Moving the body according Creator motion

| Parameter (variable) value as initially captured in piano playing process or defined by creator | |
|---|---|
| Time | Body |
| Time of staring and ending motions | XYZ initial body position<br>XYZ ending body position in each period of time (one time one direction moving body period |

FIG. 131

General function result and minimanipulation library example: Moving by walking from A-position to B-position –based on natural human walking General function result and minimanipulation library example: Moving by walking from A-position to B-position –based on natural human walking

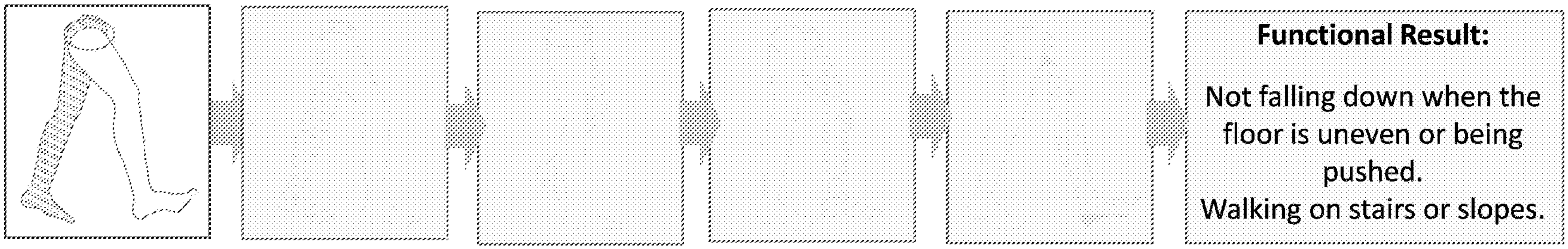

minimanipulation and parameters: the stride 3371

| pre-defined parameter | | | | | | | |
|---|---|---|---|---|---|---|---|
| time | right | | | left | | | others |
| | Leg | Knee | Foot | Leg | Knee | Foot | |
| Starting and ending | -XYZ initial and target position<br>-Height of leg raising depends of any barriers on the way<br>-Type of stepping technique | -XYZ initial and target position<br>-angle of bending | -XYZ initial and target position<br>-distance to ground | -XYZ initial and target position<br>-Height of leg raising depends of any barriers on the way<br>-Type of stepping technique | -XYZ initial and target position<br>-angle of bending | -XYZ initial and target position<br>-distance to ground | -body: location of center gravity<br>-Joints: vectors at the joints during walking and ground reaction |

FIG. 133

General function result and minimanipulation library example: Moving by walking from A-position to B-position –based on natural human walking

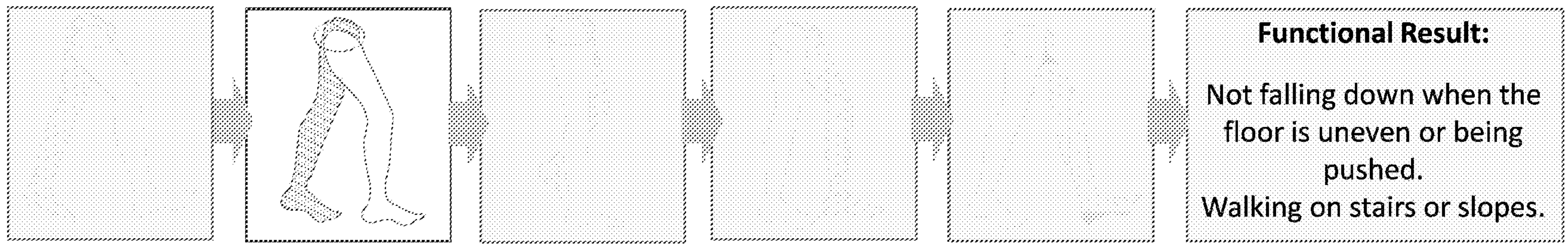

minimanipulation and parameters: the squash 3372

| pre-defined parameter | | | | | | | |
|---|---|---|---|---|---|---|---|
| time | right | | | left | | | others |
| | Leg | Knee | Foot | Leg | Knee | Foot | |
| Starting and ending | -XYZ initial and target position<br>-Height of leg raising depends of any barriers on the way<br>-Type of stepping technique | -XYZ initial and target position<br>-angle of bending | -XYZ initial and target position<br>-distance to ground | -XYZ initial and target position<br>-Height of leg raising depends of any barriers on the way<br>-Type of stepping technique | -XYZ initial and target position<br>-angle of bending | -XYZ initial and target position<br>-distance to ground | -body: location of center gravity<br>-Joints: vectors at the joints during walking and ground reaction |

FIG. 134

General function result and minimanipulation library example: Moving by walking from A-position to B-position –based on natural human walking

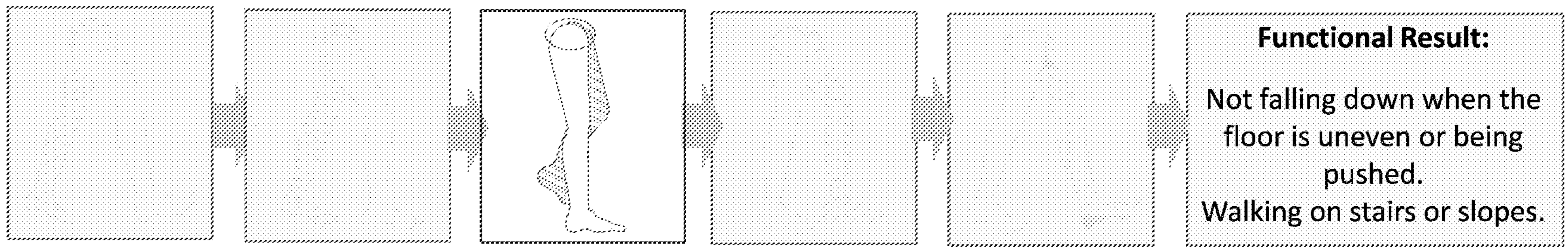

minimanipulation and parameters: the passing 3373

| pre-defined parameter | | | | | | | |
|---|---|---|---|---|---|---|---|
| time | right | | | left | | | others |
| | Leg | Knee | Foot | Leg | Knee | Foot | |
| Starting and ending | -XYZ initial and target position<br>-Height of leg raising depends of any barriers on the way<br>-Type of stepping technique | -XYZ initial and target position<br>-angle of bending | -XYZ initial and target position<br>-distance to ground | -XYZ initial and target position<br>-Height of leg raising depends of any barriers on the way<br>-Type of stepping technique | -XYZ initial and target position<br>-angle of bending | -XYZ initial and target position<br>-distance to ground | -body: location of center gravity<br>-Joints: vectors at the joints during walking and ground reaction |

FIG. 135

General function result and minimanipulation library example: Moving by walking from A-position to B-position –based on natural human walking

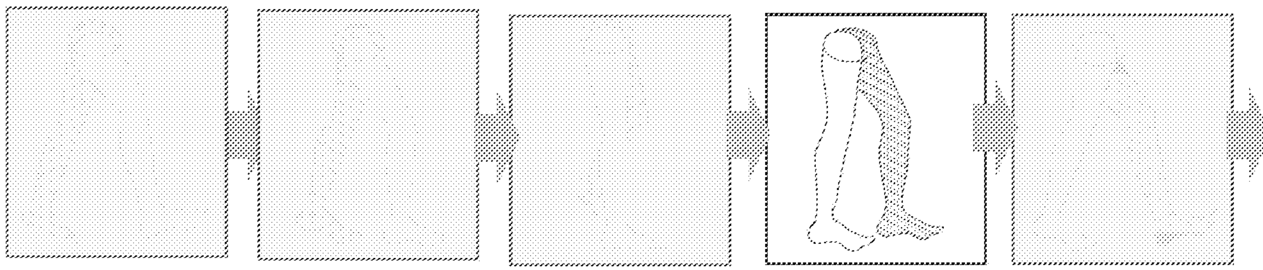

Functional Result:

Not falling down when the floor is uneven or being pushed.
Walking on stairs or slopes.

minimanipulation and parameters: the stretch 3374

| pre-defined parameter | | | | | | | |
|---|---|---|---|---|---|---|---|
| time | right | | | left | | | others |
| | Leg | Knee | Foot | Leg | Knee | Foot | |
| Starting and ending | -XYZ initial and target position<br>-Height of leg raising depends of any barriers on the way<br>-Type of stepping technique | -XYZ initial and target position<br>-angle of bending | -XYZ initial and target position<br>-distance to ground | -XYZ initial and target position<br>-Height of leg raising depends of any barriers on the way<br>-Type of stepping technique | -XYZ initial and target position<br>-angle of bending | -XYZ initial and target position<br>-distance to ground | -body: location of center gravity<br>-Joints: vectors at the joints during walking and ground reaction |

FIG. 136

General function result and minimanipulation library example: Moving by walking from A-position to B-position –based on natural human walking

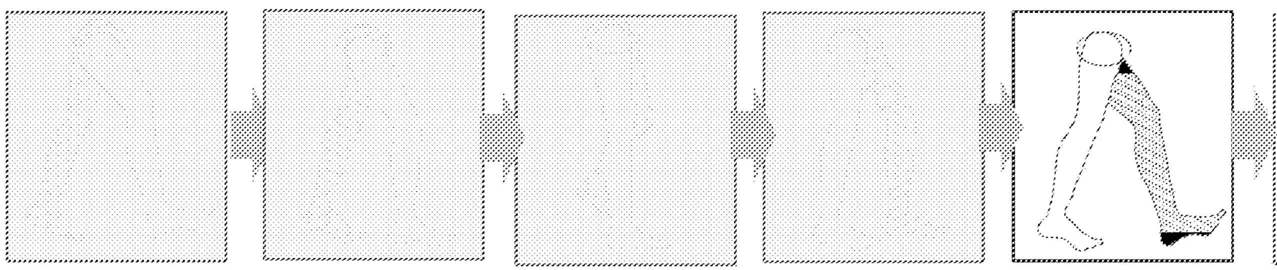

Functional Result:

Not falling down when the floor is uneven or being pushed.
Walking on stairs or slopes.

minimanipulation and parameters: the stride (change to the other leg) 3375

| pre-defined parameter | | | | | | | |
|---|---|---|---|---|---|---|---|
| time | right | | | left | | | others |
| | Leg | Knee | Foot | Leg | Knee | Foot | |
| Starting and ending | -XYZ initial and target position<br>-Height of leg raising depends of any barriers on the way<br>-Type of stepping technique | -XYZ initial and target position<br>-angle of bending | -XYZ initial and target position<br>-distance to ground | -XYZ initial and target position<br>-Height of leg raising depends of any barriers on the way<br>-Type of stepping technique | -XYZ initial and target position<br>-angle of bending | -XYZ initial and target position<br>-distance to ground | -body: location of center gravity<br>-Joints: vectors at the joints during walking and ground reaction |

FIG. 137

3381
Nursing care suite module – robot arms/hands operating

Task Execution example 1 – helping patient/senior taking medicine

Task Execution example 2 – helping patient/senior moving

Full torque required to move arm

Case 1 : $T_{original}(hand) = (w_{hand} + w_{motor})d_h(hand, elbow)$

Reduced Torque required

Case 2 : $T_{new}(hand) = (w_{hand})d_h(hand, elbow) + (w_{motor})\epsilon_h + \frac{1}{2}w_{axel}d_h(hand, elbow)$ front view top view First explosions
Step grip | steady I plasticine, card, and foam
1. Firs test First explosions
Step grip | steady I plasticine, card, and foam
2.1 knuckle exploration 1/2

First explosions
Step grip | steady I plasticine, card, and foam
2.2 knuckle exploration 2/2

Final proposal
Adjusted loft| precise and angled| PLA
3. Step grip exploration

Loft iterations
Flowing grip| steady and curvilinear | PLA
1. Loft iterations

Loft iterations
Flowing grip| steady and curvilinear | PLA
2.1 taking the loft forward 1/2

Loft iterations
Flowing grip| steady and curvilinear | PLA
2.2 taking the loft forward 2/2

Loft iterations
Flowing grip| steady and curvilinear | PLA
3 taking the loft forward – iterative process Final proposal
Adjusted loft| precise and angled| PLA
Final proposal 1/2

Final proposal
Adjusted loft| precise and angled| PLA
Final proposal 2/2

PALETTE KNIFE

SMALL SPATULAR

FISH SLICE

WHISK

LARGE SPATULAR

SMALL SAUCEPAN

MEDIUM SAUCEPAN

LARGE SAUCEPAN

LARGE POT

WOK

PASTA BASKET

SLAB

CHEF'S KNIFE

MEAT CARVING KNIFE

KNIFE FOR CUTTING

FILLET KNIFE

SLICER KNIFE

UNIVERSAL KNIFE

VEGETABLE KNIFE

BLENDER

SQUEEZY BOTTLE

CONTAINER POT LARGE

SMALL CONTAINER

| № # | #num | Group verb | Manipulation | The result of manipulation | | Ingredients | Whither? | Variables | Using a hand | possible options | Convenient containers | Numbers of recipes |
|---|---|---|---|---|---|---|---|---|---|---|---|---|
| 1.1 | num_ 1 | move | Move kitchen utensils (instruments ), containers from initial position xyz(1) (with different ingredients, or empty) to target position xyz(2) | Moved item | Container number 2/4, Table soup plate, glass bowl deep, deep plastic bowls, table plates of small size, saucer, metal bowl, snack plate, a deep porcelain bowl, a glass measuring container, a soup dish, a dish pan flat, deep frying pan, a saucepan with a long handle, skillet, pot, pan, glass baking dish, baking sheet (dripping pan), ceramic baking dish, form cheesecake socket sauce drushlak, cutting board, grater, paper towels, Sieve - with the coordinates xyz (coordinates of a center of the utensil) | Empty, potatoes, mushrooms (champignons), water (cold, hot), berries, perch fillet, cod, salmon; grated parmesan casserole, cheese, any other content. | Any place at work surface, oven, under the grinder, snack plate, sink, into pots and plates, etc | Item from standard object library SOL(n), Initial position xyz(1), target position xyz(2), initial orientation , target orientation , moving speed, the trajectory of movement xyz(a…z), type of holding | R,L,R L | Taking the edge, taking the handle, taking the side | 2 / 4 | 26 |

FIG. 165A

| № # | #num | Group verb | Manipulation | The result of manipulation | Ingredients | Ingredient position | Whither? | Variables | Using a hand | Helping tools | Convenient containers | Amount of recipe |
|---|---|---|---|---|---|---|---|---|---|---|---|---|
| 2.1 | num_2 | pour (liquid ingredients) | Pour the contents of kitchen utensils/containers from initial position xyz(1) to target position xyz(2) | Poured ingredients | cucumber pickle, sake, vinegar, olive oil, vegetable oil, milk, wine, brandy, truffle butter, yogurt, water, cream, vegetable broth, chicken broth, boiling water with pasta, sauce, vine, soy sauce, onion soup, egg yolk, cream, milk with beaten egg yolk, milk with beaten egg yolk and cream, marinade, berries jam, liquid smoke | Container No. 2, 4, 7 with the coordinates xyz Saucepan with the coordinates xyz Frying pan with the coordinates xyz Casserole with the coordinates xyz Metal bowl with the coordinates xy Glass bowl with the coordinates xy gauge tank with the coordinates xyz dipper with the coordinates xyz | Soup plate, dipper, container (4), frying pan, saucepan, saucer, saucepan, bake ware, pots, glass measuring container, drushlak, deep metal bowl, glass bowl, sieve | SOL(n), Initial position xyz(1), target position xyz(2), initial orientation, moving speed, the trajectory of movement xyz(a…z), type of holding, speed of turning (pouring), angle of inclination of SOL(n), waiting time, helping tool SOL(x) | R,L,RL | tablespoon, a small shovel, small spoon, ladle, whisk, a small plastic spatula | 2 / 4 / 7 | 25 |

FIG. 165B

| № # | #num | Group verb | Manipulation | The result of manipulation | Ingredients | Ingredient position | Variables | Using a hand | Utensils | Convenient containers | Amount of recipe | |
|---|---|---|---|---|---|---|---|---|---|---|---|---|
| 3.1 | num_4 | stir | Stir ingredients by any utensil SOL(n) | The mixed ingredients | Sliced vegetables: cucumbers, onions, parsley, carrots, cabbage, potatoes. Chopped chicken with mushrooms and chicken broth, minced beef, lasagna pasta, garlic, eggs, thick yoghurt-based sauce with garlic, butter with cookie crumbs, fresh berries (raspberries, strawberries, red currants), milled berries, crushed cookies, berry mix, chocolate mix, olive oil, vegetable oil, liquid sauce, pork fillet pieces in sauce, mushrooms, pickled cabbage with tomato paste and olive oil, a liquid marinade, milk and cream, fresh eggs with seasoning Knorr, turmeric, mayonnaise with mustard | Dining plate, cutting board, baking dish with the coordinates xyz, pan with the coordinates xyz, stewpot with the coordinates xyz, pot with the coordinates xyz deep glass dish with the coordinates xyz deep dining plate with the coordinates xyz saucer with the coordinates xyz, deep frying pan with the coordinates xyz, sieve coordinates xyz, deep metal bowl with coordinates xyz, | mixing appliance SOL(1), Initial SOL(1) position xyz(1), initial SOL(1) orientation, target utensil with ingredients SOL(2) position xyz(2), target SOL(2) orientation, moving speed, the trajectory of mixing xyz(a…z), speed of mixing, numbers of cycles | R, RL | Tongs, blades (wood, silicone), fork, kitchen spoon, teaspoon, tablespoon, blender, whisk, mixers, a small plastic shovel | | 23 | |

FIG. 165C

| № # | #num | Group verb | Manipulation | The result of manipulation | Equipment | What (by what)? | | Variables | Using a hand | | | Amount of recipe |
|---|---|---|---|---|---|---|---|---|---|---|---|---|
| 4.1 | num_5 | Switch on/off | Switch on/off or operate the equipment | Switched on / off equipment, set the mode | Stove, food processor, oven, faucet, the mixer, dishwasher, induction | fingers | | Equipment SOL(1), switch (n), switch(n) initial position, switch(n) target position, time of holding, trajectory of movement, speed of movement | R,L | | | 22 |
| 4.2 | num_6 | Open/Close | Close / open the door of equipment | | Oven, refrigerator , microwave, dishwasher | fingers | | Equipment SOL(1), door open, door close, trajectory of movement, speed of movement | R,L | | | 9 |
| № # | #num | Group verb | Manipulation | The result of manipulation | Ingredients | From where (to take)? | Whither? | Variables | Using a hand | Helping tools | Convenient containers | Amount of recipe |
| 5.1 | num_7 | pour (dry ingredients) | Pour the dry ingredients from kitchen utensils/ container into other position/utensils/container | Poured ingredients into target place | Flour, sugar, grated parmesan cheese, mushrooms, pickled vegetables, fried pieces of meat, cut vegetables: bell pepper, hot chili peppers, mushrooms, pickles, onion shallots, garlic, red onion; sauerkraut, boiled rice, cherry tomatoes, white crab meat, crumbled chocolate, coconut shavings, berries, starch, spices Knorr, pine nuts, turmeric, slices of roast pork, slices of sweet pepper; flour, steamed rice, pasta, broccoli, small slices of ham | The container number 2, 3, 4; bowl, saucer, colander, the food processor container | Dining soup plate, glass bowl, baking tin, sieve, dripping pan, frying pan, saucepan, pan, soup plate, deep glass bowl, plastic bowl, baking dish | Container/utensils SOL(1), SOL(1) initial position xyz(1), SOL(1) initial orientation, trajectory of SOL(1)movement xyz(a..z), position of pouring (turning of SOL(1)) xyz(2), speed of turning, angle of inclination of SOL(1), helping tool SOL(2) | R,L,RL | Table spoon | 2 / 3 / 4 | 22 |

FIG. 165D

| | | | | | | | | | | | | |
|---|---|---|---|---|---|---|---|---|---|---|---|---|
| 5.2 | num_8 | pour (dry ingredien ts) | Pour the contents of food film with xyz coordinates into anything with the coordinates xyz | Poured crumbs from one place to another | crumbled cookies | Food film | Dining soup plate with the coordinates xyz | Food film with ingredient initial position xyz(1), trajectory of food film movement with xyz(a..z), point of pouring position xyz(2), speed of turning, angle of inclination | R,L,RL | - | - | 1 |
| № # | #num | Group verb | Manipulation | The result of manipulation | Ingredients | From where (to take)? | Where? | Variables | Using a hand | Helping tools | Conven ient contain ers | Amou nt of recipe |
| 6.1 | num_9 | Add salt / pepper / sugar / spices | Season anything into any kitchen utensil using anything (seasoning) from a container number 2, 3 or mill | Seasoned ingredient | Salt, pepper, seasoning, red pepper, cinnamon, cumin seasoning, spices for meat, coriander, curry, voisko, brown sugar | Container for salt/sugar/spi ces, mill(electric/ manual) | Pan, cutting board, frying pan, saucepan | Container/mill SOL(1), Initial position of container SOL(1) xyz(1), SOL(1) orientation, trajectory of SOL(1)movement xyz(a..z), position of pouring (turning of SOL(1)) xyz(2), speed of turning, angle of inclination of SOL(1), number of turning cycles, pressing button time(in case of using electric mill), helping tool SOL(2) | R,RL | tablespo on, teaspoon | 2 / 3 | 23 |

FIG. 165E

| № # | #num | Group verb | Manipulation | | Ingredients | From where (to take)? | Where? | Variables | Using a hand | Suitable tools to help | | Amount of recipe |
|---|---|---|---|---|---|---|---|---|---|---|---|---|
| 7.1 | num_10 | Slice / Cut | Cut / chop ingredients on the cutting board | Chopped ingredients in pieces | Fillet of beef, chicken, pork, liver, bacon, octopus, turkey | Container, working surface, any plates, pans, frying pans with the coordinates xyz | Cutting Board | Ingredient shape, ingredient size, ingredient initial position xyz(1), ingredient initial orientation, target ingredient position xyz(2),target ingredient orientation, required pieces size, appliance(knife/ processor) SOL(1) . | RL | Universal (utility) knife, small knife, kitchen processor | 1 / 3 / 4 | 21 |
| 7.2 | num_11 | Slice / Cut | | Chopped ingredients in a fine shredding | Onions: white, red, parsley, onion pen, dill (fresh herbs), Chinese cabbage, garlic, cumin, shallots, chives, lettuce, celery | | | Ingredient shape, ingredient size, ingredient initial position xyz(1), ingredient initial orientation, target ingredient position xyz(2),target ingredient orientation, required pieces size, appliance(knife/ processor) SOL(1) . | | Universal knife, small knife, food processor | | |

FIG. 165F

| | | | | | | | | | | | | |
|---|---|---|---|---|---|---|---|---|---|---|---|---|
| 7.3 | num_12 | Slice / Cut | | Chopped ingredients in the form of pieces (except the meat) | Flapjack (pita), pineapple, bell pepper, lemon | | | Ingredient shape, ingredient size, ingredient initial position xyz(1), ingredient initial orientation, target ingredient position xyz(2),target ingredient orientation, required pieces size, appliance(knife/processor) SOL(1) . | | Universal knife, small knife | | |
| 7.4 | num_13 | Slice / Cut | | Cut slices of ingredients | Mushrooms: champignons, oyster mushrooms, wild mushrooms. Chile pepper, cucumber, cherry tomatoes, vanilla pod, pod green onions, garlic, pineapple, bell pepper, potatoes, carrots, celery, cauliflower, onions | | | Ingredient shape, ingredient size, ingredient initial position xyz(1), ingredient initial orientation, target ingredient position xyz(2),target ingredient orientation, required pieces size, appliance(knife/processor) SOL(1) . | | Universal knife, small knife | | |
| 7.5 | num_14 | Slice / Cut | | sliced ingredients into cubes | Fillet of beef, chicken, pork, liver, bacon, chorizo sausage | | | Ingredient shape, ingredient size, ingredient initial position xyz(1), ingredient initial orientation, target ingredient position xyz(2),target ingredient orientation, required pieces size, appliance(knife/processor) SOL(1) . | | Universal (utility) knife, small knife | | |

FIG. 165G

| | | | | | | | | | | |
|---|---|---|---|---|---|---|---|---|---|---|
| 7.6 | num_14.1 | Slice / Cut | | sliced ingredients into cubes (well cut ingredients) | Mushrooms, bell peppers, chili peppers, potatoes | | | Ingredient shape, ingredient size, ingredient initial position xyz(1), ingredient initial orientation, target ingredient position xyz(2),target ingredient orientation, required pieces size, appliance(knife/processor) SOL(1) . | | Universal (utility) knife, small knife |
| 7.7 | num_15 | Slice / Cut | | Cut in half ingredient | Fresh cucumber, cherry tomatoes, onions, baguette, zucchini, mini corn | | | Ingredient shape, ingredient size, ingredient initial position xyz(1), ingredient initial orientation, target ingredient position xyz(2),target ingredient orientation, required pieces size, appliance(knife/processor) SOL(1) . | | Universal (utility) knife, small knife |
| 7.8 | num_16 | Slice / Cut | | sliced bread | baguette | | | Ingredient shape, ingredient size, ingredient initial position xyz(1), ingredient initial orientation, target ingredient position xyz(2),target ingredient orientation, required pieces size, appliance(knife/processor) SOL(1) . | | Universal knife |

FIG. 165H

| | | | | | | | | | | | | |
|---|---|---|---|---|---|---|---|---|---|---|---|---|
| 7.9 | num_1 6.1 | Cut | | Delete the core of the ingredient | The bread, a slice of bread. lemon, tomato, bell pepper, zucchini | | | Ingredient shape, ingredient size, ingredient initial position xyz(1), ingredient initial orientation, target ingredient position xyz(2),target ingredient orientation, required pieces size, appliance(knife/processor) SOL(1) . | | Utility knife, teaspoon | | 2 |
| 7.10 | num_1 6.2 | Slice / Cut | | Cut in slices | Sausage, cheese, carbonate, large chunks of dried meat, ham, cuttlefish, roll | | | Ingredient shape, ingredient size, ingredient initial position xyz(1), ingredient initial orientation, target ingredient position xyz(2),target ingredient orientation, required pieces size, appliance(knife/processor) SOL(1) . | | Universal knife | | 3 |
| 7.11 | num_1 6.3 | to Cut | | Cut any shape / or cut into pieces with defined form (square, triangle, ravioli, etc.) | Potatoes, Pumpkin, Dough | | | Ingredient shape, ingredient size, ingredient initial position xyz(1), ingredient initial orientation, target ingredient position xyz(2),target ingredient orientation, required pieces size, appliance(knife/processor) SOL(1) . | | Utility knife, small knife, molds | | 3 |

FIG. 165I

| | | | | | | | | | | | | |
|---|---|---|---|---|---|---|---|---|---|---|---|---|
| 7.12 | num_1 6.4 | to Slice | | cut the broccoli into small sprigs | broccoli | | | Ingredient shape, ingredient size, ingredient initial position xyz(1), ingredient initial orientation, target ingredient position xyz(2),target ingredient orientation, required pieces size, appliance(knife/processor) SOL(1) . | | Universal knife | | 1 |
| 7.13 | num_1 6.5 | to Slice | | cut chicken breast into thin slices across the width of the breast using a utility knife | chicken breast | | | Ingredient shape, ingredient size, ingredient initial position xyz(1), ingredient initial orientation, target ingredient position xyz(2),target ingredient orientation, required pieces size, appliance(knife/processor) SOL(1) . | | Universal knife | | 1 |
| 7.14 | num_1 6.6 | to Slice | | cut the apple into fine strips | apple | | | Ingredient shape, ingredient size, ingredient initial position xyz(1), ingredient initial orientation, target ingredient position xyz(2),target ingredient orientation, required pieces size, appliance(knife/processor) SOL(1) . | | Universal knife | | 1 |

FIG. 165J

| № # | #num | Group verb | Manipulation | The result of manipulation | Ingredients | From where (to take)? | Whither? | Variables | Using a hand | Helping tools | Convenient containers | Amount of recipe |
|---|---|---|---|---|---|---|---|---|---|---|---|---|
| 8.1 | num_17 | move | Move ingredient(s) from initial position to required position | Moved ingredient in required place | Fillet of beef, pork, chicken, chicken feet; fish fillets, Flapjack (Pita) pita, onions: white, red; Shallots, Lemon, Peeled potatoes, parsley, basil, onion pen, spinach, thyme, basil, tarragon (wormwood), chopped parsley, dill; Mushrooms: champignons, oyster mushrooms, honey agaric. shredded carrots, shredded cabbage, sliced cucumber, sliced meat, liver; chopped (bacon, potatoes, cabbage, onions, pieces of meat, bacon, cherry tomatoes, onion, chili peppers, garlic cloves, vanilla pods, pieces of beef liver), Chinese cabbage, roll of the dough, pickled vegetables, fried potatoes, fried pieces of pork , ground beef, grilled onions, parsley and dill; Paste "lasagna", ground beef, grated cheese, Flapjack (Pita), Liver dough, pancakes, sour cream, mustard, tomato paste, whipped eggs with parmesan cheese, thick sauce, couscous, biscuits, butter, cookies, berry mix, melted chocolate, cooked fillet, boiled chicken wings, potato, onion, baguette, sliced baguette, sugar, meat rolls with stuffing (Kibbeh), pineapple pieces, cabbage, Kibbeh, tagliatelle pasta, omelet, pickling cabbage in saffron sauce, cherry tomatoes, paper for baking, chicken pie with mushrooms, pasta carbonara, vanilla pod. The pulp of vanilla, Dashi Kombu (kelp) with dry chopped chilli pepper, seaweed combo burgers (cutlets), dark crab meat, minced meat, Beef Cube (Knorr), octopus, squid, zucchini, ginger root, condensed cream of mushroom soup, mini-corn | The container number 1, 3, 4, 5, bowls, paper towels, pans, metal containers, cutting boards, bowls, saucepan, deep metal bowl, dripping pan, deep snack dish, plastic bowls, baking dish, bowl, kitchen processor container, nozzle for kibbeh | Bowls, paper towels, pans, metal containers, cutting boards, saucepan, deep metal bowl, baking sheet (dripping pan), deep snack dish, plastic bowls, baking dish, nozzle for Kibbeh | Ingredient shape, ingredient size, ingredient initial position xyz(1), ingredient initial orientation, target ingredient position xyz(2),target ingredient orientation, moving speed, the trajectory of movement xyz(a...z), type of holding, helping tool SOL(1) | R,L,RL | Universal knife Silicone spatula skimmer hands tablespoon Plastic blades tongs dining fork Kitchen spoon Small knife Wooden sticks for sushi | 1, 3, 4, 5 | 19 |

FIG. 165K

| № | #num | Group verb | Manipulation | The result of manipulation | Ingredients | In what? | Variables | Using a hand | Helping tools | | Amount of recipe | |
|---|---|---|---|---|---|---|---|---|---|---|---|---|
| 9.1 | num_18 | | | turn mixture of pieces | Slices of beef, chicken | | | | | | | |
| 9.2 | num_19 | turn | Flip ingredient | Turn whole pieces | meat rolls with stuffing (Kibbeh), fillet of cod, fillet of salmon, cutlets, chicken fillet, steak | Frying pan, dining soup plate | Ingredient shape, ingredient size, ingredient initial position xyz(1), ingredient initial orientation, target ingredient position xyz(2),target ingredient orientation, turning speed, type of holding, helping tool SOL(1) | R,L, RL | Tongs, blades (wood, silicone) , fork | | 7 | |
| 9.3 | num_20 | | | Flip (turn) pancakes | Pancakes, Flapjack | | | | | | | |
| № # | #num | Group verb | Manipulation | The result of manipulation | Ingredients | From where (to take)? | Whither? | Variables | Using a hand | Suitable tools to help | Convenient containers | Amount of recipe |
| 10.1 | num_21 | break | Beat the egg taking it out of the any containers and break it anywhere | To place the egg content in a bowl | Egg | Container number 4 | Deep metal bowl | Ingredient shape, ingredient size, ingredient initial position xyz(1), ingredient initial orientation, target content ingredient position xyz(2), helping tool SOL(1) | RL | utility knife | 4 | 9 |
| 10.2 | num_22 | Separate | Separate the yolks from the glairs | Separated the yolks from the glairs | white, yolk | Any utensils or container | Deep metal bowl, deep plastic bowl, glass bowl, ceramic bowl | Utensil / container SOL(1), SOL(1) Initial position xyz(1), helping tool SOL(x) | RL | | | 4 |

FIG. 165L

| № # | #num | Group verb | Manipulation | | Ingredients | | Variables | Using a hand | | | Amount of recipe | |
|---|---|---|---|---|---|---|---|---|---|---|---|---|
| 11.1 | num_23 | shake | Shake ingredients | | Mushrooms: champignons, oyster mushrooms, honey agaric; spaghetti, bell pepper, baby corn, carrots, pieces of meat | Containers, working space | Bowl, container | Container/bowl SOL(1), SOL(1) initial position xyz(1), SOL(1) initial orientation, target SOL(1) position xyz(2), shaking speed, shaking trajectory xyz(a…z), number of shaking cycles, shaking time | R,L,RL | | | 6 |
| № # | #num | Group verb | Manipulation | The result of manipulation | Ingredients | From where (to take)? | Whither? | Variables | Using a hand | Helping tools | Convenient containers | Amount of recipe |
| 12.1 | num_24 | squeeze | Squeeze the juice from the fruit or vegetable | squeezed juice | Lemon, carrot | Container Number 4 | Frying pan, glass, pan, bowl, cup | Ingredient shape, ingredient size, ingredient initial position xyz(1), ingredient initial orientation, target squeezed juice position xyz(2), moving speed, the trajectory of movement xyz(a…z), helping tool or equipment SOL(1) | R,L,RL | Juicer | 4 | 2 |
| 12.2 | num_25 | squeeze | Squeeze garlic | garlic juice | garlic clove | Container | Frying pan, soup plate | | R,L,RL | garlic press | | 1 |
| 12.3 | num_24 | squeeze | Squeeze the juice from the fruit or vegetable | squeezed ingredient | pickled vegetables | Container Number 4 | Frying pan, Metal bowl | Ingredient shape, ingredient size, ingredient initial position xyz(1), ingredient initial orientation, target squeezed juice position xyz(2), moving speed, the trajectory of movement xyz(a…z) | R,L,RL | | 4 | 2 |

FIG. 165M

| № # | #num | Group verb | Manipulation | The result of manipulation | Ingredients | From where (to take)? | Whither? | Variables | Using a hand | Helping tools | Convenient containers | Amount of recipe |
|---|---|---|---|---|---|---|---|---|---|---|---|---|
| 13.1 | num_26 | Peel | Peel ingredients taking them from utensils/container. After the manipulation, put them into required place/utensil/container | peeled ingredients | Carrots, onions, shallots, cucumber, potato, pumpkin, shrimp, ginger, apple | Container Number 4/1 | Above the work surface, cutting board, glass deep bowl | Ingredient shape, ingredient size, ingredient initial position xyz(1), ingredient initial orientation, target ingredient position xyz(2),target ingredient orientation, type of holding, helping tool SOL(1) | RL | Manual peeler, a small knife | 4 | 7 |
| 13.2 | num_26.1 | to peel (to shell) | To shell the boiled egg and placed it in required place. | Shelled egg | boiled egg | Any utensils or container | required place | Ingredient shape, ingredient size, ingredient initial position xyz(1), ingredient initial orientation, target ingredient position xyz(2) | RL | | 4 | 1 |
| № # | #num | Group verb | Manipulation | The result of manipulation | Ingredients | From where (to take)? | Whither? | Variables | Using a hand | Helping tools | Convenient containers | Amount of recipe |
| 14.1 | num_27 | Grate | Grate ingredient using grater or food processor | Grinded (grated) ingredient | Cheese, peeled cucumber, carrot, nutmeg, ginger root | Container number 3, 4, 5; cutting board | Dining plate / cutting board / glass bowl / baking dish | Ingredient shape, ingredient size, ingredient initial position xyz(1), ingredient initial orientation, target grinded ingredient position, type of holding, helping tool SOL(1), processor operation mode/time | RL | Grater, food processor | 3 / 4 / 5 | 7 |

FIG. 165N

| № # | #num | Group verb | Manipulation | The result of manipulation | Ingredients | From where (to take)? | Where? | Variables | Using a hand | Helping tools | Convenient containers | Amount of recipe |
|---|---|---|---|---|---|---|---|---|---|---|---|---|
| 15.1 | num_28 | grease | Grease the dripping pan (baking sheet) by ingredient | greased surface | A mix of eggs and cheese, yoghurt sauce, egg yolk, butter | Bowl, container number 2 | baking dish, baking sheet (dripping pan) | Container/utensils with greasing ingredient SOL(1), SOL(1) initial position xyz(1), SOL(1) initial orientation, greasing surface position, greasing surface size, greasing surface shape, trajectory of SOL(2)movement xyz(a..z), speed of greasing, helping tool SOL(2) | RL,R,L | Teaspoon with the coordinates xyz, silicone brush | 2 | 4 |
| № # | #num | Group verb | Manipulation | The result of manipulation | Ingredients | In what? | Where? | Variables | Using a hand | Helping tools | Convenient containers | Amount of recipe |
| 16.1 | num_29 | roll | Roll ingredients in the flour, sauce, breadcrumbs | Rolled ingredient | Slices of pork fillet, cod fillet, minced meat, pasta "lasagna", eggplant, ham | Flour, thick sauce, breadcrumbs, spices | Bowl, dining, plate, cutting board | Ingredient shape, ingredient size, ingredient initial position xyz(1), ingredient initial orientation, container with second ingredient SOL(1), target ingredient position xyz(2),target ingredient orientation | RL | | | 4 |
| № # | #num | Group verb | Manipulation | The result of manipulation | Ingredients | | Where? | Variables | Using a hand | Helping tools | Convenient containers | Amount of recipe |
| 17.1 | num_30 | wash | wash ingredients | washed ingredients | Carrots | | Sink | Ingredient shape, ingredient size, ingredient initial position xyz(1), ingredient initial orientation, target ingredient position xyz(2),target ingredient orientation, moving speed, the trajectory of movement xyz(a…z), type of holding | RL | | | 1 |

FIG. 165O

| № # | #num | Group verb | Manipulation | | Ingredients | | Where? | Variables | Using a hand | Suitable tools to help | Convenient containers | Amount of recipe |
|---|---|---|---|---|---|---|---|---|---|---|---|---|
| 18.1 | num_31 | crush | crush ingredient | crushed ingredient | garlic clove | | Cutting board | Ingredient shape, ingredient size, ingredient initial position xyz(1), ingredient initial orientation, target ingredient position xyz(2),target ingredient orientation, type of holding, helping tool SOL(1) | RL | Utility knife | | 2 |
| № # | #num | Group verb | Manipulation | | Ingredients | What (in what)? | Where? | Variables | Using a hand | | | Amount of recipe |
| 19.1 | num_32 | Wrap / Open | Wrap ingredients in foil/paper on the working surface | wrapped ingredient | Flapjack, biscuits, sliced potatoes, roll of the dough | in the foil, in plastic wrap, in paper towel | Working surface | Ingredient shape, ingredient size, ingredient initial position xyz(1), ingredient initial orientation, target ingredient position xyz(2), target ingredient orientation, number cycles of wrapping | RL | | | 4 |
| № # | #num | Group verb | Manipulation | The result of manipulation | Ingredients | From where (to take)? | Whither? | Variables | Using a hand | | Convenient containers | Amount of recipe |
| 20.1 | num_34 | Crumble | Crumble ingredient by any utensils | Chopped (crumbled) ingredients | Parsley, bay leaf, thyme | Container 2/4 | Cutting board, baking dish | Ingredient shape, ingredient size, ingredient initial position xyz(1), ingredient initial orientation, target ingredient position xyz(2), target ingredient orientation, type of holding, helping tool SOL(1) | RL | | 2 / 4 | 2 |

FIG. 165P

| № # | #num | Group verb | Manipulation | The result of manipulation | Ingredients | Where? | Variables | Using a hand | Helping tools | Amount of recipe | |
|---|---|---|---|---|---|---|---|---|---|---|---|
| 21.1 | num_35 | Chop | Chop ingredients by kitchen hammer on the cutting (chopping) board | Chopped ingredients | biscuit (cracker) | Cutting board | Ingredient shape, ingredient size, ingredient initial position xyz(1), ingredient initial orientation, target ingredient position xyz(2),target ingredient orientation, type of holding, helping tool SOL(1) | RL | Chop hammer with coordinates xyz | 1 | |
| № # | #num | Group verb | Manipulation | | Ingredients | Where? | Variables | Using a hand | Helping tools | Amount of recipe | |
| 22.1 | num_36 | Condense | Condense ingredients in any utensils | | Minced meat, the consistency of biscuits and butter | Form for cheesecake, deep metal bowl | Ingredient shape, ingredient size, ingredient initial position xyz(1), ingredient initial orientation, target ingredient position xyz(2), target ingredient orientation, type of holding, helping tool SOL(1) | RL | Table fork with the coordinates xyz | 2 | |
| № # | #num | Group verb | Manipulation | | Types of nozzles | From where (to take)? | Whither? | Variables | Using a hand | Convenient containers | Amount of recipe |
| 23.1 | num_37 | Insert | Insert the nozzle in a food processor | | for vegetables, farce | standard location with the coordinates xyz | Food processor (Kitchen kombain) with the coordinates xyz | Standard manipulation | RL | | 3 |
| № | #num | | Manipulation | | Ingredients | Where from to take the ingredient? | Where to perform the manipulation? | Variables | Using a hand | Used containers | |
| 24.1 | num_38 | | Insert any ingredient, taking from any utensils, into another ingredient | | | dripping pan, container number 4 | Dining plate, snack plate | Ingredient shape, ingredient size, ingredient initial position xyz(1), ingredient initial orientation, target ingredient position xyz(2), target ingredient orientation, moving speed, the trajectory of movement xyz(a…z), type of holding | RL | 4 | 2 |

FIG. 165Q

| № # | #num | Group verb | Manipulation | The result of manipulation | Ingredients | From where (to take)? | Whither? | Variables | Using a hand | | | Amount of recipe |
|---|---|---|---|---|---|---|---|---|---|---|---|---|
| 25.1 | num_40 | to Pour / to Rinse | Pour the water / rinse from the tap into any utensils | Water poured into a bowl | water | Sink with the coordinates xyz | Saucepan | Utensil SOL(1), SOL(1) Initial position xyz(1), SOL(1) orientation, trajectory of SOL(1)movement xyz(a..z), SOL(1) target position xyz(2), speed of moving, the trajectory of movement xyz(a…z) | R,L,RL | | | 1 |
| № # | #num | Group verb | Manipulation | The result of manipulation | What? | What (by what)? | Type of covering | Variables | Using a hand | | | Amount of recipe |
| 26.1 | num_41 | cover / open | Cover any kitchen utensils with cover or towel, taking from the place | Closed (covered) / opened utensils | Saucepan, frying pan, baking dish | By cover, A big plate, paper towel, dough | full, leave a small gap | Standard manipulation | R,L,RL | | | 7 |
| 26.2 | num_41.1 | Cover / remove | Cover the fillets with food film (cling film) | | turkey breast | Food film with the coordinates xyz | full, leave a small gap | Ingredient shape, ingredient size, ingredient initial position xyz(1), ingredient initial orientation, target ingredient position xyz(2),target ingredient orientation, moving speed, the trajectory of movement xyz(a…z), type of holding | RL | | | |

FIG. 165R

| № # | #num | Group verb | Manipulation | The result of manipulation | What? | From where (to take)? | Where? | Variables | Using a hand | Helping tools | Convenient containers | Amount of recipe |
|---|---|---|---|---|---|---|---|---|---|---|---|---|
| 27.1 | num_42 | Arrange / distribute | Arrange (lay) food foil / food film on the work surface | Laid foil / film on any surface | Food foil, Food film, food paper | | The working surface , dripping pan (baking dish) | component initial position xyz(1), component initial orientation, target component position xyz(2),target component orientation, moving speed, the trajectory of movement xyz(a…z), type of holding | RL | | | 2 |
| 27.2 | num_43 | | any distributed products (ingredients) on a surface | | Flour, cheese, sugar , bread crumbs, egg yolk | Container number 3, cutting board | Baguette, a baking dish, fillet | Ingredient shape, ingredient size, ingredient initial position xyz(1), ingredient initial orientation, target ingredient position xyz(2),target ingredient orientation, moving speed, the trajectory of movement xyz(a…z), type of holding | R,L,RL | Sieve | 3 | 4 |
| № # | #num | Group verb | Manipulation | | Ingredients | From where (to take)? | Whither? | Variables | Using a hand | | | Amount of recipe |
| 28.1 | num_44 | Tear off | Tear off a piece of any ingredient and put in any utensils | Cut off a piece of meat | Chicken fillet, herbs (basil) | Cutting board | Soup plate | Ingredient shape, ingredient size, ingredient initial position xyz(1), ingredient initial orientation, target ingredient position xyz(2), target ingredient orientation, required pieces size. | RL | | | 1 |

FIG. 165S

| № # | #num | Group verb | Manipulation | | | | Whither? | Variables | Using a hand | | | Amount of recipe |
|---|---|---|---|---|---|---|---|---|---|---|---|---|
| 29.1 | num_ 45 | Throw | Throw the used ingredients | | | | Waste basket | Ingredient shape, ingredient size, ingredient initial position xyz(1), ingredient initial orientation, target ingredient position xyz(2), the trajectory of movement xyz(a…z) | R | | | 1 |
| № # | #num | Group verb | Manipulation | The result of manipulation | Ingredients | | Where? | Variables | Using a hand | Helping tools | | Amount of recipe |
| 30.1 | num_ 46 | Fold in half | Fold any ingredient in half in any utensils | Folded in half fillets | fish fillets | | Dining soup plate | Ingredient shape, ingredient size, ingredient initial position xyz(1), ingredient initial orientation, target ingredient position xyz(2), target ingredient orientation | RL | By hands | | 1 |
| № # | #num | Group verb | Manipulation | The result of manipulation | Ingredients | | Where? | Variables | Using a hand | Helping tools | | Amount of recipe |
| 31.1 | num_ 47 | Give shape | Make various forms to ingredients for baking on a dripping pan (baking sheet) | Shaping the product | Cheese | | Dripping pan | Ingredient shape, ingredient size, ingredient initial position xyz(1), ingredient initial orientation, target ingredient position xyz(2),target ingredient orientation, moving speed, the trajectory of movement xyz(a…z) | RL | By hands | | 1 |
| № | #num | Group verb | Manipulation | The result of manipulation | Ingredients | | Whither? | Variables | Using a hand | Helping tools | | Amount of recipes |
| 32.1 | num_ 48 | To strain | To strain different ingredients, using sieve into the pan | Strained sauce | Sauce | | Pan | SOL(n), Initial position xyz(1), target position xyz(2), initial orientation, moving speed, the trajectory of movement xyz(a…z), type of holding, speed of turning (pouring), angle of inclination of SOL(n), waiting time | RL | Sieve | | 1 |

FIG. 165T

| № | #num | Group verb | Manipulation | The result of manipulation | Ingredients | | Where? | Variables | Using a hand | Helping tools | | Amount of recipe |
|---|---|---|---|---|---|---|---|---|---|---|---|---|
| 33.1 | num_ 49 | To roll | To roll dough on a paper for baking | Rolled dough | Dough | | Paper for baking | Ingredient shape, ingredient size, ingredient initial position xyz(1), ingredient initial orientation, target ingredient position xyz(2), target ingredient shape, target ingredient orientation, moving speed, the trajectory of movement xyz(a…z) | RL | Rolling pin | | 1 |
| № | #num | Group verb | Manipulation | The result of manipulation | Ingredients | | Where? | Variables | Using a hand | Helping tools | | Amount of recipe |
| 34.1 | num_ 50 | To knead | To knead dough | Kneaded dough | Dough | | Deep glass bowl | Ingredient shape, ingredient size, ingredient initial position xyz, target ingredient shape, moving speed, the trajectory of movement xyz(a…z) | RL | Fingers | | 1 |
| № | #num | Group verb | Manipulation | The result of manipulation | Ingredients | | Where? | Variables | Using a hand | Helping tools | | Amount of recipe |
| 35.1 | num_ 51 | To pierce | To pierce ingredient | Pierced ingredient | Meat, Fillets | | Cutting board, Snack plate | Ingredient shape, ingredient size, ingredient initial position xyz, the trajectory of movement xyz(a…z), helping tool SOL(1), target position xyz(1), target orientation, moving speed, the trajectory of movement xyz(a…z) | R,RL | Tenderizer, Toothpick | | 1 |
| № | #num | Group verb | Manipulation | | Ingredients | | Where? | Variables | Using a hand | Helping tools | | Amount of recipe |
| 36.1 | num_ 52 | To remove | Removed (flesh, viscera) | | Shrimp | | Cutting board | Ingredient shape, ingredient size, ingredient initial position xyz(1), ingredient initial orientation, target ingredient position xyz(2),target ingredient orientation, helping tool SOL(1), target position xyz(1), target orientation, moving speed, the trajectory of movement xyz(a…z) | RL | Toothpick | | 1 |

FIG. 165U

| № | #num | Group verb | Manipulation | | Ingredients | | Where? | Variables | Using a hand | Helping tools | | Amount of recipe |
|---|---|---|---|---|---|---|---|---|---|---|---|---|
| 37.1 | num_53 | To dip (to sop) | To dip ingredient in sauce | | Baby octopus, Sauce, Water | | Saucepan | Ingredient shape, ingredient size, ingredient initial position xyz(1), ingredient initial orientation, target ingredient position xyz(2),target ingredient orientation, the trajectory of movement xyz(a…z), Number of dipping, time in a lower position | R | By hands | | 1 |
| № | #num | Group verb | Manipulation | | Ingredients | | Where? | Variables | Using a hand | Helping tools | | Amount of recipe |
| 38.1 | num_54 | Touch up | To touch up the ingredient | | Slices of bacon | | In any bowl | Ingredient shape, ingredient size, ingredient initial position xyz(1), ingredient initial orientation, target ingredient position xyz(2),target ingredient orientation, moving speed, the trajectory of movement xyz(a…z) | R | By hands | | 1 |
| № | #num | Group verb | Manipulation | | Ingredients | | Where? | Variables | Using a hand | Helping tools | | Amount of recipe |
| 39.1 | num_55 | Roll up | To roll up ingredient in a tube | | Turkey breast | | Cutting board | Ingredient shape, ingredient size, ingredient initial position xyz(1), ingredient initial orientation, target ingredient position xyz(2), target ingredient orientation, target ingredient shape | RL | By hands | | 1 |

FIG. 165V

Table A: Types of Equipment

| | Types of Equipment |
|---|---|
| | KITCHEN ACCESSORIES |
| 1 | Funnels |
| 1.1. | stainless steel funnel |
| 1.2. | plastic funnel |
| 1.3 | silicone funnel |
| 1.4 | convertible funnel |
| 2 | Colanders |
| 2.1 | quadratic colanders |
| 2.2 | oval ladle-vases |
| 2.3 | colanders with folding handles |
| 2.4 | flat colander |
| 2.5 | plastic colanders |
| 2.6 | small round colanders |
| 2.7 | suspended colanders |
| 2.8 | cover-colander |
| 2.9 | stainless steel and aluminum colanders |
| 2.1 | cone colanders |
| 3 | Kitchen Appliances |
| 3.1. | Whisk |
| 3.2. | scoop, spatula |
| 3.2.1 | cook spatula |
| 3.2.2. | spatula with slots |
| 3.2.3. | confectionery spatula |
| 3.5 | Spoons |
| 3.5.1 | serving spoon |
| 3.5.2 | spoon-tongs |
| 3.5.3 | spoon with slots |
| 3.5.4 | spoon for rice |
| 3.5.5 | ladle spoon |
| 3.5.6 | ice cream spoon |
| 3.5.7 | honey spoon |
| 3.5.8 | spaghetti spoon |
| 3.5.9 | serving spoon |
| 3.6 | confectionery syringe for cookies and cream |
| 3.7 | soup ladle |
| 3.8 | Potato Masher |
| 3.9 | skimmer |
| 3.10 | Meat fork |
| 3.11 | Brush |

FIG. 166A

| | |
|---|---|
| 3.12 | coffee filter |
| 3.5.7 | honey spoon |
| 3.5.8 | spaghetti spoon |
| 3.5.9 | serving spoon |
| 3.6 | confectionery syringe for cookies and cream |
| 3.7 | soup ladle |
| 3.8 | Potato Masher |
| 3.9 | skimmer |
| 3.10 | Meat fork |
| 3.11 | Brush |
| 3.23 | ties for rolls |
| 3.2 | dough mini-scraper |
| 3.25 | grill tongs |
| 3.26 | spaghetti tongs |
| 3.27 | ice tongs |
| 3.28 | sugar tongs |
| 3.29 | package clip |
| 3.30 | package clip |
| 3.31 | citrus spray |
| 3.32 | Dough press |
| 3.33 | scoop for bulk |
| 3.34 | salad serving tongs (tweezers) |
| 3.35 | accessories for tubes |
| 3.36 | Pestle |
| 3.37 | Mortar |
| 3.38 | roller for cutting of the rings |
| 3.39 | opener for caps |
| 3.40 | meat tenderizer; meat softener |
| 3.41 | egg yolk separator |
| 3.42 | Apron |
| 3.33 | scoop for bulk |
| 3.43 | tools for decoration |
| 3.44 | jar for oil and vinegar |
| 3.45 | mug for milk boiling |
| 3.46 | napkins |
| 3.47 | tablecloth |
| 3.48 | marker for glasses |
| 3.49 | potato masher |
| 3.50 | Basket |
| 3.51 | meat tenderizer |
| 3.52 | cocotte |
| 3.53 | brush for washing of the vegetables |

FIG. 166B

| | |
|---|---|
| 3.54 | lids for cups |
| 3.55 | rope for baking |
| 3.56 | jar for herbs storage |
| 3.57 | Mortar |
| 3.58 | scraper for glass ceramic plates |
| 3.59 | Teapot for tea |
| 3.60 | clothespin for notes on the fridge |
| 3.61 | railing systems |
| 3.62 | hanger for kitchen tools |
| 3.63 | plunger with not adhering surface |
| 3.64 | silicone plunger |
| 3.65 | rolling pin with adjustable thickness |
| 3.66 | vacuum bags with pump |
| 3.67 | gas lighter |
| 3.68 | bone forceps |
| 4 | kitchen timers, thermometers |
| 4.1 | timer for meat roasting |
| 4.2 | digital thermometer |
| 4.3 | holder for thermometer |
| 4.4 | meat thermometer |
| 4.5 | digital timer |
| 4.6 | elector. digital timer |
| 4.7 | _aramel thermometer |
| 5 | Mills for spices |
| 5.1 | mill for black pepper |
| 5.2 | electric mill |
| 5.3 | combined mill for pepper and salt (2 in 1) |
| 5.4 | mill for spices |
| 5.5 | mill for greens |
| 6 | Measuring utensils |
| 6.1. | Measuring container (plastic bottle) |
| 6.2. | measuring jar |
| 6.3. | measuring jug |
| 6.4. | measuring bowl |
| 6.5. | mechanical dispenser for ice cream |
| 7 | mechanical mixers |
| | |
| 8 | Bowl |
| 8.1. | metal bowl |
| 8.2. | stainless steel bowl |
| 8.3. | plastic bowl |
| 8.4. | plastic bowl |
| 8.5. | bowls for food |

FIG. 166C

| | |
|---|---|
| 9 | Sets |
| 9.2 | wine set |
| 9.3 | sets for spices |
| 9.6. | cupcakes baking set |
| 9.7 | accessory kit for baking |
| 9.8 | set of bar tools |
| 9.9 | set of kitchen tools |
| 9.10 | Set for eggs and pancakes baking |
| 11 | Slicing and cutting of products |
| 11.1 | Cutter |
| 11.2 | holder for onions cutting |
| 11.2 | cutting boards |
| 11.3 | universal professional knives |
| 11.4 | kitchen shears |
| 11.5 | hatchet |
| 11.6 | meat hatchet |
| 11.7 | Hammer for meat with hatchet |
| 11.8 | Hoe |
| 11.9 | Hammer for meat |
| 11.10 | Knives |
| 11.11 | knife for greens |
| 11.12 | knife for oranges |
| 11.13 | knife for kiwi |
| 11.14 | knife for pineapple |
| 11.15 | Spiral knife for carrots |
| 11.16 | multifunctional knife |
| 11.17 | vegetable knife |
| 11.18 | Pizza Cutter |
| 11.19 | universal knife |
| 11.20 | knife for slicing |
| 11.21 | cook knife |
| 11.22 | gastronomic knife |
| 11.23 | opener |
| 11.24 | Cheese knife |
| 11.25 | boning knife |
| 11.26 | lettuce knife |
| 11.27 | knife for steaks |
| 11.28 | butcher knife |
| 11.29 | shredding knife |
| 11.30 | bread knife |
| 11.31 | fish knife |
| 11.32 | knife for sandwiches |
| 11.33 | Santoku knife |
| 11.34 | knife for fruit coring |
| 11.35 | Butter knife |

FIG. 166D

| | |
|---|---|
| 12 | openers |
| 12.1 | tin-opener |
| 12.2 | corkscrew |
| 12.3 | corkscrew on a stand |
| 12.4 | lever corkscrew |
| 12.5 | folding corkscrew |
| 12.6 | opener for waiter |
| 12.7 | openers |
| 13 | stands and holders |
| 13.1 | stands for hot |
| 13.2 | stand for kitchen utensils storing |
| 13.3 | toothpick holder |
| 13.4 | Bottle holder |
| 13.5 | Holder for capsules |
| 13.6 | stand for spoon |
| 13.7 | stand for coffee capsules |
| 13.8 | Coasters |
| 13.9 | Napkin holder |
| 13.10 | stand for eggs |
| 13.11 | stand for openers |
| 13.12 | stand for scoops |
| 13.13 | stand for cooking and serving of eggs |
| 13.14 | stand for ladle |
| 13.15 | Holder for paper towels |
| 13.16 | Transforming stand for kitchen appliances |
| 13.17 | stand for mug |
| 13.18 | stand mugs and saucers |
| 13.19 | stand for kitchen knives |
| 13.20 | stand for chicken |
| 13.21 | napkin-stand |
| 13.22 | heated stand |
| 13.23 | stands for cake |
| 14 | Appliances for peeling and cutting |
| 14.1 | grater for vegetables |
| 14.2 | grater |
| 14.3 | garlic masher |
| 14.4 | egg cutter |
| 14.5 | Manual vegetable cutter |
| 14.6 | Peeler for vegetables |
| 14.7 | Nutcracker |
| 14.8 | The device for separating the yolks from the whites |
| 14.9 | grasping for carrots cleaning |
| 14.10 | scraper fish scales |
| 14.11 | cutter for fruits |
| 14.12 | roller for holes |
| 14.13 | tongs for fish bones |

FIG. 166E

| | |
|---|---|
| 14.14 | spiral vegetable cutter |
| 15 | Bottle Caps |
| 15.1 | champagne cork (stopper) |
| 15.2 | stoppers for wine |
| 15.3 | The opener to remove the crown corks from bottles |
| 16 | sieves |
| 16.1 | sieve for tea |
| 16.2 | sieve-tongs for tea |
| 16.3 | Strainer for spices |
| 16.4 | Strainer for tea |
| 16.5 | Universal sieve |
| 16.6 | flour sieve |
| 16.7 | sieve to form the "Bird's Nest" |
| 16.8 | The Chinese sieve with a mesh insert |
| 16.9 | sieve with support |
| 16.10 | Mug-sieve for flour |
| 16.11 | sieve on the handle |
| 17 | Salt and pepper shakers |
| 17.1 | container for seasoning |
| 17.2 | salt cellar |
| 17.3 | containers for oil and vinegar |
| 18 | Dish dryers |
| 18.1 | salad dryer |
| | dryer-placemat |
| | dryer for crockery and cutlery |
| 19 | Cutlery Accessories |
| 19.1 | cutlery tray |
| 19.2 | cutlery holder |
| 19.3 | cutlery container |
| 19.4 | strainer for cutlery |
| 19.5 | wall hanger for kitchen tools |
| 19.6 | cutlery organizer |
| 19.7 | mat for cutlery |
| 19.8 | sliding tray for cutlery |
| 19.9 | dryer for cutlery |
| 19.10 | glass for cutlery |
| 19.11 | napkin for the cutlery |
| 19.12 | case for cutlery |
| 19.13 | tray for cutlery |
| 19.14 | mitten-potholder |
| 19.15 | box for cutlery |
| 19.16 | full-size rack (cassette) for cutlery |
| 19.17 | Stand without containers for cutlery |
| 19.18 | cassette for cutlery |
| 19.19 | container for cutlery |
| 19.20 | station for cutlery |
| 19.21 | Shelf for cutlery |
| 20 | Decorations for cocktails |
| 21.1 | Ducts |

FIG. 166F

| | |
|---|---|
| 22.2. | Sticks |
| 23 | Molds |
| 23.1 | molds for ice |
| 23.2 | molds for children |
| 23.3 | Molds for shaping products |
| 23.4 | Molds for dumplings |
| 24 | Measuring container |
| 24.1 | Measuring containers |
| 24.2 | A mixing container with the dispenser |
| 24.3 | Measuring container with the funnel |
| 24.4 | Beaker |
| 24.5 | Scoop |
| 26 | kitchen scissors |
| 26.1 | Scissors for BBQ |
| 26.2 | Kitchen scissors with bottle opener |
| 26.3 | Scissors for greens |
| 26.4 | Kitchen multipurpose scissors |
| 26.5 | Kitchen scissors for poultry |
| 27 | utensil for storages |
| 27.1 | container for storage |
| 27.2 | Bottles for liquid spices, oils |
| 27.3 | jars for storage |
| 27.4 | lunchbox |
| 27.5 | foldable lunchbox |
| 27.6 | jar for hermetic storage of bulk products |
| 27.7 | Sprayer for oil / vinegar |
| 27.8 | jar for bulk products |
| 27.9 | containers for spices |
| 27.10 | container for seasoning |
| 27.11 | Container for tea |
| 28 | potholders |
| 28.1 | oven-glove |
| 28.2 | silicone potholders |
| 28.3 | dishcloth |
| | railing with hooks |
| 29 | silicone mats |
| 29.1 | baking mat |
| 29.2 | mat for baking cakes |
| 29.3 | mat for drying of the glasses |
| 29.4 | cooking mat |
| 29.5 | Mat for drying of the dishes |
| 30 | graters, presses, rubbing machines |
| 30.1 | grater with a handle |
| 30.2 | grater |
| 30.3 | multifunction grater |
| 30.4 | grater shredder |
| 30.5 | grind for the green |

FIG. 166G

| | |
|---|---|
| 30.6 | grind for the garlic |
| 30.7 | Slicer for tomatoes |
| 30.8 | grater with rotating drums |
| 30.9 | universal device for grinding |
| 30.10 | mechanical grater |
| 30.11 | garlic peeling tube |
| 30.12 | rubbing machine |
| 30.13 | press for vegetables |
| 30.14 | press for garlic |
| 30.2 | press for hamburgers |
| 31 | knife sharpeners |
| 31.1 | electric sharpener |
| 31.2 | sharpening stone |
| 31.3 | ceramic sharpener |
| 32 | breadbox |
| 33 | lattice with legs |
| | Kitchen dishes |
| 1 | for alcohol |
| 1.2 | Brandy set with dispenser |
| 1.3 | souvenir cups |
| 1.4 | stemware |
| 1.5 | pail of ice |
| 1.6 | stemware |
| 1.7 | champagne bucket |
| 1.8 | stemware |
| 1.9 | carafe |
| 1.10 | server |
| 1.11 | bottle holder |
| 2 | tableware |
| 2.1 | first course dish |
| 2.2 | dish for bouillon |
| 2.3 | bouillon bowl |
| 2.4 | oiler |
| 2.5 | round dish |
| 2.6 | duck pan |
| 2.7 | Set for making chocolate fondue |
| 2.8 | Set for making cheese fondue |
| 2.9 | salad bowl |
| 2.10 | dish for cake |
| 2.11 | compartmental dish |
| 2.12 | set of cutlery |
| 2.13 | serving spoon and fork |
| 2.14 | dish with lid |
| 2.15 | steam table |
| 2.16 | ice-cream bowl |
| 2.17 | Flatware |

FIG. 166H

| | |
|---|---|
| 2.18 | saucer |
| 2.19 | saucer for jam |
| 2.20 | mustard-pot |
| 2.21 | pepper-pot |
| 2.22 | ash-pot |
| 2.23 | deep table plate |
| 2.24 | dinner plate |
| 2.25 | snack plate |
| 2.26 | deep dessert plate |
| 2.27 | dessert plate |
| 2.28 | plate for pies |
| 2.29 | horseradish-pot |
| 3 | Utensils for table |
| 3.1 | Pad for tableware |
| 3.2 | serving mat |
| 3.3. | serving tray |
| 3.4 | glass burner |
| 4 | Dishes for tea, coffee, dessert |
| 4.1 | sugar-bowl |
| 4.2 | mug |
| 4.3 | mug with teapot |
| 4.4 | mug with stand |
| 4.5 | mug with lid |
| 4.6 | tea set |
| 4.7 | dish |
| 4.8 | french-press |
| 4.9 | teapot |
| 4.10 | teapot with strainer |
| 4.11 | glass teapot |
| 4.12 | ice-cream bowl |
| 4.13 | multifunctional vase |
| 4.14 | glasses |
| 4.15 | soup bowl |
| 4.16 | wicker basket |
| 4.17 | vase 3-tier |
| 4.18 | tea set |
| 4.19 | napkin rings |
| 4.20 | pannier for fruits |
| 4.21 | table trash basket |
| 4.22 | biscuit dish |
| 4.23 | candy dish |
| 4.24 | coffee sets |
| 5 | CUTLERY |
| 5.1 | Table fork |
| 5.2 | fork for sprat |
| 5.3 | fork for crayfish |
| 5.4 | fork for oysters |
| 5.6 | fork for lemons |
| 5.7 | big spoon |

FIG. 166I

| | |
|---|---|
| 5.12 | ladle-spoon |
| 5.13 | spoon for hot snacks |
| 5.14 | ice cream spoon |
| 5.15 | mustard spoon |
| 5.16 | salt spoon |
| 5.17 | spatula for cakes |
| 5.18 | spatula for caviar |
| 5.19 | spatula for fish |
| 5.20 | table knife |
| 5.21 | knife and fork for the fish |
| 5.22 | knife and fork snack |
| 5.23 | knife and fork dessert |
| 5.24 | Butterknife |
| 5.25 | tool kits for lobster, crayfish |
| 5.26 | devices for spices |
| 5.27 | grille and asparagus tongs |
| 5.28 | salad unit (salad fork and spoon) |
| 5.29 | sugar-tongs |
| 5.30 | tongs for cakes and sugar |
| 5.31 | ice tongs |
| 5.32 | can-opener |
| 5.33 | fork oyster |
| 5.34 | plug for crayfish |
| 5.36 | cocotte fork |
| 5.37 | fork for canned fish in oil (sprat, sardines) |
| 5.38 | spinner for champagne |
| 5.39 | spoon to mix whiskey with soda water |
| | **Kitchen appliances** |
| 1 | aerogrill |
| 2 | blenders, grinder |
| 3 | coffee Maker |
| 4 | coffee grinder (coffee mill) |
| 5 | Food Processor |
| 6 | mixer |
| 7 | mini oven |
| 8 | multicooker |
| 9 | meat grinders |
| 10 | steamers |
| 11 | Raclette grill |
| 12 | Juicers |
| 13 | toasters |
| 14 | egg cooker |
| 15 | electric range |
| 15.1 | electric induction stove |
| 16 | electric kettle |
| 16.1 | thermopots |
| 17 | bread makers |
| 18 | microwaves |

FIG. 166J

| | Children's dishes |
|---|---|
| 1 | Children Sets for baking |
| 2 | Children cutlery |
| 3 | Children thermoses |
| 4 | Children Sets of dishes |
| | **List of ingredient data** |
| 1 | Ingredient name |
| 2 | Ingredient Photo |
| 3 | Manufacturer |
| 4 | Country |
| 5 | Type of Ingredient |
| 6 | Type of cuisine |
| 7 | Relation to Vegetarianism |
| 8 | Spice |
| 9 | Energy value |
| 10 | Description of the Ingredient |
| 11 | Status |
| 12 | Price |
| | **List of equipment data** |
| 1 | Equipment name |
| 2 | Equipment photo |
| 3 | Manufacturer |
| 4 | Brand name |
| 5 | Dimensions |
| 6 | Weight |
| 7 | Connectivity |
| 8 | Type of cuisine |
| 9 | Type of equipment |
| 10 | Description of equipment |
| 11 | Year |
| 12 | Status |
| 13 | Price |
| | **List of recipe data** |
| 1 | Name of the recipe |
| 2 | Recipe author |
| 3 | Recipe Photo |
| 4 | Preparation time |
| 5 | Basis of the dish |
| 6 | Type of cuisine |
| 7 | Type of the dish |
| 8 | Relation to Vegetarianism |
| 9 | Spice |
| 10 | Energy value |
| 11 | Number of persons |
| 12 | Description of the recipe |
| 13 | Description of the stages of cooking |
| 14 | Ingredients |
| 15 | Type of equipment |
| 16 | Video of recipe cooking |

FIG. 166K

| | |
|---|---|
| 18 | Expert Rating |
| 19 | Amount of sales |
| 21 | Automatic cooking |
| 22 | Price |

FIG. 166L

Table B: Types of Ingredients

| 1 | MEAT and MEAT PRODUCTS |
|---|---|
| 1 | Basturma |
| 2 | Fat |
| 3 | brisket cooked and smoked |
| 4 | Hare |
| 5 | leather duck |
| 6 | Sausage |
| 7 | Sausages |
| 8 | Sausages "Hunting party" |
| 9 | Horsemeat |
| 10 | Bones with bone marrow |
| 11 | Roe |
| 12 | Rabbit |
| 13 | Meat |
| 14 | Moosemeat |
| 15 | Venison |
| 16 | Liver |
| 17 | Kidney |
| 18 | Smoked ribs |
| 19 | Salami |
| 20 | Sausages |
| 21 | Cervelat |
| 22 | Sausages |
| 23 | Hungarian smoked bacon |
| 24 | bacon fat-tailed |
| 25 | Steak |
| 26 | ribeye steak |
| 27 | Farce |
| 28 | crocodile fillet |
| 29 | Jamon |
| 30 | Choriso (spanish sausage) |
| 31 | Skewers |
| 32 | Sowbelly |
| 33 | Deer tongue |
| 34 | Frog legs |
| | LAMB, VEAL |
| 1 | breast of lamb |
| 2 | loin of lamb |
| 3 | blade lamb |

FIG. 167A

| | |
|---|---|
| 4 | veal brains |
| 5 | mutton ham |
| 6 | veal ham |
| 7 | leg of lamb |
| 8 | Heel muscle mutton |
| 9 | lamb offal |
| 10 | veal kidneys |
| 11 | lamb chops |
| 12 | gras cow |
| 13 | veal heart |
| 14 | lamb testicles |
| 15 | veal fillet |
| 16 | veal cheeks |
| 17 | minced lamb |
| 18 | minced veal |
| 19 | veal tail |
| 20 | veal tongue |
| 21 | eggs bullish |
| | BEEF |
| 1 | beef brisket |
| 2 | beef fillet |
| 3 | beef (sirloin) |
| 4 | beef on the bone |
| 5 | beef eye muscle |
| 6 | legs of beef |
| 7 | ham beef |
| 8 | gras beef |
| 9 | beef ribs |
| 10 | beef heart |
| 11 | minced beef |
| 12 | tail beef |
| 13 | beef tongue |
| | PORK |
| 1 | bacon |
| 2 | smoked bacon |
| 3 | Pork |
| 4 | Ham |
| 5 | pork brisket |
| 6 | smoked pork belly |
| 7 | Pork Intestine |
| 8 | legs of pork |
| 9 | boar ham |
| 10 | pork ham |
| 11 | pork ribs |
| 12 | knuckle of pork |
| 13 | Fat |
| 14 | pork (pork neck or loin) |
| 15 | pork ears |
| 16 | minced pork |

FIG. 167B

| | |
|---|---|
| 17 | pig tail |
| 18 | pork tongue |
| 2 | BIRDS |
| 1 | garshnep |
| 2 | turkey breast |
| 3 | chicken breast |
| 4 | chicken breast, smoked |
| 5 | duck breast |
| 6 | Goose |
| 7 | chicken ventricles |
| 8 | turkey |
| 9 | turkey wings |
| 10 | chicken wings |
| 11 | chicken |
| 12 | smoked chicken |
| 13 | grouse |
| 14 | Coot |
| 15 | duck leg |
| 16 | crow's feet |
| 17 | chicken legs |
| 18 | chicken ham |
| 19 | Quail |
| 20 | gras chicken |
| 21 | chicken giblets |
| 22 | grouse |
| 23 | chicken hearts |
| 24 | Duck |
| 25 | smoked duck |
| 26 | Pheasant |
| 27 | minced chicken |
| 28 | chicken fillet |
| 29 | foie gras |
| 30 | chicken |
| 31 | chicken gutted |
| 32 | neck duck |
| 3 | FISH and SEAFOOD |
| 1 | anchovies |
| 2 | arctic char |
| 3 | mullet |
| 4 | Black Sea goby |
| 5 | shrimp head |
| 6 | Butterfish |
| 7 | scallops |
| 8 | dorado |
| 9 | Ruff |
| 10 | caviar |

FIG. 167C

| | |
|---|---|
| 11 | red caviar |
| 12 | Tobiko caviar |
| 13 | Squid |
| 14 | flounder |
| 15 | cuttlefish |
| 16 | Carp |
| 17 | Sprat |
| 18 | Smelt |
| 19 | crab sticks |
| 20 | Shrimps |
| 21 | King shrimps |
| 22 | Salad shrimps |
| 23 | Tiger prawn |
| 24 | Bream |
| 25 | salmon |
| 26 | Smoked salmon |
| 27 | Mussels |
| 28 | Mussels with shells |
| 29 | Pollock |
| 30 | Molluscs |
| 31 | Sea food |
| 32 | Sea fish |
| 33 | sole (fish) |
| 34 | Crab meat |
| 35 | Krill meat |
| 36 | Burbot |
| 37 | Perch |
| 38 | Lobster |
| 39 | Cisco |
| 40 | sturgeon |
| 41 | octopus |
| 42 | baby octopus |
| 43 | shrimp broth |
| 44 | halibut |
| 45 | Pangasius |
| 46 | cod liver oil |
| 47 | Haddock |
| 48 | Crayfish |
| 49 | dried crustaceans |
| 50 | Hot smoked fish |
| 51 | red fish salted |
| 52 | Swordfish |
| 53 | Saury |
| 54 | Sardines |
| 55 | Herring |
| 56 | Salmon |
| 57 | smoked salmon |
| 58 | salted salmon |
| 59 | Seabass |

FIG. 167D

| | |
|---|---|
| 60 | Whitefish |
| 61 | Ramp |
| 62 | Mackerel |
| 63 | smoked mackerel |
| 64 | Sheatfish |
| 65 | Starlet |
| 66 | Walleye |
| 67 | Dried seaweed |
| 68 | Tilapia |
| 69 | Carp |
| 70 | Cod |
| 71 | Hot smoked cod |
| 72 | black cod |
| 73 | Tuna |
| 74 | Turbot |
| 75 | Eel |
| 76 | smoked eel |
| 77 | Snails |
| 78 | Oysters |
| 79 | white fish fillets |
| 80 | catfish fillets |
| 81 | fillet of carp |
| 82 | fish fillet |
| 83 | salmon fillet |
| 84 | salted herring fillets |
| 85 | perch fillet |
| 86 | Trout |
| 87 | smoked trout |
| 88 | Squid Ink |
| 89 | cervical shrimp |
| 90 | cervical cancers |
| 91 | Sprats |
| 92 | Pike |
| 4 | **VEGETABLES** |
| 2 | Artichokes |
| 3 | Eggplant |
| 4 | Yam |
| 5 | broccoli tops |
| 6 | beet tops |
| 7 | Broccoli |
| 8 | Rutabaga |
| 9 | Galangal |
| 10 | Peas |
| 11 | pea sprouts |
| 12 | pea pods |
| 13 | green peas |
| 14 | Daikon |

FIG. 167E

| | |
|---|---|
| 15 | Melon |
| 16 | Ginseng |
| 17 | Ginger |
| 18 | Zucchini |
| 19 | Feces |
| 20 | Cabbage |
| 21 | Brussels sprouts |
| 22 | Sauerkraut |
| 23 | Chinese cabbage |
| 24 | Cabbage |
| 25 | Romanesco cabbage |
| 26 | savoy cabbage |
| 27 | Cauliflower |
| 28 | Potatoes |
| 29 | young potatoes |
| 30 | Kohlrabi |
| 31 | root anise |
| 32 | salsify root |
| 33 | parsley root |
| 34 | celery root |
| 35 | fresh corn |
| 36 | white onion |
| 37 | pearl bow |
| 38 | onion |
| 39 | red onion |
| 40 | dry onion |
| 41 | small onion |
| 42 | Shallots |
| 43 | cassava |
| 44 | mini corn |
| 45 | mini peppers |
| 46 | mini-tomatoes |
| 47 | carrots |
| 48 | cucumber |
| 49 | parsnips |
| 50 | squash |
| 51 | bell peppers |
| 52 | cayenne pepper |
| 53 | fresh chili pepper |
| 54 | jalapeno peppers |
| 55 | tomato |
| 56 | pickled tomatoes |
| 57 | cherry tomatoes |
| 58 | sunflower sprouts |
| 59 | wheat germ |
| 60 | soybean seedlings |
| 61 | germinated soybeans |
| 62 | rhubarb |
| 63 | Radish |

FIG. 167F

| | |
|---|---|
| 64 | wild radish |
| 65 | Turnip |
| 66 | beansprouts |
| 67 | Beet |
| 68 | Asparagus |
| 69 | chopped tomatoes |
| 70 | Sweet |
| 71 | Pumpkin |
| 72 | green beans |
| 73 | Fennel |
| 74 | physalis |
| 75 | horseradish |
| 76 | zucchini |
| 77 | Garlic |
| 78 | endive |
| 5 | FRUITS |
| 1 | Apricot |
| 2 | Avocado |
| 3 | quince |
| 4 | fresh pineapple |
| 5 | Orange |
| 6 | banana |
| 7 | Hawthorn |
| 8 | cranberries |
| 9 | grapes |
| 10 | Cherry |
| 11 | Dried cherries |
| 12 | blueberries |
| 13 | Garnet |
| 14 | Grapefruit |
| 15 | Pear |
| 16 | Blackberry |
| 17 | strawberries |
| 18 | pomegranate seeds |
| 19 | carambola |
| 20 | Kiwi |
| 21 | Strawberry |
| 22 | Cranberry |
| 23 | coconut |
| 24 | gooseberry |
| 25 | kumquat |
| 26 | Lime |
| 27 | lemon |
| 28 | Litchi |
| 29 | raspberries |
| 30 | mango |

FIG. 167G

| | |
|---|---|
| 31 | Mandarin |
| 32 | Passionfruit |
| 33 | mini pineapple |
| 34 | Nectarine |
| 35 | buckthorn |
| 36 | papaya |
| 37 | Peach |
| 38 | Pomelo |
| 39 | Rowan |
| 40 | Drain |
| 41 | red currants |
| 42 | black currant |
| 43 | tamarind |
| 44 | Feijoa |
| 45 | fruit to taste |
| 46 | persimmon |
| 47 | cherries |
| 48 | Cherry |
| 49 | blueberries |
| 50 | Apple |
| 51 | frozen berries |
| 52 | juniper berries |
| 53 | fresh berries |
| 6 | GROCERY |
| 1 | Agar |
| 2 | Adjika |
| 3 | rice paper |
| 4 | vanilla extract |
| 5 | vermicelli rice |
| 6 | egg noodles |
| 7 | Algae |
| 8 | Glucose |
| 9 | Jam |
| 10 | raspberry jam |
| 11 | fresh yeast |
| 12 | Gelatin |
| 13 | liquid Smokehouse |
| 14 | Sweetener |
| 15 | corn muffins |
| 16 | Ketchup |
| 17 | citric acid |
| 18 | Candy |
| 19 | Confiture |
| 20 | strawberry jam |
| 21 | food dye |
| 22 | Starch |

FIG. 167H

| | |
|---|---|
| 23 | potato starch |
| 24 | corn starch |
| 25 | bread crumbs |
| 26 | Noodles |
| 27 | buckwheat noodles |
| 28 | Pad Thai noodles |
| 29 | rice noodles |
| 30 | glass noodles |
| 31 | noodles harusame |
| 32 | egg noodles |
| 33 | Mayonnaise |
| 34 | poppy sweet |
| 35 | Pasta |
| 36 | cannelloni pasta |
| 37 | pasta lumakoni |
| 38 | pasta feathers |
| 39 | fusilli pasta |
| 40 | pumpkin marmalade |
| 41 | jujube fruit |
| 42 | Marzipan |
| 43 | Mirin |
| 44 | coconut milk |
| 45 | almond milk |
| 46 | soy milk |
| 47 | Muesli |
| 48 | Pasta |
| 49 | peanut paste |
| 50 | red curry paste |
| 51 | tamarind paste |
| 52 | Tom Yam Paste |
| 53 | chili paste |
| 54 | Molasses |
| 55 | Pectin |
| 56 | Penne |
| 57 | Jam |
| 58 | elderberry syrup |
| 59 | vanilla syrup |
| 60 | syrup vishnevny |
| 61 | ginger syrup |
| 62 | caramel syrup |
| 63 | maple syrup |
| 64 | strawberry syrup |
| 65 | coffee syrup |
| 66 | corn syrup |
| 67 | raspberry syrup |
| 68 | mango syrup |
| 69 | honey syrup |
| 70 | almond syrup |
| 71 | walnut syrup |

FIG. 167I

| | |
|---|---|
| 72 | blackcurrant syrup |
| 73 | chocolate syrup |
| 74 | cranberry sauce |
| 75 | worcestershire sauce |
| 76 | pomegranate sauce |
| 77 | kimchi sauce |
| 78 | Pesto |
| 79 | fish sauce |
| 80 | fish sauce nampla |
| 81 | Tabasco sauce |
| 82 | teriyaki sauce |
| 83 | sauce tkemali |
| 84 | oyster sauce |
| 85 | sweet chili sauce |
| 86 | Japanese walnut sauce |
| 87 | spaghetti |
| 88 | crumbs of white bread |
| 89 | breadcrumbs |
| 90 | pastry decorations |
| 91 | candied |
| 7 | MILK PRODUCTS and EGGS |
| 1 | yogurt |
| 2 | natural yoghurt |
| 3 | Kefir |
| 4 | margarine |
| 5 | butter |
| 6 | melted butter |
| 7 | Milk |
| 8 | baked milk |
| 9 | buttermilk |
| 10 | curdled |
| 11 | cream |
| 12 | sour cream |
| 13 | Whey |
| 14 | Thane |
| 15 | Curd |
| 16 | curd beaded |
| 17 | quail eggs |
| 18 | Egg |
| 8 | MUSHROOMS |
| 2 | mushrooms |
| 3 | Ceps |
| 4 | Enoki mushrooms |
| 5 | Chinese dried mushrooms |
| 6 | portobello mushrooms |
| 7 | dried mushrooms |

FIG. 167J

| | |
|---|---|
| 8 | shiitake mushrooms |
| 9 | milkmushrooms |
| 10 | chanterelles |
| 11 | boletus |
| 12 | honey fungus |
| 13 | saffron milk cap |
| 14 | morels |
| 15 | truffles |
| 16 | meadow mushrooms |
| 9 | CHEESE |
| 1 | cheese |
| 2 | cheese Adyghe |
| 3 | brie cheese |
| 4 | feta cheese |
| 5 | Burrata cheese |
| 6 | Gouda cheese |
| 7 | Dutch cheese |
| 8 | blue cheese |
| 9 | Gorgonzola |
| 10 | grana padano cheese |
| 11 | Gruyere cheese |
| 12 | Dor Blue cheese |
| 13 | Camembert |
| 14 | goat cheese |
| 15 | cheese sausage |
| 16 | mascarpone cheese |
| 17 | Monterey Jack cheese |
| 18 | mozzarella cheese |
| 19 | soft cheese |
| 20 | goat cheese |
| 21 | parmesan cheese |
| 22 | pecorino cheese |
| 23 | processed cheese |
| 24 | cheese Poshehonsky |
| 25 | ricotta cheese |
| 26 | Roquefort cheese |
| 27 | blue cheese |
| 28 | cream cheese |
| 29 | suluguni |
| 30 | cheese curd |
| 31 | feta cheese |
| 32 | philadelphia cheese |
| 33 | cheddar cheese |
| 34 | edam cheese |
| 35 | Emmentaler cheese |

FIG. 167K

| 10 | NUTS and DRIED FRUITS |
|---|---|
| 1 | peanuts |
| 2 | barberry |
| 3 | walnuts (peeled) |
| 4 | raisins |
| 5 | Figs |
| 6 | Chestnut |
| 7 | Dried cranberries |
| 8 | coconut |
| 9 | dried apricots |
| 10 | Filbert (hazelnut) |
| 11 | almonds |
| 12 | Nuts |
| 13 | pine nuts |
| 14 | cashew nuts |
| 15 | Dried peaches |
| 16 | sunflower seeds |
| 17 | pumpkin seeds |
| 18 | Dried Fruits |
| 19 | Dates |
| 20 | Pistachios |
| 21 | Hazelnuts |
| 22 | Prunes |
| 11 | BEVERAGES |
| 1 | Water |
| 2 | water orange |
| 3 | mineral water |
| 4 | water pink |
| 5 | GABA-tea |
| 6 | Hibiscus |
| 7 | Kvass |
| 8 | bread kvass |
| 9 | Coke |
| 10 | Kuding |
| 11 | Lemonade |
| 12 | Mate |
| 13 | Juice |
| 14 | carbonated drink |
| 15 | Bitter Brandy |
| 16 | Rooibos |
| 17 | pineapple juice |
| 18 | orange juice |
| 19 | birch juice |
| 20 | grape juice |
| 21 | cherry juice |
| 22 | pomegranate juice |

FIG. 167L

| | |
|---|---|
| 23 | strawberry juice |
| 24 | cranberry juice |
| 25 | gooseberry juice |
| 26 | lime juice |
| 27 | mango juice |
| 28 | tangerine juice |
| 29 | peach juice |
| 30 | currant juice |
| 31 | tomato juice |
| 32 | apple juice |
| 33 | Sprite |
| 34 | Tonic |
| 35 | tea white |
| 36 | tea yellow |
| 37 | green tea |
| 38 | red tea |
| 39 | Puer tea |
| 40 | Puer tea in Mandarin |
| 41 | oolong tea |
| 42 | black tea |
| 43 | Espresso |
| **12** | **ALCOHOL** |
| 1 | Balm |
| 2 | Bitter |
| 3 | Brandy |
| 4 | Bourbon |
| 5 | Vermouth |
| 6 | Wine |
| 7 | white wine |
| 8 | sparkling wine |
| 9 | red wine |
| 10 | dry red wine |
| 11 | wine sangria |
| 12 | Whiskey |
| 13 | Vodka |
| 14 | anise vodka |
| 15 | Grappa |
| 16 | Gin |
| 17 | Irish cream liqueur |
| 18 | Calvados |
| 19 | Cachaca |
| 20 | Brandy |
| 21 | Liqueur |
| 22 | orange liqueur |
| 23 | coffee liqueur |
| 24 | chocolate liqueur |

FIG. 167M

| | |
|---|---|
| 25 | Madeira |
| 26 | Marsala |
| 27 | Martini |
| 28 | Beer |
| 29 | cherry beer |
| 30 | Port |
| 31 | Rum |
| 32 | white rum |
| 33 | black rum |
| 34 | Sake |
| 35 | sambuca |
| 36 | Cider |
| 37 | tequila |
| 38 | sherry |
| 39 | Champagne (Brut) |
| 40 | schnapps |
| 13 | GREENS AND HERBS |
| 1 | Basil |
| 2 | basil red |
| 3 | bouquet garni |
| 4 | oregano |
| 5 | greens |
| 6 | dried herbs |
| 7 | cabbage pak choi |
| 8 | chervil |
| 9 | cilantro |
| 10 | oxalis |
| 11 | oat root |
| 12 | fresh coriander |
| 13 | nettle |
| 14 | Watercress |
| 15 | watercress |
| 16 | rose petals |
| 17 | lemongrass |
| 18 | bamboo leaves |
| 19 | banana leaves |
| 20 | grape leaves |
| 21 | Grape leaves (salty) |
| 22 | kaffir lime leaves |
| 23 | lime leaves |
| 24 | dandelion leaves |
| 25 | green onion |
| 26 | Leek |
| 27 | marjoram |
| 28 | Chard |
| 29 | melissa |

FIG. 167N

| | |
|---|---|
| 30 | lemon balm |
| 31 | Mint |
| 32 | oregano |
| 33 | parsley |
| 34 | dried parsley |
| 35 | plantain |
| 36 | wormwood |
| 37 | chopped camomile |
| 38 | arugula |
| 39 | iceberg lettuce |
| 40 | green salad |
| 41 | corn salad |
| 42 | lettuce |
| 43 | leaf lettuce |
| 44 | salad Mizuno |
| 45 | Oakleaf lettuce |
| 46 | radicchio salad |
| 47 | romaine lettuce |
| 48 | salad Friess |
| 49 | salad mix |
| 50 | celery |
| 51 | Lemon grass (lemon grass) |
| 52 | Italian herbs |
| 53 | spicy herbs |
| 54 | Dill |
| 55 | dandelion flowers |
| 56 | flowers |
| 57 | lavender flowers |
| 58 | chicory |
| 59 | thyme |
| 60 | Ramson |
| 61 | saffron |
| 62 | rosehips |
| 63 | chives |
| 64 | spinach |
| 65 | sorrel |
| 66 | tarragon |
| 14 | Cereals, legumes and flours |
| 1 | beans |
| 2 | mung beans |
| 3 | bulgur |
| 4 | puffed rice |
| 5 | buckwheat green |
| 6 | Quinoa |
| 7 | buckwheat |
| 8 | corn grits |

FIG. 167O

| | |
|---|---|
| **9** | semolina |
| **10** | Oats |
| **11** | pearl barley |
| **12** | cereal wheat |
| **13** | couscous |
| **14** | Flour |
| **15** | buckwheat flour |
| **16** | chestnut flour |
| **17** | corn flour |
| **18** | almond flour |
| **19** | Chickpea flour |
| **20** | oat flour |
| **21** | wheat flour |
| **22** | rye flour |
| **23** | rice flour |
| **24** | Chickpeas |
| **25** | Bran |
| **26** | Millet |
| **27** | Figure |
| **28** | Figure baya |
| **29** | basmati rice |
| **30** | brown rice |
| **31** | wild rice |
| **32** | Round grain rice |
| **33** | semola (flour made from durum wheat) |
| **34** | Beans |
| **35** | white beans |
| **36** | red beans |
| **37** | buckwheat flakes |
| **38** | cereal grains |
| **39** | oat flakes |
| **40** | Lentils |
| **41** | Barley |
| **15** | **Spices and Seasonings** |
| **1** | star anise |
| **2** | white pepper |
| **3** | Vanillin |
| **4** | Vanilla |
| **5** | vanilla essence |
| **6** | vanilla powder |
| **7** | Wasabi |
| **8** | Caltrop |
| **9** | garam masala |
| **10** | Carnation |
| **11** | cloves minced |
| **12** | Mustard |

FIG. 167P

| | |
|---|---|
| 13 | sweet mustard |
| 14 | allspice peas |
| 15 | grain mustard |
| 16 | Cumin |
| 17 | ground ginger |
| 18 | Capers |
| 19 | Cardamom |
| 20 | Curry |
| 21 | Coriander |
| 22 | ground coriander |
| 23 | Cinnamon |
| 24 | coffee essence |
| 25 | balsamic cream |
| 26 | Sesame |
| 27 | Turmeric |
| 28 | bay leaf |
| 29 | lemon pepper |
| 30 | poppy seed |
| 31 | Olives |
| 32 | olives dry |
| 33 | avocado oil |
| 34 | anchovy butter |
| 35 | peanut oil |
| 36 | mustard oil |
| 37 | oil for frying |
| 38 | scented oil |
| 39 | grapeseed oil |
| 40 | canola oil |
| 41 | corn oil |
| 42 | sesame oil |
| 43 | linseed oil |
| 44 | olive oil |
| 45 | Peanut butter |
| 46 | sunflower oil |
| 47 | lean oil |
| 48 | vegetable oil |
| 49 | oil, refined |
| 50 | oil seed-bearing |
| 51 | soybean oil |
| 52 | truffle oil |
| 53 | oil pumpkin |
| 54 | almonds hammers |
| 55 | miso paste |
| 56 | sea salt |
| 57 | Nutmeg |
| 58 | Olives |
| 59 | Ligurian olives |
| 60 | hot red pepper |
| 61 | hot peppers |

FIG. 167Q

| | |
|---|---|
| 62 | Fenugreek |
| 63 | Paprika |
| 64 | lemongrass paste |
| 65 | peperoncini |
| 66 | pepper pink polka dots |
| 67 | Chili |
| 68 | Dried chili peppers |
| 69 | mustard powder |
| 70 | seasoning fish |
| 71 | baking powder |
| 72 | rosemary |
| 73 | pink ground pepper |
| 74 | Sugar |
| 75 | vanilla sugar |
| 76 | brown sugar |
| 77 | sugar muskovado |
| 78 | sugar cane |
| 79 | powdered sugar |
| 80 | nasturtium seeds |
| 81 | Nigella seeds |
| 82 | fennel seeds |
| 83 | spice mix "taco" |
| 84 | Soda |
| 85 | ginger juice squeezed |
| 86 | lemon juice |
| 87 | Salt |
| 88 | citrate |
| 89 | grape sauce |
| 90 | sauce narsharab |
| 91 | ponzu sauce |
| 92 | soy sauce |
| 93 | tomato sauce |
| 94 | chili sauce |
| 95 | Spices |
| 96 | sumac |
| 97 | thyme |
| 98 | cumin |
| 99 | Mediterranean herbs |
| 100 | French herbs |
| 101 | vinegar |
| 102 | balsamic vinegar |
| 103 | wine vinegar |
| 104 | white wine vinegar |
| 105 | red wine vinegar |
| 106 | cherry vinegar |
| 107 | raspberry vinegar |
| 108 | rice vinegar |
| 109 | apple cider vinegar |
| 110 | hops suneli |

FIG. 167R

| | |
|---|---|
| 111 | Savory |
| 112 | chutney |
| 113 | black pepper |
| 114 | black pepper peas |
| 115 | dry garlic |
| 116 | Sage |
| 16 | PREPARED PRODUCTS |
| 1 | canned pineapple |
| 2 | canned artichokes |
| 3 | Marinated artichokes |
| 4 | baguette |
| 5 | Loaf |
| 6 | Bars of chocolate |
| 7 | meringue |
| 8 | biscuit |
| 9 | beans, canned |
| 10 | Bun |
| 11 | buns for hamburgers |
| 12 | Broth |
| 13 | beef broth |
| 14 | chicken broth |
| 15 | fish broth |
| 16 | Jam |
| 17 | Apricot jam |
| 18 | lingonberry jam |
| 19 | cherry jam |
| 20 | black currant jam |
| 21 | raspberry jam |
| 22 | blueberry jam |
| 23 | Wafer |
| 24 | canned cherry |
| 25 | Glaze |
| 26 | Dijon mustard |
| 27 | croutons |
| 28 | marinated mushrooms |
| 29 | Demiglas apple |
| 30 | Yeast |
| 31 | Jelly |
| 32 | leaven |
| 33 | marshmallows |
| 34 | crushed tomatoes in juice |
| 35 | pickled ginger |
| 36 | Cocoa |
| 37 | marinated cactus |
| 38 | Pickled capers |
| 39 | sour cabbage |

FIG. 167S

| | |
|---|---|
| 40 | sea kale |
| 41 | Kimchi |
| 42 | wafer cakes |
| 43 | gherkins |
| 44 | natural coffee |
| 45 | instant coffee |
| 46 | Crackers |
| 47 | Chocolate Crumb |
| 48 | Croissant |
| 49 | bouillon cubes |
| 50 | canned corn |
| 51 | marinated corn |
| 52 | Pita |
| 53 | Lanspik |
| 54 | Ice |
| 55 | Letcho |
| 56 | lasagna sheets |
| 57 | canned salmon |
| 58 | pickled onions |
| 59 | canned mandarins |
| 60 | marshmallow |
| 61 | hazelnut oil |
| 62 | sweet curd |
| 63 | Yoghurt |
| 64 | Honey |
| 65 | honey in the comb |
| 66 | Mix ginger |
| 67 | condensed milk |
| 68 | condensed milk boiled |
| 69 | milk powder |
| 70 | pickled carrots |
| 71 | ice cream |
| 72 | vanilla ice cream |
| 73 | chocolate ice cream |
| 74 | salted cucumber |
| 75 | pickled cucumbers |
| 76 | pickled cucumbers |
| 77 | Pecans |
| 78 | beet broth |
| 79 | corn sticks |
| 80 | bread sticks |
| 81 | tomato paste |
| 82 | Pasta Chocolate |
| 83 | Pate |
| 84 | frozen dumplings |
| 85 | hot pepper pickled |
| 86 | canned peaches |
| 87 | Cookies |
| 88 | Biscuit |

FIG. 167T

| | |
|---|---|
| 89 | Cookies Savoiardi |
| 90 | chocolate cookies |
| 91 | Pita |
| 92 | Supplements |
| 93 | tomatoes in juice |
| 94 | canned tomatoes |
| 95 | Popcorn |
| 96 | Prosciutto |
| 97 | Gingerbread |
| 98 | mango puree |
| 99 | mashed potatoes |
| 100 | tomato puree |
| 101 | apple puree |
| 102 | pickle cucumber |
| 103 | Roll |
| 104 | Pickled beets |
| 105 | pork jerky |
| 106 | sugar syrup |
| 107 | whipped cream |
| 108 | cream of coconut |
| 109 | Malt |
| 110 | Sorbet |
| 111 | barbecue sauce |
| 112 | sauce bearnez |
| 113 | Béchamel |
| 114 | Worcestershire sauce |
| 115 | sauce Demiglas |
| 116 | sauce for soups "Bright udon" |
| 117 | sweet and sour sauce |
| 118 | Salsa |
| 119 | sweet sauce |
| 120 | chocolate sauce |
| 121 | berry sauce |
| 122 | asparagus, soya |
| 123 | caramel chips |
| 124 | crushed crackers |
| 125 | Tartlets |
| 126 | Tahini |
| 127 | pasta for lasagna |
| 128 | dough for ravioli |
| 129 | pizza dough |
| 130 | yeast dough |
| 131 | dough kataifi |
| 132 | shortbread dough |
| 133 | pastry dough |
| 134 | puff pastry |
| 135 | dough dry |
| 136 | filo pastry |
| 137 | dried tomatoes |

FIG. 167U

| | |
|---|---|
| **138** | Tortilla |
| **139** | Toast |
| **140** | Tofu |
| **141** | tuna fish oil |
| **142** | tuna canned in its own juice |
| **143** | Tahini |
| **144** | Rice Stuffing |
| **145** | Canned beans |
| **146** | white bread |
| **147** | toast bread |
| **148** | rye bread |
| **149** | sweet bread |
| **150** | black bread |
| **151** | rye bread |
| **152** | corn flakes |
| **153** | ciabatta |
| **154** | tea Away |
| **155** | potato chips |
| **156** | corn chips |
| **157** | Marinated mushrooms |
| **158** | chocolate corn balls |
| **159** | Chocolate |
| **160** | white chocolate |
| **161** | bitter chocolate |
| **162** | milk chocolate |
| **163** | dark chocolate |

FIG. 167V

Table C: Lists of Food Preparation Methods and Equipment, Cuisine and Bases

A list of food preparation methods

1;"0";"The fried"

2;"0"; The boiled"

3;"0"; The stewed"

4;"0";"The baked"

5;"0"; “The cut”

FIG. 168A

A list of Equipment

1;"0";" KITCHEN ACCESSORIES"

2;"1";"funnels"

3;"2";"stainless steel funnel"

4;"2";"plastic funnel"

5;"2";"silicone funnel"

6;"2";"convertible funnel"

7;"1";"colanders"

8;"7";"quadratic colanders"

9;"7";"oval ladle-vases"

10;"7";"colanders with folding handles"

11;"7";"flat colander"

12;"7";"plastic colanders"

13;"7";"small round colanders"

14;"7";"suspended colanders"

15;"7";"cover-colander"

16;"7";"stainless steel and aluminum colanders"

17;"7";"cone colanders"

18;"1";"Kitchen Appliances"

19;"18";"whisk"

20;"18";"sco
op spatula"

21;"20";"cook spatula"

22;"20";"spatula with slots"

FIG. 168B

23;"20";"confectionery spatula"

24;"18";"spoons"

25;"24"serving spoon"

26;"24";"spoon-tongs"

27;"24";"spoon with slots"

28;"24";"spoon for rice"

29;"24";"ladle spoon"

30;"24";"ice cream spoon"

31;"24";"honey spoon"

32;"24";"spaghetti spoon"

33;"24";"serving spoon"

34;"18";"confectionery syringe for cookies and cream"

35;"18";"soup ladle"

36;"18";"potato masher"

37;"18";"skimmer"

38;"18";"Meat fork"

39;"18";"brush"

40;"18";"coffee filter"

41;"18";"whisk"

42;"18";"silicone brush"

43;"18";"silicone juicer"

FIG. 168C

44;"18";"earthen saucer"

45;"18";"tea filter"

46;"18";"pump dispenser for oil and vinegar"

47;"18";"clip for silicone spoon for the edge of the pan"

48;"18";"transformed spoons for salad"

49;"18";"device for cherry seeds removing"

50;"18";"sink mat"

51;"18";"ties for rolls"

52;"18";"dough mini-scraper"

53;"18";"grill tongs"

54;"18";"spaghetti tongs"

55;"18";"ice tongs"

56;"18";"sugar tongs"

57;"18";"package clip"

58;"18";"package clip"

59;"18";"citrus spray"

60;"18";"Dough press"

61;"18";"scoop for bulk"

62;"18";"salad serving tongs (tweezers)"

63;"18";"accessories for tubes"

64;"18";"pestle"

65;"18";"mortar"

FIG. 168D

66;"18";"roller for cutting of the rings"

67;"18";"opener for caps"

68;"18";"meat tenderizer; meat softener"

69;"18";"egg yolk separator"

70;"18";"apron"

71;"18";"tools for decoration"

72;"18";"jar for oil and vinegar"

73;"18";"mug for milk boiling"

74;"18";"napkins"

75;"18";"tablecloth"

76;"18";"marker for glasses"

78;"18";"basket"

79;"18";"meat tenderizer"

80;"18";"cocotte"

81;"18";"brush for washing of the vegetables"

82;"18";"lids for cups"

83;"18";"rope for baking"

84;"18";"jar for herbs storage"

FIG. 168E

86;"18";"scraper for glass ceramic plates"

87;"18";"Teapot for tea"

88;"18";"clothespin for notes on the fridge"

89;"18";"railing systems"

90;"18";"hanger for kitchen tools"

91;"18";plunger with not adhering surface"

92;"18";"silicone plunger"

93;"18";"rolling pin with adjustable thickness"

94;"18";"vacuum bags with pump"

95;"18";"gas lighter"

96;"18";"bone forceps"

97;"1";"kitchen timers thermometers"

98;"97";"timer for meat roasting"

99;"97";"digital thermometer"

100;"97";"holder for thermometer"

101;"97";"meat thermometer"

102;"97";"digital timer"

103;"97";"electr. digital timer"

104;"97";"aramel thermometer"

105;"1";"Mills for spices"

106;"105";"mill for black pepper"

107;"105";"electric mill"
108;"105";"combined mill for pepper and salt (2 in 1)"
109;"105";"mill for spices"

FIG. 168F

110;"105";"mill for greens"

111;"1";"Measuring utensils"

112;"111";"Measuring container (plastic bottle)"

113;"111";"measuring jar"

114;"111";"measuring jug"

115;"111";"measuring bowl"

116;"111";"mechanical dispenser for ice cream"

117;"1";"mechanical mixers"

118;"1";"bowl"

119;"118";"metal bowl"

120;"118";"stainless steel bowl"

121;"118";"plastic bowl"

122;"118";"plastic bowl"

123;"118";"bowls for food"

124;"1";"sets"

125;"124";"wine set"

126;"124";"sets for spices"

127;"124";"cupcakes baking set"

128;"124";"accessory kit for baking"

129;"124";"set of bar tools"

130;"124";"set of kitchen tools"

131;"124";"Set for eggs and pancakes baking"
132;"1";"Slicing and cutting of products"

FIG. 168G

133;"132“;”cutter"

134;"132“;”holder for onions cutting"

135;"132“;”cutting boards"

136;"132“;”universal professional knives"

137;"132“;”kitchen shears"

138;"132“;”hatchet"

139;"132“;”meat hatchet"

140;"132“;”Hammer for meat with hatchet"

141;"132“;”hoe"

142;"132“;”Hammer for meat"

143;"132“;”knives"

144;"143“;”knife for greens"

145;"143“;”knife for oranges"

146;"143“;”knife for kiwi"

147;"143“;”knife for pineapple"

148;"143“;”Spiral knife for carrots"

149;"143“;”multifunctional knife"

150;"143“;”vegetable knife"

151;"143“;”Pizza Cutter"

152;"143“;”universal knife"

153;"143“;”knife for slicing"

154;"143“;”cook knife"

FIG. 168H

154;"143“;”cook knife"

155;"143“;”gastronomic knife"

156;"143“;”opener"

157;"143“;”Cheese knife"

158;"143“;”boning knife"

159;"143“;”lettuce knife"

160;"143“;”knife for steaks"

161;"143“;”butcher knife"

162;"143“;”shredding knife"

163;"143“;”bread knife"

164;"143“;”fish knife"

165;"143“;”knife for sandwiches"

166;"143“;”Santoku knife"

167;"143“;”knife for fruit coring"

168;"143“;”Butter knife"

169;"169“;”openers"

170;"169“;”tin-opener"

171;"169“;”corkscrew"

172;"169“;”corkscrew on a stand"

173;"169“;”lever corkscrew"

174;"169“;”folding corkscrew"

175;"169“;”opener for waiter"

178;"494“;”stands for hot"

FIG. 168I

179;"494";"stand for kitchen utensils storing"
180;"494";"toothpick holder"
181;"494";"Bottle holder"

182;"494";"Holder for capsules"

183;"494";"stand for spoon"

184;"494";"stand for coffee capsules"

185;"494";"Coasters"

186;"494";"Napkin holder"

187;"494";"stand for eggs"

188;"494";"stand for openers"

189;"494";"stand for scoops"

190;"494";"stand for cooking and serving of eggs"

191;"494";"stand for ladle"

192;"494";"Holder for paper towels"

193;"494";"Transforming stand for kitchen appliances"

194;"494";"stand for mug"

195;"494";"stand mugs and saucers"

196;"494";"stand for kitchen knives"

197;"494";"stand for chicken"

198;"494";"napkin-stand"

199;"494";"heated stand"

200;"494";"stands for cake"
201;"1";"Appliances for peeling and cutting"

FIG. 168J

202;"201";"grater for vegetables"

203;"305";"grater"

204;"201";"garlic masher"

205;"201";"egg cutter"

206;"201";"Manual vegetable cutter"

207;"201";"Peeler for vegetables"

208;"201";"Nutcracker"

209;"201";"The device for separating the yolks from the whites"

210;"201";"grasping for carrots cleaning"

211;"201";"scraper fish scales"

212;"201";"cutter for fruits"

213;"201";"oller for holes"

214;"201";"tongs for fish bones"

215;"201";"spiral vegetable cutter"

216;"1";"Bottle Caps"

217;"216";"champagne cork (stopper)"

218;"216";"stoppers for wine"

219;"216";"The opener to remove the crown corks from bottles"

220;"1";"sieves"

221;"220";"sieve for tea"

222;"220";"sieve-tongs for tea"

223;"220";"Strainer for spices"
224;"220";"Strainer for tea"

FIG. 168K

225;"220";"Universal sieve"

226;"220";"flour sieve"

228;"220";"The Chinese sieve with a mesh insert"

229;"220";"sieve with support"

230;"220";"Mug-sieve for flour"

231;"220";"sieve on the handle"

232;"1";"Salt and pepper shakers"

233;"282";"container for seasoning"

234;"232";"salt cellar"

235;"232";"containers for oil and vinegar"

236;"1";"Dish dryers"

237;"236";"salad dryer"

238;"236";"dryer-placemat"

239;"236";"dryer for crockery and cutlery"

240;"1";"Cutlery Accessories"

241;"240";"cutlery tray"

242;"240";"cutlery holder"

243;"240";"cutlery container"

244;"240";"strainer for cutlery"

245;"240";"wall hanger for kitchen tools"

246;"240";"cutlery organizer"

247;"240";"mat for cutlery"
248;"240";"sliding tray for cutlery"

FIG. 168L

249;"240";"dryer for cutlery"

250;"240";"glass for cutlery"

251;"240";"napkin for the cutlery"

252;"240";"case for cutlery"

253;"240";"tray for cutlery"

254;"240";"mitten-potholder"

255;"240";"box for cutlery"

256;"240";"full-size rack (cassette) for cutlery"

257;"240";"Stand without containers for cutlery"

258;"240";"cassette for cutlery"

259;"240";"container for cutlery"

260;"240";"station for cutlery"

261;"240";"Shelf for cutlery"

262;"1";"Decorations for cocktails"

263;"262";"ducts"

264;"262";"sticks"

266;"496";"molds for ice"

267;"496";"molds for children"

268;"496";"Molds for shaping products"

269;"496";"Molds for dumplings"

271;"497";"Measuring container"

272;"497";"A mixing container with the dispenser"
273;"497";"Measuring container with the funnel"

FIG. 168M

274;"497";"beaker"

275;"497";"scoop"

276;"1";"kitchen scissors"

277;"276";"Scissors for BBQ"

278;"276";"Kitchen scissors with bottle opener"

279;"276";"Scissors for greens"

280;"276";"Kitchen multipurpose scissors"

281;"276";"Kitchen scissors for poultry"

282;"1";"utensil for storage"

283;"282";"container for storage"

284;"282";" Bottles for liquid spices oils"

285;"282";"jars for storage"

286;"282";"lunchbox"

287;"282";"foldable lunchbox"

288;"282";"jar for hermetic storage of bulk products"

289;"282";"Sprayer for oil / vinegar"

290;"282";"jar for bulk products"

291;"282";"containers for spices"

293;"282";"Container for tea"

294;"1";"potholders"

295;"294";"oven-glove"

296;"294";"silicone potholders"

297;"294";"dishcloth"

FIG. 168N

298;"1";"railing with hooks"

299;"1";"silicone mats"

300;"299";"baking mat"

301;"299";"mat for baking cakes"

302;"299";"mat for drying of the glasses"

303;"299";"cooking mat"

304;"299";"Mat for drying of the dishes"

305;"1";"graters presses rubbing machines"

306;"305";"grater with a handle"

308;"305";"multifunction grater"

309;"305";"grater shredder"

310;"305";"grind for the green"

311;"305";"grind for the garlic"

312;"305";"Slicer for tomatoes"

313;"305";"grater with rotating drums"

314;"305";"universal device for grinding"

315;"305";"mechanical grater"

316;"305";"garlic peeling tube"

317;"305";"rubbing machine"

318;"305";"press for vegetables"

319;"305";"press for garlic"

320;"305";"press for hamburgers"

321;"1";"knife sharpener"

FIG. 168O

322;"321";"electric sharpener"

323;"321";"sharpening stone"

324;"321";"ceramic sharpener"

325;"1";"breadbox"

326;"1";"lattice with legs"

327;"339";"Flatware"

328;"327";"for alcohol"

329;"540";"Cognac set with the batcher"

330;"540";"Glasses souvenir"

331;"540";"Glasses"

332;"540";"Bucket for ice"

333;"540";"Shot glasses"

334;"540";"Bucket for champagne"

335;"540";"Wine glasses"

336;"540";"decanter"

337;"540";"tray"

338;"540";"Support under a bottle"

339;"327";"tableware"

340;"339";"first course dish"

341;"339";"dish for bouillon"

342;"339";"bouillon bowl"

343;"339";"oiler"
344;"339";"round dish"
345;"339";"duck pan"

FIG. 168P

346;"339";"Set for making chocolate fondue"

347;"339";"Set for making cheese fondue"

348;"339";"salad bowl"

349;"339";"dish for cake"

350;"339";"compartmental dish"

351;"339";"set of cutlery"

352;"339";"serving spoon and fork"

353;"339";"dish with lid"

354;"339";"steam table"

355;"374";"ice-cream bowl"

357;"339";"saucer"

358;"339";"saucer for jam"

359;"339";"mustard-pot"

360;"339";"pepper-pot"

361;"339";"ash-pot"

362;"339";"deep table plate"

363;"339";"dinner plate"

364;"339";"snack plate"

365;"339";"deep dessert plate"

366;"339";"dessert plate"

367;"339";"plate for pies"

368;"339";"horseradish-pot"
369;"327";"Utensils for table"

FIG. 168Q

370;"369";"Pad for tableware"

371;"369";"serving mat"

372;"369";"serving tray"

373;"369";"glass burner"

374;"327";" Dishes for tea coffee desert"

375;"374";"sugar-bowl"

376;"374";"mug"

377;"374";"mug with teapot"

378;"374";"mug with stand"

379;"374";"mug with lid"

380;"374";"tea set"

381;"374";"dish"

382;"374";"french-press"

383;"374";"teapot"

384;"374";"teapot with strainer"

385;"374";"glass teapot"

387;"374";"multifunctional vase"

388;"540";"Glasses"

389;"374";"soup bowl"

390;"374";"wicker basket"

391;"374";"vase 3-tier"

393;"374";"napkin rings"

394;"374";"pannier for fruits"

FIG. 168R

395;"374";"table trash basket"

396;"374";"biscuit dish"

397;"374";"candy dish"

398;"374";"coffee sets"

399;"327";"CUTLERY"

437;"0";"Kitchen appliances"

438;"437";"aerogrill"

439;"437";"blenders grinder"

440;"437";"coffee Maker"

441;"437";"coffee grinder (coffee mill)"

442;"437";"Food Processor"

443;"437";"mixer"

444;"437";"mini oven"

445;"437";"multicooker"

446;"437";"meat grinders"

447;"437";"steamers"

448;"437";"Raclette grill"

449;"437";"Juicers"

450;"437";"toasters"

451;"437";"egg cooker"

452;"437";"electric range"

453;"437";"electric induction stove"
454;"437";"electric kettle"
455;"437";"thermopots"
456;"437";"bread makers"

FIG. 168S

457;"437";"microwaves"

458;"437";"weights for kitchen"

459;"437";"electric driers"

461;"0";"Children's dishes"

462;"461";"Children Sets for baking"

463;"461";"Children cutlery"

464;"461";"Children thermoses"

465;"461";"Children Sets of dishes"

488;"437";"deep fryer"

491;"339";"baking sheet"

494;"1";"stand and holders"

495;"220";"sieve to form the "Bird's Nest""

496;"1";"mold"

497;"1";"Measuring container"

498;"339";"pan"

499;"339";"frying pan"

500;"437";"Cookware for induction cookers"

501;"437";"Juice cookers"

502;"437";"Milk cooker"

503;"437";"Covers / splash screens"

504;"437";"Microwave cookware"

505;"437";"Braziers roasters"

506;"437";"Turk"

FIG. 168T

507;"437";"Dumpling (manti) cookers"

508;"437";"Sets"

509;"437";"Samovars"

510;"437";"Kasans"

511;"437";"Electric stove"

512;"437";"Casseroles (pans)"

513;"512";"casseroles (pans) with non-stick coating"

514;"512";"aluminum casseroles (pans)"

515;"512";"Stainless steel casseroles (pans)"

516;"512";"Enameled casseroles (pans)"

517;"512";"Teflon coated casseroles (pans)"

518;"512";"Heat-proof glass casseroles (pans)"

519;"512";"Ladles"

520;"512";"Ceramic casseroles (pans)"

521;"512";"Set of casseroles (pans)"

522;"512";"Pressure cooker"

523;"512";"Pan-steamer"

524;"512";"casseroles for induction cookers"

525;"512";"Pan-fryer"

526;"512";"Cast iron casserole (pot)"

527;"512";"Titanium casserole"

528;"437";"Frying pans skillet"
529;"528";"Frying pan with ceramic coating"
530;"528";"Frying pans with non-stick coating"

FIG. 168U

531;"528";"Frying pan with removable handle"

532;"528";"Stewpots"

533;"528";"Frying pans for grill"

534;"528";"Wok"

535;"528";"Pancake pans"

536;"528";"Electric frying pans"

537;"528";"Cast iron skillet"

538;"528";"Multifunctional frying pan"

539;"528";"Titanium frying pan"

540;"437";"Drinkware"

541;"540";"Wine glasses"

542;"540";"Water glasses"

543;"540";"Beer glasses"

544;"540";"Kegs"

545;"540";"Carafes"

546;"540";"Decanters"

547;"540";"Jugs"

548;"540";"Shots"

549;"540";"Wine glasses for champagne"

550;"540";"Glasses for brandy / cognac"

551;"540";"Wine glasses for a cocktail / martini"

FIG. 168V

A Sample List of Cuisine

1;"0";"Abkhaz"

2;"0";"Australian"

3;"0";"Austrian"

4;"0";"Azerbaijan"

5;"0";"Albanian"

6;"0";"Algerian"

7;"0";"American"

8;"0";"English"

9;"0";"Arabic"

10;"0";"Argentine"

11;"0";"Armenian"

12;"0";"Bashkir"

13;"0";"Belarusian"

14;"0";"Belgian"

15;"0";"Bulgarian"

16;"0";"Bosnian"

17;"0";"Brazilian"

18;"0";"Hungarian"

19;"0";"Venezuelan"

20;"0";"Vietnamese"

21;"0";"Greek"

FIG. 168W

22;"0";"Georgian"
23;"0";"Danish"
24;"0";"Jewish"
25;"0";"Israeli"
26;"0";"Indian"
27;"0";"Indonesian"
28;"0";"Jordanian"
29;"0";"Iraqi"
30;"0";"Iranian"
31;"0";"Irish"
32;"0";"Icelandic"
33;"0";"Spanish"
34;"0";"Italian"
35;"0";"Cambodian"
36;"0";"Canadian"
37;"0";"Cypriot"
38;"0";"Chinese"
39;"0";"Colombian"
40;"0";"Korean"
41;"0";"Creole"
42;"0";"Costa Rica"
43;"0";"Latvian"
44;"0";"Lebanese"
45;"0";"Libyan"
46;"0";"Lithuanian"
47;"0";"Macedonian"
48;"0";"Malaysian"
49;"0";"Moroccan"
50;"0";"Mexican"
51;"0";"Moldavian"
52;"0";"Mongolian"
53;"0";"German"
54;"0";"Dutch"
55;"0";"New Zealand"

FIG. 168X

56;"0";"Norwegian"
57;"0";"Ossetian"
58;"0";"Pakistani"
59;"0";"Palestinian"
60;"0";"Panamanian"
61;"0";"Peruvian"
62;"0";"Polish"
63;"0";"Portuguese"
64;"0";"Romanian"
65;"0";"Russian"
66;"0";"Serbian"
67;"0";"Singaporean"
68;"0";"Syrian"
69;"0";"Slovak"
70;"0";"Slovenian"
71;"0";"Thai"
72;"0";"Tatar"
73;"0";"Tibetan"
74;"0";"Tunisian"
75;"0";"Turkish"
76;"0";"Turkmen"
77;"0";"Ukrainian"
78;"0";"Philippine"
79;"0";"Finnish"
80;"0";"French"
81;"0";"Croatian"
82;"0";"Montenegrin"
83;"0";"Czech"
84;"0";"Chilean"
85;"0";"Chuvash"
86;"0";"Chukotka"
87;"0";"Swedish"
88;"0";"Swiss"
89;"0";"Scottish"

FIG. 168Y

90;"0";"Ecuadorian"
91;"0";"Estonian"
92;"0";"Japanese"
93;"0";"Raw food diet"
94;"0";"European"
95;"0";"International"
96;"0";"Multinational"
97;"0";"Lean"
98;"0";"Caucasian"
99;"0";"Children"

FIG. 168Z

A Sample List of Sample Bases:

1;"0";"Meat and meat products"

2;"1";"Basturma"

3;"1";"Fat"

4;"1";"brisket cooked and smoked"

5;"1";"Hare"

6;"1";"leather duck"

7;"1";"Sausage"

8;"1";"Sausages"

9;"1";"Sausages "Hunting party""

10;"1";"Horsemeat"

11;"1";"Bones with bone marrow"

12;"1";"Roe"

13;"1";"Rabbit"

14;"1";"Meat"

15;"1";"Moosemeat"

16;"1";"Venison"

17;"1";"Liver"

18;"1";"Kidney"

19;"1";"Smoked ribs"

20;"1";"Salami"

21;"1";"Sausages"

22;"1";"Cervelat"

23;"1";"Sausages"

24;"1";"Hungarian smoked bacon"

25;"1";"bacon fat-tailed"

FIG. 169A

26;"1";"Steak"

27;"1";"ribeye steak"

28;"1";"Farce"

29;"1";"crocodile fillet"

30;"1";"Jamon"

31;"1";"Choriso (Spanish sausage)"

32;"1";"Skewers"

33;"1";"Sowbelly"

34;"1";"Deer tongue"

35;"1";"LAMB"

36;"35";"breast of lamb"

37;"35";"loin of lamb"

38;"35";"blade lamb"

39;"35";"veal brains"

40;"35";"mutton ham"

41;"35";"veal ham"

42;"35";"leg of lamb"

43;"35";"Heel muscle mutton"

44;"35";"lamb offal"

45;"35";"veal kidneys"

46;"35";"lamb chops"

47;"35";"gras cow"

48;"35";"veal heart"

49;"35";"lamb testicles"

50;"35";"VEAL"

51;"35";"veal cheeks"

FIG. 169B

52;"35";"minced lamb"

53;"35";"minced veal"

54;"35";"veal tail"

55;"35";"veal tongue"

56;"35";"eggs bullish"

57;"1";"BEEF"

58;"57";"beef brisket"

59;"57";""

60;"57";"beef (sirloin)"

61;"57";"beef on the bone"

62;"57";"beef eye muscle"

63;"57";"legs of beef"

64;"57";"ham beef"

65;"57";"gras beef"

66;"57";"beef ribs"

67;"57";"beef heart"

68;"57";"minced beef"

69;"57";"tail beef"

70;"57";"beef tongue"

71;"1";"PORK"

72;"71";"bacon"

73;"71";"smoked bacon"

74;"71";"pork"

75;"71";"ham"

76;"71";"pork brisket"

FIG. 169C

77;"71";"smoked pork belly"

78;"71";"Pork Intestine"

79;"71";"legs of pork"

80;"71";"boar ham"

81;"71";"pork ham"

82;"71";"pork ribs"

83;"71";"knuckle of pork"

84;"71";"fat"

85;"71";"pork (pork neck or loin)"

86;"71";"pork ears"

87;"71";"minced pork"

88;"71";"pig tail"

89;"71";"pork tongue"

90;"0";"Birds"

91;"90";"garshnep"

92;"90";"turkey breast"

93;"90";"chicken breast"

94;"90";"chicken breast smoked"

95;"90";"duck breast"

96;"90";"Goose"

97;"90";"chicken ventricles"

98;"90";"turkey"

99;"90";"turkey wings"

100;"90";"chicken wings"

101;"90";"chicken

FIG. 169D

102;"90";"smoked chicken"

103;"90";"grouse"

104;"90";"coot"

105;"90";"duck leg"

106;"90";"crow's feet"

107;"90";"chicken legs"

108;"90";"chicken ham"

109;"90";"quail"

110;"90";"gras chicken"

111;"90";"chicken giblets"

112;"90";"grouse"

113;"90";"chicken hearts"

114;"90";"duck"

115;"90";"smoked duck"

116;"90";"Pheasant"

117;"90";"minced chicken"

118;"90";"chicken fillet"

119;"90";"foie gras"

120;"90";"chicken"

121;"90";"chicken gutted"

122;"90";"neck duck"

123;"0";"FISH and SEAFOOD"

124;"123";"anchovies"

125;"123";"arctic char"

126;"123";"mullet"

FIG. 169E

127;"123";"Black Sea goby"

128;"123";"shrimp head"

129;"123";"Butterfish"

130;"123";"scallops"

131;"123";"dorado"

132;"123";"ruff"

133;"123";"caviar"

134;"123";"red caviar"

135;"123";"Tobiko caviar"

136;"123";"squid"

137;"123";"flounder"

138;"123";"cuttlefish"

139;"123";"carp"

140;"123";"sprat"

141;"123";"smelt"

142;"123";"crab sticks"

143;"123";"Shrimps"

144;"123";"King shrimps"

145;"123";"Salad shrimps"

146;"123";"Tiger prawn"

147;"123";"Bream"

148;"123";"salmon"

149;"123";"Smoked salmon"

150;"123";"Mussels"

151;"123";"Mussels with shells"

FIG. 169F

152;"123";"Pollock"
153;"123";"Molluscs"
154;"123";"Sea food"
155;"123";"Sea fish"
156;"123";"sole (fish)"
157;"123";"Crab meat"
158;"123";"Krill meat"
159;"123";"Burbot"
160;"123";"Frog legs"
161;"123";"Perch"
162;"123";"Lobster"
163;"123";"cisco"
164;"123";"sturgeon"
165;"123";"octopus"
166;"123";"baby octopus"
167;"123";"shrimp broth"
168;"123";"halibut"
169;"123";"Pangasius"
169;"123";"cod liver oil"
171;"123";"haddock"
172;"123";"crayfish"
173;"123";"dried crustaceans"
174;"123";"Hot smoked fish"
175;"123";"red fish salted"
176;"123";"swordfish"
177;"123";"saury"

FIG. 169G

178;"123";"sardines"
179;"123";"herring"
180;"123";"salmon"
181;"123";"smoked salmon"
182;"123";"salted salmon"
183;"123";"seabass"
184;"123";"whitefish"
185;"123";"ramp"
186;"123";"mackerel"
187;"123";"smoked mackerel"
188;"123";"sheatfish"
189;"123";"starlet"
190;"123";"walleye"
191;"123";"Dried seaweed"
192;"123";"tilapia"
193;"123";"carp"
194;"123";"cod"
195;"123";"Hot smoked cod"
196;"123";"black cod"
197;"123";"tuna"
198;"123";"turbot"
199;"123";"eel"
200;"123";"smoked eel"
201;"123";"snails"
202;"123";"oysters"
203;"123";"white fish fillets"

FIG. 169H

204;"123";"catfish fillets"
205;"123";"fillet of carp"
206;"123";"fish fillet"
207;"123";"salmon fillet"
208;"123";"salted herring fillets"
209;"123";"perch fillet"
210;"123";"trout"
211;"123";"smoked trout"
212;"123";"Squid Ink"
213;"123";"cervical shrimp"
214;"123";"cervical cancers"
215;"123";"sprats"
216;"123";"pike"
217;"0";"VEGETABLES"
218;"217";"watermelon"
219;"217";"Artichokes"
220;"217";"eggplant"
221;"217";"yam"
222;"217";"broccoli tops"
223;"217";"beet tops"
224;"217";"broccoli"
225;"217";"rutabaga"
226;"217";"galangal"
227;"217";"peas"
228;"217";"pea sprouts"
229;"217";"pea pods"

FIG. 169I

230;"217";"green peas"
231;"217";"daikon"
232;"217";"melon"
233;"217";"Ginseng"
234;"217";"Ginger"
235;"217";"zucchini"
236;"217";"feces"
237;"217";"cabbage"
238;"217";"Brussels sprouts"
239;"217";"sauerkraut"
240;"217";"Chinese cabbage"
241;"217";"Cabbage"
242;"217";"Romanesco cabbage"
243;"217";"savoy cabbage"
244;"217";"cauliflower"
245;"217";"potatoes"
246;"217";"young potatoes"
247;"217";"kohlrabi"
248;"217";"root anise"
249;"217";"salsify root"
250;"217";"parsley root"
251;"217";"celery root"
252;"217";"fresh corn"
253;"217";"white onion"
254;"217";"pearl bow"
255;"217";"onion"

FIG. 169J

256;"217";"red onion"
257;"217";"dry onion"
258;"217";"small onion"
259;"217";"Shallots"
260;"217";"cassava"
261;"217";"mini corn"
262;"217";"mini peppers"
263;"217";"mini-tomatoes"
264;"217";"carrots"
265;"217";"cucumber"
266;"217";"parsnips"
267;"217";"squash"
268;"217";"bell peppers"
269;"217";"cayenne pepper"
270;"217";"fresh chili pepper"
271;"217";"jalapeno peppers"
272;"217";"tomato"
273;"217";"pickled tomatoes"
274;"217";"cherry tomatoes"
275;"217";"sunflower sprouts"
276;"217";"wheat germ"
277;"217";"soybean seedlings"
278;"217";"germinated soybeans"
279;"217";"rhubarb"
280;"217";"Radish"
281;"217";"wild radish"

FIG. 169K

282;"217";"Turnip"
283;"217";"beansprouts"
284;"217";"beet"
285;"217";"Asparagus"
286;"217";"chopped tomatoes"
287;"217";"Sweet"
288;"217";"Pumpkin"
289;"217";"green beans"
290;"217";"Fennel"
291;"217";"physalis"
292;"217";"horseradish"
293;"217";"zucchini"
294;"217";"garlic"
295;"217";"endive"
296;"0";"FRUITS"
297;"296";"Apricot"
298;"296";"Avocado"
299;"296";"quince"
300;"296";"fresh pineapple"
301;"296";"Orange"
302;"296";"banana"
303;"296";"Hawthorn"
304;"296";"cranberries"
305;"296";"grapes"
306;"296";"Cherry"
307;"296";"Dried cherries"

FIG. 169L

308;"296";"blueberries"
309;"296";"Garnet"
310;"296";"Grapefruit"
311;"296";"pear"
312;"296";"Blackberry"
313;"296";"strawberries"
314;"296";"pomegranate seeds"
315;"296";"carambola"
316;"296";"kiwi"
317;"296";"Strawberry"
318;"296";"Cranberry"
319;"296";"coconut"
320;"296";"gooseberry"
321;"296";"kumquat"
322;"296";"Lime"
323;"296";"lemon"
324;"296";"Litchi"
325;"296";"raspberries"
326;"296";"mango"
327;"296";"Mandarin"
328;"296";"Passionfruit"
329;"296";"mini pineapple"
330;"296";"Nectarine"
331;"296";"buckthorn"
332;"296";"papaya"
333;"296";"Peach"

FIG. 169M

334;"296";"Pomelo"
335;"296";"Rowan"
336;"296";"drain"
337;"296";"red currants"
338;"296";"black currant"
339;"296";"tamarind"
340;"296";"Feijoa"
341;"296";"fruit to taste"
342;"296";"persimmon"
343;"296";"cherries"
344;"296";"Cherry"
345;"296";"blueberries"
346;"296";"apple"
347;"296";"frozen berries"
348;"296";"juniper berries"
349;"296";"fresh berries"
350;"0";"GROCERY"
351;"350";"agar"
352;"350";"adjika"
353;"350";"rice paper"
354;"350";" vanilla extract"
355;"350";"vermicelli rice"
356;"350";"egg noodles"
357;"350";"algae"
358;"350";"glucose"
359;"350";"jam"

FIG. 169N

360;"350";"raspberry jam"
361;"350";"fresh yeast"
362;"350";"gelatin"
363;"350";"liquid Smokehouse"
364;"350";"sweetener"
365;"350";"corn muffins"
366;"350";"ketchup"
367;"350";"citric acid"
368;"350";"candy"
369;"350";"confiture"
370;"350";"strawberry jam"
371;"350";"food dye"
372;"350";"starch"
373;"350";"potato starch"
374;"350";"corn starch"
375;"350";"bread crumbs"
376;"350";"Noodles"
377;"350";"buckwheat noodles"
378;"350";"Pad Thai noodles"
379;"350";"rice noodles"
380;"350";"glass noodles"
381;"350";"noodles harusame"
382;"350";"egg noodles"
383;"350";"mayonnaise"
384;"350";"poppy sweet"
385;"350";"pasta"

FIG. 169O

386;"350";"cannelloni pasta"

387;"350";"pasta lumakoni"

388;"350";"pasta feathers"

389;"350";"fusilli pasta"

390;"350";"pumpkin marmalade"

391;"350";"jujube fruit"

392;"350";"marzipan"

393;"350";"mirin"

394;"350";"coconut milk"

395;"350";"almond milk"

396;"350";"soy milk"

397;"350";"muesli"

398;"350";"Pasta"

399;"350";"peanut paste"

400;"350";"red curry paste"

401;"350";"tamarind paste"

402;"350";"Tom Yam Paste"

403;"350";"chili paste"

404;"350";"molasses"

405;"350";"pectin"

406;"350";"Penne"

407;"350";"jam"

408;"350";"elderberry syrup"

409;"350";"vanilla syrup"

410;"350";"syrup vishnevny"

FIG. 169P

411;"350";"ginger syrup"

412;"350";"caramel syrup"

413;"350";"maple syrup"

414;"350";"strawberry syrup"

415;"350";"coffee syrup"

416;"350";"corn syrup"

417;"350";"raspberry syrup"

418;"350";"mango syrup"

419;"350";"honey syrup"

420;"350";"almond syrup"

421;"350";"walnut syrup"

422;"350";"blackcurrant syrup"

423;"350";"chocolate syrup"

424;"350";"cranberry sauce"

425;"350";"worcestershire sauce"

426;"350";"pomegranate sauce"

427;"350";"kimchi sauce"

428;"350";"pesto"

429;"350";"fish sauce"

430;"350";"fish sauce nam pla"

431;"350";"Tabasco sauce"

432;"350";"teriyaki sauce"

433;"350";"sauce tkemali"

434;"350";"oyster sauce"

435;"350";"sweet chili sauce"

FIG. 169Q

436;"350";"Japanese walnut sauce"

437;"350";"spaghetti"

438;"350"; ";"crumbs of white bread"

439;"350";"breadcrumbs"

440;"350";"pastry decorations"

441;"350";"candied"

442;"0";"MILK PRODUCTS and EGGS"

443;"442";"yogurt"

444;"442";"natural yoghurt"

445;"442";"kefir"

446;"442";"margarine"

447;"442";"butter"

448;"442";"melted butter"

449;"442";"milk"

450;"442";"baked milk"

451;"442";"buttermilk"

452;"442";"curdled"

453;"442";"cream"

454;"442";"sour cream"

455;"442";"whey"

456;"442";"Thane"

457;"442";"curd"

458;"442";"curd beaded"

FIG. 169R

459;"442";"quail eggs"

460;"442";"egg"

461;"0";"mushrooms"

462;"461";"oyster mushrooms"

463;"461";""

464;"461";"ceps"

465;"461";"Enoki mushrooms"

466;"461";"Chinese dried mushrooms"

467;"461";"portobello mushrooms"

468;"461";"dried mushrooms"

469;"461";"shiitake mushrooms"

470;"461";"milkmushrooms"

471;"461";"chanterelles"

472;"461";"boletus"

473;"461";"honey fungus"

474;"461";"saffron milk cap"

475;"461";"morels"

476;"461";"truffles"

477;"461";"meadow mushrooms"

478;"0";"CHEESE"

479;"478";"cheese"

480;"478";"cheese Adyghe"

481;"478";"brie cheese"

482;"478";"feta cheese"

FIG. 169S

483;"478";"Burrata cheese"

484;"478";"Gouda cheese"

485;"478";"Dutch cheese"

486;"478";"blue cheese"

487;"478";"Gorgonzola"

488;"478";" ;"grana padano cheese"

489;"478";"Gruyere cheese"

490;"478";" -";"Dor Blue cheese"

491;"478";"Camembert"

492;"478";"goat cheese"

493;"478";"cheese sausage"

494;"478";"mascarpone cheese"

495;"478";"Monterey Jack cheese"

496;"478";"mozzarella cheese"

497;"478";"soft cheese"

498;"478";"goat cheese"

499;"478";"parmesan cheese"

500;"478";"pecorino cheese"

501;"478";"processed cheese"

502;"478";"cheese Poshehonsky"

503;"478";"ricotta cheese"

FIG. 169T

504;"478";"Roquefort cheese"

505;"478";"blue cheese"

506;"478";"cream cheese"

507;"478";"suluguni"

508;"478";"cheese curd"

509;"478";"feta cheese"

510;"478";"philadelphia cheese"

511;"478";"cheddar cheese"

512;"478";"edam cheese"

513;"478";"Emmentaler cheese"

514;"0";"NUTS and DRIED FRUITS"

515;"514";"peanuts"

516;"514";"barberry"

517;"514";"walnuts (peeled)"

518;"514";"raisins"

519;"514";"figs"

520;"514";"Chestnut"

521;"514";"Dried cranberries"

522;"514";"coconut"

523;"514";"dried apricots"

524;"514";"Filbert (hazelnut)"

525;"514";"almonds"

FIG. 169U

526;"514";"nuts"

527;"514";"pine nuts"

528;"514";"cashew nuts"

529;"514";"Dried peaches"

530;"514";"sunflower seeds"

531;"514";"pumpkin seeds"

532;"514";"Dried Fruits"

533;"514";"Dates"

534;"514";"pistachios"

535;"514";"hazelnuts"

536;"514";"prunes"

537;"0";"BEVERAGES"

538;"537";"water"

539;"537";"water orange"

540;"537";"mineral water"

541;"537";"water pink"

542;"537";"GABA-tea"

543;"537";"Hibiscus"

544;"537";"kvass"

545;"537";"bread kvass"

546;"537";"-;"Coke"

547;"537";"Kuding"

548;"537";"lemonade"

549;"537";"mate"

550;"537";"juice"

551;"537";"carbonated drink"

FIG. 169V

552;"537";"Bitter Brandy"

553;"537";"Rooibos"

554;"537";"pineapple juice"

555;"537";"orange juice"

556;"537";"birch juice"

557;"537";"grape juice"

558;"537";"cherry juice"

559;"537";"pomegranate juice"

560;"537";"strawberry juice"

561;"537";"cranberry juice"

562;"537";"gooseberry juice"

563;"537";"lime juice"

564;"537";"mango juice"

565;"537";"tangerine juice"

566;"537";"peach juice"

567;"537";"currant juice"

568;"537";"tomato juice"

569;"537";"apple juice"

570;"537";"sprite"

571;"537";"tonic"

572;"537";"tea white"

573;"537";"tea yellow"

574;"537";"green tea"

575;"537";"red tea"

576;"537";"Puer tea"

FIG. 169W

577;"537";"Puer tea in Mandarin"

578;"537";"oolong tea"

579;"537";"black tea"

580;"537";"Espresso"
581;"0";"ALCOHOL"

582;"581";"Balm"

583;"581";"Bitter"

584;"581";"brandy"

585;"581";"bourbon"

586;"581";"vermouth"

587;"581";"wine"

588;"581";"white wine"

589;"581";"sparkling wine"

590;"581";"red wine"

591;"581";"dry red wine"

592;"581";"wine sangria"

593;"581";"whiskey"

594;"581";"Vodka"

595;"581";"anise vodka"

596;"581";"grappa"

597;"581";"gin"

598;"581";" -";"Irish cream liqueur"

599;"581";"Calvados"

600;"581";"Cachaca"

FIG. 169X

601;"581";"brandy"

602;"581";"liqueur"

603;"581";"orange liqueur"

604;"581";"coffee liqueur"

605;"581";"chocolate liqueur"

606;"581";"Madeira"

607;"581";"Marsala"

608;"581";"Martini"

609;"581";"beer"

610;"581";"cherry beer"

611;"581";"port"

612;"581";"rum"

613;"581";"white rum"

614;"581";"black rum"

615;"581";"Sake"

616;"581";"sambuca"

617;"581";"cider"

618;"581";"tequila"

619;"581";"sherry"

620;"581";"()";"Champagne (Brut)"

621;"581";"schnapps"

622;"0";"GREENS AND HERBS"

623;"622";"basil"

624;"622";"basil red"

625;"622";"bouquet garni"

FIG. 169Y

626;"622";"oregano"

627;"622";"greens"

628;"622";"dried herbs"

629;"622";"-;"cabbage pak choi"

630;"622";"chervil"

631;"622";"cilantro"

632;"622";"oxalis"

633;"622";"oat root"

634;"622";"fresh coriander"

635;"622";"nettle"

636;"622";"Watercress"

637;"622";"watercress"

638;"622";"rose petals"

639;"622";"lemongrass"

640;"622";"bamboo leaves"

641;"622";"banana leaves"

642;"622";"grape leaves"

643;"622";"Grape leaves (salty)"

644;"622";"kaffir lime leaves"

645;"622";"lime leaves"

646;"622";"dandelion leaves"

647;"622";"green onion"
648;"622";"-;"Leek"

649;"622";"marjoram"

650;"622";"chard"

651;"622";"melissa"

FIG. 169Z

652;"622";"lemon balm"

653;"622";"Mint"

654;"622";"oregano"

655;"622";"parsley"

656;"622";"dried parsley"

657;"622";"plantain"

658;"622";"wormwood"

659;"622";"chopped camomile"

660;"622";"arugula"

661;"622";"iceberg lettuce"

662;"622";"green salad"

663;"622";"corn salad"

664;"622";"lettuce"

665;"622";"leaf lettuce"

666;"622";"salad Mizuno"

667;"622";" :"Oakleaf lettuce"

668;"622";"radicchio salad"

669;"622";"romaine lettuce"

670;"622";"salad Friess"

671;"622";"salad mix"

672;"622";"celery"

673;"622";"Lemon grass (lemon grass)"

674;"622";"Italian herbs"

675;"622";"spicy herbs"

FIG. 169Z1

676;"622";"dill"

677;"622";"dandelion flowers"

678;"622";"flowers"

679;"622";"lavender flowers"

680;"622";"chicory"

681;"622";"thyme"

682;"622";"Ramson"

683;"622";"saffron"

684;"622";"rosehips"

685;"622";"chives"

686;"622";"spinach"

687;"622";"sorrel"

688;"622";"tarragon"

689;"0";" Cereals legumes and flours"

690;"689";"beans"

691;"689";"mung beans"

692;"689";"bulgur"

693;"689";"puffed rice"

694;"689";"buckwheat green"

695;"689";"Quinoa"

696;"689";"buckwheat"

697;"689";"corn grits"

698;"689";"semolina"

699;"689";"oats"

700;"689";"pearl barley"

FIG. 169Z2

701;"689";"cereal wheat"

702;"689";"couscous"

703;"689";"flour"

704;"689";"buckwheat flour"

705;"689";"chestnut flour"

706;"689";"corn flour"

707;"689";"almond flour"

708;"689";"Chickpea flour"

709;"689";"oat flour"

710;"689";"wheat flour"

711;"689";"rye flour"

712;"689";"rice flour"

713;"689";"chickpeas"

714;"689";"bran"

715;"689";"millet"

716;"689";"Figure"

717;"689";"Figure baya"

718;"689";"basmati rice"

719;"689";"brown rice"

720;"689";"wild rice"

721;"689";"Round grain rice"

722;"689";"semola (flour made from durum wheat)"

723;"689";"Beans"

724;"689";"white beans"

725;"689";"red beans"

FIG. 169Z3

726;"689";"buckwheat flakes"

727;"689";"cereal grains"

728;"689"; "oat flakes"

729;"689";"lentils"

730;"689";"barley"

731;"0";"Spices and Seasonings"

732;"731";"star anise"

733;"731";"white pepper"

734;"731";"vanillin"

735;"731";"vanilla"

736;"731";"vanilla essence"

737;"731";"vanilla powder"

738;"731";"wasabi"

739;"731";"caltrop"

740;"731";"garam masala"

741;"731";"Carnation"

742;"731";"cloves minced"

743;"731";"mustard"

744;"731";"sweet mustard"

745;"731";"allspice peas"

746;"731";"grain mustard"

747;"731";"Cumin"

748;"731";"ground ginger"

749;"731";"capers"

750;"731";"cardamom"

751;"731";"curry"

FIG. 169Z4

752;"731";"coriander"

753;"731";"ground coriander"

754;"731";"cinnamon"

755;"731";"coffee essence"

756;"731";"balsamic cream"

757;"731";"sesame"

758;"731";"turmeric"

759;"731";"bay leaf"

760;"731";"lemon pepper"

761;"731";"poppy seed"

762;"731";"olives"

763;"731";"olives dry"

764;"731";"avocado oil"

765;"731";"anchovy butter"

766;"731";"peanut oil"

767;"731";"mustard oil"

768;"731";"oil for frying"

769;"731";"scented oil"

770;"731";"grapeseed oil"

771;"731";"canola oil"

772;"731";"corn oil"

773;"731";"sesame oil"

774;"731";"linseed oil"

775;"731";"olive oil"

776;"731";"Peanut butter"

777;"731";"sunflower oil"

FIG. 169Z5

778;"731";"lean oil"

779;"731";"vegetable oil"

780;"731";"oil refined"

781;"731";"oil seed-bearing"

782;"731";"soybean oil"

783;"731";"truffle oil"

784;"731";"oil pumpkin"

785;"731";"almonds hammers"

786;"731";"miso paste"

787;"731";"sea ??salt"

788;"731";"nutmeg"

789;"731";"olives"

790;"731";"Ligurian olives"

791;"731";"hot red pepper"

792;"731";"hot peppers"

793;"731";"fenugreek"

794;"731";"paprika"

795;"731";"lemongrass paste"

796;"731";"peperoncini"

797;"731";"pepper pink polka dots"

798;"731";"chili"

799;"731";"Dried chili peppers"

800;"731";"mustard powder"

801;"731";"seasoning fish"

802;"731";"baking powder"

803;"731";"rosemary"

FIG. 169Z6

804;"731";"pink ground pepper"

805;"731";"sugar"

806;"731";"vanilla sugar"

807;"731";"brown sugar"

808;"731"; "sugar muskovado"

809;"731"; "sugar cane"

810;"731";"powdered sugar"

811;"731";"nasturtium seeds"

812;"731";"Nigella seeds"

813;"731";"fennel seeds"

814;"731";"";"spice mix "taco""

815;"731";"Soda"

816;"731";"ginger juice squeezed"

817;"731";"lemon juice"

818;"731";"salt"

819;"731";"citrate"

820;"731";"grape sauce"

821;"731";"sauce narsharab"

822;"731";"ponzu sauce"

823;"731";"soy sauce"

824;"731";"tomato sauce"

825;"731";"chili sauce"

826;"731";"Spices"

827;"731";"sumac"

828;"731";"thyme"

829;"731";"cumin"

FIG. 169Z7

830;"731";"Mediterranean herbs"

831;"731";"French herbs"

832;"731";"vinegar"

833;"731";"balsamic vinegar"

834;"731";"wine vinegar"

835;"731";"white wine vinegar"

836;"731";"red wine vinegar"

837;"731";"cherry vinegar"

838;"731";"raspberry vinegar"

839;"731";"rice vinegar"

840;"731";"apple cider vinegar"

841;"731";-";"hops suneli"

842;"731";"Savory"

843;"731";"chutney"

844;"731";"black pepper"

845;"731";"black pepper peas"

846;"731";"dry garlic"

847;"731";"sage"

848;"0";"PREPARED PRODUCTS"

849;"848";"canned pineapple"

850;"848";"canned artichokes"

851;"848";"Marinated artichokes"

852;"848";"baguette"

853;"848";"loaf"

854;"848";"Bars of chocolate"

855;"848";"meringue"

FIG. 169Z8

856;"848";"biscuit"

857;"848";"beans canned"

858;"848";"bun"

859;"848";"buns for hamburgers"

860;"848";"broth"

861;"848";"beef broth"

862;"848";"chicken broth"

863;"848";"fish broth"

864;"848";"Jam"

865;"848";"Apricot jam"

866;"848";"lingonberry jam"

867;"848";"cherry jam"

868;"848";"black currant jam"

869;"848";"raspberry jam"

870;"848";"blueberry jam"

871;"848";"Wafer"

872;"848";"canned cherry"

873;"848";"Glaze"

874;"848";"Dijon mustard"

875;"848";"croutons"

876;"848";"marinated mushrooms"

877;"848";"Demiglas apple"

878;"848";"yeast"

879;"848";"Jelly"

880;"848";"leaven"
881;"848";"marshmallows"

FIG. 169Z9

882;"848";"crushed tomatoes in juice"

883;"848";"pickled ginger"

884;"848";"Cocoa"

885;"848";"marinated cactus"

886;"848";"Pickled capers"

887;"848";"sour cabbage"

888;"848";"sea ??kale"

889;"848";"Kimchi"

890;"848";"wafer cakes"

891;"848";"gherkins"

892;"848";"natural coffee"

893;"848";"instant coffee"

894;"848";"crackers"

895;"848";"Chocolate Crumb"

896;"848";"croissant"

897;"848";"bouillon cubes"

898;"848";"canned corn"

899;"848";"marinated corn"

900;"848";"pita"

901;"848";"lanspik"

902;"848";"ice"

903;"848";"letcho"

904;"848";"lasagna sheets"

905;"848";"canned salmon"

906;"848";"pickled onions"

FIG. 169Z10

907;"848";"canned mandarins"

908;"848";"marshmallow"

909;"848";"hazelnut oil"

910;"848";"sweet curd"

911;"848";"yoghurt"

912;"848";"honey"

913;"848";"honey in the comb"

914;"848";"Mix ginger"

915;"848";"condensed milk"

916;"848";"condensed milk boiled"

917;"848";"milk powder"

918;"848";"pickled carrots"

919;"848";"ice cream"

920;"848";"vanilla ice cream"

921;"848";"chocolate ice cream"

922;"848";"salted cucumber"

923;"848";"pickled cucumbers"

924;"848";"pickled cucumbers"

925;"848";"pecans"

926;"848";"beet broth"

927;"848";"corn sticks"

928;"848";"bread sticks"

929;"848";"tomato paste"

930;"848";"Pasta Chocolate"

931;"848";"pate"

FIG. 169Z11

932;"848";"frozen dumplings"

933;"848";"hot pepper pickled"

934;"848";"canned peaches"

935;"848";"Cookies"

936;"848";"Biscuit"

937;"848";"Cookies Savoiardi"

938;"848";"chocolate cookies"

939;"848";"pita"

940;"848";"supplements"

941;"848";"tomatoes in juice"

942;"848";"canned tomatoes"

943;"848";"popcorn"

944;"848";"prosciutto"

945;"848";"gingerbread"

946;"848";"mango puree"

947;"848";"mashed potatoes"

948;"848";"tomato puree"

949;"848";"apple puree"

950;"848";"pickle cucumber"

951;"848";"roll"

952;"848";"Pickled beets"

953;"848";"pork jerky"

954;"848";"sugar syrup"

955;"848";"whipped cream"

956;"848";"cream of coconut"

957;"848";"malt"

FIG. 169Z12

958;"848";"sorbet"

959;"848";"barbecue sauce"

960;"848";"sauce bearnez"

961;"848";"bechamel"

962;"848";"Worcestershire sauce"

963;"848";"sauce Demiglas"

964;"848";""

965;"848";"sweet and sour sauce"

966;"848";"salsa"

967;"848";"sweet sauce"

968;"848";"chocolate sauce"

969;"848";"berry sauce"

970;"848";"asparagus soya"

971;"848";"caramel chips"

972;"848";"crushed crackers"

973;"848";"tartlets"

974;"848";"tahini"

975;"848";"pasta for lasagna"

976;"848";"dough for ravioli"

977;"848";"pizza dough"

978;"848";"yeast dough"

979;"848";"dough kataifi"

980;"848";"shortbread dough"

981;"848";"pastry dough"

982;"848";"puff pastry"

983;"848";"dough dry"

FIG. 169Z13

984;"848";"filo pastry"

985;"848";"dried tomatoes"

986;"848";"Tortilla"

987;"848";"toast"

988;"848";"tofu"

989;"848";"tuna fish oil"

990;"848";"tuna canned in its own juice"

991;"848";"Tahini"

992;"848";"Rice Stuffing"

993;"848";"Canned beans"

994;"848";"white bread"

995;"848"; "toast bread"

996;"848";"rye bread"

997;"848";"sweet bread"

998;"848";"black bread"

999;"848";"rye bread"

1000;"848";"corn flakes"

1001;"848";"ciabatta"

1002;"848";"tea Away"

1003;"848";"potato chips"

1004;"848";"corn chips"

1005;"848";"Marinated mushrooms"

1006;"848";"chocolate corn balls"

1007;"848";"Chocolate"

1008;"848";"white chocolate"

1009;"848";"bitter chocolate"

FIG. 169Z14

1010;"848";"milk chocolate"

1011;"848";"dark chocolate"

1012;"50";"veal fillet"

1013;"57";"beef fillet"

1014;"848";"sauce for soups "Bright udon""

1015;"296";"Lemon"

1016;"217";"Carrots"

1017;"217";"Tomato"

FIG. 169Z15

Table D: Types of Cuisine and Food Dishes

| | Types of Cuisine |
|---|---|
| 1 | Abkhaz cuisine |
| 2 | Australian cuisine |
| 3 | Austrian cuisine |
| 4 | Azerbaijan cuisine |
| 5 | Albanian cuisine |
| 6 | Algerian cuisine |
| 7 | American cuisine |
| 8 | English cuisine |
| 9 | Arabic cuisine |
| 10 | Argentine cuisine |
| 11 | Armenian cuisine |
| 12 | Bashkir cuisine |
| 13 | Belarusian cuisine |
| 14 | Belgian cuisine |
| 15 | Bulgarian cuisine |
| 16 | Bosnian cuisine |
| 17 | Brazilian cuisine |
| 18 | Hungarian cuisine |
| 19 | Venezuelan cuisine |
| 20 | Vietnamese cuisine |
| 21 | Greek cuisine |
| 22 | Georgian cuisine |
| 23 | Danish cuisine |
| 24 | Jewish cuisine |
| 25 | Israeli cuisine |
| 26 | Indian cuisine |
| 27 | Indonesian cuisine |
| 28 | Jordanian cuisine |
| 29 | Iraqi cuisine |
| 30 | Iranian cuisine |
| 31 | Irish cuisine |
| 32 | Icelandic cuisine |
| 33 | Spanish cuisine |
| 34 | Italian cuisine |
| 35 | Cambodian cuisine |
| 36 | Canadian cuisine |
| 37 | Cypriot cuisine |
| 38 | Chinese cuisine |
| 39 | Colombian cuisine |
| 40 | Korean cuisine |
| 41 | Creole cuisine |
| 42 | Costa Rica cuisine |
| 43 | Latvian cuisine |

FIG. 170A

| | |
|---|---|
| 44 | Lebanese cuisine |
| 45 | Libyan cuisine |
| 46 | Lithuanian cuisine |
| 47 | Macedonian cuisine |
| 48 | Malaysian cuisine |
| 49 | Moroccan cuisine |
| 50 | Mexican cuisine |
| 51 | Moldavian cuisine |
| 52 | Mongolian cuisine |
| 53 | German cuisine |
| 54 | Dutch cuisine |
| 55 | Zealand cuisine |
| 56 | Norwegian cuisine |
| 57 | Ossetian cuisine |
| 58 | Pakistani cuisine |
| 59 | Palestinian cuisine |
| 60 | Panamanian cuisine |
| 61 | Peruvian cuisine |
| 62 | Polish cuisine |
| 63 | Portuguese cuisine |
| 64 | Romanian cuisine |
| 65 | Russian cuisine |
| 66 | Serbian cuisine |
| 67 | Singaporean cuisine |
| 68 | Syrian cuisine |
| 69 | Slovak cuisine |
| 70 | Slovenian cuisine |
| 71 | Thai cuisine |
| 72 | Tatar cuisine |
| 73 | Tibetan cuisine |
| 74 | Tunisian cuisine |
| 75 | Turkish cuisine |
| 76 | Turkmen cuisine |
| 77 | Ukrainian cuisine |
| 78 | Philippine cuisine |
| 79 | Finnish cuisine |
| 80 | French cuisine |
| 81 | Croatian cuisine |
| 82 | Montenegrin cuisine |
| 83 | Czech cuisine |
| 84 | Chilean cuisine |
| 85 | Chuvash cuisine |
| 86 | Chukotka cuisine |
| 87 | Swedish cuisine |
| 88 | Swiss cuisine |
| 89 | Scottish cuisine |
| 90 | Ecuadorian cuisine |
| 91 | Estonian cuisine |

FIG. 170B

| | |
|---|---|
| 92 | Japanese cuisine |
| 93 | Raw food diet |
| 94 | Estonian cuisine |
| 95 | Japanese cuisine |
| 96 | Raw food diet |

| 1 | Types of Food Dishes |
|---|---|
| 1 | Snacks |
| 2 | Salads |
| 3 | Entrees |
| 4 | Main Dishes |
| 5 | Desserts |
| 6 | Drinks |
| 7 | Sauces and marinades |
| 8 | Baking |
| 9 | Semi manufactures and preservatives |

FIG. 170C

Table E: List of Robotic Food Preparation System (One Embodiment)

| No | Category | Sys Category | System | Responsible Party(s) | Major Challenges | Level of Completion | Notes |
|---|---|---|---|---|---|---|---|
| 01 | Hardware | Robot | Hands | | Productization, Robustness, Cost, Weight | | |
| 02 | Hardware | Robot | Arms | | | | |
| 03 | Hardware | Robot | Armature Rails | | | | |
| 04 | Hardware | Capture/Training | Dynamic 3D Vision System | | | | |
| 05 | Hardware | Capture/Training | Data Input | | | | |
| 06 | Hardware | Capture/Training | Editing System | | | | |
| 07 | Hardware | Kitchen Module | Cabinets | | | | |
| 08 | Hardware | Kitchen Module | Fixtures | | | | |
| 09 | Hardware | Kitchen Module | Lighting with ability to computer-operating mode | | | | |
| 10 | Hardware | Kitchen Module | Protection/Safety Screen with ability to computer-operating mode | | | | |

FIG. 171A

| | | | | | | | |
|---|---|---|---|---|---|---|---|
| 11 | Hardware | Kitchen Module | Appliances | | | | |
| 12 | Hardware | Kitchen Module | Automatic Storage device with ability to computer-operating mode | | | | |
| 13 | Hardware | Kitchen Module | Automatic modular dispenser for flowing, liquid ingredients and water with ability to computer-operating mode | | | | |
| | Hardware | Kitchen Module | Freshness ingredients analytical device | | | | |
| | Hardware | Kitchen Module | Built-in electronic scales (in the tabletop) with ability to computer-operating mode | | | | |
| 14 | Hardware | Kitchen Module | Cleaning | | | | |
| 15 | Hardware | Kitchen Module | Waste Disposal | | | | |
| | Hardware | Kitchen Module | Multi-functional professional steam-oven with ability to computer-operating mode | | | | |
| | Hardware | Kitchen Module | Multi-functional professional kitchen processor with ability to computer-operating mode | | | | |
| | Hardware | Kitchen Module | Top-loaded dishwasher with ability to computer-operating mode | | | | |
| | Hardware | Kitchen Module | Professional Stove with turning control regulators/buttons operated with ability to computer-operating mode | | | | |
| | Hardware | Kitchen Module | Standard dimension layout | | | | |
| | Hardware | Kitchen Module | Anti-wieting, smoke, steam ventilation system autonomous or be connected to the duct with ability to computer-operating mode | | | | |
| | Hardware | Kitchen Module | Kitchen sink with tap with ability to computer-operating mode | | | | |

FIG. 171B

| | | | | | | | |
|---|---|---|---|---|---|---|---|
| 16 | Hardware | Control/Power Modules | CPU | | | | |
| 17 | Hardware | Control/Power Modules | I/O Touchscreen | | | | |
| 18 | Hardware | Control/Power Modules | Power Supply | | | | |
| 19 | Hardware | Accessories | Utensils | | | | |
| 20 | Hardware | Accessories | Food Containers/Cartridges | | | | |
| 21 | Software | Robot Module | OS | | | | |
| | Hardware | Kitchen Module | Professional Stove with turning control regulators/buttons operated with ability to computer-operating mode | | | | |
| 21 | Software | Robot Module | OS | | | | |
| 22 | Software | Robot Module | Apps | | | | |
| 23 | Software | Robot Module | hand firmware | | | | |
| 24 | Software | Robot Module | Arm firmware | | | | |
| 25 | Software | Robot Module | Rail Control | | | | |
| 26 | Software | Capture/Training | OS | | | | |
| 27 | Software | Capture/Training | apps | | | | |
| 28 | Software | Capture/Training | Vision | | | | |
| 29 | Software | Capture/Training | Data Input | | | | |
| 30 | Software | Capture/Training | Editing System | | | | |
| 31 | Software | Kitchen Module | OS | | | | |
| 32 | Software | Kitchen Module | App | | | | |

FIG. 171C

| | | | | | | | |
|---|---|---|---|---|---|---|---|
| 33 | Software | Kitchen Module | Controller Protection/Safety | | | | |
| 34 | Software | Kitchen Module | Controller, Appliances | | | | |
| 35 | Software | Kitchen Module | Controller, Storage | | | | |
| 36 | Software | Kitchen Module | Controller, Cleaning | | | | |
| 36 | Software | Kitchen Module | Controller, Steam-oven | | | | |
| 36 | Software | Kitchen Module | Controller, Kitchen Processor | | | | |
| 36 | Software | Kitchen Module | Controller, Dishwasher | | | | |
| 36 | Software | Kitchen Module | Controller, Stove | | | | |
| 36 | Software | Kitchen Module | Controller, Ventilation system | | | | |
| 36 | Software | Kitchen Module | Controller, Lighting | | | | |
| 37 | Software | Kitchen Module | Controller, Waste | | | | |
| 37 | Software | Kitchen Module | Controller, Tap | | | | |
| 37 | Software | Kitchen Module | Controller, Dispensing device | | | | |
| 37 | Software | Kitchen Module | Controller, Scales | | | | |
| 37 | Software | Kitchen Module | Controller, Freshness Indicator | | | | |
| 38 | Software | Control/ Power Modules | OS | | | | |
| 39 | Software | Control/ Power Modules | I/O Touchscreen | | | | |
| 40 | Software | Control/ Power Modules | Control Apps | | | | |
| 41 | Other | Food | Food Recipe Development | | | | |
| 42 | Other | Food | Food Container Prep | | | | |
| 43 | Other | Food | Food Order/Delivery | | | | |
| 44 | Other | Logistics | Safety/Regulatory | | | | |
| 45 | Other | Logistics | Sales/Distribution | | | | |

FIG. 171D

| | | | | | | | |
|---|---|---|---|---|---|---|---|
| 46 | Other | Logistics | Installation/Maintenance | | | | |
| 47 | Other | Logistics | Packaging/Shipping Container | | | | |
| 48 | Other | Logistics | Return Management | | | | |
| 49 | Other | Logistics | Technical Training | | | | |
| 50 | Other | Logistics | Manuals | | | | |
| 51 | Other | Logistics | Warranty | | | | |
| 52 | Production | Robot | | | | | |
| 53 | Production | Kitchen Module | | | | | |
| 54 | Production | Integration / Shipping | | | | | |
| 55 | Production | | | | | | |
| 56 | Production | | | | | | |
| 57 | Production | | | | | | |
| 58 | Production | | | | | | |
| 59 | Production | | | | | | |
| 60 | Production | | | | | | |

FIG. 171E

| Types of functional results: | Functional result | minimanipulations | Parameters (variables) |
|---|---|---|---|
| | Robot making sushi | | |
| | | Taking exact amount of rice from container | 1.XYZ position and orientation of container with rice<br>2. Position rice in the container (temporary library non-standardized objects)<br>3.Amount of rice you need to take, according Creator captured or entered information<br>4.Time of starting, according Creator timeline<br>5. Time of ending, according Creator timeline |
| | | Making sufficient for sushi piece of rice by pressing out by fingers | 1.Size of piece according initial size made by Creator<br>2.Shape of piece according initial size made by Creator<br>3.Position XYZ and orientation where we need to place it<br>4. Fingers pressure to making piece of rice according Creator initial pressure<br>5.Time of starting, according Creator timeline<br>6. Time of ending, according Creator timeline |
| | | Take the whole piece of fish filet from container | 1.XYZ position and orientation of container with fish filet<br>2. Shape of fish filet (temporary non-standardized object library)in container<br>3. Size of fish filet (temporary non-standardized object library) in container.<br>4. XYZ position and orientation of fish filet in container.<br>5. XYZ position and orientation, where we need to put the fish filet<br>6.Time of starting, according Creator timeline<br>7. Time of ending, according Creator timeline |
| | | Cut sufficient for sushi piece of fish by knife of by special device. | 2. Shape of fish filet (temporary non-standardized object library)<br>3. Size of fish filet (temporary non-standardized object library)<br>4. XYZ position and orientation of fish filet on operating place.<br>5.defined by initial Creator cooking thickness of current required piece<br>6. cutting angle, taking from initial Creator cooking process<br>7.Time of starting, according Creator timeline<br>8. Time of ending, according Creator timeline |

FIG. 172A

| | | | |
|---|---|---|---|
| | | Put exact amount of wasabi on the top of piece of rice | 1.XYZ position and orientation of container with pre-measured wasabi pieces<br>2. XYZ position and orientation of targeted wasabi piece (temporary non-standardized object library).<br>3. XYZ position where we need to put the wasabi piece according the shape of piece of rice and Creator place choice<br>3. Pressure of pushing wasabi in piece of rice according Creator initial pressure<br>4.Time of starting, according Creator timeline<br>5. Time of ending, according Creator timeline |
| | | Put piece of fish on the top of piece of rice in sufficient way | 1.XYZ position and orientation of catted piece of fish<br>2. XYZ position and orientation of prepared piece of rice<br>3. XYZ position and orientation where we need to place cut piece of fish<br>4.Time of starting, according Creator timeline<br>5. Time of ending, according Creator timeline |
| | | Press out the sushi by fingers | 1.XYZ position and orientation of piece of rice with fish on the top<br>2. Pressure of pinch according of Creator initial pinch<br>3.Time of starting, according Creator timeline<br>4. Time of ending, according Creator timeline |
| | Robot playing piano musical composition | | |
| | | Successfully press keys according playing technique 1... n by right hand | 1.Time each finger pressing starting and ending period<br>2. Define the number of pressing techniques<br>3.Assign each finger to exact key number |
| | | Successfully press keys according playing technique 1... n by left hand | 1.Time each finger pressing starting and ending period<br>2. Define the number of pressing techniques<br>3.Assign each finger to exact key number |
| | | Successfully press pedal piano by feet | 1.Time each feet pressing starting and ending period<br>2. The number of pressing techniques<br>3. Assigning each feet to sufficient pedal |
| | | Moving the body according Creator motion | 1.XYZ initial body position<br>2. XYZ ending body position<br>3. Time of starting motion<br>4. Time of ending motion |

FIG. 172B

| | | | |
|---|---|---|---|
| | Robot moving by walking from A-position to B-position. | Making walking step by right leg | 1.Speed (starting and ending time)<br>2.XYZ initial and target position<br>3. Height of leg raising depends of any barriers on the way<br>4. Type of stepping technique |
| | | Making walking step by left leg | 1.Speed (starting and ending time)<br>2.XYZ initial and target position<br>3. Height of leg raising depends of any barriers on the way<br>4. Type of stepping technique |
| | Robot moving by running from A to B position | Making running step by right leg | 1.Speed (starting and ending time)<br>2.XYZ initial and target position<br>3. Height of leg raising depends of any barriers on the way<br>4. Type of stepping technique |
| | | Making running step by left leg | 1.Speed (starting and ending time)<br>2.XYZ initial and target position<br>3. Height of leg raising depends of any barriers on the way<br>4. Type of stepping technique |
| | Robot jumping from A to B position | | |
| | Robot taking particular book from shelf | | |
| | Robot bringing bag form A position to B position | | |
| | Robot opening the jar | | |
| | Putting food in a bowl for a cat | | |

FIG. 172C

Manipulation – REGULAR

| Manipulation | 1st level | 2nd level |
|---|---|---|
| Measurement | | |
| | Measurement of body temperature | |
| | | Basal body temperature (observable entity) |
| | | Breast temperature (observable entity) |
| | | Axillary temperature (observable entity) |
| | | Bladder temperature (observable entity) |
| | | Groin temperature (observable entity) |
| | | Nasopharyngeal temperature (observable entity) |
| | | Oral temperature (observable entity) |
| | | Rectal temperature (observable entity) |
| | | Temperature of esophagus (observable entity) |
| | | Temperature of vagina (observable entity) |
| | | Tympanic temperature (observable entity) |
| | | Joint temperature (observable entity) |
| | | Temperature of digit (observable entity) |
| | | Temperature of pinna (observable entity) |
| | | Temperature of skin (observable entity) |
| | Measurement of Blood pressure | |
| | Measurement of heart rate | |
| | Measurement of respiratory rate | |
| | Measurements of a body | |
| | | Growth |
| | | Weight |
| | | head circumference |
| | | chest circumference |
| | | hip circumference |
| Lavage | | |
| | Gastric lavage | |
| | | Gastric lavage with instillation of therapeutic substance |
| | | Gastric lavage with water |
| | | Nasogastric irrigation |
| | Irrigation of bowel | |
| | Irrigation of bowel | |
| | Irrigation of colon | |
| | Irrigation of colon via cecostomy tube | |
| | Rectal irrigation | |
| | Rectal stump washout via rectum | |
| | Rectal stump washout via stoma | |
| | Irrigation of gastrostomy | |

FIG. 173A

| | | | |
|---|---|---|---|
| | Irrigation of nasoenteral probe | | |
| | Irrigation of nasogastrall probe | | |
| | Irrigation of ear | | |
| | | Syringing ear to remove wax | |
| | Irrigation of eye | | |
| | Irrigation of nasal passages | | |
| | | Displacement therapy of nose, Proetz type | |
| | | Irrigation of nasal sinus | |
| | | Aspiration and lavage of nasal sinus by puncture | |
| | | Displacement therapy of nose, Proetz type | |
| | | Irrigation by cannulation of sphenoid sinus | |
| | | Irrigation of maxillary antrum | |
| | | Irrigation by cannulation of maxillary sinus | |
| | | Nasal sinus puncture and irrigation | |
| | pharynx Irrigation | | |
| | Irrigation of ureteral catheter | | |
| | | Irrigation of indwelling urinary catheter | |
| | Irrigation of ureterostomy and ureteral catheter | | |
| | Irrigation of ureterostomy | | |
| | Irrigation of ureterostomy and ureteral catheter | | |
| | Irrigation of urethra | | |
| | Irrigation of urinary bladder | | |
| | Irrigation of cystostomy | | |
| | Manual bladder washout through catheter | | |
| | Urethral irrigation of bladder | | |
| | Stoma irrigation | | |
| | Irrigation of enterostomy | | |
| Supplemental oxygen | | | |
| Maintenance of body temperature | | | |
| | Active rewarming of the hypothermic patient | | |
| | Cooling - control body temperature | | |
| Catheterization | | | |
| | Catheterization of nasal sinus | | |
| | Catheterization of ureter | | |
| | | Cystoscopic catheterization of ureter | |
| | | Cystostomy with insertion of ureteral catheter | |
| | | Retrograde catheterization of ureter | |
| | Catheterization of urinary bladder | | |
| | | Bladder catheter - diagnostic | |
| | | Urethral catheterization for urodynamics | |
| | | Catheterization of bladder by indwelling suprapubic catheter | |
| | | Complicated catheterization of bladder | |
| | | Cystostomy and insertion of suprapubic catheter | |

FIG. 173B

| | | |
|---|---|---|
| | | Insertion of indwelling catheter into urinary bladder |
| | | Insertion of suprapubic catheter using ultrasound guidance |
| | | Residual catheterization |
| | Insertion of catheter into esophagus, permanent tube type | |
| | Insertion of chronic ambulatory peritoneal dialysis catheter | |
| | | Insertion of dialysis catheter using doppler ultrasound guidance |
| | Insertion of nontunneled hemodialysis catheter | |
| | Insertion of urethral catheter | |
| | | Insertion of indwelling urethral catheter |
| | | Insertion of urethral catheter using guide wire |
| | | Intermittent urethral catheterization |
| | | Clean intermittent self-catheterization |
| | | Urethral catheterization for urodynamics |
| | Insertion of vascular catheter | |
| | Catheterization of vein | |
| | Catheterization of brachial vein | |
| | Catheterization of neck vein | |
| | Jugular vein catheterization | |
| | Catheterization of external jugular vein | |
| | Catheterization of subclavian vein | |
| | Catheterization of vein of lower limb | |
| | Catheterization of vein of upper limb | |
| | Central venous cannula insertion | |
| | Central venous cannula insertion via antecubital fossa vein | |
| | Central venous cannula insertion via axillary vein | |
| | Central venous cannula insertion via femoral vein | |
| | Central venous cannula insertion via jugular vein | |
| | Central venous cannula insertion via external jugular vein | |
| | Central venous cannula insertion via long saphenous vein | |
| | Central venous cannula insertion via subclavian vein | |
| | Insertion of subclavian feeding line | |
| | Central venous cannula insertion via umbilical vein | |
| | Insertion of catheter for central venous pressure monitoring | |
| | Insertion of central venous catheter using doppler ultrasound guidance | |
| | Insertion of cuffed central venous catheter | |
| | Insertion of nontunneled central venous catheter | |
| | Insertion of peripherally inserted central catheter | |
| | Insertion of peripherally inserted central catheter using fluoroscopic guidance | |
| | Percutaneous transluminal insertion of peripherally inserted central catheter | |
| | Insertion of tunneled venous catheter | |
| | Reinsertion of tunneled central venous catheter | |
| | Insertion of catheter with venous sampling | |
| | Bilateral insertion of catheter with bilateral venous sampling | |
| | Intravenous insertion | |

FIG. 173C

| | | |
|---|---|---|
| | Venous catheterization for renal dialysis | |
| | Insertion of catheter into artery | |
| | Introduction of catheter, retrograde, brachial artery | |
| | Introduction of catheter into carotid artery | |
| | Umbilical artery cannula insertion | |
| | Adjustment of chronic ambulatory peritoneal dialysis catheter | |
| | Aspiration of chronic ambulatory peritoneal dialysis catheter | |
| | Flushing of chronic ambulatory peritoneal dialysis catheter | |
| | Insertion of chronic ambulatory peritoneal dialysis catheter | |
| | Removal of chronic ambulatory peritoneal dialysis catheter | |
| | Renewal of chronic ambulatory peritoneal dialysis catheter | |
| | Insertion of peritoneal dialysis catheter using fluoroscopy guidance | |
| | Insertion of temporary peritoneal dialysis catheter | |
| | Laparoscopic insertion of peritoneal dialysis catheter | |
| | Peritoneal dialysis catheter procedure using fluoroscopic guidance | |
| | Removal of peritoneal dialysis catheter | |
| | Removal of chronic ambulatory peritoneal dialysis catheter | |
| | Replacement of peritoneal dialysis catheter | |
| | Renewal of chronic ambulatory peritoneal dialysis catheter | |
| | Shaving of peritoneal dialysis catheter cuff | |
| | Repositioning of Tenckhoff catheter | |
| | Venous catheter care | |
| | | Care of central venous catheter |
| | | Care of tunneled central venous catheter |

Physiotherapy

| | | |
|---|---|---|
| | massage | |
| | passive mobilization | |
| | | Continuous passive mobilization of ankle |
| | | Continuous passive mobilization of elbow |
| | | Continuous passive mobilization of fingers |
| | | Continuous passive mobilization of hip |
| | | Continuous passive mobilization of knee |
| | | Continuous passive mobilization of shoulder |
| | | Continuous passive mobilization of wrist |
| | Exercises for paralysis | |
| | Exercises for rigidity | |
| | Exercises for spasticity | |
| | Physical exercises | |
| | | Active exercise |
| | | Assisting exercise |
| | | Muscle strength exercise |
| | | Relaxation exercise |
| | Physical medicine ultrasound treatment | |

FIG. 173D

| | | |
|---|---|---|
| | Physical rehabilitation therapy procedure | |
| | | Care of stump technique |
| | | Control of phantom sensation technique |
| | | Protection of stump technique |
| | | Cerebral palsy rehabilitation |
| | | Doffing lower limb prosthesis practice |
| | | Donning lower limb prosthesis practice |
| | | Functional rehabilitation |
| | | Gait evaluation |
| | | Locomotor training |
| | | Transfers with patient participation |
| | | Lower limb amputee transfer practice |
| | | Wheelchair transfer practice |
| | | Walking practice |
| | | Walking with patient - mobilization |
| | | Weight transfer practice |
| | | Joint disease rehabilitation |
| | | Physical medicine initial examination and planning for rehabilitation program |
| | | Sensorimotor techniques |
| | | Biomechanical therapeutic activity |
| | | Biomechanical remedial activity |
| | | Body mechanics promotion |
| | | Range of motion activity |
| | | Lower limb activities |
| | | Range of motion exercise |
| | | Upper limb activities |
| | | Motor retraining technique |
| | | Neurodevelopmental techniques |
| | | Developmental therapy |
| | | Movement facilitation |
| | | Activity for ontogenetic motor pattern |
| | | Kinetic activities for coordination |
| | | Kinetic activities for range of motion |
| | | Kinetic activities for strengthening |
| | | Movement experience |
| | | Neurological functional rehabilitation |
| | | Neuromuscular stimulation |

FIG. 173E

| | | |
|---|---|---|
| | | Reciprocal arm movements |
| | | Reflex inhibition |
| | | Reflex inhibiting patterning |
| | | Reflex inhibiting posture |
| | | Rhythmic stabilization |
| | | Rhythmical bouncing |
| | | Trunk elongation |
| | | Weight transference - neurological |
| | | Weight-bearing - neurological |
| | | Weight-bearing through affected side |
| | | Play therapy |
| | | Competitive games psychotherapy |
| | | Group trust experience games |
| | | Minor group games for therapy |
| | | Minor team games for therapy |
| | | Pair activity games for therapy |
| | | Relay games for therapy |
| | | Team games for therapy |
| hygienic procedures | | |
| | Assisting with mouthcare | |
| | Assisting with personal grooming | |
| | Assistance with shaving | |
| | Assisting with haircare | |
| | Assistance with hair styling | |
| | Assistance with washing hair | |
| | Assisting with nail care | |
| | Self-care assistance: bathing/hygiene | |
| | Assisting with toileting | |
| | | Give bedpan, remove and clean |
| | | Give urinal, remove and clean |
| | | Placing a patient on a bedpan |

FIG. 173F

| | |
|---|---|
| | Rectal tube insertion |
| feeding | |
| | Bottle feeding of patient |
| | Fluid intake encouragement |
| | Food intake encouragement |
| | Forced feeding of patient |
| | Intravenous feeding of patient |
| | Parenteral alimentation procedure |
| | Central line feeding |
| | Prolonged intravenous feeding |
| | Peripheral line feeding |
| | Total parenteral nutrition |
| | Mealtime assistance |
| | Nil by mouth |
| | Re-introduction of fiber |
| | Routine feeding of patient |
| | Self-care assistance: feeding |
| Sampling for analyses | |
| | blood sampling |
| | urine sampling |
| | scraping |
| | stool sampling |
| | smear sampling |
| Care of stoma and catheters | |
| | Assessment of stoma self care |
| | Assessment of cathether self care |
| Care of a wound | |
| | Application of pressure to wound |
| | Change of wound pack |
| | Chemical cauterization of wound |
| | Cleaning wound |
| | Dressing of wound |

FIG. 173G

| | | |
|---|---|---|
| | Exploration of wound | |
| | Gluing of wound | |
| | Glue closure of skin wound | |
| | Immobilization of wound | |
| | Irrigation of wound | |
| | Closure of skin wound by tape | |
| | Shave debridement of skin wound | |
| | Wound care | |
| | | Closed drainage wound care |
| | | Post-surgical wound care |
| | | Special care of wound |
| | | Wound infiltration |
| | | Wound infiltration of local anesthetic |
| Methods of administering drugs | | |
| | Oral | |
| | parenterally (injections) | |
| | | Subcutaneously |
| | | Intramuscularly |
| | | intra-arterial |
| | | intravenously (dropper) |
| | | intravenously (bolus) |
| | inhaler (or puffer) | |
| | per rectum | |
| | vaginal (pessary) | |
| | sublingual | |
| | intra-nasal | |
| | eye drops | |
| | ear drops | |
| | topical skin cream | |
| | nebuliser | |
| | Installation of dropper | |

FIG. 173H

| | | |
|---|---|---|
| | | arm |
| | | leg |
| | | subclavicular vein |
| | intramuscular injection execution | |
| | | buttock |
| | | thigh |
| | | arm |
| | | other |
| | subcutaneous injection execution | |
| | | shoulder |
| | | thigh |
| | | subscapular |
| | | abdomen |
| | "per os" drug administration | |
| | ointment applying | |
| | Eye drops instillation | |
| | | eye |
| | | ear |
| | general anaesthetic | |
| | local anaesthetic | |
| | regional block | |
| | nerve block | |
| | entonox | |
| | sedation | |

FIG. 173I

Manipulation – EMERGENCY

| Manipulation | 1st level | 2nd level |
|---|---|---|
| Intubation | | |
| Resuscitation/cardiopulmonary resuscitation | | |
| | Cardiac reanimation | |
| | Chest compressions | |
| | Defibrillation/pacing | |
| | | - defibrillation |
| | | - external pacing |
| | Artificial respiration | |
| | Artificial respiration | |
| | Continuous positive airways pressure/nasal intermittent positive pressure ventilation/bag valve mask | |
| | Nasal airway | |
| | Oral airway | |
| replenishment of blood loss | | |
| | blood transfusion | |
| | Transfusion of blood components | |
| | Saline infusion | |
| Hemostasis | | |
| | Rainey clips | |
| | Tourniquet | |
| | Bandage | |
| | injection hemostasis | |
| | Suture | |
| Emergency manipulation on trachea | | |
| | Tracheostomy | |
| | cricothyrotomy | |
| Fracture of bone | | |
| | Immobilization | |
| | Splinting | |
| | Fracture review | |
| | Joint aspiration | |
| | Plaster of Paris | |
| | | application Plaster of Paris |
| | | removal Plaster of Paris |
| Wound closure (excluding sutures) | | |
| | Steri-Strips | |
| | wound glue | |
| | other (e.g. clips) | |

FIG. 174

Equipment List

| | | |
|---|---|---|
| Equipment | | |
| | CPAP / BIPAP | |
| | | Chin Restraint |
| | | CPAP water chambers |
| | | CPAP humidifiers |
| | | CPAP mask pads |
| | Oxygen Concentrator | |
| | | Oxygen Cylinders |
| | Compressor Nebulizer System | |
| | Willchair | |
| | Apnea Monitors | |
| | Ventilators | |
| | Monitor | |
| | defibrillator | |
| | pulseoxymeter | |
| | Ambu's bag | |
| | tonometer | |
| | thermometer | |
| | irrigator | |
| Expendables | | |
| | Test tubes | |
| | Syringes | |
| | Catheter urethral | |
| | nteric feeding tube | |
| | Bed Pan | |
| | Tube rectal | |
| | Infusional system | |
| | Needle | |
| | Catheter intravenous | |
| | urinal | |
| | ostomy pouching system | |
| | Catheter aspiration | |
| | Tube for an intubation | |
| | bandage | |
| | plait | |
| | dressing | |
| Medication | | |
| | morphine | |
| | adrenaline | |
| | atropine | |
| | physical solution | |

FIG. 175

Nursery Service - Manipulation Guide

| Manipulation | minimanipulations |
|---|---|
| Intramuscular injection (in the buttock) | |
| -Preparation for manipulation: | |
| | 1. нelp the patient to adopt the necessary position. |
| | 2. remove the clothing at the injection site |
| | 3. treat your hands with untiseptic solution |
| -Guidelines | |
| | 1. Define a place (XYZ coordinates and shape) of insertion of a needle |
| | 2. Treat the place by untiseptic from the center to the periphery (or from bottom to up) a large area of skin |
| | 3. Treat by untiseptic the puncture site |
| | 4. Open the steril syringe pack |
| | 5. Wipe by untiseptic the top of the ampule or vial. |
| | 6. Open the ampule or vial. |
| | 7. Take the necessary amount of drug into the syringe |
| | 8. Take the syringe in a right hand |
| | 9. Shift the skin using the left hand over the injection site |
| | 10. Insert a needle with exact power into the muscle at 90 degrees to a predetermined depth. |
| | 11. Move your left robotic hand on the plunger and push gently (inject the drug into a muscle). |
| | 12. Press the antiseptic wipes to the injection site and quickly withdraw the needle. |
| | 13. Discard syringe and materials to the waste container |
| Intravenous injection - jet injection (subcutaneous veins of the anterior surface of the forearm and elbow) | |
| -Preparation for manipulation: | |
| | 1. нelp the patient to adopt the necessary position. |
| | 2. remove the clothing at the injection site |
| | 3. treat the robotics hands with antiseptic |
| -Guidelines | |
| | 1. Open the steril syringe pack |
| | 2. Wipe by untiseptic the top of the ampule or vial. |
| | 3. Open the ampule or vial. |
| | 4. Take the necessary amount of drug into the syringe |
| | 5. Put on the gloves on the robotic hands |
| | 6. Apply venous tourniquet on the middle third of the shoulder through the disposable diaper or napkin (or clothes). |
| | 7. Ask the patient to stretch and relax the fist for a few times. |
| | 8. Find and palpate the most accessible and filled vein (select vein for injection). |
| | 9. Treat from the center to the periphery (or from bottom to up) a large area of skin with the first ball, |
| | 10. Ask the patient to make a fist |

FIG. 176A

| | |
|---|---|
| | 11. Treat the injection site with the antiseptic wipes |
| | 12.Shift the elbow skin (using the left thumb), fixing the vein |
| | 13.Take the syringe in the right hand, holding the index finger on the cannula needle, place the needle parallelly to the surface, gently (with power X) pierce the skin and vein (simultaneously or successively) and slide 1/3 length of the needle to feel the "falling into the void", or the appearance of blood in the cannula and the syringe barrel; |
| | 14.Pull the plunger and ensure that the blood appeared in the syringe barrel; |
| | 15.Untie the tourniquet by pulling one of the ends. |
| | 16. Ask the patient to unclench his fist. |
| | 17. Pull the plunger to check the needle contact with a vein. |
| | 18. Gently push the plunger (Inject the drug), without changing the position of the syringe |
| | 19.Apply the antiseptic wipes to the injection site and remove the needle from the vein |
| | 20.Ask the patient to bend the arm, leaving the ball at the puncture site to stop bleeding |
| | 21. Discard syringe and materials to the waste container |
| Defibrillation | |
| -Equipment: | |
| | Defibrillator |
| -Guidelines | |
| | 1. Place the patient on his back on a surface |
| | 2. Open the chest surface |
| | 3. Prepare the chest surface to the attachment of the electrodes |
| | 4. Turn on the power. |
| | 5. Place the first electrode over an area of cardiac dullness (women - outwards from the apex of the heart, beyond the breast) |
| | 6. Place the second electrode under the right clavicle (at the right edge of the sternum directly below the clavicle), and if it is the dorsal electrode, then under the left scapula. |
| | 7. Do not touch the patient and equipment |
| | 8. Wait for completion of the ECG and the information about the need to discharge |
| | 9. Determine the readiness of equipment for electric discharge |
| | 10. Do not touch the patient |
| | 11. Push on "discharge" button after the defibrillator is ready |
| | 12. Open the chest surface |

FIG. 176B

Equipment List

| | | |
|---|---|---|
| Equipment | | |
| | CPAP / BIPAP | |
| | | Chin Restraint |
| | | CPAP water chambers |
| | | CPAP humidifiers |
| | | CPAP mask pads |
| | Oxygen Concentrator | |
| | | Oxygen Cylinders |
| | Compressor Nebulizer System | |
| | Willchair | |
| | Apnea Monitors | |
| | Ventilators | |
| | Monitor | |
| | defibrillator | |
| | pulseoxymeter | |
| | Ambu's bag | |
| | tonometer | |
| | thermometer | |
| | irrigator | |
| Expendables | | |
| | Test tubes | |
| | Syringes | |
| | Catheter urethral | |
| | nteric feeding tube | |
| | Bed Pan | |
| | Tube rectal | |
| | Infusional system | |
| | Needle | |
| | Catheter intravenous | |
| | urinal | |
| | ostomy pouching system | |
| | Catheter aspiration | |
| | Tube for an intubation | |
| | bandage | |
| | plait | |
| | dressing | |
| Medication | | |
| | morphine | |
| | adrenaline | |
| | atropine | |
| | physical solution | |

FIG. 177

ROBOTIC END EFFECTOR INTERFACE SYSTEMS

CROSS REFERENCE TO RELATED APPLICATIONS

This application is a continuation of a continuation-in-part U.S. patent application Ser. No. 14/829,579 entitled "Robotic Manipulation Methods and Systems for Executing a Domain-Specific Application in an Instrumented Environment with Electronic Minimanipulation Libraries," filed on 18 Aug. 2015, which is the continuation-in-part application of co-pending U.S. patent application Ser. No. 14/627,900 entitled "Methods and Systems for Food Preparation in a Robotic Cooking Kitchen," filed 20 Feb. 2015.

The continuation-in-part application claims priority to U.S. Provisional Application Ser. No. 62/202,030 entitled "Robotic Manipulation Methods and Systems Based on Electronic Mini-Manipulation Libraries," filed 6 Aug. 2015, U.S. Provisional Application Ser. No. 62/189,670 entitled "Robotic Manipulation Methods and Systems Based on Electronic Minimanipulation Libraries," filed 7 Jul. 2015, U.S. Provisional Application Ser. No. 62/166,879 entitled "Robotic Manipulation Methods and Systems Based on Electronic Minimanipulation Libraries," filed 27 May 2015, U.S. Provisional Application Ser. No. 62/161,125 entitled "Robotic Manipulation Methods and Systems Based on Electronic Minimanipulation Libraries," filed 13 May 2015, U.S. Provisional Application Ser. No. 62/146,367 entitled "Robotic Manipulation Methods and Systems Based on Electronic Minimanipulation Libraries," filed 12 Apr. 2015, U.S. Provisional Application Ser. No. 62/116,563 entitled "Method and System for Food Preparation in a Robotic Cooking Kitchen," filed 16 Feb. 2015, U.S. Provisional Application Ser. No. 62/113,516 entitled "Method and System for Food Preparation in a Robotic Cooking Kitchen," filed 8 Feb. 2015, U.S. Provisional Application Ser. No. 62/109,051 entitled "Method and System for Food Preparation in a Robotic Cooking Kitchen," filed 28 Jan. 2015, U.S. Provisional Application Ser. No. 62/104,680 entitled "Method and System for Robotic Cooking Kitchen," filed 16 Jan. 2015, U.S. Provisional Application Ser. No. 62/090,310 entitled "Method and System for Robotic Cooking Kitchen," filed 10 Dec. 2014, U.S. Provisional Application Ser. No. 62/083,195 entitled "Method and System for Robotic Cooking Kitchen," filed 22 Nov. 2014, U.S. Provisional Application Ser. No. 62/073,846 entitled "Method and System for Robotic Cooking Kitchen," filed 31 Oct. 2014, U.S. Provisional Application Ser. 62/055,799 entitled "Method and System for Robotic Cooking Kitchen," filed 26 Sep. 2014, U.S. Provisional Application Ser. No. 62/044,677, entitled "Method and System for Robotic Cooking Kitchen," filed 2 Sep. 2014.

The U.S. patent application Ser. No. 14/627,900 claims priority to U.S. Provisional Application Ser. No. 62/116,563 entitled "Method and System for Food Preparation in a Robotic Cooking Kitchen," filed 16 Feb. 2015, U.S. Provisional Application Ser. No. 62/113,516 entitled "Method and System for Food Preparation in a Robotic Cooking Kitchen," filed 8 Feb. 2015, U.S. Provisional Application Ser. No. 62/109,051 entitled "Method and System for Food Preparation in a Robotic Cooking Kitchen," filed 28 Jan. 2015, U.S. Provisional Application Ser. No. 62/104,680 entitled "Method and System for Robotic Cooking Kitchen," filed 16 Jan. 2015, U.S. Provisional Application Ser. No. 62/090,310 entitled "Method and System for Robotic Cooking Kitchen," filed 10 Dec. 2014, U.S. Provisional Application Ser. No. 62/083,195 entitled "Method and System for Robotic Cooking Kitchen," filed 22 Nov. 2014, U.S. Provisional Application Ser. No. 62/073,846 entitled "Method and System for Robotic Cooking Kitchen," filed 31 Oct. 2014, U.S. Provisional Application Ser. 62/055,799 entitled "Method and System for Robotic Cooking Kitchen," filed 26 Sep. 2014, U.S. Provisional Application Ser. No. 62/044,677, entitled "Method and System for Robotic Cooking Kitchen," filed 2 Sep. 2014, U.S. Provisional Application Ser. No. 62/024,948 entitled "Method and System for Robotic Cooking Kitchen," filed 15 Jul. 2014, U.S. Provisional Application Ser. No. 62/013,691 entitled "Method and System for Robotic Cooking Kitchen," filed 18 Jun. 2014, U.S. Provisional Application Ser. No. 62/013,502 entitled "Method and System for Robotic Cooking Kitchen," filed 17 Jun. 2014, U.S. Provisional Application Ser. No. 62/013,190 entitled "Method and System for Robotic Cooking Kitchen," filed 17 Jun. 2014, U.S. Provisional Application Ser. No. 61/990,431 entitled "Method and System for Robotic Cooking Kitchen," filed 8 May 2014, U.S. Provisional Application Ser. No. 61/987,406 entitled "Method and System for Robotic Cooking Kitchen," filed 1 May 2014, U.S. Provisional Application Ser. No. 61/953,930 entitled "Method and System for Robotic Cooking Kitchen," filed 16 Mar. 2014, and U.S. Provisional Application Ser. No. 61/942,559 entitled "Method and System for Robotic Cooking Kitchen," filed 20 Feb. 2014.

The subject matter of all of the foregoing disclosures is incorporated herein by reference in their entireties.

BACKGROUND

Technical Field

The present disclosure relates generally to the interdisciplinary fields of robotics and artificial intelligence (AI), more particularly to computerized robotic systems employing electronic libraries of minimanipulations with transformed robotic instructions for replicating movements, processes, and techniques with real-time electronic adjustments.

Background Art

Research and development in robotics have been undertaken for decades, but the progress has been mostly in the heavy industrial applications like automobile manufacturing automation or military applications. Simple robotics systems have been designed for the consumer markets, but they have not seen a wide application in the home-consumer robotics space, thus far. With advances in technology, combined with a population with higher incomes, the market may be ripe to create opportunities for technological advances to improve people's lives. Robotics has continued to improve automation technology with enhanced artificial intelligence and emulation of human skills and tasks in many forms in operating a robotic apparatus or a humanoid.

The notion of robots replacing humans in certain areas and executing tasks that humans would typically perform is an ideology in continuous evolution since robots were first developed in the 1970s. Manufacturing sectors have long used robots in teach-playback mode, where the robot is taught, via pendant or offline fixed-trajectory generation and download, which motions to copy continuously and without alteration or deviation. Companies have taken the pre-programmed trajectory-execution of computer-taught trajectories and robot motion-playback into such application domains as mixing drinks, welding or painting cars, and others. However, all of these conventional applications use a 1:1 computer-to-robot or tech-playback principle that is intended to have only the robot faithfully execute the motion-commands, which is usually following a taught/pre-computed trajectory without deviation.

SUMMARY OF THE DISCLOSURE

Embodiments of the present disclosure are directed to methods, computer program products, and computer systems of a robotic apparatus with robotic instructions replicating a food dish with substantially the same result as if the chef had prepared the food dish. In a first embodiment, the robotic apparatus in a standardized robotic kitchen comprises two robotic arms and hands that replicate the precise movements of a chef in the same sequence (or substantially the same sequence). The two robotic arms and hands replicate the movements in the same timing (or substantially the same timing) to prepare a food dish based on a previously recorded software file (a recipe-script) of the chef's precise movements in preparing the same food dish. In a second embodiment, a computer-controlled cooking apparatus prepares a food dish based on a sensory-curve, such as temperature over time, which was previously recorded in a software file where the chef prepared the same food dish with the cooking apparatus with sensors for which a computer recorded the sensor values over time when the chef previously prepared the food dish on the cooking apparatus fitted with sensors. In a third embodiment, the kitchen apparatus comprises the robotic arms in the first embodiment and the cooking apparatus with sensors in the second embodiment to prepare a dish that combines both the robotic arms and one or more sensory curves, where the robotic arms are capable of quality-checking a food dish during the cooking process, for such characteristics as taste, smell, and appearance, allowing for any cooking adjustments to the preparation steps of the food dish. In a fourth embodiment, the kitchen apparatus comprises a food storage system with computer-controlled containers and container identifiers for storing and supplying ingredients for a user to prepare a food dish by following a chef's cooking instructions. In a fifth embodiment, a robotic cooking kitchen comprises a robot with arms and a kitchen apparatus in which the robot moves around the kitchen apparatus to prepare a food dish by emulating a chef's precise cooking movements, including possible real-time modifications/adaptations to the preparation process defined in the recipe-script.

A robotic cooking engine comprises detection, recording, and chef emulation cooking movements, controlling significant parameters, such as temperature and time, and processing the execution with designated appliances, equipment, and tools, thereby reproducing a gourmet dish that tastes identical to the same dish prepared by a chef and served at a specific and convenient time. In one embodiment, a robotic cooking engine provides robotic arms for replicating a chef's identical movements with the same ingredients and techniques to produce an identical tasting dish.

The underlying motivation of the present disclosure centers around humans being monitored with sensors during their natural execution of an activity, and then, being able to use monitoring-sensors, capturing-sensors, computers, and software to generate information and commands to replicate the human activity using one or more robotic and/or automated systems. While one can conceive of multiple such activities (e.g. cooking, painting, playing an instrument, etc.), one aspect of the present disclosure is directed to the cooking of a meal: in essence, a robotic meal preparation application. Monitoring a human chef is carried out in an instrumented application-specific setting (a standardized kitchen in this case), and involves using sensors and computers to watch, monitor, record, and interpret the motions and actions of the human chef, in order to develop a robot-executable set of commands robust to variations and changes in an environment that is capable of allowing a robotic or automated system in a robotic kitchen prepare the same dish to the standards and quality as the dish prepared by the human chef.

The use of multimodal sensing systems is the means by which the necessary raw data is collected. Sensors capable of collecting and providing such data include environment and geometrical sensors, such as two- (cameras, etc.) and three-dimensional (lasers, sonar, etc.) sensors, as well as human motion-capture systems (human-worn camera-targets, instrumented suits/exoskeletons, instrumented gloves, etc.), as well as instrumented (sensors) and powered (actuators) equipment used during recipe creation and execution (instrumented appliances, cooking-equipment, tools, ingredient dispensers, etc.). All this data is collected by one or more distributed/central computers and processed by a variety of software processes. The algorithms will process and abstract the data to the point that a human and a computer-controlled robotic kitchen can understand the activities, tasks, actions, equipment, ingredients and methods, and processes used by the human, including replication of key skills of a particular chef. The raw data is processed by one or more software abstraction engines to create a recipe-script that is both human-readable and, through further processing, machine-understandable and machine-executable, spelling out all actions and motions for all steps of a particular recipe that a robotic kitchen would have to execute. These commands range in complexity from controlling individual joints, to a particular joint-motion profile over time, to abstraction levels of commands, with lower-level motion-execution commands embedded therein, associated with specific steps in a recipe. Abstraction motion-commands (e.g. "crack an egg into the pan", "sear to a golden color on both sides", etc.) can be generated from the raw data, refined, and optimized through a multitude of iterative learning processes, carried out live and/or off-line, allowing the robotic kitchen systems to successfully deal with measurement-uncertainties, ingredient variations, etc., enabling complex (adaptive) minimanipulation motions using fingered-hands mounted to robot-arms and wrists, based on fairly abstraction/high-level commands (e.g. "grab the pot by the handle", "pour out the contents", "grab the spoon off the countertop and stir the soup", etc.).

The ability to create machine-executable command sequences, now contained within digital files capable of being shared/transmitted, allowing any robotic kitchen to execute them, opens up the option to execute the dish-preparation steps anywhere at any time. Hence, it allows the option to buy/sell recipes online, allowing users to access and distribute recipes on a per-use or subscription basis.

The replication of a dish prepared by a human is performed by a robotic kitchen, which is in essence a standardized replica of the instrumented kitchen used by the human chef during the creation of the dish, except that the human's actions are now carried out by a set of robotic arms and hands, computer-monitored and computer-controllable appliances, equipment, tools, dispensers, etc. The degree of dish-replication fidelity will thus be closely tied to the degree to which the robotic kitchen is a replica of the kitchen (and all its elements and ingredients), in which the human chef was observed while preparing the dish.

Broadly stated, a robotic end effector interface handle comprises a housing having a first end and a second end, the first end being on the opposite side of the second end, the housing having a shaped exterior surface between the first end and the second end, the first end having a physical portion that extends outward to serve as a first stopping reference point, the second end having a physical portion that extends outward to serve as a second stopping reference point, wherein a robotic hand grasps the exterior surface of the housing within the first and second ends in a predefined, pretested position and orientation, and wherein the robotic effector operates the housing that is attachable to a kitchen tool in the predefined, pretested position and orientation, the robotic end effector including a robotic hand.

A robotic platform, comprising one or more robotic arms, the one or more robotic arms including a first robotic arm; one or more end effectors, the one or more end effectors including a first end effector, the first end effector coupled to the first robotic arm; and one or more cooking tools, each cooking tool having a standardized handle; wherein the first end effector grasps and operates a first standardized handle in a first cooking tool in a predefined, pretested position and orientation, thereby avoiding misorientation. In another embodiment, a humanoid having a robot computer controller operated by robot operating system (ROS) with robotic instructions comprises a database having a plurality of electronic minimanipulation libraries, each electronic minimanipulation library including a plurality of minimanipulation elements. The plurality of electronic minimanipulation libraries can be combined to create one or more machine executable application-specific instruction sets, and the plurality of minimanipulation elements within an electronic minimanipulation library can be combined to create one or more machine executable application-specific instruction sets; a robotic structure having an upper body and a lower body connected to a head through an articulated neck, the upper body including torso, shoulder, arms, and hands; and a control system, communicatively coupled to the database, a sensory system, a sensor data interpretation system, a motion planner, and actuators and associated controllers, the control system executing application-specific instruction sets to operate the robotic structure.

In addition, embodiments of the present disclosure are directed to methods, computer program products, and computer systems of a robotic apparatus for executing robotic instructions from one or more libraries of minimanipulations. Two types of parameters, elemental parameters and application parameters, affect the operations of minimanipulations. During the creation phase of a minimanipulation, the elemental parameters provide the variables that test the various combinations, permutations, and the degrees of freedom to produce successful minimanipulations. During the execution phase of minimanipulations, application parameters are programmable or can be customized to tailor one or more libraries of minimanipulations to a particular application, such as food preparation, making sushi, playing piano, painting, picking up a book, and other types of applications.

Minimanipulations comprise a new way of creating a general programmable-by-example platform for humanoid robots. The state of the art largely requires explicit development of control software by expert programmers for each and every step of a robotic action or action sequence. The exception to the above are for very repetitive low level tasks, such as factory assembly, where the rudiments of learning-by-imitation are present. A minimanipulation library provides a large suite of higher-level sensing-and-execution sequences that are common building blocks for complex tasks, such as cooking, taking care of the infirm, or other tasks performed by the next generation of humanoid robots. More specifically, unlike the previous art, the present disclosure provides the following distinctive features. First, a potentially very large library of pre-defined/pre-learned sensing-and-action sequences called minimanipulations. Second, each mini-manipulation encodes preconditions required for the sensing-and-action sequences to produce successfully the desired functional results (i.e. the postconditions) with a well-defined probability of success (e.g. 100% or 97% depending on the complexity and difficulty of the minimanipulation). Third, each minimanipulation references a set of variables whose values may be set a-priori or via sensing operations, before executing the minimanipulation actions. Fourth, each minimanipulation changes the value of a set of variables to represent the functional result (the postconditions) of executing the action sequence in the minimanipulation. Fifth, minimanipulations may be acquired by repeated observation of a human tutor (e.g. an expert chef) to determine the sensing-and-action sequence, and to determine the range of acceptable values for the variables. Sixth, minimanipulations may be composed into larger units to perform end-to-end tasks, such as preparing a meal, or cleaning up a room. These larger units are multi-stage applications of minimanipulations either in a strict sequence, in parallel, or respecting a partial order wherein some steps must occur before others, but not in a total ordered sequence (e.g. to prepare a given dish, three ingredients need to be combined in exact amounts into a mixing bowl, and then mixed; the order of putting each ingredient into the bowl is not constrained, but all must be placed before mixing). Seventh, the assembly of minimanipulations into end-to-end-tasks is performed by robotic planning, taking into account the preconditions and postconditions of the component minimanipulations. Eighth, case-based reasoning wherein observation of humans performing end-to-end tasks, or other robots doing so, or the same robot's past experience can be used to acquire a library of reusable robotic plans form cases (specific instances of performing an end-to-end task), both successful ones to replicate, and unsuccessful ones to learn what to avoid.

In a first aspect of the present disclosure, the robotic apparatus performs a task by replicating a human-skill operation, such as food preparation, playing piano, or painting, by accessing one or more libraries of minimanipulations. The replication process of the robotic apparatus emulates the transfer of a human's intelligence or skill set through a pair of hands, such as how a chef uses a pair of hands to prepare a particular dish; or a piano maestro playing a master piano piece through his or her pair of hands (and perhaps through the feet and body motions, as well). In a second aspect of the present disclosure, the robotic apparatus comprises a humanoid for home applications where the humanoid is designed to provide a programmable or customizable psychological, emotional, and/or functional comfortable robot, and thereby providing pleasure to the user. In a third aspect of the present disclosure, one or more minimanipulation libraries are created and executed as, first, one or more general minimanipulation libraries, and second, as one or more application specific minimanipulation libraries. One or more general minimanipulation libraries are created based on the elemental parameters and the degrees of freedom of a humanoid or a robotic apparatus. The humanoid or the robotic apparatus are programmable, so that the one or more general minimanipulation libraries can be programmed or customized to become one or more application specific minimanipulation libraries specific tailored to the user's request in the operational capabilities of the humanoid or the robotic apparatus.

Some embodiments of the present disclosure are directed to the technical features relating to the ability of being able to create complex robotic humanoid movements, actions and interactions with tools and the environment by automatically building movements for the humanoid, actions, and behaviors of the humanoid based on a set of computer-encoded robotic movement and action primitives. The primitives are defined by motion/actions of articulated degrees of freedom that range in complexity from simple to complex, and which can be combined in any form in serial/parallel fashion. These motion-primitives are termed to be Minimanipulations (MMs) and each MM has a clear time-indexed command input-structure, and output behavior-/performance-profile that are intended to achieve a certain function. MMs can range from the simple ('index a single finger joint by 1 degree') to the more involved (such as 'grab the utensil') to the even more complex ('fetch the knife and cut the bread') to the fairly abstract ('play the $1^{st}$ bar of Schubert's piano concerto #1').

Thus, MMs are software-based and represented by input and output data sets and inherent processing algorithms and performance descriptors, akin to individual programs with input/output data files and subroutines, contained within individual run-time source-code, which when compiled generates object-code that can be compiled and collected within various different software libraries, termed as a collection of various Minimanipulation-Libraries (MMLs). MMLs can be grouped in to multiple groupings, whether these be associated to (i) particular hardware elements (finger/hand, wrist, arm, torso, foot, legs, etc.), (ii) behavioral elements (contacting, grasping, handling, etc.), or even (iii) application-domains (cooking, painting, playing a musical instrument, etc.). Furthermore, within each of these groupings, MMLs can be arranged based on multiple levels (simple to complex) relating to the complexity of behavior desired.

It should thus be understood that the concept of Minimanipulation (MM) (definitions and associations, measurement and control variables and their combinations and value-usage and —modification, etc.) and its implementation through usage of multiple MMLs in a near infinite combination, relates to the definition and control of basic behaviors (movements and interactions) of one or more degrees of freedom (movable joints under actuator control) at levels ranging from a single joint (knuckle, etc.) to combinations of joints (fingers and hand, arm, etc.) to ever higher degree of freedom systems (torso, upper-body, etc.) in a sequence and combination that achieves a desirable and successful movement sequence in free space and achieves a desirable degree of interaction with the real world so as to be able to enact a desirable function or output by the robot system, on and with, the surrounding world via tools, utensils, and other items.

Examples for the above definition can range from (i) a simple command sequence for a digit to flick a marble along a table, through (ii) stirring a liquid in a pot using a utensil, to (iii) playing a piece of music on an instrument (violin, piano, harp, etc.). The basic notion is that MMs are represented at multiple levels by a set of MM commands executed in sequence and in parallel at successive points in time, and together create a movement and action/interaction with the outside world to arrive at a desirable function (stirring the liquid, striking the bow on the violin, etc.) to achieve a desirable outcome (cooking pasta sauce, playing a piece of Bach concerto, etc.).

The basic elements of any low-to-high MM sequence comprise movements for each subsystem, and combinations thereof are described as a set of commanded positions/velocities and forces/torques executed by one or more articulating joints under actuator power, in such a sequence as required. Fidelity of execution is guaranteed through a closed-loop behavior described within each MM sequence and enforced by local and global control algorithms inherent to each articulated joint controller and higher-level behavioral controllers.

Implementation of the above movements (described by articulating joint positions and velocities) and environment interactions (described by joint/interface torques and forces) is achieved by having computer playback desirable values for all required variables (positions/velocities and forces/torques) and feeding these to a controller system that faithfully implements them on each joint as a function of time at each time step. These variables and their sequence and feedback loops (hence not just data files, but also control programs), to ascertain the fidelity of the commanded movement/interactions, are all described in data-files that are combined into multi-level MMLs, which can be accessed and combined in multiple ways to allow a humanoid robot to execute multiple actions, such as cooking a meal, playing a piece of classical music on a piano, lifting an infirm person into/out-of a bed, etc. There are MMLs that describe simple rudimentary movement/interactions, which are then used as building-blocks for ever higher-level MMLs that describe ever-higher levels of manipulation, such as 'grasp', 'lift', 'cut' to higher level primitives, such as 'stir liquid in pot'/'pluck harp-string to g-flat' or even high-level actions, such as 'make a vinaigrette dressing'/'paint a rural Brittany summer landscape'/'play Bach's Piano-concerto #1', etc. Higher level commands are simply a combination towards a sequence of serial/parallel lower- and mid-level MM primitives that are executed along a common timed stepped sequence, which is overseen by a combination of a set of planners running sequence/path/interaction profiles with feedback controllers to ensure the required execution fidelity (as defined in the output data contained within each MM sequence).

The values for the desirable positions/velocities and forces/torques and their execution playback sequence(s) can be achieved in multiple ways. One possible way is through watching and distilling the actions and movements of a human executing the same task, and distilling from the observation data (video, sensors, modeling software, etc.) the necessary variables and their values as a function of time and associating them with different minimanipulations at various levels by using specialized software algorithms to distill the required MM data (variables, sequences, etc.) into various types of low-to-high MMLs. This approach would allow a computer program to automatically generate the MMLs and define all sequences and associations automatically without any human involvement.

Embodiments of the present disclosure are directed to the technical features relating to the ability of being able to create complex robotic humanoid movements, actions, and interactions with tools and the instrumented environment by automatically building movements for the humanoid; actions and behaviors of the humanoid based on a set of computer-encoded robotic movement and action primitives. The primitives are defined by motions/actions of articulated degrees of freedom that range in complexity from simple to complex, and which can be combined in any form in serial/parallel fashion. These motion-primitives are termed to be minimanipulations and each has a clear time-indexed command input-structure and output behavior/performance profile that is intended to achieve a certain function. Minimanipulations comprise a new way of creating a general programmable-by-example platform for humanoid robots. One or more minimanipulation electronic libraries provide a large suite of higher-level sensing-and-execution sequences that are common building blocks for complex tasks, such as cooking, taking care of the infirm, or other tasks performed by the next generation of humanoid robots. Another way would be (again by way of an automated computer-controlled process employing specialized algorithms) to learn from online data (videos, pictures, sound logs, etc.) how to build a required sequence of actionable sequences using existing low-level MMLs to build the proper sequence and combinations to generate a task-specific MML.

Yet another way, although most certainly more (time-) inefficient and less cost-effective, might be for a human programmer to assemble a set of low-level MM primitives to create an ever-higher level set of actions/sequences in a higher-level MML to achieve a more complex task-sequence, again composed of pre-existing lower-level MMLs.

Modification and improvements to individual variables (meaning joint position/velocities and torques/forces at each incremental time-interval and their associated gains and combination algorithms) and the motion/interaction sequences are also possible and can be effected in many different ways. It is possible to have learning algorithms monitor each and every motion/interaction sequence and perform simple variable-perturbations to ascertain outcome to decide on if/how/when/what variable(s) and sequence(s) to modify in order to achieve a higher level of execution fidelity at levels ranging from low- to high-levels of various MMLs. Such a process would be fully automatic and allow for updated data sets to be exchanged across multiple platforms that are interconnected, thereby allowing for massively parallel and cloud-based learning via cloud computing.

Advantageously, the robotic apparatus in a standardized robotic kitchen has the capabilities to prepare a wide array of cuisines from around the world through a global network and database access, as compared to a chef who may specialize in one type of cuisine. The standardized robotic kitchen also is able to capture and record favorite food dishes for replication by the robotic apparatus whenever desired to enjoy the food dish without the repetitive process of laboring to prepare the same dish repeatedly.

The structures and methods of the present disclosure are disclosed in detail in the description below. This summary does not purport to define the disclosure. The disclosure is defined by the claims. These and other embodiments, features, aspects, and advantages of the disclosure will become better understood with regard to the following description, appended claims, and accompanying drawings.

BRIEF DESCRIPTION OF THE DRAWINGS

The disclosure will be described with respect to specific embodiments thereof, and reference will be made to the drawings, in which:

FIG. 29 is a table illustrating a database library structure of minimanipulations objects for use in the standardized robotic kitchen in accordance with the present disclosure.

FIG. 30 is a table illustrating a database library structure of standardized objects for use in the standardized robotic kitchen in accordance with the present disclosure.

FIG. 48 is a block diagram illustrating an elevation view of the program storage system for use with the standardized robotic kitchen in accordance with the present disclosure.

FIG. 50 is a block diagram illustrating an ingredient quality-monitoring dashboard associated with ingredient access containers for use with the standardized robotic kitchen in accordance with the present disclosure.

FIGS. 64A-B are block diagrams illustrating an example of a predefined recipe search criterion in accordance with the present disclosure.

FIG. 65 is a block diagram illustrating some pre-defined containers in the robotic kitchen in accordance with the present disclosure.

FIG. 87B is a block diagram illustrating a top plan view in the fourth embodiment of the robotic food preparation kitchen with the humanoid robot in accordance with the present disclosure.

FIG. 92A is a block diagram illustrating the emotional detection and analysis of a person's emotional state by monitoring a set of hormones, a set of pheromones, and other key parameters in accordance with the present disclosure.

FIG. 93 is a block diagram illustrating a port device implanted in a person to detect and record the person's emotional profile in accordance with the present disclosure.

Figure 117A:
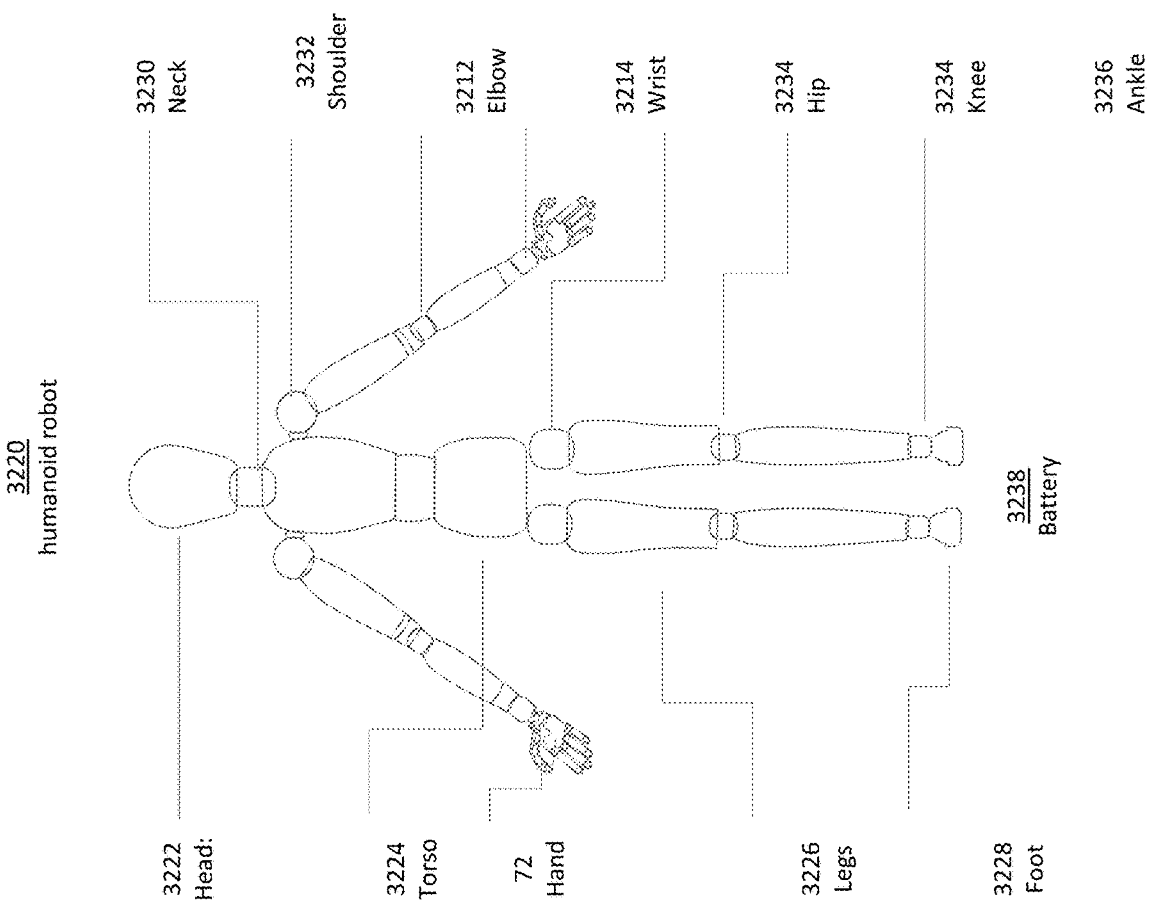
Figure 117B:
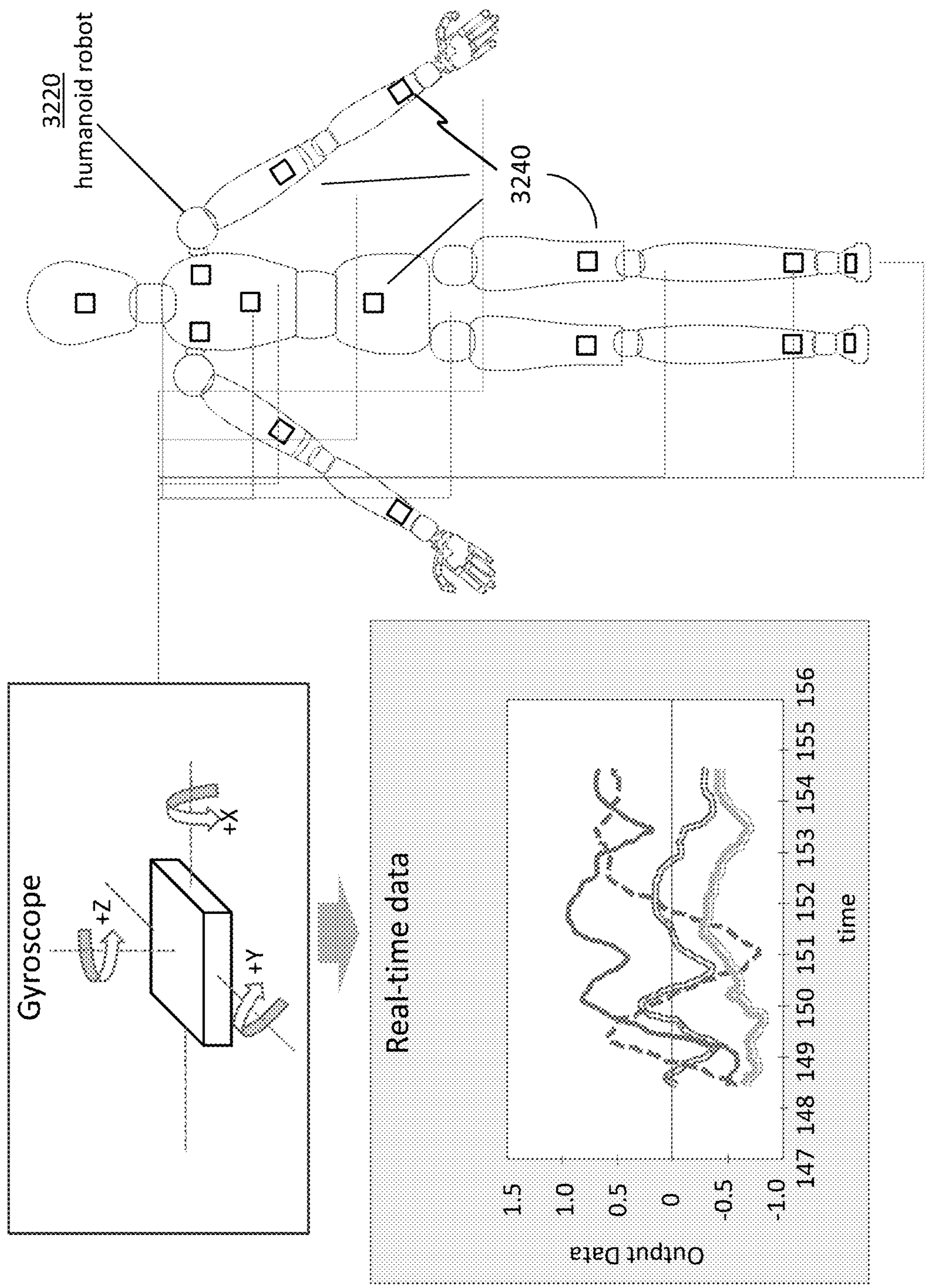
Figure 117C:
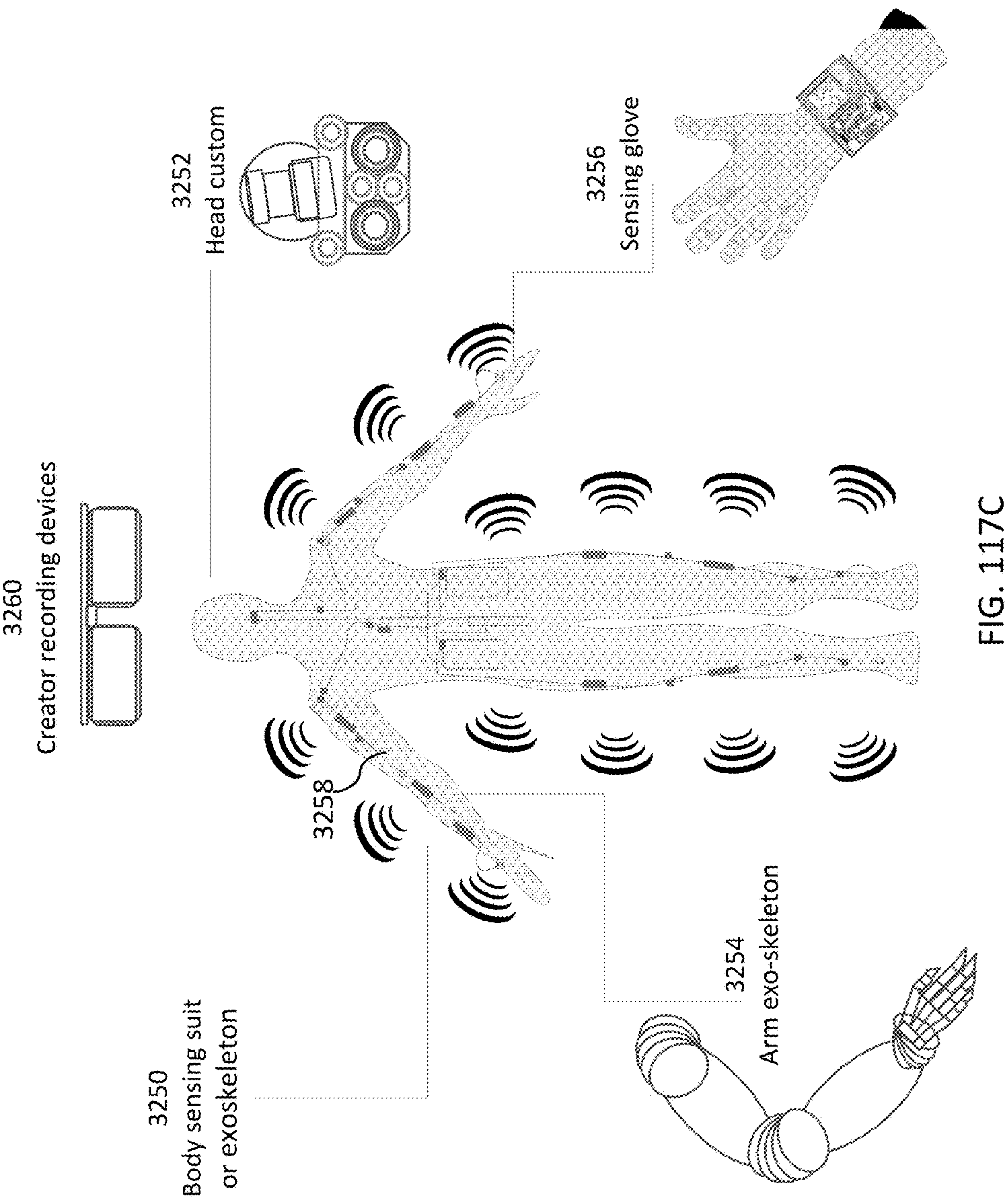

FIG. 117A is a block diagram illustrating one embodiment of a humanoid in accordance with the present disclosure; FIG. 117B is a block diagram illustrating the humanoid embodiment with gyroscopes and graphical data in accordance with the present disclosure; and FIG. 117C is graphical diagram illustrating the creator recording devices on a humanoid, including a body sensing suit, an arm exoskeleton, head gear, and sensing glove in accordance with the present disclosure.

Figure 118:
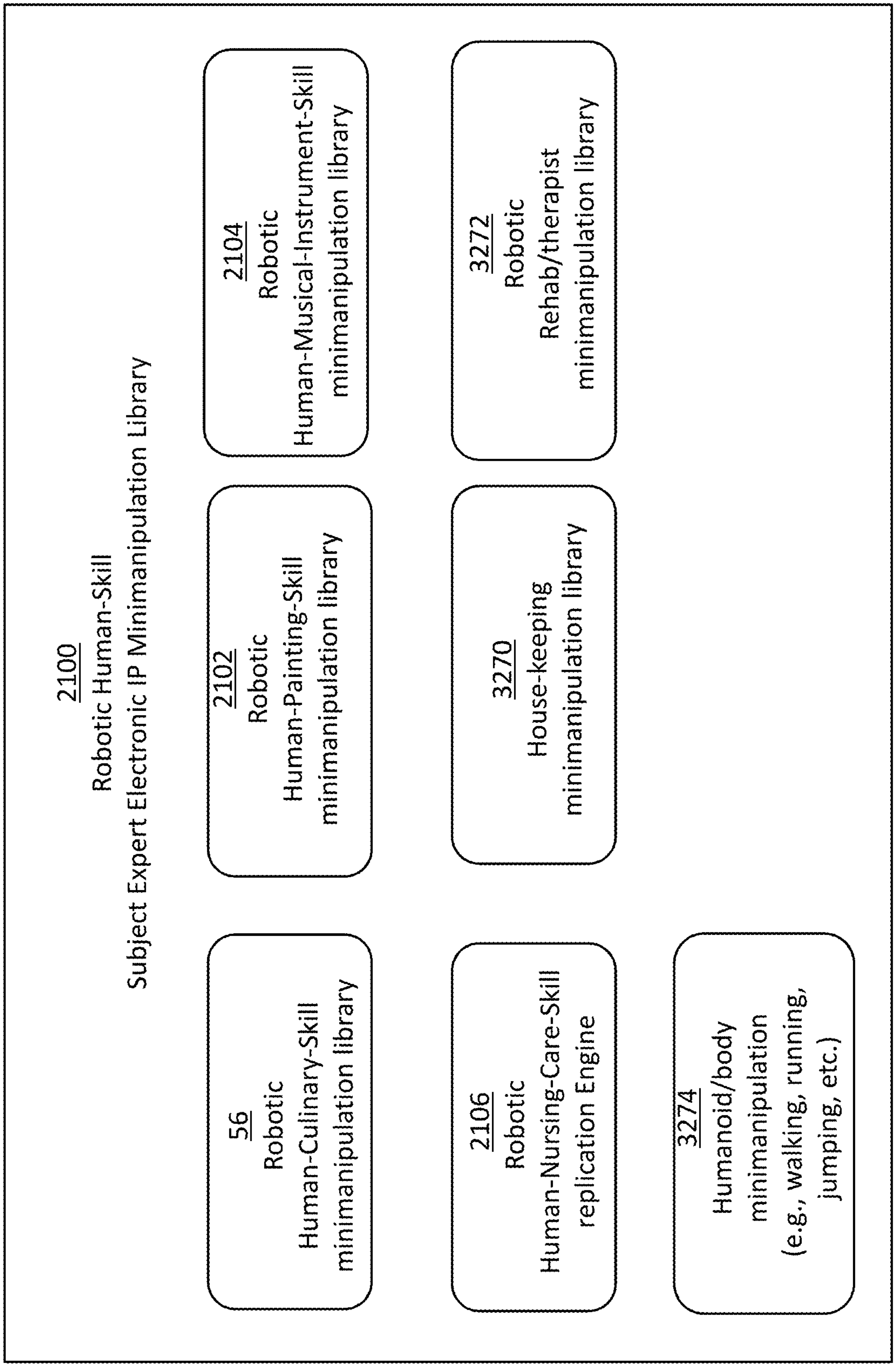

FIG. 118 is a block diagram illustrating a robotic human-skill subject expert minimanipulation library in accordance with the present disclosure.

Figure 119:
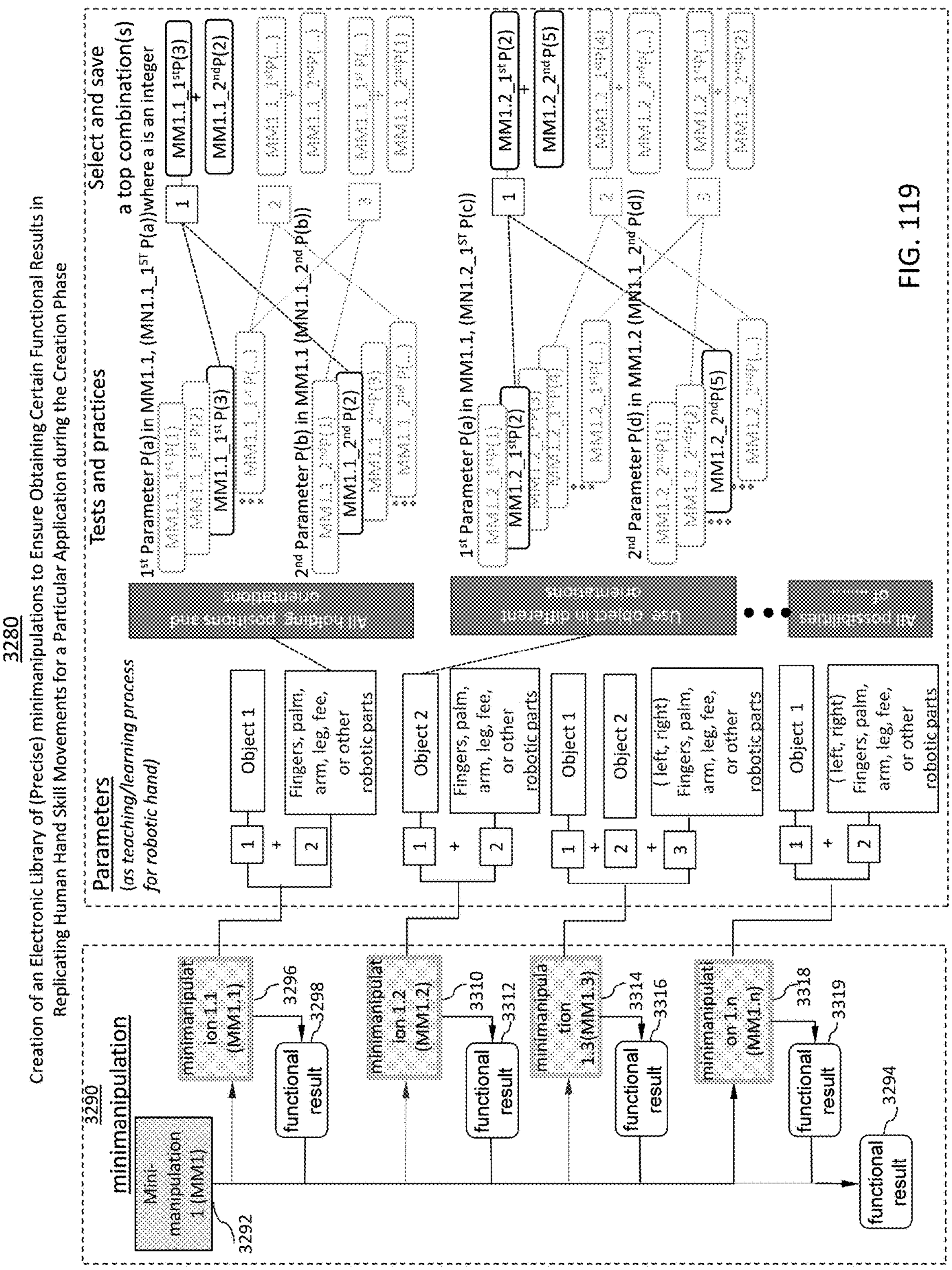

FIG. 119 is a block diagram illustrating the creation process of an electronic library of general minimanipulations for replacing human-hand-skill movements in accordance with the present disclosure.

Figure 120:
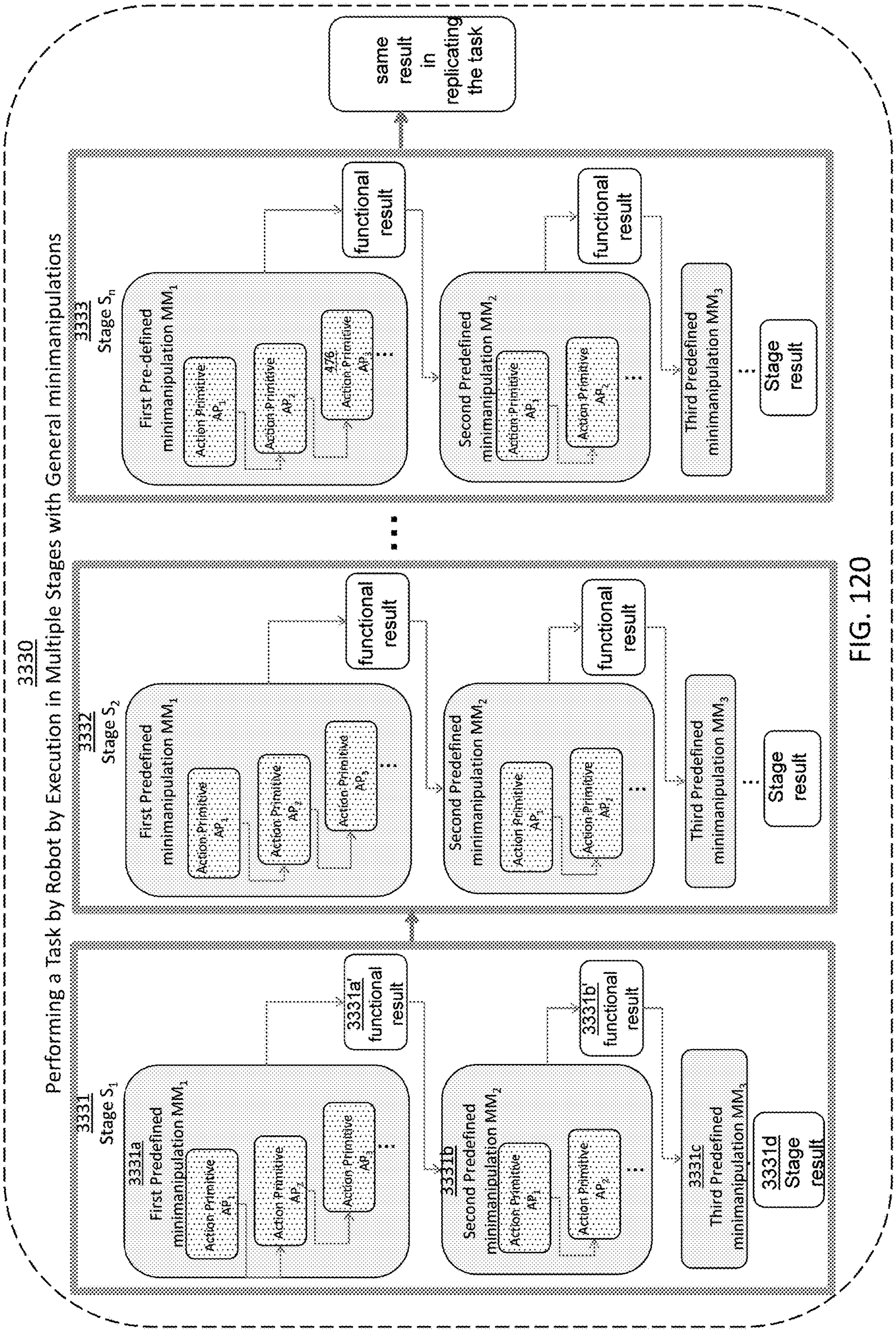

FIG. 120 is a block diagram illustrating performing a task by robot by execution in multiple stages with general minimanipulations in accordance with the present disclosure.

Figure 121:
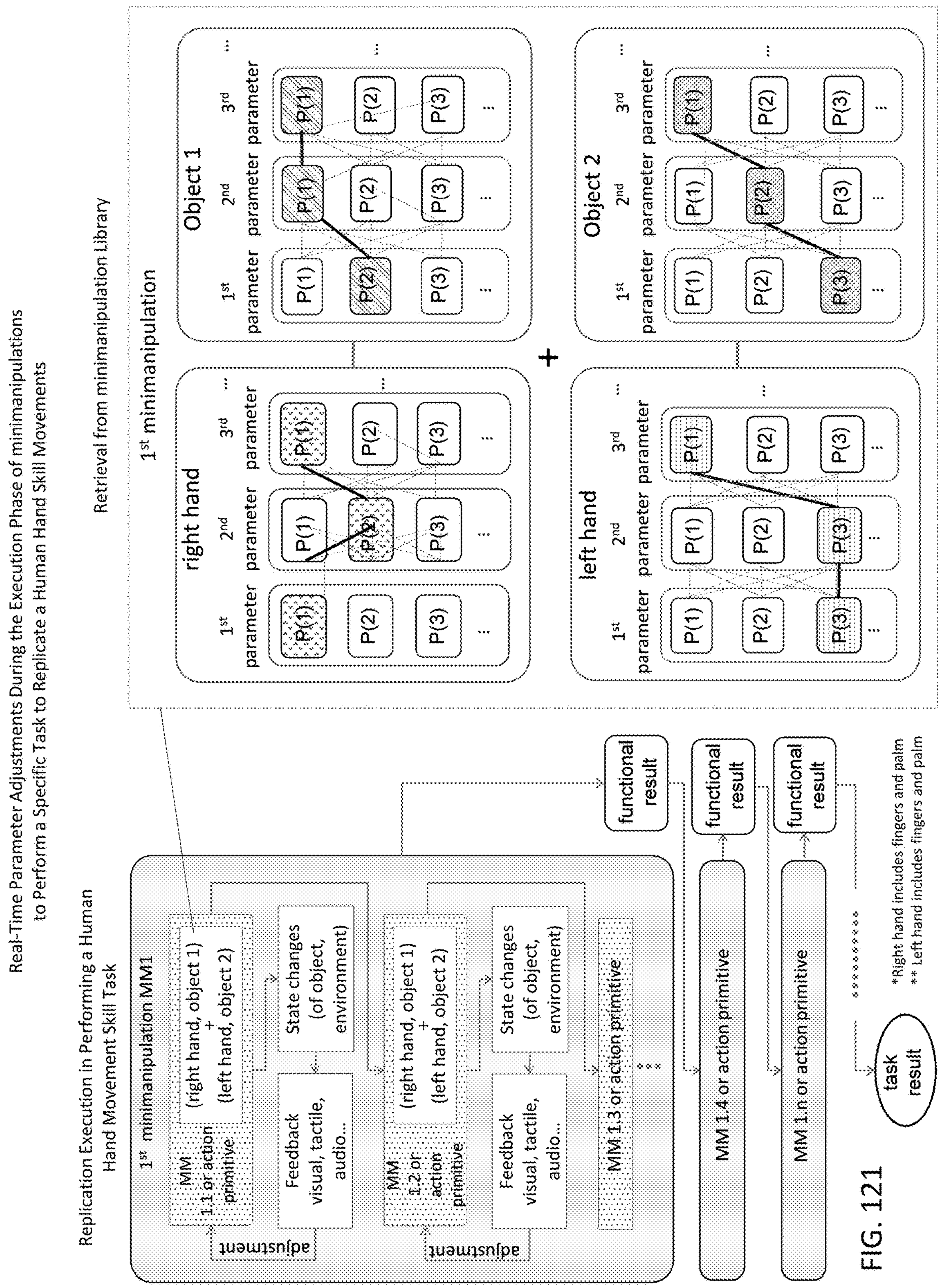

FIG. 121 is a block diagram illustrating the real-time parameter adjustment during the execution phase of minimanipulations in accordance with the present disclosure.

Figure 122:
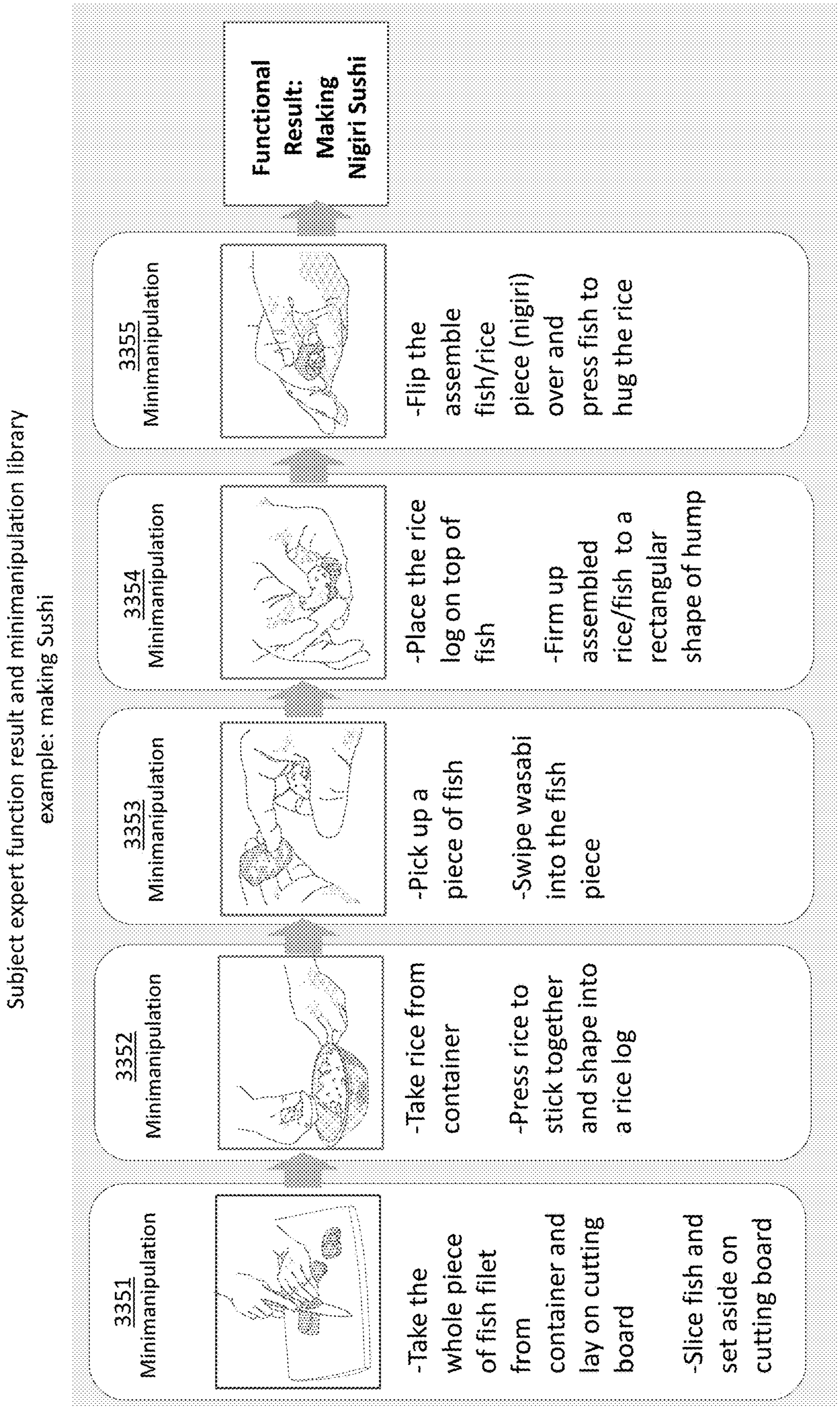

FIG. 122 is a block diagram illustrating a set of minimanipulations for making sushi in accordance with the present disclosure.

FIG. 123 is a block diagram illustrating a first minimanipulation of cutting fish in the set of minimanipulations for making sushi in accordance with the present disclosure.

FIG. 124 is a block diagram illustrating a second minimanipulation of taking rice from a container in the set of minimanipulations for making sushi in accordance with the present disclosure.

FIG. 125 is a block diagram illustrating a third minimanipulation of picking up a piece of fish in the set of minimanipulations for making sushi in accordance with the present disclosure.

FIG. 126 is a block diagram illustrating a fourth minimanipulation of firming up the rice and fish into a desirable shape in the set of minimanipulations for making sushi in accordance with the present disclosure.

FIG. 127 is a block diagram illustrating a fifth minimanipulation of pressing the fish to hug the rice in the set of minimanipulations for making sushi in accordance with the present disclosure.

Figure 128:
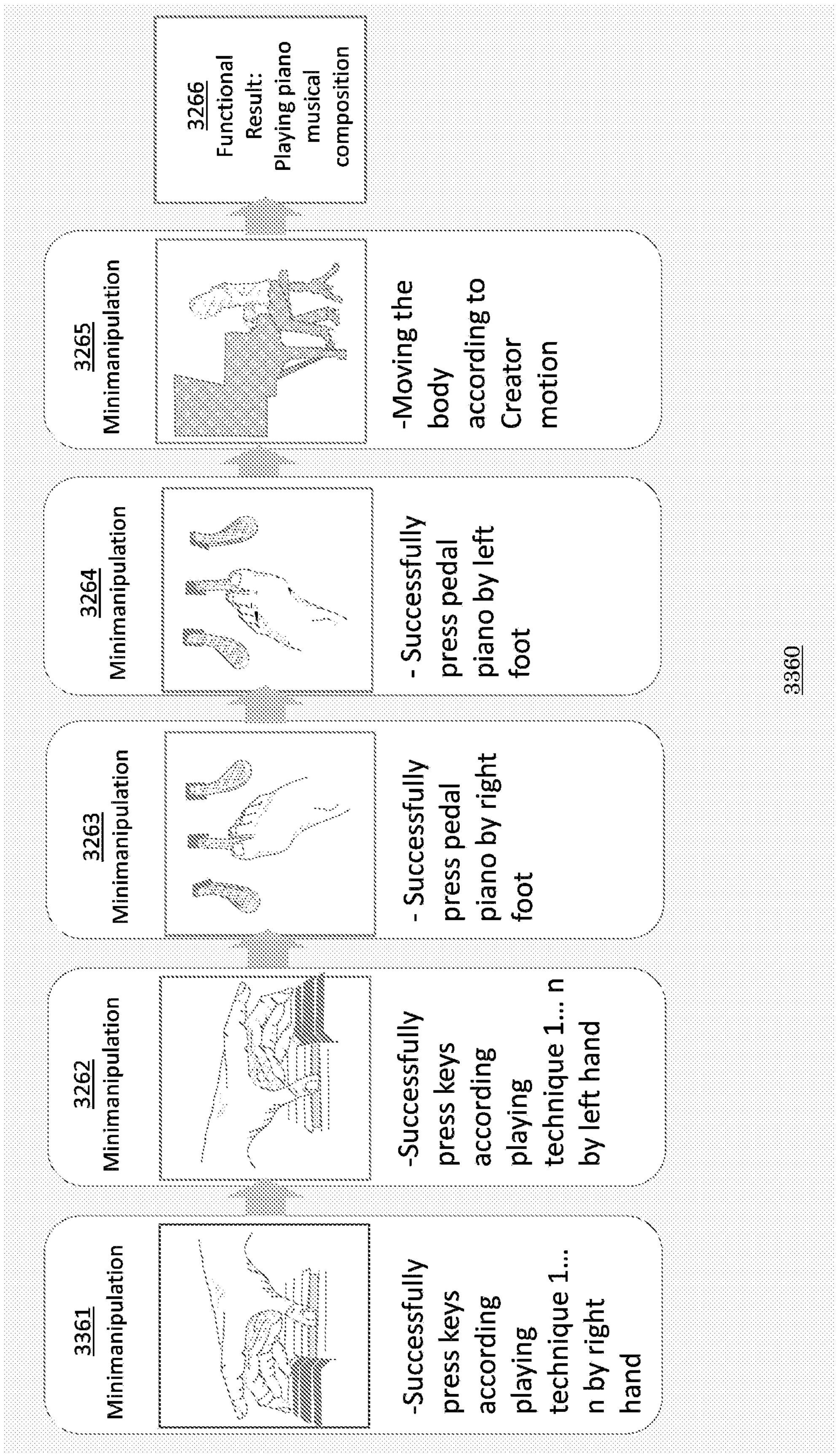

FIG. 128 is a block diagram illustrating a set of minimanipulations for playing piano that occur in any sequence or in any combination in parallel in accordance with the present disclosure.

FIG. 129 is a block diagram illustrating a first minimanipulation for the right hand and a second minimanipulation for the left hand of the set of minimanipulations that occur in parallel for playing piano from the set of minimanipulations for playing piano in accordance with the present disclosure.

FIG. 130 is a block diagram illustrating a third minimanipulation for the right foot and a fourth minimanipulation for the left foot of the set of minimanipulations that occur in parallel from the set of minimanipulations for playing piano in accordance with the present disclosure.

FIG. 131 is a block diagram illustrating a fifth minimanipulation for moving the body that occur in parallel with one or more other minimanipulations from the set of minimanipulations for playing piano in accordance with the present disclosure.

Figure 132:
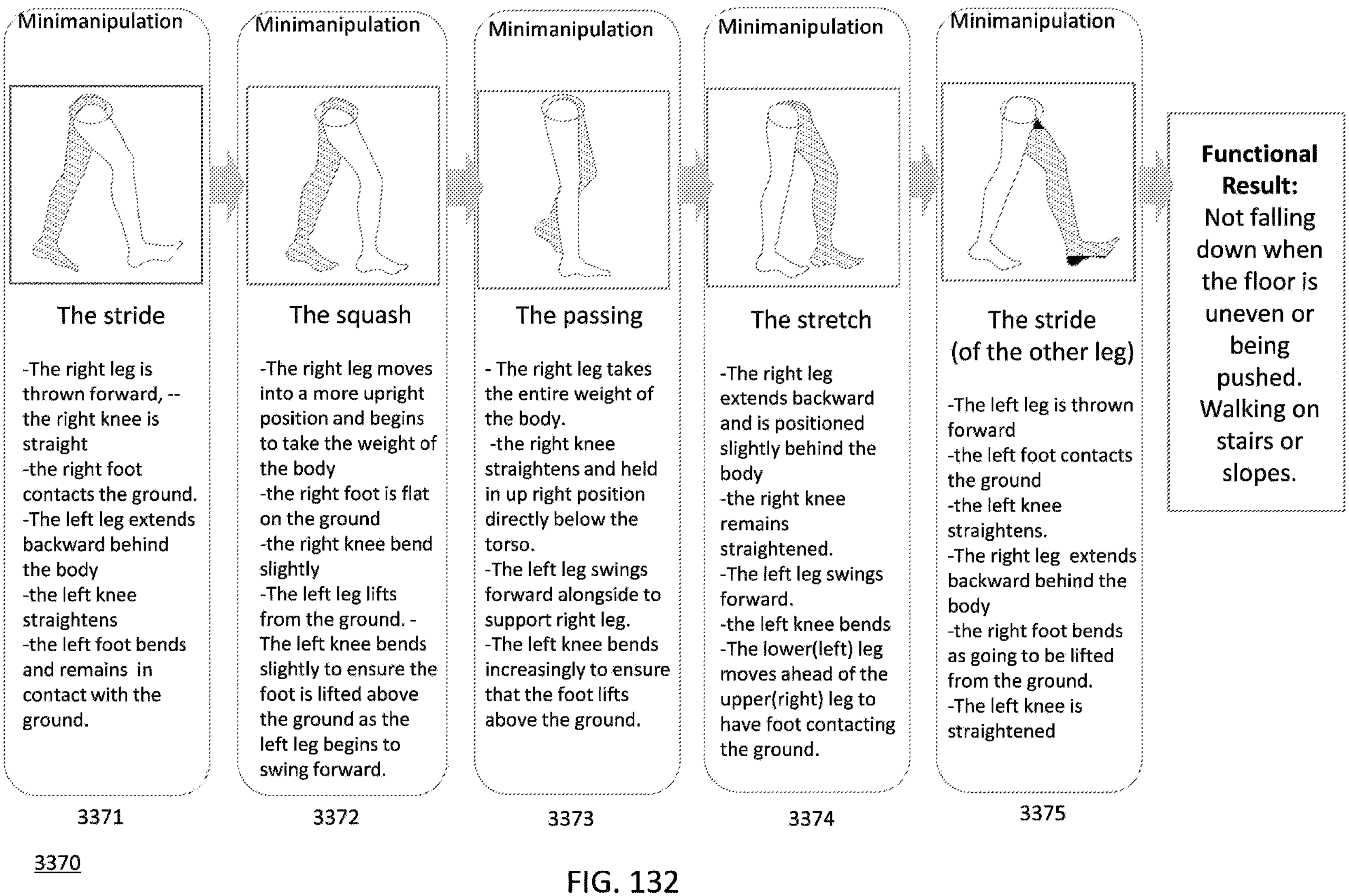

FIG. 132 is a block diagram illustrating a set of minimanipulations for humanoid to walk that occur in any sequence, or in any combination in parallel in accordance with the present disclosure.

FIG. 133 is a block diagram illustrating a first minimanipulation of stride pose with the right leg in the set of minimanipulations for humanoid to walk in accordance with the present disclosure.

FIG. 134 is a block diagram illustrating a second minimanipulation of squash pose with the right leg in the set of minimanipulations for humanoid to walk in accordance with the present disclosure.

FIG. 135 is a block diagram illustrating a third minimanipulation of passing pose with the right leg in the set of minimanipulations for humanoid to walk in accordance with the present disclosure.

FIG. 136 is a block diagram illustrating a fourth minimanipulation of stretch pose with the right leg in the set of minimanipulations for humanoid to walk in accordance with the present disclosure.

FIG. 137 is a block diagram illustrating a fifth minimanipulation of stride pose with the left leg in the set of minimanipulations for humanoid to walk in accordance with the present disclosure.

Figure 138:
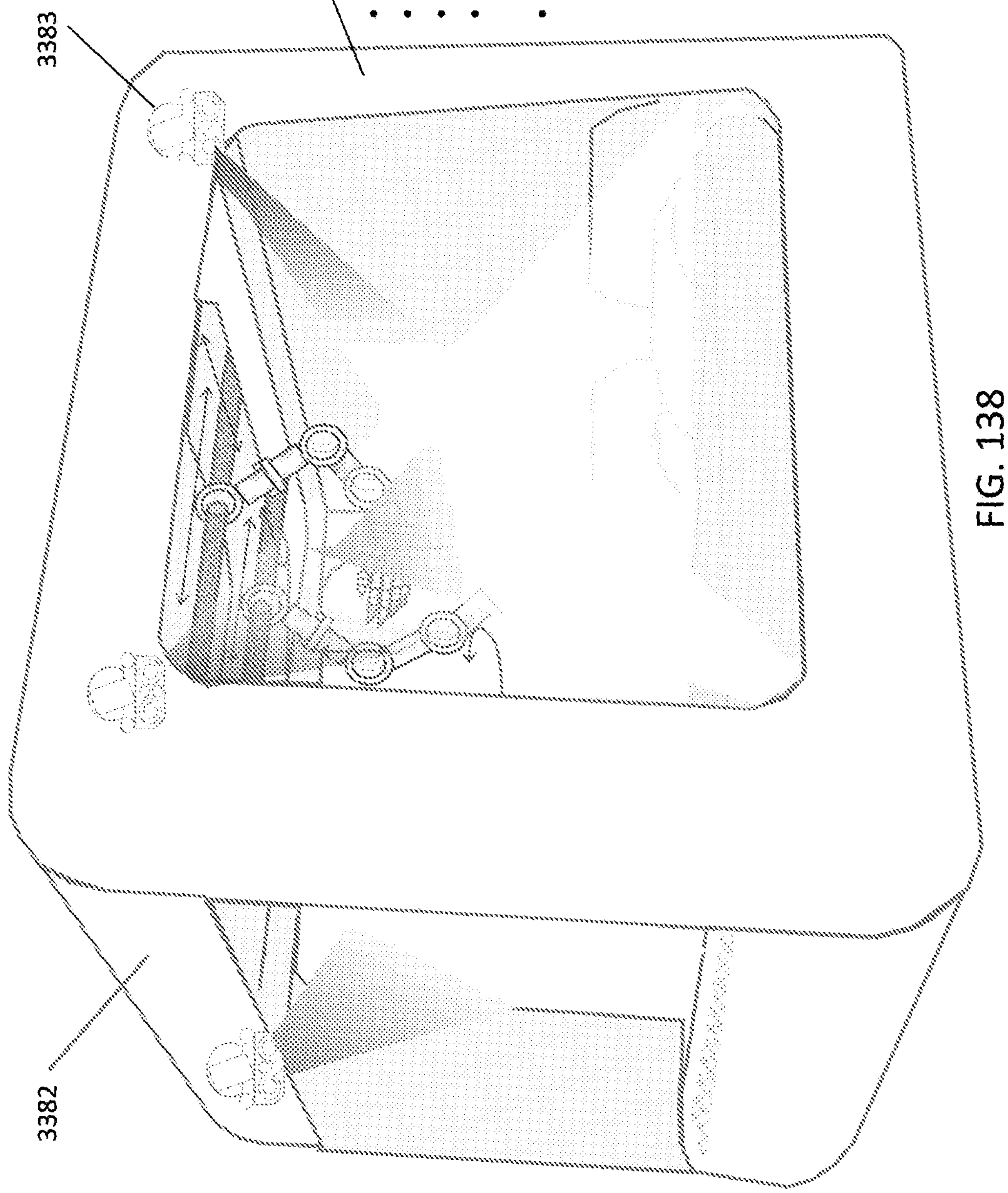

FIG. 138 is a block diagram illustrating a robotic nursing care module with a three-dimensional vision system in accordance with the present disclosure.

Figure 139:
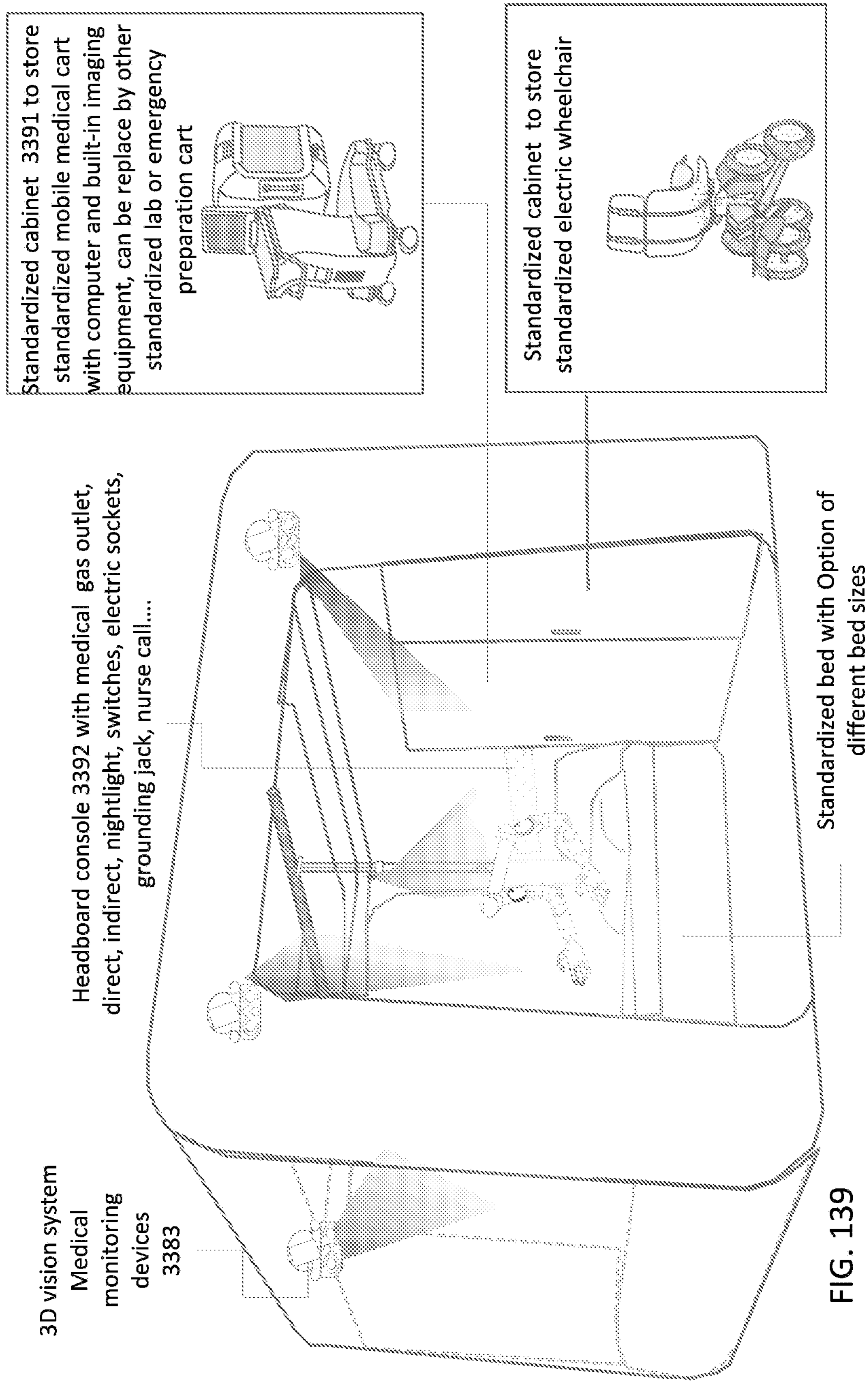

FIG. 139 is a block diagram illustrating a robotic nursing care module with standardized cabinets in accordance with the present disclosure.

Figure 140:
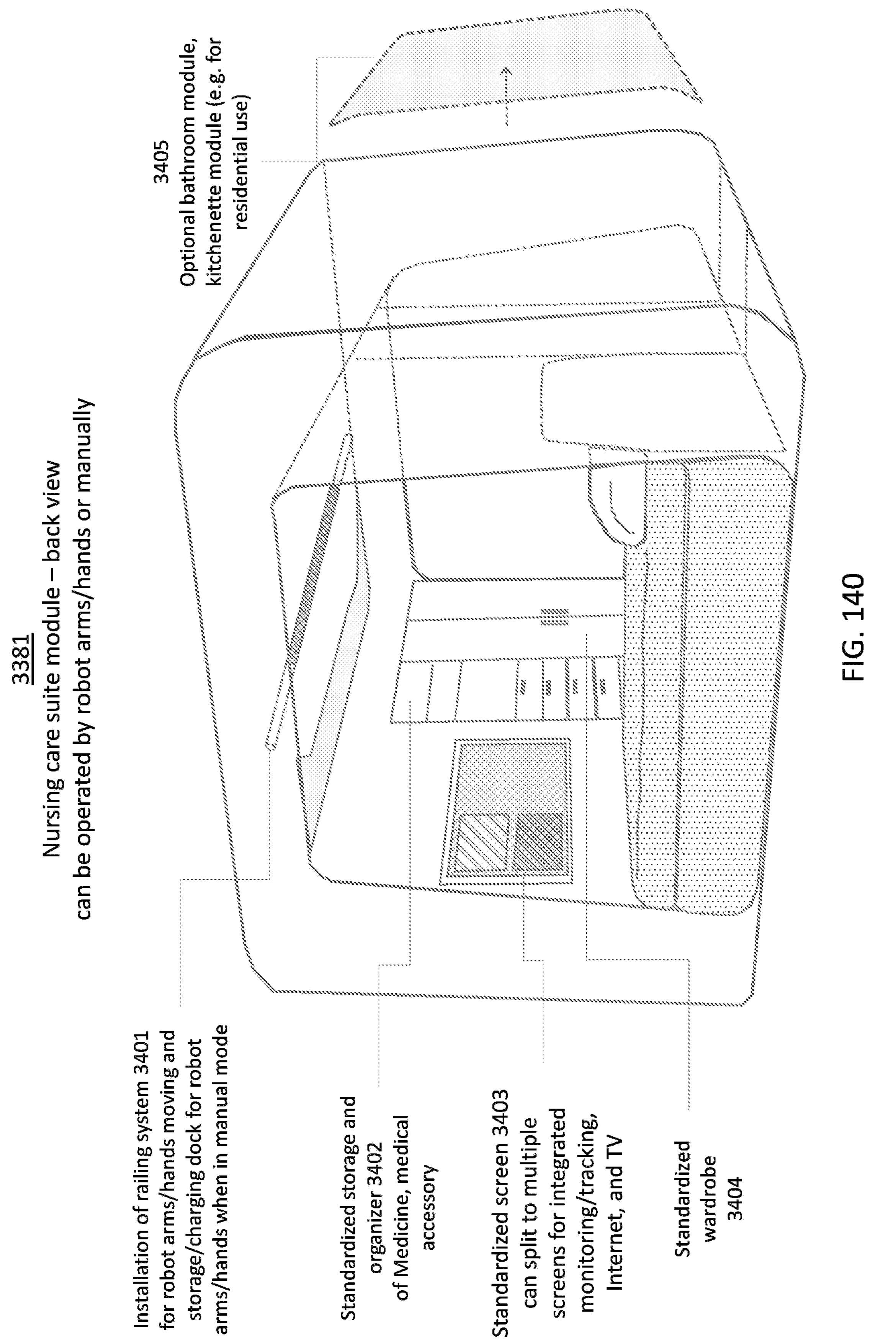

FIG. 140 is a block diagram illustrating a robotic nursing care module with one or more standardized storages, a standardized screen, and a standardized wardrobe in accordance with the present disclosure.

Figure 141:
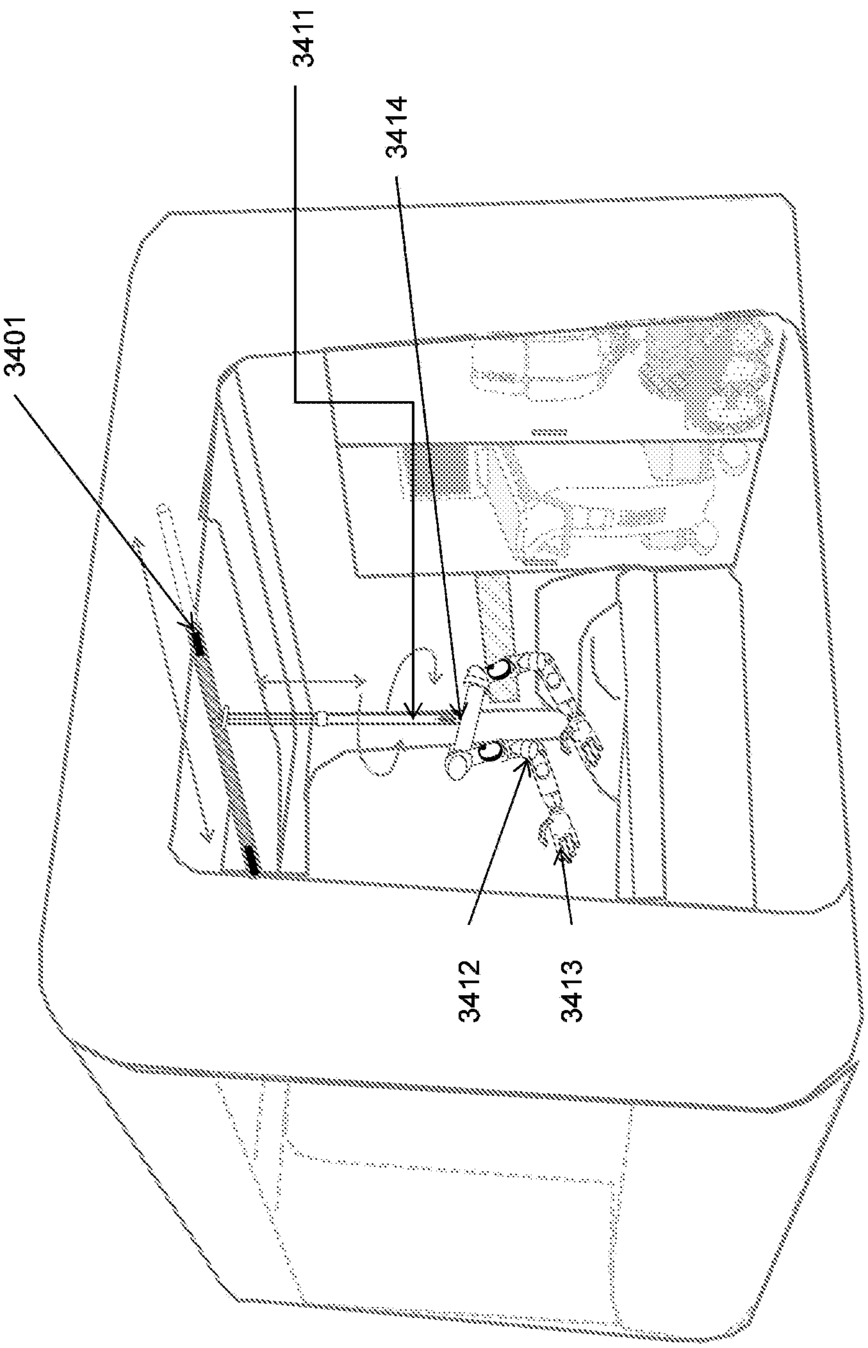

FIG. 141 is a block diagram illustrating a robotic nursing care module with a telescopic body with a pair of robotic arms and a pair of robotic hands in accordance with the present disclosure.

Figure 142:
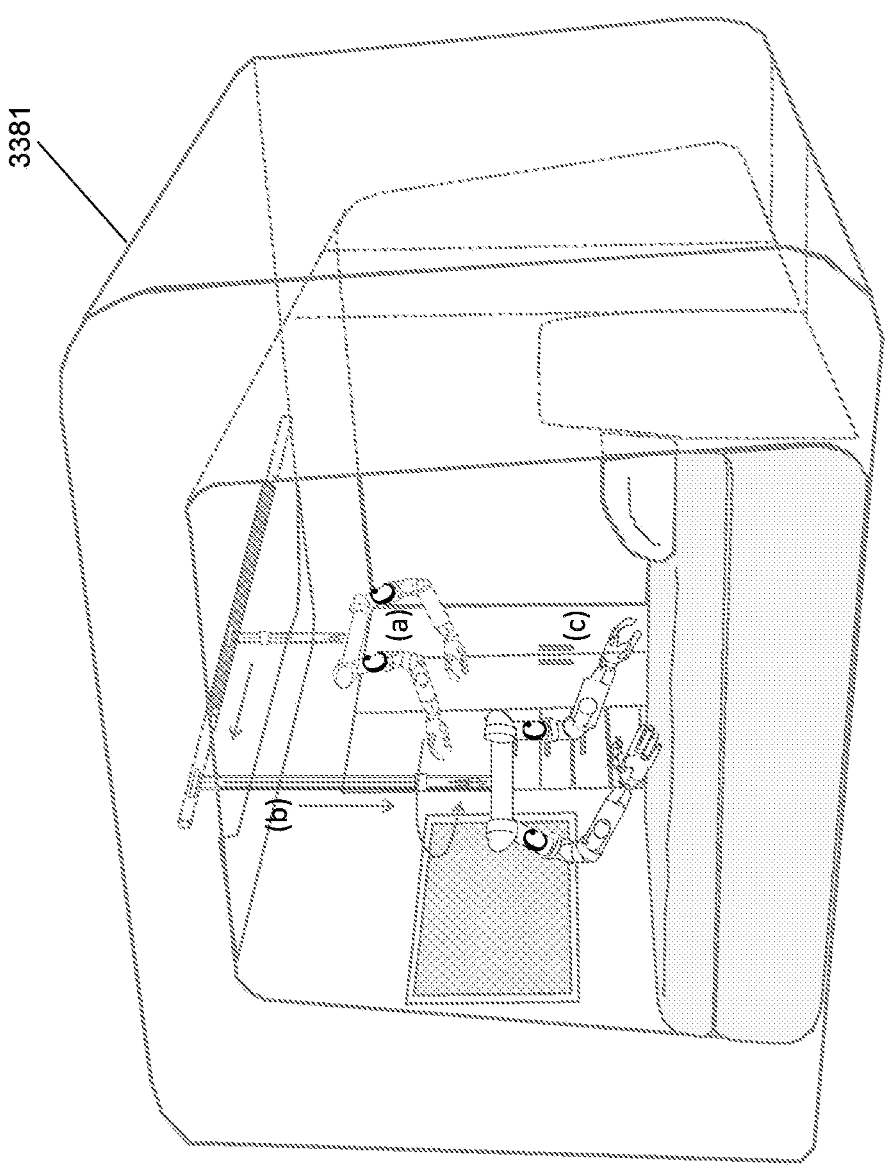

FIG. 142 is a block diagram illustrating a first example of executing a robotic nursing care module with various movements to aid an elderly person in accordance with the present disclosure.

Figure 143:
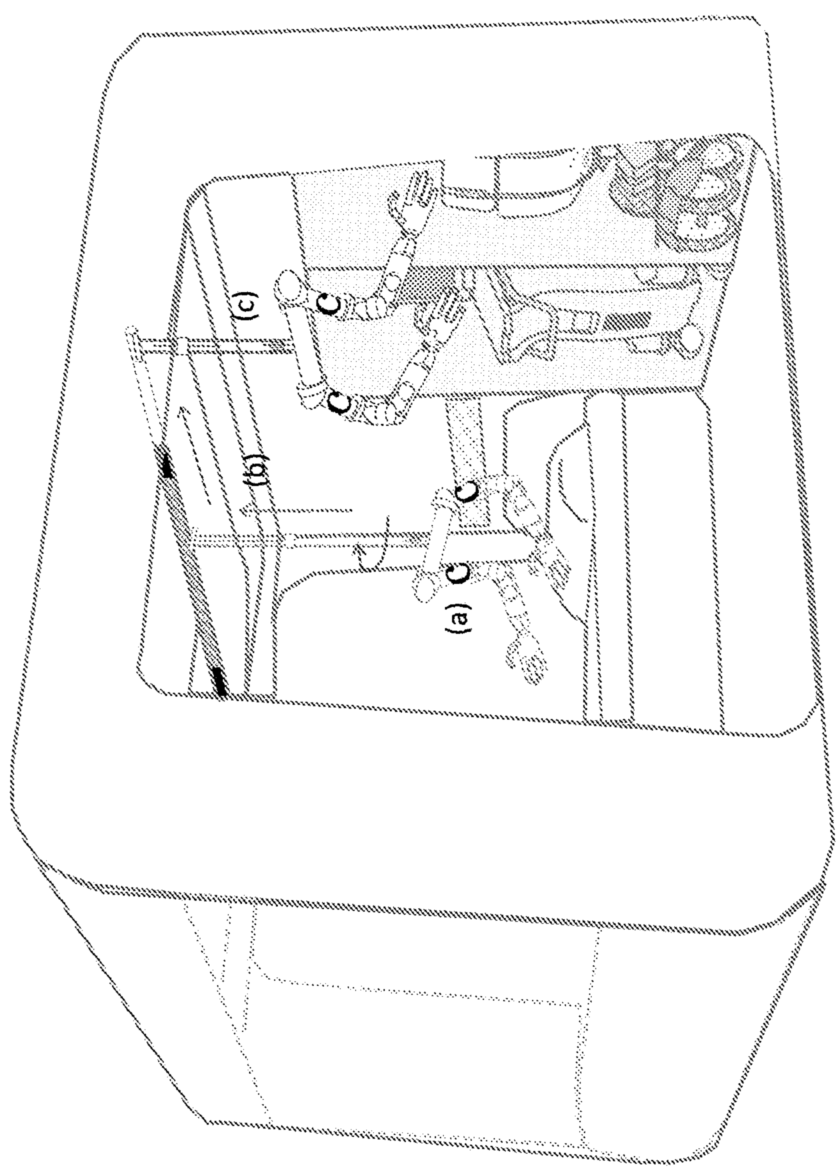

FIG. 143 is a block diagram illustrating a second example of executing a robotic nursing care module with loading and unloading a wheel chair in accordance with the present disclosure.

Figure 144:
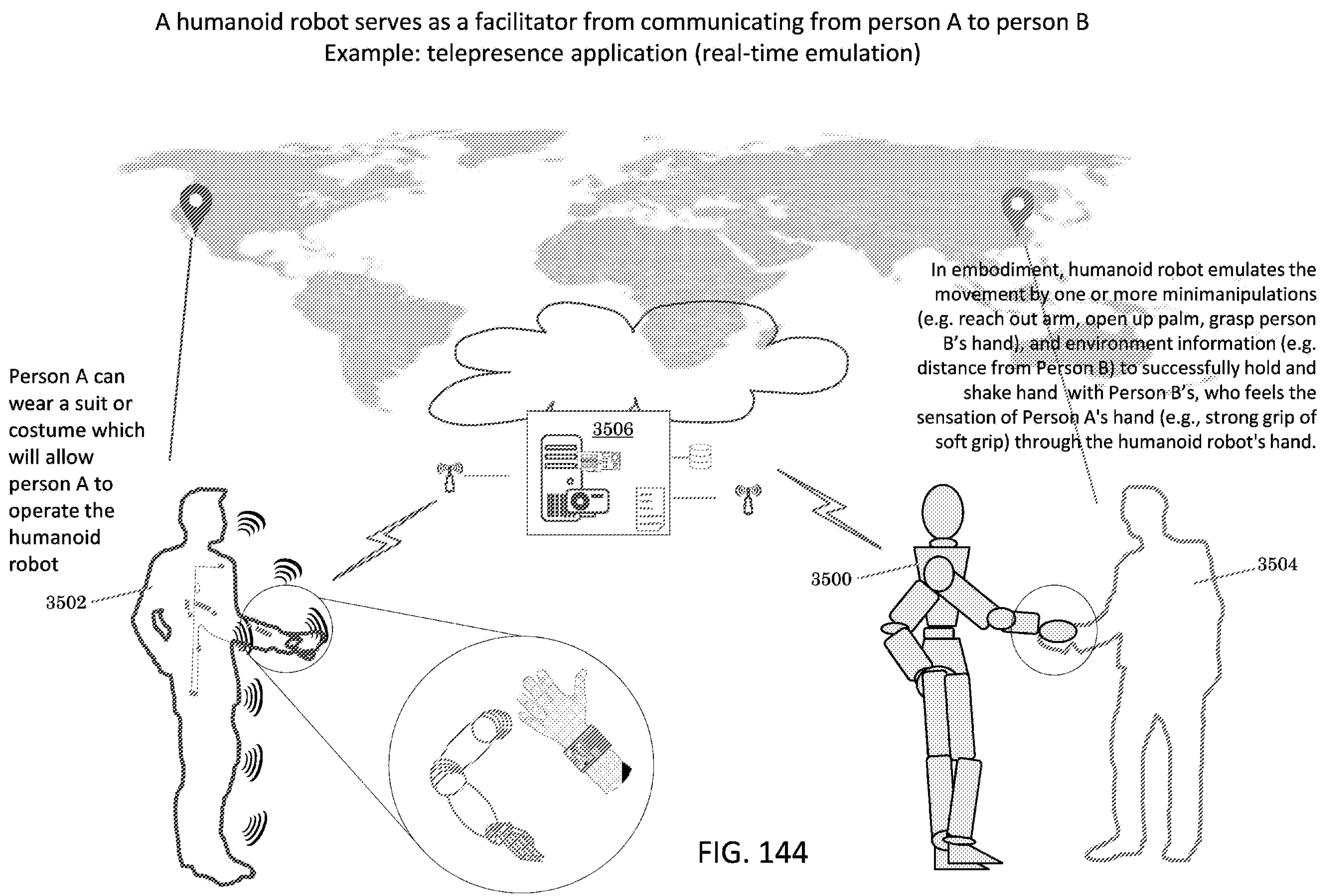

FIG. 144 is a pictorial diagram illustrating a humanoid robot acting as a facilitator between two human sources in accordance with the present disclosure.

Figure 145:
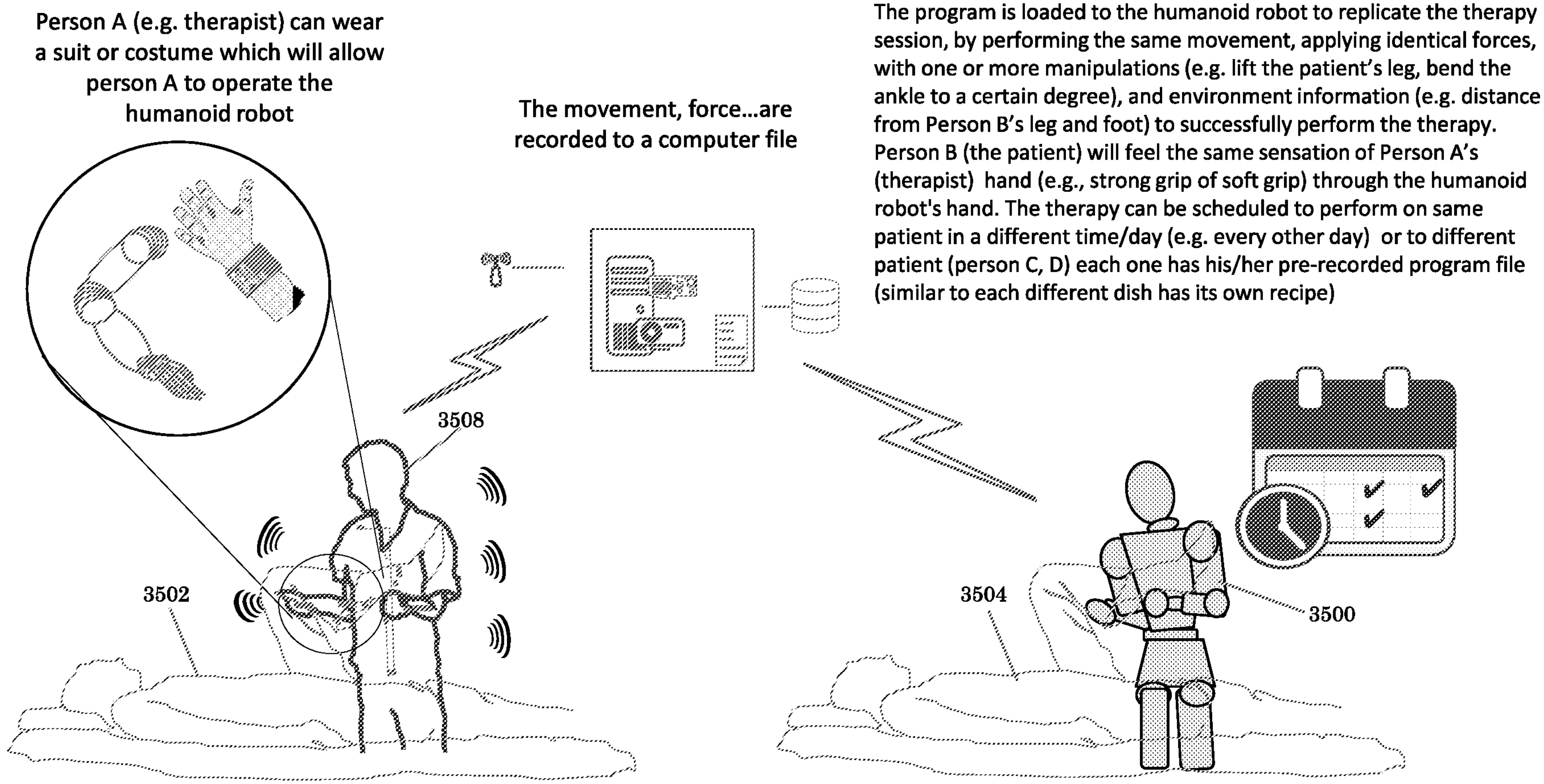

FIG. 145 is a pictorial diagram illustrating a humanoid robot serving as a therapist on person B while under the direct control of person A in accordance with the present disclosure.

Figure 146:
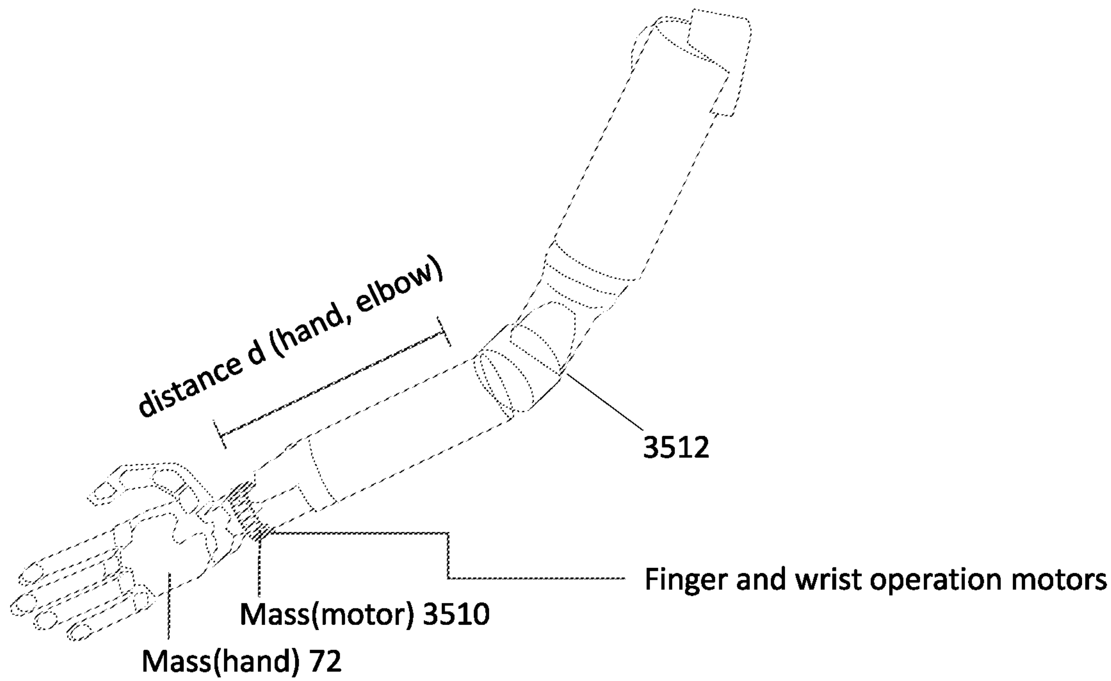

FIG. 146 is a block diagram illustrating the first embodiment in the placement of motors relative to the robotic hand and arm with full torque require moving the arm in accordance with the present disclosure.

Figure 147:
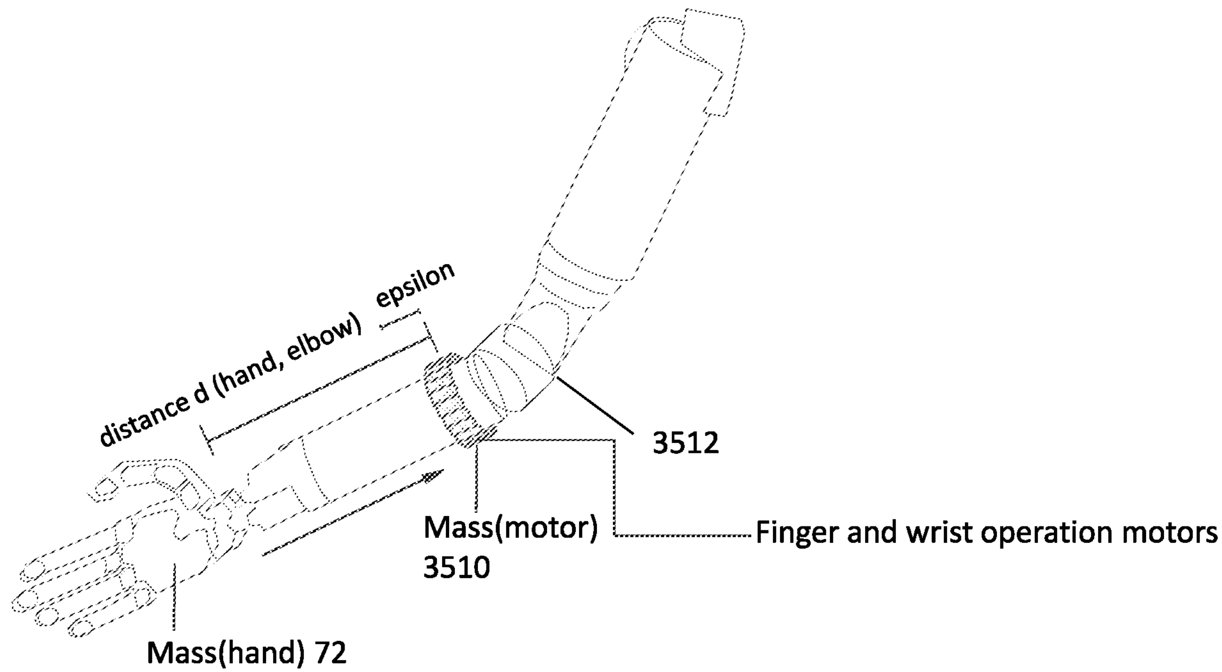

FIG. 147 is a block diagram illustrating the second embodiment in the placement of motors relative to the robotic hand and arm with a reduced torque require moving the arm in accordance with the present disclosure.

Figure 148A:
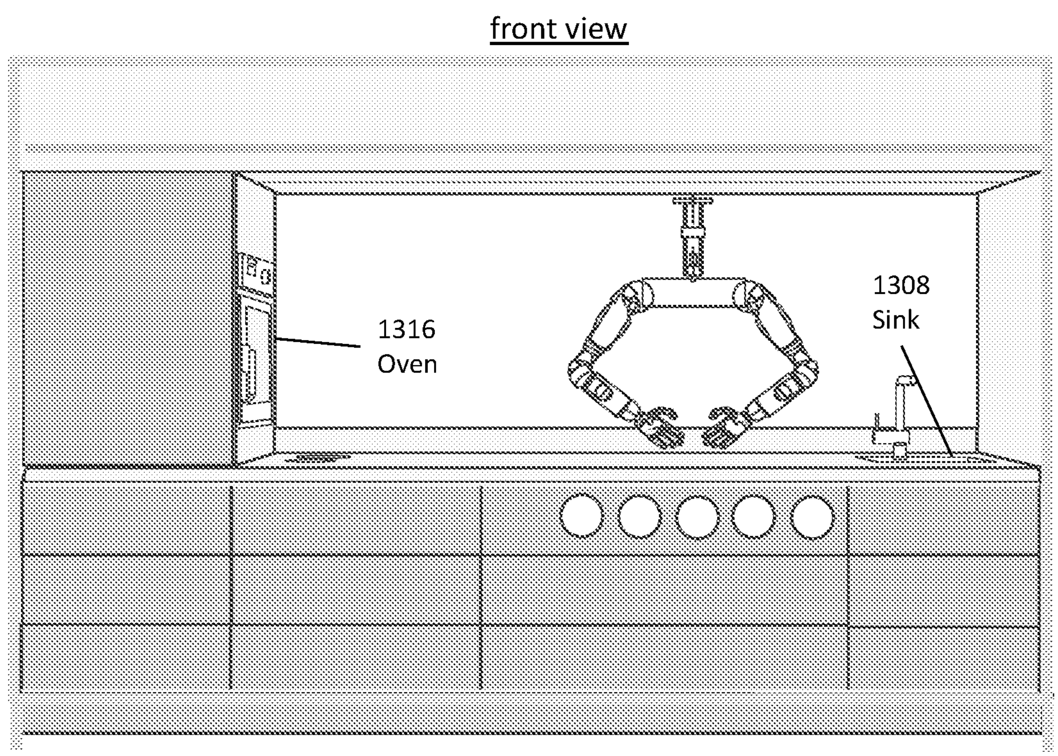
Figure 148B:
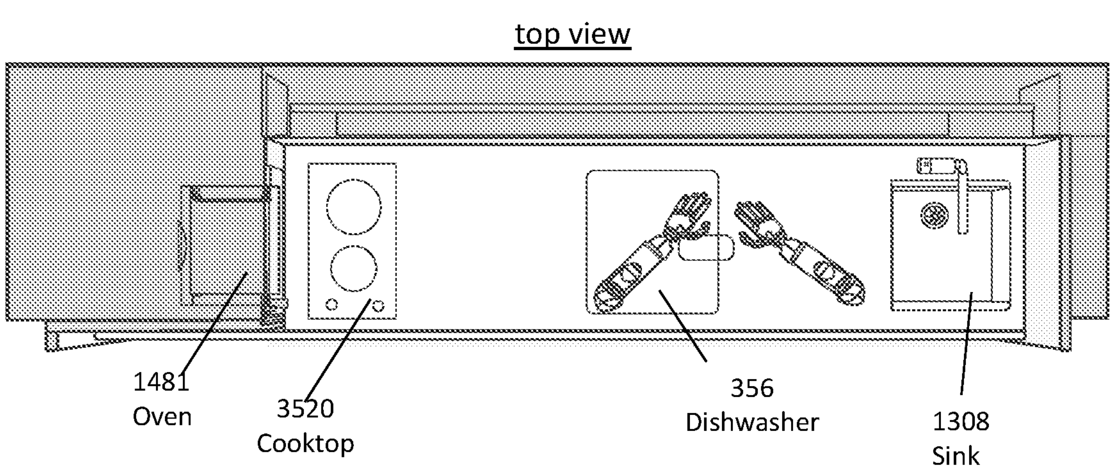

FIG. 148A is a pictorial diagram illustrating a front view of robotic arms extending from an overhead mount for use in a robotic kitchen with an oven in accordance with the present disclosure; and FIG. 148B is a pictorial diagram illustrating a top view of robotic arms extending from an overhead mount for use in a robotic kitchen with an oven in accordance with the present disclosure.

Figure 149A:
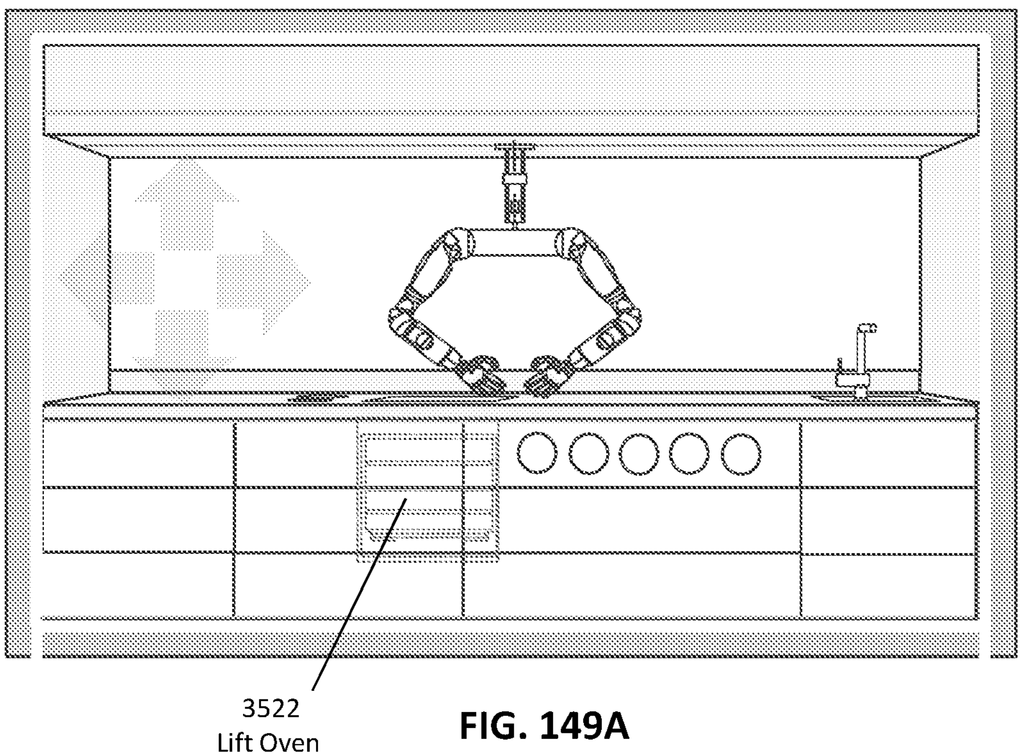
Figure 149B:
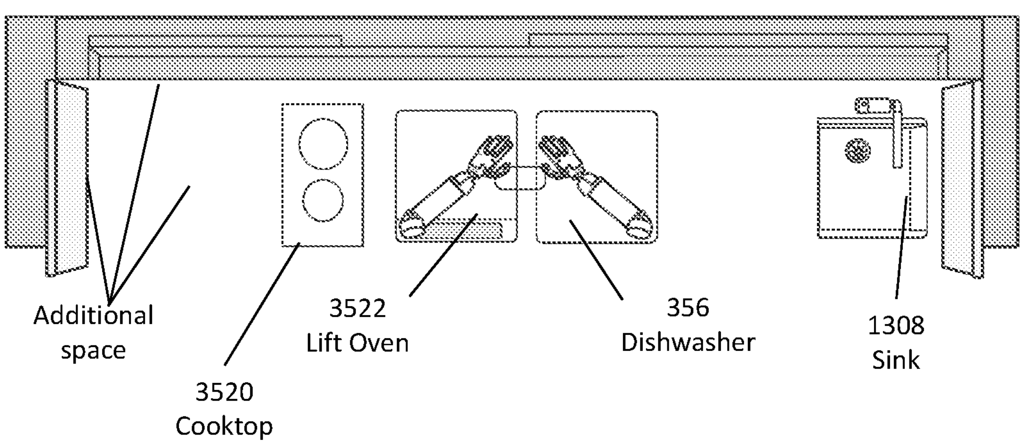

FIG. 149A is a pictorial diagram illustrating a front view of robotic arms extending from an overhead mount for use in a robotic kitchen with additional spacing in accordance with the present disclosure; and FIG. 149B is a pictorial diagram illustrating a top view of robotic arms extending from an overhead mount for use in a robotic kitchen with additional spacing in accordance with the present disclosure.

Figure 150A:
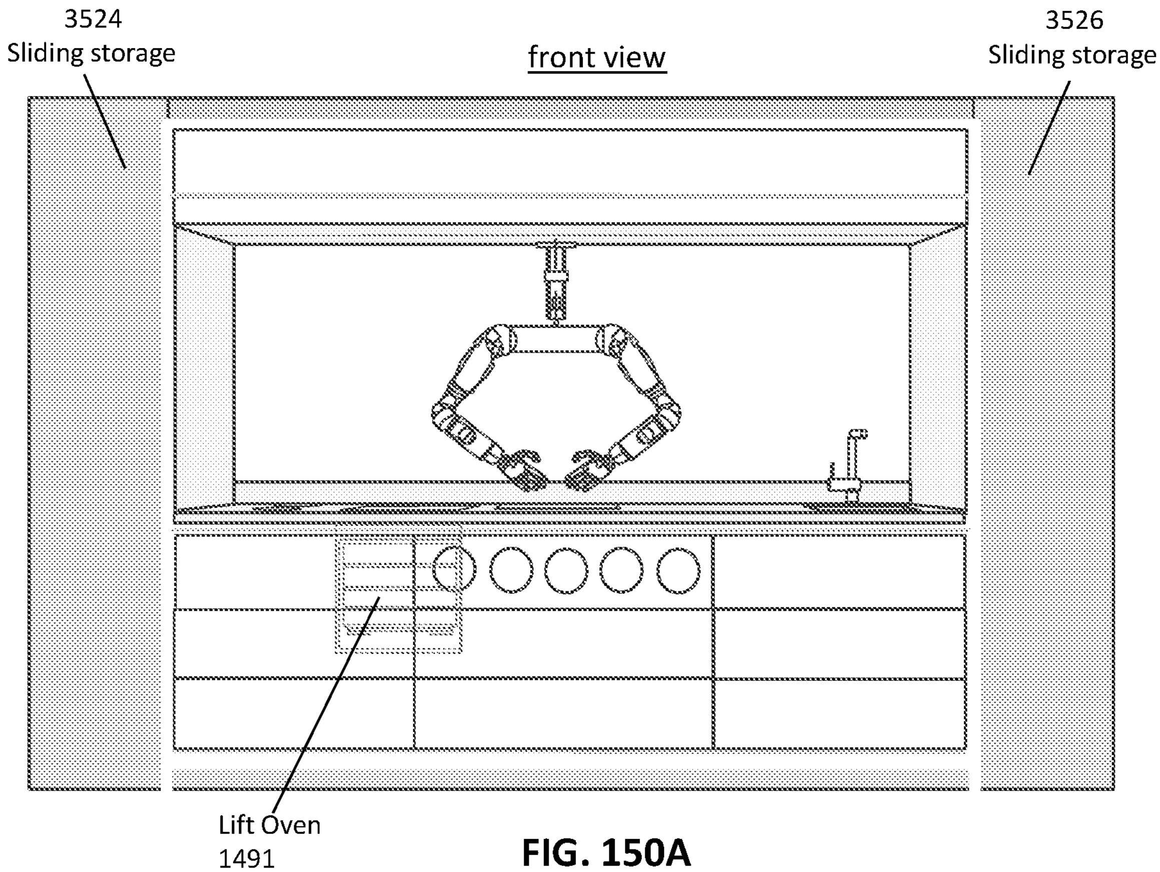
Figure 150B:
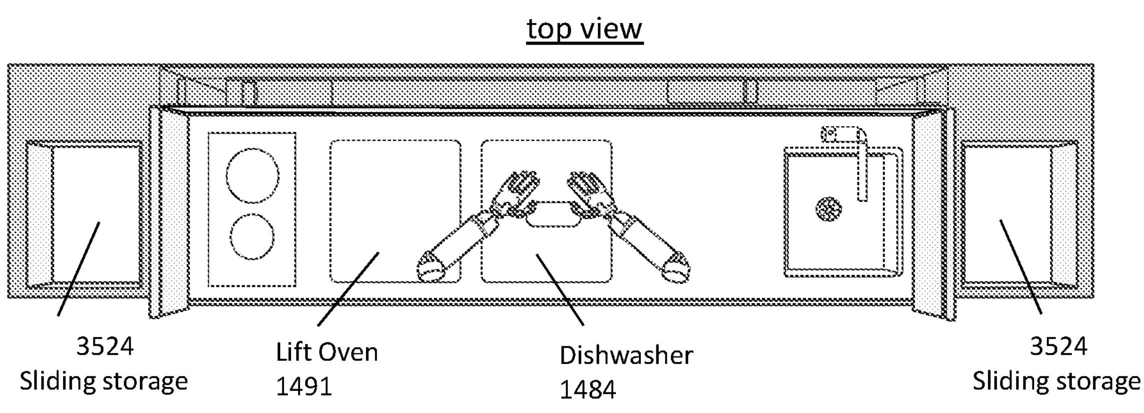

FIG. 150A is a pictorial diagram illustrating a front view robotic arms extending from an overhead mount for use in a robotic kitchen with sliding storages in accordance with the present disclosure; and FIG. 150B is a pictorial diagram illustrating a top view robotic arms extending from an overhead mount for use in a robotic kitchen with sliding storages in accordance with the present disclosure.

Figure 151A:
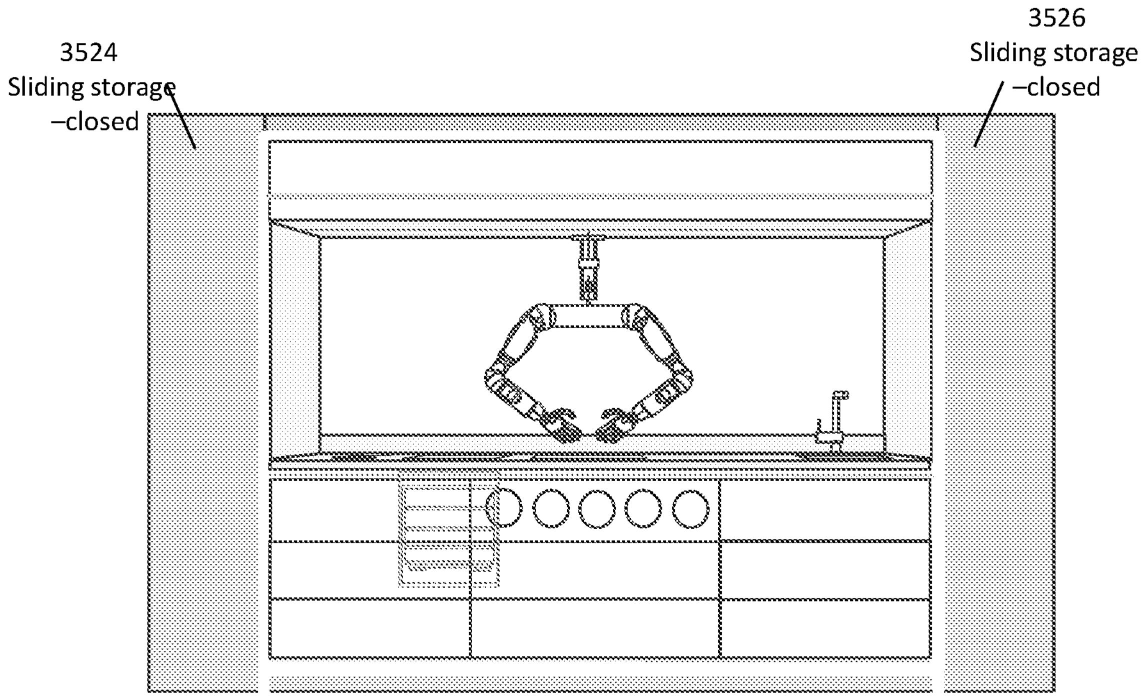
Figure 151B:
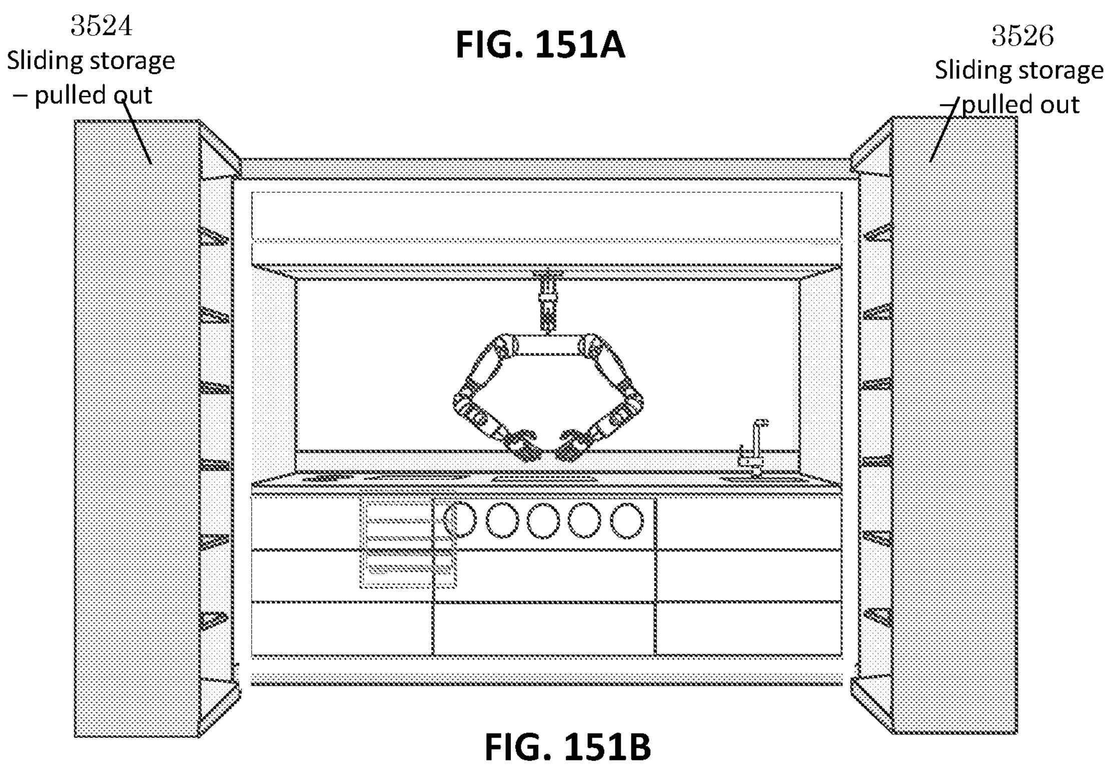
Figure 152:
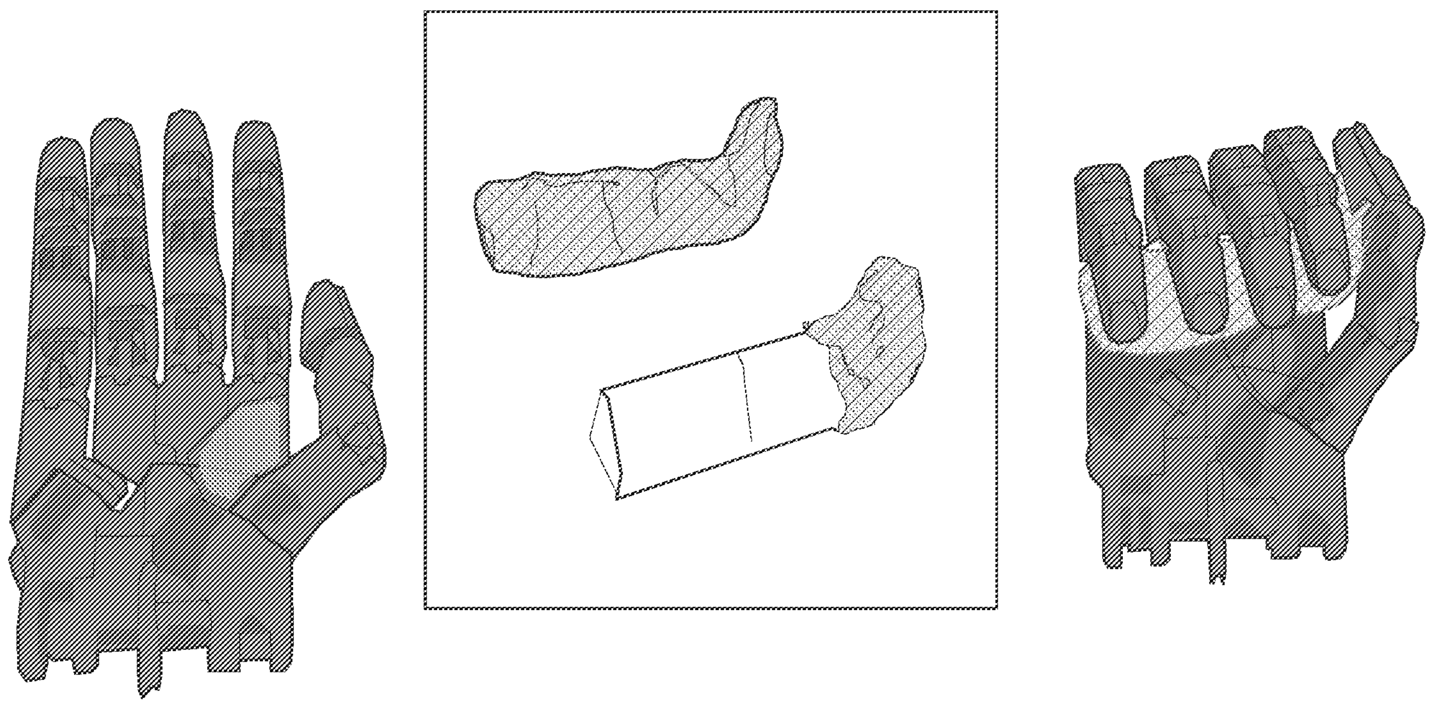
Figure 153:
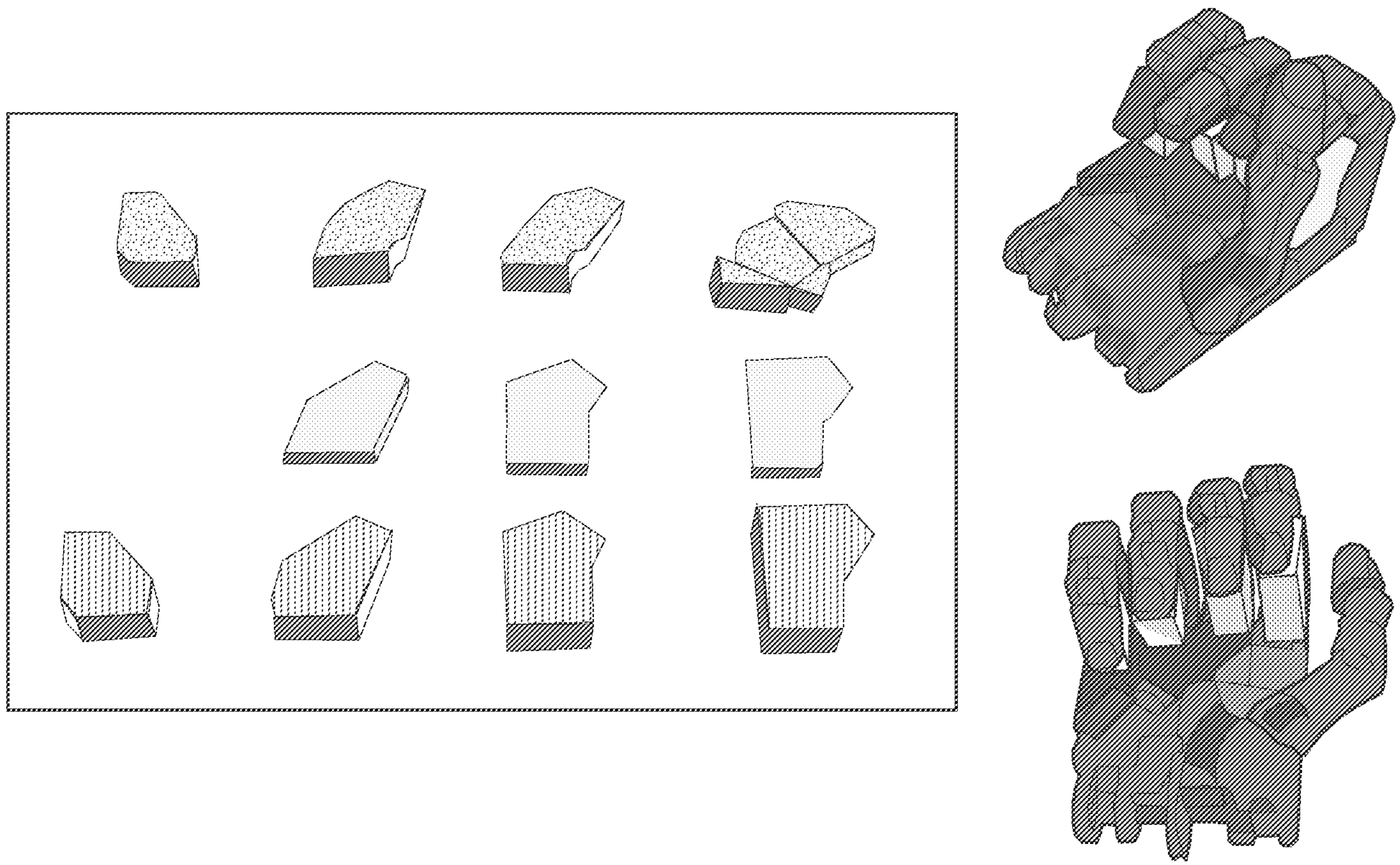
Figure 154:
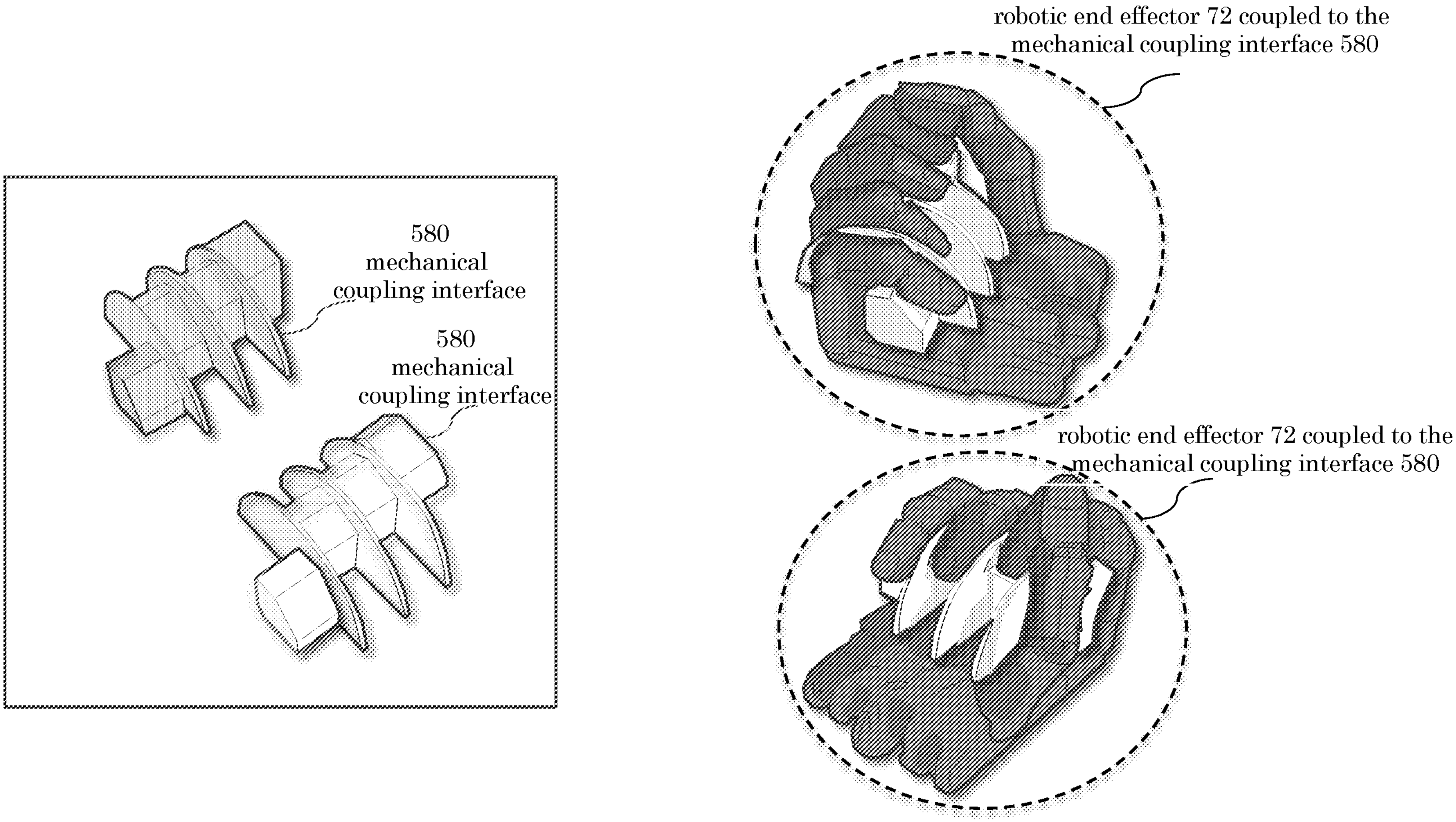
Figure 155:
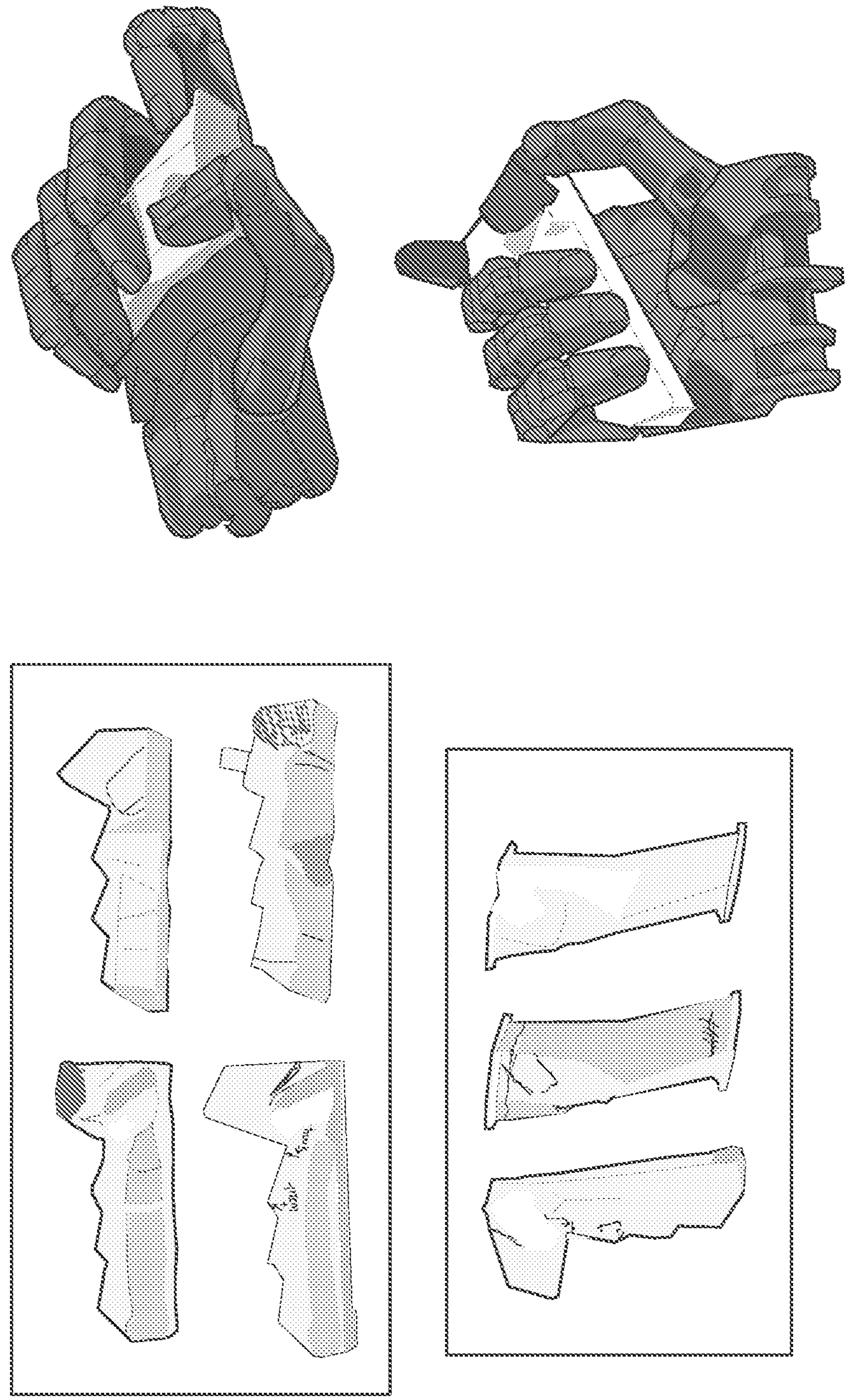
Figure 156:
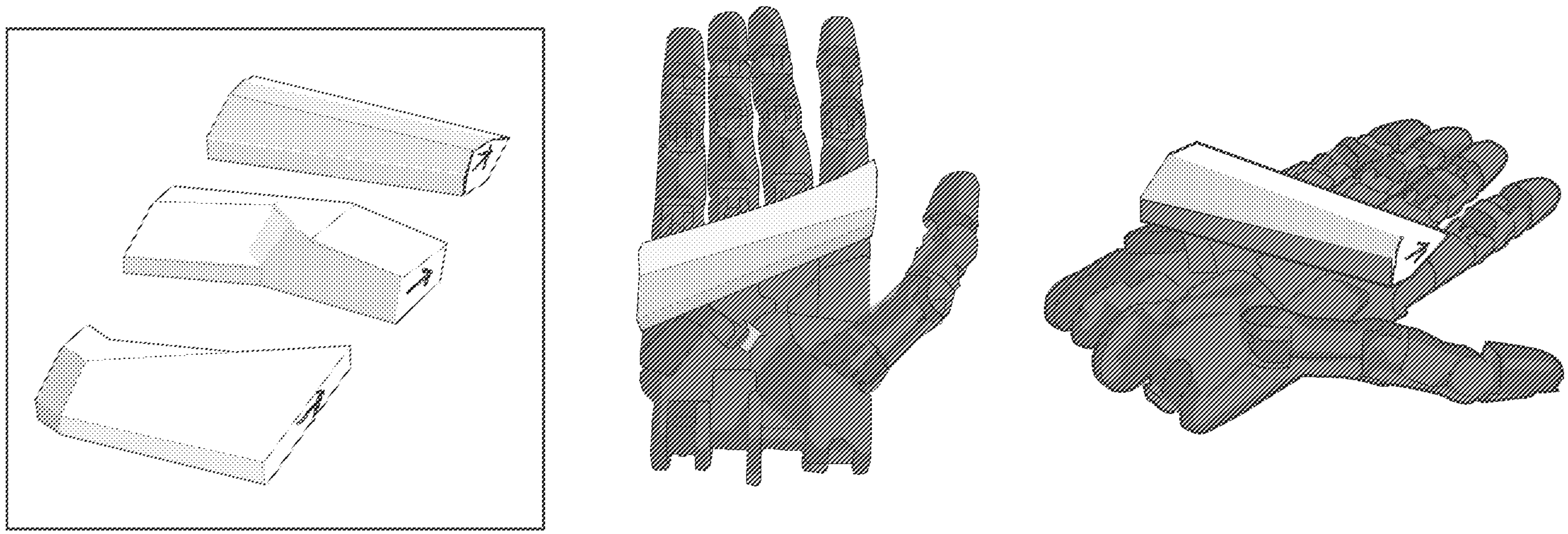
Figure 157:
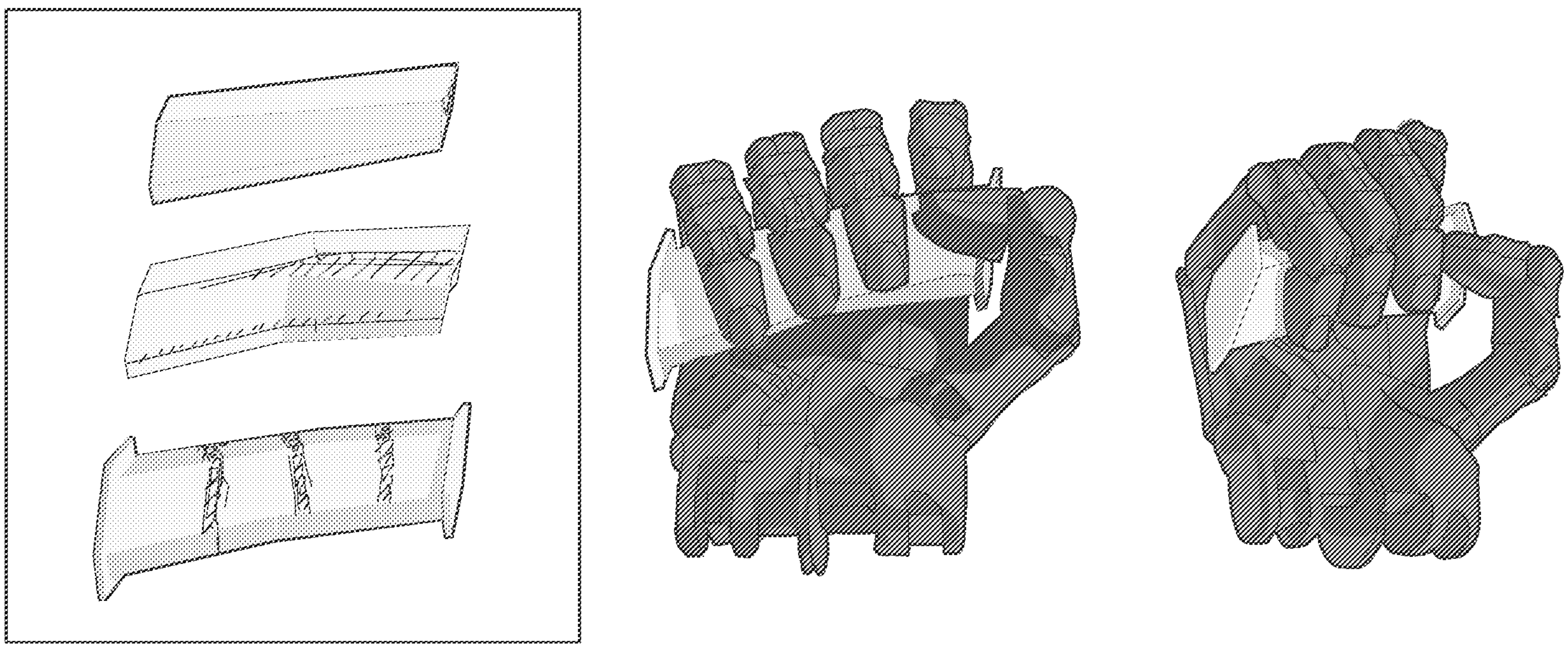
Figure 158:
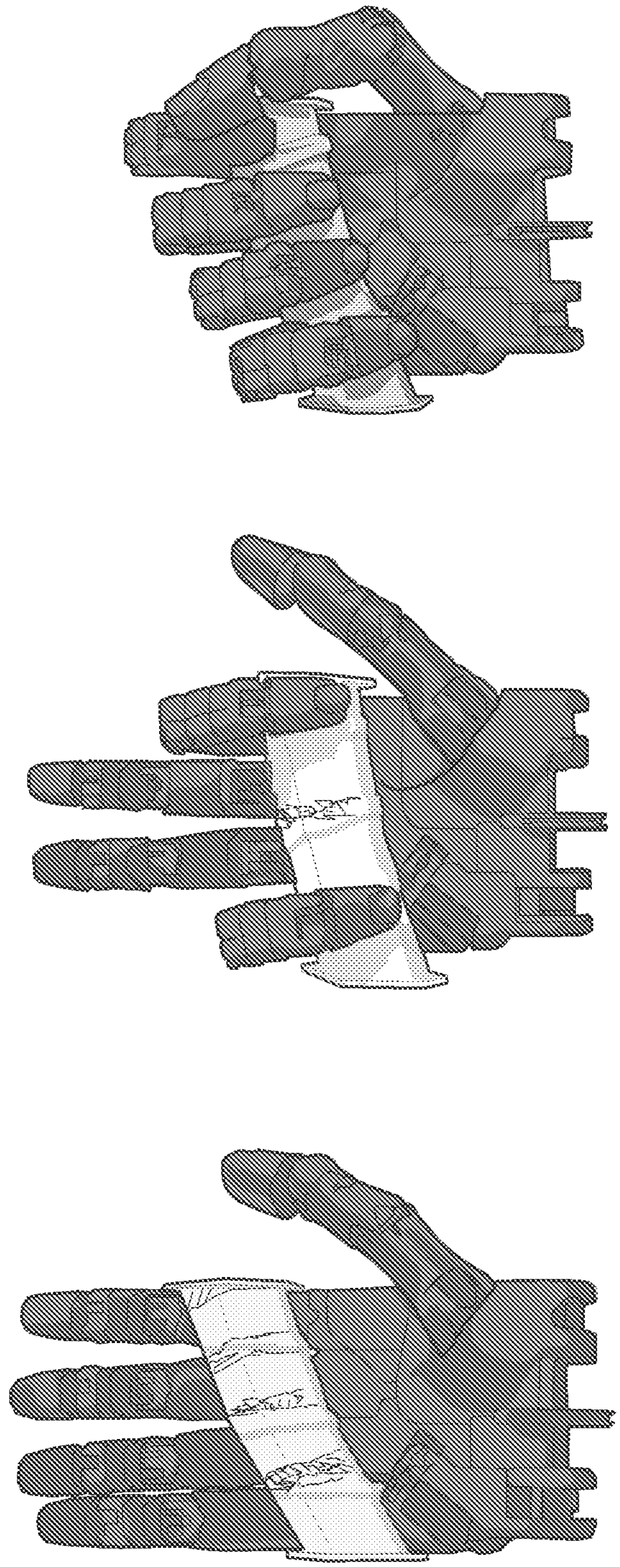
Figure 159:
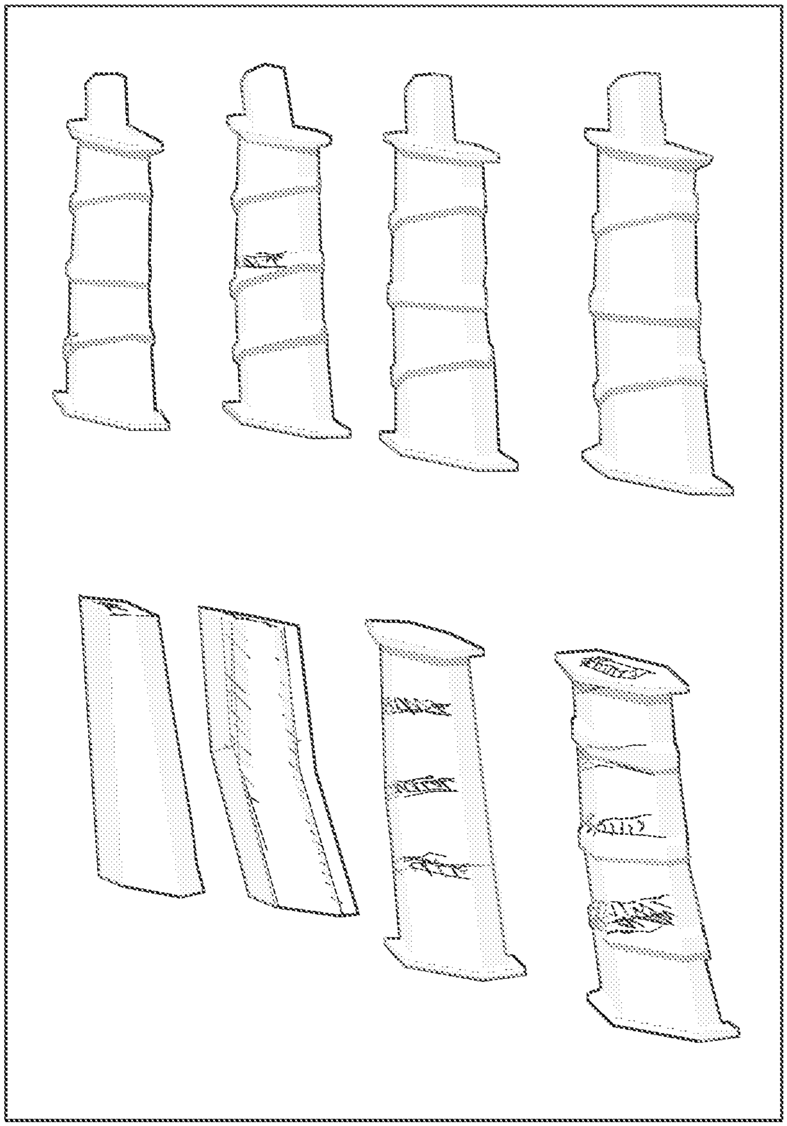
Figure 160:
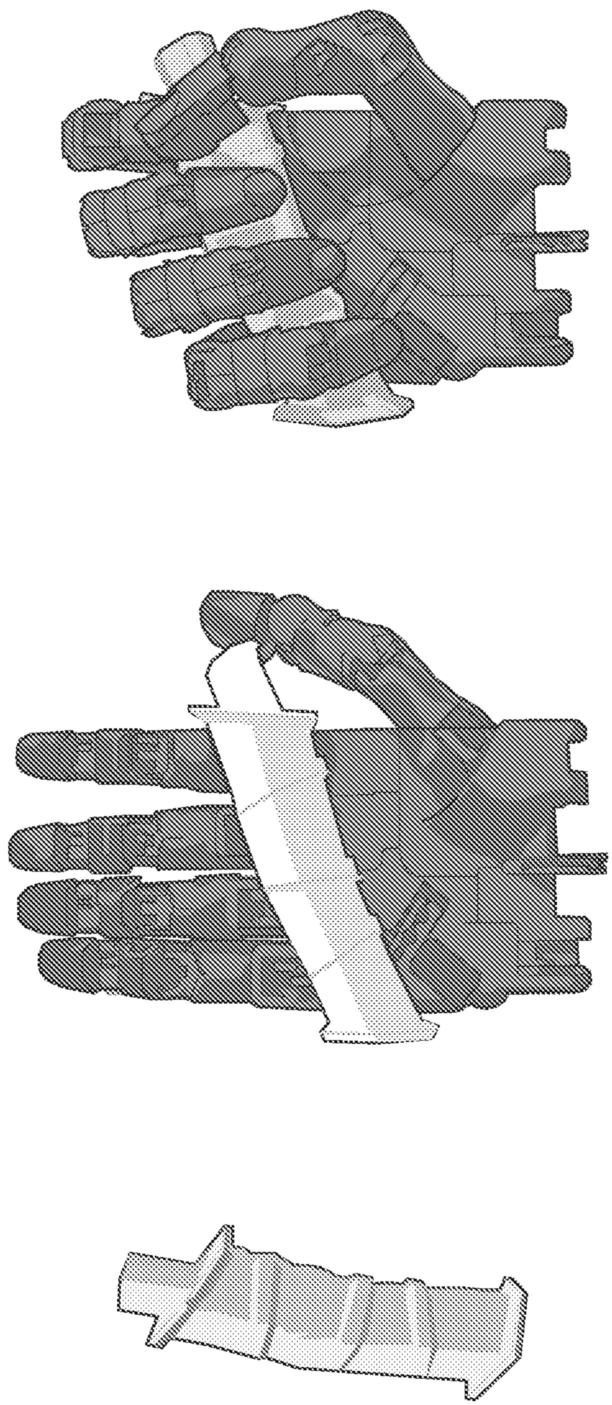
Figure 161:
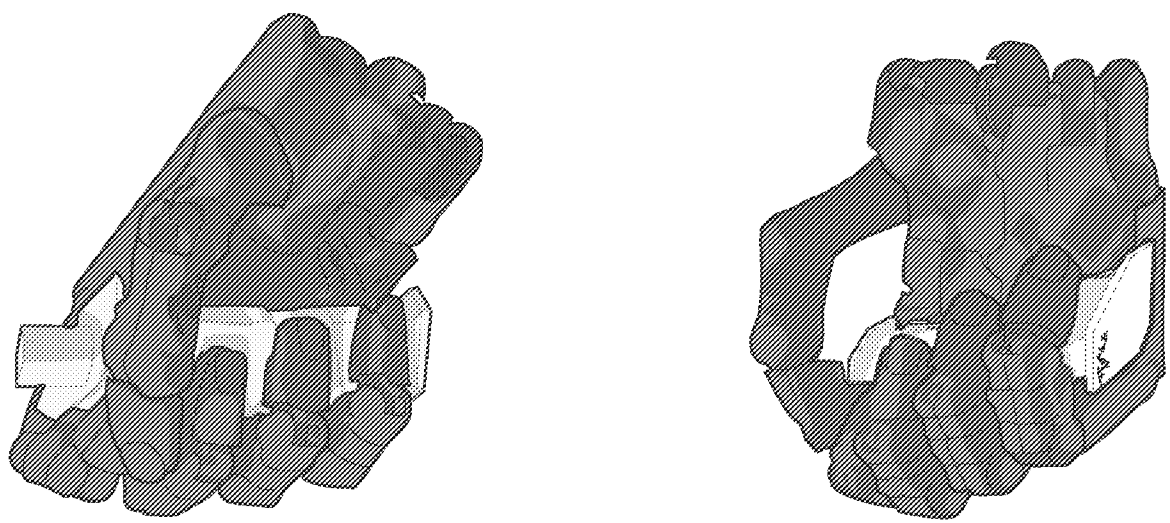

FIG. 151A is a pictorial diagram illustrating a front view robotic arms extending from an overhead mount for use in a robotic kitchen with sliding storages having shelves in accordance with the present disclosure; and FIG. 151B is a pictorial diagram illustrating a top view robotic arms extending from an overhead mount for use in a robotic kitchen with sliding storages having shelves in accordance with the present disclosure.

FIGS. 152-161 are pictorial diagrams of the various embodiments of robotic gripping options in accordance with the present disclosure.

Figure 162A:
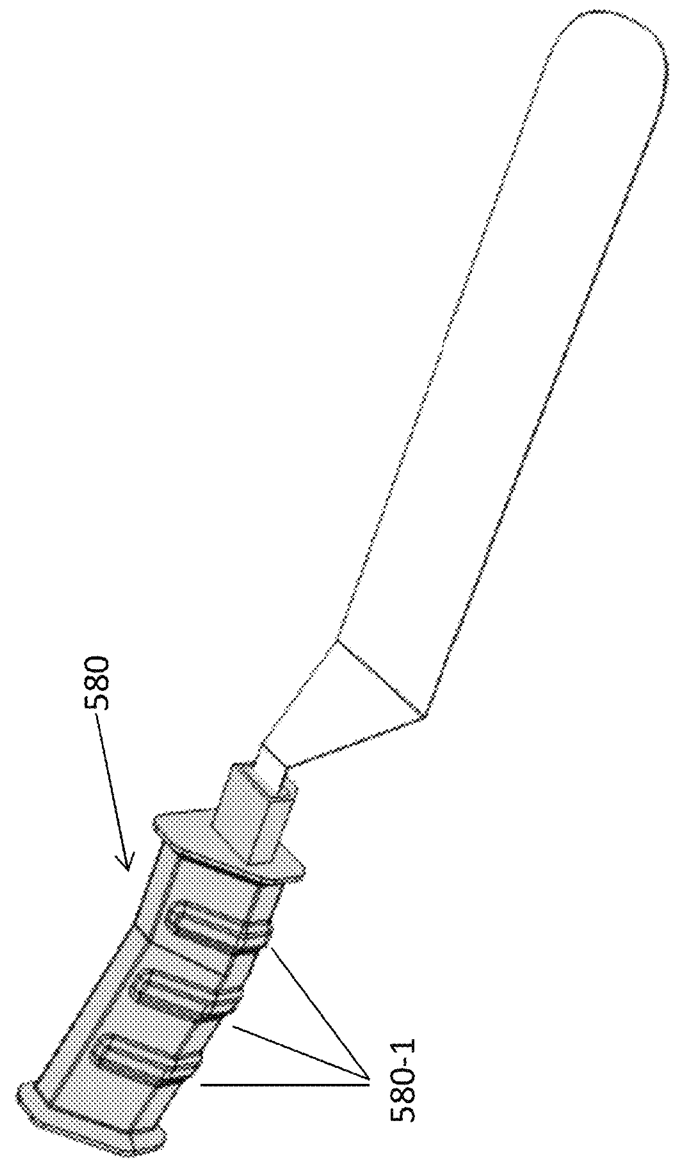
Figure 162B:
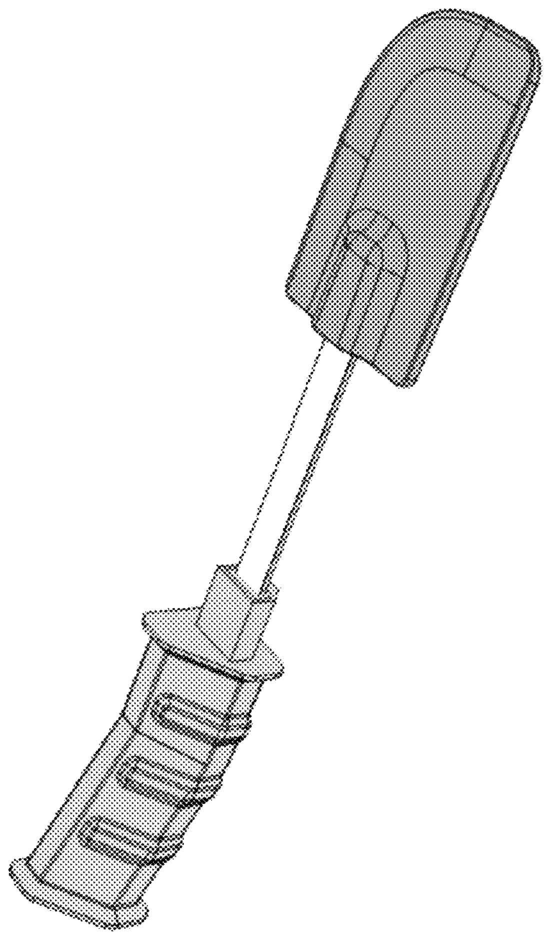
Figure 162C:
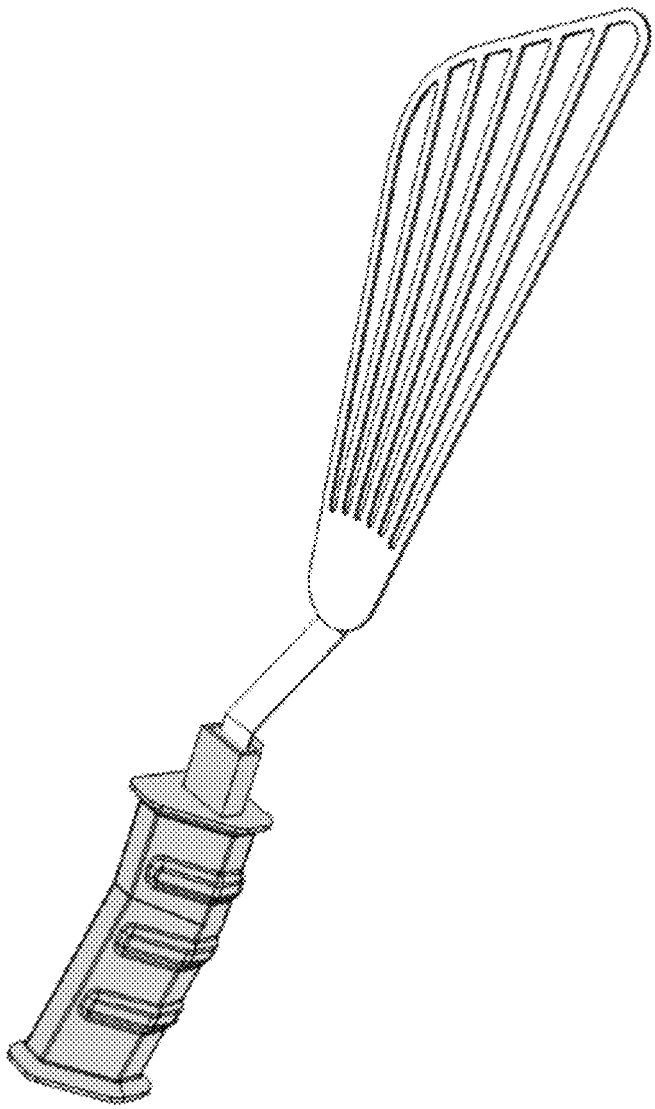
Figure 162D:
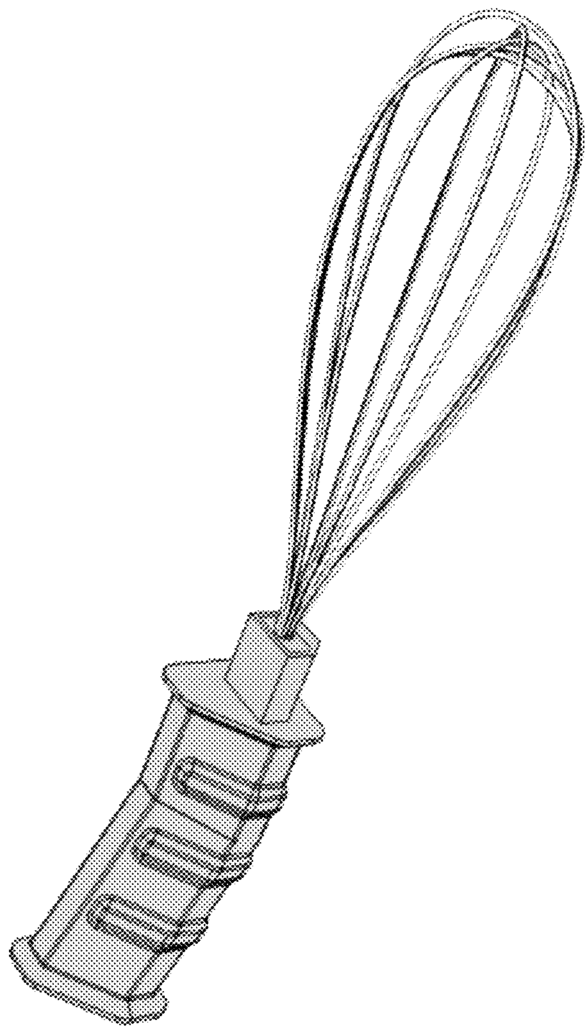
Figure 162E:
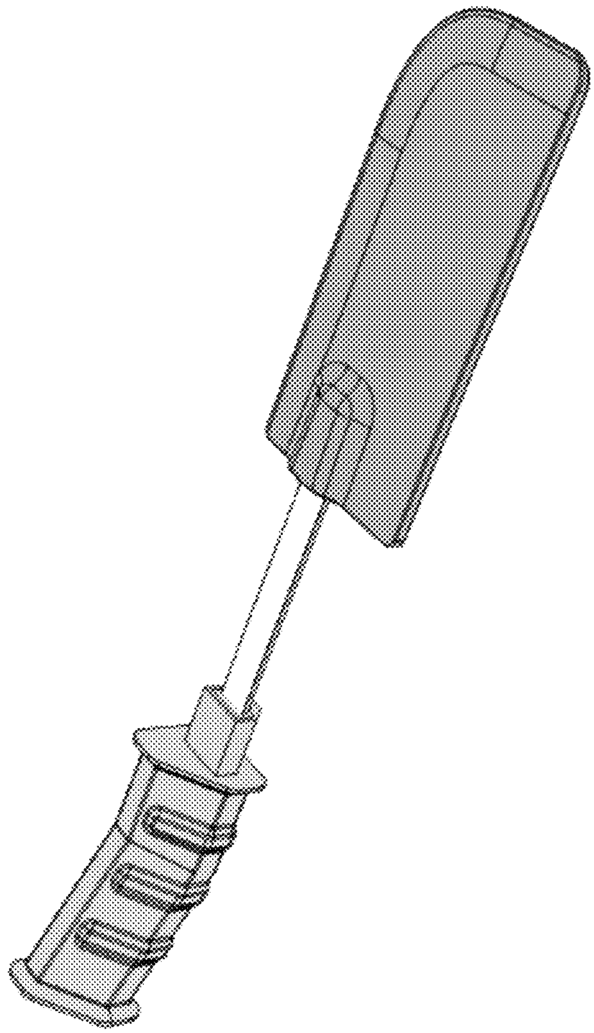
Figure 162F:
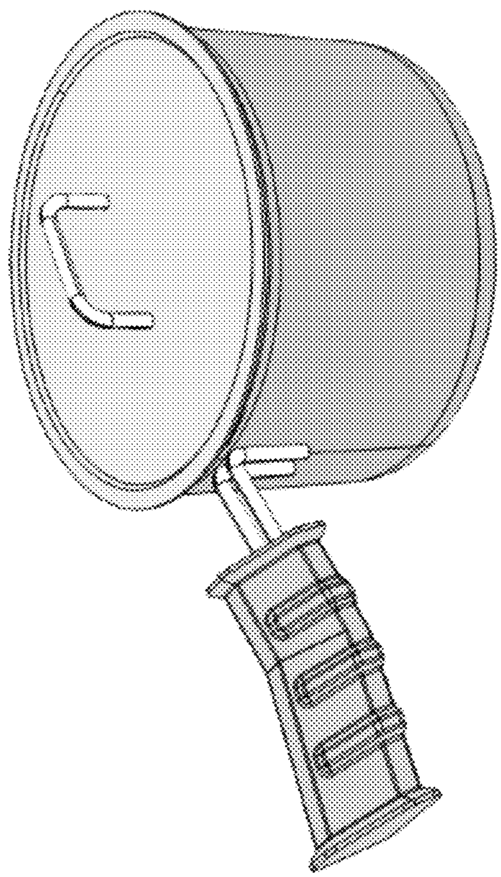
Figure 162G:
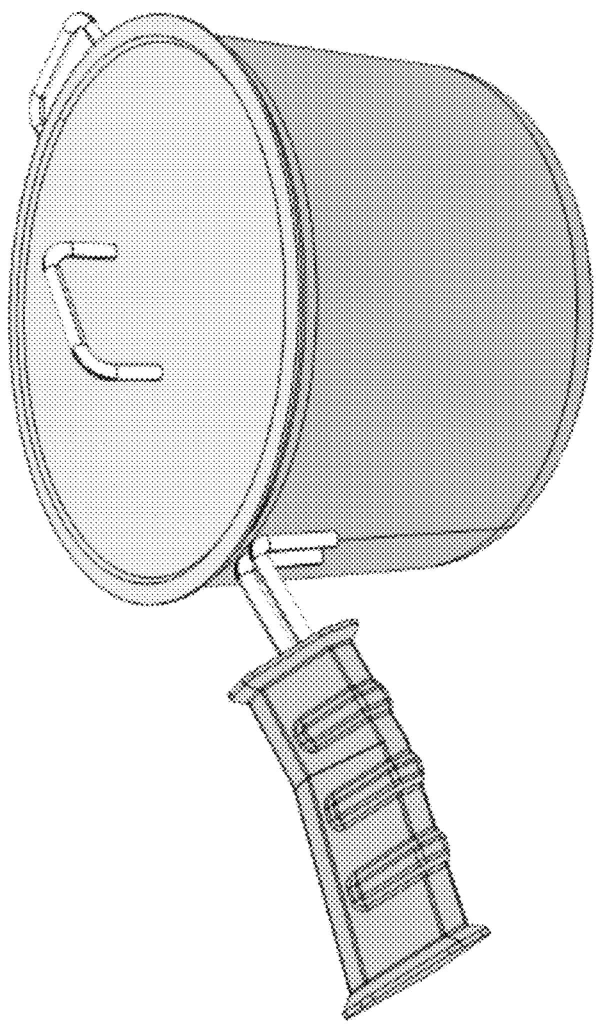
Figure 162H:
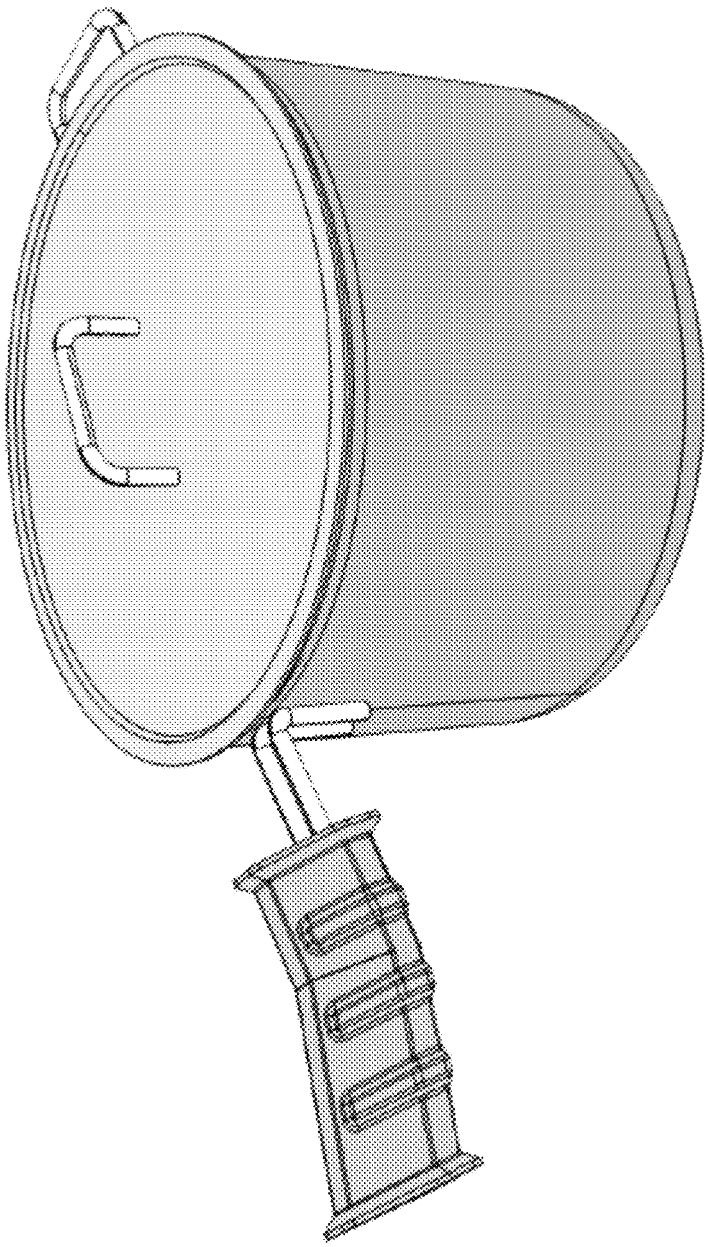
Figure 162I:
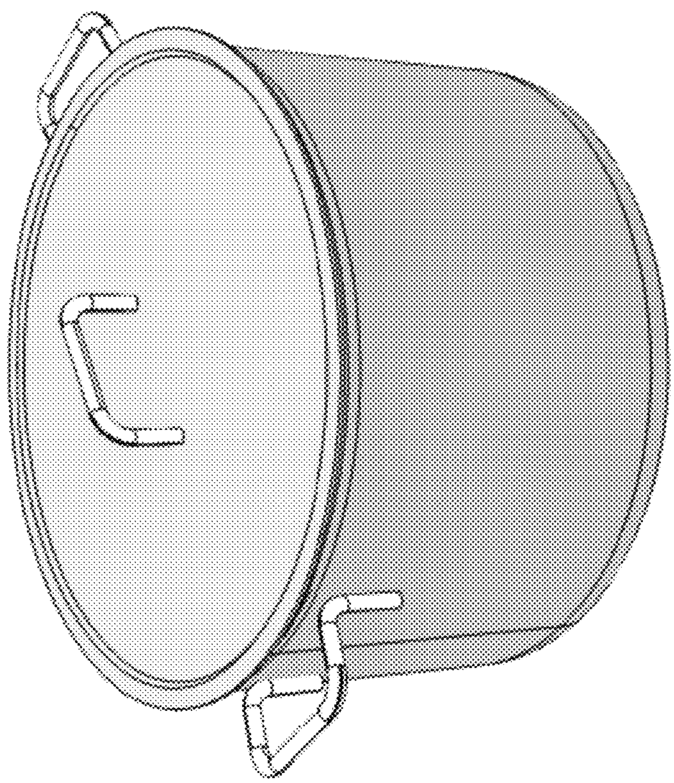
Figure 162J:
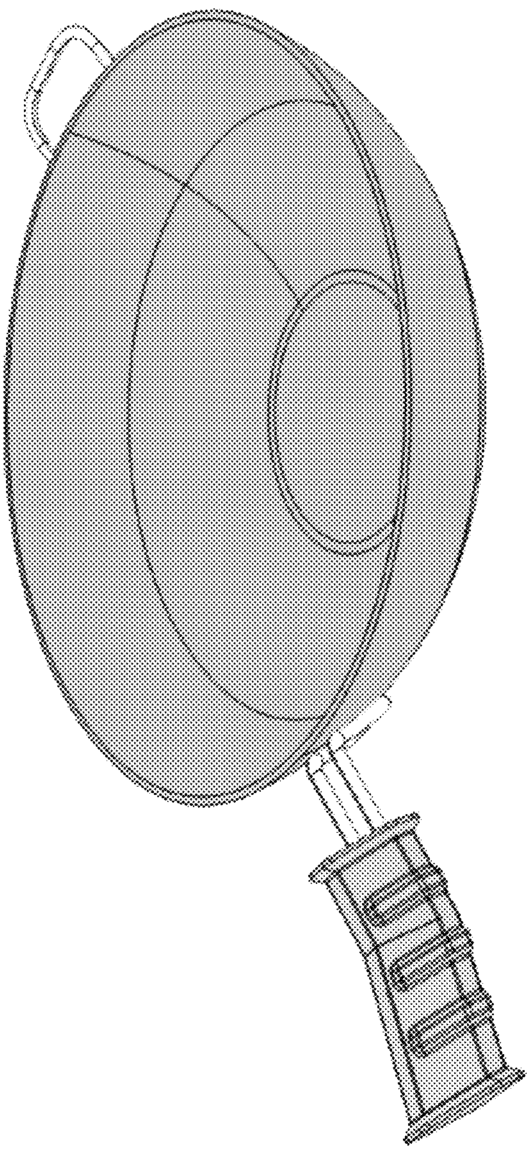
Figure 162K:
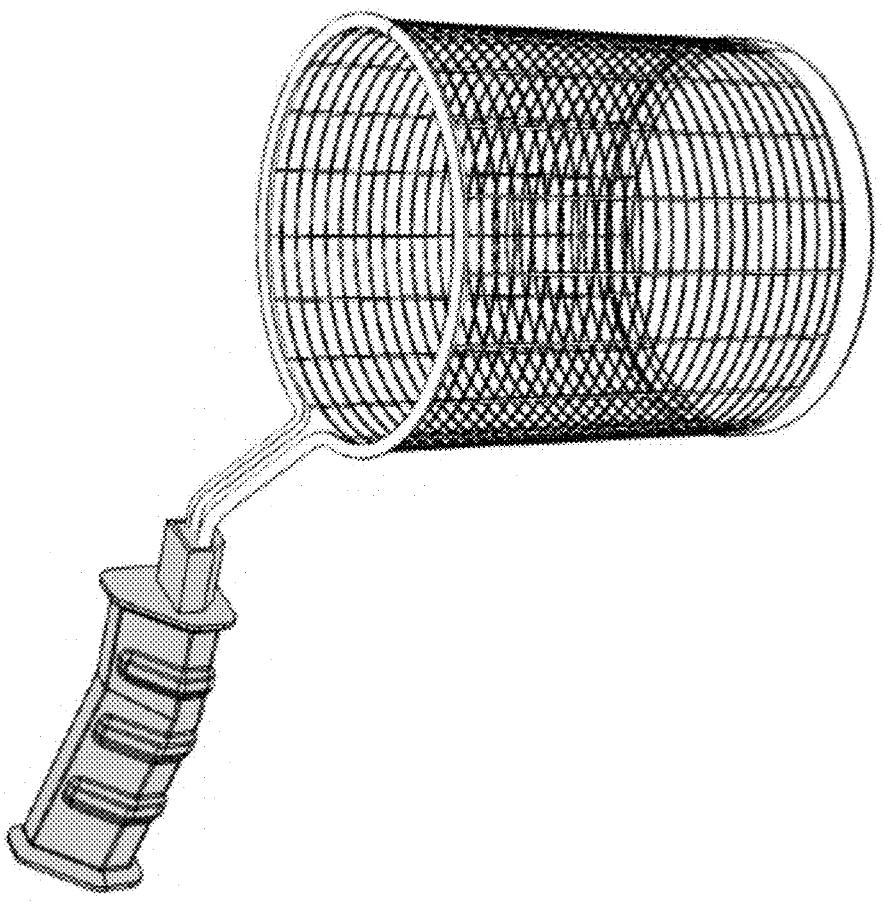
Figure 162L:
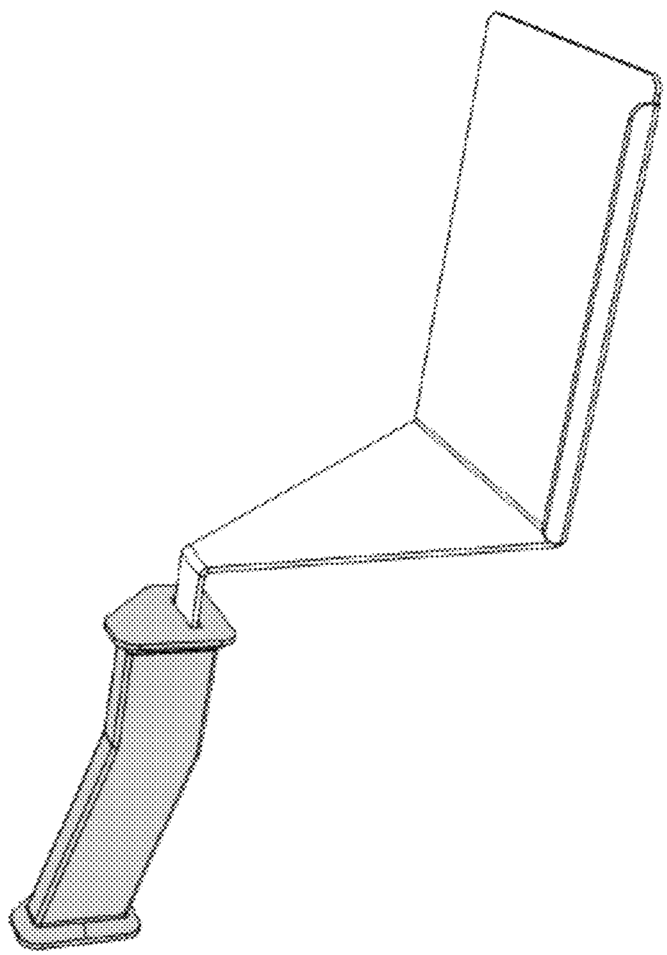
Figure 162M:
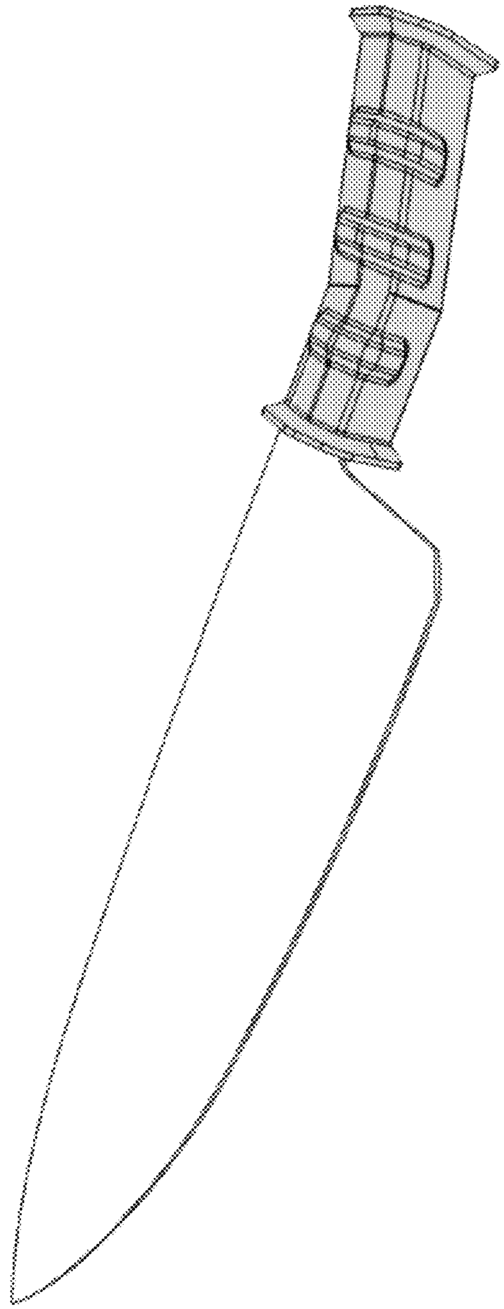
Figure 162N:
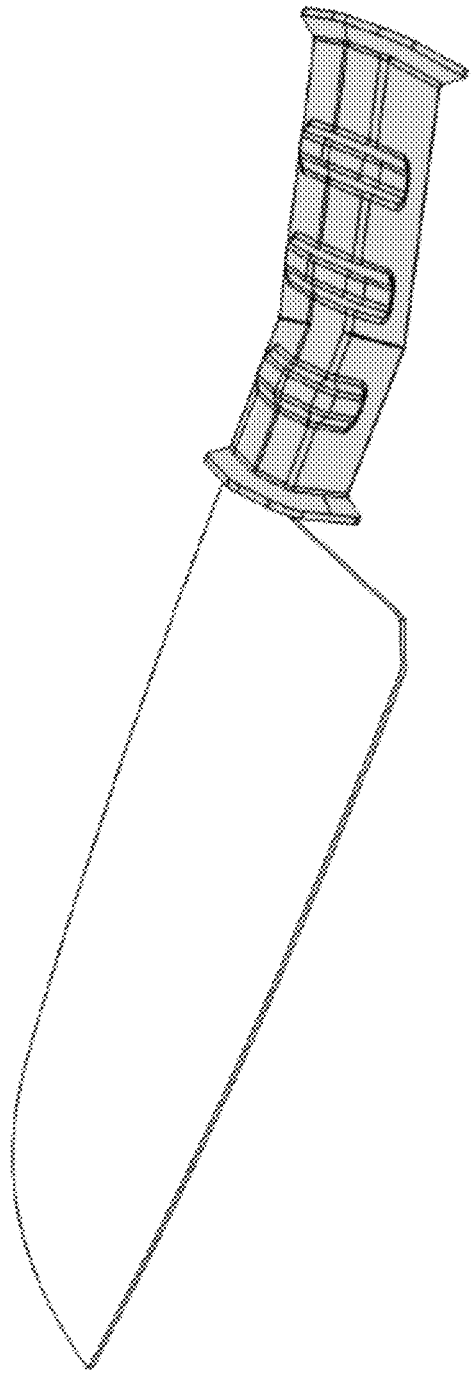
Figure 162O:
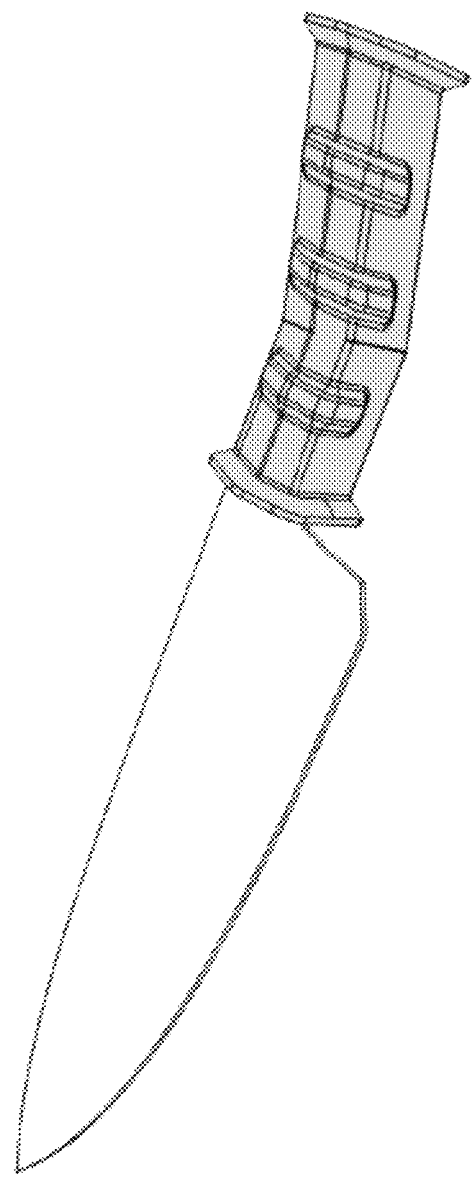
Figure 162P:
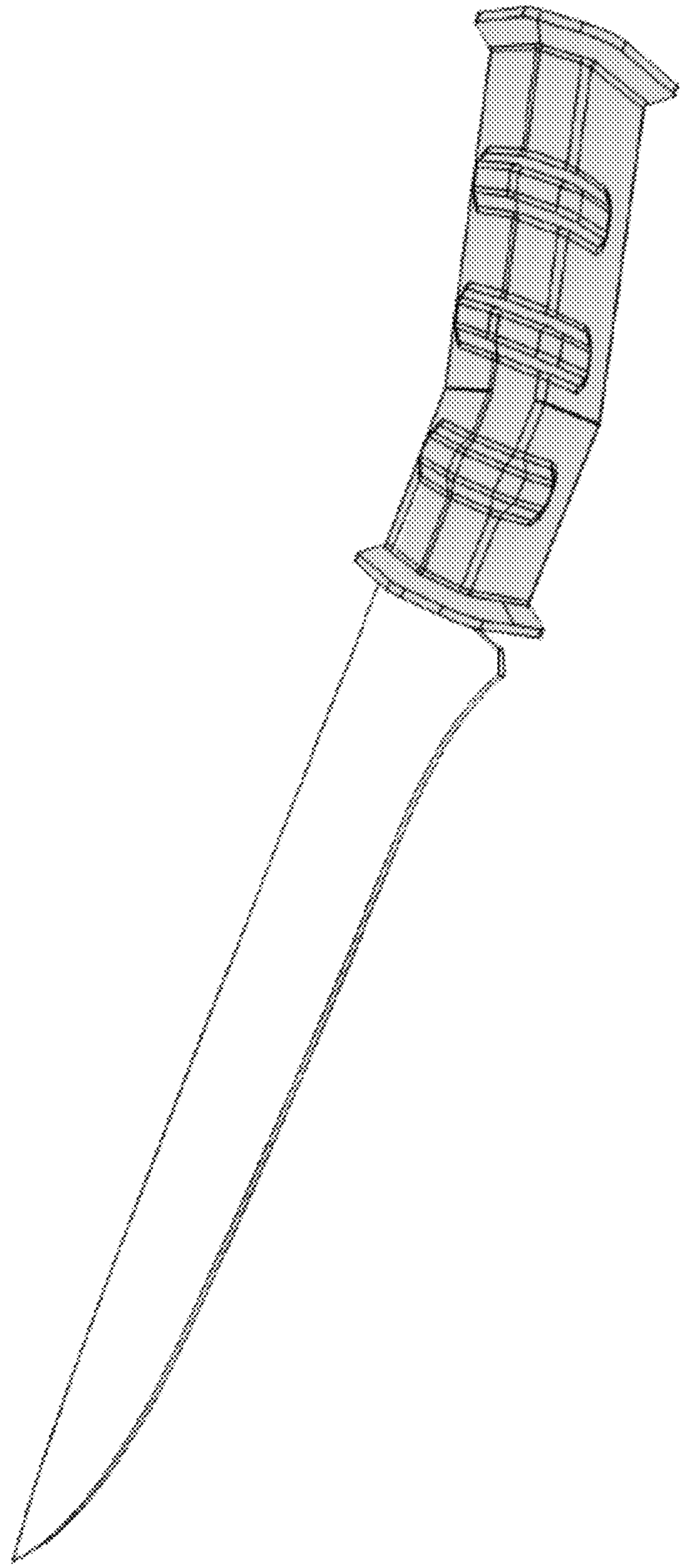
Figure 162Q:
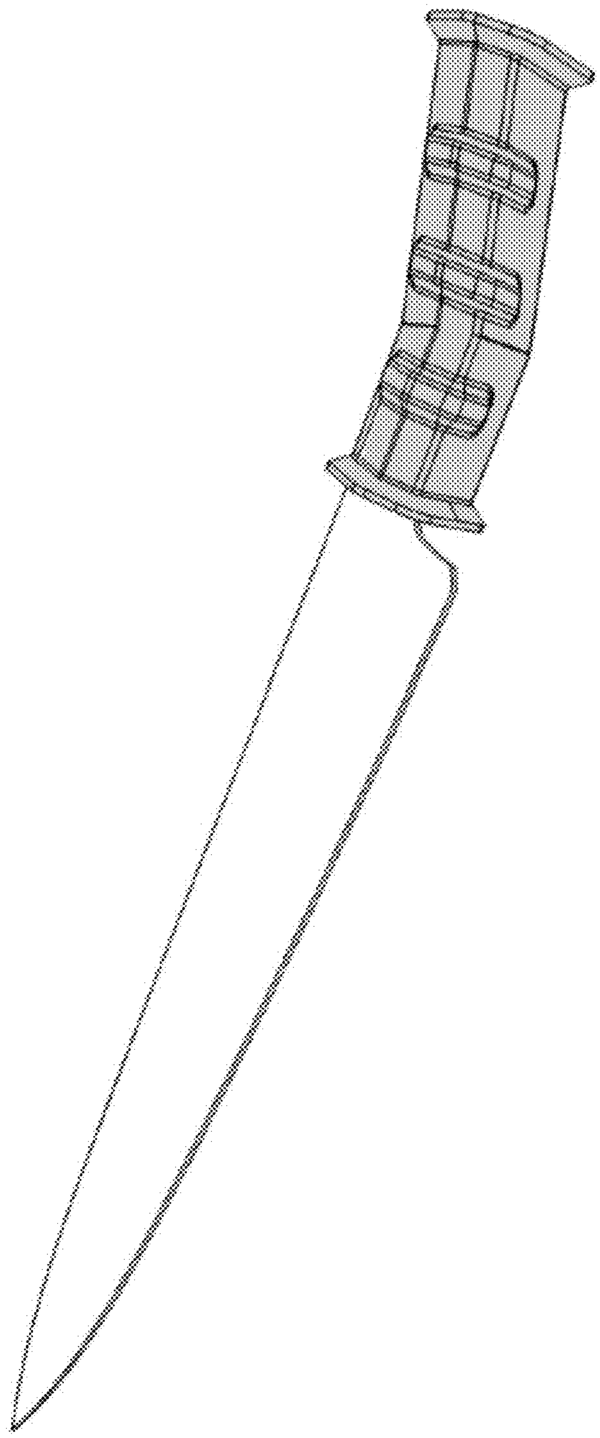
Figure 162R:
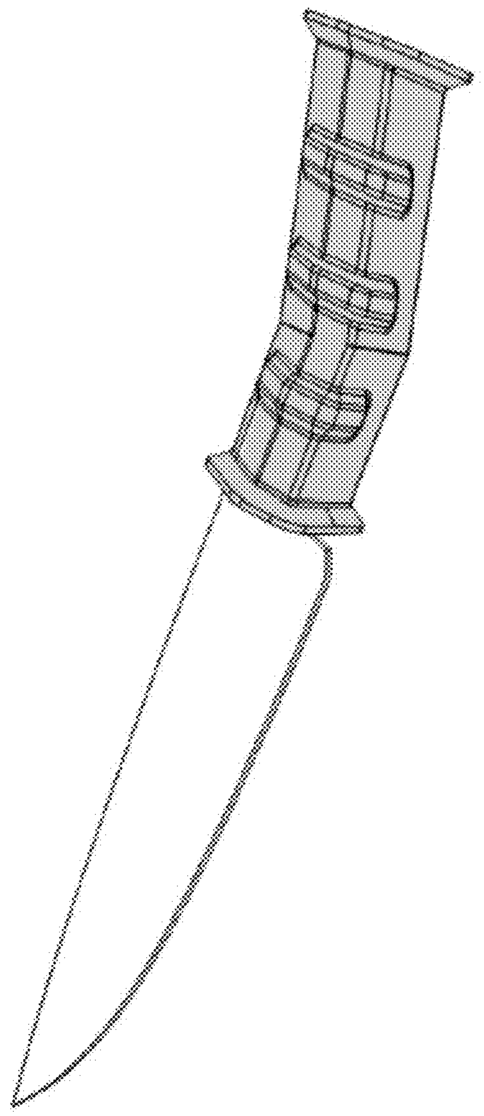
Figure 162S:
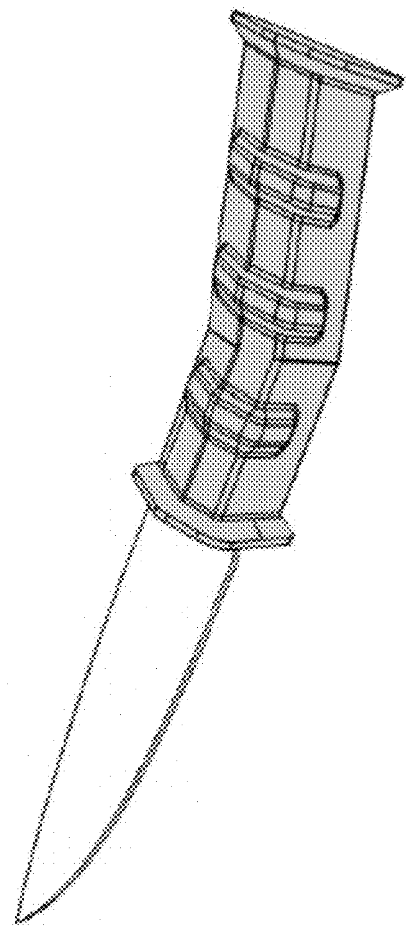

FIGS. 162A-S are pictorial diagrams illustrating a cookware handle suitable for the robotic hand to attach to various kitchen utensils and cookware in accordance with the present disclosure.

Figure 163:
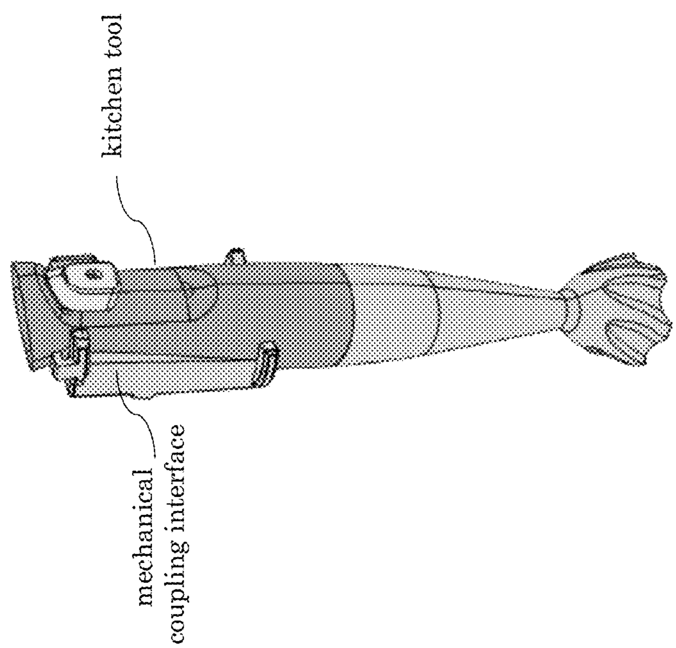

FIG. 163 is a pictorial diagram of a blender portion for use in the robotic kitchen in accordance with the present disclosure.

Figure 164A:
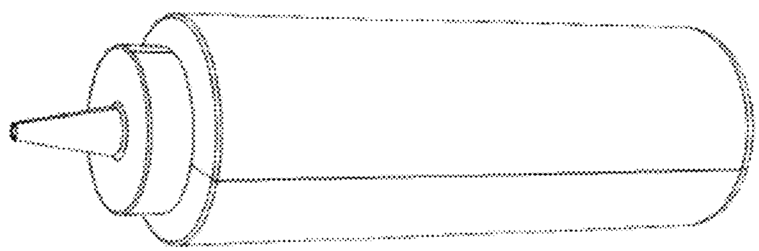
Figure 164B:
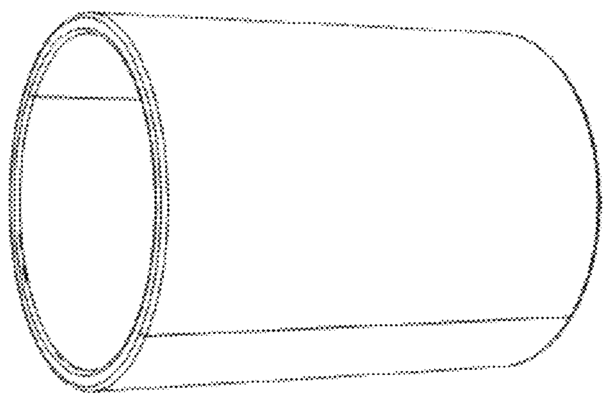
Figure 164C:
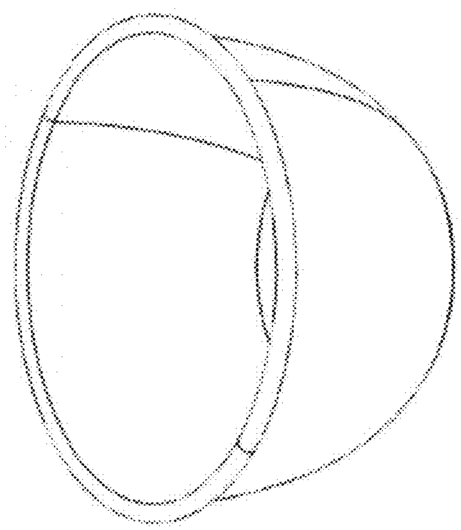

FIGS. 164A-C are pictorial diagrams illustrating the various kitchen holders for use in the robotic kitchen in accordance with the present disclosure.

FIGS. 165A-V are block diagram illustrating examples of manipulations but do not limit the present disclosure.

FIGS. 166A-L illustrate sample types of kitchen equipment in Table A in accordance with the present disclosure.

FIGS. 167A-167V illustrate sample types of ingredients in Table B in accordance with the present disclosure.

FIGS. 168A-168Z illustrate sample lists of food preparation, methods, equipment, and cuisine in Table C in accordance with the present disclosure.

FIG. 169A-Z15 illustrate a variety of sample bases in Table C in accordance with the present disclosure.

FIGS. 170A-170C illustrate sample types of cuisine and food dishes in Table D in accordance with the present disclosure.

FIGS. 171A-E illustrate one embodiment of robotic food preparation system in Table E in accordance with the present disclosure.

FIGS. 172A-C illustrate sample minimanipulations that a robot executes including a robot making sushi, a robot playing piano, a robot moving a robot by moving from a first position to a second position, a robot jumping from a first position to a second position, a humanoid taking a book from book shelf, a humanoid bringing a bag from a first position to a second position, a robot opening a jar, and a robot putting food in a bowl for a cat to consume in accordance with the present disclosure.

FIGS. 173A-I illustrate sample multi-level minimanipulations for a robot to perform including measurement, lavage, supplemental oxygen, maintenance of body temperature, catheterization, physiotherapy, hygienic procedures, feeding, sampling for analyses, care of stoma and catheters, care of a wound, and methods of administering drugs in accordance with the present disclosure.

FIG. 174 illustrates sample multi-level minimanipulations for a robot to perform intubation, resuscitation/cardiopulmonary resuscitation, replenishment of blood loss, hemostasis, emergency manipulation on trachea, fracture of bone, and wound closure in accordance with the present disclosure.

FIG. 175 illustrates a list of sample medical equipment and medical device list in accordance with the present disclosure.

FIGS. 176A-B illustrate a sample nursery service with minimanipulations in accordance with the present disclosure.

FIG. 177 illustrates another equipment list in accordance with the present disclosure.

Figure 178:
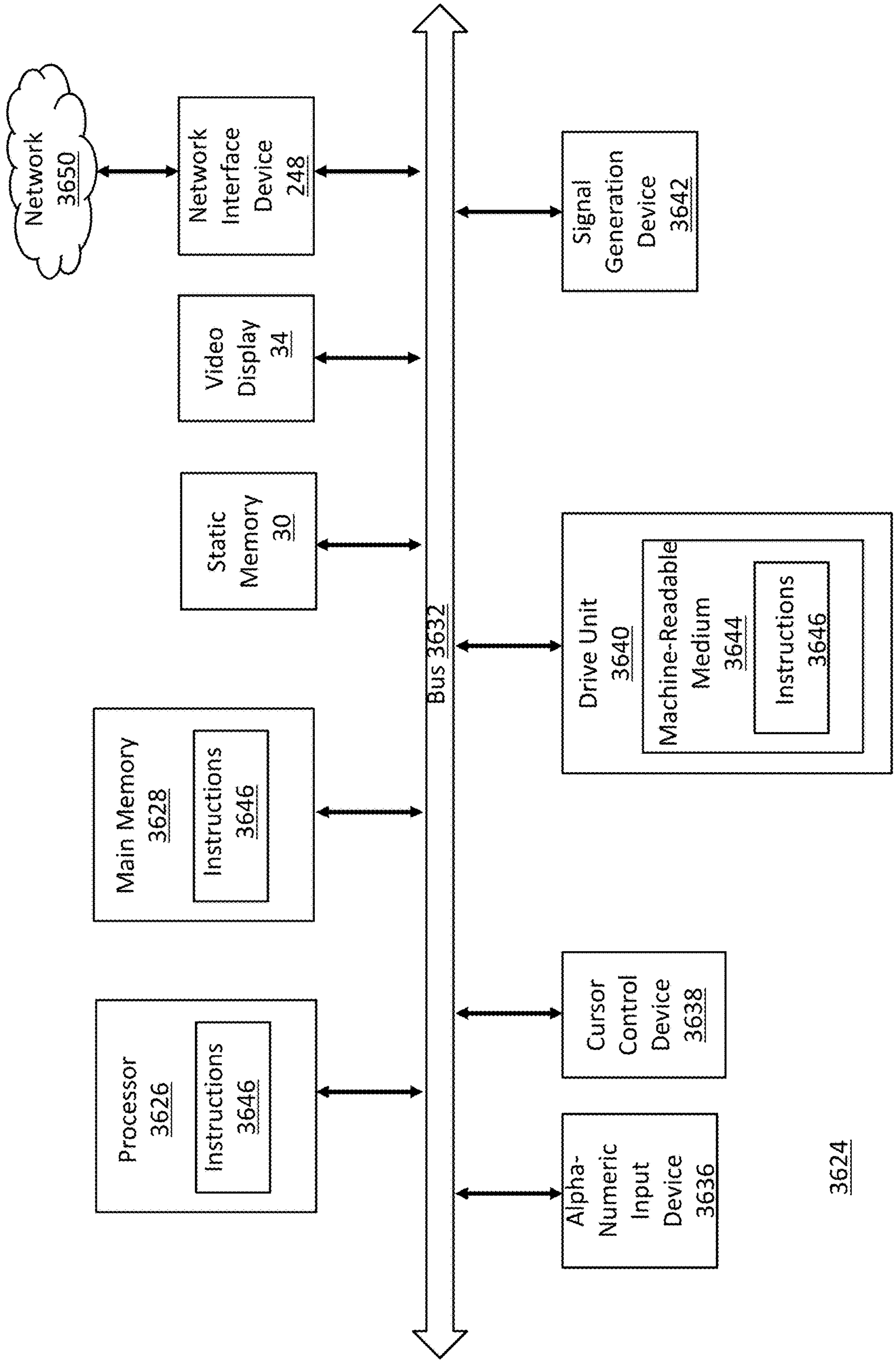

FIG. 178 is a block diagram illustrating an example of a computer device on which computer-executable instructions perform the robotic methodologies discussed herein and which may be installed and executed.

DETAILED DESCRIPTION

Figure 1:
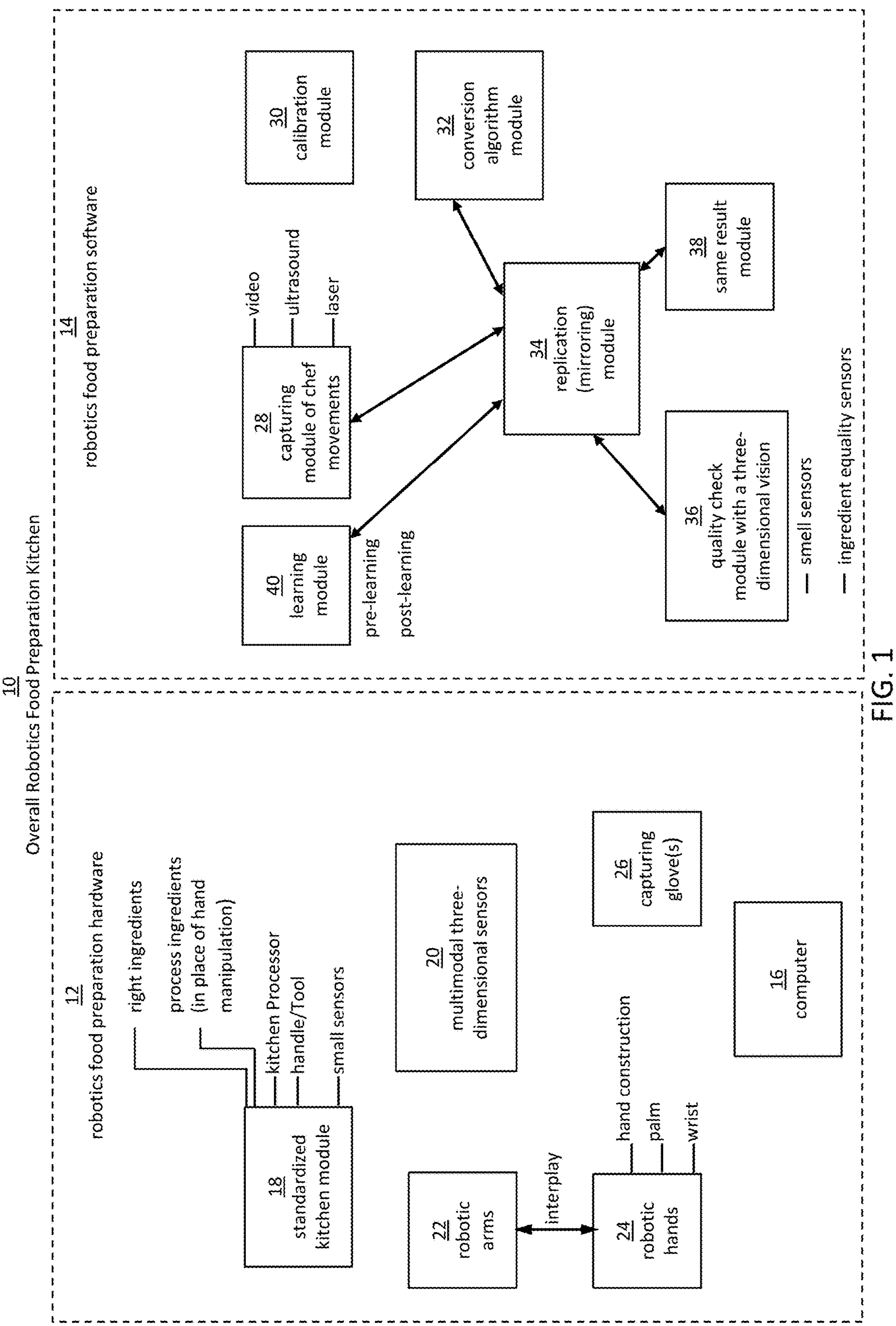
FIG. 1 is a system diagram illustrating an overall robotic food preparation kitchen with hardware and software in accordance with the present disclosure.

A description of structural embodiments and methods of the present disclosure is provided with reference to FIGS. 1-178. It is to be understood that there is no intention to limit the disclosure to the specifically disclosed embodiments but that the disclosure may be practiced using other features, elements, methods, and embodiments. Like elements in various embodiments are commonly referred to with like reference numerals.

The following definitions apply to the elements and steps described herein. These terms may likewise be expanded upon.

Abstraction Data—refers to the abstraction recipe of utility for machine-execution, which has many other data-elements that a machine needs to know for proper execution and replication. This so-called meta-data, or additional data corresponding to a particular step in the cooking process, whether it be direct sensor-data (clock-time, water-temperature, camera-image, utensil or ingredient used, etc.) or data generated through interpretation or abstraction of larger data-sets (such as a 3-Dimensional range cloud from a laser used to extract the location and types of objects in the image, overlaid with texture and color maps from a camera-picture, etc.). The meta-data is time-stamped and used by the robotic kitchen to set, control, and monitor all processes and associated methods and equipment needed at every point in time as it steps through the sequence of steps in the recipe.

Abstraction Recipe—refers to a representation of a chef's recipe, which a human knows as represented by the use of certain ingredients, in certain sequences, prepared and combined through a sequence of processes and methods, as well as skills of the human chef. An abstraction recipe used by a machine for execution in an automated way requires different types of classifications and sequences. While the overall steps carried out are identical to those of the human chef, the abstraction recipe of utility to the robotic kitchen requires that additional meta-data be a part of every step in the recipe. Such meta-data includes the cooking time and variables, such as temperature (and its variations over time), oven-setting, tool/equipment used, etc. Basically a machine-executable recipe-script needs to have all possible measured variables of import to the cooking process (all measured and stored while the human chef was preparing the recipe in the chef studio) correlated to time, both overall and that within each process-step of the cooking-sequence. Hence, the abstraction recipe is a representation of the cooking steps mapped into a machine-readable representation or domain, which takes the required process from the human-domain to that of the machine-understandable and machine-executable domain through a set of logical abstraction steps.

Acceleration—refers to the maximum rate of speed-change at which a robotic arm can accelerate around an axis or along a space-trajectory over a short distance.

Accuracy—refers to how closely a robot can reach a commanded position. Accuracy is determined by the difference between the absolute positions of the robot compared to the commanded position. Accuracy can be improved, adjusted, or calibrated with external sensing, such as sensors on a robotic hand or a real-time three-dimensional model using multiple (multi-mode) sensors.

Action Primitive—in one embodiment, the term refers to an indivisible robotic action, such as moving the robotic apparatus from location X1 to location X2, or sensing the distance from an object for food preparation without necessarily obtaining a functional outcome. In another embodiment, the term refers to an indivisible robotic action in a sequence of one or more such units for accomplishing a minimanipulation. These are two aspects of the same definition.

Automated Dosage System—refers to dosage containers in a standardized kitchen module where a particular size of food chemical compounds (such as salt, sugar, pepper, spice, any kind of liquids, such as water, oil, essences, ketchup, etc.) is released upon application.

Automated Storage and Delivery System—refers to storage containers in a standardized kitchen module that maintain a specific temperature and humidity for storing food; each storage container is assigned a code (e.g., a bar code) for the robotic kitchen to identify and retrieve where a particular storage container delivers the food contents stored therein.

Data Cloud—refers to a collection of sensor or data-based numerical measurement values from a particular space (three-dimensional laser/acoustic range measurement, RGB-values from a camera image, etc.) collected at certain intervals and aggregated based on a multitude of relationships, such as time, location, etc.

Degree of Freedom ("DOF")—refers to a defined mode and/or direction in which a mechanical device or system can move. The number of degrees of freedom is equal to the total number of independent displacements or aspects of motion. The total number of degrees of freedom is doubled for two robotic arms.

Edge Detection—refers to a software-based computer program(s) capable of identifying the edges of multiple objects that may be overlapping in a two-dimensional-image of a camera yet successfully identifying their boundaries to aid in object identification and planning for grasping and handling.

Equilibrium Value—refers to the target position of a robotic appendage, such as a robotic arm where the forces acting upon it are in equilibrium, i.e. there is no net force and thus no net movement.

Execution Sequence Planner—refers to a software-based computer program(s) capable of creating a sequence of execution scripts or commands for one or more elements or systems capable of being computer controlled, such as arm(s), dispensers, appliances, etc.

Food Execution Fidelity—refers to a robotic kitchen, which is intended to replicate the recipe-script generated in the chef studio by watching, measuring, and understanding the steps, variables, methods, and processes of the human chef, thereby trying to emulate his/her techniques and skills. The fidelity of how close the execution of the dish-preparation comes to that of the human-chef is measured by how close the robotically-prepared dish resembles the human-prepared dish as measured by a variety of subjective elements, such as consistency, color, taste, etc. The notion is that the more closely the dish prepared by the robotic kitchen is to that prepared by the human chef, the higher the fidelity of the replication process.

Food Preparation Stage (also referred to as "Cooking Stage")—refers to a combination, either sequential or in parallel, of one or more minimanipulations including action primitives, and computer instructions for controlling the various kitchen equipment and appliances in the standardized kitchen module. One or more food preparation stages collectively represent the entire food preparation process for a particular recipe.

Geometric Reasoning—refers to a software-based computer program(s) capable of using a two-dimensional (2D)/three-dimensional (3D) surface, and/or volumetric data to reason as to the actual shape and size of a particular volume. The ability to determine or utilize boundary information also allows for inferences as to the start and end of a particular geometric element and the number present in an image or model.

Grasp Reasoning—refers to a software-based computer program(s) capable of relying on geometric and physical reasoning to plan a multi-contact (point/area/volume) interaction between a robotic end-effector (gripper, link, etc.), or even tools/utensils held by the end-effector, so as to successfully contact, grasp, and hold the object in order to manipulate it in a three-dimensional space.

Hardware Automation Device—fixed process device capable of executing pre-programmed steps in succession without the ability to modify any of them; such devices are used for repetitive motions that do not need any modulation.

Ingredient Management and Manipulation—refers to defining each ingredient in detail (including size, shape, weight, dimensions, characteristics, and properties), one or more real-time adjustments in the variables associated with the particular ingredient that may differ from the previous stored ingredient details (such as the size of a fish fillet, the dimensions of an egg, etc.), and the process in executing the different stages for the manipulation movements to an ingredient.

Kitchen Module (or Kitchen Volume)—a standardized full-kitchen module with standardized sets of kitchen equipment, standardized sets of kitchen tools, standardized sets of kitchen handles, and standardized sets of kitchen containers, with predefined space and dimensions for storing, accessing, and operating each kitchen element in the standardized full-kitchen module. One objective of a kitchen module is to predefine as much of the kitchen equipment, tools, handles, containers, etc. as possible, so as to provide a relatively fixed kitchen platform for the movements of robotic arms and hands. Both a chef in the chef kitchen studio and a person at home with a robotic kitchen (or a person at a restaurant) uses the standardized kitchen module, so as to maximize the predictability of the kitchen hardware, while minimizing the risks of differentiations, variations, and deviations between the chef kitchen studio and a home robotic kitchen. Different embodiments of the kitchen module are possible, including a standalone kitchen module and an integrated kitchen module. The integrated kitchen module is fitted into a conventional kitchen area of a typical house. The kitchen module operates in at least two modes, a robotic mode and a normal (manual) mode.

Machine Learning—refers to the technology wherein a software component or program improves its performance based on experience and feedback. One kind of machine learning often used in robotics is reinforcement learning, where desirable actions are rewarded and undesirable ones are penalized. Another kind is case-based learning, where previous solutions, e.g. sequences of actions by a human teacher or by the robot itself are remembered, together with any constraints or reasons for the solutions, and then are applied or reused in new settings. There are also additional kinds of machine learning, such as inductive and transductive methods.

Minimanipulation (MM)—generally, MM refers to one or more behaviors or task-executions in any number or combinations and at various levels of descriptive abstraction, by a robotic apparatus that executes commanded motion-sequences under sensor-driven computer-control, acting through one or more hardware-based elements and guided by one or more software-controllers at multiple levels, to achieve a required task-execution performance level to arrive at an outcome approaching an optimal level within an acceptable execution fidelity threshold. The acceptable fidelity threshold is task-dependent and therefore defined for each task (also referred to as "domain-specific application"). In the absence of a task-specific threshold, a typical threshold would be 0.001 (0.1%) of optimal performance.

In one embodiment from a robotic technology perspective, the term MM refers to a well-defined pre-programmed sequence of actuator actions and collection of sensory feedback in a robot's task-execution behavior, as defined by performance and execution parameters (variables, constants, controller-type and —behaviors, etc.), used in one or more low-to-high level control-loops to achieve desired motion/interaction behavior for one or more actuators ranging from individual actuations to a sequence of serial and/or parallel multi-actuator coordinated motions (position and velocity)/interactions (force and torque) to achieve a specific task with desirable performance metrics. MMs can be combined in various ways by combining lower-level MM behaviors in serial and/or parallel to achieve ever-higher and higher-level more-and-more complex application-specific task behaviors with an ever higher level of (task-descriptive) abstraction.

In another embodiment from a software/mathematical perspective, the term MM refers to a combination (or a sequence) of one or more steps that accomplish a basic functional outcome within a threshold value of the optimal outcome (examples of threshold value as within 0.1, 0.01, 0.001, or 0.0001 of the optimal value with 0.001 as the preferred default). Each step can be an action primitive, corresponding to a sensing operation or an actuator movement, or another (smaller) MM, similar to a computer program comprised of basic coding steps and other computer programs that may stand alone or serve as sub-routines. For instance, a MM can be grasping an egg, comprised of the motor actions required to sense the location and orientation of the egg, then reaching out a robotic arm, moving the robotic fingers into the right configuration, and applying the correct delicate amount of force for grasping: all primitive actions. Another MM can be breaking-an-egg-with-a-knife, including the grasping MM with one robotic hand, followed by grasping-a-knife MM with the other hand, followed by the primitive action of striking the egg with the knife using a predetermined force at a predetermined location.

High-Level Application-specific Task Behaviors—refers to behaviors that can be described in natural human-understandable language and are readily recognizable by a human as clear and necessary steps in accomplishing or achieving a high-level goal. It is understood that many other lower-level behaviors and actions/movements need to take place by a multitude of individually actuated and controlled degrees of freedom, some in serial and parallel or even cyclical fashion, in order to successfully achieve a higher-level task-specific goal. Higher-level behaviors are thus made up of multiple levels of low-level MMs in order to achieve more complex, task-specific behaviors. As an example, the command of playing on a harp the first note of the $1^{st}$ bar of a particular sheet of music, presumes the note is known (i.e., g-flat), but now lower-level MMs have to take place involving actions by a multitude of joints to curl a particular finger, move the whole hand or shape the palm so as to bring the finger into contact with the correct string, and then proceed with the proper speed and movement to achieve the correct sound by plucking/strumming the cord. All these individual MMs of the finger and/or hand/palm in isolation can all be considered MMs at various low levels, as they are unaware of the overall goal (extracting a particular note from a specific instrument). While the task-specific action of playing a particular note on a given instrument so as to achieve the necessary sound, is clearly a higher-level application-specific task, as it is aware of the overall goal and need to interplay between behaviors/motions and is in control of all the lower-level MMs required for a successful completion. One could even go as far as defining playing a particular musical note as a lower-level MM to the overall higher-level applications-specific task behavior or command, spelling out the playing of an entire piano-concerto, where playing individual notes could each be deemed as low-level MM behaviors structured by the sheet music as the composer intended.

Low-Level Minimanipulation Behaviors—refers to movements that are elementary and required as basic building blocks for achieving a higher-level task-specific motion/movement or behavior. The low-level behavioral blocks or elements can be combined in one or more serial or parallel fashion to achieve a more complex medium or a higher-level behavior. As an example, curling a single finger at all finger joints is a low-level behavior, as it can be combined with curling all other fingers on the same hand in a certain sequence and triggered to start/stop based on contact/force-thresholds to achieve the higher-level behavior of grasping, whether this be a tool or a utensil. Hence, the higher-level task-specific behavior of grasping is made up of a serial/parallel combination of sensory-data driven low-level behaviors by each of the five fingers on a hand. All behaviors can thus be broken down into rudimentary lower levels of motions/movements, which when combined in certain fashion achieve a higher-level task behavior. The breakdown or boundary between low- and high-level behaviors can be somewhat arbitrary, but one way to think of it is that movements or actions or behaviors that humans tend to carry out without much conscious thinking (such as curling ones fingers around a tool/utensil until contact is made and enough contact-force is achieved) as part of a more human-language task-action (such as "grab the tool"), can and should be considered low-level. In terms of a machine-language execution language, all actuator-specific commands, which are devoid of higher-level task awareness, are certainly considered low-level behaviors.

Model Elements and Classification—refers to one or more software-based computer program(s) capable of understanding elements in a scene as being items that are used or needed in different parts of a task; such as a bowl for mixing and the need for a spoon to stir, etc. Multiple elements in a scene or a world-model may be classified into groupings allowing for faster planning and task-execution.

Motion Primitives—refers to motion actions that define different levels/domains of detailed action steps, e.g. a high-level motion primitive would be to grab a cup, and a low-level motion primitive would be to rotate a wrist by five degrees.

Multimodal Sensing Unit—refers to a sensing unit comprised of multiple sensors capable of sensing and detecting multiple modes or electromagnetic bands or spectra: particularly, capable of capturing three-dimensional position and/or motion information. The electromagnetic spectrum can range from low to high frequencies and does not need to be limited to that perceived by a human being. Additional modes might include, but are not limited to, other physical senses such as touch, smell, etc.

Number of Axes—three axes are required to reach any point in space. To fully control the orientation of the end of the arm (i.e. the wrist), three additional rotational axes (yaw, pitch, and roll) are required.

Parameters—refers to variables that can take numerical values or ranges of numerical values. Three kinds of parameters are particularly relevant: parameters in the instructions to a robotic device (e.g. the force or distance in an arm movement), user-settable parameters (e.g. prefers meat well done vs. medium), and chef-defined parameters (e.g. set oven temperature to 350 F).

Parameter Adjustment—refers to the process of changing the values of parameters based on inputs. For instance changes in the parameters of instructions to the robotic device can be based on the properties (e.g. size, shape, orientation) of, but not limited to, the ingredients, position/orientation of kitchen tools, equipment, appliances, speed, and time duration of a minimanipulation.

Payload or Carrying Capacity—refers to how much weight a robotic arm can carry and hold (or even accelerate) against the force of gravity as a function of its endpoint location.

Physical Reasoning—refers to a software-based computer program(s) capable of relying on geometrically-reasoned data and using physical information (density, texture, typical geometry, and shape) to assist an inference-engine (program) to better model the object and also predict its behavior in the real world, particularly when grasped and/or manipulated/handled.

Raw Data—refers to all measured and inferred sensory-data and representation information that is collected as part of the chef-studio recipe-generation process while watching/monitoring a human chef preparing a dish. Raw data can range from a simple data-point such as clock-time, to oven temperature (over time), camera-imagery, three-dimensional laser-generated scene representation data, to appliances/equipment used, tools employed, ingredients (type and amount) dispensed and when, etc. All the information the studio-kitchen collects from its built-in sensors and stores in raw, time-stamped form, is considered raw data. Raw data is then used by other software processes to generate an even higher level of understanding and recipe-process understanding, turning raw data into additional time-stamped processed/interpreted data.

Robotic Apparatus—refers the set of robotic sensors and effectors. The effectors comprise one or more robotic arms and one or more robotic hands for operation in the standardized robotic kitchen. The sensors comprise cameras, range sensors, and force sensors (haptic sensors) that transmit their information to the processor or set of processors that control the effectors.

Recipe Cooking Process—refers to a robotic script containing abstract and detailed levels of instructions to a collection of programmable and hard-automation devices, to allow computer-controllable devices to execute a sequenced operation within its environment (e.g. a kitchen replete with ingredients, tools, utensils, and appliances).

Recipe Script—refers to a recipe script as a sequence in time containing a structure and a list of commands and execution primitives (simple to complex command software) that, when executed by the robotic kitchen elements (robot-arm, automated equipment, appliances, tools, etc.) in a given sequence, should result in the proper replication and creation of the same dish as prepared by the human chef in the studio-kitchen. Such a script is sequential in time and equivalent to the sequence employed by the human chef to create the dish, albeit in a representation that is suitable and understandable by the computer-controlled elements in the robotic kitchen.

Recipe Speed Execution—refers to managing a timeline in the execution of recipe steps in preparing a food dish by replicating a chef's movements, where the recipe steps include standardized food preparation operations (e.g., standardized cookware, standardized equipment, kitchen processors, etc.), MMs, and cooking of non-standardized objects.

Repeatability—refers to an acceptable preset margin in how accurately the robotic arms/hands can repeatedly return to a programmed position. If the technical specification in a control memory requires the robotic hand to move to a certain X-Y-Z position and within +/−0.1 mm of that position, then the repeatability is measured for the robotic hands to return to within +/−0.1 mm of the taught and desired/commanded position.

Robotic Recipe Script—refers to a computer-generated sequence of machine-understandable instructions related to the proper sequence of robotically/hard-automation execution of steps to mirror the required cooking steps in a recipe to arrive at the same end-product as if cooked by a chef.

Robotic Costume—External instrumented device(s) or clothing, such as gloves, clothing with camera-tractable markers, jointed exoskeleton, etc., used in the chef studio to monitor and track the movements and activities of the chef during all aspects of the recipe cooking process(es).

Scene Modeling—refers to a software-based computer program(s) capable of viewing a scene in one or more cameras' fields of view and being capable of detecting and identifying objects of importance to a particular task. These objects may be pre-taught and/or be part of a computer library with known physical attributes and usage-intent.

Smart Kitchen Cookware/Equipment—refers to an item of kitchen cookware (e.g., a pot or a pan) or an item of kitchen equipment (e.g., an oven, a grill, or a faucet) with one or more sensors that prepares a food dish based on one or more graphical curves (e.g., a temperature curve, a humidity curve, etc.).

Software Abstraction Food Engine—refers to a software engine that is defined as a collection of software loops or programs, acting in concert to process input data and create a certain desirable set of output data to be used by other software engines or an end-user through some form of textual or graphical output interface. An abstraction software engine is a software program(s) focused on taking a large and vast amount of input data from a known source in a particular domain (such as three-dimensional range measurements that form a data-cloud of three-dimensional measurements as seen by one or more sensors), and then processing the data to arrive at interpretations of the data in a different domain (such as detecting and recognizing a table-surface in a data-cloud based on data having the same vertical data value, etc.), in order to identify, detect, and classify data-readings as pertaining to an object in three-dimensional space (such as a table-top, cooking pot, etc.). The process of abstraction is basically defined as taking a large data set from one domain and inferring structure (such as geometry) in a higher level of space (abstracting data points), and then abstracting the inferences even further and identifying objects (pots, etc.) out of the abstraction data-sets to identify real-world elements in an image, which can then be used by other software engines to make additional decisions (handling/manipulation decisions for key objects, etc.). A synonym for "software abstraction engine" in this application could be also "software interpretation engine" or even "computer-software processing and interpretation algorithm".

Task Reasoning—refers to a software-based computer program(s) capable of analyzing a task-description and breaking it down into a sequence of multiple machine-executable (robot or hard-automation systems) steps, to achieve a particular end result defined in the task description.

Three-dimensional World Object Modeling and Understanding—refers to a software-based computer program(s) capable of using sensory data to create a time-varying three-dimensional model of all surfaces and volumes, to enable it to detect, identify, and classify objects within the same and understand their usage and intent.

Torque Vector—refers to the torsion force upon a robotic appendage, including its direction and magnitude.

Volumetric Object Inference (Engine)—refers to a software-based computer program(s) capable of using geometric data and edge-information, as well as other sensory data (color, shape, texture, etc.), to allow for identification of three-dimensionality of one or more objects to aid in the object identification and classification process.

For additional information on replication by a robotic apparatus and MM library, see the pending U.S. non-provisional patent application Ser. No. 14/627,900, entitled "Methods and Systems for Food Preparation in Robotic Cooking Kitchen".

FIG. 1 is a system diagram illustrating an overall robotics food preparation kitchen 10 with robotic hardware 12 and robotic software 14. The overall robotics food preparation kitchen 10 comprises a robotics food preparation hardware 12 and robotics food preparation software 14 that operate together to perform the robotics functions for food preparation. The robotic food preparation hardware 12 includes a computer 16 that controls the various operations and movements of a standardized kitchen module 18 (which generally operate in an instrumented environment with one or more sensors), multimodal three-dimensional sensors 20, robotic arms 22, robotic hands 24 and capturing gloves 26. The robotic food preparation software 14 operates with the robotics food preparation hardware 12 to capture a chef's movements in preparing a food dish and replicating the chef's movements via robotics arms and hands to obtain the same result or substantially the same result (e.g., taste the same, smell the same, etc.) of the food dish that would taste the same or substantially the same as if the food dish was prepared by a human chef.

The robotic food preparation software 14 includes the multimodal three-dimensional sensors 20, a capturing module 28, a calibration module 30, a conversion algorithm module 32, a replication module 34, a quality check module 36 with a three-dimensional vision system, a same result module 38, and a learning module 40. The capturing module 28 captures the movements of the chef as the chef prepares a food dish. The calibration module 30 calibrates the robotic arms 22 and robotic hands 24 before, during, and after the cooking process. The conversion algorithm module 32 is configured to convert the recorded data from a chef's movements collected in the chef studio into recipe modified data (or transformed data) for use in a robotic kitchen where robotic hands replicate the food preparation of the chef's dish. The replication module 34 is configured to replicate the chef's movements in a robotic kitchen. The quality check module 36 is configured to perform quality check functions of a food dish prepared by the robotic kitchen during, prior to, or after the food preparation process. The same result module 38 is configured to determine whether the food dish prepared by a pair of robotic arms and hands in the robotic kitchen would taste the same or substantially the same as if prepared by the chef. The learning module 40 is configured to provide learning capabilities to the computer 16 that operates the robotic arms and hands.

Figure 2:
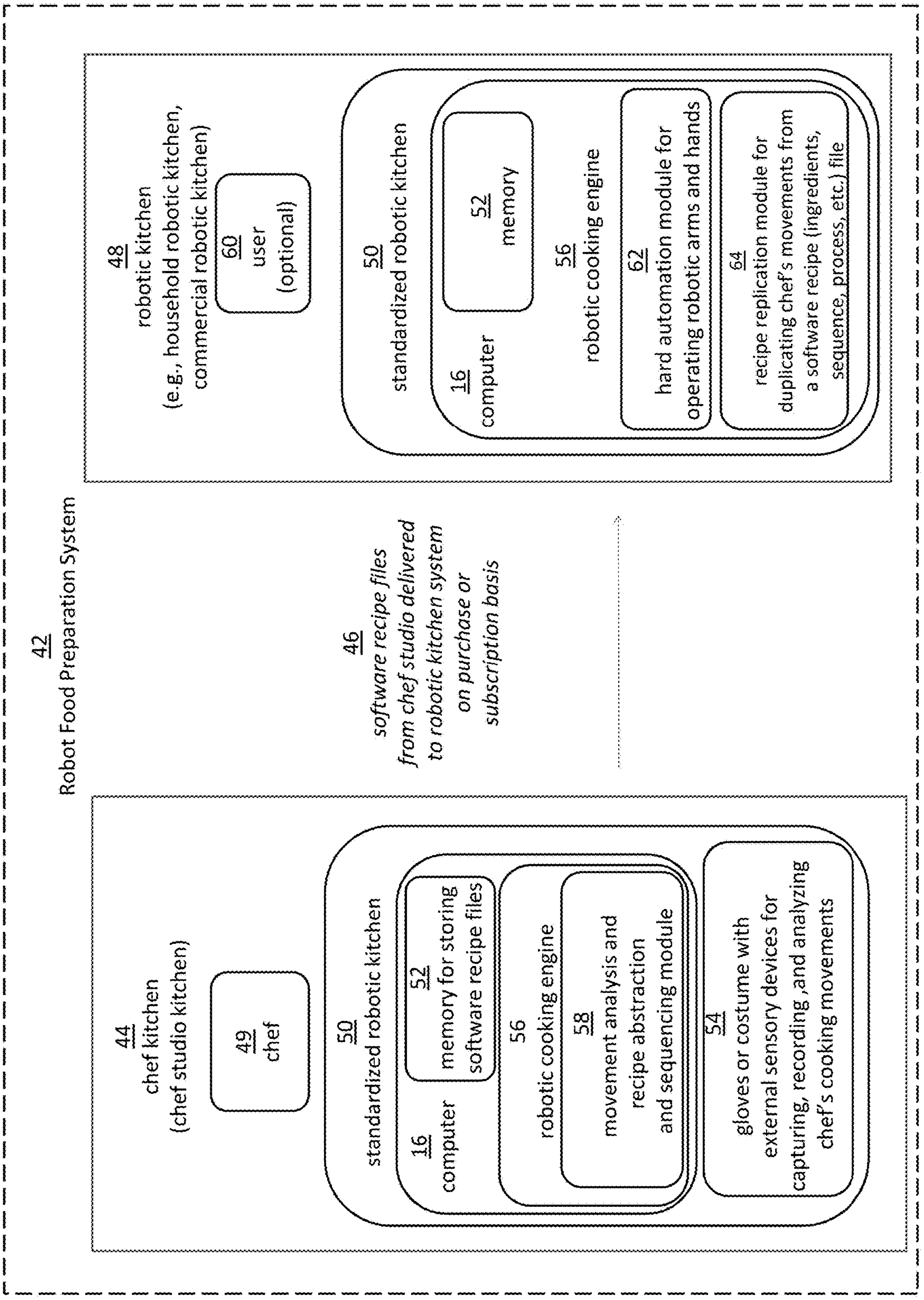
FIG. 2 is a system diagram illustrating a first embodiment of a food robot cooking system that includes a chef studio system and a household robotic kitchen system in accordance with the present disclosure.

FIG. 2 is a system diagram illustrating a first embodiment of a food robot cooking system that includes a chef studio system and a household robotic kitchen system for preparing a dish by replicating a chef's recipe process and movements. The robotic kitchen cooking system 42 comprises a chef kitchen 44 (also referred to as "chef studio-kitchen"), which transfers one or more software recorded recipe files 46 to a robotic kitchen 48 (also referred to as "household robotic kitchen"). In one embodiment, both the chef kitchen 44 and the robotic kitchen 48 use the same standardized robotic kitchen module 50 (also referred as "robotic kitchen module", "robotic kitchen volume", or "kitchen module", or "kitchen volume") to maximize the precise replication of preparing a food dish, which reduces the variables that may contribute to deviations between the food dish prepared at the chef kitchen 44 and the one prepared by the robotic kitchen 46. A chef 52 wears robotic gloves or a costume with external sensory devices for capturing and recording the chef's cooking movements. The standardized robotic kitchen 50 comprises a computer 16 for controlling various computing functions, where the computer 16 includes a memory 52 for storing one or more software recipe files from the sensors of the gloves or costumes 54 for capturing a chef's movements, and a robotic cooking engine (software) 56. The robotic cooking engine 56 includes a movement analysis and recipe abstraction and sequencing module 58. The robotic kitchen 48 typically operates autonomously with a pair of robotic arms and hands, with an optional user 60 to turn on or program the robotic kitchen 46. The computer 16 in the robotic kitchen 48 includes a hard automation module 62 for operating robotic arms and hands, and a recipe replication module 64 for replicating a chef's movements from a software recipe (ingredients, sequence, process, etc.) file.

The standardized robotic kitchen 50 is designed for detecting, recording, and emulating a chef's cooking movements, controlling significant parameters such as temperature over time, and process execution at robotic kitchen stations with designated appliances, equipment, and tools. The chef kitchen 44 provides a computing kitchen environment 16 with gloves with sensors or a costume with sensors for recording and capturing a chef's 50 movements in the food preparation for a specific recipe. Upon recording the movements and recipe process of the chef 49 for a particular dish into a software recipe file in memory 52, the software recipe file is transferred from the chef kitchen 44 to the robotic kitchen 48 via a communication network 46, including a wireless network and/or a wired network connected to the Internet, so that the user (optional) 60 can purchase one or more software recipe files or the user can be subscribed to the chef kitchen 44 as a member that receives new software recipe files or periodic updates of existing software recipe files. The household robotic kitchen system 48 serves as a robotic computing kitchen environment at residential homes, restaurants, and other places in which the kitchen is built for the user 60 to prepare food. The household robotic kitchen system 48 includes the robotic cooking engine 56 with one or more robotic arms and hard-automation devices for replicating the chef's cooking actions, processes, and movements based on a received software recipe file from the chef studio system 44.

The chef studio 44 and the robotic kitchen 48 represent an intricately linked teach-playback system, which has multiple levels of fidelity of execution. While the chef studio 44 generates a high-fidelity process model of how to prepare a professionally cooked dish, the robotic kitchen 48 is the execution/replication engine/process for the recipe-script created through the chef working in the chef studio. Standardization of a robotic kitchen module is a means to increase performance fidelity and success/guarantee.

The varying levels of fidelity for recipe-execution depend on the correlation of sensors and equipment (besides of course the ingredients) between those in the chef studio 44 and that in the robotic kitchen 48. Fidelity can be defined as a dish tasting identical to that prepared by a human chef (indistinguishably so) at one of the (perfect replication/execution) ends of the spectrum, while at the opposite end the dish could have one or more substantial or fatal flaws with implications to quality (overcooked meat or pasta), taste (burnt elements), edibility (incorrect consistency) or even health-implications (undercooked meat such as chicken/pork with *salmonella* exposure, etc.).

A robotic kitchen that has identical hardware and sensors and actuation systems that can replicate the movements and processes akin to those by the chef that were recorded during the chef-studio cooking process is more likely to result in a higher fidelity outcome. The implication here is that the setups need to be identical, and this has a cost and volume implication. The robotic kitchen 48 can, however, still be implemented using more standardized non-computer-controlled or computer-monitored elements (pots with sensors, networked appliances, such as ovens, etc.), requiring more sensor-based understanding to allow for more complex execution monitoring. Since uncertainty has now increased as to key elements (correct amount of ingredients, cooking temperatures, etc.) and processes (use of stirrer/masher in case a blender is not available in a robotic home kitchen), the guarantees of having an identical outcome to that from the chef will undoubtedly be lower.

An emphasis in the present disclosure is that the notion of a chef studio 44 coupled with a robotic kitchen is a generic concept. The level of the robotic kitchen 48 is variable all the way from a home-kitchen outfitted with a set of arms and environmental sensors, all the way to an identical replica of the studio-kitchen, where a set of arms and articulated motions, tools, and appliances and ingredient-supply can replicate the chef's recipe in an almost identical fashion. The only variable to contend with will be the quality-degree of the end-result or dish in terms of quality, looks, taste, edibility, and health.

A potential method to mathematically describe this correlation between the recipe-outcome and the input variables in the robotic kitchen can best be described by the function below:

$$F_{recipe\text{-}outcome}=F_{studio}(I,E,P,M,V)+F_{RobKit}(E_f,I,R_e,P_{mf})$$

where $F_{studio}$=Recipe Script Fidelity of Chef-Studio $F_{RobKit}$=Recipe Script Execution by Robotic Kitchen I=Ingredients E=Equipment P=Processes M=Methods V=Variables (Temperature, Time, Pressure, etc.)

$E_f$=Equipment Fidelity $R_e$=Replication Fidelity $P_{mf}$=Process Monitoring Fidelity The above equation relates the degree to which the outcome of a robotically-prepared recipe matches that a human chef would prepare and serve ($F_{recipe\text{-}outcome}$) to the level that the recipe was properly captured and represented by the chef studio 44 ($F_{studio}$) based on the ingredients (I) used, the equipment (E) available to execute the chef's processes (P) and methods (M) by properly capturing all the key variables (V) during the cooking process; and how the robotic kitchen is able to represent the replication/execution process of the robotic recipe script by a function ($F_{RobKit}$) that is primarily driven by the use of the proper ingredients (I), the level of equipment fidelity ($E_f$) in the robotic kitchen compared to that in the chef studio, the level to which the recipe-script can be replicated ($R_e$) in the robotic kitchen, and to what extent there is an ability and need to monitor and execute corrective actions to achieve the highest process monitoring fidelity ($P_{mf}$) possible.

The functions ($F_{studio}$) and ($F_{RobKit}$) can be any combination of linear or non-linear functional formulas with constants, variables, and any form of algorithmic relationships. An example for such algebraic representations for both functions could be:

$$F_{studio}=I(fct.\ \sin(\text{Temp}))+E(fct.\text{Cooptop1*5})+P(fct.\text{Circle(spoon)}+V(fct.0.5\text{*time})$$

Delineating that the fidelity of the preparation process is related to the temperature of the ingredient, which varies over time in the refrigerator as a sinusoidal function, the speed with which an ingredient can be heated on the cooktop on specific station at a particular multiplicative rate, and related to how well a spoon can be moved in a circular path of a certain amplitude and period, and that the process needs to be carried out at no less than $Y_2$ the speed of the human chef for the fidelity of the preparation process to be maintained.

$$F_{RobKit}=E_f,(\text{Cooktop2,Size})+I(1.25\text{*Size+Linear (Temp)})+R_e(\text{Motion-Profile})+P_{mf}(\text{Sensor-Suite Correspondence})$$

Delineating that the fidelity of the replication process in the robotic kitchen is related to the appliance type and layout for a particular cooking-area and the size of the heating-element, the size and temperature profile of the ingredient being seared and cooked (thicker steak requiring more cooking time), while also preserving the motion-profile of any stirring and bathing motions of a particular step like searing or mousse-beating, and whether the correspondence between sensors in the robotic kitchen and the chef-studio is sufficiently high to trust the monitored sensor data to be accurate and detailed enough to provide a proper monitoring fidelity of the cooking process in the robotic kitchen during all steps in a recipe.

The outcome of a recipe is not only a function of what fidelity the human chef's cooking steps/methods/process/skills were captured with by the chef studio, but also with what fidelity these can be executed by the robotic kitchen, where each of them has key elements that impact their respective subsystem performance.

Figure 3:
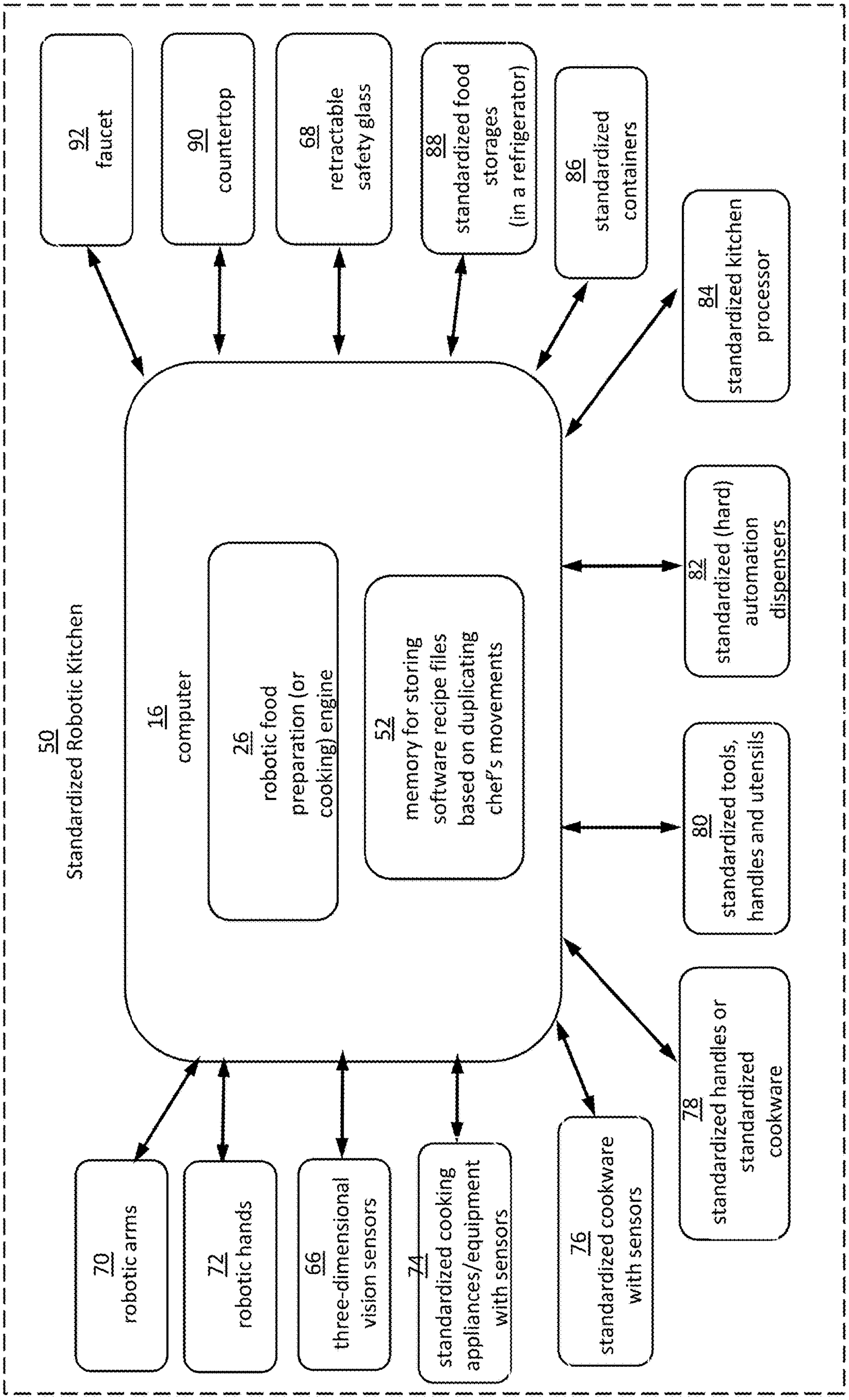
FIG. 3 is system diagram illustrating one embodiment of the standardized robotic kitchen for preparing a dish by replicating a chef's recipe process, techniques, and movements in accordance with the present disclosure.

FIG. 3 is a system diagram illustrating one embodiment of the standardized robotic kitchen 50 for food preparation by recording a chef's movement in preparing and replicating a food dish by robotic arms and hands. In this context, the term "standardized" (or "standard") means that the specifications of the components or features are presets, as will be explained below. The computer 16 is communicatively coupled to multiple kitchen elements in the standardized robotic kitchen 50, including a three-dimensional vision sensor 66, a retractable safety screen 68 (e.g., glass, plastic, or other types of protective material), robotic arms 70, robotic hands 72, standardized cooking appliances/equipment 74, standardized cookware with sensors 76, standardized handle(s) or standardized cookware 78, standardized handles and utensils 80, standardized hard automation dispenser(s) 82 (also referred to as "robotic hard automation module(s)"), a standardized kitchen processor 84, standardized containers 86, and a standardized food storage in a refrigerator 88.

The standardized (hard) automation dispenser(s) 82 is a device or a series of devices that is/are programmable and/or controllable via the cooking computer 16 to feed or provide pre-packaged (known) amounts or dedicated feeds of key materials for the cooking process, such as spices (salt, pepper, etc.), liquids (water, oil, etc.), or other dry materials (flour, sugar, etc.). The standardized hard automation dispensers 82 may be located at a specific station or may be able to be robotically accessed and triggered to dispense according to the recipe sequence. In other embodiments, a robotic hard automation module may be combined or sequenced in series or parallel with other modules, robotic arms, or cooking utensils. In this embodiment, the standardized robotic kitchen 50 includes robotic arms 70 and robotic hands 72; robotic hands, as controlled by the robotic food preparation engine 56 in accordance with a software recipe file stored in the memory 52 for replicating a chef's precise movements in preparing a dish to produce the same tasting dish as if the chef had prepared it himself or herself. The three-dimensional vision sensors 66 provide the capability to enable three-dimensional modeling of objects, providing a visual three-dimensional model of the kitchen activities, and scanning the kitchen volume to assess the dimensions and objects within the standardized robotic kitchen 50. The retractable safety glass 68 comprises a transparent material on the robotic kitchen 50, which when in an ON state extends the safety glass around the robotic kitchen to protect surrounding human beings from the movements of the robotic arms 70 and hands 72, hot water and other liquids, steam, fire and other dangers influents. The robotic food preparation engine 56 is communicatively coupled to an electronic memory 52 for retrieving a software recipe file previously sent from the chef studio system 44 for which the robotic food preparation engine 56 is configured to execute processes in preparing and replicating the cooking method and processes of a chef as indicated in the software recipe file. The combination of robotic arms 70 and robotic hands 72 serves to replicate the precise movements of the chef in preparing a dish, so that the resulting food dish will taste identical (or substantially identical) to the same food dish prepared by the chef. The standardized cooking equipment 74 includes an assortment of cooking appliances 46 that are incorporated as part of the robotic kitchen 50, including, but not limited to, a stove/induction/cooktop (electric cooktop, gas cooktop, induction cooktop), an oven, a grill, a cooking steamer, and a microwave oven. The standardized cookware and sensors 76 are used as embodiments for the recording of food preparation steps based on the sensors on the cookware and cooking a food dish based on the cookware with sensors, which include a pot with sensors, a pan with sensors, an oven with sensors, and a charcoal grill with sensors. The standardized cookware 78 includes frying pans, sauté pans, grill pans, multi-pots, roasters, woks, and braisers. The robotic arms 70 and the robotic hands 72 operate the standardized handles and utensils 80 in the cooking process. In one embodiment, one of the robotic hands 72 is fitted with a standardized handle, which is attached to a fork head, a knife head, and a spoon head for selection as required. The standardized hard automation dispensers 82 are incorporated into the robotic kitchen 50 to provide for expedient (via both robot arms 70 and human use) key and common/repetitive ingredients that are easily measured/dosed out or pre-packaged. The standardized containers 86 are storage locations that store food at room temperature. The standardized refrigerator containers 88 refer to, but are not limited to, a refrigerator with identified containers for storing fish, meat, vegetables, fruit, milk, and other perishable items. The containers in the standardized containers 86 or standardized storages 88 can be coded with container identifiers from which the robotic food preparation engine 56 is able to ascertain the type of food in a container based on the container identifier. The standardized containers 86 provide storage space for non-perishable food items such as salt, pepper, sugar, oil, and other spices. Standardized cookware with sensors 76 and the cookware 78 may be stored on a shelf or a cabinet for use by the robotic arms 70 for selecting a cooking tool to prepare a dish. Typically, raw fish, raw meat, and vegetables are pre-cut and stored in the identified standardized storages 88. The kitchen countertop 90 provides a platform for the robotic arms 70 to handle the meat or vegetables as needed, which may or may not include cutting or chopping actions. The kitchen faucet 92 provides a kitchen sink space for washing or cleaning food in preparation for a dish. When the robotic arms 70 have completed the recipe process to prepare a dish and the dish is ready for serving, the dish is placed on a serving counter 90, which further allows for the dining environment to be enhanced by adjusting the ambient setting with the robotic arms 70, such as placement of utensils, wine glasses, and a chosen wine compatible with the meal. One embodiment of the equipment in the standardized robotic kitchen module 50 is a professional series to increase the universal appeal to prepare various types of dishes.

The standardized robotic kitchen module 50 has as one objective: the standardization of the kitchen module 50 and various components with the kitchen module itself to ensure consistency in both the chef kitchen 44 and the robotic kitchen 48 to maximize the preciseness of recipe replication while minimizing the risks of deviations from precise replication of a recipe dish between the chef kitchen 44 and the robotic kitchen 48. One main purpose of having the standardization of the kitchen module 50 is to obtain the same result of the cooking process (or the same dish) between a first food dish prepared by the chef and a subsequent replication of the same recipe process via the robotic kitchen. Conceiving a standardized platform in the standardized robotic kitchen module 50 between the chef kitchen 44 and the robotic kitchen 48 has several key considerations: same timeline, same program or mode, and quality check. The same timeline in the standardized robotic kitchen 50 where the chef prepares a food dish at the chef kitchen 44 and the replication process by the robotic hands in the robotic kitchen 48 refers to the same sequence of manipulations, the same initial and ending time of each manipulation, and the same speed of moving an object between handling operations. The same program or mode in the standardized robotic kitchen 50 refers to the use and operation of standardized equipment during each manipulation recording and execution step. The quality check refers to three-dimensional vision sensors in the standardized robotic kitchen 50, which monitor and adjust in real time each manipulation action during the food preparation process to correct any deviation and avoid a flawed result. The adoption of the standardized robotic kitchen module 50 reduces and minimizes the risks of not obtaining the same result between the chef's prepared food dish and the food dish prepared by the robotic kitchen using robotic arms and hands. Without the standardization of a robotic kitchen module and the components within the robotic kitchen module, the increased variations between the chef kitchen 44 and the robotic kitchen 48 increase the risks of not being able to obtain the same result between the chef's prepared food dish and the food dish prepared by the robotic kitchen because more elaborate and complex adjustment algorithms will be required with different kitchen modules, different kitchen equipment, different kitchenware, different kitchen tools, and different ingredients between the chef kitchen 44 and the robotic kitchen 48.

The standardized robotic kitchen module 50 includes the standardization of many aspects. First, the standardized robotic kitchen module 50 includes standardized positions and orientations (in the XYZ coordinate plane) of any type of kitchenware, kitchen containers, kitchen tools, and kitchen equipment (with standardized fixed holes in the kitchen module and device positions). Second, the standardized robotic kitchen module 50 includes a standardized cooking volume dimension and architecture. Third, the standardized robotic kitchen module 50 includes standardized equipment sets, such as an oven, a stove, a dishwasher, a faucet, etc. Fourth, the standardized robotic kitchen module 50 includes standardized kitchenware, standardized cooking tools, standardized cooking devices, standardized containers, and standardized food storage in a refrigerator, in terms of shape, dimension, structure, material, capabilities, etc. Fifth, in one embodiment, the standardized robotic kitchen module 50 includes a standardized universal handle for handling any kitchenware, tools, instruments, containers, and equipment, which enable a robotic hand to hold the standardized universal handle in only one correct position, while avoiding any improper grasps or incorrect orientations. Sixth, the standardized robotic kitchen module 50 includes standardized robotic arms and hands with a library of manipulations. Seventh, the standardized robotic kitchen module 50 includes a standardized kitchen processor for standardized ingredient manipulations. Eighth, the standardized robotic kitchen module 50 includes standardized three-dimensional vision devices for creating dynamic three-dimensional vision data, as well as other possible standard sensors, for recipe recording, execution tracking, and quality check functions. Ninth, the standardized robotic kitchen module 50 includes standardized types, standardized volumes, standardized sizes, and standardized weights for each ingredient during a particular recipe execution.

Figure 4:
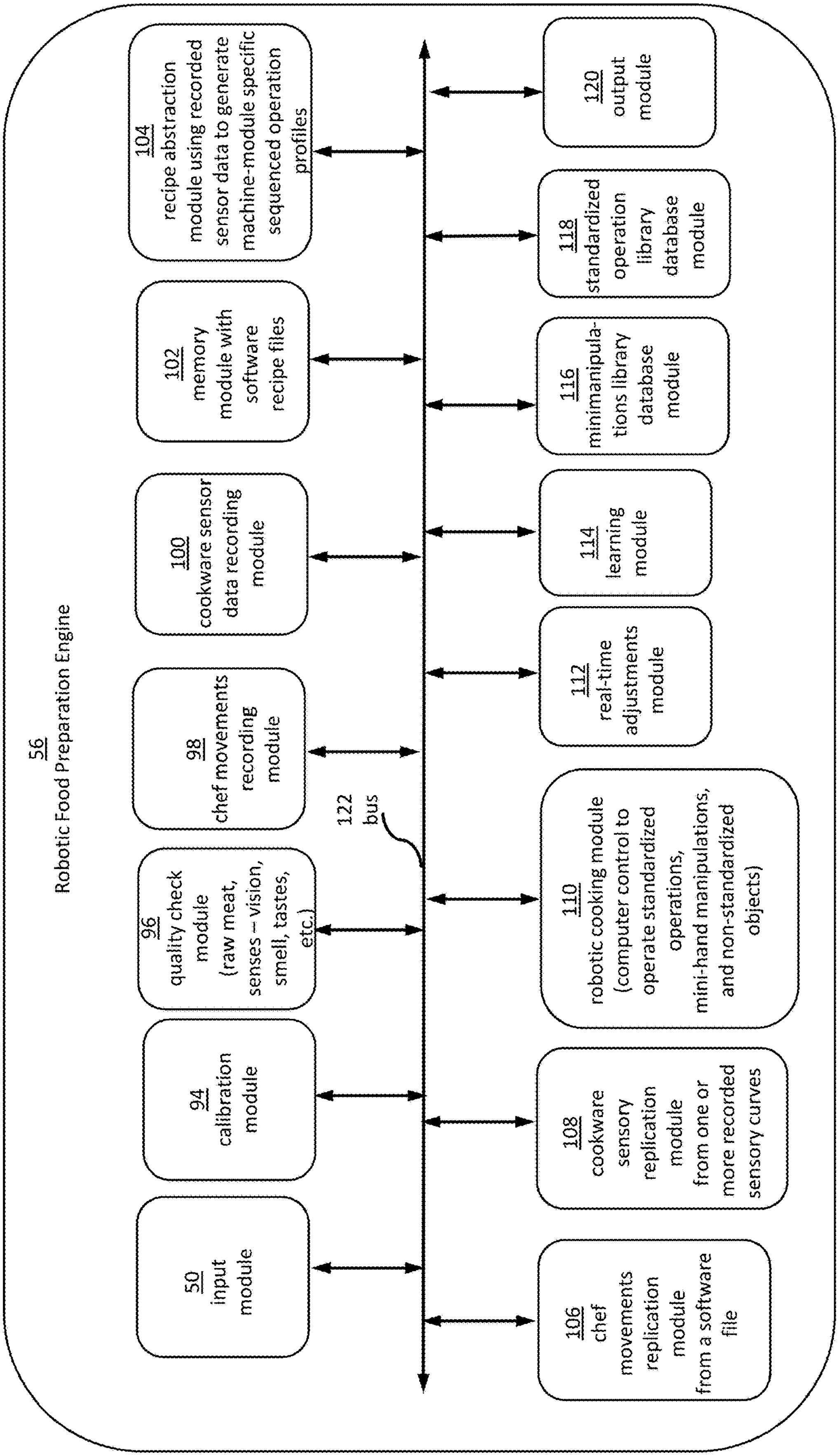
FIG. 4 is a system diagram illustrating one embodiment of a robotic food preparation engine for use with the computer in the chef studio system and the household robotic kitchen system in accordance with the present disclosure.

FIG. 4 is a system diagram illustrating one embodiment of the robotic cooking engine 56 (also referred to as "robotic food preparation engine") for use with the computer 16 in the chef studio system 44 and the household robotic kitchen system 48. Other embodiments may have modifications, additions, or variations of the modules in the robotic cooking engine 16, in the chef kitchen 44, and robotic kitchen 48. The robotic cooking engine 56 includes an input module 50, a calibration module 94, a quality check module 96, a chef movement recording module 98, a cookware sensor data recording module 100, a memory module 102 for storing software recipe files, a recipe abstraction module 104 using recorded sensor data to generate machine-module specific sequenced operation profiles, a chef movements replication software module 106, a cookware sensory replication module 108 using one or more sensory curves, a robotic cooking module 110 (computer control to operate standardized operations, minimanipulations, and non-standardized objects), a real-time adjustment module 112, a learning module 114, a minimanipulation library database module 116, a standardized kitchen operation library database module 118, and an output module 120. These modules are communicatively coupled via a bus 122.

The input module 50 is configured to receive any type of input information, such as software recipe files sent from another computing device. The calibration module 94 is configured to calibrate itself with the robotic arms 70, the robotic hands 72, and other kitchenware and equipment components within the standardized robotic kitchen module 50. The quality check module 96 is configured to determine the quality and freshness of raw meat, raw vegetables, milk-associated ingredients, and other raw foods at the time that the raw food is retrieved for cooking, as well as checking the quality of raw foods when receiving the food into the standardized food storage 88. The quality check module 96 can also be configured to conduct quality testing of an object based on senses, such as the smell of the food, the color of the food, the taste of the food, and the image or appearance of the food. The chef movements recording module 98 is configured to record the sequence and the precise movements of the chef when the chef prepares a food dish. The cookware sensor data recording module 100 is configured to record sensory data from cookware equipped with sensors (such as a pan with sensors, a grill with sensors, or an oven with sensors) placed in different zones within the cookware, thereby producing one or more sensory curves. The result is the generation of a sensory curve, such as temperature curve (and/or humidity), that reflects the temperature fluctuation of cooking appliances over time for a particular dish. The memory module 102 is configured as a storage location for storing software recipe files, for either replication of chef recipe movements or other types of software recipe files including sensory data curves. The recipe abstraction module 104 is configured to use recorded sensor data to generate machine-module specific sequenced operation profiles. The chef movements replication module 106 is configured to replicate the chef's precise movements in preparing a dish based on the stored software recipe file in the memory 52. The cookware sensory replication module 108 is configured to replicate the preparation of a food dish by following the characteristics of one or more previously recorded sensory curves, which were generated when the chef 49 prepared a dish by using the standardized cookware with sensors 76. The robotic cooking module 110 is configured to control and operate autonomously standardized kitchen operations, minimanipulations, non-standardized objects, and the various kitchen tools and equipment in the standardized robotic kitchen 50. The real time adjustment module 112 is configured to provide real-time adjustments to the variables associated with a particular kitchen operation or a mini operation to produce a resulting process that is a precise replication of the chef movement or a precise replication of the sensory curve. The learning module 114 is configured to provide learning capabilities to the robotic cooking engine 56 to optimize the precise replication in preparing a food dish by robotic arms 70 and the robotic hands 72, as if the food dish was prepared by a chef, using a method such as case-based (robotic) learning. The minimanipulation library database module 116 is configured to store a first database library of minimanipulations. The standardized kitchen operation library database module 117 is configured to store a second database library of standardized kitchenware and information on how to operate this standardized kitchenware. The output module 118 is configured to send output computer files or control signals external to the robotic cooking engine.

Figure 5A:
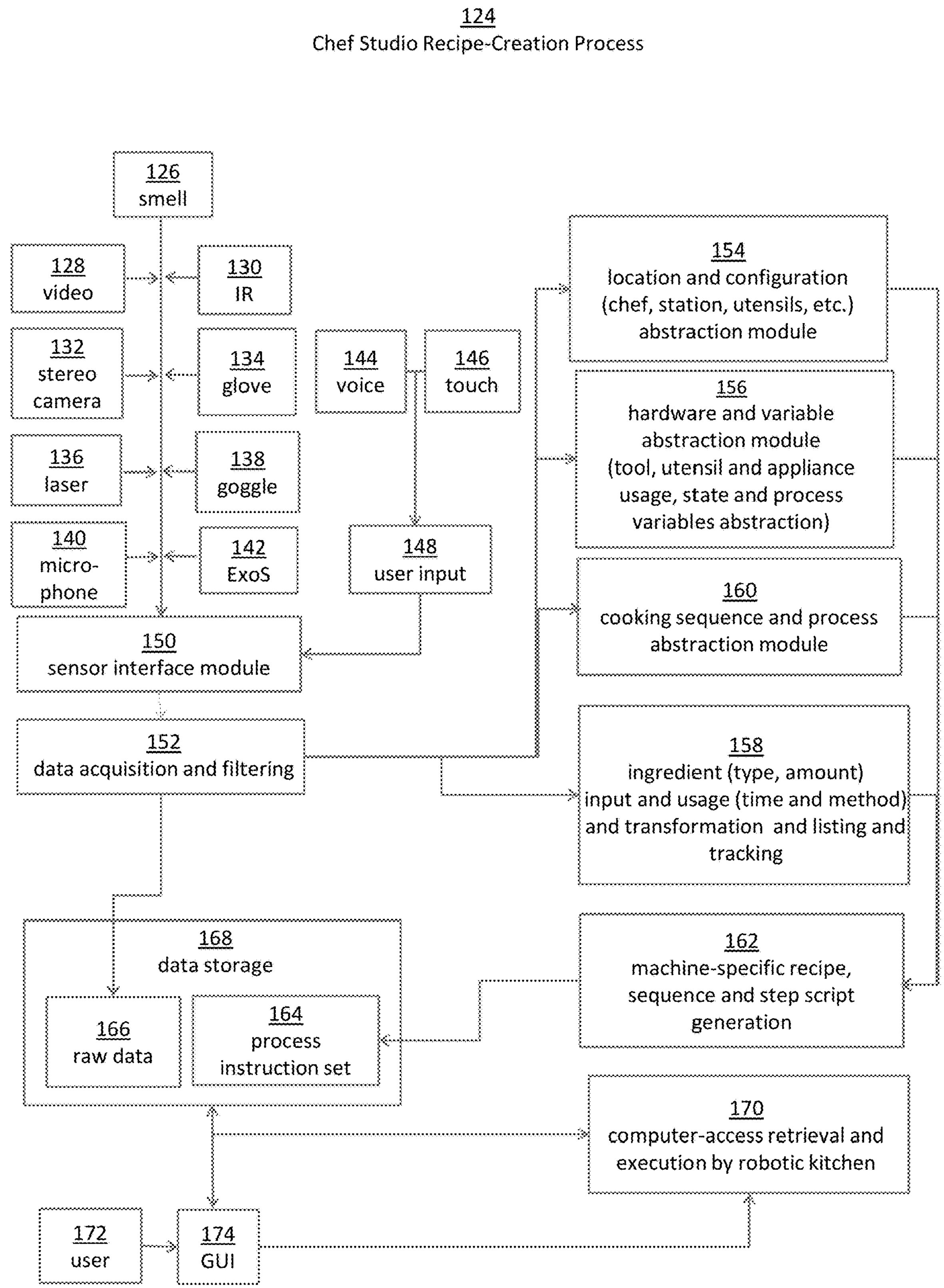
FIG. 5A is a block diagram illustrating a chef studio recipe-creation process in accordance with the present disclosure.

FIG. 5A is a block diagram illustrating a chef studio recipe-creation process 124, showcasing several main functional blocks supporting the use of expanded multimodal sensing to create a recipe instruction-script for a robotic kitchen. Sensor-data from a multitude of sensors, such as (but not limited to) smell 126, video cameras 128, infrared scanners and rangefinders 130, stereo (or even trinocular) cameras 132, haptic gloves 134, articulated laser-scanners 136, virtual-world goggles 138, microphones 140 or an exoskeleton motion suit 142, human voice 144, touch-sensors 146, and even other forms of user input 148, are used to collect data through a sensor interface module 150. The data is acquired and filtered 152, including possible human user input 148 (e.g., chef, touch-screen and voice input), after which a multitude of (parallel) software processes utilize the temporal and spatial data to generate the data that is used to populate the machine-specific recipe-creation process. Sensors may not be limited to capturing human position and/or motion but may also capture position, orientation, and/or motion of other objects in the standardized robotic kitchen 50.

These individual software modules generate such information (but are not thereby limited to only these modules) as (i) chef-location and cooking-station ID via a location and configuration module 154, (ii) configuration of arms (via torso), (iii) tools handled, when and how, (iv) utensils used and locations on the station through the hardware and variable abstraction module 156, (v) processes executed with them, and (vi) variables (temperature, lid y/n, stirring, etc.) in need of monitoring through the process module 158, (vii) temporal (start/finish, type) distribution and (viii) types of processes (stir, fold, etc.) being applied, and (ix) ingredients added (type, amount, state of prep, etc.) through the cooking sequence and process abstraction module 160.

All this information is then used to create a machine-specific (not just for the robotic-arms, but also ingredient dispensers, tools, and utensils, etc.) set of recipe instructions through the standalone module 162, which are organized as script of sequential/parallel overlapping tasks to be executed and monitored. This recipe-script is stored 164 alongside the entire raw data set 166 in the data storage module 168 and is made accessible to either a remote robotic cooking station through the robotic kitchen interface module 170 or a human user 172 via a graphical user interface (GUI) 174.

Figure 5B:
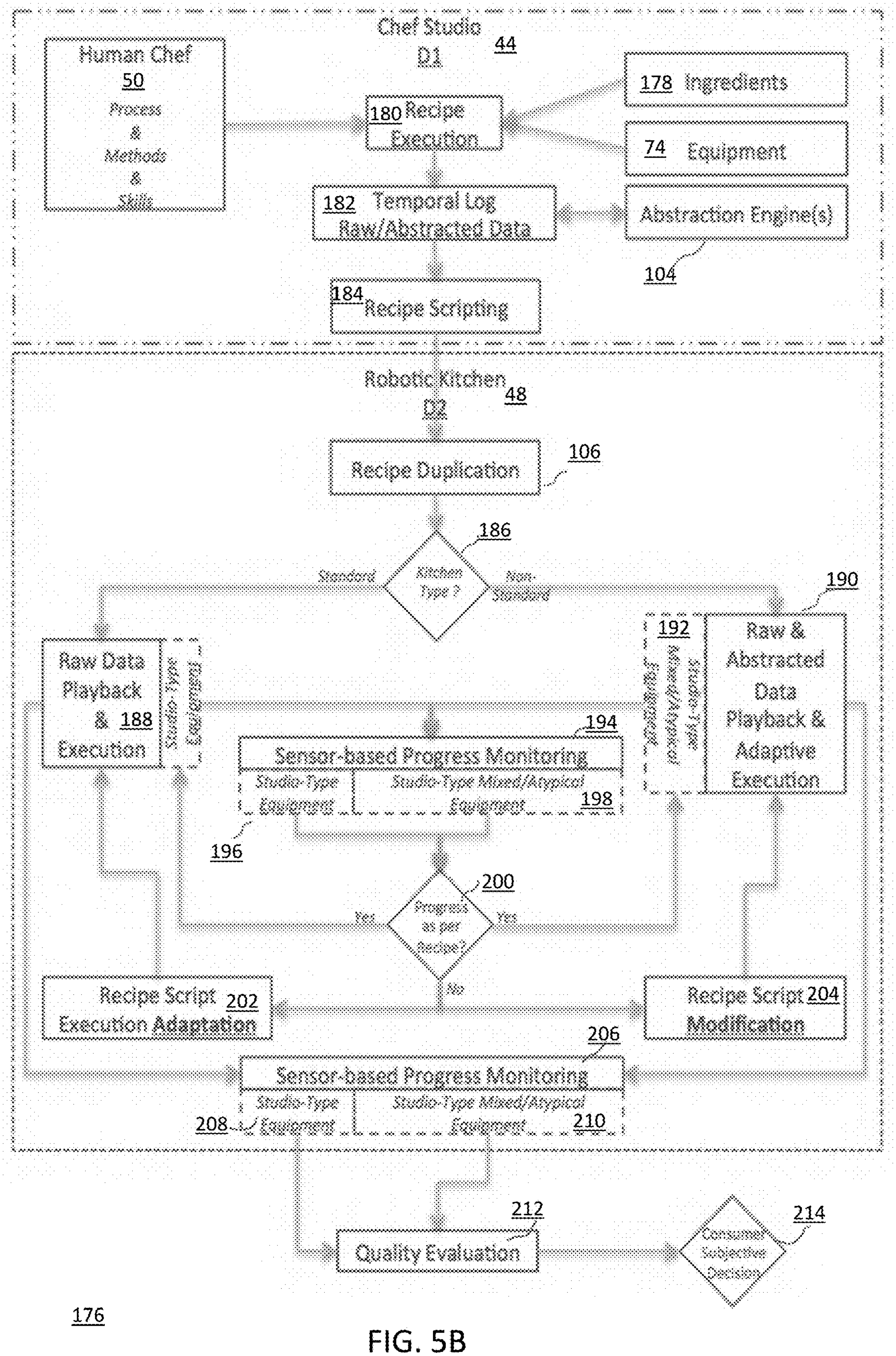
FIG. 5B is block diagram illustrating one embodiment of a standardized teach/playback robotic kitchen in accordance with the present disclosure.

FIG. 5B is a block diagram illustrating one embodiment of the standardized chef studio 44 and robotic kitchen 50 with teach/playback process 176. The teach/playback process 176 describes the steps of capturing a chef's recipe-implementation processes/methods/skills 49 in the chef studio 44 where he/she carries out the recipe execution 180, using a set of chef-studio standardized equipment 74 and recipe-required ingredients 178 to create a dish while being logged and monitored 182. The raw sensor data is logged (for playback) in 182 and processed to generate information at different abstraction levels (tools/equipment used, techniques employed, times/temperatures started/ended, etc.), and then used to create a recipe-script 184 for execution by the robotic kitchen 48. The robotic kitchen 48 engages in a recipe replication process 106, whose profile depends on whether the kitchen is of a standardized or non-standardized type, which is checked by a process 186.

The robotic kitchen execution is dependent on the type of kitchen available to the user. If the robotic kitchen uses the same/identical (at least functionally) equipment as used in the in the chef studio, the recipe replication process is primarily one of using the raw data and playing it back as part of the recipe-script execution process. Should the kitchen however differ from the ideal standardized kitchen, the execution engine(s) will have to rely on the abstraction data to generate kitchen-specific execution sequences to try to achieve a similar step-by-step result.

Since the cooking process is continually monitored by all sensor units in the robotic kitchen via a monitoring process 194, regardless of whether the known studio equipment 196 or the mixed/atypical non-chef studio equipment 198 is being used, the system is able to make modifications as needed depending on a recipe progress check 200. In one embodiment of the standardized kitchen, raw data is typically played back through an execution module 188 using chef-studio type equipment, and the only adjustments that are expected are adaptations 202 in the execution of the script (repeat a certain step, go back to a certain step, slow down the execution, etc.) as there is a one-to-one correspondence between taught and played-back data-sets. However, in the case of the non-standardized kitchen, the chances are very high that the system will have to modify and adapt the actual recipe itself and its execution, via a recipe script modification module 204, to suit the available tools/appliances 192 which differ from those in the chef studio 44 or the measured deviations from the recipe script (meat cooking too slowly, hot-spots in pot burning the roux, etc.). Overall recipe-script progress is monitored using a similar process 206, which differs depending on whether chef-studio equipment 208 or mixed/atypical kitchen equipment 210 is being used.

A non-standardized kitchen is less likely to result in a close-to-human chef cooked dish, as compared to using a standardized robotic kitchen that has equipment and capabilities reflective of those used in the studio-kitchen. The ultimate subjective decision is of course that of the human (or chef) tasting, or a quality evaluation 212, which yields to a (subjective) quality decision 214.

Figure 5C:
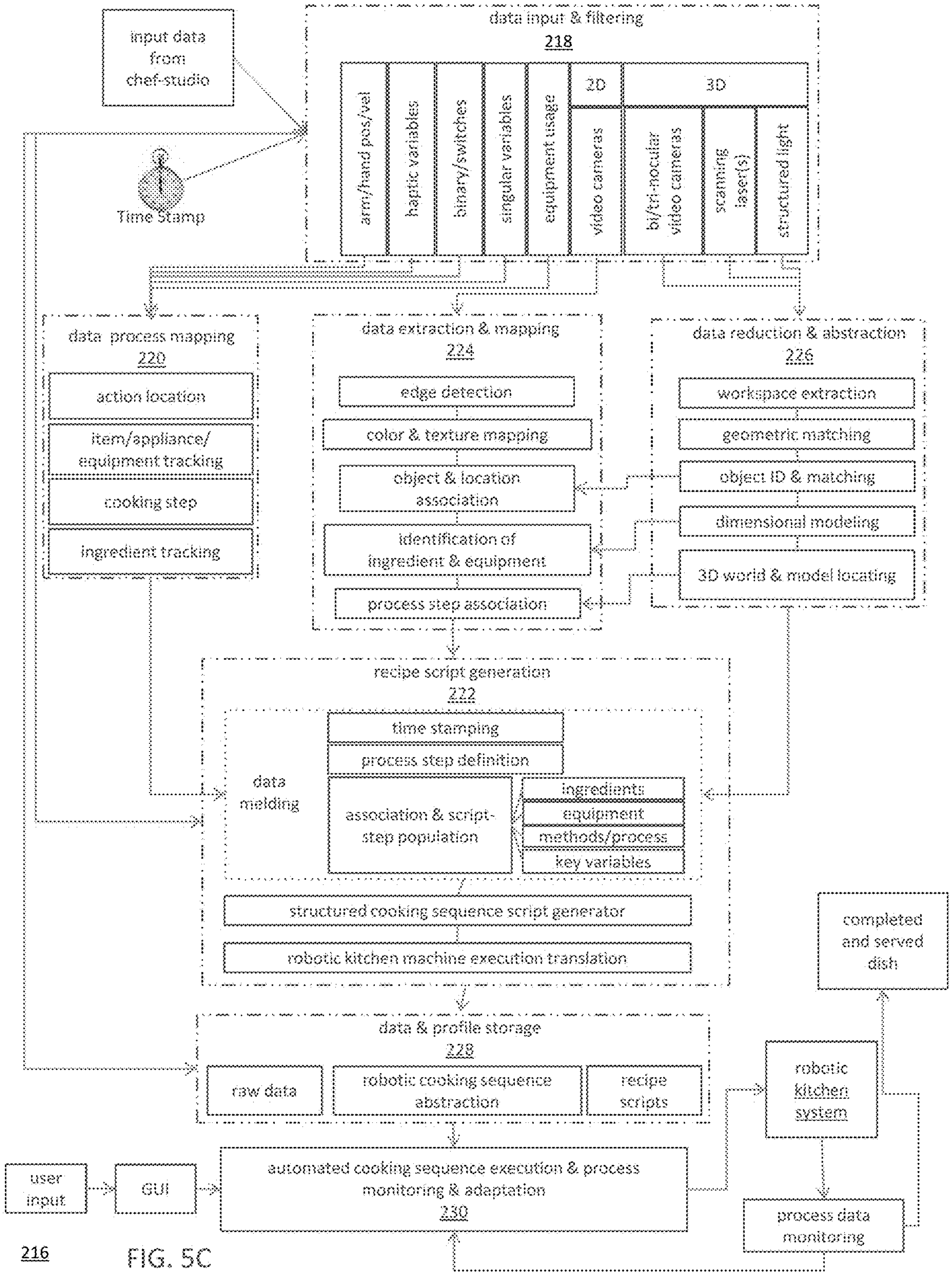
FIG. 5C is a block diagram illustrating one embodiment of a recipe script generation and abstraction engine in accordance with the present disclosure.

FIG. 5C is a block diagram illustrating one embodiment 216 of a recipe script generation and abstraction engine that pertains to the structure and flow of the recipe-script generation process as part of the chef-studio recipe walk-through by a human chef. The first step is for all available data measurable in the chef studio 44, whether it be ergonomic data from the chef (arms/hands positions and velocities, haptic finger data, etc.), status of the kitchen appliances (ovens, fridges, dispensers, etc.), specific variables (cooktop temperature, ingredient temperature, etc.), appliance or tools being used (pots/pans, spatulas, etc.), or two-dimensional and three-dimensional data collected by multi-spectrum sensory equipment (including cameras, lasers, structured light systems, etc.), to be input and filtered by the central computer system and also time-stamped by a main process 218.

A data process-mapping algorithm 220 uses the simpler (typically single-unit) variables to determine where the process action is taking place (cooktop and/or oven, fridge, etc.) and assigns a usage tag to any item/appliance/equipment being used whether intermittently or continuously. It associates a cooking step (baking, grilling, ingredient-addition, etc.) to a specific time-period and tracks when, where, which, and how much of what ingredient was added. This (time-stamped) information dataset is then made available for the data-melding process during the recipe-script generation process 222.

The data extraction and mapping process 224 is primarily focused on taking two-dimensional information (such as from monocular/single-lensed cameras) and extracting key information from the same. In order to extract the important and more abstraction descriptive information from each successive image, several algorithmic processes have to be applied to this dataset. Such processing steps can include (but are not limited to) edge-detection, color and texture-mapping, and then using the domain-knowledge in the image, coupled with object-matching information (type and size) extracted from the data reduction and abstraction process 226, to allow for the identification and location of the object (whether an item of equipment or ingredient, etc.), again extracted from the data reduction and abstraction process 226, allowing one to associate the state (and all associated variables describing the same) and items in an image with a particular process-step (frying, boiling, cutting, etc.). Once this data has been extracted and associated with a particular image at a particular point in time, it can be passed to the recipe-script generation process 222 to formulate the sequence and steps within a recipe.

The data-reduction and abstraction engine (set of software routines) 226 is intended to reduce the larger three-dimensional data sets and extract from them key geometric and associative information. A first step is to extract from the large three-dimensional data point-cloud only the specific workspace area of importance to the recipe at that particular point in time. Once the data set has been trimmed, key geometric features will be identified by a process known as template matching. This allows for the identification of such items as horizontal tabletops, cylindrical pots and pans, arm and hand locations, etc. Once typical known (template) geometric entities are determined in a data-set a process of object identification and matching proceeds to differentiate all items (pot vs. pan, etc.) and associates the proper dimensionality (size of pot or pan, etc.) and orientation of the same, and places them within the three-dimensional world model being assembled by the computer. All this abstraction/extracted information are then also shared with the data-extraction and mapping engine 224, prior to all being fed to the recipe-script generation engine 222.

The recipe-script generation engine process 222 is responsible for melding (blending/combining) all the available data and sets into a structured and sequential cooking script with clear process-identifiers (prepping, blanching, frying, washing, plating, etc.) and process-specific steps within each, which can then be translated into robotic-kitchen machine-executable command-scripts that are synchronized based on process-completion and overall cooking time and cooking progress. Data melding will at least involve, but will not solely be limited to, the ability to take each (cooking) process step and populating the sequence of steps to be executed with the properly associated elements (ingredients, equipment, etc.), methods and processes to be used during the process steps, and the associated key control (set oven/cooktop temperatures/settings), and monitoring-variables (water or meat temperature, etc.) to be maintained and checked to verify proper progress and execution. The melded data is then combined into a structured sequential cooking script that will resemble a set of minimally descriptive steps (akin to a recipe in a magazine) but with a much larger set of variables associated with each element (equipment, ingredient, process, method, variable, etc.) of the cooking process at any one point in the procedure. The final step is to take this sequential cooking script and transform it into an identically structured sequential script that is translatable by a set of machines/robot/equipment within a robotic kitchen 48. It is this script the robotic kitchen 48 uses to execute the automated recipe execution and monitoring steps.

All raw (unprocessed) and processed data as well as the associated scripts (both structure sequential cooking-sequence script and the machine-executable cooking-sequence script) are stored in the data and profile storage unit/process 228 and time-stamped. It is from this database that the user, by way of a GUI, can select and cause the robotic kitchen to execute a desired recipe through the automated execution and monitoring engine 230, which is continually monitored by its own internal automated cooking process, with necessary adaptations and modifications to the script generated by the same and implemented by the robotic-kitchen elements, in order to arrive at a completely plated and served dish.

Figure 5D:
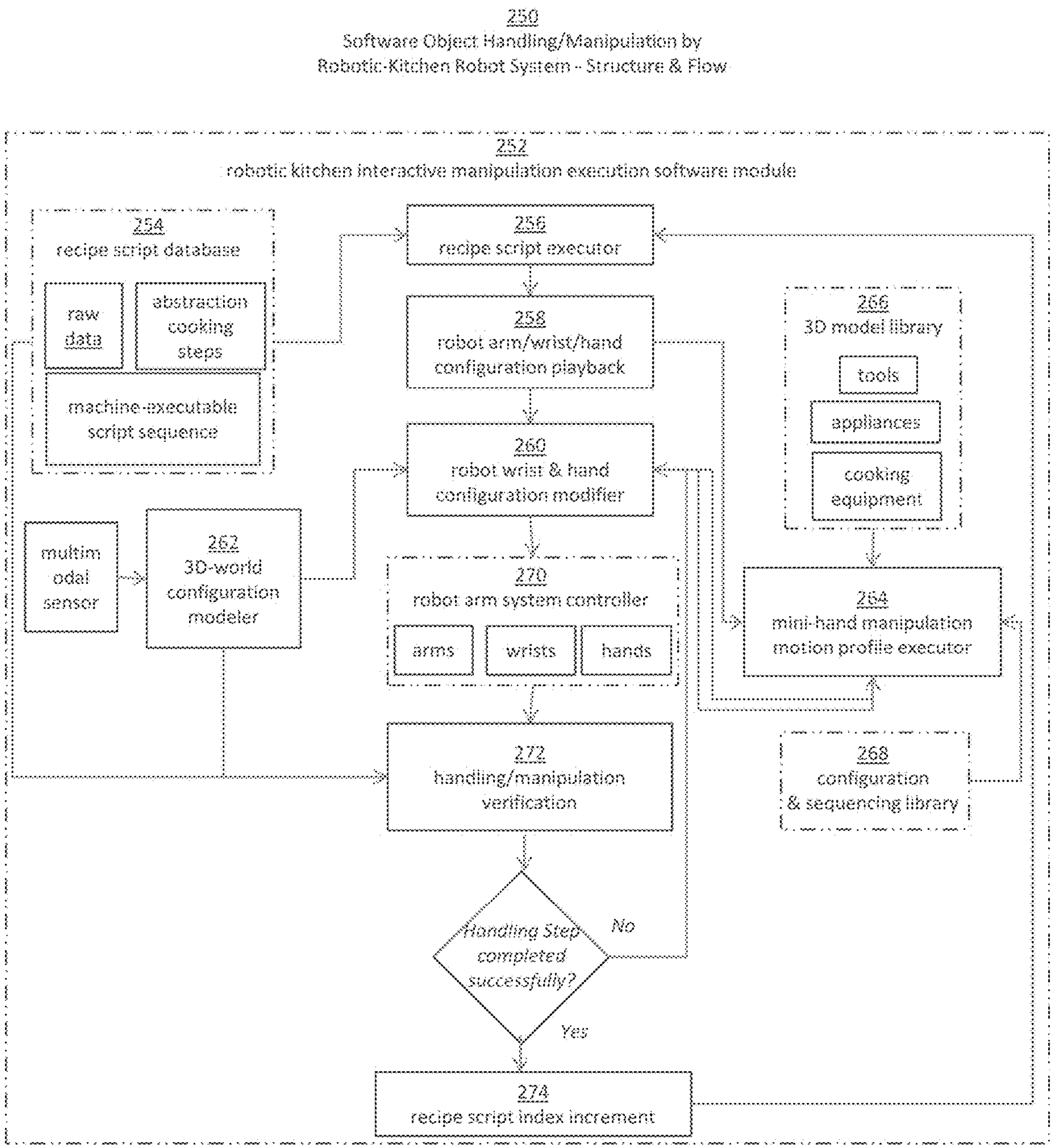
FIG. 5D is a block diagram illustrating software elements for object-manipulation in the standardized robotic kitchen in accordance with the present disclosure.

FIG. 5D is a block diagram illustrating software elements for object-manipulation (or object handling) in the standardized robotic kitchen 50, which shows the structure and flow 250 of the object-manipulation portion of the robotic kitchen execution of a robotic script, using the notion of motion-replication coupled-with/aided-by minimanipulation steps. In order for automated robotic-arm/-hand-based cooking to be viable, it is insufficient to monitor every single joint in the arm and hands/fingers. In many cases just the position and orientation of the hand/wrist are known (and able to be replicated), but then manipulating an object (identifying location, orientation, pose, grab-location, grabbing-strategy and task-execution) requires that local-sensing and learned behaviors and strategies for the hand and fingers be used to complete the grabbing/manipulating task successfully. These motion-profiles (sensor-based/-driven) behaviors and sequences are stored within the mini hand-manipulation library software repository in the robotic-kitchen system. The human chef could be wearing complete arm-exoskeleton or an instrumented/target-fitted motion-vest allowing the computer via built-in sensors or though camera-tracking to determine the exact 3D position of the hands and wrists at all times. Even if the ten fingers on both hands had all their joints instrumented (more than 30 DoFs (Degrees of Freedom) for both hands and very awkward to wear and use, and thus unlikely to be used), a simple motion-based playback of all joint positions would not guarantee successful (interactive) object manipulation.

The minimanipulation library is a command-software repository, where motion behaviors and processes are stored based on an off-line learning process, where the arm/wrist/finger motions and sequences to successfully complete a particular abstract task (grab the knife and then slice; grab the spoon and then stir; grab the pot with one hand and then use other hand to grab spatula and get under meat and flip it inside the pan; etc.). This repository has been built up to contain the learned sequences of successful sensor-driven motion-profiles and sequenced behaviors for the hand/wrist (and sometimes also arm-position corrections), to ensure successful completions of object (appliance, equipment, tools) and ingredient manipulation tasks that are described in a more abstract language, such as "grab the knife and slice the vegetable", "crack the egg into the bowl", "flip the meat over in the pan", etc. The learning process is iterative and is based on multiple trials of a chef-taught motion-profile from the chef studio, which is then executed and iteratively modified by the offline learning algorithm module, until an acceptable execution-sequence can be shown to have been achieved. The minimanipulation library (command software repository) is intended to have been populated (a-priori and offline) with all the necessary elements to allow the robotic-kitchen system to successfully interact with all equipment (appliances, tools, etc.) and main ingredients that require processing (steps beyond just dispensing) during the cooking process. While the human chef wore gloves with embedded haptic sensors (proximity, touch, contact-location/-force) for the fingers and palm, the robotic hands are outfitted with similar sensor-types in locations to allow their data to be used to create, modify and adapt motion-profiles to execute successfully the desired motion-profiles and handling-commands.

The object-manipulation portion of the robotic-kitchen cooking process (robotic recipe-script execution software module for the interactive manipulation and handling of objects in the kitchen environment) 252 is further elaborated below. Using the robotic recipe-script database 254 (which contains data in raw, abstraction cooking-sequence and machine-executable script forms), the recipe script executor module 256 steps through a specific recipe execution-step. The configuration playback module 258 selects and passes configuration commands through to the robot arm system (torso, arm, wrist and hands) controller 270, which then controls the physical system to emulate the required configuration (joint-positions/-velocities/-torques, etc.) values.

The notion of being able to carry out proper environment interaction manipulation and handling tasks faithfully is made possible through a real-time process-verification by way of (i) 3D world modeling as well as (ii) minimanipulation. Both the verification and manipulation steps are carried out through the addition of the robot wrist and hand configuration modifier 260. This software module uses data from the 3D world configuration modeler 262, which creates a new 3D world model at every sampling step from sensory data supplied by the multimodal sensor(s) unit(s), in order to ascertain that the configuration of the robotic kitchen systems and process matches that required by the recipe script (database); if not, it enacts modifications to the commanded system-configuration values to ensure the task is completed successfully. Furthermore, the robot wrist and hand configuration modifier 260 also uses configuration-modifying input commands from the minimanipulation motion profile executor 264. The hand/wrist (and potentially also arm) configuration modification data fed to the configuration modifier 260 are based on the minimanipulation motion profile executor 264 knowing what the desired configuration playback should be from 258, but then modifying it based on its 3D object model library 266 and the a-priori learned (and stored) data from the configuration and sequencing library 268 (which was built based on multiple iterative learning steps for all main object handling and processing steps).

While the configuration modifier 260 continually feeds modified commanded configuration data to the robot arm system controller 270, it relies on the handling/manipulation verification software module 272 to verify not only that the operation is proceeding properly but also whether continued manipulation/handling is necessary. In the case of the latter (answer 'N' to the decision), the configuration modifier 260 re-requests configuration-modification (for the wrist, hands/fingers and potentially the arm and possibly even torso) updates from both the world modeler 262 and the minimanipulation profile executor 264. The goal is simply to verify that a successful manipulation/handling step or sequence has been successfully completed. The handling/manipulation verification software module 272 carries out this check by using the knowledge of the recipe script database F2 and the 3D world configuration modeler 262 to verify the appropriate progress in the cooking step currently being commanded by the recipe script executor 256. Once progress has been deemed successful, the recipe script index increment process 274 notifies the recipe script executor 256 to proceed to the next step in the recipe-script execution.

Figure 6:
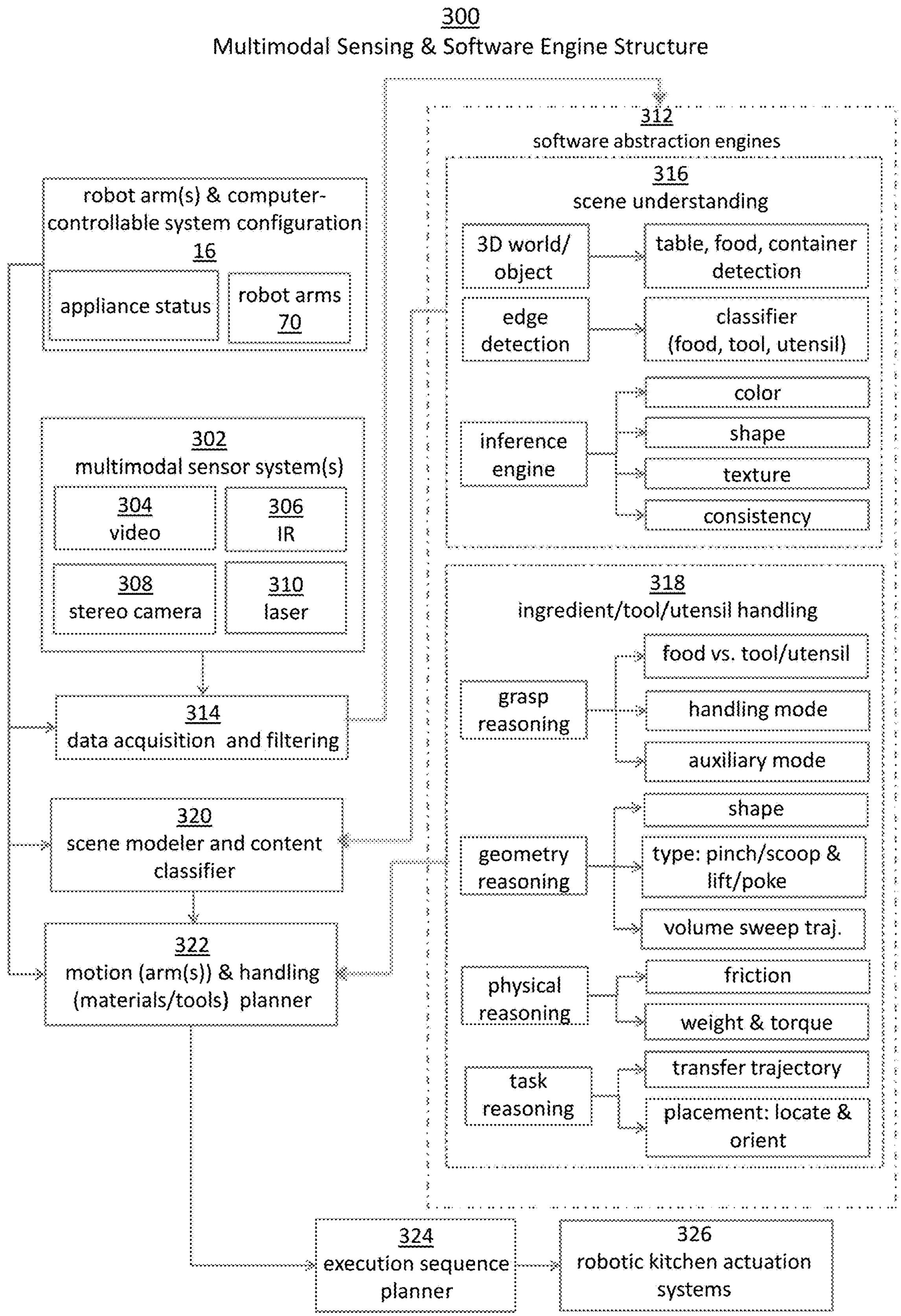
FIG. 6 is a block diagram illustrating a multimodal sensing and software engine architecture in accordance with the present disclosure.

FIG. 6 is a block diagram illustrating a multimodal sensing and software engine architecture 300 in accordance with the present disclosure. One of the main autonomous cooking features allowing for planning, execution and monitoring of a robotic cooking script requires the use of multimodal sensory input 302 that is used by multiple software modules to generate data needed to (i) understand the world, (ii) model the scene and materials, (iii) plan the next steps in the robotic cooking sequence, (iv) execute the generated plan and (v) monitor the execution to verify proper operations—all of these steps occurring in a continuous/repetitive closed loop fashion.

The multimodal sensor-unit(s) 302, comprising, but not limited to, video cameras 304, IR cameras and rangefinders 306, stereo (or even trinocular) camera(s) 308 and multi-dimensional scanning lasers 310, provide multi-spectral sensory data to the main software abstraction engines 312 (after being acquired & filtered in the data acquisition and filtering module 314). The data is used in a scene understanding module 316 to carry out multiple steps such as (but not limited to) building high- and lower-resolution (laser: high-resolution; stereo-camera: lower-resolution) three-dimensional surface volumes of the scene, with superimposed visual and IR-spectrum color and texture video information, allowing edge-detection and volumetric object-detection algorithms to infer what elements are in a scene, allowing the use of shape-/color-/texture- and consistency-mapping algorithms to run on the processed data to feed processed information to the Kitchen Cooking Process Equipment Handling Module 318. In the module 318, software-based engines are used for the purpose of identifying and three-dimensionally locating the position and orientation of kitchen tools and utensils and identifying and tagging recognizable food elements (meat, carrots, sauce, liquids, etc.) so as to generate data to let the computer build and understand the complete scene at a particular point in time so as to be used for next-step planning and process monitoring. Engines required to achieve such data and information abstraction include, but are not limited to, grasp reasoning engines, robotic kinematics and geometry reasoning engines, physical reasoning engines and task reasoning engines. Output data from both engines 316 and 318 are then used to feed the scene modeler and content classifier 320, where the 3D world model is created with all the key content required for executing the robotic cooking script executor. Once the fully-populated model of the world is understood, it can be used to feed the motion and handling planner 322 (if robotic-arm grasping and handling are necessary, the same data can be used to differentiate and plan for grasping and manipulating food and kitchen items depending on the required grip and placement) to allow for planning motions and trajectories for the arm(s) and attached end-effector(s) (grippers, multi-fingered hands). A follow-on Execution Sequence planner 324 creates the proper sequencing of task-based commands for all individual robotic/automated kitchen elements, which are then used by the robotic kitchen actuation systems 326. The entire sequence above is repeated in a continuous closed loop during the robotic recipe-script execution and monitoring phase.

Figure 7A:
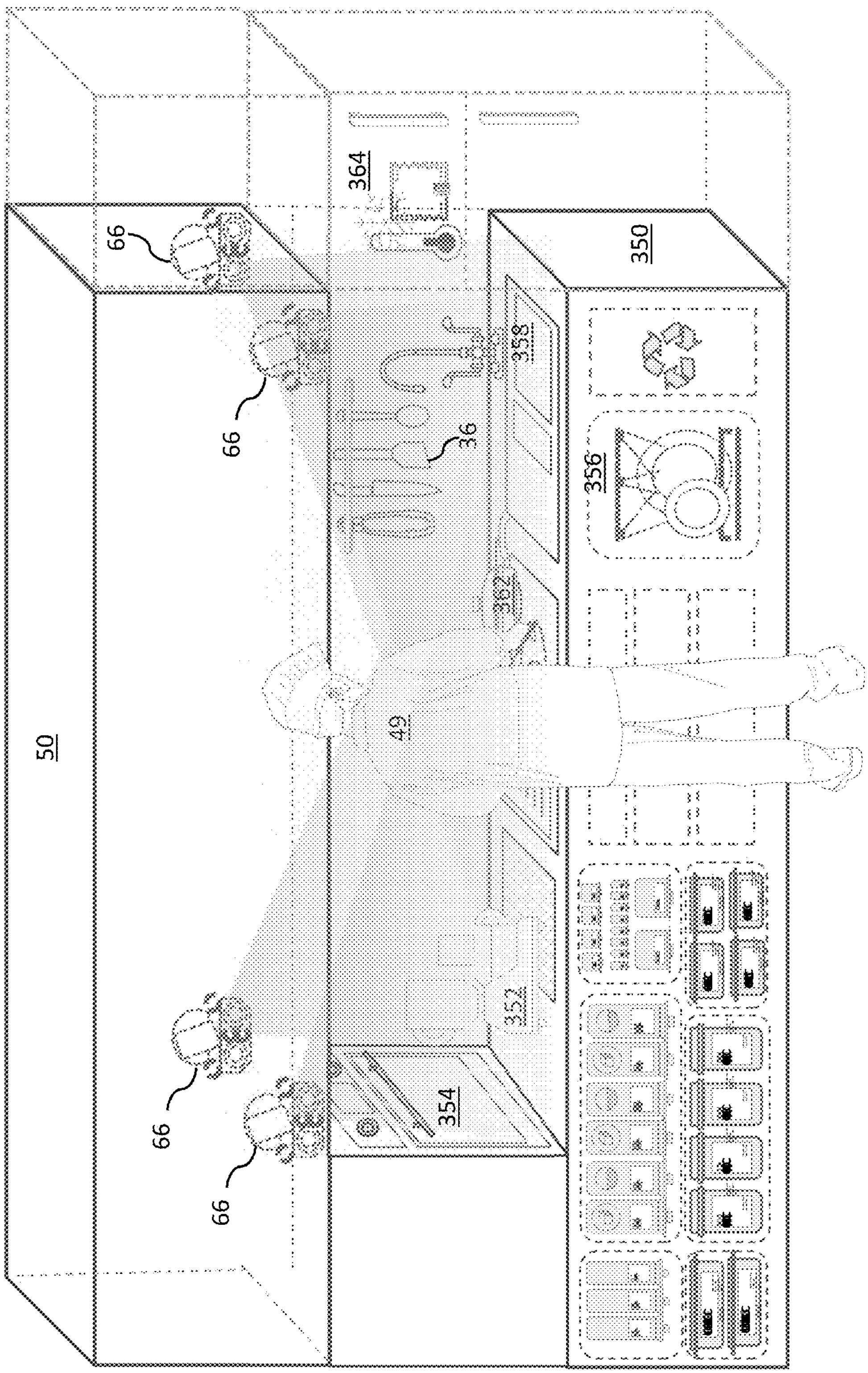
FIG. 7A is a block diagram illustrating a standardized robotic kitchen module used by a chef in accordance with the present disclosure.

FIG. 7A depicts the standardized kitchen 50 which in this case plays the role of the chef-studio, in which the human chef 49 carries out the recipe creation and execution while being monitored by the multi-modal sensor systems 66, so as to allow the creation of a recipe-script. Within the standardized kitchen, are contained multiple elements necessary for the execution of a recipe, including the main cooking module 350, which includes such as equipment as utensils 360, a cooktop 362, a kitchen sink 358, a dishwasher 356, a table-top mixer and blender (also referred to as a "kitchen blender") 352, an oven 354 and a refrigerator/freezer combination unit 364.

Figure 7B:
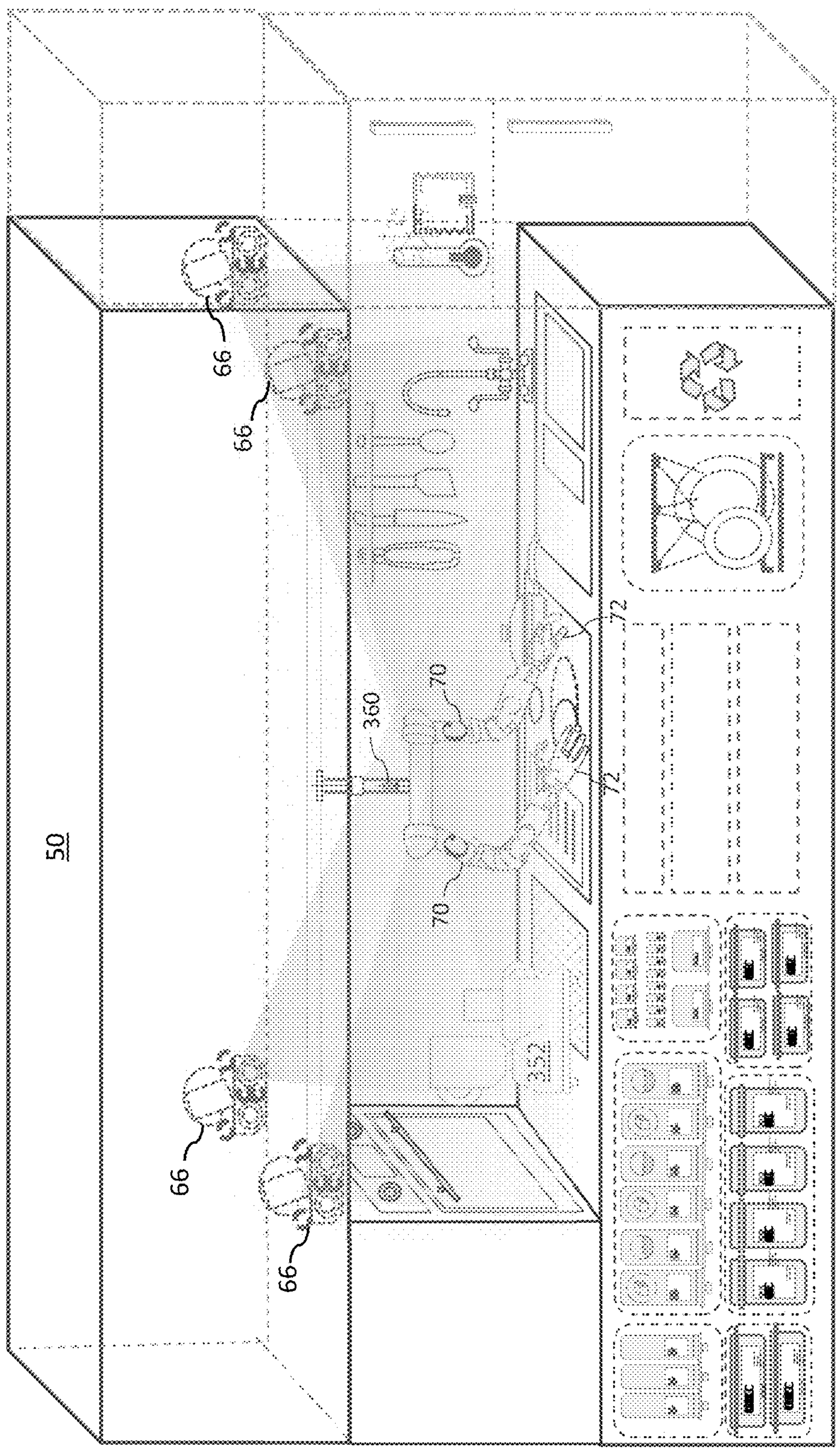
FIG. 7B is a block diagram illustrating the standardized robotic kitchen module with a pair of robotic arms and hands in accordance with the present disclosure.

FIG. 7B depicts the standardized kitchen 50, which in this case is configured as the standardized robotic kitchen, with a dual-arm robotics system with vertical telescoping and rotating torso joint 366, outfitted with two arms 70, and two wristed and fingered hands 72, carries out the recipe replication processes defined in the recipe-script. The multi-modal sensor systems 66 continually monitor the robotically executed cooking steps in the multiple stages of the recipe replication process.

Figure 7C:
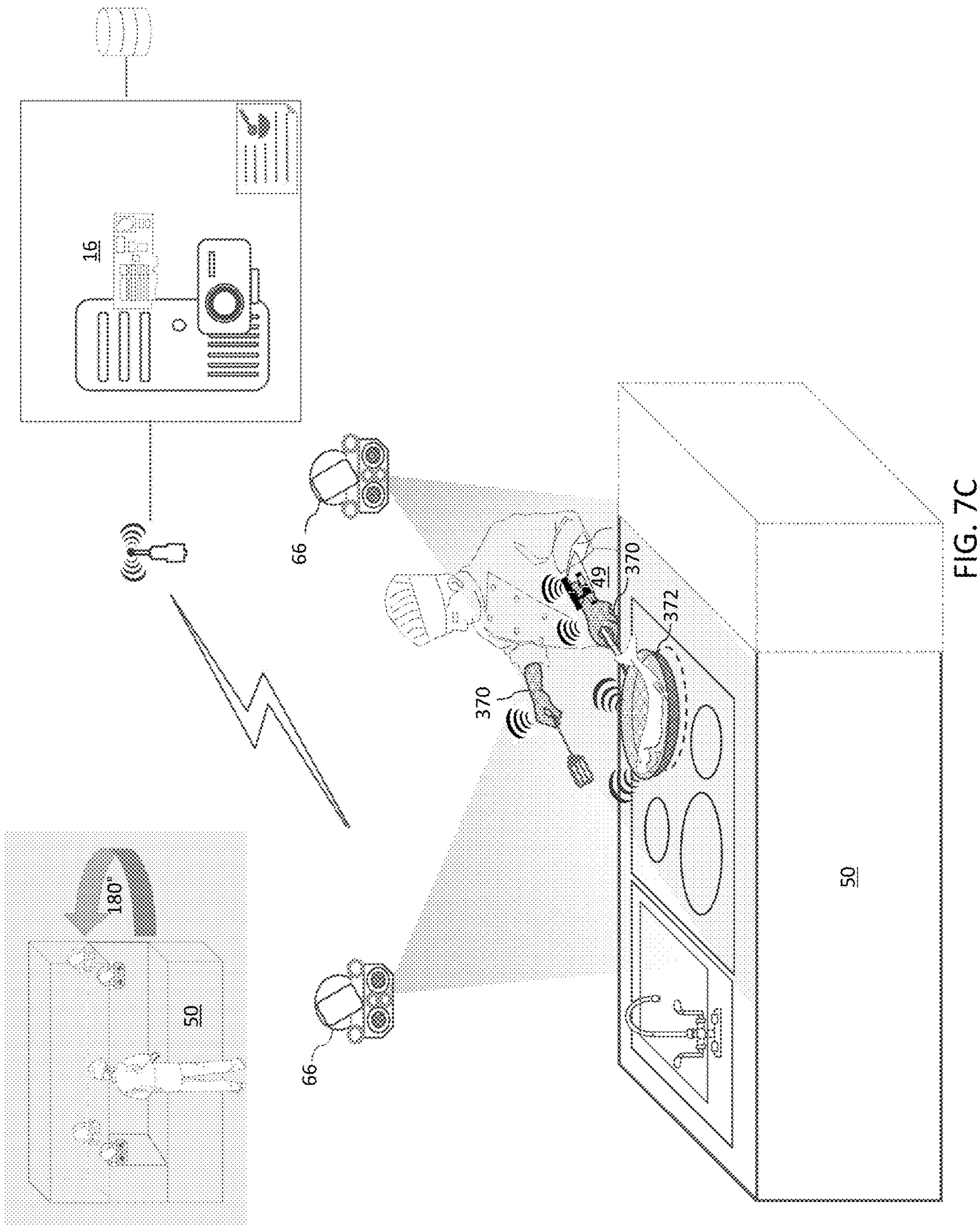
FIG. 7C is a block diagram illustrating one embodiment of a physical layout of the standardized robotic kitchen module used by a chef in accordance with the present disclosure.

FIG. 7C depicts the systems involved in the creation of a recipe-script by monitoring a human chef 49 during the entire recipe execution process. The same standardized kitchen 50 is used in a chef studio mode, with the chef able to operate the kitchen from either side of the work-module. Multi-modal sensors 66 monitor and collect data, as well as through the haptic gloves 370 worn by the chef and instrumented cookware 372 and equipment, relaying all collected raw data wirelessly to a processing computer 16 for processing and storage.

Figure 7D:
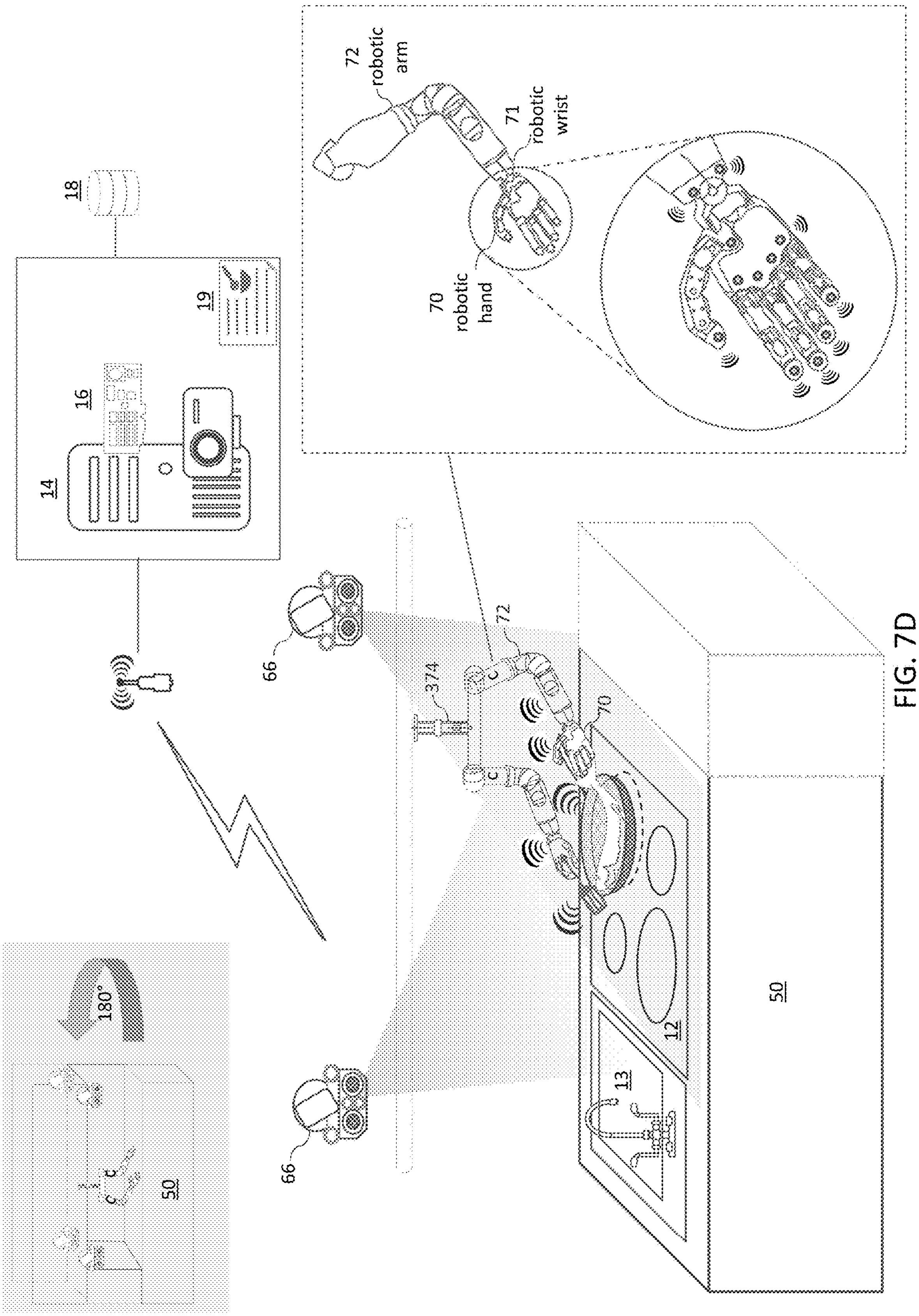
FIG. 7D is a block diagram illustrating one embodiment of a physical layout of the standardized robotic kitchen module used by a pair of robotic arms and hands in accordance with the present disclosure.

FIG. 7D depicts the systems involved in a standardized kitchen 50 for the replication of a recipe script 19 through the use of a dual-arm system with telescoping and rotating torso 374, comprised of two arms 72, two robotic wrists 71 and two multi-fingered hands 72 with embedded sensory skin and point-sensors. The robotic dual-arm system uses the instrumented arms and hands with a cooking utensil and an instrumented appliance and cookware (pan in this image) on a cooktop 12, while executing a particular step in the recipe replication process, while being continuously monitored by the multi-modal sensor units 66 to ensure the replication process is carried out as faithfully as possible to that created by the human chef. All data from the multi-modal sensors 66, dual-arm robotics system comprised of torso 74, arms 72, wrists 71 and multi-fingered hands 72, utensils, cookware and appliances, is wirelessly transmitted to a computer 16, where it is processed by an onboard processing unit 16 in order to compare and track the replication process of the recipe to as faithfully as possible follow the criteria and steps as defined in the previously created recipe script 19 and stored in media 18.

Some suitable robotic hands that can be modified for use with the robotic kitchen 48 include Shadow Dexterous Hand and Hand-Lite designed by Shadow Robot Company, located in London, the United Kingdom; a servo-electric 5-finger gripping hand SVH designed by SCHUNK GmbH & Co. KG, located in Lauffen/Neckar, Germany; and DLR HIT HAND II designed by DLR Robotics and Mechatronics, located in Cologne, Germany.

Several robotic arms 72 are suitable for modification to operate with the robotic kitchen 48, which include UR3 Robot and UR5 Robot by Universal Robots A/S, located in Odense S, Denmark, Industrial Robots with various payloads designed by KUKA Robotics, located in Augsburg, Bavaria, Germany, Industrial Robot Arm Models designed by Yaskawa Motoman, located in Kitakyushu, Japan.

Figure 7E:
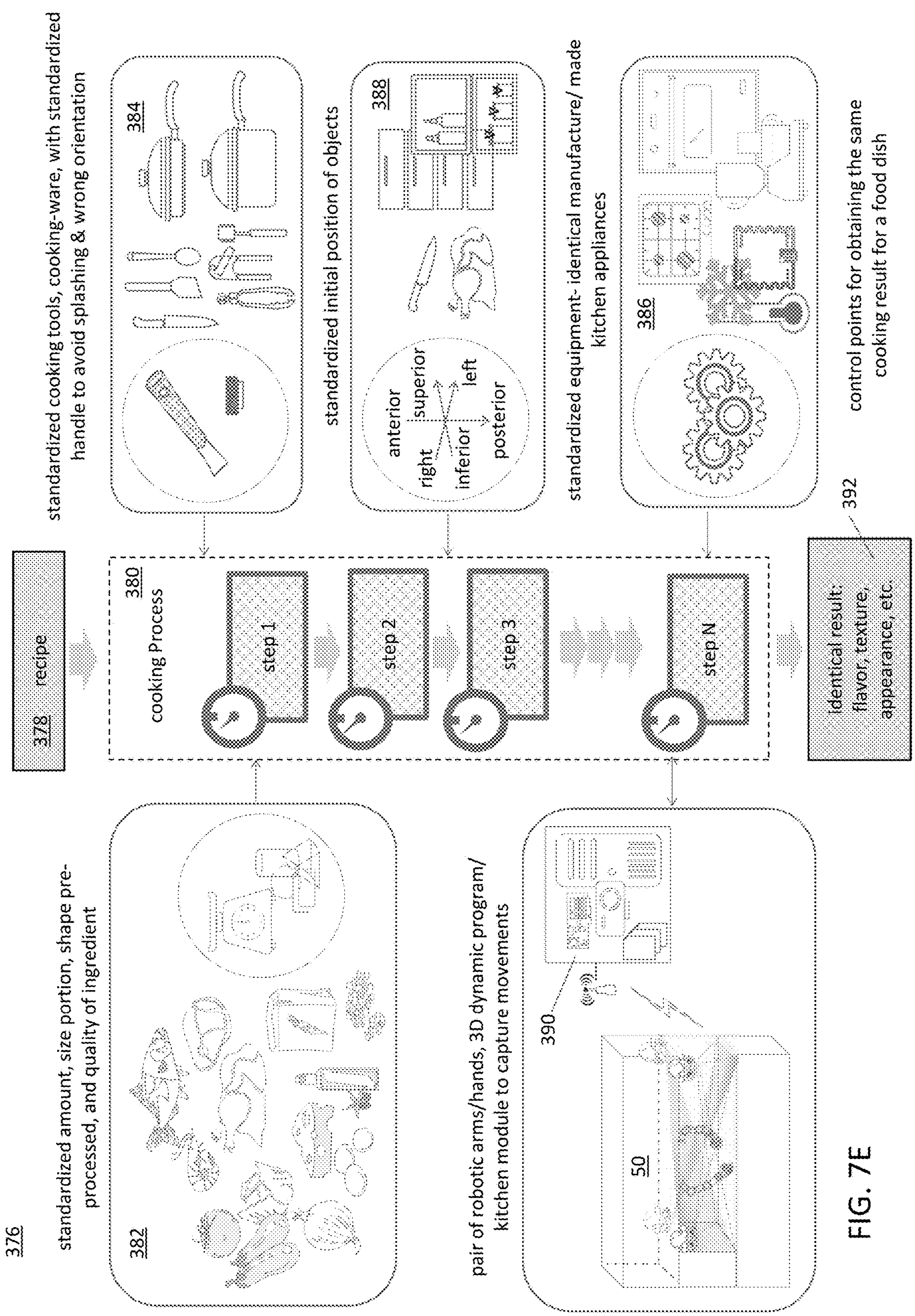
FIG. 7E is a block diagram depicting the stepwise flow and methods to ensure that there are control or verification points during the recipe replication process based on the recipe-script when executed by the standardized robotic kitchen in accordance with the present disclosure.

FIG. 7E is a block diagram depicting the stepwise flow and methods 376 to ensure that there are control or verification points during the recipe replication process based on the recipe-script when executed by the standardized robotic kitchen 50, that ensures as nearly identical as possible a cooking result for a particular dish as executed by the standardized robotic kitchen 50, when compared to the dish prepared by the human chef 49. Using a recipe 378, as described by the recipe-script and executed in sequential steps in the cooking process 380, the fidelity of execution of the recipe by the robotic kitchen 50 will depend largely on considering the following main control items. Key control items include the process of selecting and utilizing a standardized portion amount and shape of a high-quality and pre-processed ingredient 382, the use of standardized tools and utensils, cook-ware with standardized handles to ensure proper and secure grasping with a known orientation 384, standardized equipment 386 (oven, blender, fridge, fridge, etc.) in the standardized kitchen that is as identical as possible when comparing the chef studio kitchen where the human chef 49 prepares the dish and the standardized robotic kitchen 50, location and placement 388 for ingredients to be used in the recipe, and ultimately a pair of robotic arms, wrists and multi-fingered hands in the robotic kitchen module 50 continually monitored by sensors with computer-controlled actions 390 to ensure successful execution of each step in every stage of the replication process of the recipe-script for a particular dish. In the end, the task of ensuring an identical result 392 is the ultimate goal for the standardized robotic kitchen 50.

Figure 7F:
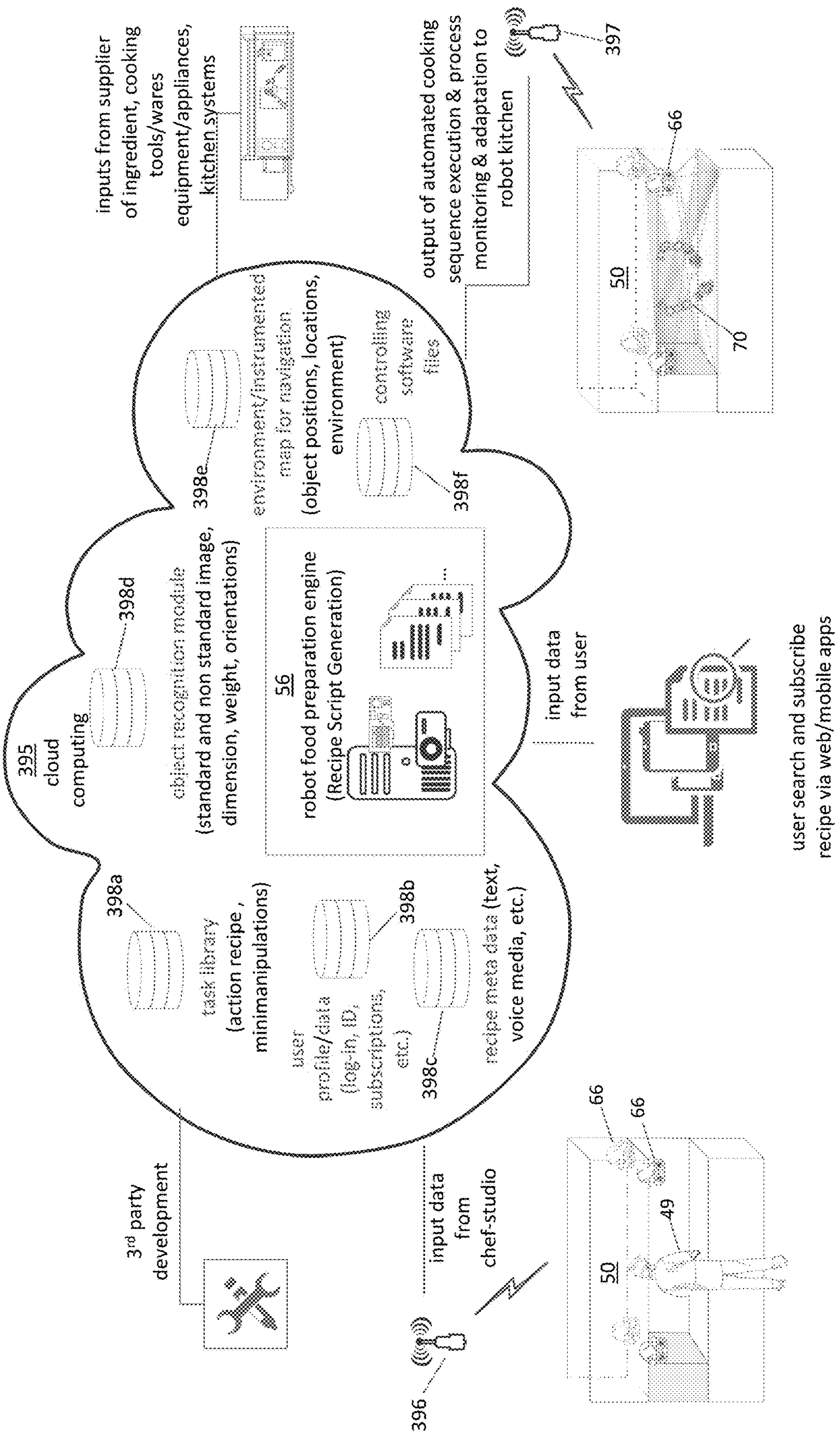
FIG. 7F depicts a block diagram of a cloud-based recipe software for facilitating between the chef studio, the robotic kitchen and other sources.

FIG. 7F depicts a block diagram of a cloud-based recipe software for facilitating between the chef studio, the robotic kitchen, and other sources. The various types of data communicated, modified, and stored on a cloud computing 396 between the chef kitchen 44, which operates a standardized robotic kitchen 50 and the robotic kitchen 48, which operates a standardized robotic kitchen 50. The cloud computing 394 provides a central location to store software files, including operation of the robot food preparation 56, which can conveniently retrieve and upload software files through a network between the chef kitchen 44 and the robotic kitchen 48. The chef kitchen 44 is communicatively coupled to the cloud computing 395 through a wired or wireless network 396 via the Internet, wireless protocols, and short distance communication protocols, such as BlueTooth. The robotic kitchen 48 is communicatively coupled to the cloud computing 395 through a wired or wireless network 397 via the Internet, wireless protocols, and short distance communication protocols, such as BlueTooth. The cloud computing 395 includes computer storage locations to store a task library 398*a* with actions, recipe, and minimanipulations; a user profile/data 398*b* with login information, ID, and subscriptions; a recipe meta data 398*c* with text, voice media, etc.; an object recognition module 398*d* with standard images, non-standard images, dimensions, weight, and orientations; an environment/instrumented map 398*e* for navigation of object positions, locations, and the operating environment; and a controlling software files 398*f* for storing robotic command instructions, high-level software files, and low-level software files. In another embodiment, the Internet of Things (IoT) devices can be incorporated to operate with the chef kitchen 44, the cloud computing 396 and the robotic kitchen 48.

Figure 8A:
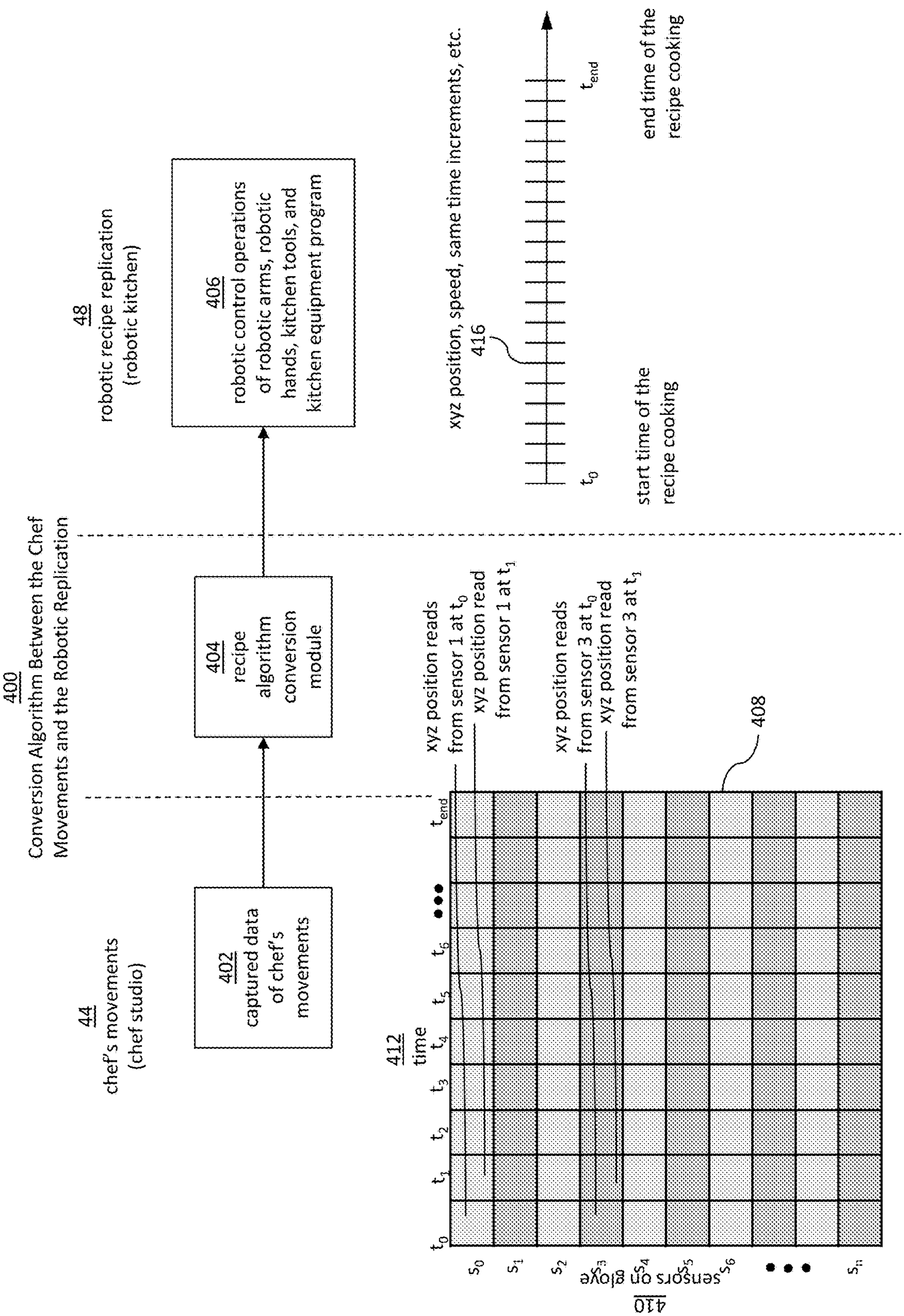
FIG. 8A is a block diagram illustrating one embodiment of a conversion algorithm module between the chef movements and the robotic mirror movements in accordance with the present disclosure.

FIG. 8A is a block diagram illustrating one embodiment of a recipe conversion algorithm module 400 between the chef's movements and the robotic replication movements. A recipe algorithm conversion module 404 converts the captured data from the chef's movements in the chef studio 44 into a machine-readable and machine-executable language 406 for instructing the robotic arms 70 and the robotic hands 72 to replicate a food dish prepared by the chef's movement in the robotic kitchen 48. In the chef studio 44, the computer 16 captures and records the chef's movements based on the sensors on a glove 26 that the chef wears, represented by a plurality of sensors $S_0$, $S_1$, $S_2$, $S_3$, $S_4$, $S_5$, $S_6$ . . . $S_n$ in the vertical columns, and the time increments $t_0$, $t_1$, $t_2$, $t_3$, $t_4$, $t_5$, $t_6$ . . . $t_{end}$ in the horizontal rows, in a table 408. At time $t_0$, the computer 16 records the xyz coordinate positions from the sensor data received from the plurality of sensors $S_0$, $S_1$, $S_2$, $S_3$, $S_4$, $S_5$, $S_6$ . . . $S_n$. At time $t_1$, the computer 16 records the xyz coordinate positions from the sensor data received from the plurality of sensors $S_0$, $S_1$, $S_2$, $S_3$, $S_4$, $S_5$, $S_6$ . . . $S_n$. At time $t_2$, the computer 16 records the xyz coordinate positions from the sensor data received from the plurality of sensors $S_0$, $S_1$, $S_2$, $S_3$, $S_4$, $S_5$, $S_6$ . . . $S_n$. This process continues until the entire food preparation is completed at time $t_{end}$. The duration for each time units to, $t_1$, $t_2$, $t_3$, $t_4$, $t_5$, $t_6$ . . . $t_{end}$ is the same. As a result of the captured and recorded sensor data, the table 408 shows any movements from the sensors $S_0$, $S_1$, $S_2$, $S_3$, $S_4$, $S_5$, $S_6$ . . . $S_n$ in the glove 26 in xyz coordinates, which would indicate the differentials between the xyz coordinate positions for one specific time relative to the xyz coordinate positions for the next specific time. Effectively, the table 408 records how the chef's movements change over the entire food preparation process from the start time, to, to the end time, $t_{end}$. The illustration in this embodiment can be extended to two gloves 26 with sensors, which the chef 49 wears to capture the movements while preparing a food dish. In the robotic kitchen 48, the robotic arms 70 and the robotic hands 72 replicate the recorded recipe from the chef studio 44, which is then converted to robotic instructions, where the robotic arms 70 and the robotic hands 72 replicate the food preparation of the chef 49 according to the timeline 416. The robotic arms 70 and hands 72 carry out the food preparation with the same xyz coordinate positions, at the same speed, with the same time increments from the start time, to, to the end time, $t_{end}$, as shown in the timeline 416.

In some embodiments, a chef performs the same food preparation operation multiple times, yielding values of the sensor reading, and parameters in the corresponding robotic instructions that vary somewhat from one time to the next. The set of sensor readings for each sensor across multiple repetitions of the preparation of the same food dish provides a distribution with a mean, standard deviation and minimum and maximum values. The corresponding variations on the robotic instructions (also called the effector parameters) across multiple executions of the same food dish by the chef also define distributions with mean, standard deviation, minimum and maximum values. These distributions may be used to determine the fidelity (or accuracy) of subsequent robotic food preparations.

In one embodiment the estimated average accuracy of a robotic food preparation operation is given by:

$$A(C, R) = 1 - \frac{1}{n}\sum_{n=1,\ldots n} \frac{|c_i - p_i|}{\max(|c_{i,t} - p_{i,t}|}$$

Where C represents the set of Chef parameters ($1^{st}$ through $n^{th}$) and R represents the set of Robotic Apparatus parameters (correspondingly ($1^{st}$ through $n^{th}$). The numerator in the sum represents the difference between robotic and chef parameters (i.e. the error) and the denominator normalizes for the maximal difference). The sum gives the total normalized cumulative error $$\left(\text{i.e. } \sum\nolimits_{n=1,\ldots n} \frac{|c_i - p_i|}{\max(|c_{i,t} - p_{i,t}|}\right)$$

and multiplying by 1/n gives the average error. The complement of the average error corresponds to the average accuracy.

Another version of the accuracy calculation weighs the parameters for importance, where each coefficient (each $\alpha_i$) represents the importance of the $i^{th}$ parameter, the normalized cumulative error is $$\sum\nolimits_{n=1,\ldots n} \frac{\alpha_i |c_i - p_i|}{\max(|c_{i,t} - p_{i,t}|}$$

and the estimated average accuracy is given by:

$$A(C, R) = 1 - \left(\sum_{n=1,\ldots n} \frac{\alpha_i |c_i - p_i|}{\max(|c_{i,t} - p_{i,t}|}\right) / \sum_{i=1,\ldots n} \alpha_i$$

Figure 8B:
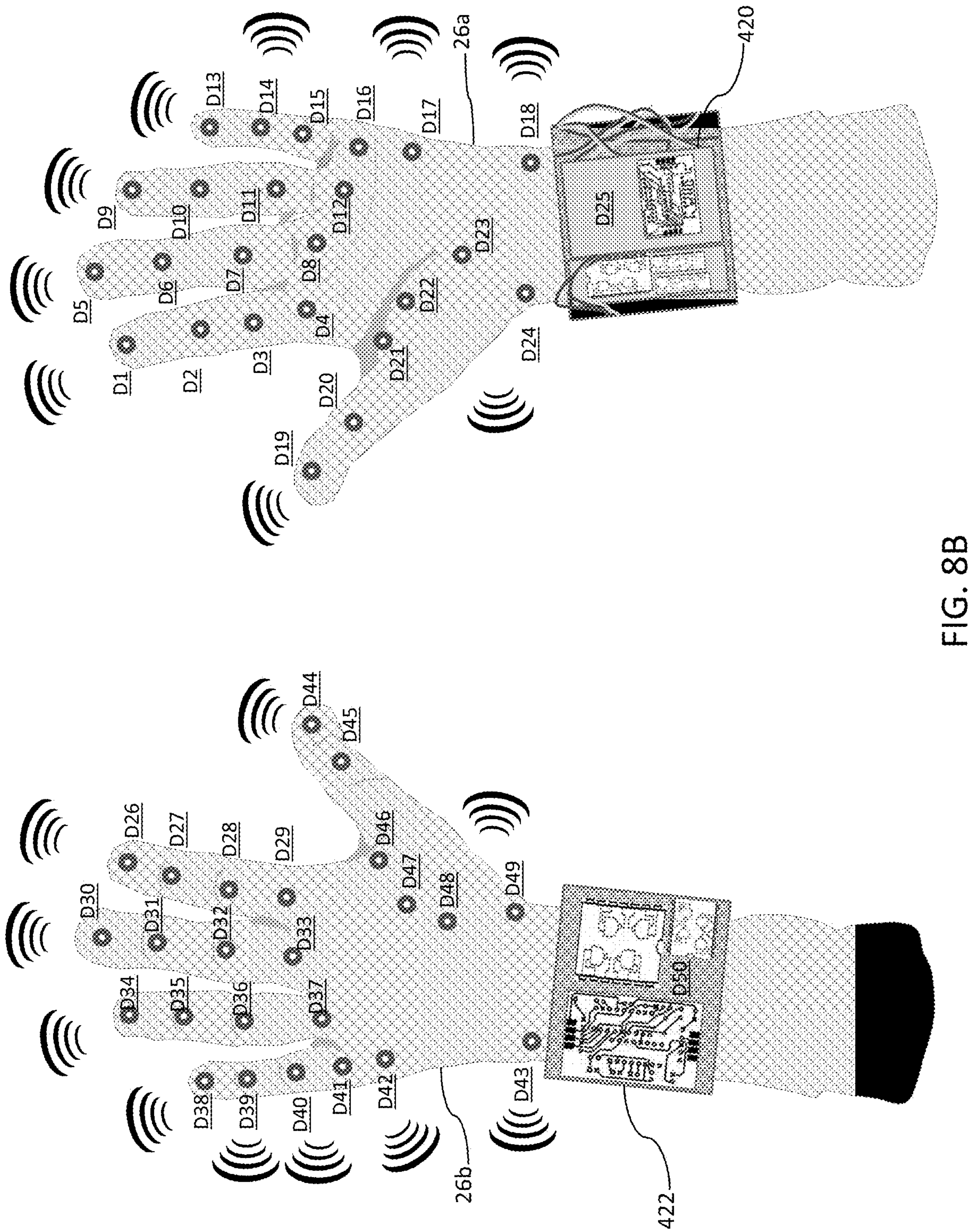
FIG. 8B is a block diagram illustrating a pair of gloves with sensors worn by the chef for capturing and transmitting the chef's movements.

FIG. 8B is a block diagram illustrating the pair of gloves 26*a* and 26*b* with sensors worn by the chef 49 for capturing and transmitting the chef's movements. In this illustrative example, which is intended to show one example without limiting effects, a right hand glove 26*a* Includes 25 sensors to capture the various sensor data points D1, D2, D3, D4, D5, D6, D7, D8, D9, D10, D11, D12, D13, D14, D15, D16, D17, D18, D19, D20, D21, D22, D23, D24, and D25, on the glove 26*a*, which may have optional electronic and mechanical circuits 420. A left hand glove 26*b* Includes 25 sensors to capture the various sensor data points D26, D27, D28, D29, D30, D31, D32, D33, D34, D35, D36, D37, D38, D39, D40, D41, D42, D43, D44, D45, D46, D47, D48, D49, D50, on the glove 26*b*, which may have optional electronic and mechanical circuits 422.

Figure 8C:
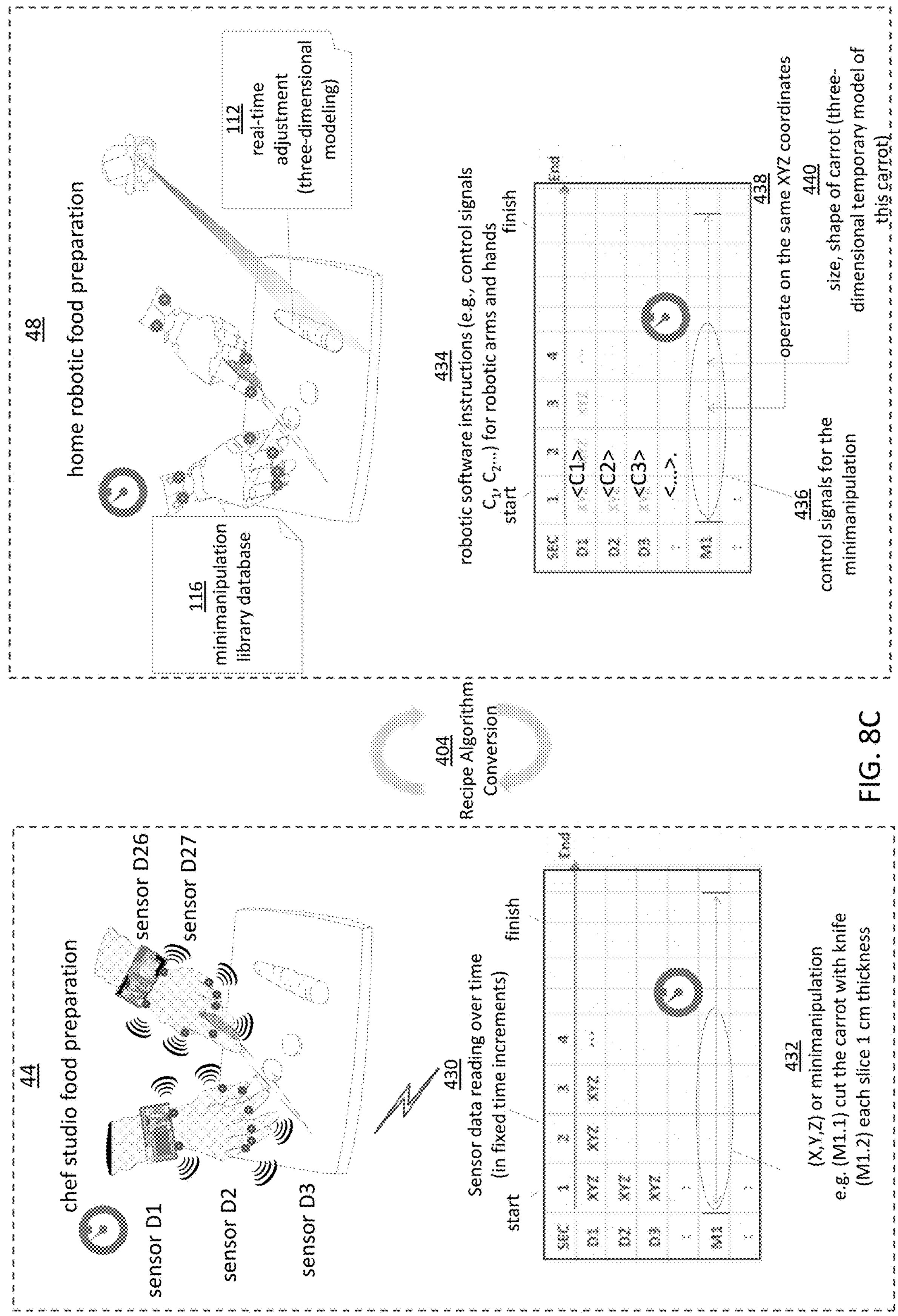
FIG. 8C is a block diagram illustrating robotic cooking execution based on the captured sensory data from the chef's gloves in accordance with the present disclosure.

FIG. 8C is a block diagram illustrating robotic cooking execution steps based on the captured sensory data from the chef's sensory capturing gloves 26*a* and 26*b*. In the chef studio 44, the chef 49 wears gloves 26*a* and 26*b* with sensors for capturing the food preparation process, where the sensor data are recorded in a table 430. In this example, the chef 49 is cutting a carrot with a knife in which each slice of the carrot is about 1 centimeter in thickness. These action primitives by the chef 49, as recorded by the gloves 26*a*, 26*b*, may constitute a minimanipulation 432 that take place over time slots 1, 2, 3 and 4. The recipe algorithm conversion module 404 is configured to convert the recorded recipe file from the chef studio 44 to robotic instructions for operating the robotic arms 70 and the robotic hands 72 in the robotic kitchen 28 according to a software table 434. The robotic arms 70 and the robotic hands 72 prepare the food dish with control signals 436 for the minimanipulation, as pre-defined in the minimanipulation library 116, of cutting the carrot with knife in which each slice of the carrot is about 1 centimeter in thickness. The robotic arms 70 and the robotic hands 72 operate autonomously with the same xyz coordinates 438 and with possible real-time adjustment on the size and shape of a particular carrot by creating a temporary three-dimensional model 440 of the carrot from the real-time adjustment devices 112

Figure 8D:
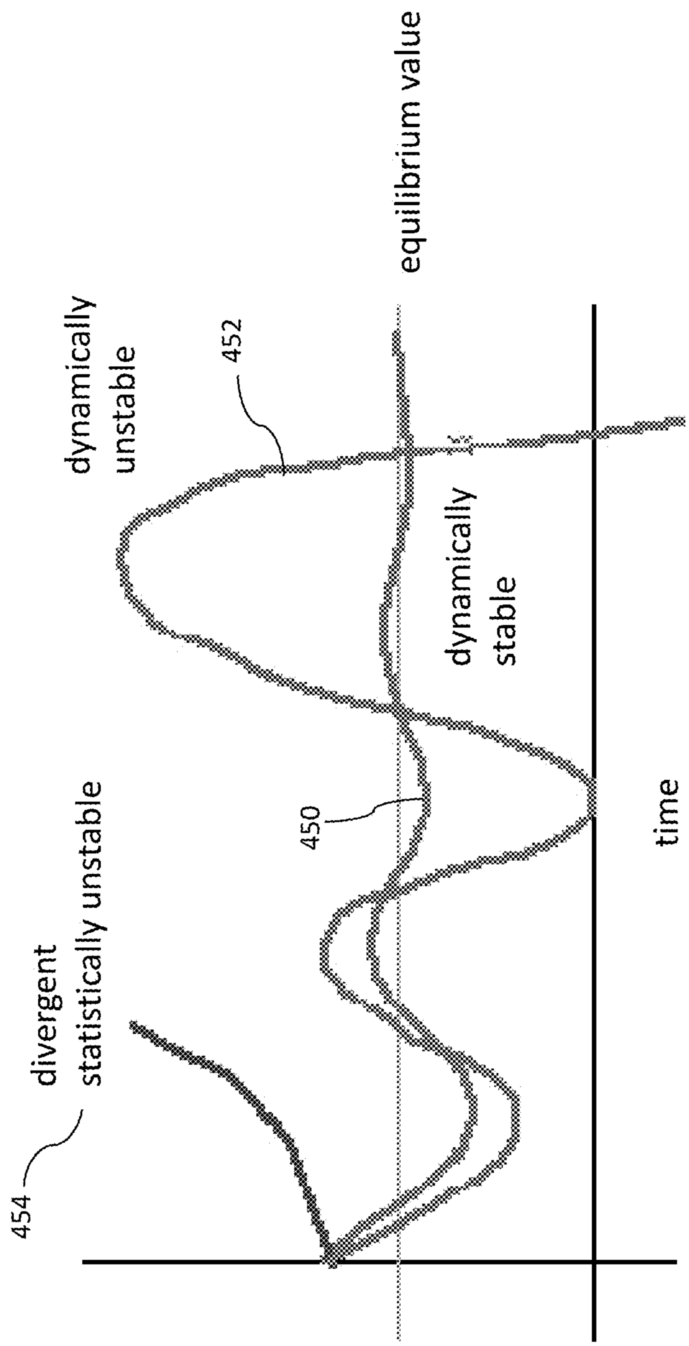
FIG. 8D is a graphical diagram illustrating dynamically stable and dynamically unstable curves relative to equilibrium.

In order to operate a mechanical robotic mechanism autonomously such as the ones described in the embodiments of this disclosure, a skilled artisan realizes that many mechanical and control problems need to be addressed, and the literature in robotics describes methods to do just that. The establishment of static and/or dynamic stability in a robotics system is an important consideration. Especially for robotic manipulation, dynamic stability is a strongly desired property, in order to prevent accidental breakage or movements beyond those desired or programmed. Dynamic stability is illustrated in FIG. 8D relative to equilibrium. Here the "equilibrium value" is the desired state of the arm (i.e. the arm moves to exactly where it was programmed to move to, with deviations caused by any number of factors such as inertia, centripetal or centrifugal forces, harmonic oscillations, etc. A dynamically-stable system is one where variations are small and dampen out over time, as represented by a curved line 450. A dynamically unstable system is one where variations fail to dampen and can increase over time, as depicted by a curved line 452. In addition, the worst situation is when the arm is statically unstable (e.g. it cannot hold the weight of whatever it is grasping), and falls, or it fails to recover from any deviation from the programmed position and/or path, as illustrated by a curved line 454. For additional information on planning (forming sequences of minimanipulations, or recovering when something goes wrong), Garagnani, M. (1999) "Improving the Efficiency of Processed Domain-axioms Planning", Proceedings of PLANSIG-99, Manchester, England, pp. 190-192, which this references is incorporated by reference herein in its entirety.

The cited literature addresses conditions for dynamic stability that are imported by reference into the present disclosure to enable proper functioning of the robotic arms. These conditions include the fundamental principle for calculating torque to the joints of a robotic arm:

$$\vec{T} = M(\vec{q})\frac{d^2\vec{q}}{dt^2} + C\left(\vec{q}, \frac{d\vec{q}}{dt}\right)d\vec{q}, + G(\vec{q})$$

where T is the torque vector (T has n components, each corresponding to a degree of freedom of the robotic arm), M is the inertial matrix of the system (M is a positive semi-definite n-by-n matrix), C is a combination of centripetal and centrifugal forces, also an n-by-n matrix, G(q) is the gravity vector, and q is the position vector. In addition, they include finding stable points and minima, e.g. via the LaGrange equation if the robotic positions (x's) can be described by twice-differentiable functions (y's).

$$J[y]=\int_{x_1}^{x_2} L[x,y(x),y'(x)]dx.$$

$$J[y]\leq J[f+\varepsilon\eta].$$

In order for the system comprised of the robotic arms and hands/grippers to be stable, the system needs to be properly designed, built, and have an appropriate sensing and control system, which operates within the boundary of acceptable performance. One wants to achieve the best (highest speed with highest position/velocity and force/torque tracking and all under stable conditions) performance possible, given the physical system and what its controller is asking it to do.

When one speaks of proper design, the notion is one of achieving proper observability and controllability of the system. Observability implies that the key variables of the system (joint/finger positions and velocities, forces and torques) are measurable by the system, which implies one needs to have the ability to sense these variables, which in turn implies the presence and use of the proper sensing devices (internal or external). Controllability implies that one (computer in this case) have the ability to shape or control the key axes of the system based on observed parameters from internal/external sensors; this usually implies an actuator or direct/indirect control over a certain parameter by way of a motor or other computer-controlled actuation system. The ability to make the system as linear in its response as possible, thereby negating the detrimental effects of nonlinearities (stiction, backlash, hysteresis, etc.), allows for control schemes like PID gain-scheduling and nonlinear controllers like sliding-mode control to guarantee system stability and performance even in the light of system-modeling uncertainties (errors in mass/inertia estimates, dimensional geometry discretization, sensor/torque discretization anomalies, etc.) which are always present in any higher-performance control system.

Furthermore, the use of a proper computing and sampling system is significant, as the system's ability to follow rapid motions with a certain maximum frequency content is clearly related to what control bandwidth (closed-loop sampling rate of the computer control system) the entire system is able to achieve and thus the frequency-response (ability to track motions of certain speeds and motion-frequency content) the system is able to exhibit.

All the above characteristics are significant when it comes to ensuring that a highly redundant system can actually carry out the complex and dexterous tasks a human chef requires for a successful recipe-script execution, in both a dynamic and a stable fashion.

Machine learning in the context of robotic manipulation of relevance to the disclosure can involve well known methods for parameter adjustment, such as reinforcement learning. An alternate and preferred embodiment for this disclosure is a different and more appropriate learning technique for repetitive complex actions such as preparing and cooking a meal with multiple steps over time, namely case-based learning. Case-based reasoning, also known as analogical reasoning, has been developed over time.

As a general overview, case-based reasoning comprises the following steps:

A. Constructing and Remembering Cases.

A case is a sequence of actions with parameters that are successfully carried out to achieve an objective. The parameters include distances, forces, directions, positions, and other physical or electronic measures whose values are required to carry out the task successfully (e.g. a cooking operation). First, 1. storing aspects of the problem that was just solved together with:
2. the method(s) and optionally intermediate steps to solve the problem and its parameter values, and
3. (typically) storing the final outcome.

B. Applying Cases (at a Later Point of Time)

4. Retrieving one or more stored cases whose problems bear strong similarity to the new problem,
5. Optionally adjusting the parameters from the retrieved case(s) to apply to the current case (e.g. an item may weigh somewhat more, and hence a somewhat stronger force is needed to lift it),
6. Using the same methods and steps from the case(s) with the adjusted parameters (if needed) at least in part to solve the new problem.

Hence, case-based reasoning comprises remembering solutions to past problems and applying them with possible parametric modification to new very similar problems. However, in order to apply case-based reasoning to the robotic manipulation challenge, something more is needed. Variation in one parameter of the solution plan will cause variation in one or more coupled parameters. This requires transformation of the problem solution, not just application. We call the new process case-based robotic learning since it generalizes the solution to a family of close solutions (those corresponding to small variations in the input parameters—such as exact weight, shape and location of the input ingredients). Case-based robotic learning operates as follows:

C. Constructing, Remembering and Transforming Robotic Manipulation Cases

1. Storing aspects of the problem that was just solved together with:
2. The value of the parameters (e.g. the inertial matrix, forces, etc. from equation 1),
3. Perform perturbation analysis by varying the parameter(s) pertinent to the domain (e.g. in cooking, vary the weight of the materials or their exact starting position), to see how much parameter values can vary and still obtain the desired results,
4. Via perturbation analysis on the model, record which other parameter values will change (e.g. forces) and by how much they should change, and
5. If the changes are within operating specification of the robotic apparatus, store the transformed solution plan (with the dependencies among parameters and projected change calculations for their values).

D. Applying Cases (at a Later Point of Time)

6. Retrieve one or more stored cases with the transformed exact values (now ranges, or calculations for new values depending on values of the input parameters), but still whose initial problems bear strong similarity to the new problem, including parameter values and value ranges, and
7. Use the transformed methods and steps from the case(s) at least in part to solve the new problem.

As the chef teaches the robot (the two arms and the sensing devices, such as haptic feedback from fingers, force-feedback from joints, and one or more observation cameras), the robot learns not only the specific sequence of movements, and time correlations, but also the family of small variations around the chef's movements to be able to prepare the same dish regardless of minor variations in the observable input parameters—and thus it learns a generalized transformed plan, giving it far greater utility than rote memorization. For additional information on case-based reasoning and learning, see materials by Leake, 1996 Book, Case-Based Reasoning: Experiences, Lessons and Future Directions, http://journals.cambridge.org/action/displayAbstract?fromPage=online&aid=4068324&fileId=S0269888

900006585dl.acm.org/citation.cfm?id=524680; Carbonell, 1983, Learning by Analogy: Formulating and Generalizing Plans from Past Experience, http://link.springer.com/chapter/10.1007/978-3-662-12405-5_5, which these references are incorporated by reference herein in their entireties.

Figure 8E:
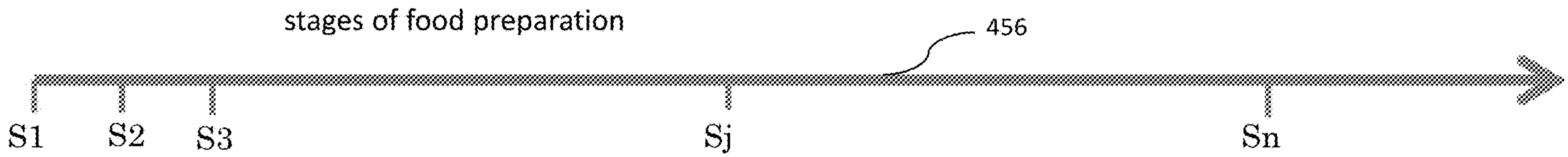
FIG. 8E is a sequence diagram illustrating the process of food preparation that requires a sequence of steps that are referred to as stages in accordance with the present disclosure.

As depicted in FIG. 8E, the process of cooking requires a sequence of steps that are referred to as a plurality of stages $S_1, S_2, S_3 \ldots S_j \ldots S_n$ of food preparation, as shown in a timeline 456. These may require strict linear/sequential ordering or some may be performed in parallel; either way we have a set of stages $\{S_1, S_2, \ldots, S_i, \ldots, S_n\}$, all of which must be completed successfully to achieve overall success. If the probability of success for each stage is $P(s_i)$ and there are n stages, then the probability of overall success is estimated by the product of the probability of success at each stage:

$$P(S) = \prod_{S_i \in S} P(s_i)$$

A person of skill in the art will appreciate that the probability of overall success can be low even if the probability of success of individual stages is relatively high. For instance, given 10 stages and a probability of success of each stage being 90%, the probability of overall success is $(0.9)^{10}=0.28$ or 28%.

A stage in preparing a food dish comprises one or more minimanipulations, where each minimanipulation comprises one or more robotic actions leading to a well-defined intermediate result. For instance, slicing a vegetable can be a minimanipulation comprising grasping the vegetable with one hand, grasping a knife with the other, and applying repeated knife movements until the vegetable is sliced. A stage in preparing a dish can comprise one or multiple slicing minimanipulations.

The probability of success formula applies equally well at the level of stages and at the level of minimanipulations, so long as each minimanipulation is relatively independent of other minimanipulations.

In one embodiment, in order to mitigate the problem of reduced certainty of success due to potential compounding errors, standardized methods for most or all of the minimanipulations in all of the stages are recommended. Standardized operations are ones that can be pre-programmed, pretested, and if necessary pre-adjusted to select the sequence of operations with the highest probability of success. Hence, if the probability of standardized methods via the minimanipulations within stages is very high, so will be the overall probability of success of preparing the food dish, due to the prior work, until all of the steps have been perfected and tested. For instance, to return to the above example, if each stage utilizes reliable standardized methods, and its success probability is 99% (instead of 90% as in the earlier example), then the overall probability of success will be $(0.99)^{10}=90.4\%$, assuming there are 10 stages as before. This is clearly better than 28% probability of an overall correct outcome.

In another embodiment, more than one alternative method is provided for each stage, wherein, if one alternative fails, another alternative is tried. This requires dynamic monitoring to determine the success or failure of each stage, and the ability to have an alternate plan. The probability of success for that stage is the complement of the probability of failure for all of the alternatives, which mathematically is written as:

$$P(s_i \mid A(s_i)) = 1 - \prod_{a_j \in A(s_i)} (1 - P(s_i \mid a_j))$$

In the above expression, $s_i$ is the stage and $A(s_i)$ is the set of alternatives for accomplishing $s_i$. The probability of failure for a given alternative is the complement of the probability of success for that alternative, namely $1-P(s_i|a_j)$, and the probability of all the alternatives failing is the product in the above formula. Hence, the probability that not all will fail is the complement of the product. Using the method of alternatives, the overall probability of success can be estimated as the product of each stage with alternatives, namely:

$$P(S) = \prod_{S_i \in S} P(s_i \mid A(s_i))$$

With this method of alternatives, if each of the 10 stages had 4 alternatives, and the expected success of each alternative for each stage was 90%, then the overall probability of success would be $(1-(1-(0.9))^4)^{10}=0.99$ or 99% versus just 28% without the alternatives. The method of alternatives transforms the original problem from a chain of stages with multiple single points of failure (if any stage fails) to one without single points of failure, since all the alternatives would need to fail in order for any given stage to fail, providing more robust outcomes.

In another embodiment, both standardized stages, comprising of standardized minimanipulations and alternate means of the food dish preparation stages, are combined, yielding a behavior that is even more robust. In such a case, the corresponding probability of success can be very high, even if alternatives are only present for some of the stages or minimanipulations.

In another embodiment only the stages with lower probability of success are provided alternatives, in case of failure, for instance stages for which there is no very reliable standardized method, or for which there is potential variability, e.g. depending on odd-shaped materials. This embodiment reduces the burden of providing alternatives to all stages.

Figure 8F:
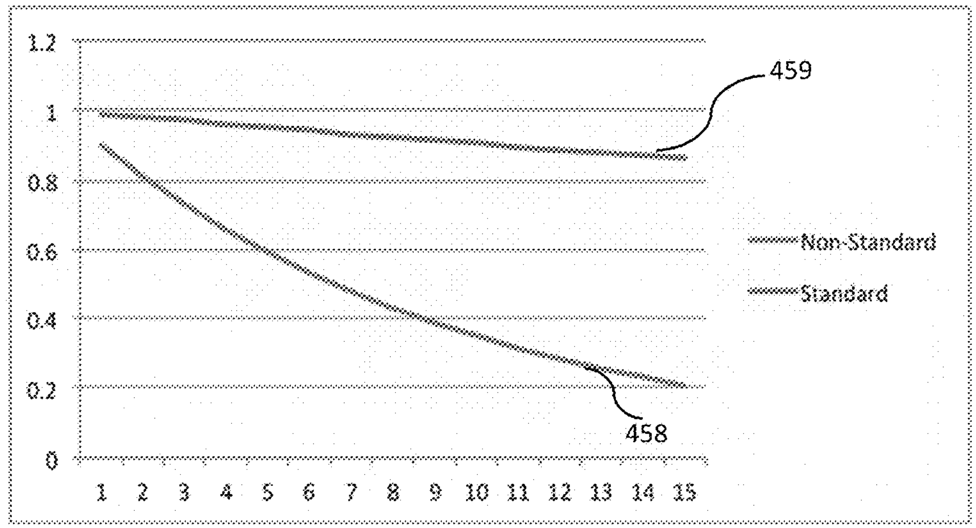
FIG. 8F is a graphical diagram illustrating the probability of overall success as a function of the number of stages to prepare a food dish in accordance with the present disclosure.

FIG. 8F is a graphical diagram showing the probability of overall success (y-axis) as a function of the number of stages needed to cook a food dish (x-axis) for a first curve 458 illustrating a non-standardized kitchen 458 and a second curve 459 illustrating the standardized kitchen 50. In this example, the assumption made is that the individual probability of success per food preparation stage was 90% for a non-standardized operation and 99% for a standardized pre-programmed stage. The compounded error is much worse in the former case, as shown in the curve 458 compared to the curve 459.

Figure 8G:
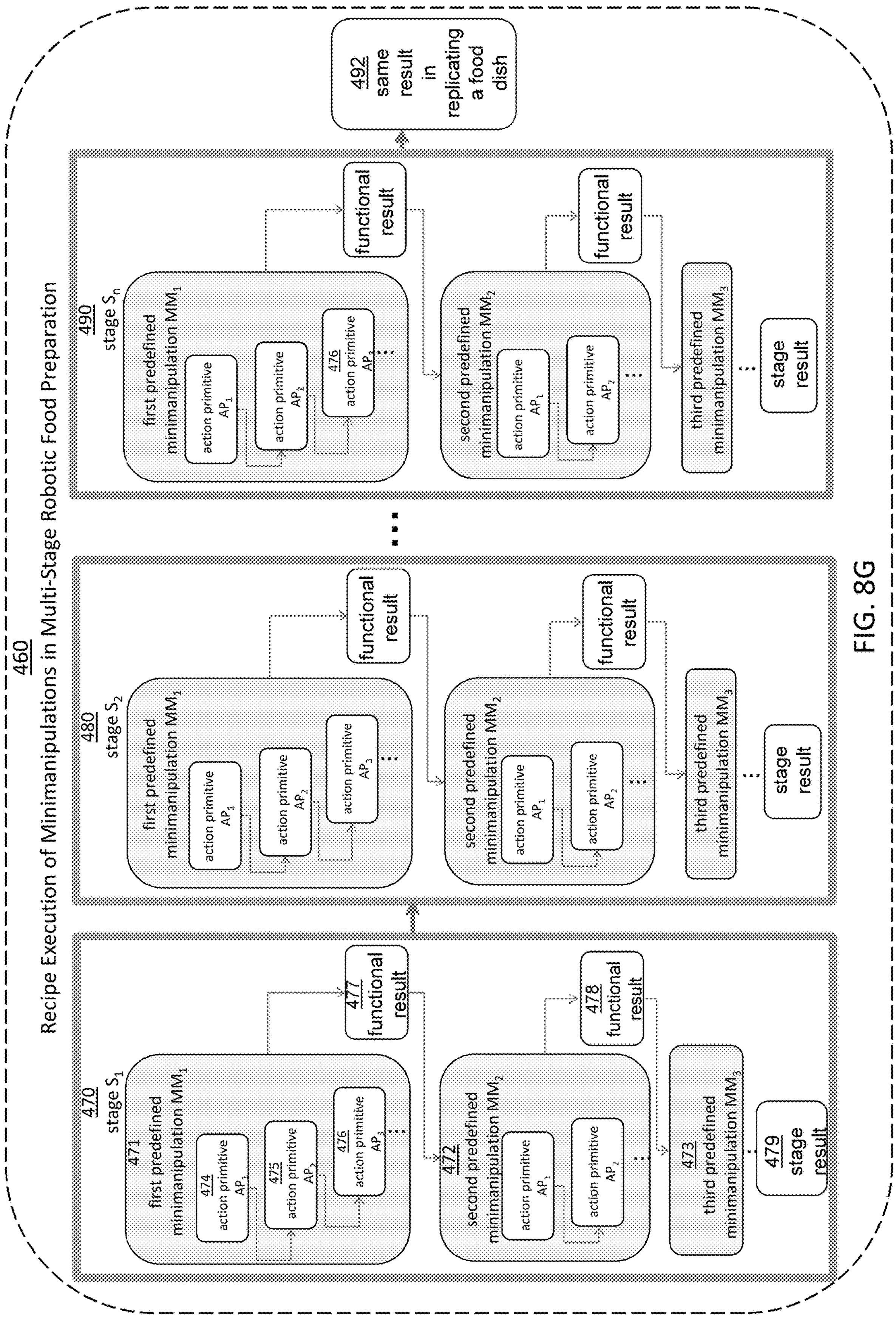
FIG. 8G is a block diagram illustrating the execution of a recipe with multi-stage robotic food preparation with minimanipulations and action primitives.

FIG. 8G is a block diagram illustrating the execution of a recipe 460 with multi-stage robotic food preparation with minimanipulations and action primitives. Each food recipe 460 can be divided into a plurality of food preparation stages: a first food preparation stage $S_1$ 470, a second food preparation stage $S_2 \ldots$ an n-stage food preparation stage $S_n$ 490, as executed by the robotic arms 70 and the robotic hands 72. The first food preparation stage $S_1$ 470 comprises one or more minimanipulations $MM_1$471, $MM_2$ 472, and $MM_3$ 473. Each minimanipulation includes one or more action primitives, which obtains a functional result. For example, the first minimanipulation $MM_1$ 471 includes a first action primitive $AP_1$ 474, a second action primitive $AP_2$ 475, and a third action primitive $AP_3$ 475, which then achieves a functional result 477. The one or more minimanipulations $MM_1$471, $MM_2$ 472, $MM_3$ 473 in the first stage $S_1$ 470 then accomplish a stage result 479. The combination of one or more food preparation stage $S_1$ 470, the second food preparation stage $S_2$ and the n-stage food preparation stage $S_n$ 490 produces substantially the same or the same result by replicating the food preparation process of the chef 49 as recorded in the chef studio 44.

A predefined minimanipulation is available to achieve each functional result (e.g., the egg is cracked). Each minimanipulation comprises of a collection of action primitives which act together to accomplish the functional result. For example, the robot may begin by moving its hand towards the egg, touching the egg to localize its position and verify its size, and executing the movements and sensing actions necessary to grasp and lift the egg into the known and predetermined configuration.

Multiple minimanipulations may be collected into stages such as making a sauce for convenience in understanding and organizing the recipe. The end result of executing all of the minimanipulations to complete all of the stages is that a food dish has been replicated with a consistent result each time.

Figure 9A:
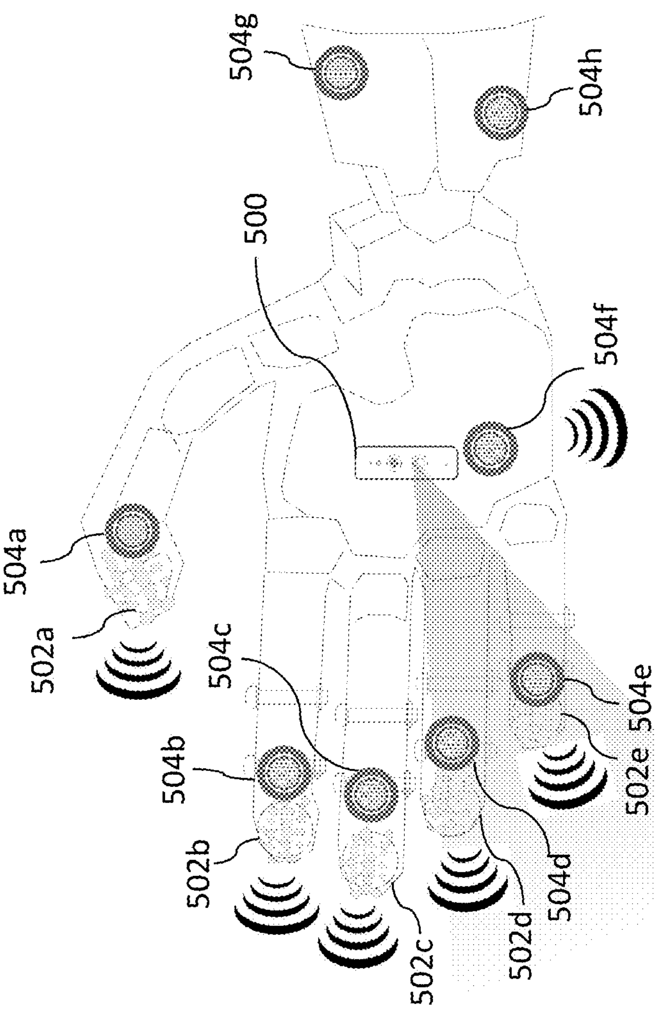
FIG. 9A is a block diagram illustrating an example of robotic hand and wrist with haptic vibration, sonar, and camera sensors for detecting and moving a kitchen tool, an object, or a piece of kitchen equipment in accordance with the present disclosure.

FIG. 9A is a block diagram illustrating an example of the robotic hand 72 with five fingers and a wrist with RGB-D sensor, camera sensors and sonar sensor capabilities for detecting and moving a kitchen tool, an object, or an item of kitchen equipment. The palm of the robotic hand 72 includes an RGB-D sensor 500, a camera sensor or a sonar sensor 504*f*. Alternatively, the palm of the robotic hand 450 includes both the camera sensor and the sonar sensor. The RGB-D sensor 500 or the sonar sensor 504*f* is capable of detecting the location, dimensions and shape of the object to create a three-dimensional model of the object. For example, the RGB-D sensor 500 uses structured light to capture the shape of the object, three-dimensional mapping and localization, path planning, navigation, object recognition and people tracking. The sonar sensor 504*f* uses acoustic waves to capture the shape of the object. In conjunction with the camera sensor 452 and/or the sonar sensor 454, the video camera 66 placed somewhere in the robotic kitchen, such as on a railing, or on a robot, provides a way to capture, follow, or direct the movement of the kitchen tool as used by the chef 49, as illustrated in FIG. 7A. The video camera 66 is positioned at an angle and some distance away from the robotic hand 72, and therefore provides a higher-level view of the robotic hand's 72 gripping of the object, and whether the robotic hand has gripped or relinquished/released the object. A suitable example of RGB-D (a red light beam, a green light beam, a blue light beam, and depth) sensor is the Kinect system by Microsoft, which features an RGB camera, depth sensor and multi-array microphone running on software, which provide full-body 3D motion capture, facial recognition and voice recognition capabilities.

The robotic hand 72 has the RGB-D sensor 500 placed in or near the middle of the palm for detecting the distance and shape of an object, as well as the distance of the object, and for handling a kitchen tool. The RGB-D sensor 500 provides guidance to the robotic hand 72 in moving the robotic hand 72 toward the direction of the object and to make necessary adjustments to grab an object. Second, a sonar sensor 502*f* and/or a tactile pressure sensor are placed near the palm of the robotic hand 72, for detecting the distance and shape, and subsequent contact, of the object. The sonar sensor 502*f* can also guide the robotic hand 72 to move toward the object. Additional types of sensors in the hand may include ultrasonic sensors, lasers, radio frequency identification (RFID) sensors, and other suitable sensors. In addition, the tactile pressure sensor serves as a feedback mechanism so as to determine whether the robotic hand 72 continues to exert additional pressure to grab the object at such point where there is sufficient pressure to safely lift the object. In addition, the sonar sensor 502*f* in the palm of the robotic hand 72 provides a tactile sensing function to grab and handle a kitchen tool. For example, when the robotic hand 72 grabs a knife to cut beef, the amount of pressure that the robotic hand exerts on the knife and applies to the beef can be detected by the tactile sensor when the knife finishes slicing the beef, i.e. when the knife has no resistance, or when holding an object. The pressure distributed is not only to secure the object, but also not to break it (e.g. an egg).

Furthermore, each finger on the robotic hand 72 has haptic vibration sensors 502*a-e* and sonar sensors 504*a-e* on the respective fingertips, as shown by a first haptic vibration sensor 502*a* and a first sonar sensor 504*a* on the fingertip of the thumb, a second haptic vibration sensor 502*b* and a second sonar sensor 504*b* on the fingertip of the index finger, a third haptic vibration sensor 502*c* and a third sonar sensor 504*c* on the fingertip of the middle finger, a fourth haptic vibration sensor 502*d* and a fourth sonar sensor 504*d* on the fingertip of the ring finger, and a fifth haptic vibration sensor 502*e* and a fifth sonar sensor 504*e* on the fingertip of the pinky. Each of the haptic vibration sensors 502*a*, 502*b*, 502*c*, 502*d* and 502*e* can simulate different surfaces and effects by varying the shape, frequency, amplitude, duration and direction of a vibration. Each of the sonar sensors 504*a*, 504*b*, 504*c*, 504*d* and 504*e* provides sensing capability on the distance and shape of the object, sensing capability for the temperature or moisture, as well as feedback capability. Additional sonar sensors 504*g* and 504*h* are placed on the wrist of the robotic hand 72.

Figure 9B:
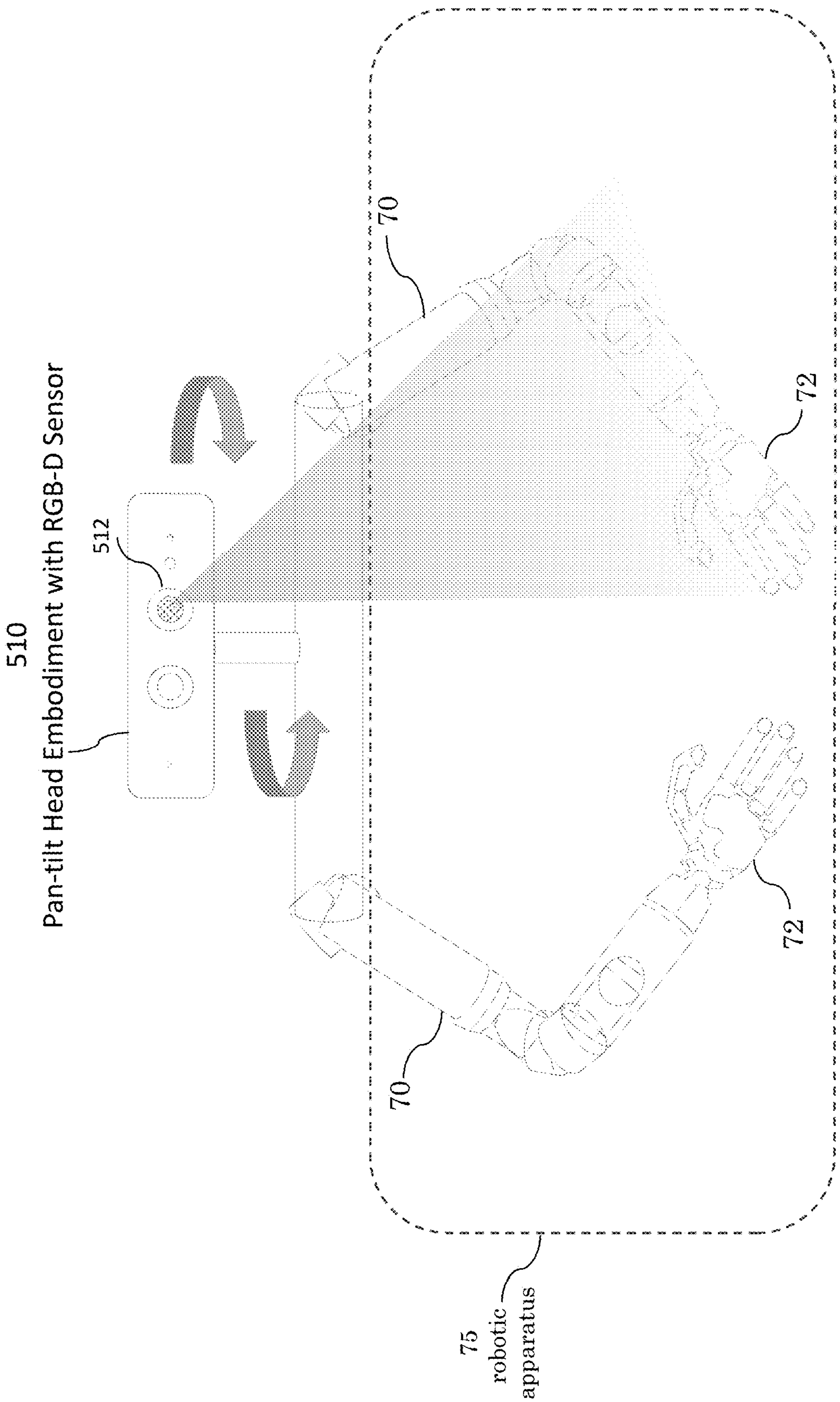
FIG. 9B is a block diagram illustrating a pan-tilt head with sensor camera coupled to a pair of robotic arms and hands for operation in the standardized robotic kitchen in accordance with the present disclosure.

FIG. 9B is a block diagram illustrating one embodiment of a pan-tilt head 510 with a sensor camera 512 coupled to a pair of robotic arms and hands for operation in the standardized robotic kitchen. The pan-tilt head 510 has an RGB-D sensor 512 for monitoring, capturing or processing information and three-dimensional images within the standardized robotic kitchen 50. The pan-tilt head 510 provides good situational awareness, which is independent of arm and sensor motions. The pan-tilt head 510 is coupled to the pair of robotic arms 70 and hands 72 for executing food preparation processes, but the pair of robotic arms 70 and hands 72 may cause occlusions. In one embodiment, a robotic apparatus comprises one or more robotic arms 70 and one or more robotic hands (or robotic grippers) 72.

Figure 9C:
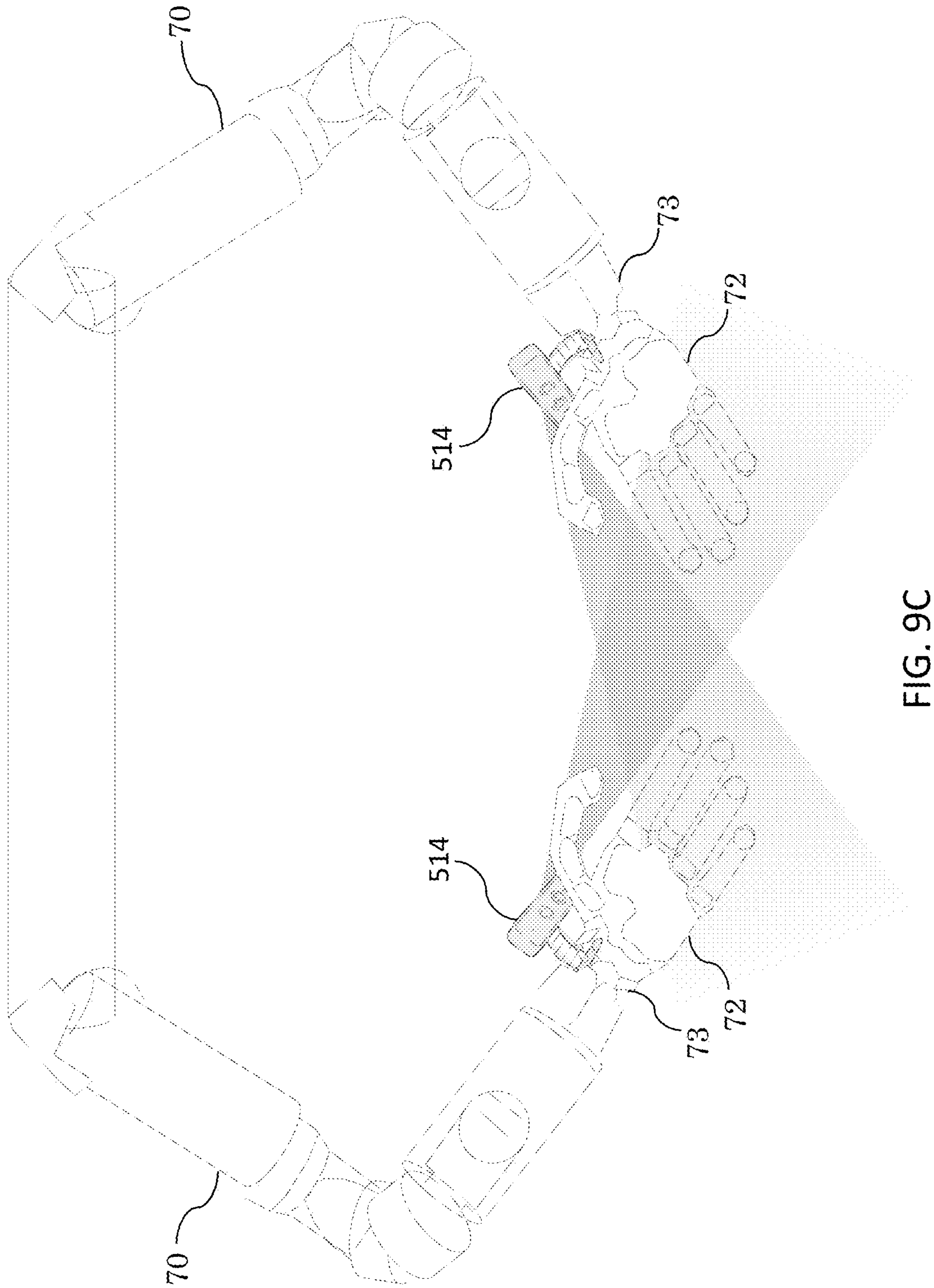
FIG. 9C is a block diagram illustrating sensor cameras on the robotic wrists for operation in the standardized robotic kitchen in accordance with the present disclosure.

FIG. 9C is a block diagram illustrating sensor cameras 514 on the robotic wrists 73 for operation in the standardized robotic kitchen 50. One embodiment of the sensor cameras 514 is an RGB-D sensor that provides color image and depth perception mounted to the wrists 73 of the respective hand 72. Each of the camera sensors 514 on the respective wrist 73 provides limited occlusions by an arm, while generally not occluded when the robotic hand 72 grasps an object. However, the RGB-D sensors 514 may be occluded by the respective robotic hand 72.

Figure 9D:
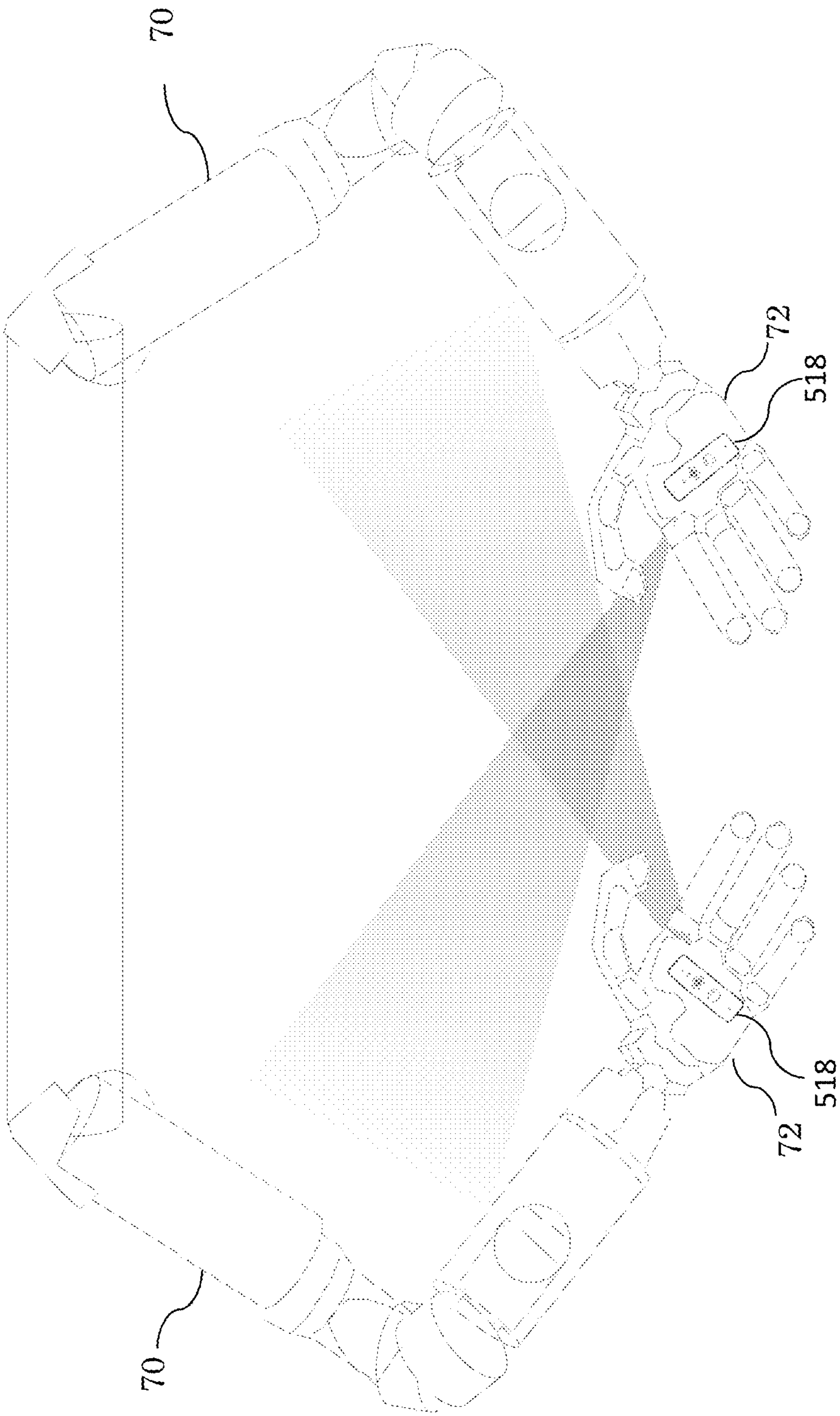
FIG. 9D is a block diagram illustrating an eye-in-hand on the robotic hands for operation in the standardized robotic kitchen in accordance with the present disclosure.

FIG. 9D is a block diagram illustrating an eye-in-hand 518 on the robotic hands 72 for operation in the standardized robotic kitchen 50. Each hand 72 has a sensor, such as an RGD-D sensor for providing an eye-in-hand function by the robotic hand 72 in the standardized robotic kitchen 50. The eye-in-hand 518 with RGB-D sensor in each hand provides high image details with limited occlusions by the respective robotic arm 70 and the respective robotic hand 72. However, the robotic hand 72 with the eye-in-hand 518 may encounter occlusions when grasping an object.

Figure 9E:
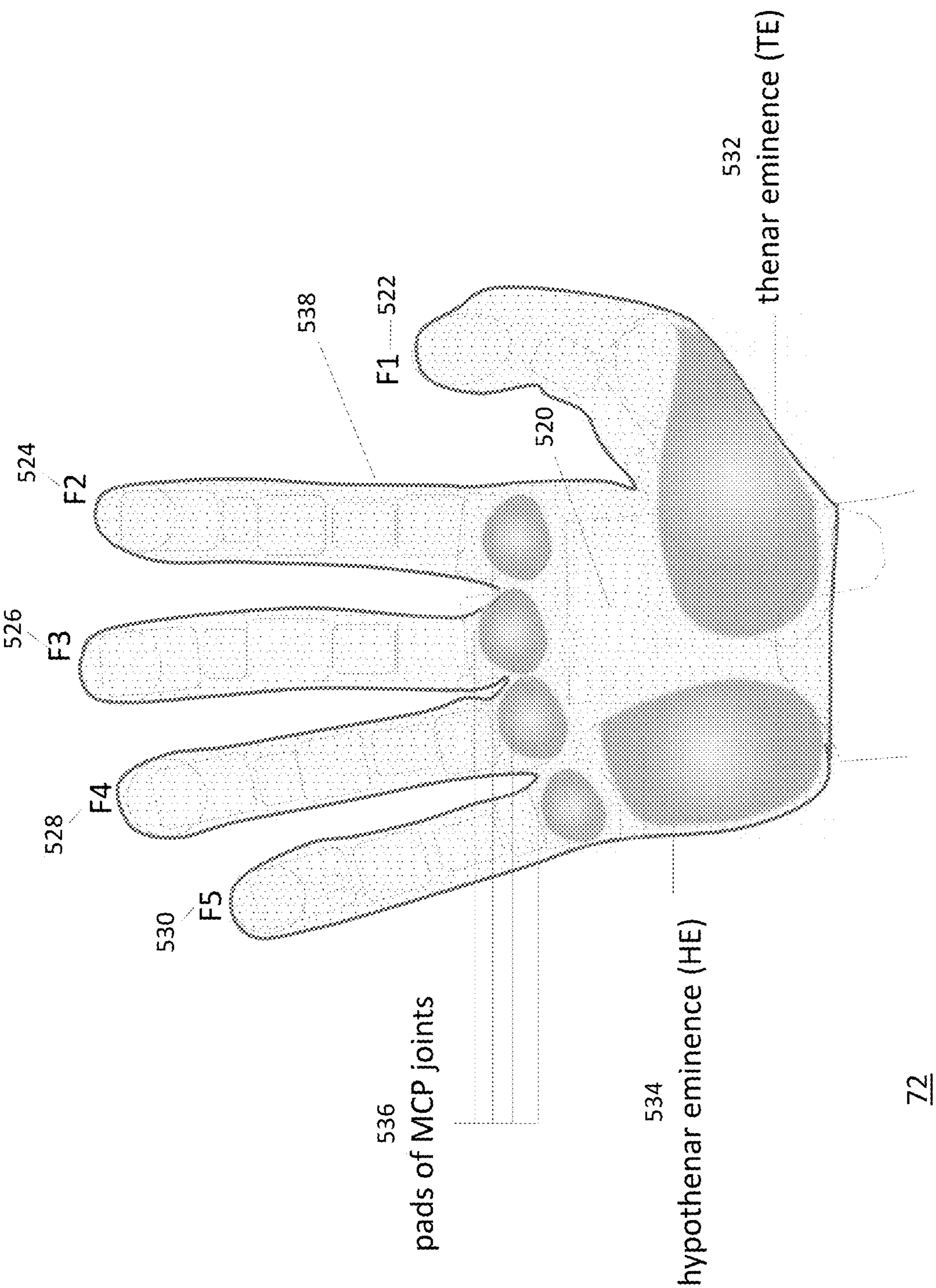
FIGS. 9E-I are pictorial diagrams illustrating aspects of deformable palm in a robotic hand in accordance with the present disclosure.
Figure 9F:
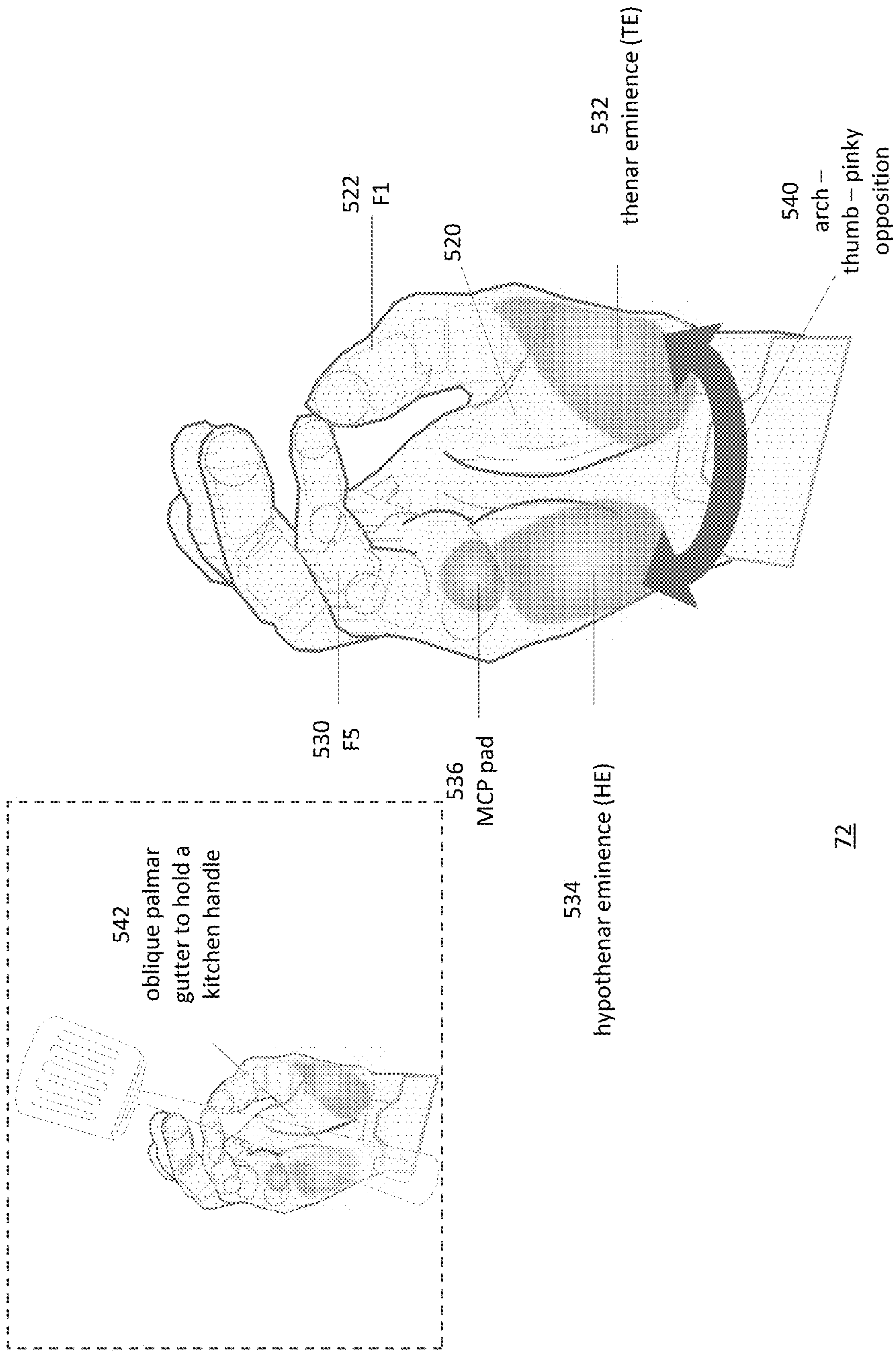
Figure 9G:
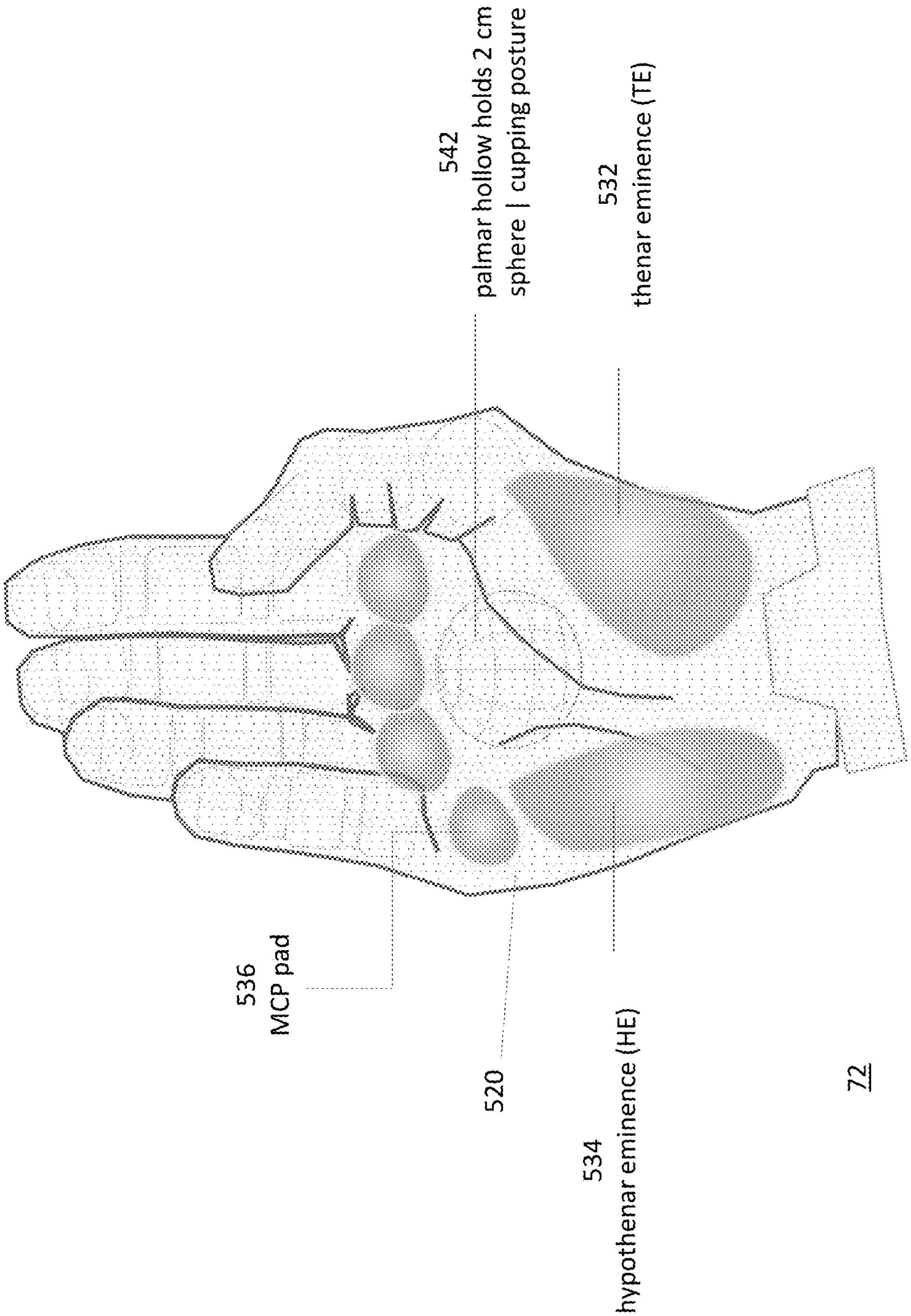

FIGS. 9E-G are pictorial diagrams illustrating aspects of a deformable palm 520 in the robotic hand 72. The fingers of a five-fingered hand are labeled with the thumb as a first finger F1 522, the index finger as a second finger F2 524, the middle finger as a third finger F3 526, the ring finger as a fourth finger F4 528, and the little finger as a fifth finger F5 530. The thenar eminence 532 is a convex volume of deformable material on the radial (the first finger F1 522) side of the hand. The hypothenar eminence 534 is a convex volume of deformable material on the ulnar (the fifth finger F5 530) side of the hand. The metacarpophalangeal pads (MCP pads) 536 are convex deformable volumes on the ventral (palmar) side of the metacarpophalangeal (knuckle) joints of second, third, fourth and fifth fingers F2 524, F3 526, F4 528, F5 530. The robotic hand 72 with the deformable palm 520 wears a glove on the outside with a soft human-like skin.

Together the thenar eminence 532 and hypothenar eminence 534 support application of large forces from the robot arm to an object in the working space such that application of these forces puts minimal stress on the robot hand joints (e.g., picture of the rolling pin). Extra joints within the palm 520 themselves are available to deform the palm. The palm 520 should deform in such a way as to enable the formation of an oblique palmar gutter for tool grasping in a way similar to a chef (typical handle grasp). The palm 520 should deform in such a way as to enable cupping, for conformable grasping of convex objects such as dishes and food materials in a manner similar to the chef, as shown by a cupping posture 542 in FIG. 9G.

Joints within the palm 520 that may support these motions include the thumb carpometacarpal joint (CMC), located on the radial side of the palm near the wrist, which may have two distinct directions of motion (flexion/extension and abduction/adduction). Additional joints required to support these motions may include joints on the ulnar side of the palm near the wrist (the fourth finger F4 528 and the fifth finger F5 530 CMC joints), which allow flexion at an oblique angle to support cupping motion at the hypothenar eminence 534 and formation of the palmar gutter.

The robotic palm 520 may include additional/different joints as needed to replicate the palm shape observed in human cooking motions, e.g., a series of coupled flexure joints to support formation of an arch 540 between the thenar and hypothenar eminences 532 and 534 to deform the palm 520, such as when the thumb F1 522 touches the pinky finger F5 530, as illustrated in FIG. 9F.

When the palm is cupped, the thenar eminence 532, the hypothenar eminence 534, and the MCP pads 536 form ridges around a palmar valley that enable the palm to close around a small spherical object (e.g., 2 cm).

Figure 9H:
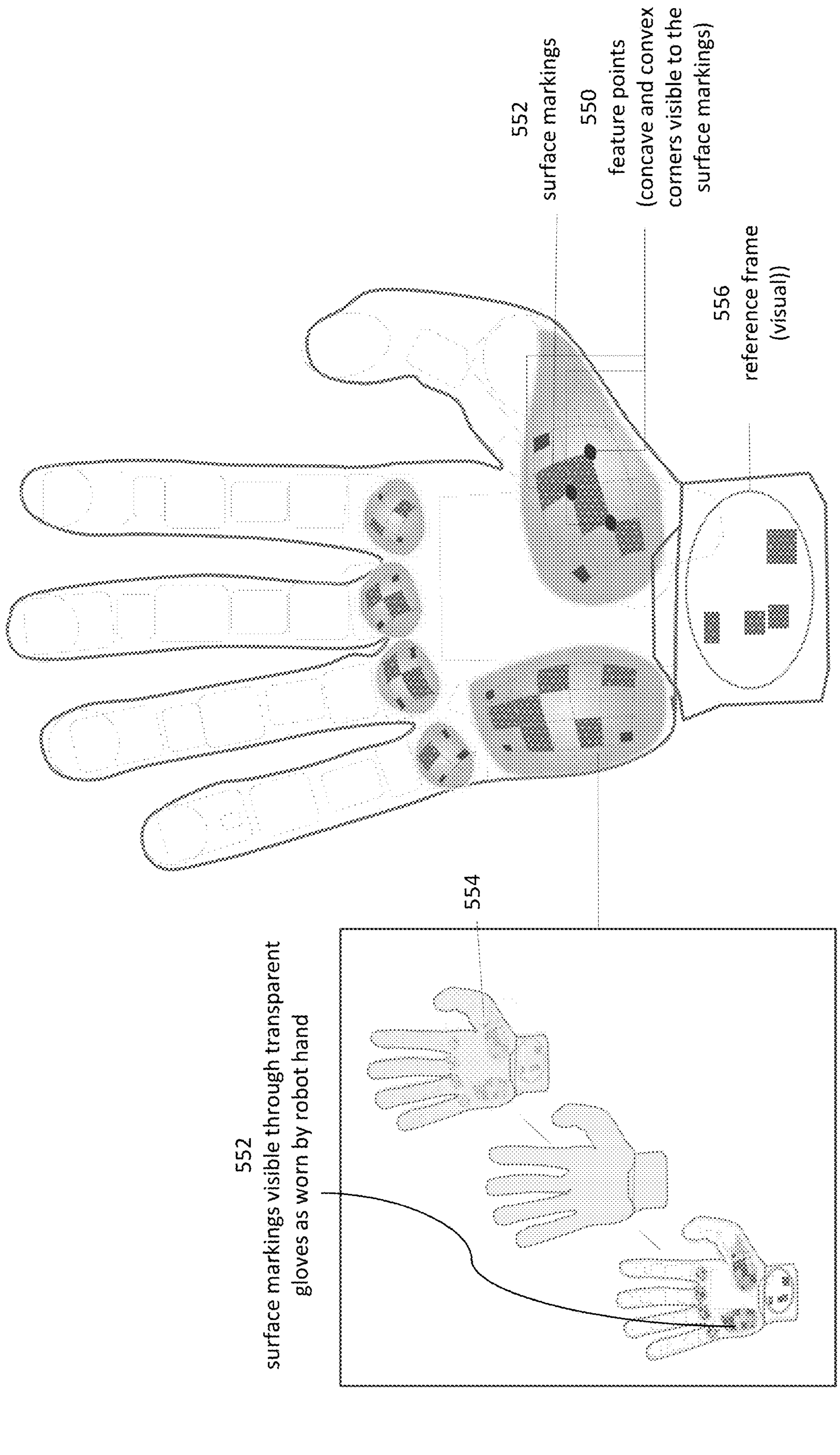
Figure 9I:
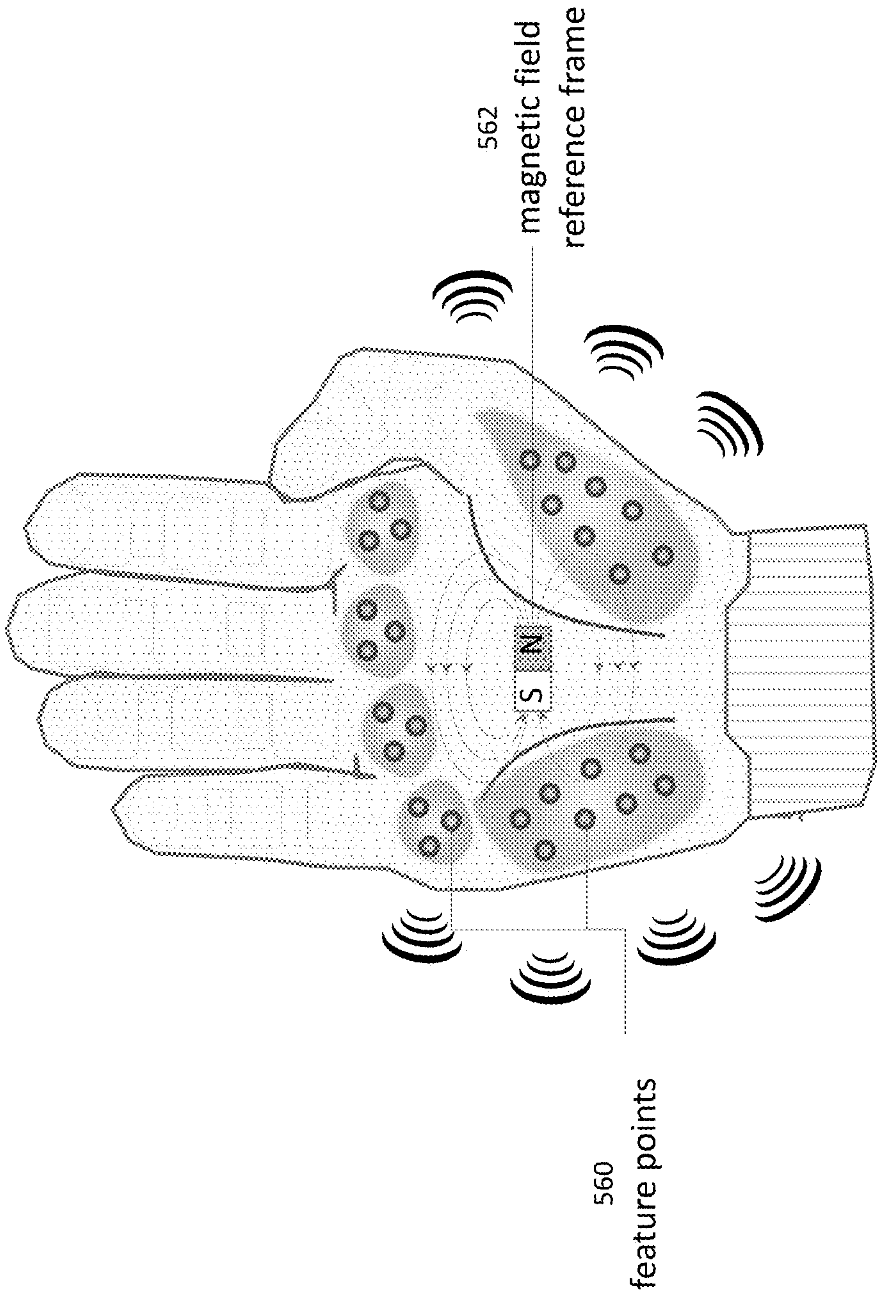

The shape of the deformable palm will be described using locations of feature points relative to a fixed reference frame, as shown in FIGS. 9H and 9I. Each feature point is represented as a vector of x, y, and z coordinate positions over time. Feature point locations are marked on the sensing glove worn by the chef and on the sensing glove worn by the robot. A reference frame is also marked on the glove, as illustrated in FIGS. 9H and 9I. Feature points are defined on a glove relative to the position of the reference frame.

Feature points are measured by calibrated cameras mounted in the workspace as the chef performs cooking tasks. Trajectories of feature points in time are used to match the chef motion with the robot motion, including matching the shape of the deformable palm. Trajectories of feature points from the chef's motion may also be used to inform robot deformable palm design, including shape of the deformable palm surface and placement and range of motion of the joints of the robot hand.

In the embodiment as depicted in FIG. 9H, the feature points are in the hypothenar eminence 534, the thenar eminence 532, and the MCP pad 536 are checkered patterns with markings that show the feature points in each region of the palm. The reference frame in the wrist area has four rectangles that are identifiable as a reference frame. The feature points (or markers) are identified in their respective locations relative to the reference frame. The feature points and reference frame in this embodiment can be implemented underneath a glove for food safety but transparent through the glove for detection.

FIG. 9H shows the robot hand with a visual pattern that may be used to determine the locations of three-dimensional shape feature points 550. The locations of these shape feature points provide information about the shape of the palm surface as the palm joints move and as the palm surface deforms in response to applied forces.

The visual pattern comprises surface markings 552 on the robot hand or on a glove worn by the chef. These surface markings may be covered by a food safe transparent glove 554, but the surface markings 552 remain visible through the glove.

When the surface markings 552 are visible in a camera image, two-dimensional feature points may be identified within that camera image by locating convex or concave corners within the visual pattern. Each such corner in a single camera image is a two-dimensional feature point.

When the same feature point is identified in multiple camera images, the three-dimensional location of this point can be determined in a coordinate frame, which is fixed with respect to the standardized robotic kitchen 50. This calculation is performed based on the two-dimensional location of the point in each image and the known camera parameters (position, orientation, field of view, etc. . . . ).

A reference frame 556 fixed to the robotic hand 72 can be obtained using a reference frame visual pattern. In one embodiment, the reference frame 556 fixed to the robotic hand 72 comprises of an origin and three orthogonal coordinate axes. It is identified by locating features of the reference frame's visual pattern in multiple cameras, and using known parameters of the reference frame visual pattern and known parameters of the cameras to extract the origin and coordinate axes.

Three-dimensional shape feature points expressed in the coordinate frame of the food preparation station can be converted into the reference frame of the robot hand once the reference frame of the robot hand is observed.

The shape of the deformable palm is comprised of a vector of three-dimensional shape feature points, all of which are expressed in the reference coordinate frame fixed to the hand of the robot or the chef.

As illustrated in FIG. 9I, the feature points 560 in the embodiments are represented by the sensors, such as Hall effect sensors, in the different regions (the hypothenar eminence 534, the thenar eminence 532, and the MCP pad 536 of the palm. The feature points are identifiable in their respective locations relative to the reference frame, which in this implementation is a magnet. The magnet produces magnetic fields that are readable by the sensors. The sensors in this embodiment are embedded underneath the glove.

FIG. 9I shows the robot hand 72 with embedded sensors and one or more magnets 562 that may be used as an alternative mechanism to determine the locations of three-dimensional shape feature points. One shape feature point is associated with each embedded sensor. The locations of these shape feature points 560 provide information about the shape of the palm surface as the palm joints move and as the palm surface deforms in response to applied forces.

Shape feature point locations are determined based on sensor signals. The sensors provide an output that allows calculation of distance in a reference frame, which is attached to the magnet, which furthermore is attached to the hand of the robot or the chef.

The three-dimensional location of each shape feature point is calculated based on the sensor measurements and known parameters obtained from sensor calibration. The shape of the deformable palm is comprised of a vector of three-dimensional shape feature points, all of which are expressed in the reference coordinate frame, which is fixed to the hand of the robot or the chef. For additional information on common contact regions on the human hand and function in grasping, see the material from Kamakura, Noriko, Michiko Matsuo, Harumi Ishii, Fumiko Mitsuboshi, and Yoriko Miura. "Patterns of static pretension in normal hands." American Journal of Occupational Therapy 34, no. 7 (1980): 437-445, which this reference is incorporated by reference herein in its entirety.

Figure 10A:
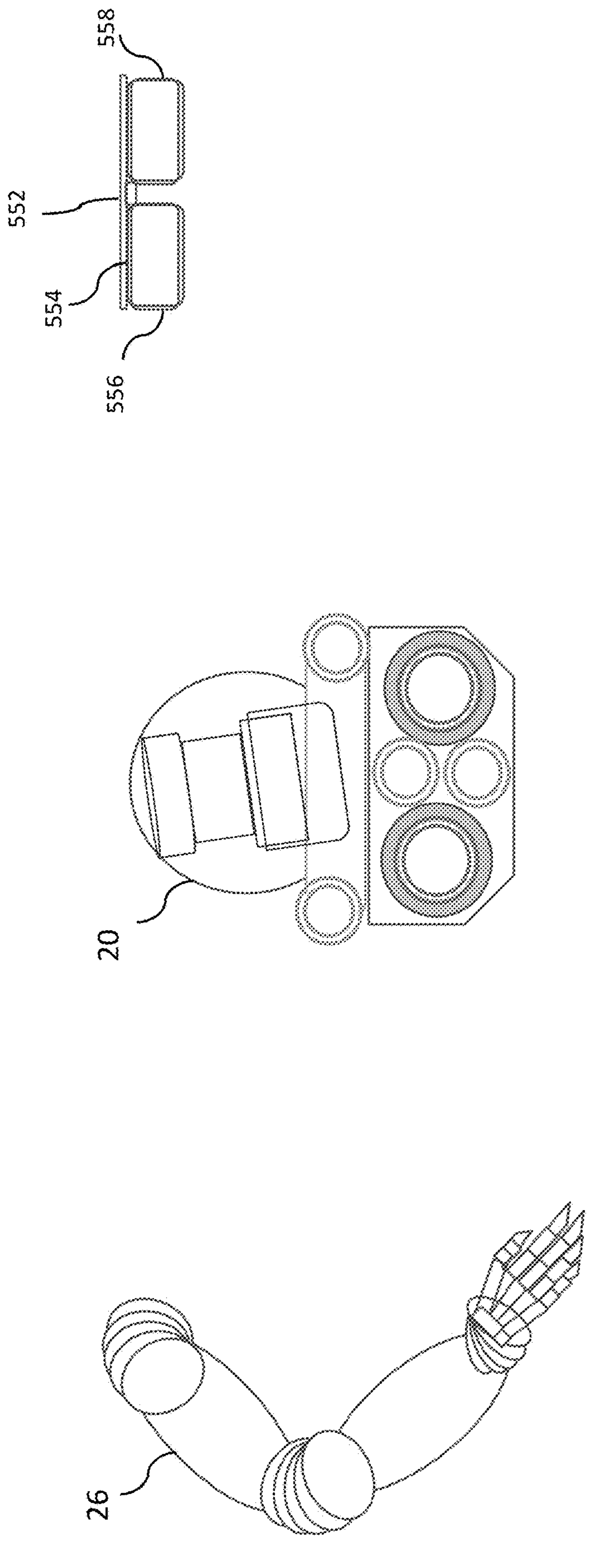
FIG. 10A is block diagram illustrating examples of chef recording devices which a chef wears in the robotic kitchen environment for recording and capturing his or her movements during the food preparation process for a specific recipe.

FIG. 10A is block diagram illustrating examples of chef recording devices 550 which the chef 49 wears in the standardized robotic kitchen environment 50 for recording and capturing the chef's movements during the food preparation process for a specific recipe. The chef recording devices 550 include, but are not limited to, one or more robot gloves (or robot garment) 26, a multimodal sensor unit 20 and a pair of robot glasses 552. In the chef studio system 44, the chef 49 wears the robot gloves 26 for cooking, recording, and capturing the chef's cooking movements. Alternatively, the chef 49 may wear a robotic costume with robotic gloves instead of just the robot gloves 26. In one embodiment, the robot glove 26, with embedded sensors, captures, records and saves the position, pressure and other parameters of the chef's arm, hand, and finger motions in a xyz-coordinate system with a time-stamp. The robot gloves 26 save the position and pressure of the arms and fingers of the chef 18 in a three-dimensional coordinate frame over a time duration from the start time to the end time in preparing a particular food dish. When the chef 49 wears the robotic gloves 26, all of the movements, the position of the hands, the grasping motions, and the amount of pressure exerted, in preparing a food dish in the chef studio system 44, are precisely recorded at a periodic time interval, such as every t seconds. The multimodal sensor unit(s) 20 include video cameras, IR cameras and rangefinders 306, stereo (or even trinocular) camera(s) 308 and multi-dimensional scanning lasers 310, and provide multi-spectral sensory data to the main software abstraction engines 312 (after being acquired and filtered in the data acquisition and filtering module 314). The multimodal sensor unit 20 generates a three-dimensional surface or texture, and processes abstraction model-data. The data is used in a scene understanding module 316 to carry out multiple steps such as (but not limited to) building high- and lower-resolution (laser: high-resolution; stereo-camera: lower-resolution) three-dimensional surface volumes of the scene, with superimposed visual and IR-spectrum color and texture video-information, allowing edge-detection and volumetric object-detection algorithms to infer what elements are in a scene, allowing the use of shape-/color-/texture- and consistency-mapping algorithms to run on the processed data to feed processed information to the Kitchen Cooking Process Equipment Handling Module 318. Optionally, in addition to the robot gloves 76, the chef 49 can wear a pair of robot glasses 552, which has one or more robot sensors 554 around the frame with a robot earpiece 556 and a microphone 558. The robot glasses 552 provide additional vision and capturing capabilities such as a camera for capturing video and recording images that the chef 49 sees while cooking a meal. The one or more robot sensors 554 capture and record temperature and smell of the meal that is being prepared. The earpiece 556 and the microphone 558 capture and record sounds that the chef 49 hears while cooking, which may include human voices, sounds characteristics of frying, grilling, grinding, etc. The chef 49 may also record simultaneous voice instructions and real-time cooking steps of the food preparation by using the earpiece and microphone 82. In this respect, the chef robot recorder devices 550 record the chef's movements, speed, temperature and sound parameters during the food preparation process for a particular food dish.

Figure 10B:
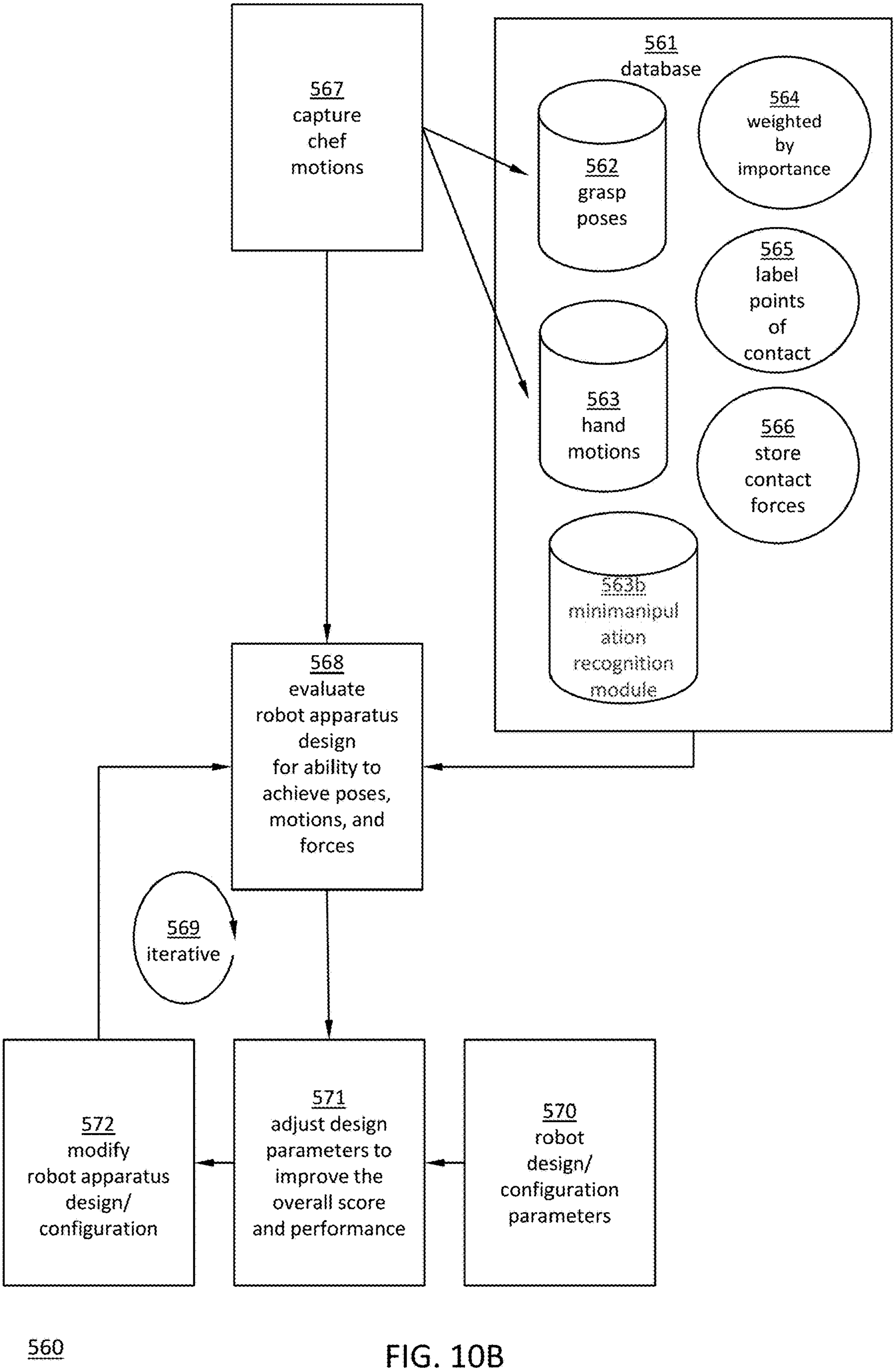
FIG. 10B is a flow diagram illustrating one embodiment of the process in evaluating the captured chef's motions with robot poses, motions, and forces in accordance with the present disclosure.

FIG. 10B is a flow diagram illustrating one embodiment of the process 560 in evaluating the captured of chef's motions with robot poses, motions and forces. A database 561 stores predefined (or predetermined) grasp poses 562 and predefined hand motions by the robotic arms 72 and the robotic hands 72, which are weighted by importance 564, labeled with points of contact 565, and stored contact forces 565. At operation 567, the chef movements recording module 98 is configured to capture the chef's motions in preparing a food dish based in part on the predefined grasp poses 562 and the predefined hand motions 563. At operation 568, the robotic food preparation engine 56 is configured to evaluate the robot apparatus configuration for its ability to achieve poses, motions and forces, and to accomplish minimanipulations. Subsequently, the robot apparatus configuration undergoes an iterative process 569 in assessing the robot design parameters 570, adjusting design parameters to improve the score and performance 571, and modifying the robot apparatus configuration 572.

Figure 11:
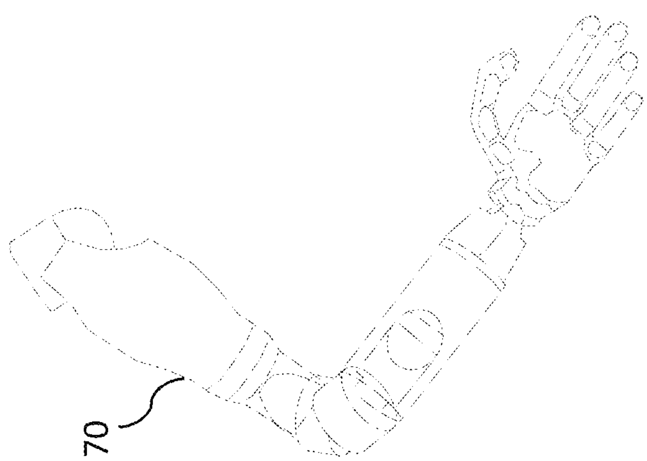
FIG. 11 is block diagram illustrating a side view of a robotic arm embodiment for use in the household robotic kitchen system in accordance with the present disclosure.

FIG. 11 is block diagram illustrating one embodiment of a side view of the robotic arm 70 for use with the standardized robotic kitchen system 50 in the household robotic kitchen 48. In other embodiments, one or more of the robotic arms 70, such as one arm, two arms, three arms, four arms, or more, can be designed for operation in the standardized robotic kitchen 50. The one or more software recipe files 46 from the chef studio system 44, which store a chef's arm, hand, and finger movements during food preparation, can be uploaded and converted into robotic instructions to control the one or more robotic arms 70 and the one or more robotic hands 72 to emulate the chef's movements for preparing a food dish that the chef has prepared. The robotic instructions control the robotic apparatus 75 to replicate the precise movements of the chef in preparing the same food dish. Each of the robotic arms 70 and each of the robotic hands 72 may also include additional features and tools, such as a knife, a fork, a spoon, a spatula, other types of utensils, or food preparation instruments to accomplish the food preparation process.

Figure 12A:
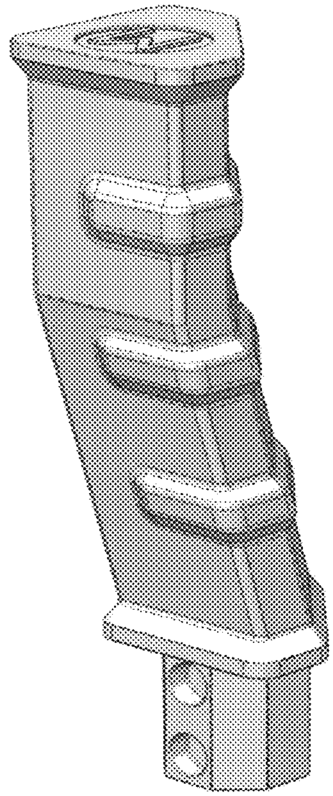
FIGS. 12A-C are block diagrams illustrating one embodiment of a kitchen handle for use with the robotic hand with the palm in accordance with the present disclosure.
Figure 12B:
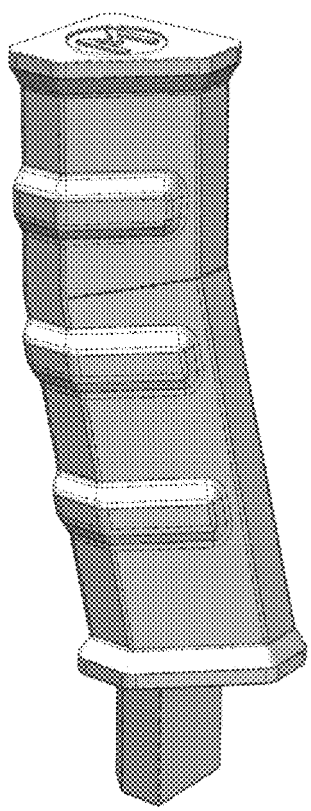
Figure 12C:
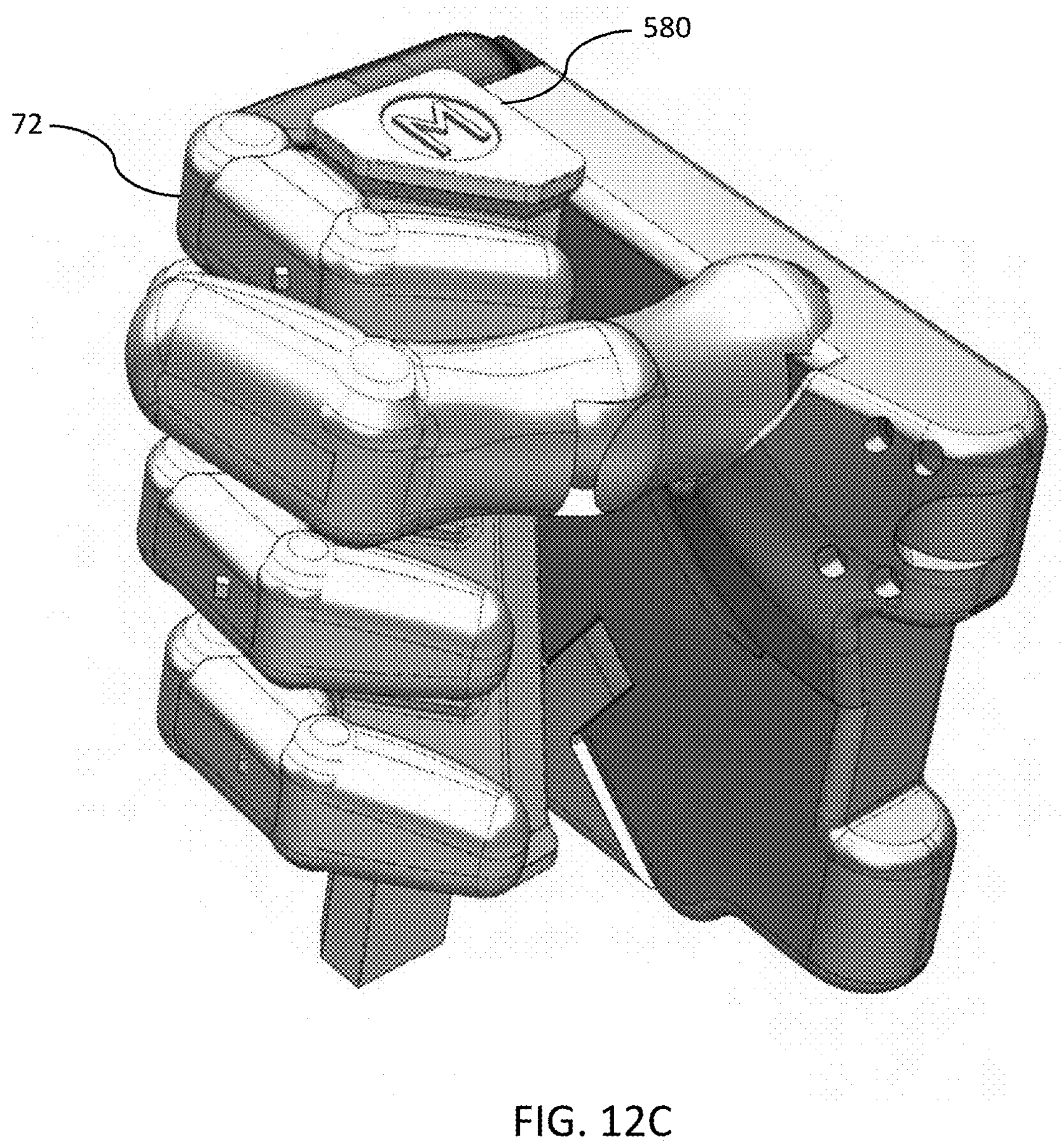

FIGS. 12A-C are block diagrams illustrating one embodiment of a kitchen handle 580 for use with the robotic hand 72 with the palm 520. The design of the kitchen handle 580 is intended to be universal (or standardized) so that the same kitchen handle 580 can attach to any type of kitchen utensils or tools, e.g. a knife, a spatula, a skimmer, a ladle, a draining spoon, a turner, etc. Different perspective views of the kitchen handle 580 are shown in FIGS. 12A-B. The robotic hand 72 grips the kitchen handle 580 as shown in FIG. 12C. Other types of standardized (or universal) kitchen handles may be designed without departing from the spirit of the present disclosure.

Figure 13:
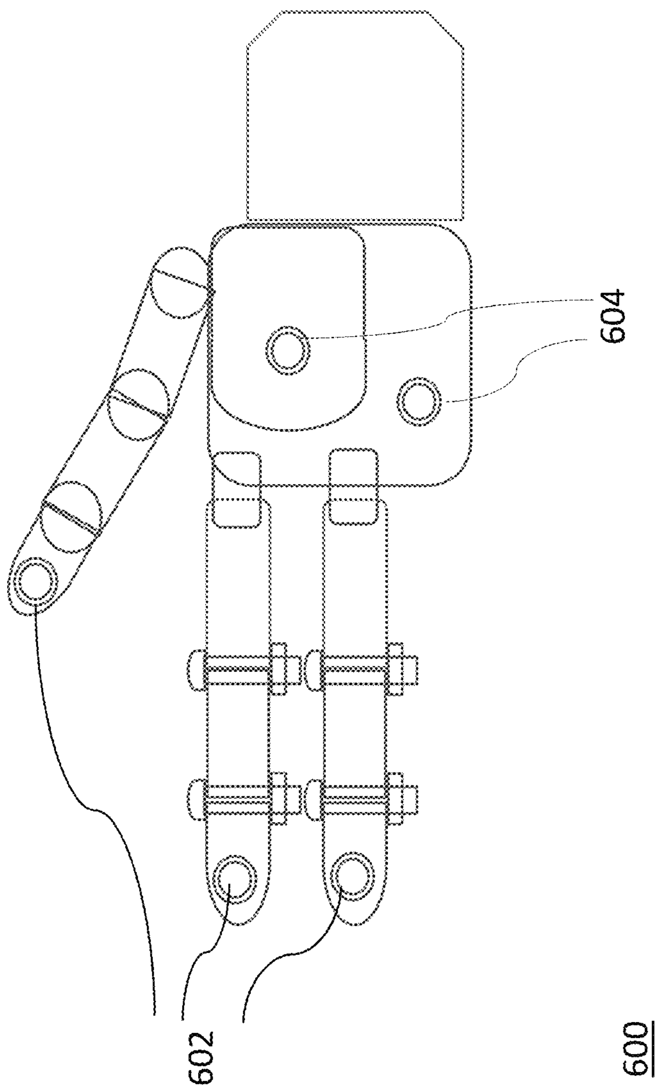
FIG. 13 is a pictorial diagram illustrating an example robotic hand with tactile sensors and distributed pressure sensors in accordance with the present disclosure.

FIG. 13 is a pictorial diagram illustrating an example robotic hand 600 with tactile sensors 602 and distributed pressure sensors 604. During the food preparation process, the robotic apparatus 75 uses touch signals generated by sensors in the fingertips and the palms of a robot's hands to detect force, temperature, humidity and toxicity as the robot replicates step-by-step movements and compares the sensed values with the tactile profile of the chef's studio cooking program. Visual sensors help the robot to identify the surroundings and take appropriate cooking actions. The robotic apparatus 75 analyzes the image of the immediate environment from the visual sensors and compares it with the saved image of the chef's studio cooking program, so that appropriate movements are made to achieve identical results. The robotic apparatus 75 also uses different microphones to compare the chef's instructional speech to background noise from the food preparation processes to improve recognition performance during cooking. Optionally, the robot may have an electronic nose (not shown) to detect odor or flavor and surrounding temperature. For example, the robotic hand 600 is capable of differentiating a real egg by surface texture, temperature and weight signals generated by haptic sensors in the fingers and palm, and is thus able to apply the proper amount of force to hold an egg without breaking it, as well as performing a quality check by shaking and listening for sloshing, cracking the egg and observing and smelling the yolk and albumen to determine the freshness. The robotic hand 600 then may take action to dispose of a bad egg or select a fresh egg. The sensors 602 and 604 on hands, arms, and head enable the robot to move, touch, see and hear to execute the food preparation process using external feedback and obtain a result in the food dish preparation that is identical to the chef's studio cooking result.

Figure 14:
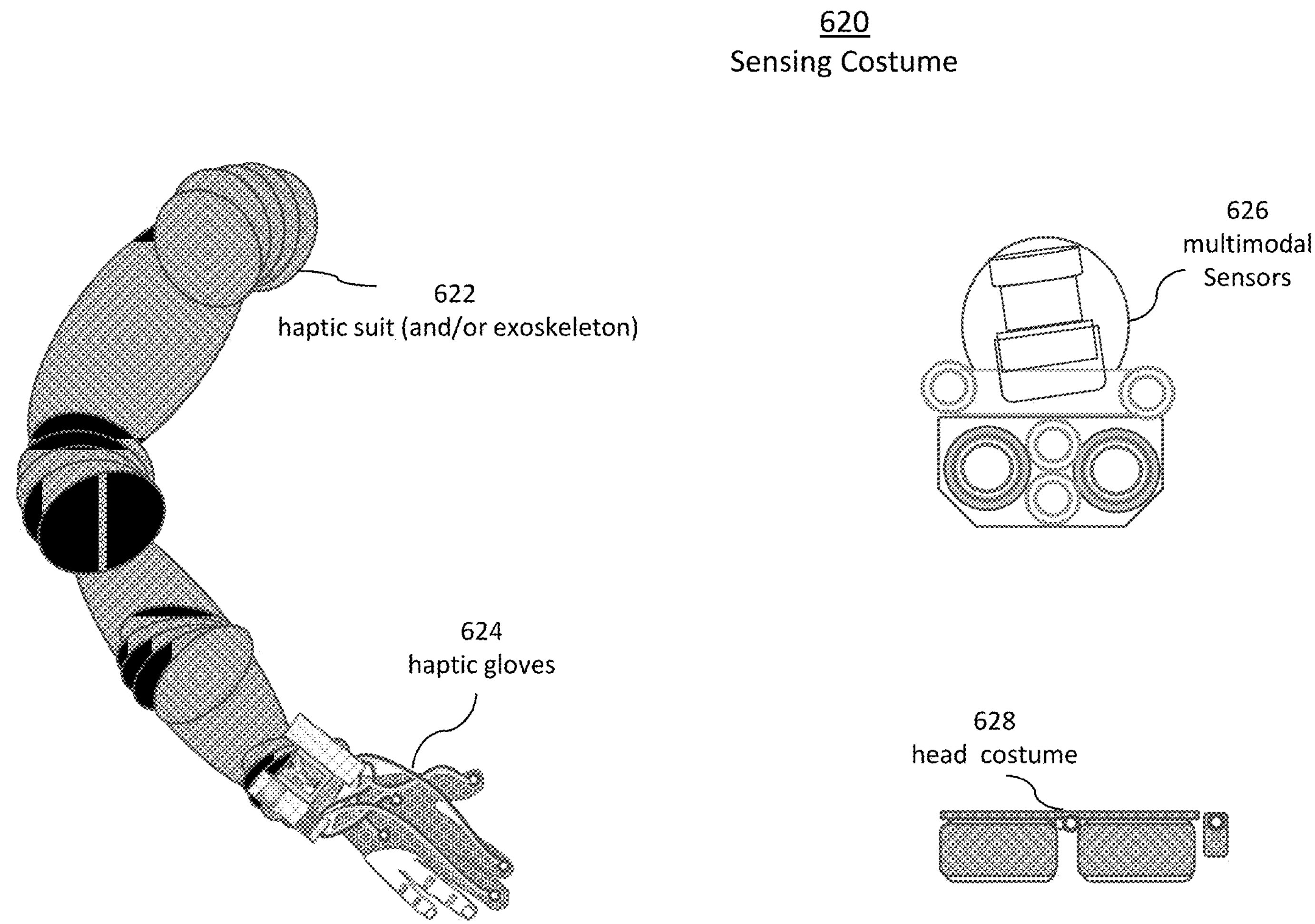
FIG. 14 is a pictorial diagram illustrating an example of a sensing costume for a chef to wear at the robotic cooking studio in accordance with the present disclosure.

FIG. 14 is a pictorial diagram illustrating an example of a sensing costume 620 (for the chef 49 to wear at the standardized robotic kitchen 50. During the food preparation of a food dish, as recorded by a software file 46, the chef 49 wears the sensing costume 620 for capturing the real-time chef's food preparation movements in a time sequence. The sensing costume 620 may include, but is not limited to, a haptic suit 622 (shown one full-length arm and hand costume)[again, no number like that in there], haptic gloves 624, a multimodal sensor(s) 626 [no such number], a head costume 628. The haptic suit 622 with sensors is capable of capturing data from the chef's movements and transmitting captured data to the computer 16 to record the xyz coordinate positions and pressure of human arms 70 and hands/fingers 72 in the XYZ-coordinate system with a time-stamp. The sensing costume 620 also senses and the computer 16 records the position, velocity and forces/torques and endpoint contact behavior of human arms 70 and hands/fingers 72 in a robot-coordinate frame with and associates them with a system timestamp, for correlating with the relative positions in the standardized robotic kitchen 50 with geometric sensors (laser, 3D stereo, or video sensors). The haptic glove 624 with sensors is used to capture, record and save force, temperature, humidity, and toxicity signals detected by tactile sensors in the gloves 624. The head costume 628 includes feedback devices with vision camera, sonar, laser, or radio frequency identification (RFID) and a custom pair of glasses that are used to sense, capture, and transmit the captured data to the computer 16 for recording and storing images that the chef 48 observes during the food preparation process. In addition, the head costume 628 also includes sensors for detecting the surrounding temperature and smell signatures in the standardized robotic kitchen 50. Furthermore, the head costume 628 also includes an audio sensor for capturing the audio that the chef 49 hears, such as sound characteristics of frying, grinding, chopping, etc.

Figure 15B:
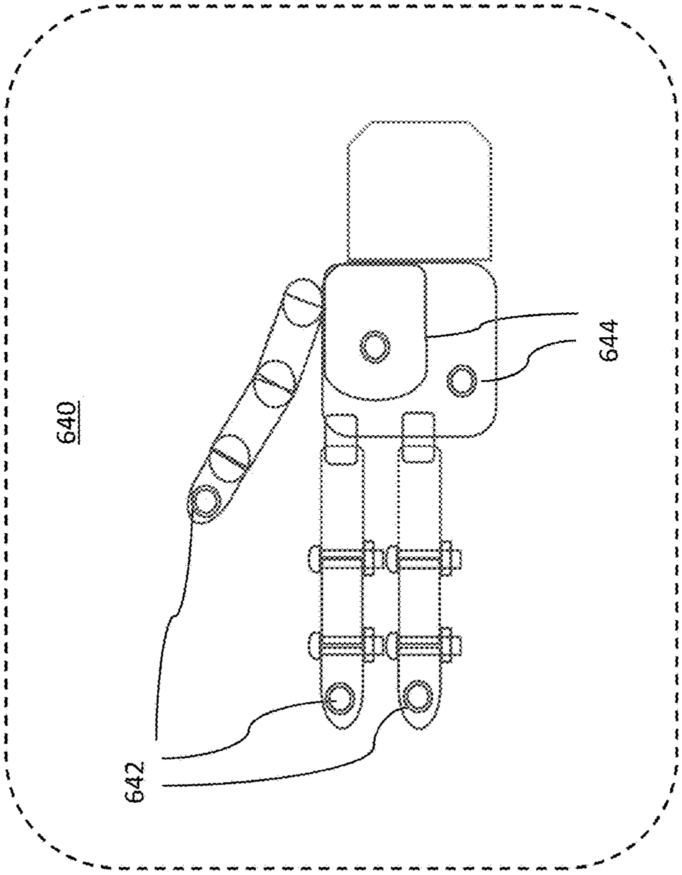
FIGS. 15A-B are pictorial diagrams illustrating one embodiment of a three-fingered haptic glove with sensors for food preparation by the chef and an example of a three-fingered robotic hand with sensors in accordance with the present disclosure.
Figure 15A:
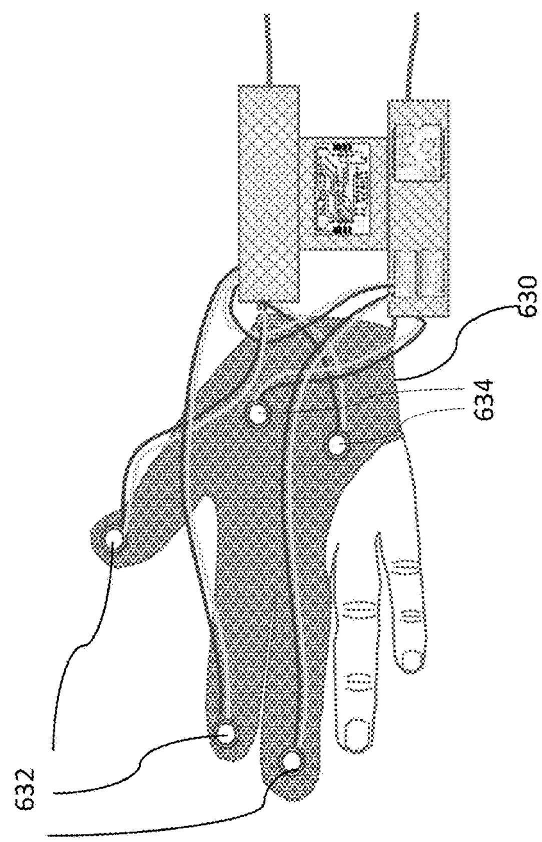

FIGS. 15A-B are pictorial diagrams illustrating one embodiment of a three-finger haptic glove 630 with sensors for food preparation by the chef 49 and an example of a three-fingered robotic hand 640 with sensors. The embodiment illustrated herein shows the simplified robotic hand 640, which has less than five fingers for food preparation. Correspondingly, the complexity in the design of the simplified robotic hand 640 would be significantly reduced, as well as the cost to manufacture the simplified robotic hand 640. Two finger grippers or four-finger robotic hands, with or without an opposing thumb, are also possible alternate implementations. In this embodiment, the chef's hand movements are limited by the functionalities of the three fingers, thumb, index finder and middle finger, where each finger has a sensor 632 for sensing data of the chef's movement with respect to force, temperature, humidity, toxicity or tactile-sensation. The three-finger haptic glove 630 also includes point sensors or distributed pressure sensors in the palm area of the three-finger haptic glove 630. The chef's movements in preparing a food dish wearing the three-finger haptic glove 630 using the thumb, the index finger, and the middle fingers are recorded in a software file. Subsequently, the three-fingered robotic hand 640 replicates the chef's movements from the converted software recipe file into robotic instructions for controlling the thumb, the index finger and the middle finger of the robotic hand 640 while monitoring sensors 642*b* on the fingers and sensors 644 on the palm of the robotic hand 640. The sensors 642 include a force, temperature, humidity, toxicity or tactile sensor, while the sensors 644 can be implemented with point sensors or distributed pressure sensors.

Figure 15C:
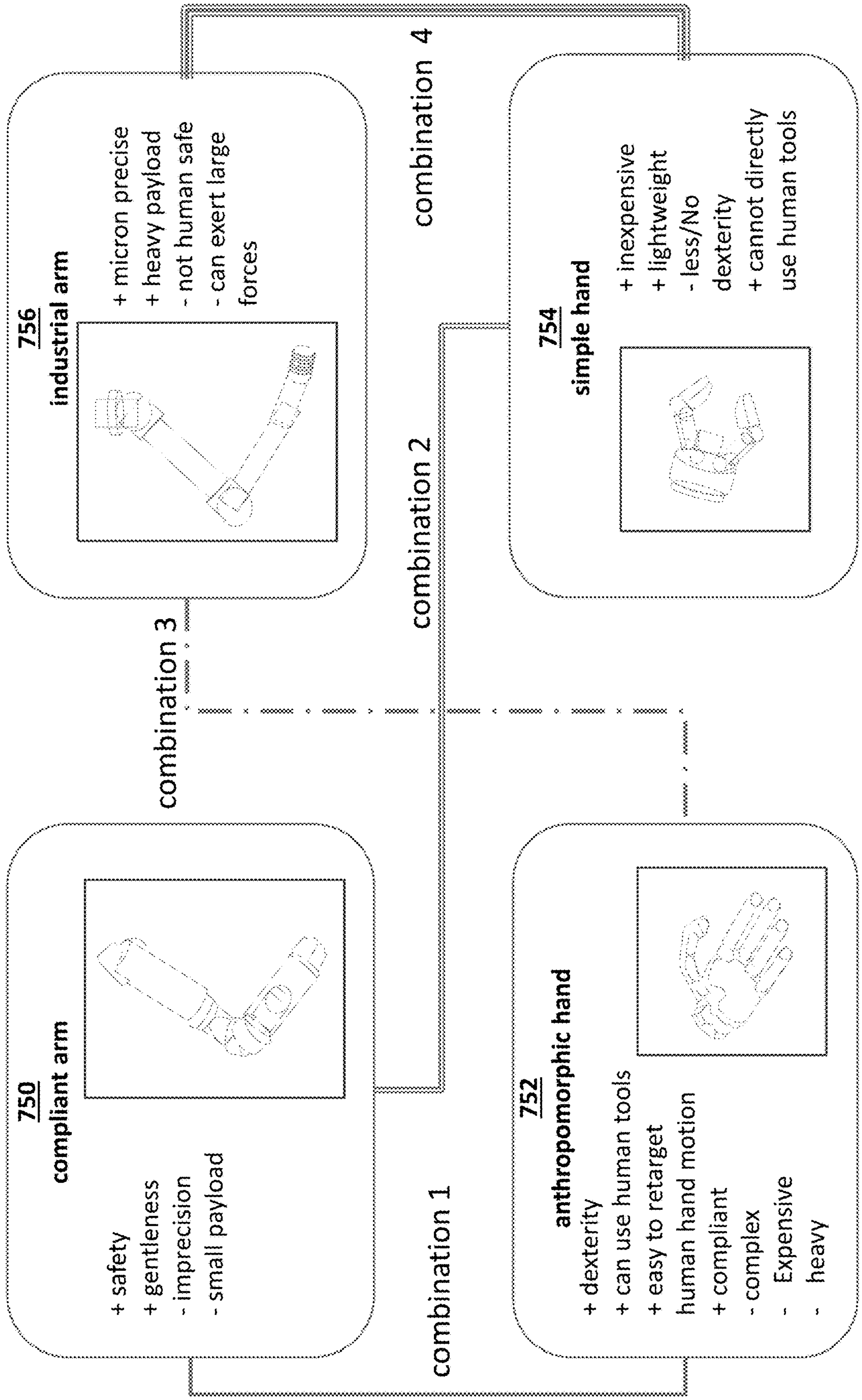
FIG. 15C is a block diagram illustrating one example of the interplay and interactions between a robotic arm and a robotic hand in accordance with the present disclosure.

FIG. 15C is a block diagram illustrating one example of the interplay and interactions between the robotic arm 70 and the robotic hand 72. A compliant robotic arm 750 provides a smaller payload, higher safety, more gentle actions, but less precision. An anthropomorphic robotic hand 752 provides more dexterity, capable of handling human tools, is easier to retarget for a human hand motion, more compliant, but the design requires more complexity, increase in weight, and higher product cost. A simple robotic hand 754 is lighter in weight, less expensive, with lower dexterity, and not able to use human tools directly. An industrial robotic arm 756 is more precise, with higher payload capacity but generally not considered safe around humans and can potentially exert a large amount of force and cause harm. One embodiment of the standardized robotic kitchen 50 is to utilize a first combination of the compliant arm 750 with the anthropomorphic hand 752. The other three combinations are generally less desirable for implementation of the present disclosure.

Figure 15D:
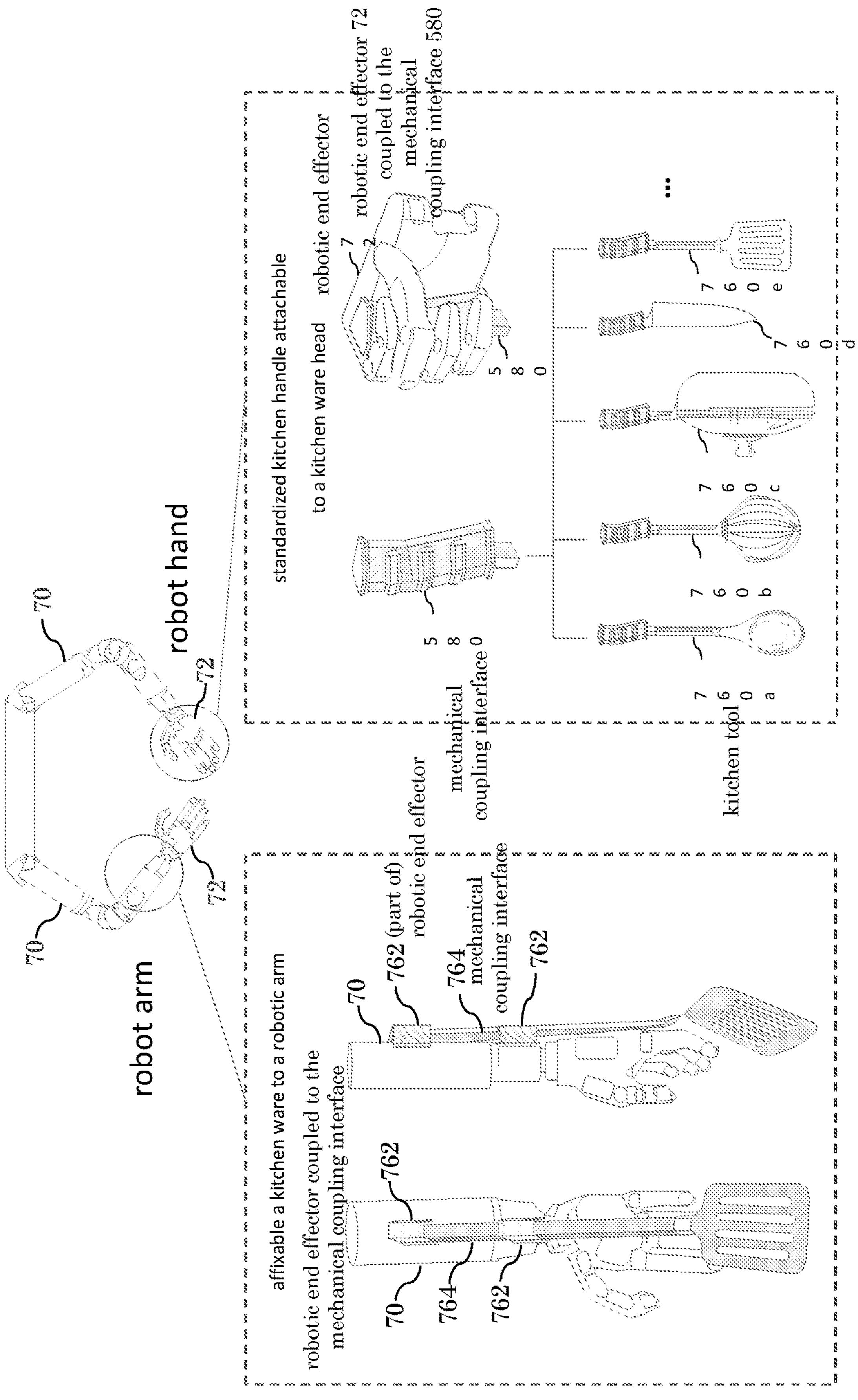
FIG. 15D is a block diagram illustrating the robotic hand using the standardized kitchen handle that is attachable to a cookware head and the robotic arm attachable to kitchen ware in accordance with the present disclosure.

FIG. 15D is a block diagram illustrating the robotic hand 72 using the standardized kitchen handle 580 to attach to a custom cookware head and the robotic arm 70 affixable to kitchen ware. In one technique to grab a kitchen ware, the robotic hand 72 grabs the standardized kitchen tool 580 for attaching to any one of the custom cookware heads from the illustrated choices of 760*a*, 760*b*, 760*c*, 760*d*, 760*e*, and others. For example, the standardized kitchen handle 580 is attached to the custom spatula head 760*e* for use to stir-fry the ingredients in a pan. In one embodiment, the standardized kitchen handle 580 can be held by the robotic hand 72 in just one position, which minimizes the potential confusion in different ways to hold the standardized kitchen handle 580. In another technique to grab a kitchen ware, the robotic arm has one or more holders 762 that are affixable to a kitchen ware 762, where the robotic arm 70 is able to exert more forces if necessary in pressing the kitchen ware 762 during the robotic hand motion.

Figure 16:
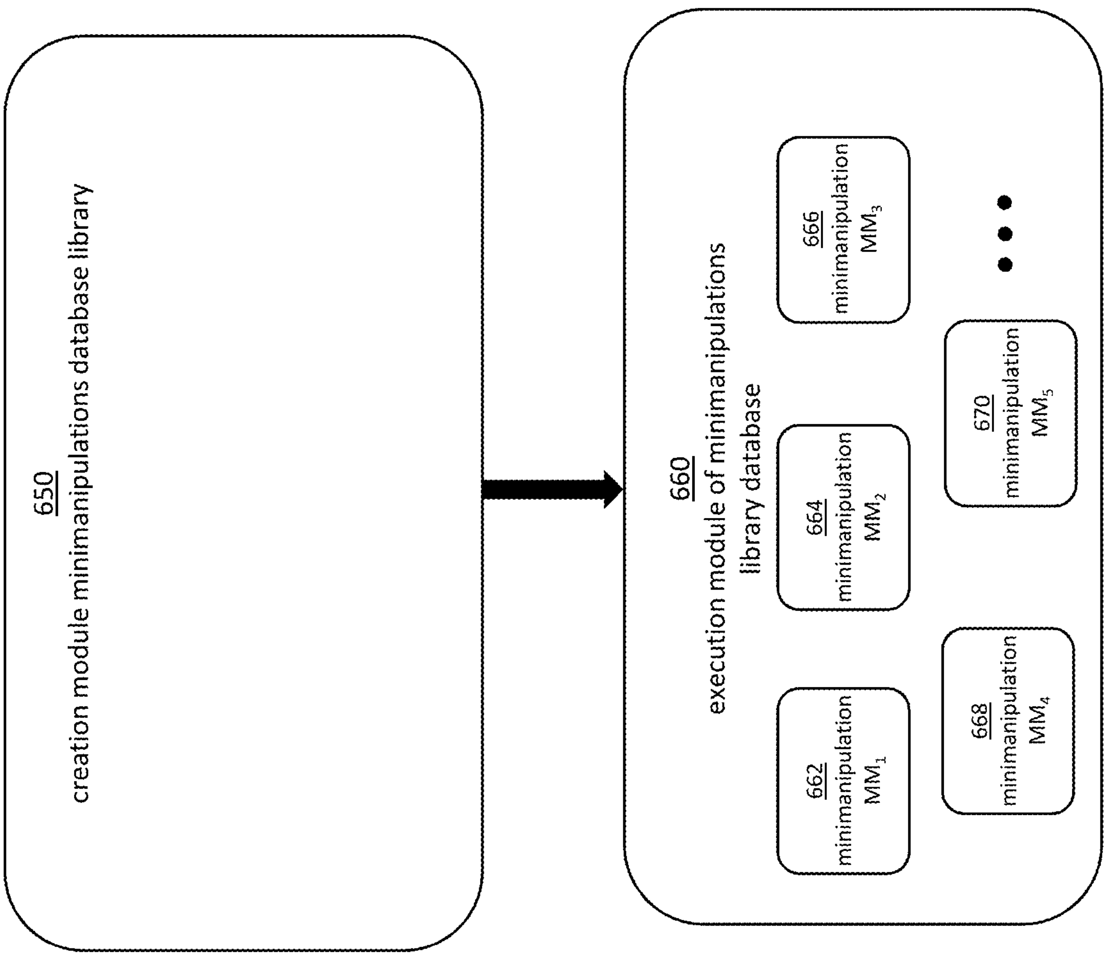
FIG. 16 is a block diagram illustrating the creation module of a minimanipulation database library and the execution module of the minimanipulation database library in accordance with the present disclosure.

FIG. 16 is a block diagram illustrating a creation module 650 of a minimanipulation library database and an execution module 660 of the minimanipulation library database. The creation module 60 of the minimanipulation database library is a process of creating, testing various possible combinations, and selecting an optimal minimanipulation to achieve a specific functional result. One objective of the creation module 60 is to explore all different possible combinations in performing a specific minimanipulation and predefine a library of optimal minimanipulations for subsequent execution by the robotic arms 70 and the robotic hands 72 in preparing a food dish. The creation module 650 of the minimanipulation library can also be used as a teaching method for the robotic arms 70 and the robotic hands 72 to learn about the different food preparation functions from the minimanipulation library database. The execution modules 660 of the minimanipulations library database is configured to provide a range of minimanipulation functions which the robotic apparatus 75 can access and execute from the minimanipulations library database containing a first minimanipulation $MM_1$ with a first functional outcome 662, a second minimanipulation $MM_2$ with a second functional outcome 664, a third minimanipulation $MM_3$ with a third functional outcome 666, a fourth minimanipulation $MM_4$ with a fourth functional outcome 668, and a fifth minimanipulation $MM_5$ with a fifth functional outcome 670, during the process of preparing a food dish.

Generalized Minimanipulations: A generalized minimanipulation comprises a well-defined sequence of sensing and actuator actions with an expected functional outcome. Associated with each minimanipulation we have a set of preconditions and a set of post-conditions. The pre-conditions assert what must be true in the world state in order to enable the minimanipulation to take place. The postconditions are changes to the world state brought about by the minimanipulations.

For instance, the minimanipulation for grasping a small object would comprise observing the location and orientation of the object, moving the robotic hand (the gripper) to align it with the object's position, applying the requisite force based on the object's weight and rigidity, and moving the arm upwards.

In this example, the preconditions include having a graspable object located within reach of the robotic hand, and its weight being within the lifting capabilities of the arm. The postconditions are that the object is no longer resting on the surface where it was found previously and it is now held by to robot's hand.

More generally, a generalized minimanipulation M comprises triple <PRE, ACT, POST>, where $PRE=\{s_1, s_2, \ldots, s_n\}$, is a set of items in the world state that must be true before the actions $ACT=[a_1, a_2, \ldots, a_k]$ can take place, and result in a set of changes to the world state denoted as $POST=\{p_1, p_2, \ldots, p_m\}$. Note that [square brackets] mean sequences, and {curly brackets} mean unordered sets. Each post condition may also have a probability in case the outcome is less than certain. For instance the minimanipulation for grasping an egg may have a 0.99 probability that the egg is in the hand of the robot (the remaining 0.01 probability may correspond to inadvertently breaking the egg while attempting to grasp it, or other unwanted consequence).

Even more generally, a minimanipulation can include other (smaller) minimanipulations in its sequence of actions instead of just atomic or basic robotic sensing or actuating. In such a case, the minimanipulation would comprise the sequence: $ACT=[a_1, m_2, m_3, \ldots, a_k]$ where basic actions denoted by "a's" are interspersed with minimanipulations denoted by "m's". In such a case, the post condition set would be satisfied by the union of the preconditions for its basic actions and the union of the preconditions of all of its sub-minimanipulations.

$$PRE=PRE_a \cup (U_{m_i \in ACT} PRE(m_i))$$

The postconditions would of the generalized minimanipulation would be determined in a similar manner, that is:

$$POST=POST_a \cup (U_{m_i \in ACTPOST}(m_i))$$

Of note is that the preconditions and postconditions refer to specific aspects of the physical world (locations, orientation, weights, shapes, etc.), rather than just being mathematical symbols. In other words, the software and algorithms that implement selection and assembly of minimanipulations have direct effects on the robotic machinery, which in turn has directs effects on the physical world.

In one embodiment, when specifying the threshold performance of a minimanipulation, whether generalized or basic, the measurements are performed on the POST conditions, comparing the actual result to the optimal result. For instance, in the task of assembly if a part is positioned within 1% of its desired orientation and location and the threshold of performance was 2%, then the minimanipulation is successful. Similarly, if the threshold were 0.5% in the above example, then the minimanipulation is unsuccessful.

In another embodiment, instead of specifying a threshold performance for a minimanipulation, an acceptable range is defined for the parameters of the POST conditions, and the minimanipulation is successful if the resulting value of the parameters after executing the minimanipulation fall within the specified range. These ranges are task dependent and specified for each task. For instance, in the assembly task, the position of a part may be specified within a range (or tolerance), such as between 0 and 2 millimeters of another part, and the minimanipulation is successful if it the final location of the part is within the range.

In a third embodiment a minimanipulation is successful if its POST conditions match PRE conditions of the next minimanipulation in the robotic task. For instance, if the POST condition in the assembly task of one minimanipulation places a new part 1 millimeter from a previously placed part and the next minimanipulation (e.g. welding) has a PRE condition that specifies the parts must be within 2 millimeters, then the first minimanipulation was successful.

In general, the preferred embodiments for all minimanipulations, basic and generalized, that are stored in the minimanipulation library have been designed, programmed and tested in order that they be performed successfully in foreseen circumstances.

Tasks comprising of minimanipulations: A robotic task is comprised of one or (typically) multiple minimanipulations. These minimanipulations may execute sequentially, in parallel, or adhering to a partial order. "Sequentially" means that each step is completed before the subsequent one is started. "In parallel" means that the robotic device can execute the steps simultaneously or in any order. A "partial order" means that some steps must be performed in sequence—those specified in the partial order—and the rest can be executed before, after, or during the steps specified in the atrial order. A partial order is defined in the standard mathematical sense as a set of steps S and ordering constraints among some of the steps $s_i \rightarrow s_j$ meaning that step i must be executed before step j. These steps can be minimanipulations or combinations of minimanipulations. For instance in a robotic chef, if two ingredients must be placed in a bowl and the mixed. There are ordering constraint that each ingredient must be placed in the bowl before mixing, but no ordering constraint on which ingredient is placed first into the mixing bowl.

Figure 17A:
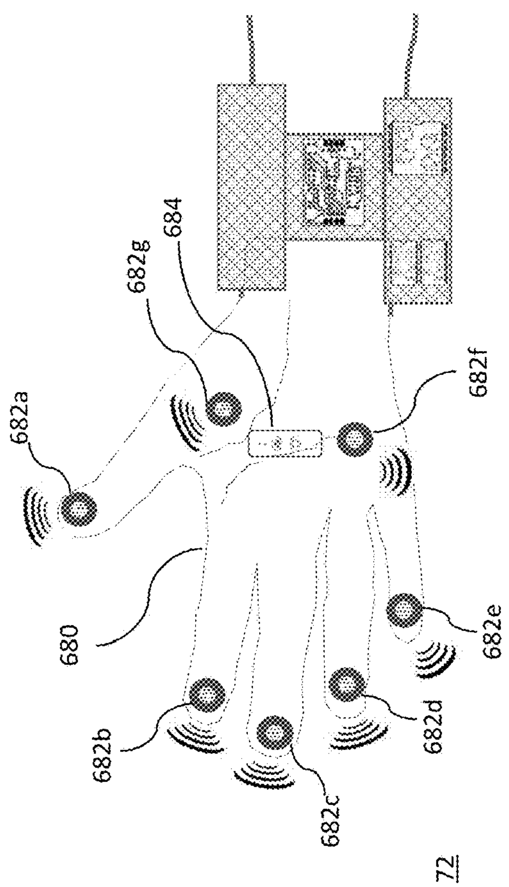
FIG. 17A is a block diagram illustrating a sensing glove used by a chef to execute standardized operating movements in accordance with the present disclosure.

FIG. 17A is a block diagram illustrating a sensing glove 680 used by the chef 49 to sense and capture the chef's movements while preparing a food dish. The sensing glove 680 has a plurality of sensors 682*a*, 682*b*, 682*c*, 682*d*, 682*e* on each of the fingers, and a plurality of sensors 682*f*, 682*g*, in the palm area of the sensing glove 680. In one embodiment, the at least 5 pressure sensors 682*a*, 682*b*, 682*c*, 682*d*, 682*e* inside the soft glove are used for capturing and analyzing the chef's movements during all hand manipulations. The plurality of sensors 682*a*, 682*b*, 682*c*, 682*d*, 682*e*, 682*f*, and 682*g* in this embodiment are embedded in the sensing glove 680 but transparent to the material of the sensing glove 680 for external sensing. The sensing glove 680 may have feature points associated with the plurality of sensors 682*a*, 682*b*, 682*c*, 682*d*, 682*e*, 682*f*, 682*g* that reflect the hand curvature (or relief) of various higher and lower points in the sensing glove 680. The sensing glove 680, which is placed over the robotic hand 72, is made of soft materials that emulate the compliance and shape of human skin. Additional description elaborating on the robotic hand 72 can be found in FIG. 9A.

The robotic hand 72 includes a camera sensor 684, such as an RGB-D sensor, an imaging sensor or a visual sensing device, placed in or near the middle of the palm for detecting the distance and shape of an object, as well as the distance of the object, and for handling a kitchen tool. The imaging sensor 682*f* provides guidance to the robotic hand 72 in moving the robotic hand 72 towards the direction of the object and to make necessary adjustments to grab an object. In addition, a sonar sensor, such as a tactile pressure sensor, may be placed near the palm of the robotic hand 72, for detecting the distance and shape of the object. The sonar sensor 682*f* can also guide the robotic hand 72 to move toward the object. Each of the sonar sensors 682*a*, 682*b*, 682*c*, 682*d*, 682*e*, 682*f*, 682*g* includes ultrasonic sensors, laser, radio frequency identification (RFID), and other suitable sensors. In addition, each of the sonar sensors 682*a*, 682*b*, 682*c*, 682*d*, 682*e*, 682*f*, 682*g* serves as a feedback mechanism to determine whether the robotic hand 72 continues to exert additional pressure to grab the object at such point where there is sufficient pressure to grab and lift the object. In addition, the sonar sensor 682*f* in the palm of the robotic hand 72 provides tactile sensing function to handle a kitchen tool. For example, when the robotic hand 72 grabs a knife to cut beef, the amount of pressure that the robotic hand 72 exerts on the knife and applies to the beef, allows the tactile sensor to detect when the knife finishes slicing the beef, i.e., when the knife has no resistance. The distributed pressure is not only to secure the object, but also so as not to exert too much pressure so as to, for example, not to break an egg). Furthermore, each finger on the robotic hand 72 has a sensor on the finger tip, as shown by the first sensor 682*a* on the finger tip of the thumb, the second sensor 682*b* on the finger tip of the index finger, the third sensor 682*c* on the finger tip of the middle finger, the fourth sensor 682*d* on the finger tip of the ring finger, and the fifth sensor 682*f* on the finger tip of the pinky. Each of the sensors 682*a*, 682*b*, 682*c*, 682*d*, 682*e* provide sensing capability on the distance and shape of the object, sensing capability for temperature or moisture, as well as tactile feedback capability.

Figure 17B:
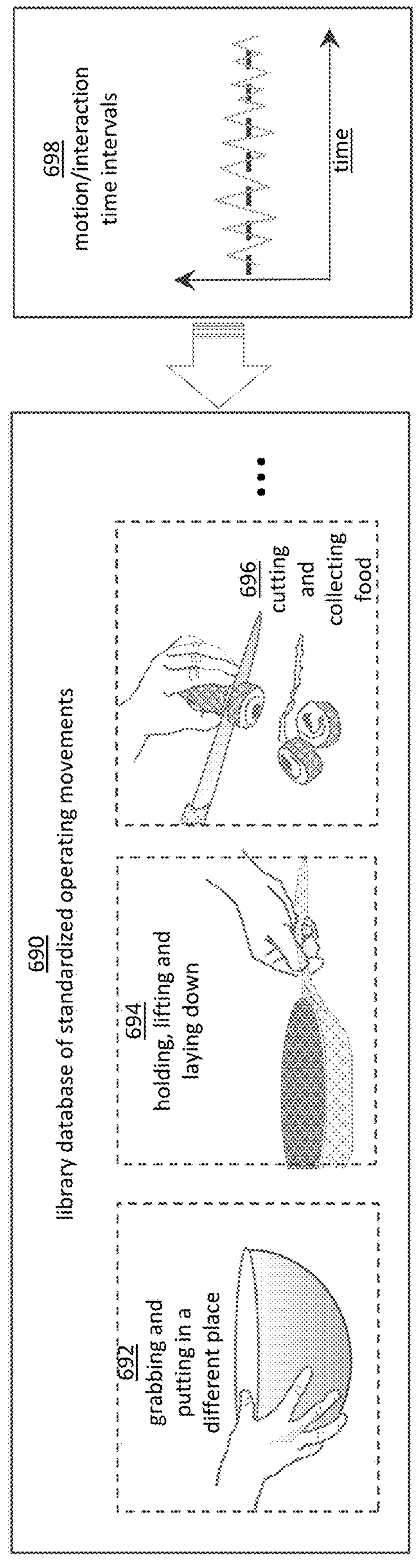
FIG. 17B is a block diagram illustrating a database of standardized operating movements in the robotic kitchen module in accordance with the present disclosure.

The RGB-D sensor 684 and the sonar sensor 682*f* in the palm, plus the sonar sensors 682*a*, 682*b*, 682*c*, 682*d*, 682*e* in the fingertip of each finger, provide a feedback mechanism to the robotic hand 72 as a means to grab a non-standardized object, or a non-standardized kitchen tool. The robotic hands 72 may adjust the pressure to a sufficient degree to grab ahold of the non-standardized object. A program library 690 that stores sample grabbing functions 692, 694, 696 according to a specific time interval for which the robotic hand 72 can draw from in performing a specific grabbing function, is illustrated in FIG. 17B. FIG. 17B is a block diagram illustrating a library database 690 of standardized operating movements in the standardized robotic kitchen module 50. Standardized operating movements, which are predefined and stored in the library database 690, include grabbing, placing, and operating a kitchen tool or a piece of kitchen equipment, with motion/interaction time profiles 698.

Figure 18A:
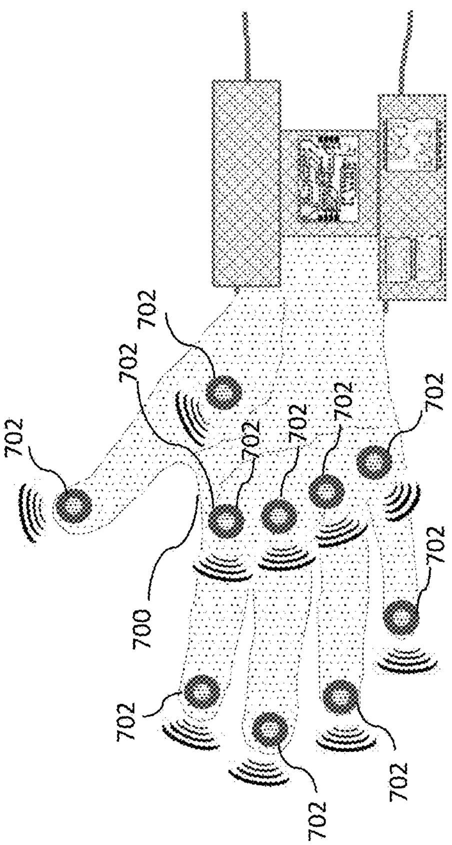
FIG. 18A is a graphical diagram illustrating that each of the robotic hand coated with a artificial human-like soft-skin glove in accordance with the present disclosure.

FIG. 18A is a graphical diagram illustrating that each of the robotic hands 72 is coated with a artificial human-like soft-skin glove 700. The artificial human-like soft-skin glove 700 includes a plurality of embedded sensors that are transparent and sufficient for the robot hands 72 to perform high-level minimanipulations. In one embodiment, the soft-skin glove 700 includes ten or more sensors to replicate a chef's hand movements.

Figure 18B:
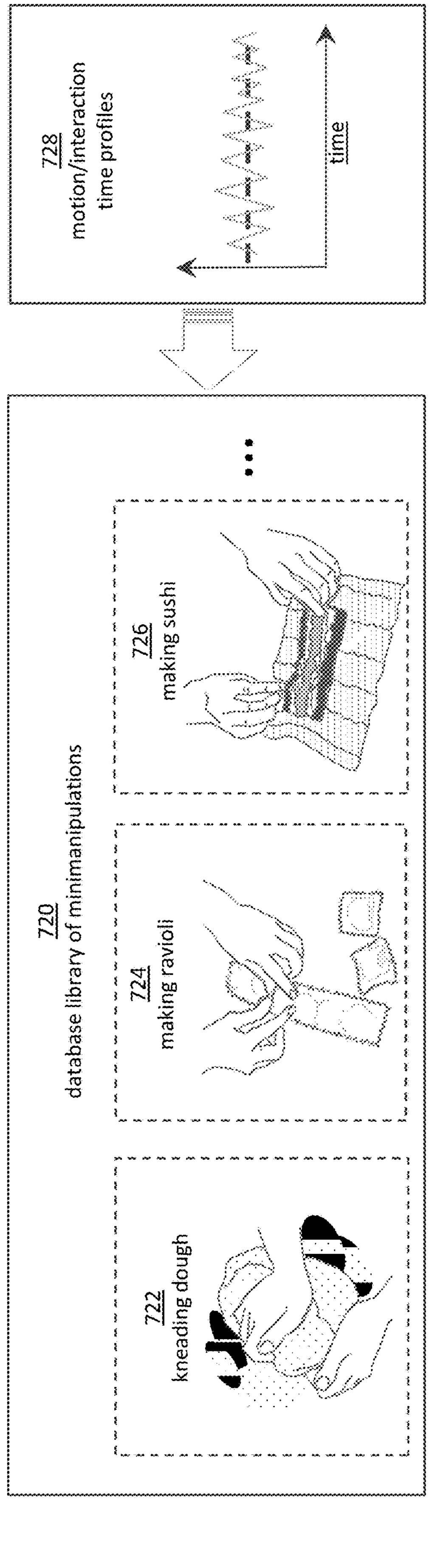
FIG. 18B is a block diagram illustrating robotic hands coated with artificial human-like skin gloves to execute high-level minimanipulations based on a library database of minimanipulations, which have been predefined and stored in the library database, in accordance with the present disclosure.

FIG. 18B is a block diagram illustrating robotic hands coated with artificial human-like skin gloves to execute high-level minimanipulations based on a library database 720 of minimanipulations, which have been predefined and stored in the library database 720. High-level minimanipulations refer to a sequence of action primitives requiring a substantial amount of interaction movements and interaction forces and control over the same. Three examples of minimanipulations are provided, which are stored in the database library 720. The first example of minimanipulation is to use the pair of robotic hands 72 to knead the dough 722. The second example of minimanipulation is to use the pair of robotic hands 72 to make ravioli 724. The third example of minimanipulation is to use the pair of robotic hands 72 to make sushi 726. Each of the three examples of minimanipulations has motion/interaction time profiles 728 that are tracked by the computer 16.

Figure 18C:
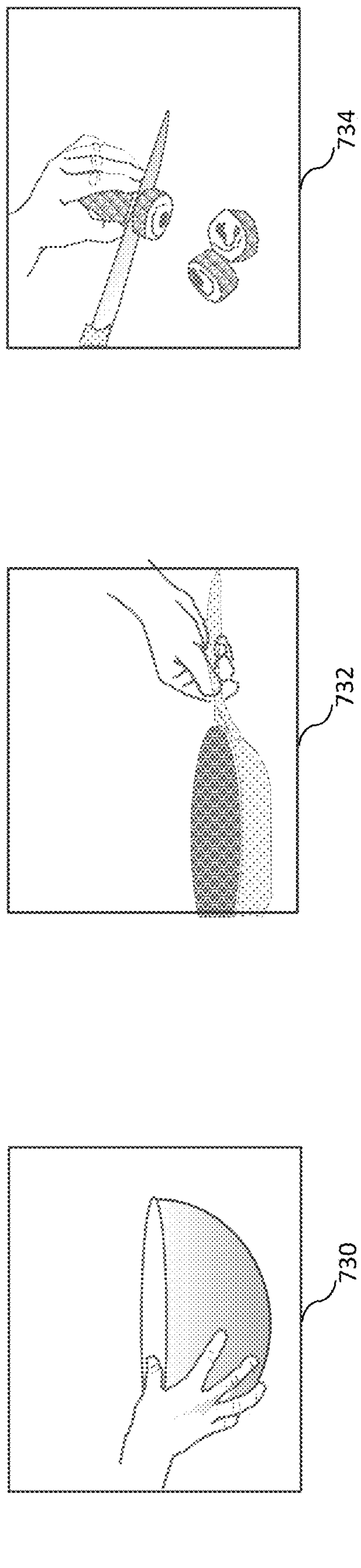
FIG. 18C is a graphical diagram illustrating three types of taxonomy of manipulation actions for food preparation in accordance with the present disclosure.

FIG. 18C is a graphical diagram illustrating three types of taxonomy of manipulation actions for food preparation with continuous trajectory of the robotic arm 70 and the robotic hand 72 motions and forces that result in a desired goal state. The robotic arm 70 and the robotic hand 72 execute rigid grasping and transfer 730 movements for picking up an object with an immovable grasp and transferring them to a goal location without the need for a forceful interaction. Examples of a rigid grasping and transfer include putting the pan on the stove, picking up the salt shaker, shaking salt into the dish, dropping ingredients into a bowl, pouring the contents out of a container, tossing a salad, and flipping a pancake. The robotic arm 70 and the robotic hand 72 execute a rigid grasp with forceful interaction 732 where there is a forceful contact between two surfaces or objects. Examples of a rigid grasp with forceful interaction include stirring a pot, opening a box, and turning a pan, and sweeping items from a cutting board into a pan. The robotic arm 70 and the robotic hand 72 execute a forceful interaction with deformation 734 where there is a forceful contact between two surfaces or objects that results in the deformation of one of two surfaces, such as cutting a carrot, breaking an egg, or rolling dough. For additional information on the function of the human hand, deformation of the human palm, and its function in grasping, see the material from I. A. Kapandji, "The Physiology of the Joints, Volume 1: Upper Limb, 6e," Churchill Livingstone, 6 edition, 2007, which this reference is incorporated by reference herein in its entirety.

Figure 18D:
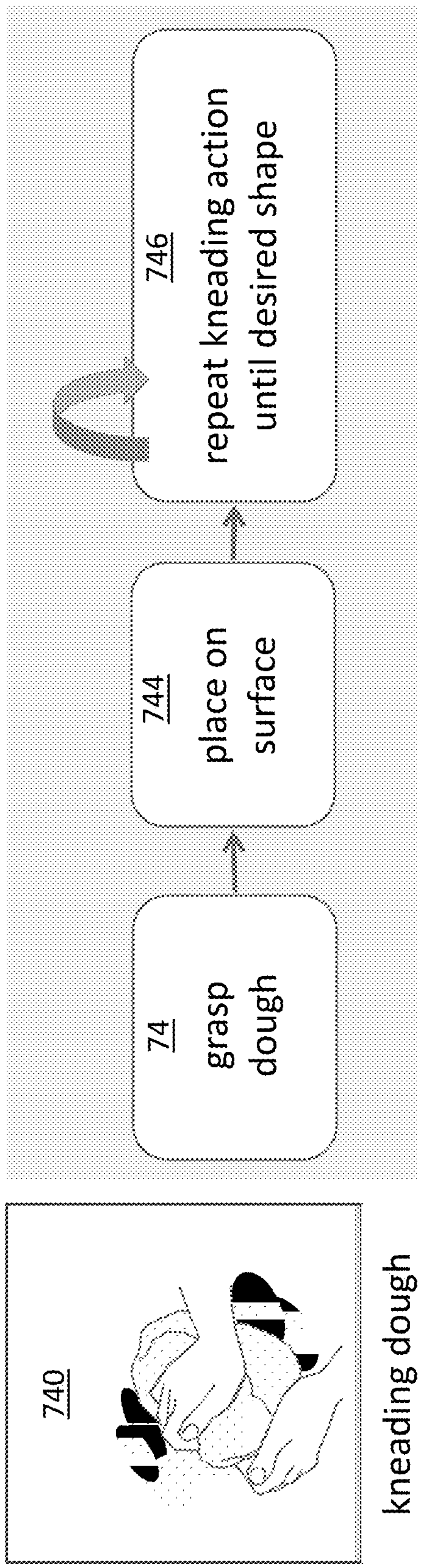
FIG. 18D is a flow diagram illustrating one embodiment on taxonomy of manipulation actions for food preparation in accordance with the present disclosure.

FIG. 18D is a simplified flow diagram illustrating one embodiment on taxonomy of manipulation actions for food preparation in kneading dough 740. Kneading dough 740 may be a minimanipulation that has been previously predefined in the library database of minimanipulations. The process of kneading dough 740 comprises a sequence of actions (or short minimanipulations), including grasping the dough 742, placing the dough on a surface 744, and repeating the kneading action until one obtains a desired shape 746.

Figure 19:
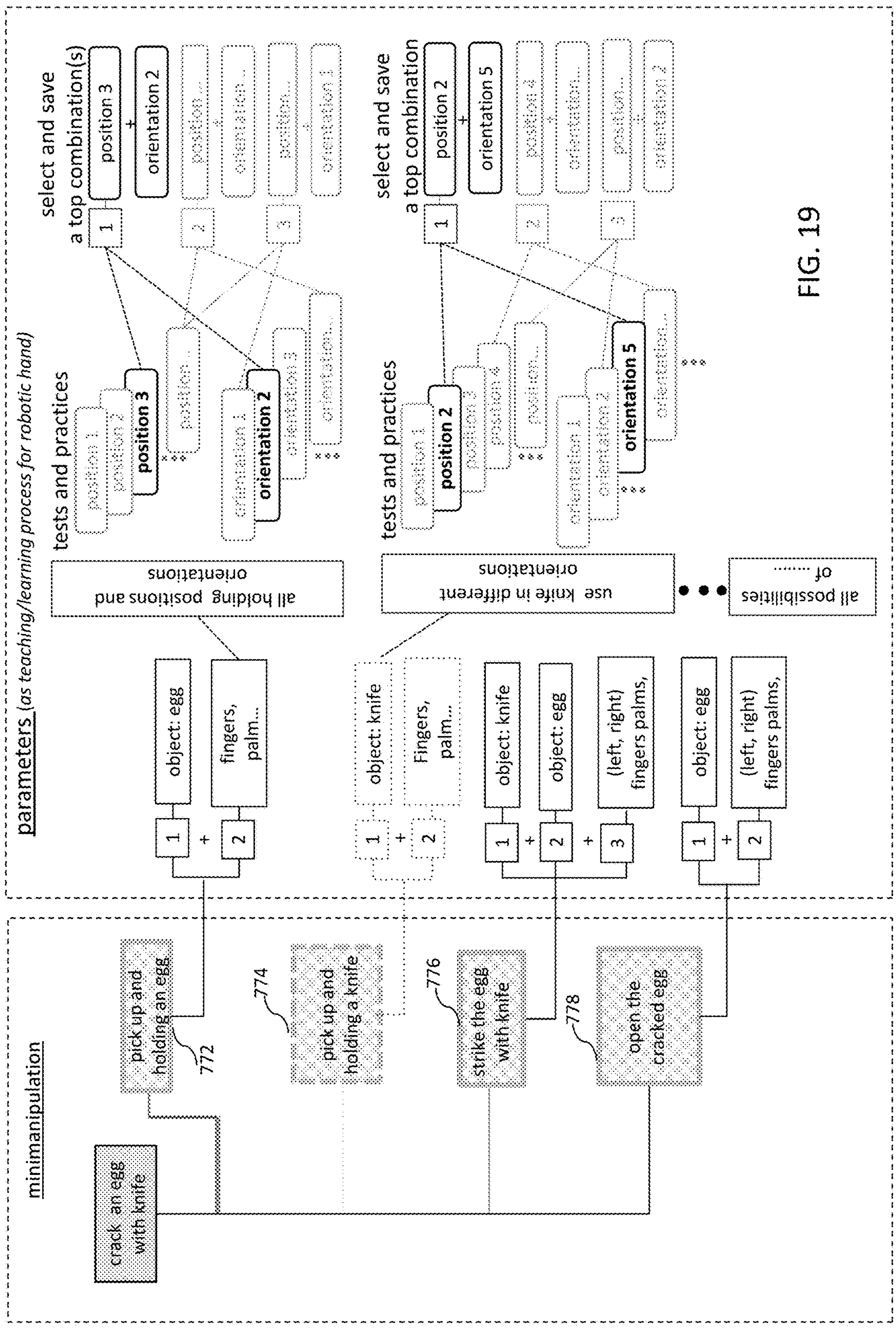
FIG. 19 is a block diagram illustrating the creation of a minimanipulation that results in cracking an egg with a knife, an example in accordance with the present disclosure.

FIG. 19 is a block diagram illustrating an example of a database library structure 770 of a minimanipulation that results in "cracking an egg with a knife." The minimanipulation 770 of cracking an egg includes how to hold an egg in the right position 772, how to hold a knife relative to the egg 774, what is the best angle to strike the egg with the knife 776, and how to open the cracked egg 778. Various possible parameters for each 772, 774, 776, and 778, are tested to find the best way to execute a specific movement. For example in holding an egg 772, the different positions, orientations, and ways to hold an egg are tested to find an optimal way to hold the egg. Second, the robotic hand 72 picks up the knife from a predetermined location. The holding the knife 774 is explored as to the different positions, orientations, and the way to hold the knife in order to find an optimal way to handle the knife. Third, the striking the egg with knife 776 is also tested for the various combinations of striking the knife on the egg to find the best way to strike the egg with the knife. Consequently, the optimal way to execute the minimanipulation of cracking an egg with a knife 770 is stored in the library database of minimanipulations. The saved minimanipulation of cracking an egg with a knife 770 would comprise the best way to hold the egg 772, the best way to hold the knife 774, and the best way to strike the knife with the egg 776.

To create the minimanipulation that results in cracking an egg with a knife, multiple parameter combinations must be tested to identify a set of parameters that ensure the desired functional result—that the egg is cracked—is achieved. In this example, parameters are identified to determine how to grasp and hold an egg in such a way so as not to crush it. An appropriate knife is selected through testing, and suitable placements are found for the fingers and palm so that it may be held for striking. A striking motion is identified that will successfully crack an egg. An opening motion and/or force are identified that allows a cracked egg to be opened successfully.

The teaching/learning process for the robotic apparatus 75 involves multiple and repetitive tests to identify the necessary parameters to achieve the desired final functional result.

These tests may be performed over varying scenarios. For example, the size of the egg can vary. The location at which it is to be cracked can vary. The knife may be at different locations. The minimanipulations must be successful in all of these variable circumstances.

Once the learning process has been completed, results are stored as a collection of action primitives that together are known to accomplish the desired functional result.

Figure 20:
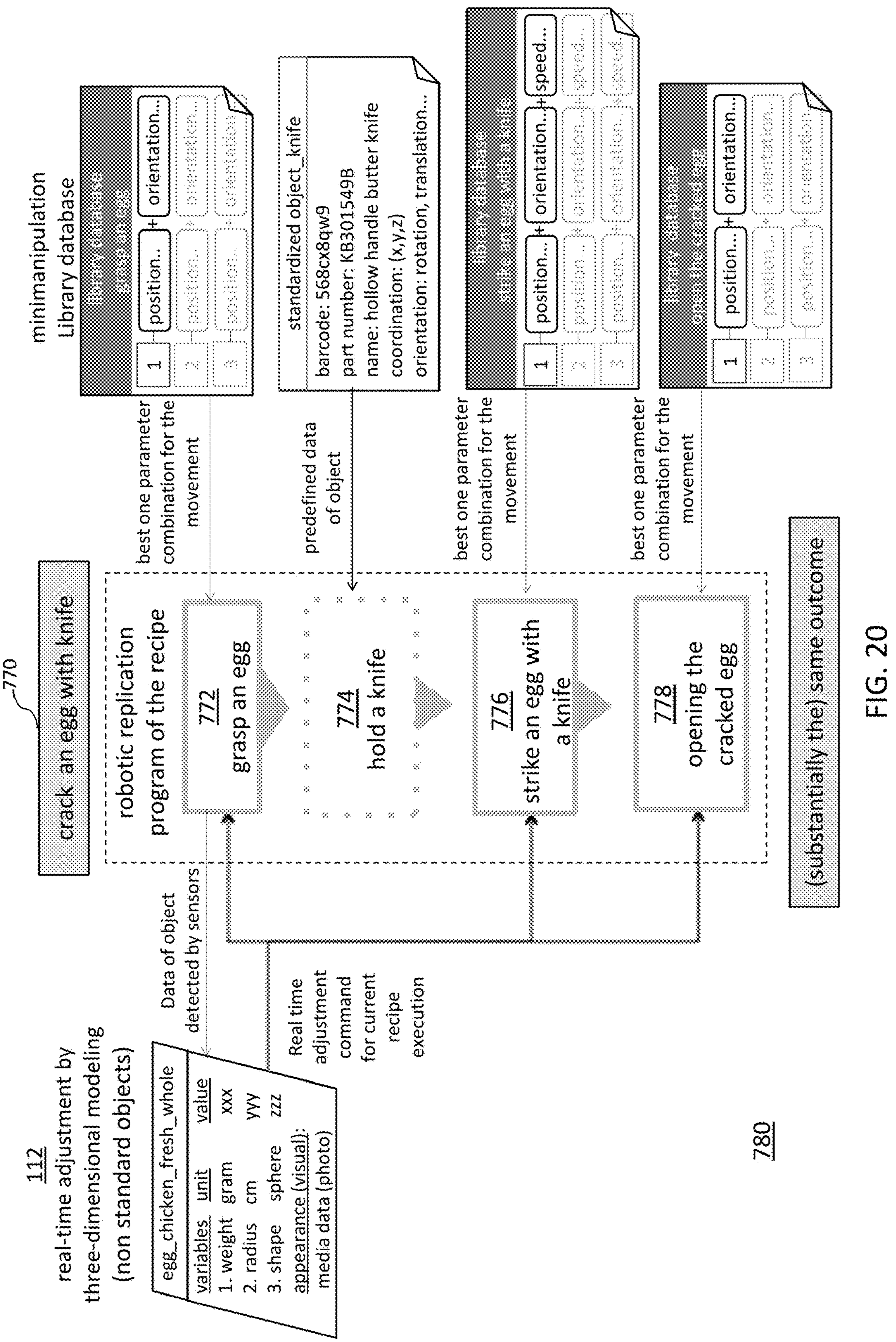
FIG. 20 is a block diagram illustrating an example of recipe execution for a minimanipulation with real-time adjustment in accordance with the present disclosure.

FIG. 20 is a block diagram illustrating an example of recipe execution 780 for a mini manipulation with real-time adjustment by three-dimensional modeling of non-standard objects 112. In recipe execution 780, the robotic hands 72 execute the minimanipulations 770 of cracking an egg with a knife, where the optimal way to execute each movement in the cracking an egg operation 772, the holding a knife operation 774, the striking the egg with a knife operation 776, and opening the cracked egg operation 778 is selected from the minimanipulations library database. The process of executing the optimal way to carry out each of the movements 772, 774, 776, 778 ensures that the minimanipulation 770 will achieve the same (or guarantee of), or substantially the same, outcome for that specific minimanipulation. The multimodal three-dimensional sensor 20 provides real-time adjustment capabilities 112 as to the possible variations in one or more ingredients, such as the dimension and weight of an egg.

As an example of the operative relationship between the creation of a minimanipulation in FIG. 19 and the execution of the minimanipulation in FIG. 20, specific variables associated with the minimanipulation of "cracking an egg with a knife," includes an initial xyz coordinates of egg, an initial orientation of the egg, the size of the egg, the shape of the egg, an initial xyz coordinate of the knife, an initial orientation of the knife, the xyz coordinates where to crack the egg, speed, and the time duration of the minimanipulation. The identified variables of the minimanipulation, "crack an egg with a knife," are thus defined during the creation phase, where these identifiable variables may be adjusted by the robotic food preparation engine 56 during the execution phase of the associated minimanipulation.

Figure 21:
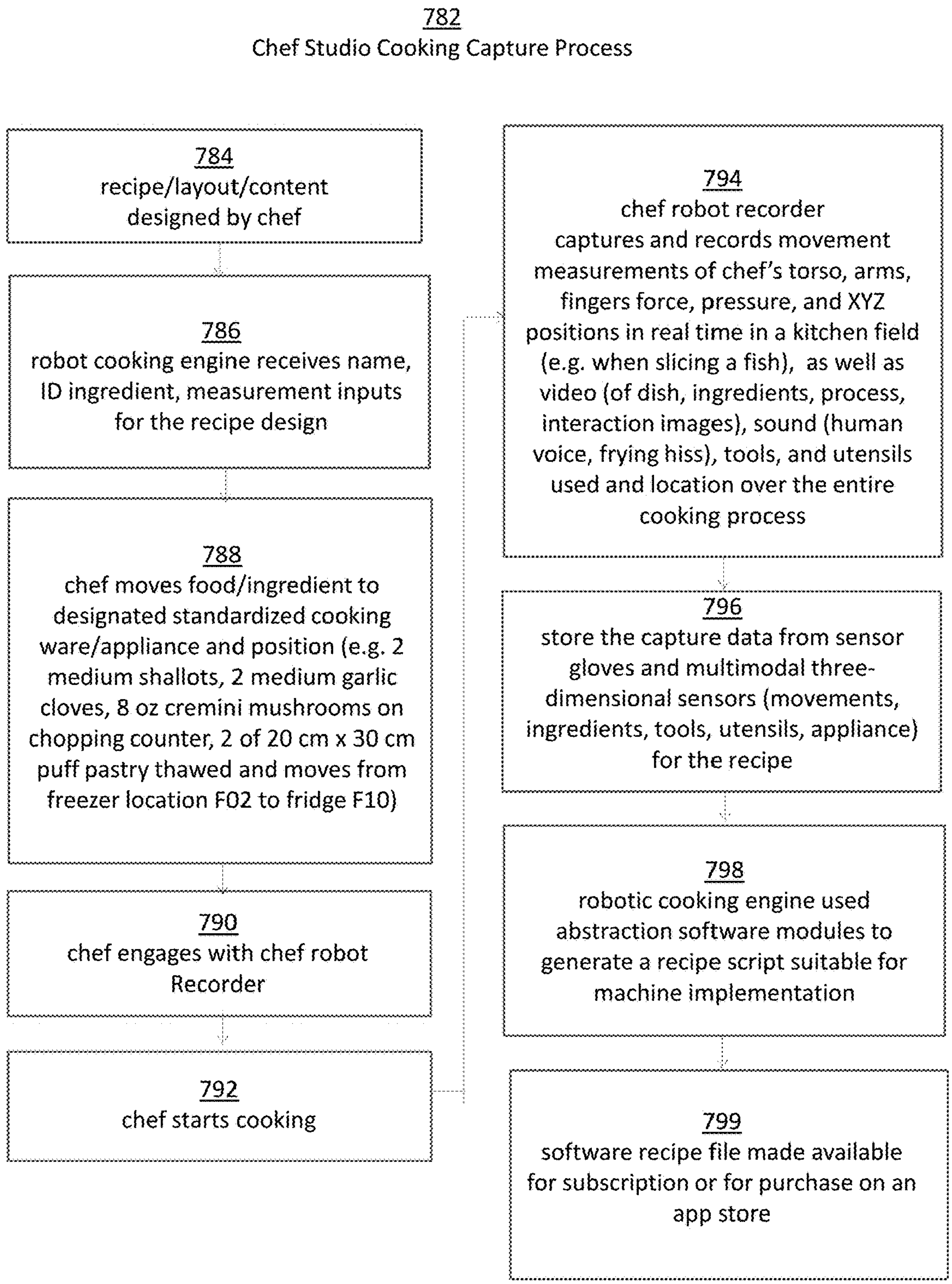
FIG. 21 is a flow diagram illustrating the software process to capture a chef's food preparation movements in a standardized kitchen module in accordance with the present disclosure.

FIG. 21 is a flow diagram illustrating the software process 782 to capture a chef's food preparation movements in a standardized kitchen module to produce the software recipe files 46 from the chef studio 44. In the chef studio 44, at step 784, the chef 49 designs the different components of a food recipe. At step 786, the robotic cooking engine 56 is configured to receive the name, ID ingredient, and measurement inputs for the recipe design that the chef 49 has selected. At step 788, the chef 49 moves food/ingredients into designated standardized cooking ware/appliances and into their designated positions. For example, the chef 49 may pick two medium shallots and two medium garlic cloves, place eight crimini mushrooms on the chopping counter, and move two 20 cm×30 cm puff pastry units thawed from freezer lock F02 to a refrigerator (fridge). At step 790, the chef 49 wears the capturing gloves 26 or the haptic costume 622, which has sensors that capture the chef's movement data for transmission to the computer 16. At step 792, the chef 49 starts working the recipe that he or she selects from step 122. At step 794, the chef movement recording module 98 is configured to capture and record the chef's precise movements, including measurements of the chef's arms and fingers' force, pressure, and XYZ positions and orientations in real time in the standardized robotic kitchen 50. In addition to capturing the chef's movements, pressure, and positions, the chef movement recording module 98 is configured to record video (of dish, ingredients, process, and interaction images) and sound (human voice, frying hiss, etc.) during the entire food preparation process for a particular recipe. At step 796, the robotic cooking engine 56 is configured to store the captured data from step 794, which includes the chef's movements from the sensors on the capturing gloves 26 and the multimodal three-dimensional sensors 30. At step 798, the recipe abstraction software module 104 is configured to generate a recipe script suitable for machine implementation. At step 799, after the recipe data has been generated and saved, the software recipe file 46 is made available for sale or subscription to users via an app store or marketplace to a user's computer located at home or in a restaurant, as well as integrating the robotic cooking receipt app on a mobile device.

Figure 22:
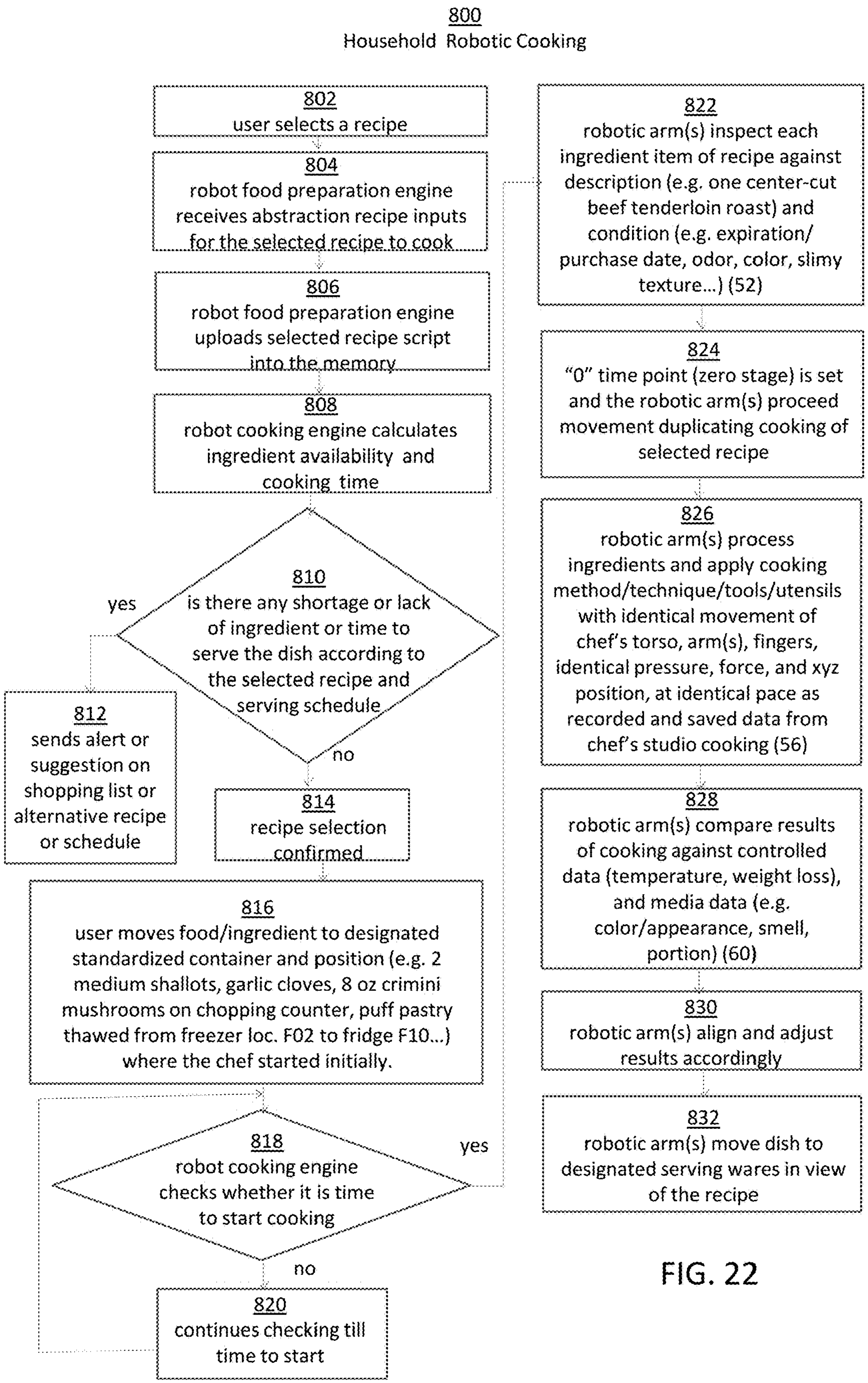
FIG. 22 is a flow diagram illustrating the software process for food preparation by robotic apparatus in the robotic standardized kitchen module in accordance with the present disclosure.

FIG. 22 is a flow diagram 800 illustrating the software process for food preparation by the robotic apparatus 75 in the robotic standardized kitchen with the robotic apparatus 75 based one or more of the software recipe files 22 received from chef studio system 44. At step 802, the user 24 through the computer 15 selects a recipe bought or subscribed to from the chef studio 44. At step 804, the robot food preparation engine 56 in the household robotic kitchen 48 is configured to receive inputs from the input module 50 for the selected recipe to be prepared. At step 806, the robot food preparation engine 56 in the household robotic kitchen 48 is configured to upload the selected recipe into the memory module 102 with software recipe files 46. At step 808, the robot food preparation engine 56 in the household robotic kitchen 48 is configured to calculate the ingredient availability to complete the selected recipe and the approximate cooking time required to finish the dish. At step 810, the robot food preparation engine 56 in the household robotic kitchen 48 is configured to analyze the prerequisites for the selected recipe and decides whether there is any shortage or lack of ingredients, or insufficient time to serve the dish according to the selected recipe and serving schedule. If the prerequisites are not met, at step 812, the robot food preparation engine 56 in the household robotic kitchen 48 sends an alert, indicating that the ingredients should be added to a shopping list, or offers an alternate recipe or serving schedules. However, if the prerequisites are met, the robot food preparation engine 56 is configured to confirm the recipe selection at step 814. At step 816, after the recipe selection has been confirmed, the user 60 through the computer 16 moves the food/ingredients to specific standardized containers and into the required positions. After the ingredients have been placed in the designated containers and the positions as identified, the robot food preparation engine 56 in the household robotic kitchen 48 is configured to check if the start time has been triggered at step 818. At this juncture, the household robot food preparation engine 56 offers a second process check to ensure that all the prerequisites are being met. If the robot food preparation engine 56 in the household robotic kitchen 48 is not ready to start the cooking process, the household robot food preparation engine 56 continues to check the prerequisites at step 820 until the start time has been triggered. If the robot food preparation engine 56 is ready to start the cooking process, at step 822, the quality check for raw food module 96 in the robot food preparation engine 56 is configured to process the prerequisites for the selected recipe and inspects each ingredient item against the description of the recipe (e.g. one center-cut beef tenderloin roast) and condition (e.g. expiration/purchase date, odor, color, texture, etc.). At step 824, the robot food preparation engine 56 sets the time at a "0" stage and uploads the software recipe file 46 to the one or more robotic arms 70 and the robotic hands 72 for replicating the chef's cooking movements to produce a selected dish according to the software recipe file 46. At step 826, the one or more robotic arms 72 and hands 74 process ingredients and execute the cooking method/technique with identical movements as that of the chef's 49 arms, hands and fingers, with the exact pressure, the precise force, and the same XYZ position, at the same time increments as captured and recorded from the chef's movements. During this time, the one or more robotic arms 70 and hands 72 compare the results of cooking against the controlled data (such as temperature, weight, loss, etc.) and the media data (such as color, appearance, smell, portion-size, etc.), as illustrated in step 828. After the data has been compared, the robotic apparatus 75 (including the robotic arms 70 and the robotic hands 72) aligns and adjusts the results at step 830. At step 832, the robot food preparation engine 56 is configured to instruct the robotic apparatus 75 to move the completed dish to the designated serving dishes and placing the same on the counter.

Figure 23:
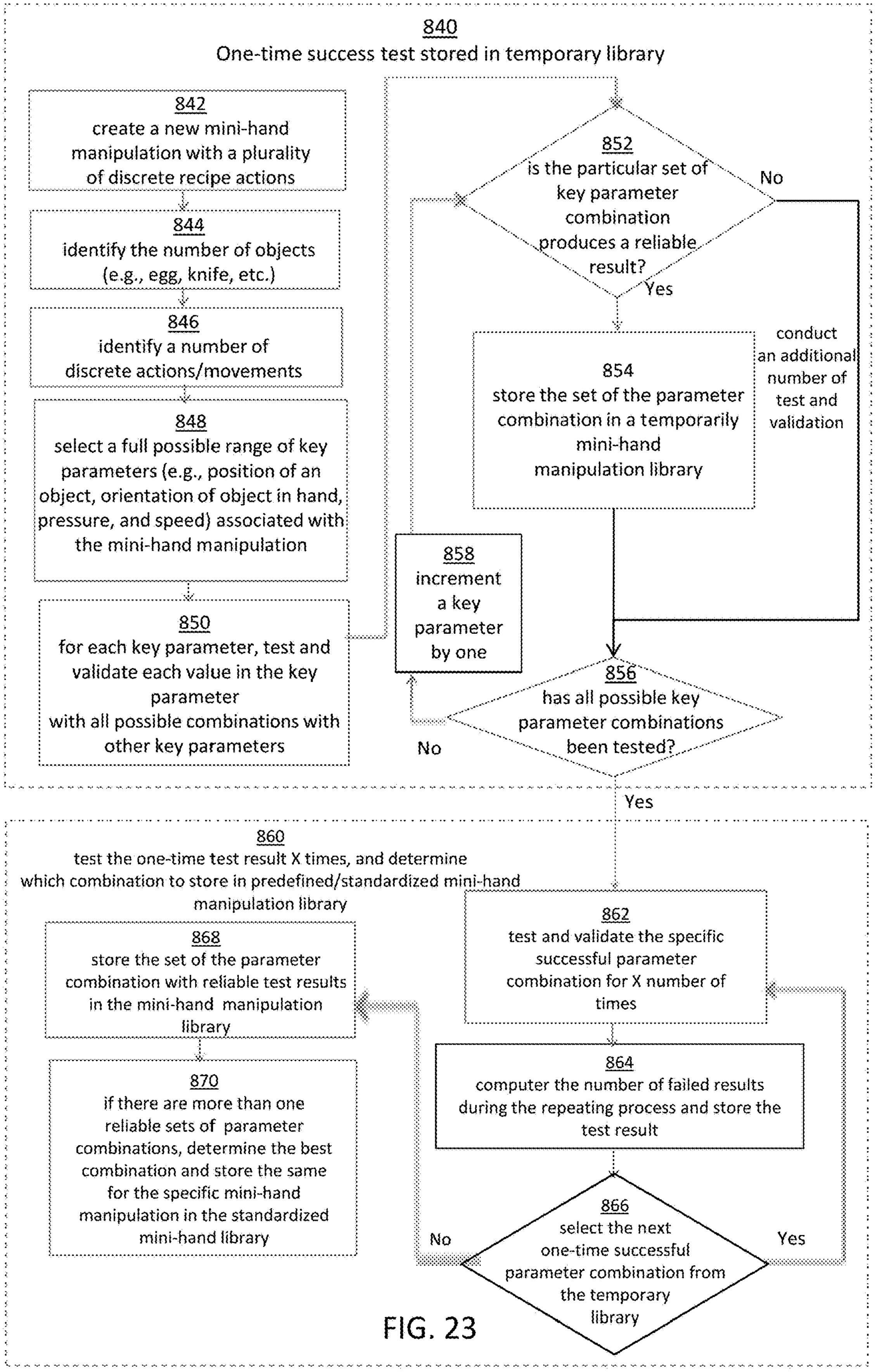
FIG. 23 is a flow diagram illustrating one embodiment of the software process for creating, testing, validating, and storing the various parameter combinations for a minimanipulation system in accordance with the present disclosure.

FIG. 23 is a flow diagram illustrating one embodiment of the software process for creating, testing, and validating, and storing the various parameter combinations for a minimanipulation library database 840. The minimanipulation library database 840 involves a one-time success test process 840 (e.g., holding an egg), which is stored in a temporary library, and testing the combination of one-time test results 860 (e.g., the entire movements of cracking an egg) in the minimanipulation database library. At step 842, the computer 16 creates a new minimanipulation (e.g., crack an egg) with a plurality of action primitives (or a plurality of discrete recipe actions). At step 844, the number of objects (e.g., an egg and a knife) associated with the new minimanipulation are identified. The computer 16 identifies a number of discrete actions or movements at step 846. At step 848, the computer selects a full possible range of key parameters (such as the positions of an object, the orientations of the object, pressure, and speed) associated with the particular new minimanipulation. At step 850, for each key parameter, the computer 16 tests and validates each value of the key parameters with all possible combinations with other key parameters (e.g., holding an egg in one position but testing other orientations). At step 852, the computer 16 is configured to determine if the particular set of key parameter combinations produces a reliable result. The validation of the result can be done by the computer 16 or a human. If the determination is negative, the computer 16 proceeds to step 856 to find if there are other key parameter combinations that have yet to be tested. At step 858, the computer 16 increments a key parameter by one in formulating the next parameter combination for further testing and evaluation for the next parameter combination. If the determination at step 852 is positive, the computer 16 then stores the set of successful key parameter combinations in a temporary location library at step 854. The temporary location library stores one or more sets of successful key parameter combinations (that have either the most successful or optimal test or have the least failed results).

At step 862, the computer 16 tests and validates the specific successful parameter combination for X number of times (such as one hundred times). At step 864, the computer 16 computes the number of failed results during the repeated test of the specific successful parameter combination. At step 866, the computer 16 selects the next one-time successful parameter combination from the temporary library, and returns the process back to step 862 for testing the next one-time successful parameter combination X number of times. If no further one-time successful parameter combination remains, the computer 16 stores the test results of one or more sets of parameter combinations that produce a reliable (or guaranteed) result at step 868. If there are more than one reliable sets of parameter combinations, at step 870, the computer 16 determines the best or optimal set of parameter combinations and stores the optimal set of parameter combination which is associated with the specific minimanipulation for use in the minimanipulation library database by the robotic apparatus 75 in the standardized robotic kitchen 50 during the food preparation stages of a recipe.

Figure 24:
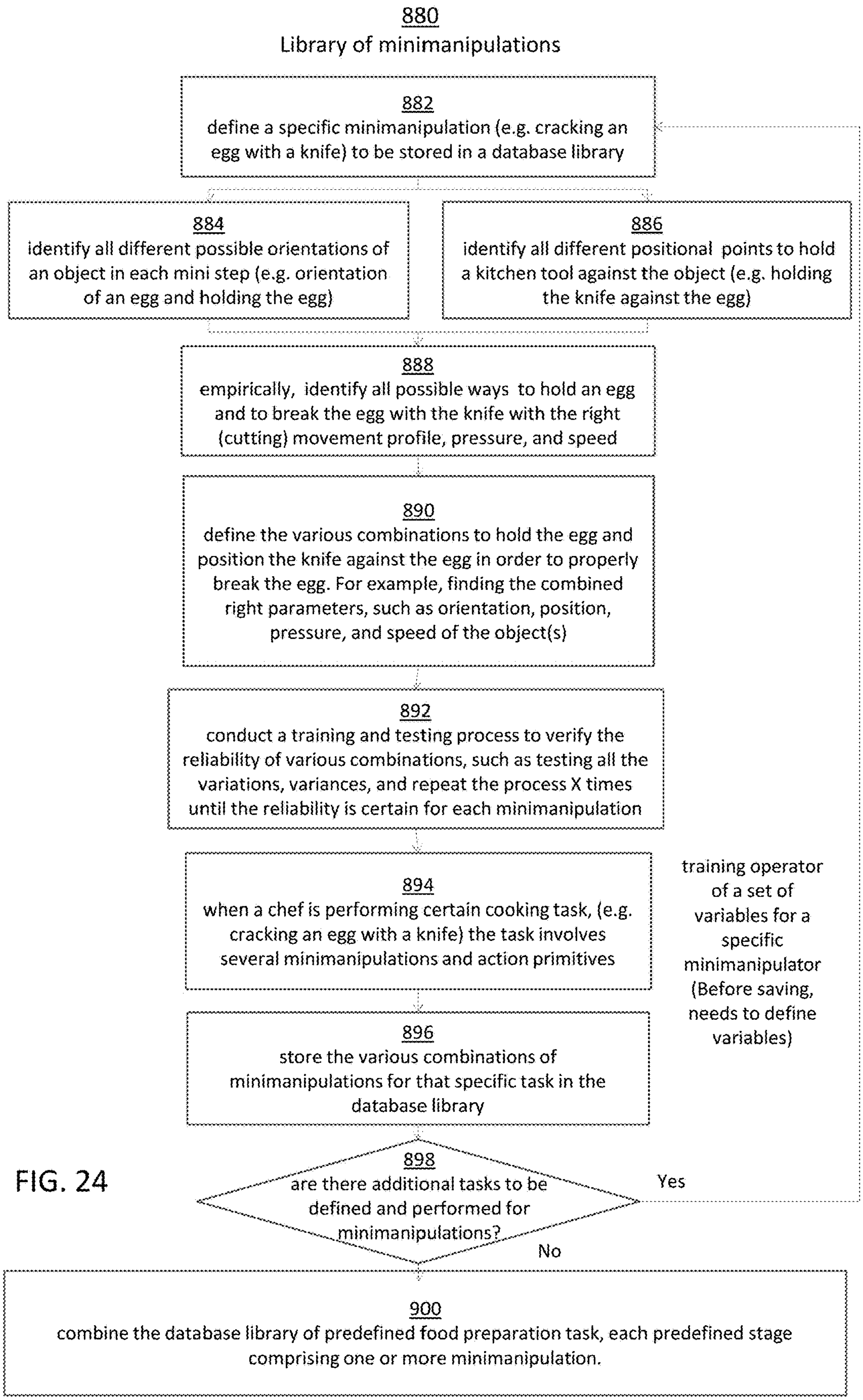
FIG. 24 is a flow diagram illustrating one embodiment of the software process for creating the tasks for a minimanipulation system in accordance with the present disclosure.

FIG. 24 is a flow diagram illustrating one embodiment of the software process 880 for creating the tasks for a minimanipulation. At step 882, the computer 16 defines a specific robotic task (e.g. cracking an egg with a knife) with a robotic mini hand manipulator to be stored in a database library. The computer at step 884 identifies all different possible orientations of an object in each mini step (e.g. orientation of an egg and holding the egg) and at step 886 identifies all different positional points to hold a kitchen tool against the object (e.g. holding the knife against the egg). At step 888, the computer empirically identifies all possible ways to hold an egg and to break the egg with the knife with the right (cutting) movement profile, pressure, and speed. At step 890, the computer 16 defines the various combinations to hold the egg and positioning of the knife against the egg in order to properly break the egg (for example, finding the combination of optimal parameters such as orientation, position, pressure, and speed of the object(s)). At step 892, the computer 16 conducts training and testing process to verify the reliability of various combinations, such as testing all the variations, variances, and repeats the process X times until the reliability is certain for each minimanipulation. When the chef 49 is performing certain food preparation task, (e.g. cracking an egg with a knife) the task is translated to several steps/tasks of mini-hand manipulation to perform as part of the task at step 894. At step 896, the computer 16 stores the various combinations of minimanipulations for that specific task in the database library. At step 898, the computer 16 determines whether there are additional tasks to be defined and performed for any minimanipulations. The process returns to step 882 if there are any additional minimanipulations to be defined. Different embodiments of the kitchen module are possible, including a standalone kitchen module and an integrated robotic kitchen module. The integrated robotic kitchen module is fitted into a conventional kitchen area of a typical house. The robotic kitchen module operates in at least two modes, a robotic mode and a normal (manual) mode. Cracking an egg is one example of a minimanipulation. The minimanipulation library database would also apply to a wide a variety of tasks, such as using a fork to grab a slab of beef by applying the right pressure in the right direction and to the proper depth to the shape and depth of the meat. At step 900, the computer combines the database library of predefined kitchen tasks, where each predefined kitchen task comprises one or more minimanipulations.

Figure 25:
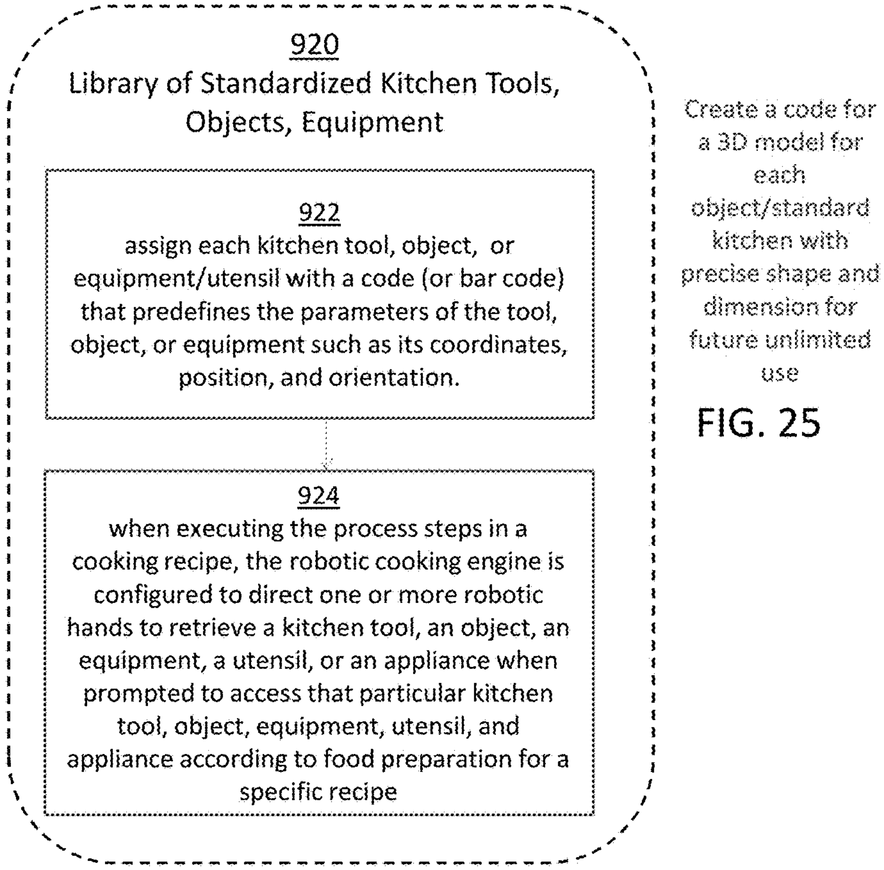
FIG. 25 is a flow diagram illustrating the process of assigning and utilizing a library of standardized kitchen tools, standardized objects, and standardized equipment in a standardized robotic kitchen in accordance with the present disclosure.

FIG. 25 is a flow diagram illustrating the process 920 of assigning and utilizing a library of standardized kitchen tools, standardized objects, and standardized equipment in a standardized robotic kitchen. At step 922, the computer 16 assigns each kitchen tool, object, or equipment/utensil with a code (or bar code) that predefines the parameters of the tool, object, or equipment such as its three-dimensional position coordinates and orientation. This process standardizes the various elements in the standardized robotic kitchen 50, including but not limited to: standardized kitchen equipment, standardized kitchen tools, standardized knifes, standardized forks, standardized containers, standardized pans, standardized appliances, standardized working spaces, standardized attachments, and other standardized elements. When executing the process steps in a cooking recipe, at step 924, the robotic cooking engine is configured to direct one or more robotic hands to retrieve a kitchen tool, an object, a piece of equipment, a utensil, or an appliance when prompted to access that particular kitchen tool, object, equipment, utensil or appliance, according to the food preparation process for a specific recipe.

Figure 26:
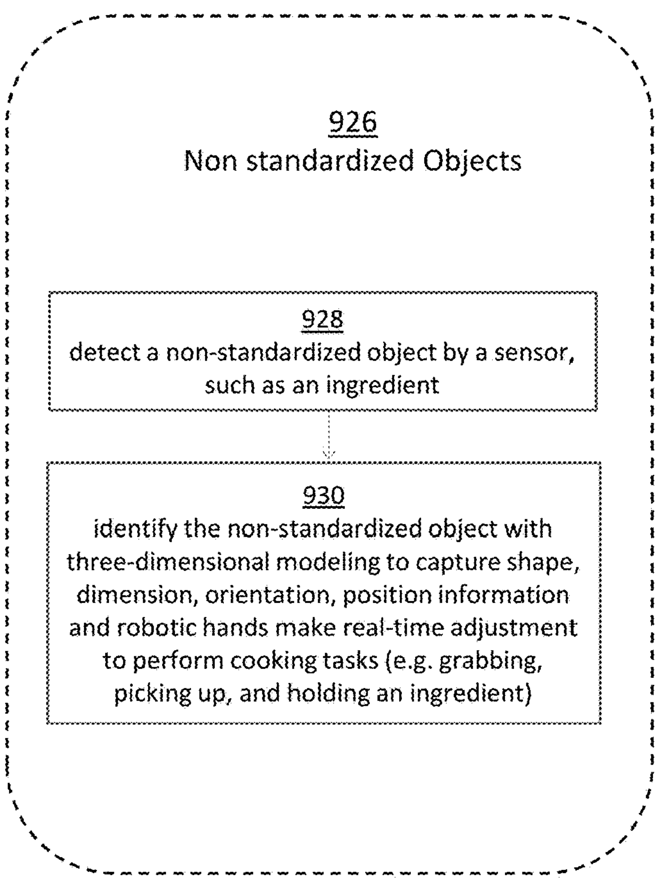
FIG. 26 is a flow diagram illustrating the process of identifying a non-standardized object with three-dimensional modeling in accordance with the present disclosure.

FIG. 26 is a flow diagram illustrating the process 926 of identifying a non-standard object through three-dimensional modeling and reasoning. At step 928, the computer 16 detects a non-standard object by a sensor, such as an ingredient that may have a different size, different dimensions, and/or different weight. At step 930, the computer 16 identifies the non-standard object with three-dimensional modeling sensors 66 to capture shape, dimensions, orientation and position information and robotic hands 72 make a real-time adjustment to perform the appropriate food preparation tasks (e.g. cutting or picking up a piece of steak).

Figure 27:
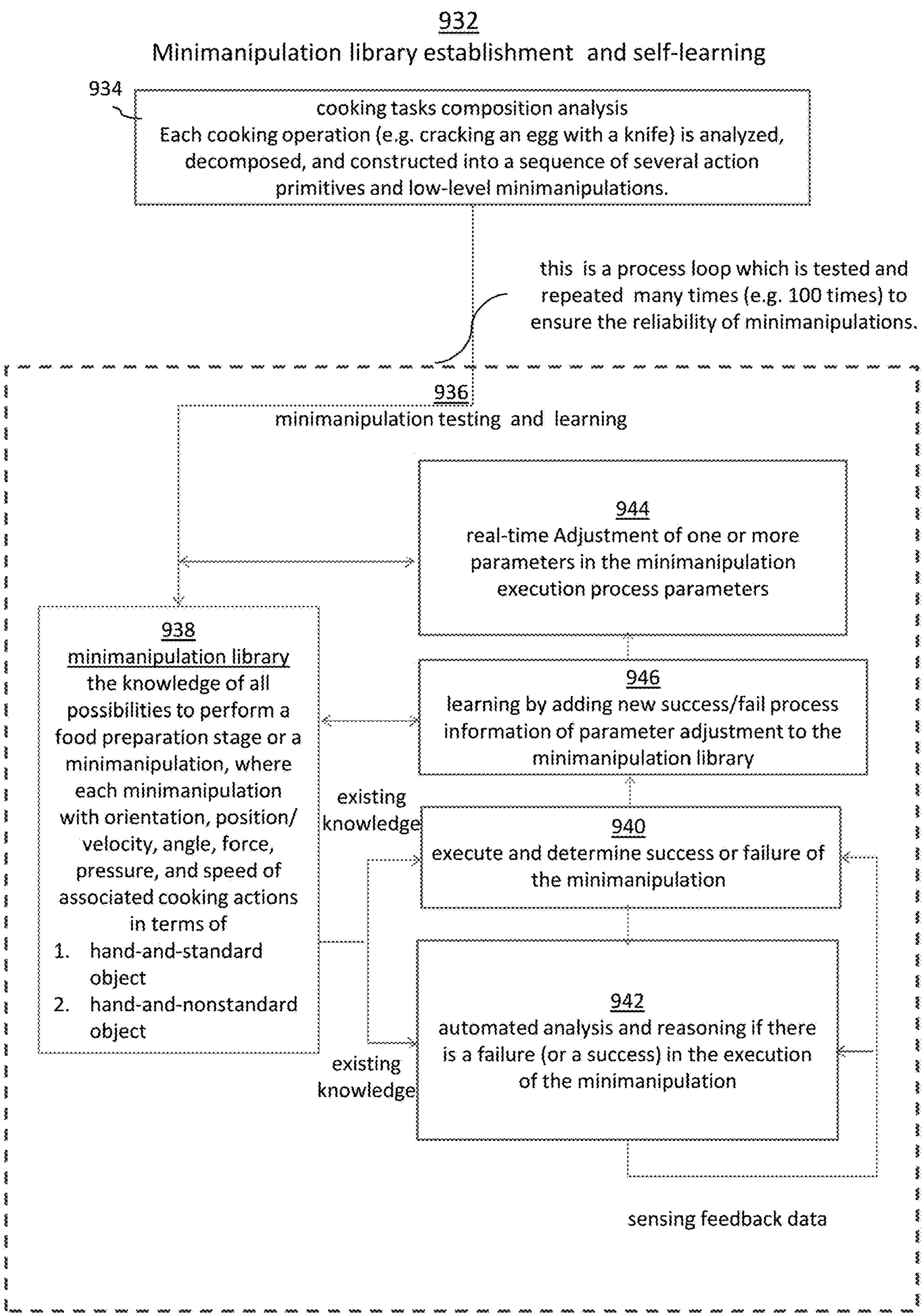
FIG. 27 is a flow diagram illustrating the process for testing and learning of minimanipulations in accordance with the present disclosure.

FIG. 27 is a flow diagram illustrating the process 932 for testing and learning of minimanipulations. At step 934, the computer performs a food preparation task composition analysis in which each cooking operation (e.g. cracking an egg with a knife) is analyzed, decomposed, and constructed into a sequence of action primitives or minimanipulations. In one embodiment, a minimanipulation refers to a sequence of one or more action primitives that accomplish a basic functional outcome (e.g., the egg has been cracked, or a vegetable sliced) that advances toward a specific result in preparing a food dish. In this embodiment, a minimanipulation can be further described as a low-level minimanipulation or a high-level minimanipulation where a low-level minimanipulation refers to a sequence of action primitives that requires minimal interaction forces and relies almost exclusively on the use of the robotic apparatus 75, and a high-level minimanipulation refers to a sequence of action primitives requiring a substantial amount of interaction and interaction forces and control thereof. The process loop 936 focuses on minimanipulation and learning steps and comprises tests, which are repeated many times (e.g. 100 times) to ensure the reliability of minimanipulations. At step 938, the robotic food preparation engine 56 is configured to assess the knowledge of all possibilities to perform a food preparation stage or a minimanipulation, where each minimanipulation is tested with respect to orientations, positions/velocities, angles, forces, pressures, and speeds with a particular minimanipulation. A minimanipulation or an action primitive may involve the robotic hand 72 and a standard object, or the robotic hand 72 and a nonstandard object. At step 940, the robotic food preparation engine 56 is configured to execute the minimanipulation and determine if the outcome can be deemed successful or a failure. At step 942, the computer 16 conducts an automated analysis and reasoning about the failure of the minimanipulation. For example, the multimodal sensors may provide sensing feedback data on the success or failure of the minimanipulation. At step 944, the computer 16 is configured to make a real-time adjustment and adjusts the parameters of the minimanipulation execution process. At step 946, the computer 16 adds new information about the success or failure of the parameter adjustment to the minimanipulation library as a learning mechanism to the robotic food preparation engine 56.

Figure 28:
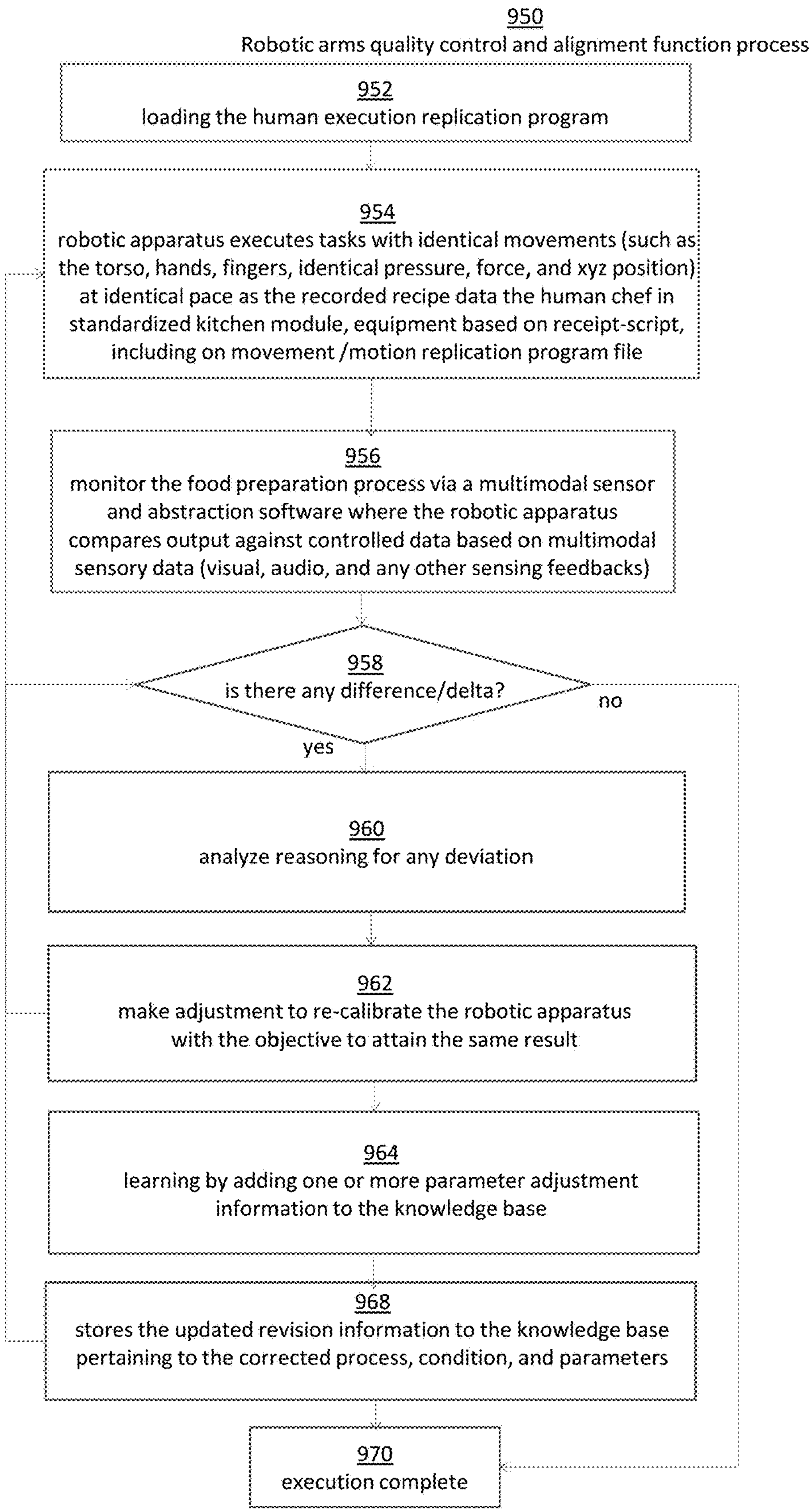
FIG. 28 is a flow diagram illustrating the process for robotic arms quality control and alignment function process in accordance with the present disclosure.

FIG. 28 is a flow diagram illustrating the process 950 for quality control and alignment functions for robotic arms. At step 952, the robotic food preparation engine 56 loads a human chef replication software recipe file 46 via the input module 50. For example, the software recipe file 46 to replicate food preparation from Michelin starred chef Arnd Beuchel's "Wiener Schnitzel". At step 954, the robotic apparatus 75 executes tasks with identical movements such as those for the torso, hands, fingers, with identical pressure, force and xyz position, at an identical pace as the recorded recipe data stored based on the actions of the human chef preparing the same recipe in a standardized kitchen module with standardized equipment based on the stored receipt-script including all movement/motion replication data. At step 956, the computer 16 monitors the food preparation process via a multimodal sensor that generates raw data supplied to abstraction software where the robotic apparatus 75 compares real-world output against controlled data based on multimodal sensory data (visual, audio, and any other sensory feedback). At step 958, the computer 16 determines if there any differences between the controlled data and the multimodal sensory data. At step 960, the computer 16 analyzes whether the multimodal sensory data deviates from the controlled data. If there is a deviation, at step 962, the computer 16 makes an adjustment to re-calibrate the robotic arm 70, the robotic hand 72, or other elements. At step 964, the robotic food preparation engine 16 is configured to learn in process 964 by adding the adjustment made to one or more parameter values to the knowledge database. At step 968, the computer 16 stores the updated revision information to the knowledge database pertaining to the corrected process, condition, and parameters. If there is no difference in deviation from step 958, the process 950 goes directly to step 970 in completing the execution.

FIG. 29 is a table illustrating one embodiment of a database library structure 972 of minimanipulation objects for use in the standardized robotic kitchen. The database library structure 972 shows several fields for entering and storing information for a particular minimanipulation, including (1) the name of the minimanipulation, (2) the assigned code of the minimanipulation, (3) the code(s) of standardized equipment and tools associated with the performance of the minimanipulation, (4) the initial position and orientation of the manipulated (standard or non-standard) objects (ingredients and tools), (5) parameters/variables defined by the user (or extracted from the recorded recipe during execution), (6) sequence of robotic hand movements (control signals for all servos) and connecting feedback parameters (from any sensor or video monitoring system) of minimanipulations on the timeline. The parameters for a particular minimanipulation may differ depending on the complexity and objects that are necessary to perform the minimanipulation. In this example, four parameters are identified: the starting XYZ position coordinates in the volume of the standardized kitchen module, the speed, the object size, and the object shape. Both the object size and the object shape may be defined or described by non-standard parameters.

FIG. 30 is a table illustrating a database library structure 974 of standard objects for use in the standardized robotic kitchen 50, which contains three-dimensional models of standard objects. The standard object database library structure 974 shows several fields to store information pertaining to a standard object, including (1) the name of an object, (2) an image of the object, (3) an assigned code for the object, (4) a virtual 3D model with full dimensions of the object in an XYZ coordinate-matrix with the preferred resolution predefined, (5) a virtual vector model of the object (if available), (6) definition and marking of the working elements of the object (the elements, which may be in contact with hands and other objects for manipulation), and (7) an initial standard orientation of the object for each specific manipulation. The sample database structure 974 of an electronic library contains three-dimensional models of all standard objects (i.e., all kitchen equipment, kitchen tools, kitchen appliances, containers), which is part of the overall standardized kitchen module 50. The three-dimensional models of standard objects can be visually captured by a three-dimensional camera and store in the database library structure 974 for subsequent use.

Figure 31:
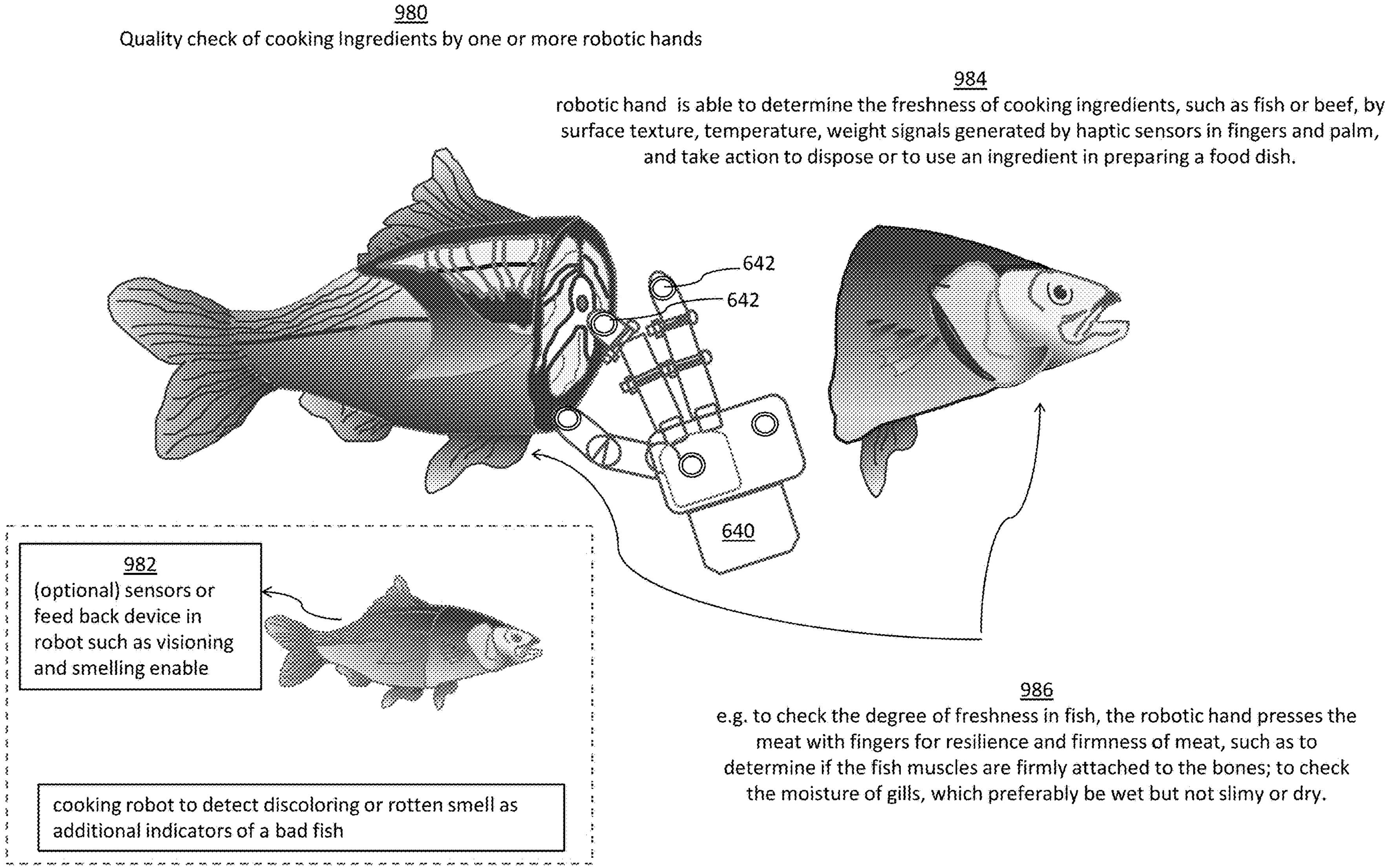
FIG. 31 is a pictorial diagram illustrating a robotic hand for conducting quality check of fish in accordance with the present disclosure.

FIG. 31 depicts the execution of process 980 by using the robotic hand 640 with one or more sensors 642 to check for the quality of the ingredients as part of the recipe replication process by the standardized robotic kitchen. The multi-modal sensor system video-sensing element is able to implement process 982, which uses color-detection and spectral analysis to detect discoloration indicating possible spoilage. Similarly using an ammonia-sensitive sensor system, whether embedded in the kitchen or part of a mobile probe handled by the robotic hands, further potential for spoilage can be detected. Additional haptic sensors in the robotic hands and fingers would allow for validating the freshness of the ingredient through the touch-sensing process 984, where the firmness and resistance to contact forces is measured (amount and rate of deflection as a function of compression-distance). As an example, for fish the color (deep red) and moisture content of the gills is an indicator of freshness, as the eyes which should be clear (not fogged), and the proper temperature of the flesh of a properly thawed fish should not exceed 40 degrees Fahrenheit. Additional contact-sensors on the finger-tips are able to carry out additional quality check 986 related to the temperature, texture and overall weight of the ingredient through touching, rubbing and holding/pickup motions. All the data collected through these haptic sensors and video-imagery can be used in a processing algorithm to decide on the freshness of the ingredient and make decisions on whether to use it or dispose of it.

Figure 32:
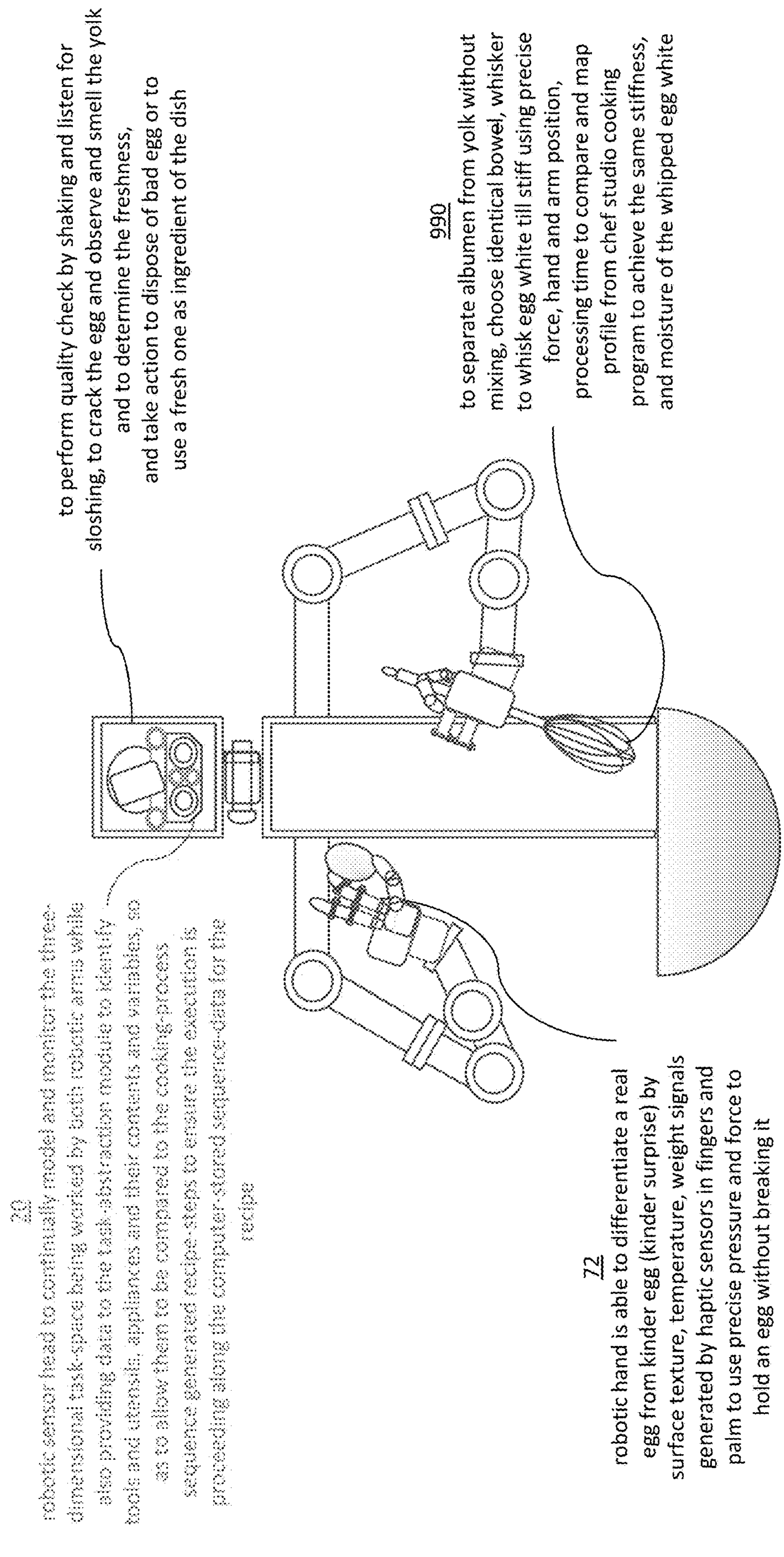
FIG. 32 is a pictorial diagram illustrating a robotic sensor head for conducting quality check in a bowl in accordance with the present disclosure.

FIG. 32 depicts the robotic recipe-script replication process 988, wherein a multi-modal sensor outfitted head 20, and dual arms with multi-fingered hands 72 holding ingredients and utensils, interact with cookware 990. The robotic sensor head 20 with a multi-modal sensor unit is used to continually model and monitor the three-dimensional task-space being worked by both robotic arms while also providing data to the task-abstraction module to identify tools and utensils, appliances and their contents and variables, so as to allow them to be compared to the cooking-process sequence generated recipe-steps to ensure the execution is proceeding along the computer-stored sequence-data for the recipe. Additional sensors in the robotic sensor head 20 are used in the audible domain to listen and smell during significant parts of the cooking process. The robotic hands 72 and their haptic sensors are used to handle respective ingredients properly, such as an egg in this case; the sensors in the fingers and palm are able to for example detect a usable egg by way of surface texture and weight and its distribution and hold and orient the egg without breaking it. The multi-fingered robotic hands 72 are also capable of fetching and handling particular cookware, such as a bowl in this case, and grab and handle cooking utensils (a whisk in this case), with proper motions and force application so as to properly process food ingredients (e.g. cracking an egg, separating the yolks and beating the egg-white until a stiff composition is achieved) as specified in the recipe-script.

Figure 33:
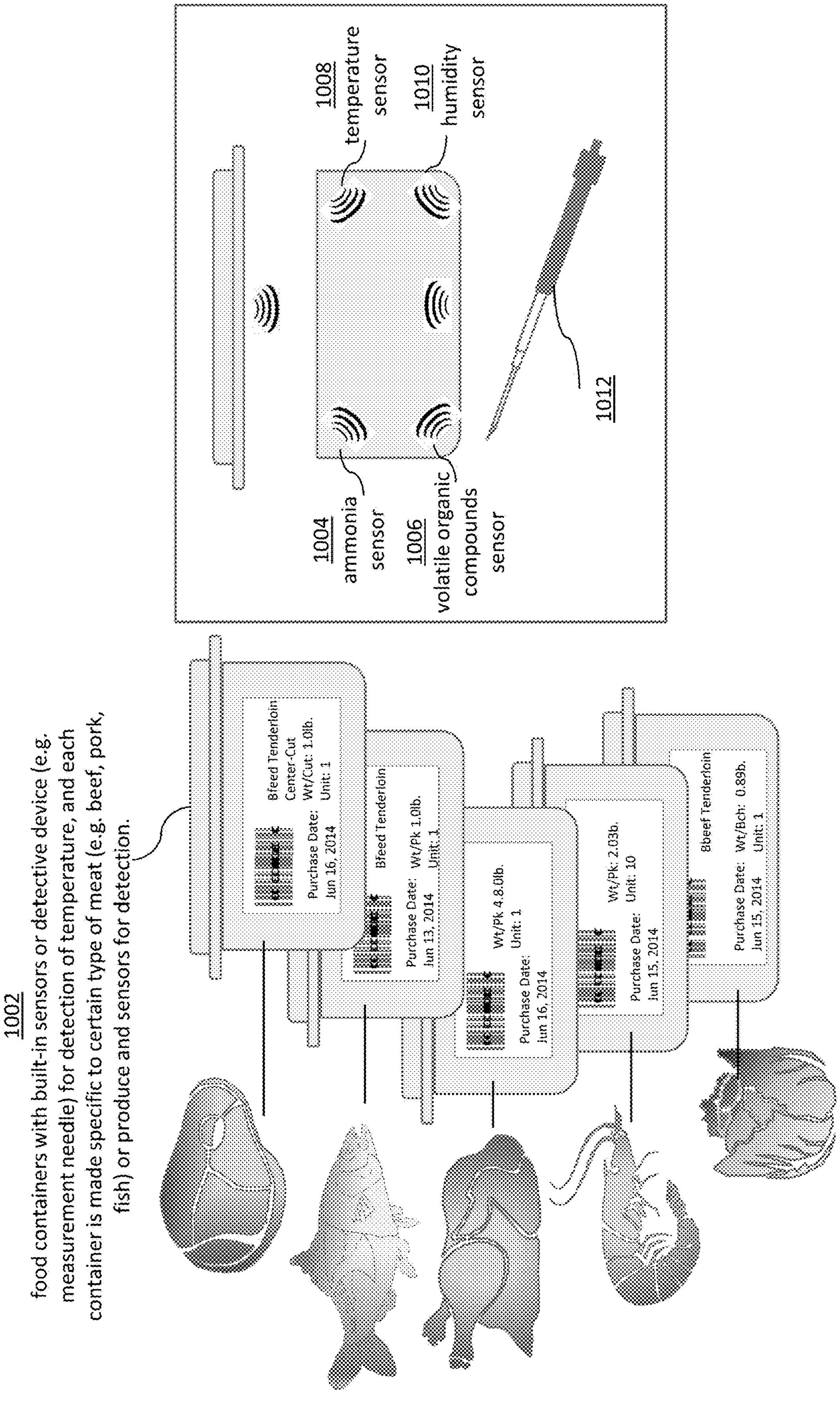
FIG. 33 is a pictorial diagram illustrating a detection device or container with a sensor for determining the freshness and quality of food in accordance with the present disclosure.

FIG. 33 depicts the ingredient storage system notion 1000, wherein food storage containers 1002, capable of storing any of the needed cooking ingredients (e.g. meats, fish, poultry, shellfish, vegetables, etc.), are outfitted with sensors to measure and monitor the freshness of the respective ingredient. The monitoring sensors embedded in the food storage containers 1002 include, but are not limited to, ammonia sensors 1004, volatile organic compound sensors 1006, internal container temperature sensors 1008 and humidity sensors 1010. Additionally a manual probe (or detection device) 1012 with one or more sensors can be used, whether employed by the human chef or the robotic arms and hands, to allow for key measurements (such as temperature) within a volume of a larger ingredient (e.g. internal meat temperature).

Figure 34:
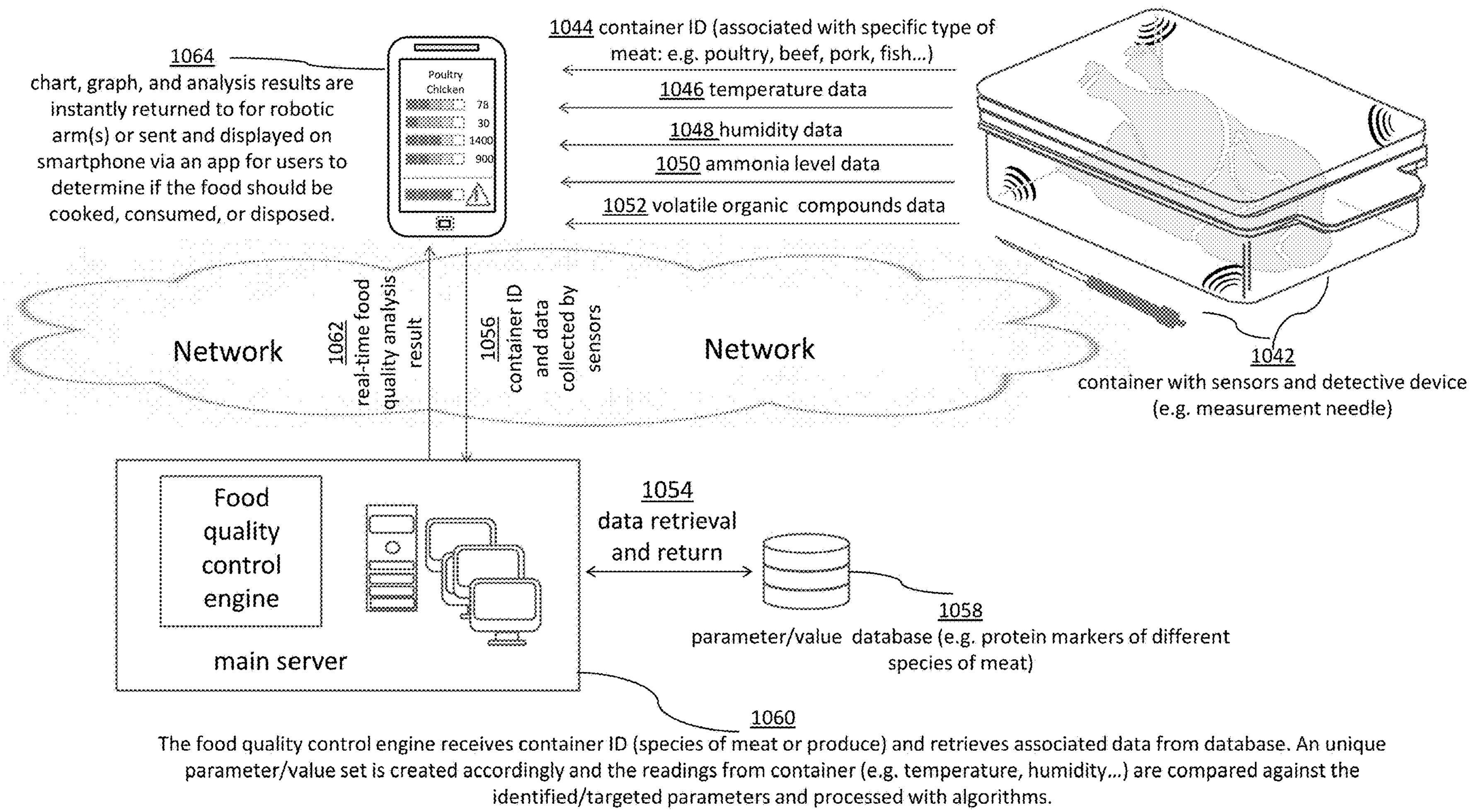
FIG. 34 is a system diagram illustrating an online analysis system for determining the freshness and quality of food in accordance with the present disclosure.

FIG. 34 depicts the measurement and analysis process 1040 carried out as part of the freshness and quality check for ingredients placed in food storage containers 1042 containing sensors and detection devices (e.g. a temperature probe/needle) for conducing online analysis for food freshness on cloud computing or a computer over the Internet or a computer network. A container is able to forward its data set by way of a metadata tag 1044, specifying its container-ID, and including the temperature data 1046, humidity data 1048, ammonia level data 1050, volatile organic compound data 1052 over a wireless data-network through a communication step 1056, to a main server where a food control quality engine processes the container data. The processing step 1060 uses the container-specific data 1044 and compares it to data-values and —ranges considered acceptable, which are stored and retrieved from media 1058 by a data retrieval and storage process 1054. A set of algorithms then make the decision as to the suitability of the ingredient, providing a real-time food quality analysis result over the data-network via a separate communication process 1062. The quality analysis results are then utilized in another process 1064, where the results are forwarded to the robotic arms for further action and may also be displayed remotely on a screen (such as a smartphone or other display) for a user to decide if the ingredient is to be used in the cooking process for later consumption or disposed of as spoiled.

Figure 35:
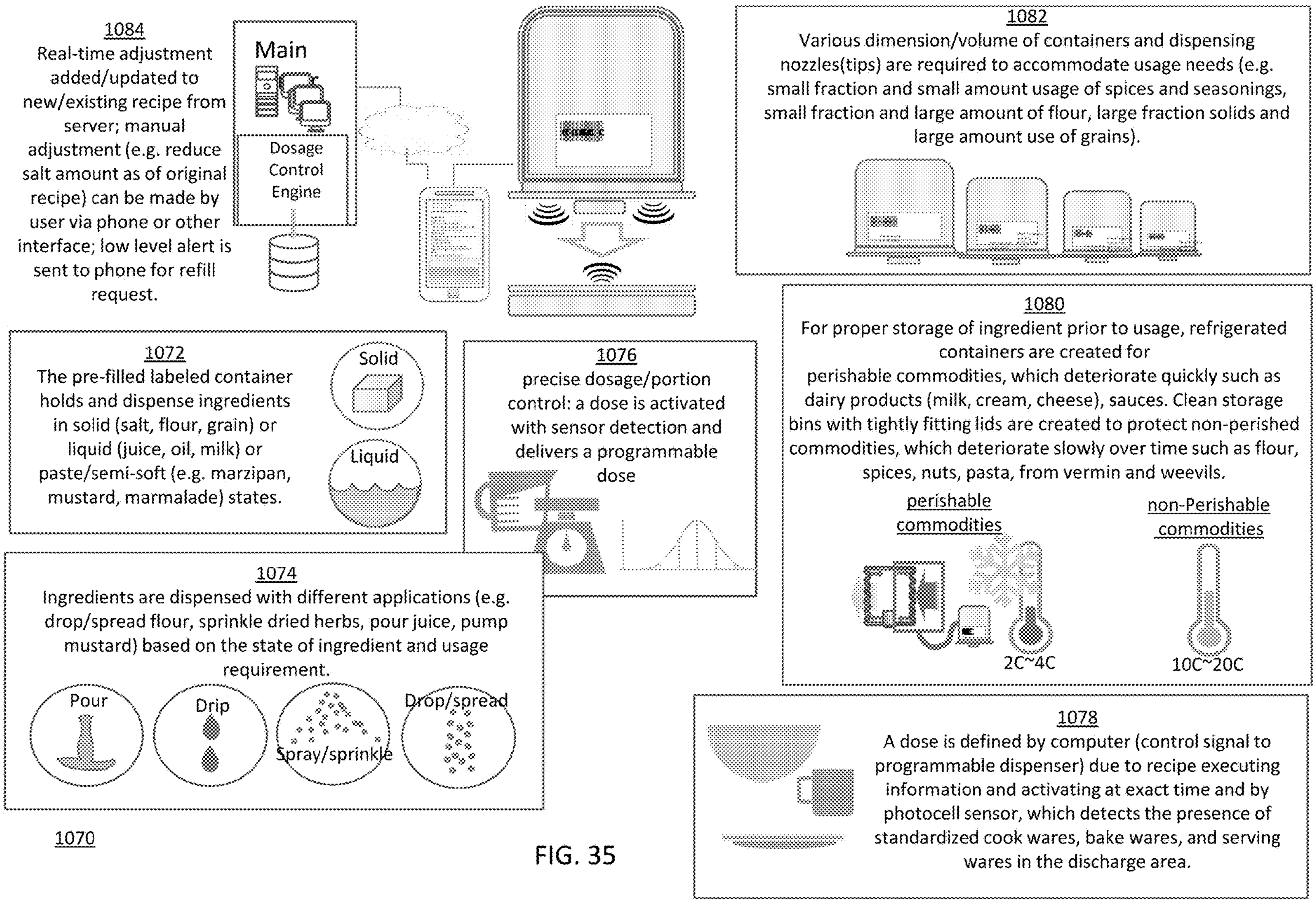
FIG. 35 is a block diagram illustrating pre-filled containers with programmable dispenser control in accordance with the present disclosure.

FIG. 35 depicts the functionalities and process-steps of pre-filled ingredient containers 1070 with one or more program dispenser controls for use in the standardized robotic kitchen 50, whether it be the standardized robotic kitchen or the chef studio. Ingredient containers 1070 are designed in different sizes 1082 and varied usages are suitable for proper storage environments 1080 to accommodate perishable items by way of refrigeration, freezing, chilling, etc. to achieve specific storage temperature ranges. Additionally, the pre-filled ingredient storage containers 1070 are also designed to suit different types of ingredients 1072, with containers already pre-labeled and pre-filled with solid (salt, flour, rice, etc.), viscous/pasty (mustard, mayonnaise, marzipan, jams, etc.) or liquid (water, oil, milk, juice, etc.) ingredients, where dispensing processes 1074 utilize a variety of different application devices (dropper, chute, peristaltic dosing pump, etc.) depending on the ingredient type, with exact computer-controllable dispensing by way of a dosage control engine 1084 running a dosage control process 1076 ensuring that the proper amount of ingredient is dispensed at the right time. It should be noted that the recipe-specified dosage is adjustable to suit personal tastes or diets (low sodium, etc.), by way of a menu-interface or even through a remote phone application. The dosage determination process 1078 is carried out by the dosage control engine 1084, based on the amount specified in the recipe, with dispensing occurring either through manual release command or remote computer control based on the detection of a particular dispensing container at the exit point of the dispenser.

Figure 36:
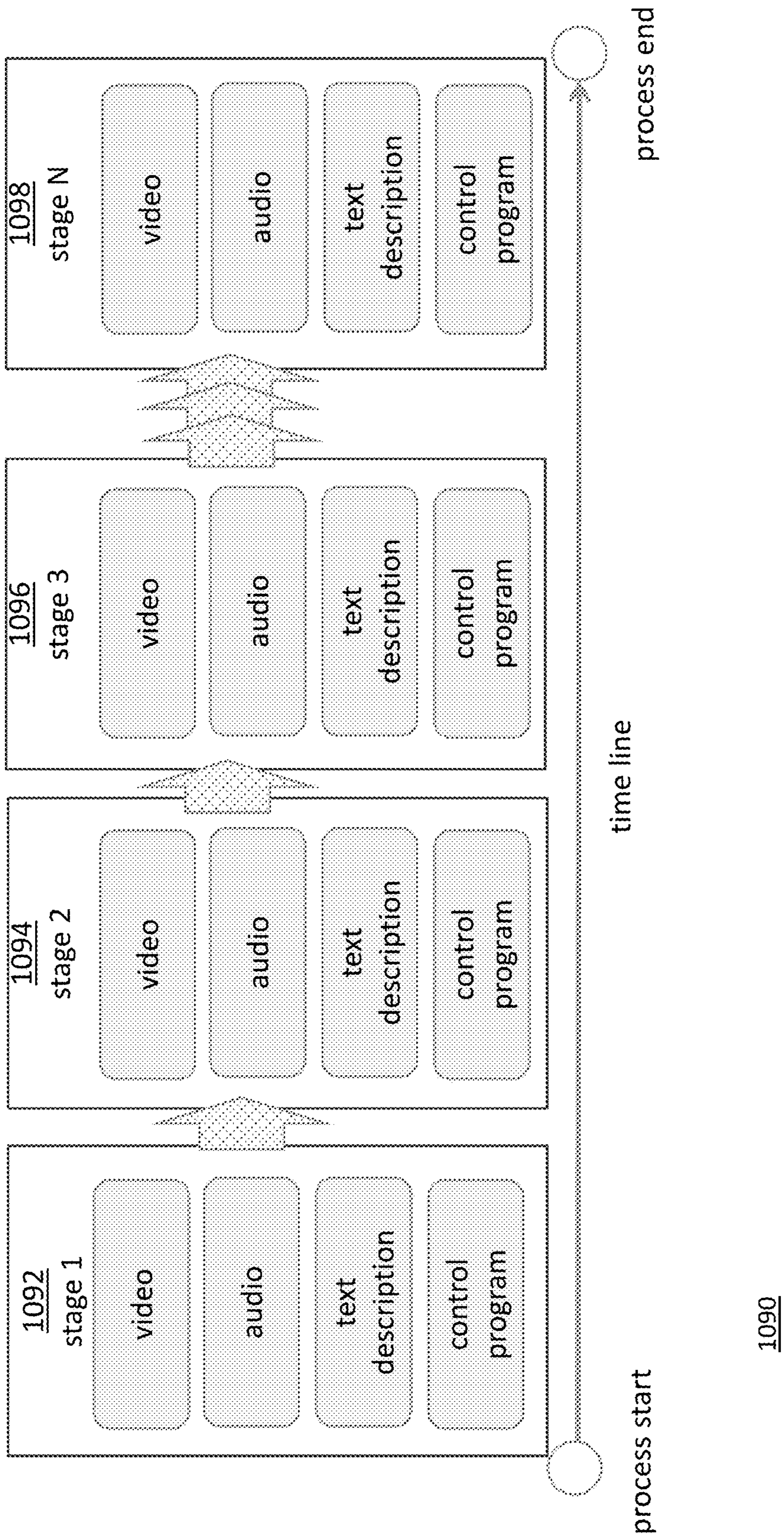
FIG. 36 is a block diagram illustrating recipe structure and process for food preparation in the standardized robotic kitchen in accordance with the present disclosure.

FIG. 36 is a block diagram illustrating a recipe structure and process 1090 for food preparation in the standardized robotic kitchen 50. The food preparation process 1090 is shown as divided into multiple stages along the cooking timeline, with each stage having or more raw data blocks for each stage 1092, stage 1094, stage 1096 and stage 1098. The data blocks can contain such elements as video-imagery, audio-recordings, textual descriptions, as well as the machine-readable and —understandable set of instructions and commands that form a part of the control program. The raw data set is contained within the recipe structure and representative of each cooking stage along a timeline divided into many time-sequenced stages, with varying levels of time-intervals and —sequences, all the way from the start of the recipe replication process to the end of the cooking process, or any sub-process therein.

Figure 37A:
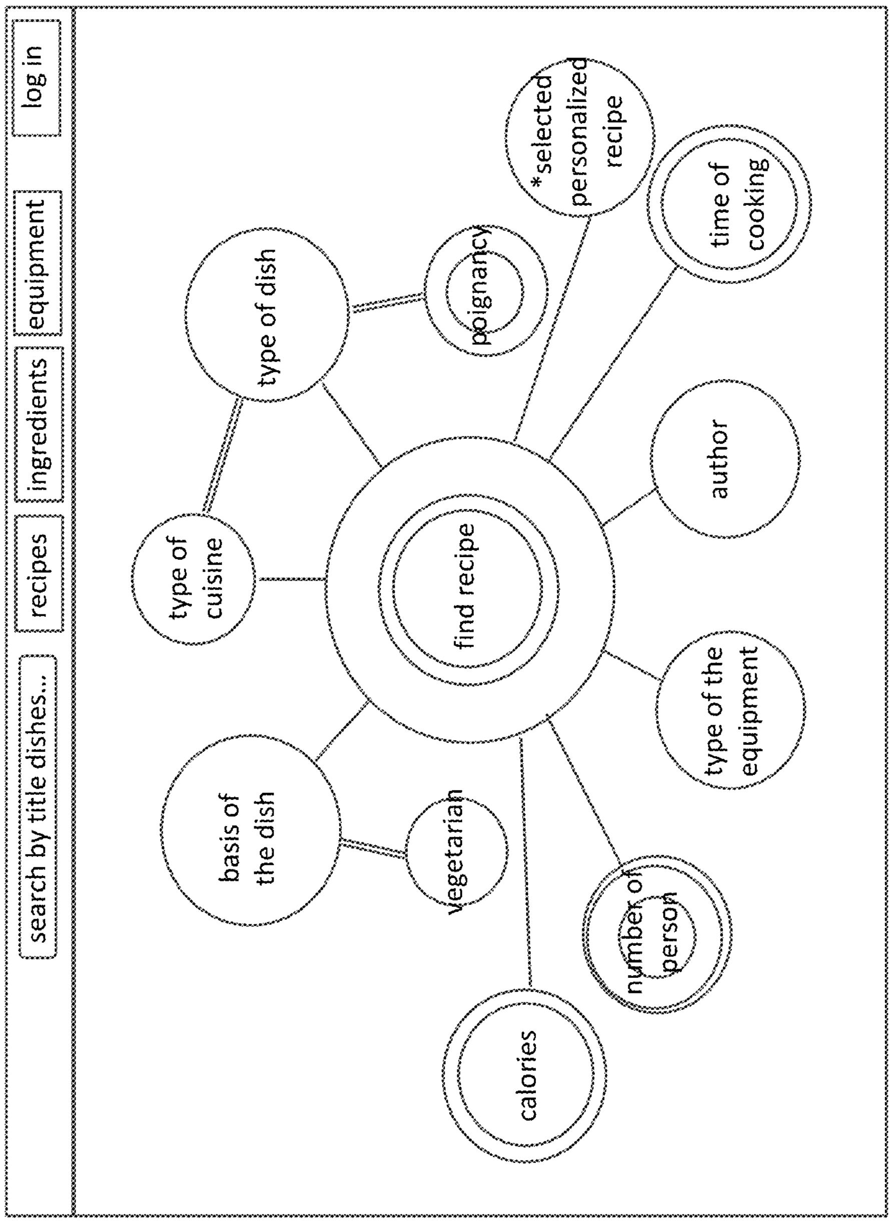
FIGS. 37A-C are block diagrams illustrating recipe search menus for use in the standardized robotic kitchen in accordance with the present disclosure.
Figure 37B:
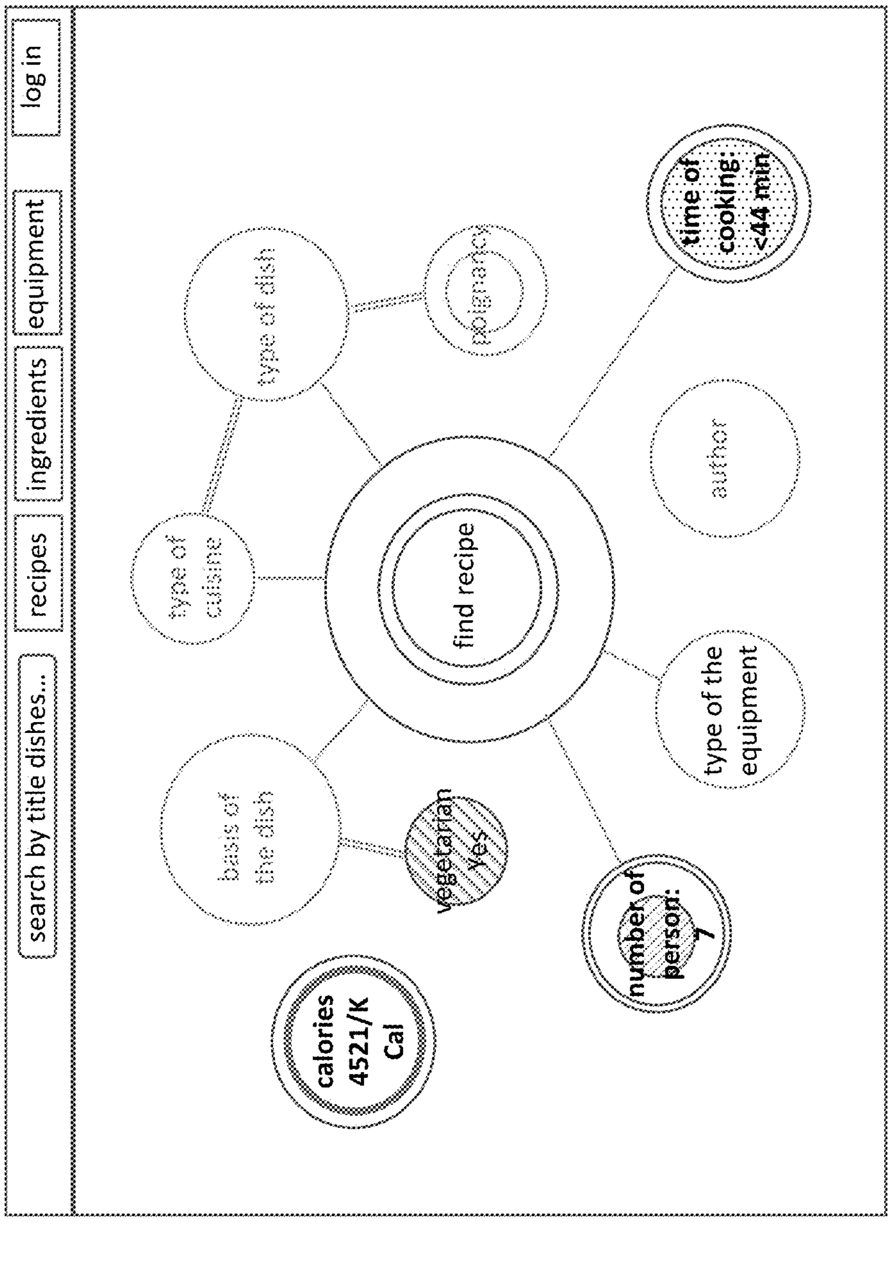
Figure 37C:
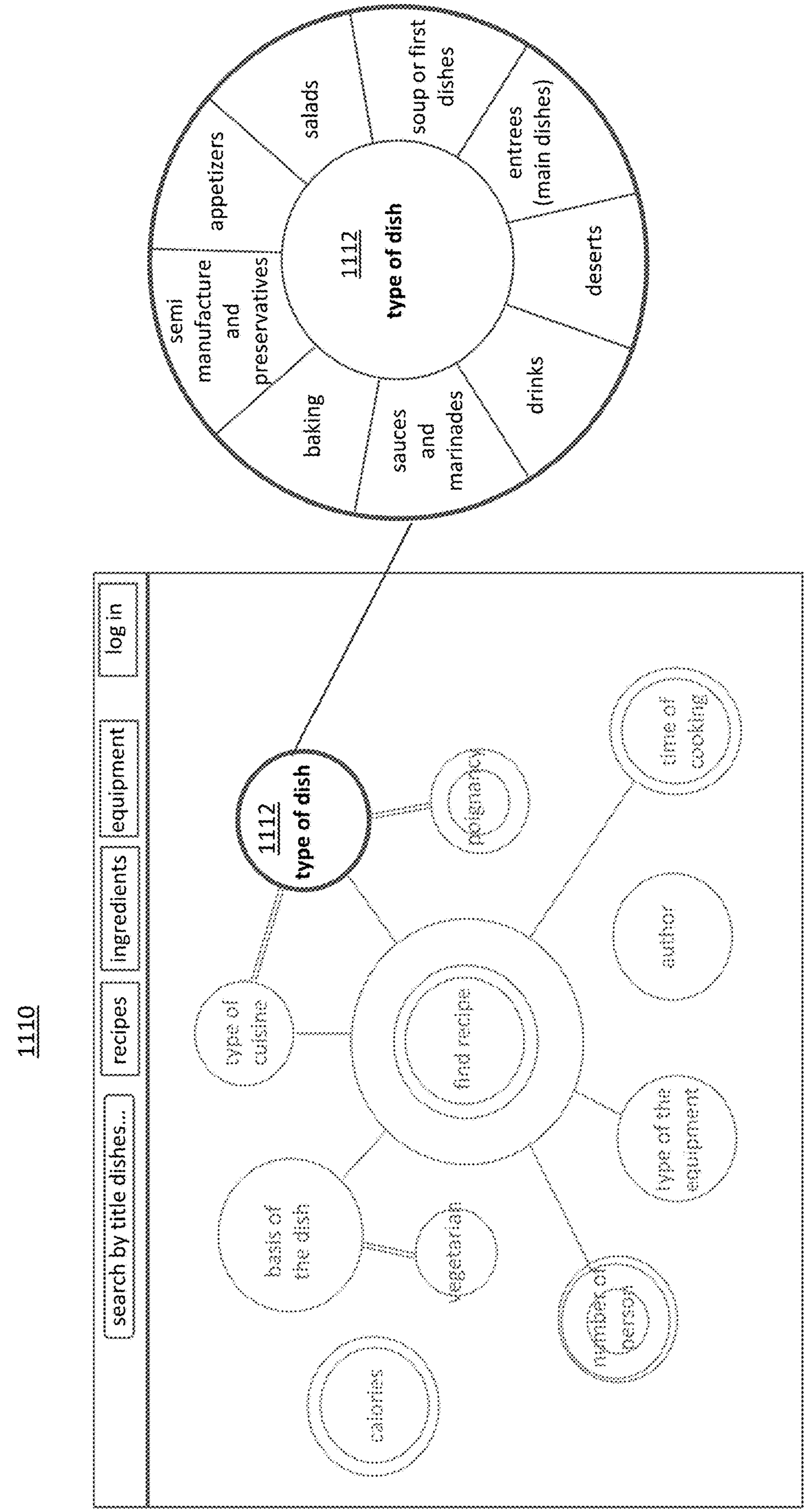
Figure 37D:
FIG. 37D is a screen shot of a menu with the option to create and submit a recipe in accordance with the present disclosure.
Figure 37E:
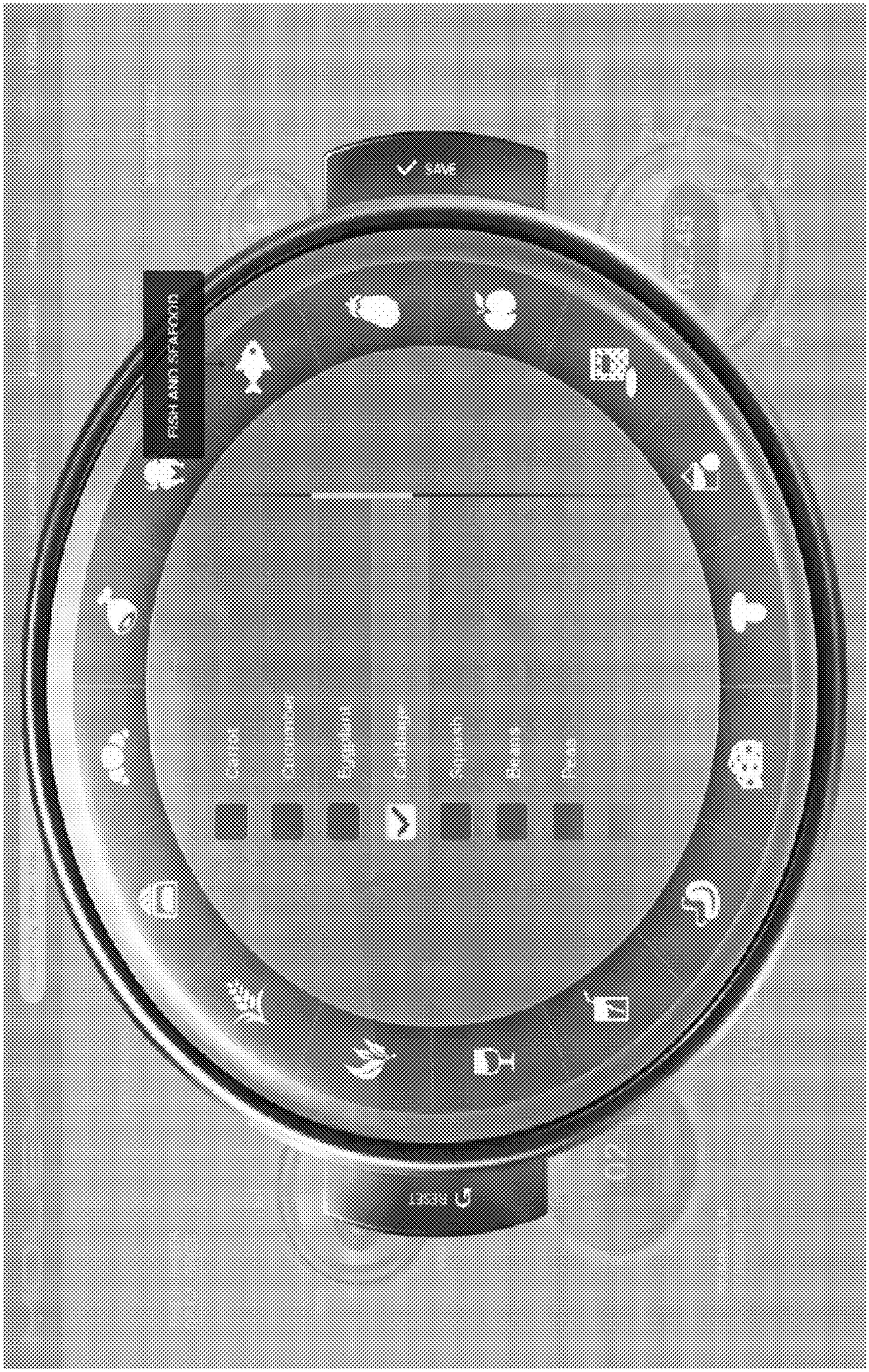
FIG. 37E is a screen shot depicting the types of ingredients.
Figure 37F:
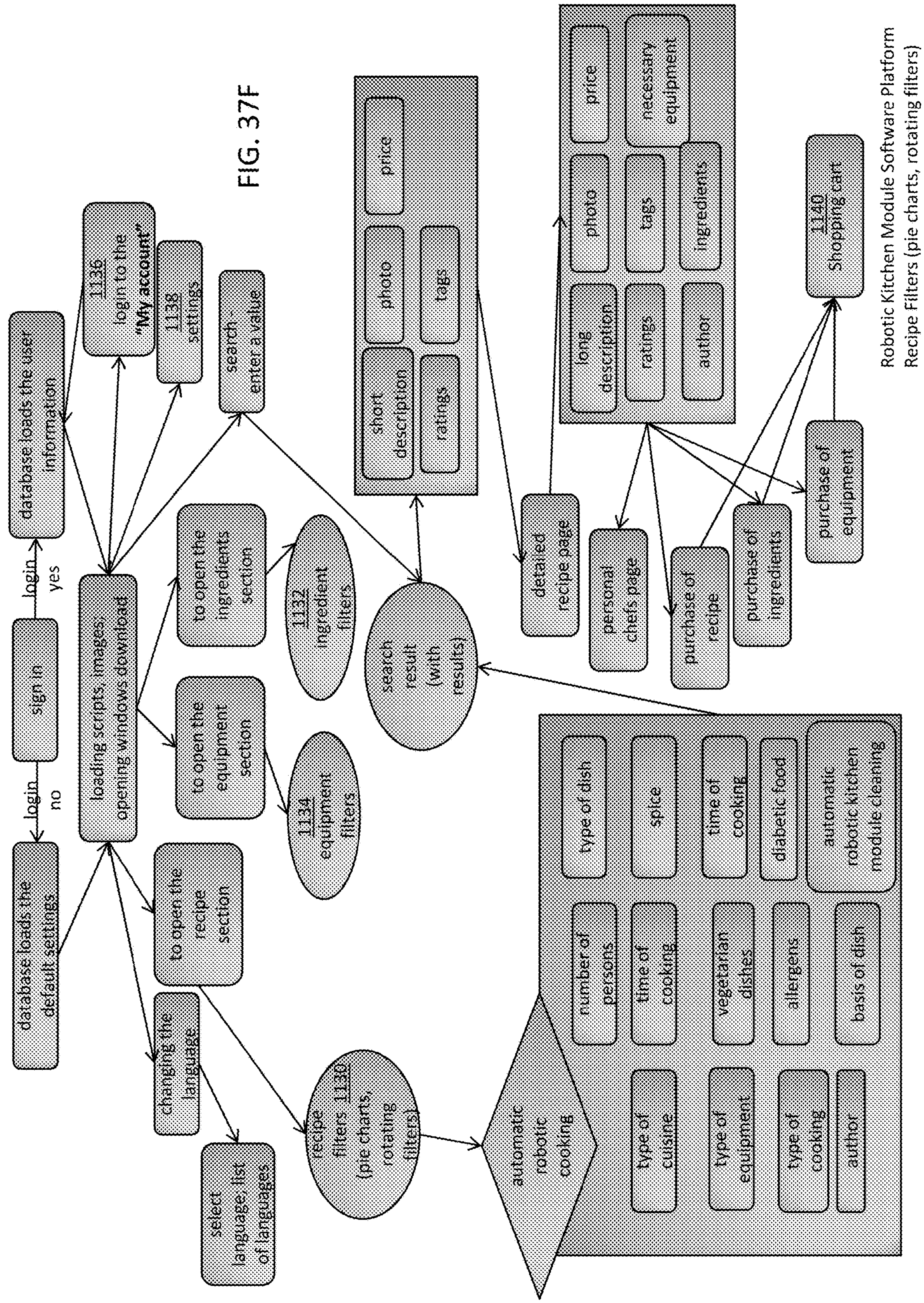
FIGS. 37F-N are flow diagrams illustrating one embodiment of the food preparation user interface with functional capabilities including a recipe filter, an ingredient filter, an equipment filter, an account and social network access, a personal partner page, a shopping cart page, and the information on the purchased recipe, registration setting, and creation of a recipe in accordance with the present disclosure.

FIGS. 37A-C are block diagrams illustrating recipe search menus for use in the standardized robotic kitchen. As shown in FIG. 37A, a recipe search menu 1110 provides most popular categories such as type of cuisine (e.g. Italian, French, Chinese), the basis of ingredients of the dish (e.g. fish, pork, beef, pasta), or criteria and range such as cooking time range (e.g. less than 60 minutes, between 20 to 40 minutes) as well as conducting a keyword search (e.g. ricotta cavatelli, migliaccio cake). A selected personalized recipe may exclude a recipe with allergic ingredients in which a user can indicate allergic ingredients that the user may refrain from in a personal user profile, which can be defined by a user or from another source. In FIG. 37B, the user may select a search criteria, including the requirements of a cooking time less than 44 minutes, serving sufficient portions for 7 people, providing vegetarian dish options, with a total calories of 4521 or less, as shown in this figure. The different types of dishes 1112 are shown in FIG. 37C where menu 1110 has hierarchical levels such that the user may select a category (e.g. type of dish) 1112, which then expands to the next level sub-categories (e.g. appetizers, salads, entrees) to refine the selections. A screen shot of an implemented recipe creation and submission is illustrated in FIG. 37D. Another screen shot depicting the types of ingredients is shown in FIG. 37E.

Figure 37G:
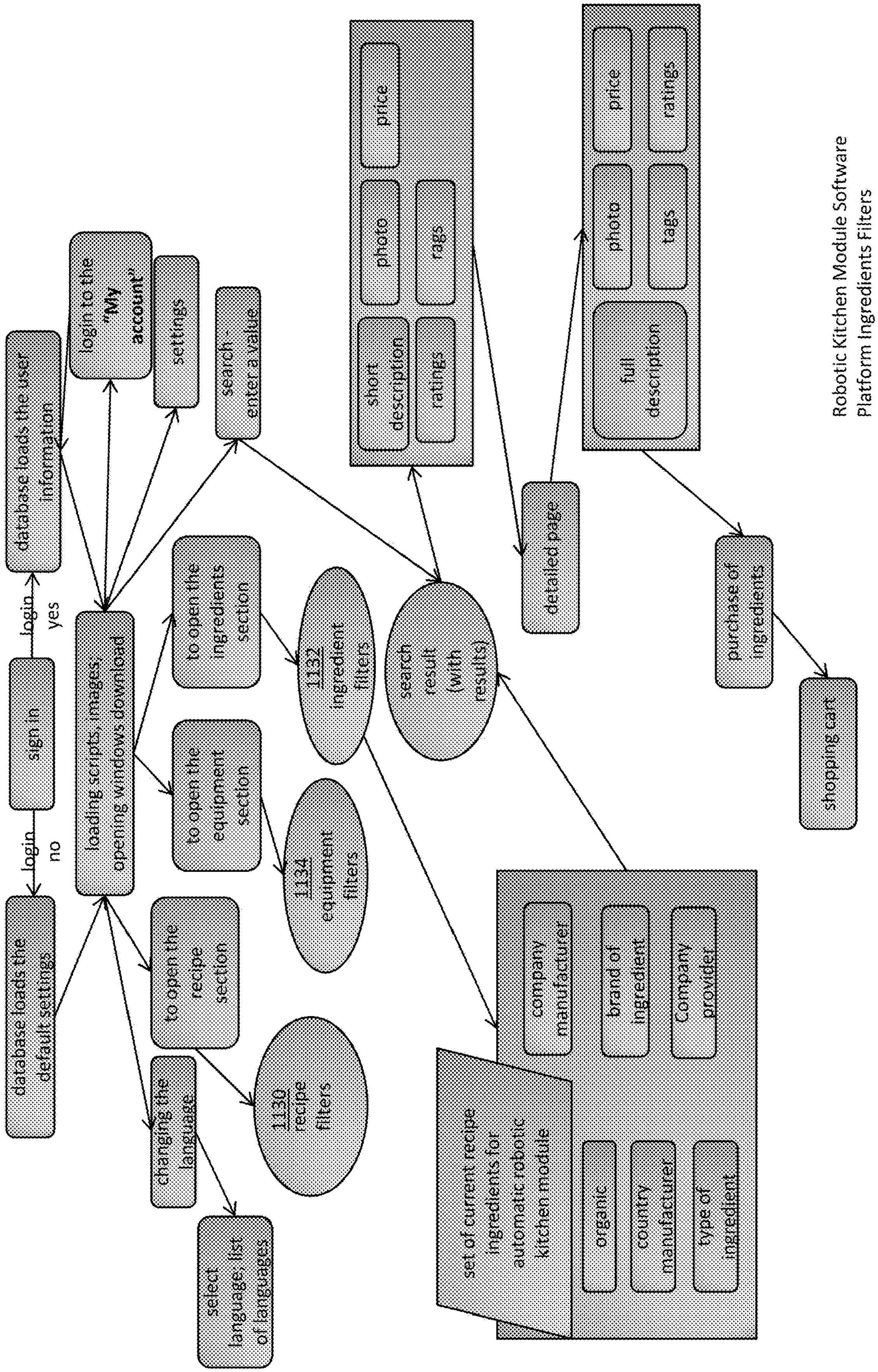

One embodiment of the flow charts in functioning as a recipe filter, an ingredient filter, an equipment filter, an account and social network access, a personal partner page, a shopping cart page, and the information on the purchased recipe, registration setting, create a recipe are illustrated in FIG. 37F through 37O, which illustrate the various functions that the robotic food preparation software 14 is capable of performing based on the filtering of databases and presenting the information to the user. As demonstrated in FIG. 37F, a platform user can access the recipe section and choose the desired recipe filters 1130 for automatic robotic cooking. The most common filter types include types of cuisine (e.g. Chinese, French, Italian), type of cooking (e.g. bake, steam, fry), vegetarian dishes, and diabetic food. The user will be able to view the recipe details, such as description, photo, ingredients, price, and ratings, from the filtered search result. In FIG. 37G, the user can choose the desired ingredient filters 1132, such as organic, type of ingredient, or brand of ingredient, for his purpose. In FIG. 37G, the user can apply the equipment filters 1134 for the automatic robotic kitchen modules, such as the type, the brand, and the manufacturer of equipment. After selecting, the user will be able to purchase recipes, ingredients, or equipment product directly through the system portal from the associated vendors. The platform allows the users to create additional filters and parameters for his/her own purpose, which makes the entire system customizable and constantly renewing. The user-added filters and parameters will appear as system filters after approval by moderator.

Figure 37H:
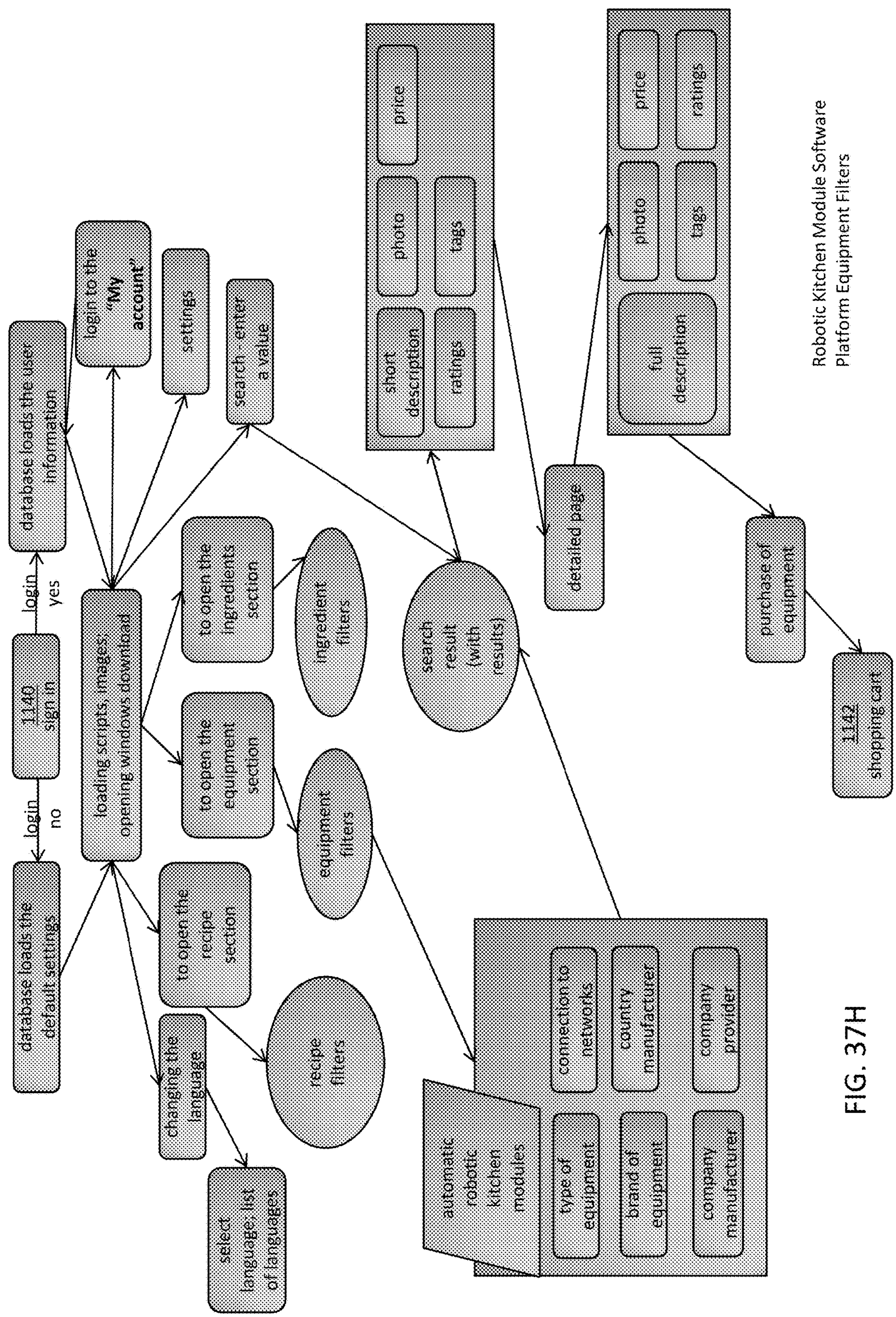
Figure 37I:
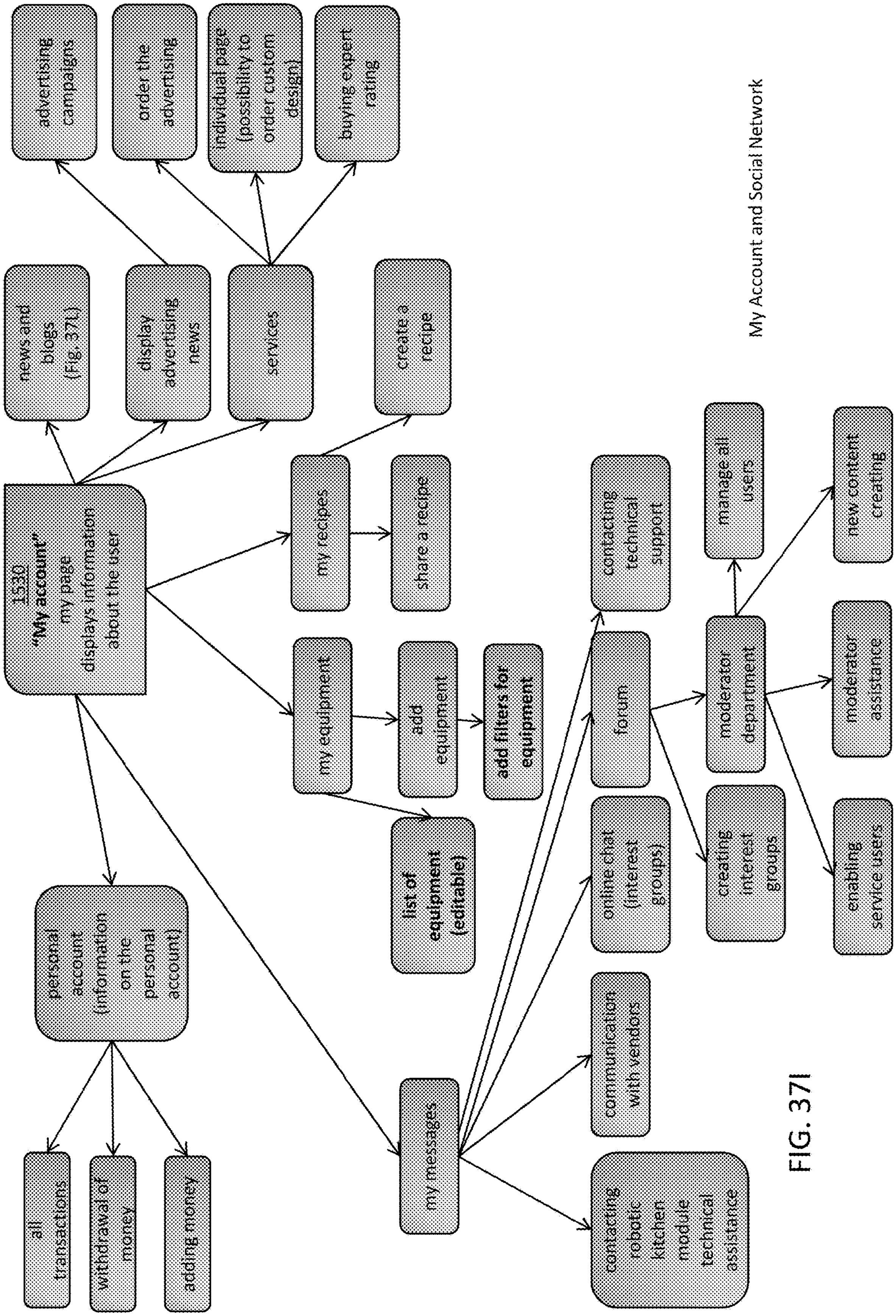

In FIG. 37H, a user is able to connect to other users and vendors through the platform's social professional network by logging into the user account 1140. The identity of the network user is verified, possibly through the credit card and the address details. The account portal also serves as a trading platform for users to share or sell their recipes, as well as advertising to other users. The user can manage his account finance and equipment through the account portal as well.

Figure 37J:
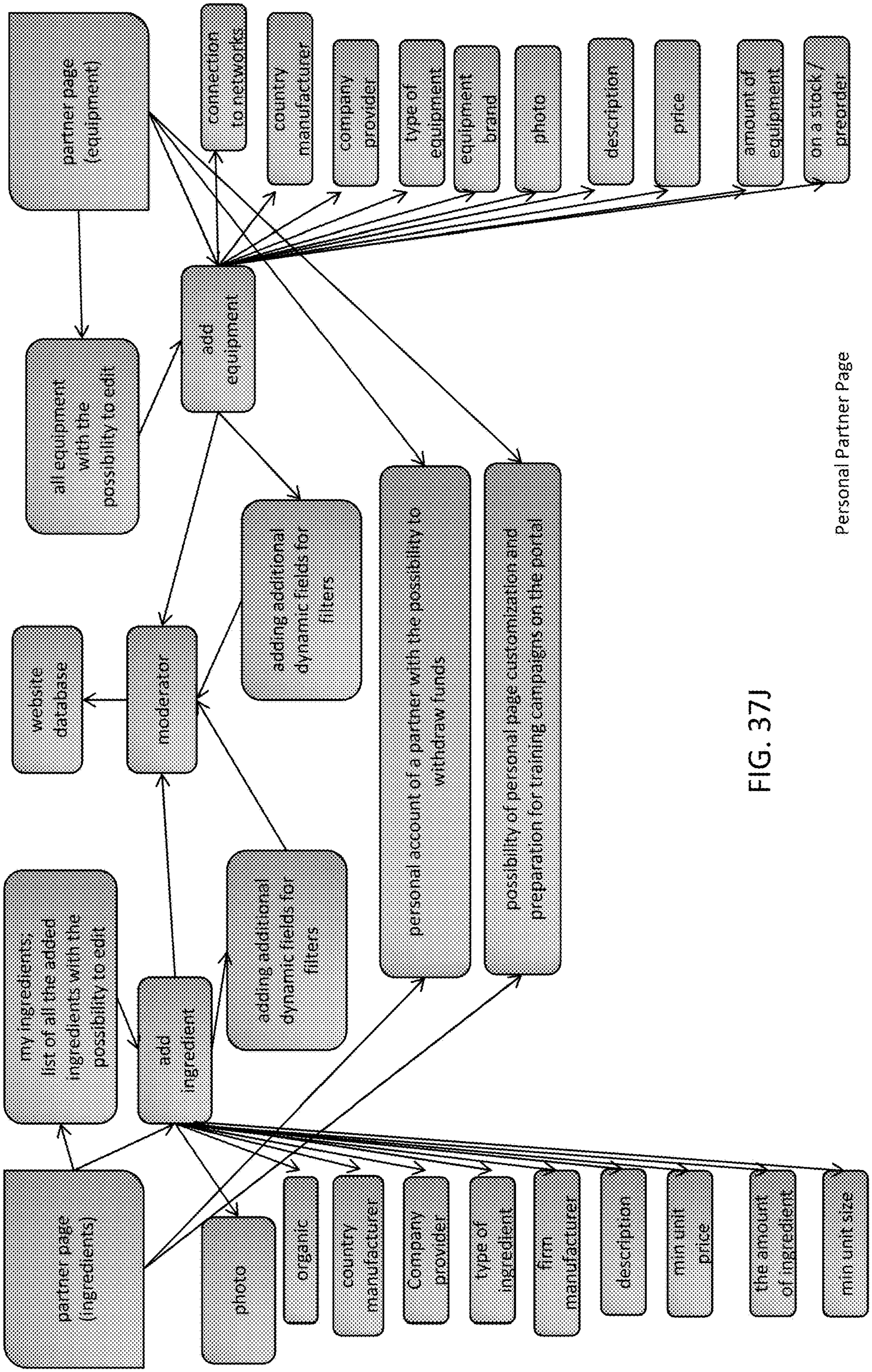
Figure 37K:
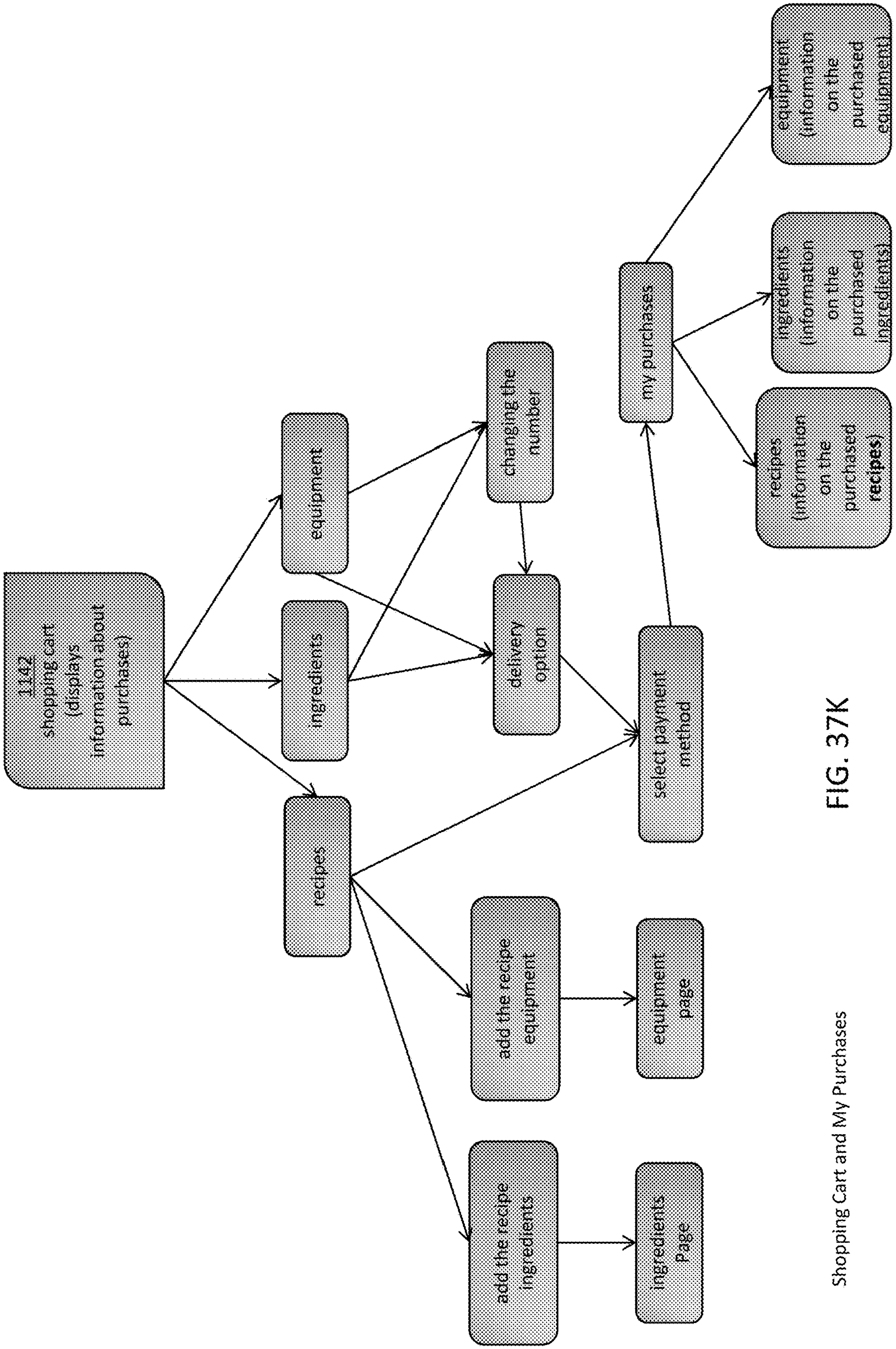

An example of partnership between users of the platform is demonstrated in FIG. 37J. One user can provide all the information and details for his ingredients and another user does the same for his equipment. All information must be filtered through a moderator before adding to the platform/website database. In FIG. 37K, a user can see the information for his purchases in the shopping cart 1142. Other options, such as delivery and payment method, can also be changed. The user can also purchase more ingredients or equipment, based on the recipes in his shopping cart.

Figure 37L:
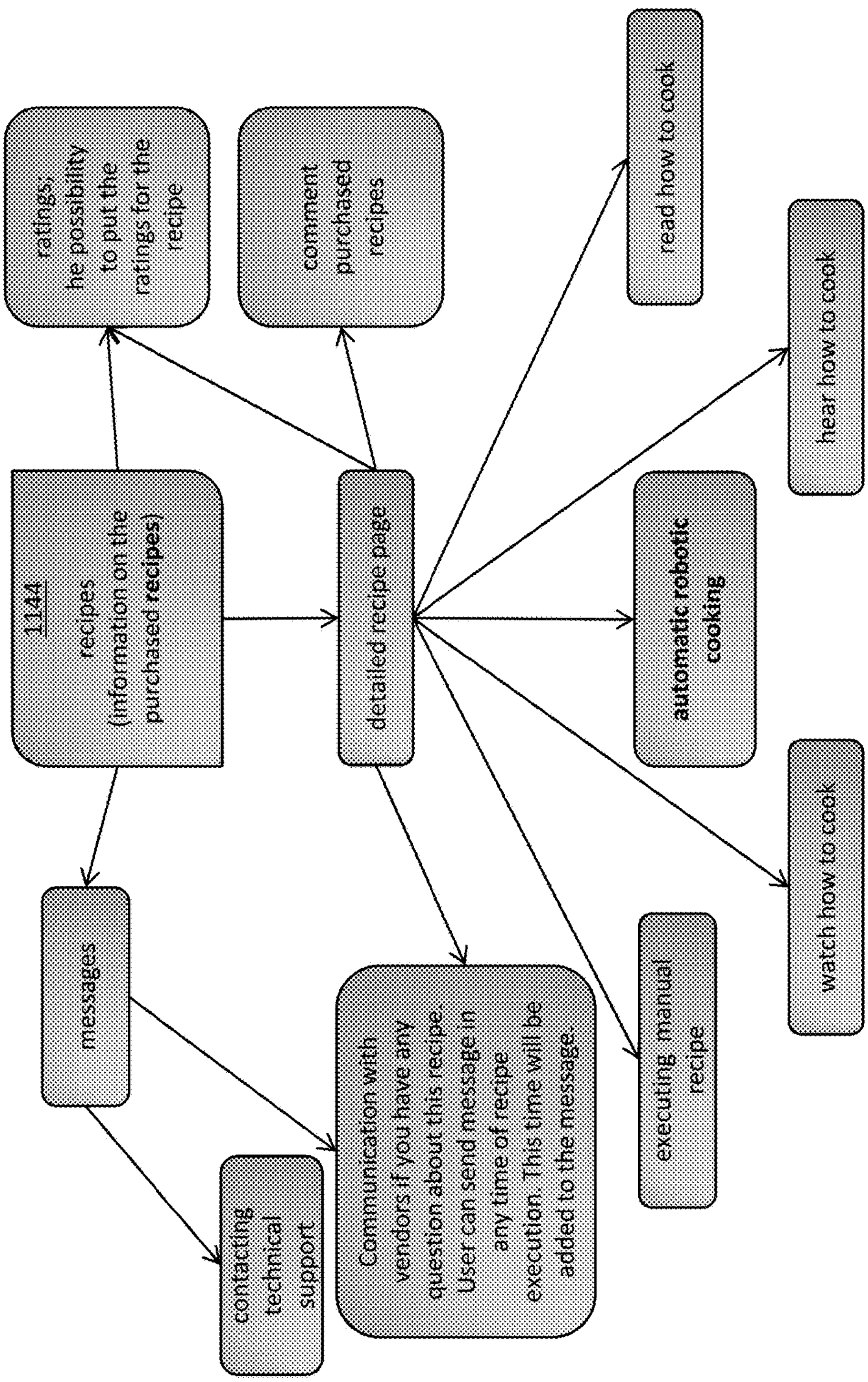

FIG. 37L shows the other information on the purchased recipes can be accessed from the recipes page 1144. The user can read, hear, and watch how to cook, as well as execute automatic robotic cooking. Communication with the vendors or technical support regarding the recipe is also possible from the recipes page.

Figure 37M:
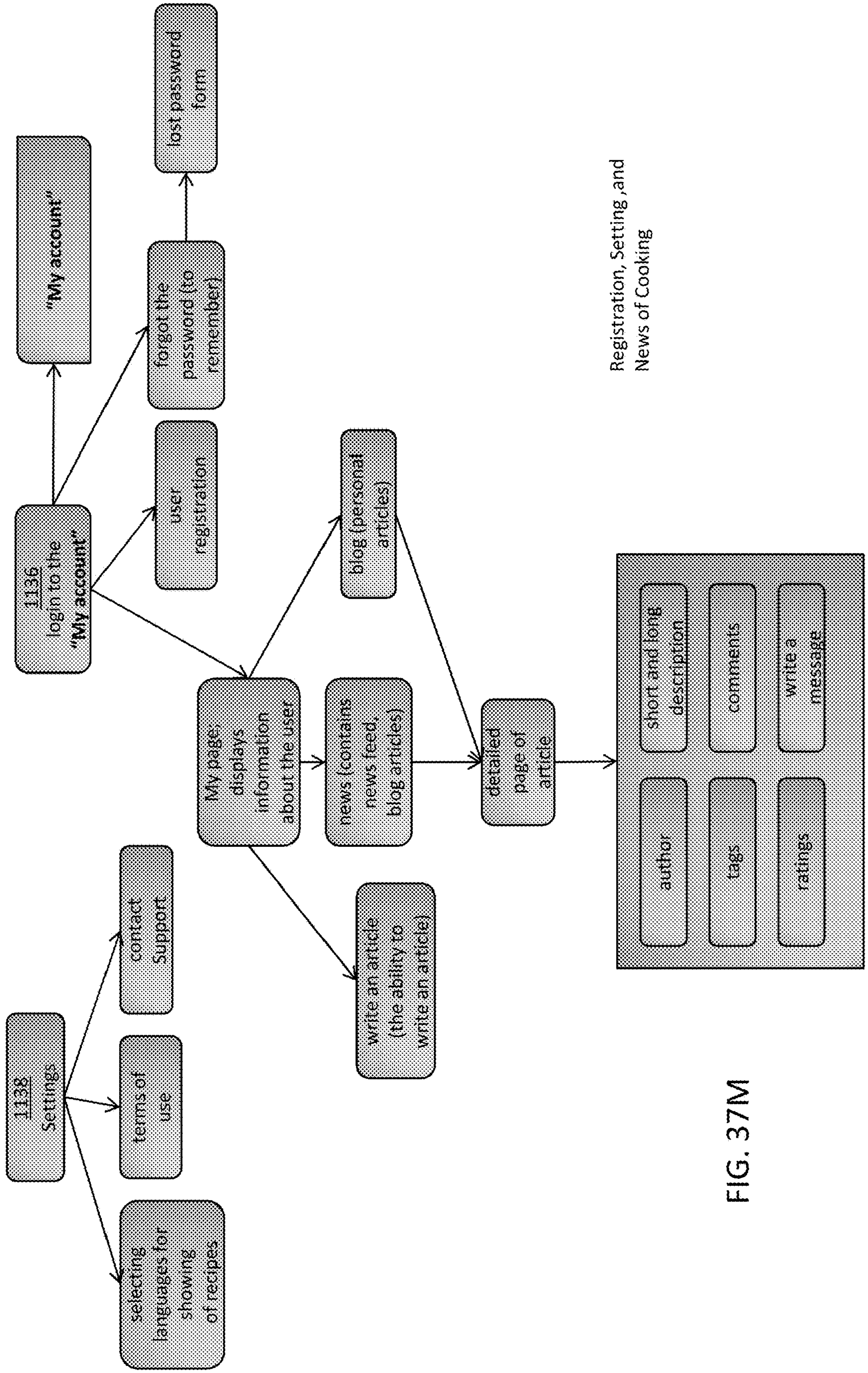
Figure 37N:
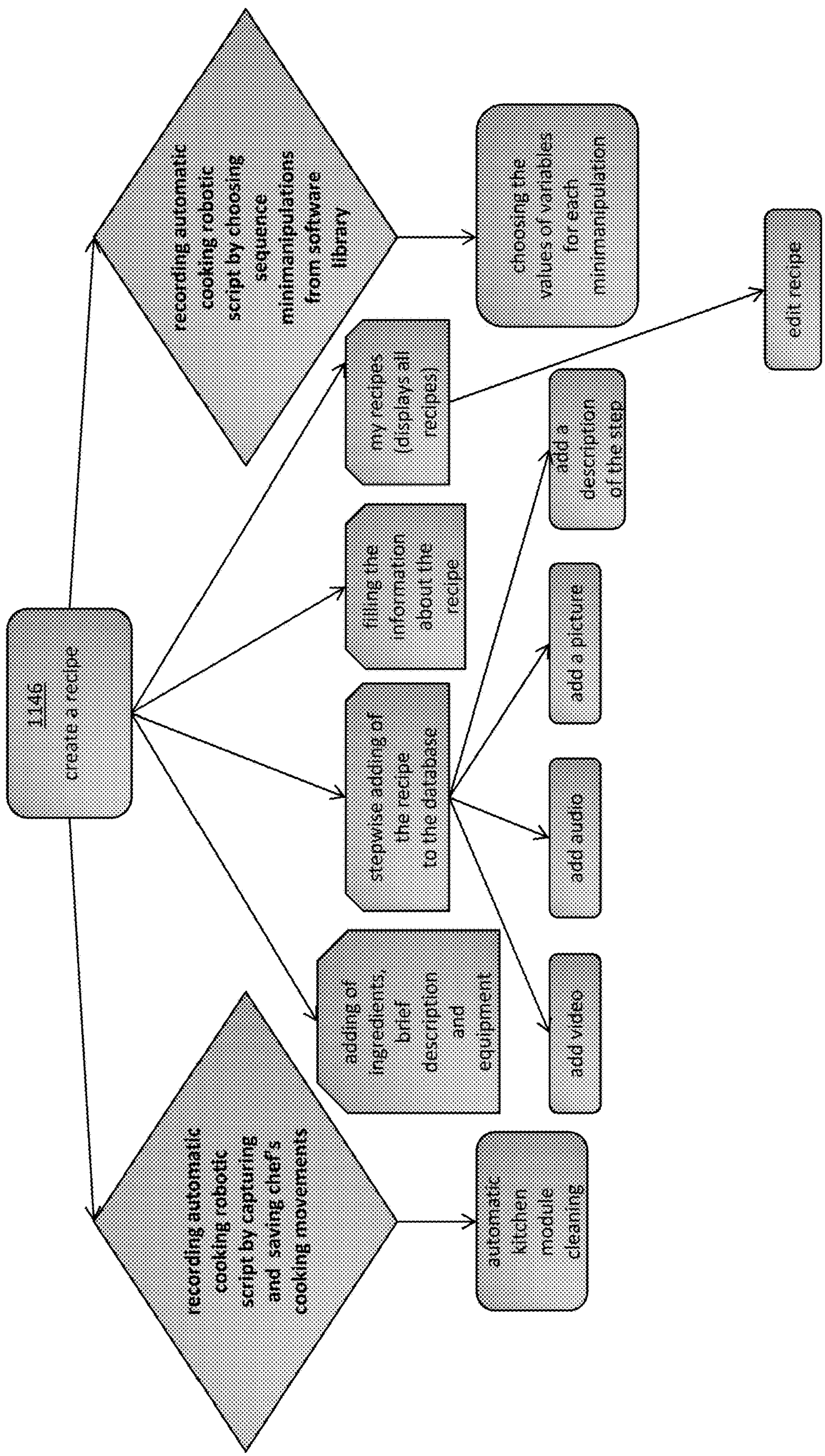

FIG. 37M is a block diagram that illustrate the different layers of the platform from the "My account" page 1136 and Settings page 1138. From the "My account" page, the user will be able to read professional cooking news or blogs, and can write an article to publish. Through the recipe page under "My account", there are multiple ways a user can create his own recipe 1146, as shown in FIG. 37N. The user can create a recipe by creating an automatic robotic cooking script either by capturing chief cooking movements or by choosing manipulation sequences from software library. The user can also create recipe by simply listing the ingredient/equipment, then add audio, video, or picture. The user can edit all recipes from the recipe page.

Figure 38:
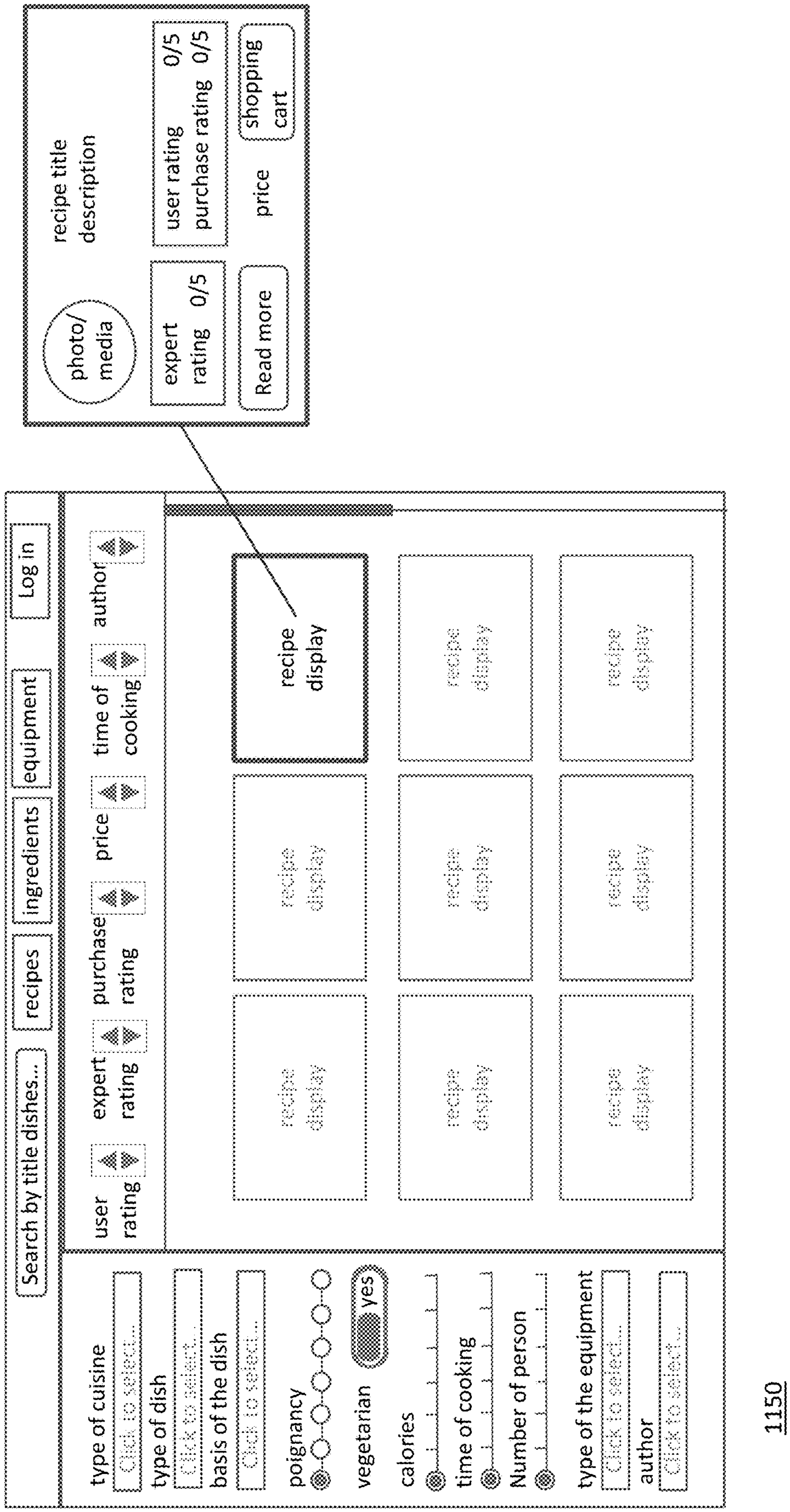
FIG. 38 is a block diagram illustrating a recipe search menu by selecting fields for use in the standardized robotic kitchen in accordance with the present disclosure.

FIG. 38 is a block diagram illustrating a recipe search menu 1150 by selecting fields for use in the standardized robotic kitchen. By selecting a category with a search criteria or range, the user 60 receives a return page that lists the various recipes results. The user 60 is able to sort the results by criteria such as a user rating (e.g. from high to low), an expert rating (e.g. from high to low), or the duration of the food preparation (e.g. from shorter to longer). The computer display may contain a photo/media, title, description, ratings and price information of the recipe, with an optional tab of the "read more" button that brings up a complete recipe page for browsing further information about the recipe.

Figure 39:
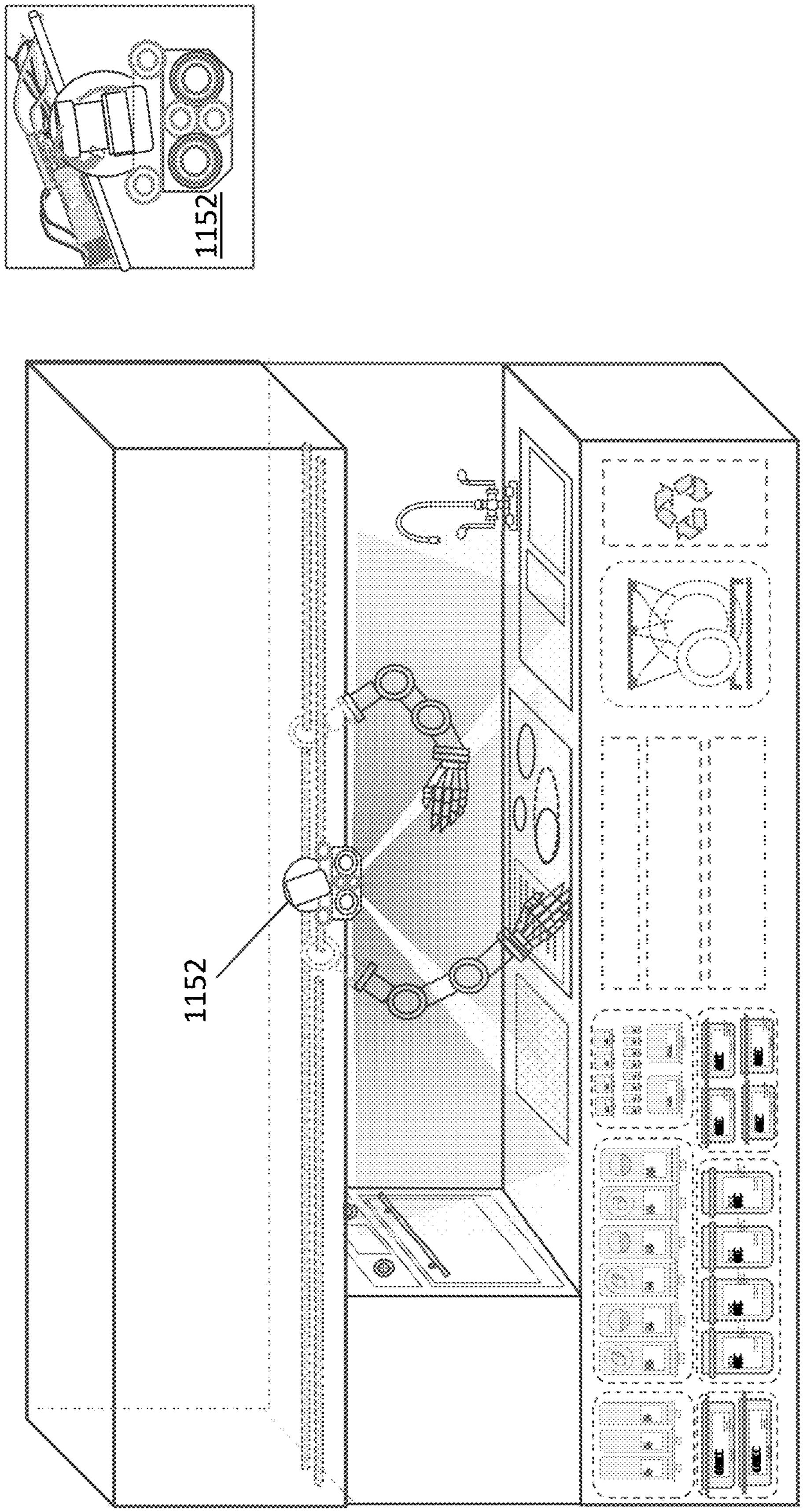
FIG. 39 is a block diagram illustrating the standardized robotic kitchen with an augmented sensor for three-dimensional tracking and reference data generation in accordance with the present disclosure.

The standardized robotic kitchen 50 in FIG. 39 depicts a possible configuration for the use of an augmented sensor system 1152, which represents one embodiment of the multimodal three-dimensional sensors 20. The augmented sensor system 1152 shows a single augmented sensor system 1854 placed on a movable computer-controllable linear rail travelling the length of the kitchen axis with the intent to cover the complete visible three-dimensional workspace of the standardized kitchen effectively. The standardized robotic kitchen 50 shows a single augmented sensor system 20 placed on a movable computer-controllable linear rail travelling the length of the kitchen axis with the intent to cover the complete visible three-dimensional workspace of the standardized kitchen effectively.

Based on the proper placement of the augmented sensor system 1152 placed somewhere in the robotic kitchen, such as on a computer-controllable railing, or on the torso of a robot with arms and hands, allows for 3D-tracking and raw data generation, both during chef-monitoring for machine-specific recipe-script generation, and monitoring the progress and successful completion of the robotically-executed steps in the stages of the dish replication in the standardized robotic kitchen 50.

Figure 40:
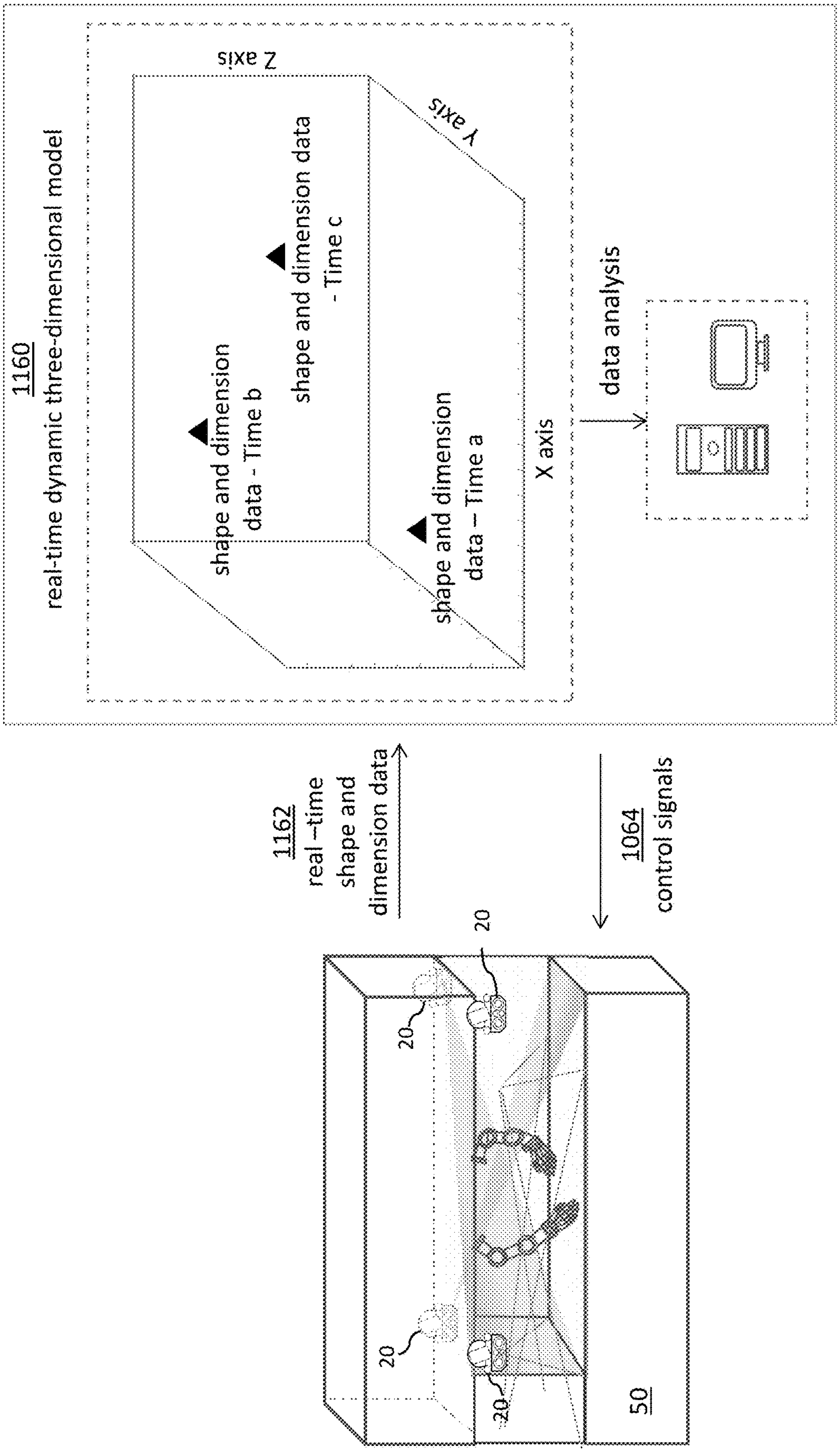
FIG. 40 is a block diagram illustrating the standardized robotic kitchen with multiple sensors for creating real-time three-dimensional modeling in accordance with the present disclosure.

FIG. 40. is a block diagram illustrating the standardized kitchen module 50 with multiple camera sensors and/or lasers 20 for real-time three-dimensional modeling 1160 of the food preparation environment. The robotic kitchen cooking system 48 includes a three-dimensional electronic sensor that is capable of providing real-time raw data for a computer to create a three-dimensional model of the kitchen operating environment. One possible implementation of the real-time three-dimensional modeling process involves the use of three-dimensional laser scanning. An alternative implementation of the real-time three-dimensional modeling is to use one or more video cameras. Yet a third method involves the use of a projected light-pattern observed by a camera, so-called structured-light imaging. The three-dimensional electronic sensor scans the kitchen operating environment in real-time to provide a visual representation (shape and dimensional data) 1162 of the working space in the kitchen module. For example, the three-dimensional electronic sensor captures in real-time the three-dimensional images of whether the robotic arm/hand has picked up meat or fish. The three-dimensional model of the kitchen also serves as sort of a 'human-eye' for making adjustments to grab an object, as some objects may have nonstandard dimensions. The compute processing system 16 generates a computer model of the three-dimensional geometry, robotic kinematics, objects in the workspace and provides controls signals 1164 back to the standardized robotic kitchen 50. For instance, three-dimensional modeling of the kitchen can provide a three-dimensional resolution grid with a desirable spacing, such as with 1 centimeter spacing between the grid points.

The standardized robotic kitchen 50 depicts another possible configuration for the use of one or more augmented sensor systems 20. The standardized robotic kitchen 50 shows a multitude of augmented sensor systems 20 placed in the corners above the kitchen work-surface along the length of the kitchen axis with the intent to effectively cover the complete visible three-dimensional workspace of the standardized robotic kitchen 50.

The proper placement of the augmented sensor system 20 in the standardized robotic kitchen 50, allows for three-dimensional sensing, using video-cameras, lasers, sonars and other two- and three-dimensional sensor systems to enable the collection of raw data to assist in the creation of processed data for real-time dynamic models of shape, location, orientation and activity for robotic arms, hands, tools, equipment and appliances, as they relate to the different steps in the multiple sequential stages of dish replication in the standardized robotic kitchen 50.

Raw data is collected at each point in time to allow the raw data to be processed to be able to extract the shape, dimension, location and orientation of all objects of importance to the different steps in the multiple sequential stages of dish replication in the standardized robotic kitchen 50 in a step 1162. The processed data is further analyzed by the computer system to allow the controller of the standardized robotic kitchen to adjust robotic arm and hand trajectories and minimanipulations, by modifying the control signals defined by the robotic script. Adaptations to the recipe-script execution and thus control signals is essential in successfully completing each stage of the replication for a particular dish, given the potential for variability for many variables (ingredients, temperature, etc.). The process of recipe-script execution based on key measurable variables is an essential part of the use of the augmented (also termed multi-modal) sensor system 20 during the execution of the replicating steps for a particular dish in a standardized robotic kitchen 50.

Figure 41A:
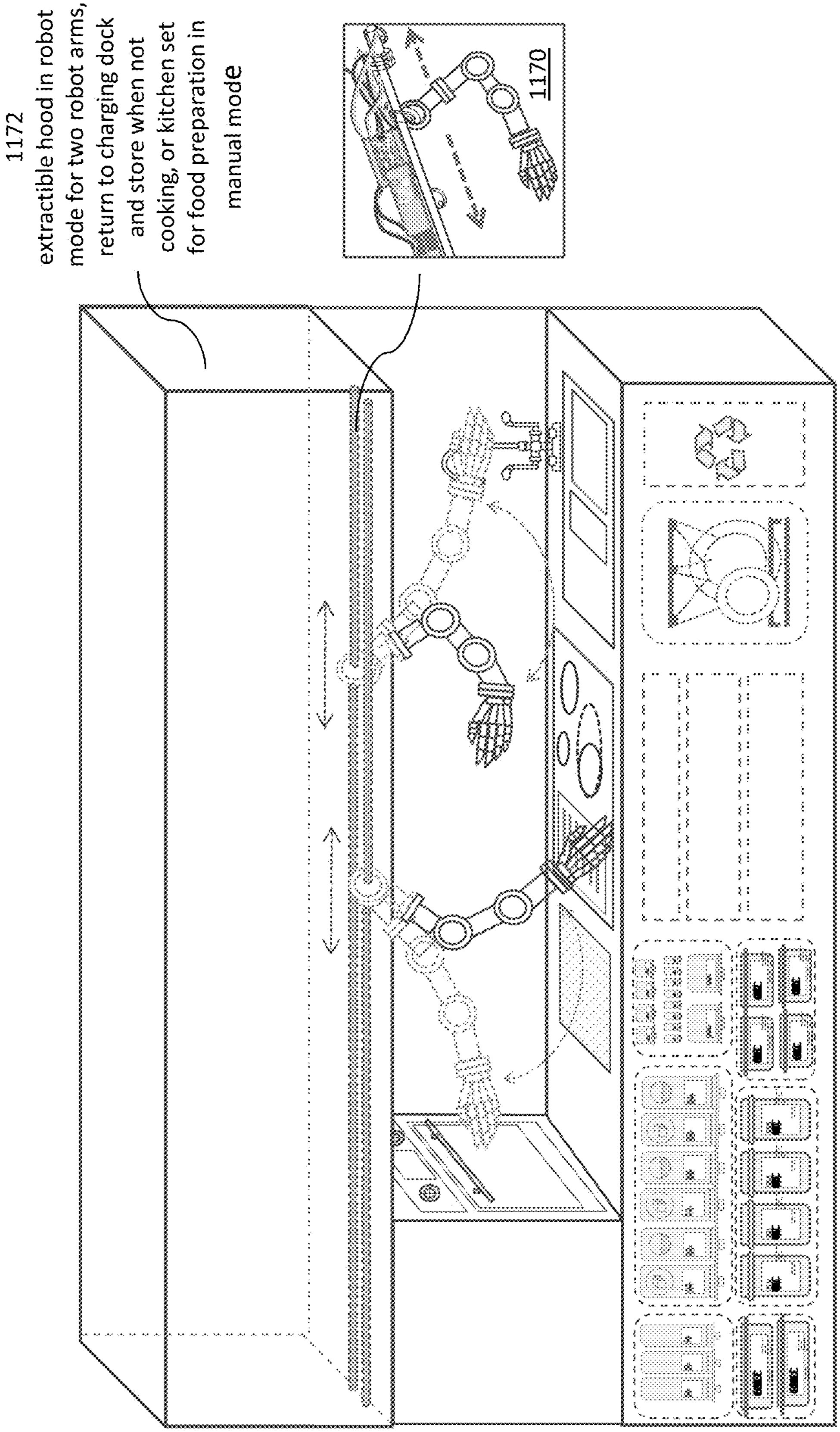
FIGS. 41A-L are block diagrams illustrating the various embodiments and features of the standardized robotic kitchen in accordance with the present disclosure.

FIG. 41A is a diagram illustrating a robotic kitchen prototype. The prototype kitchen comprises three levels, the top level includes a rail system 1170 with a pair of arms to move along for food preparation during a robot mode. An extractible hood 1172 is assessable for two robot arms to return to a charging dock to allow them to be stored when not used for cooking, or for when the kitchen is set to manual cooking mode in a manual mode. The mid level includes sinks, stove, griller, oven, and a working counter top with access to ingredients storage. The middle level has also a computer monitor to operate the equipment, choose the recipe, watching the video and text instructions, and listening to the audio instruction. The lower level includes an automatic container system to store food/ingredients at their best conditions, with the possibility to automatically deliver ingredients to the cooking volume as required by the recipe. The kitchen prototype also includes an oven, dishwasher, cooking tools, accessories, cookware organizer, drawers and recycle bin.

Figure 41B:
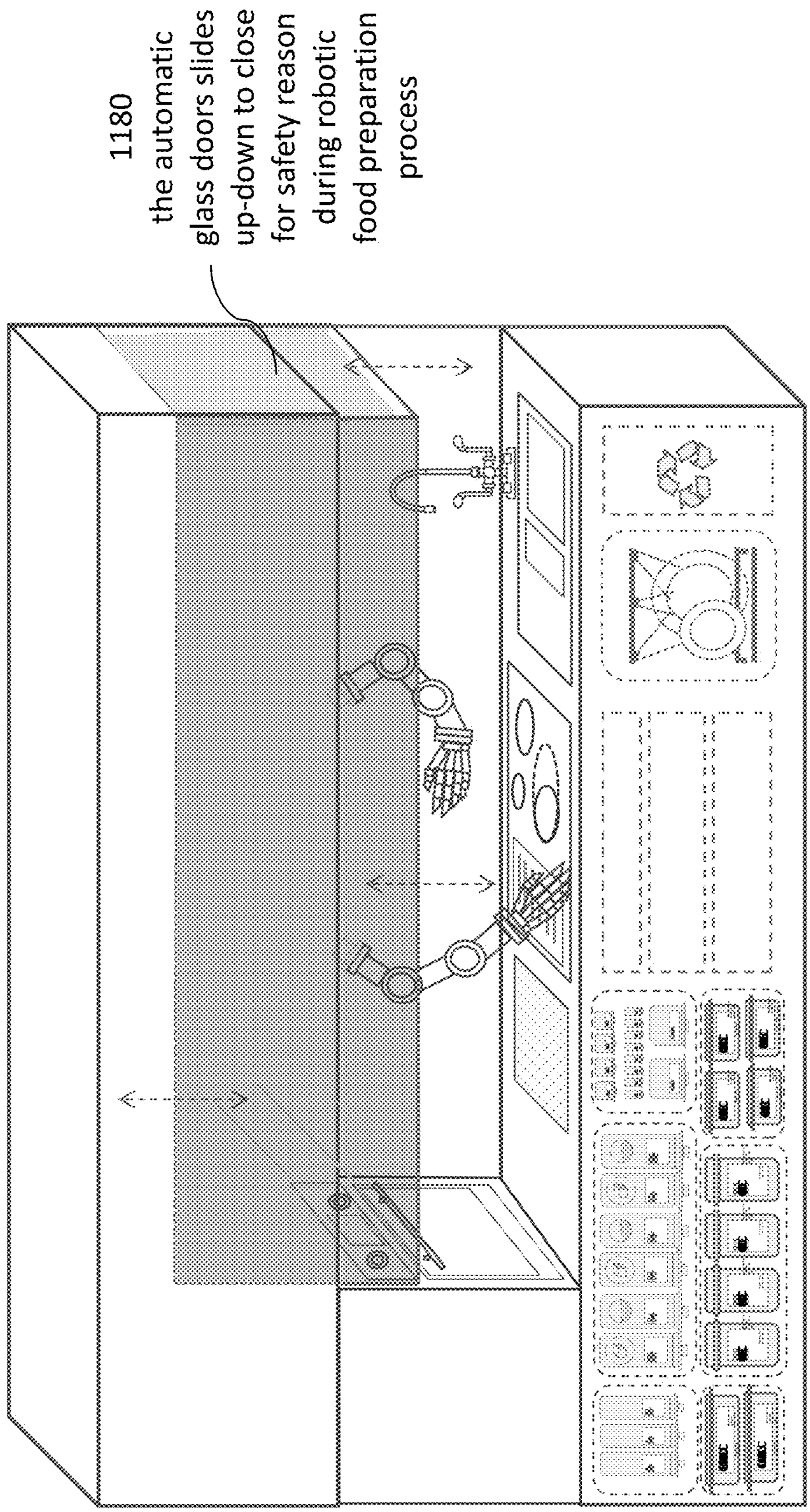

FIG. 41B is a diagram illustrating a robotic kitchen prototype with a transparent material enclosure 1180 that serves as a protection mechanism while the robotic cooking process is occurring to prevent causing potential injuries to surrounding humans. The transparent material enclosure can be made from a variety of transparent materials, such as glass, fiberglass, plastics, or any other suitable material for use in the robotic kitchen 50 to provide as a protective screen to shield from the operation of robotic arms and hand from external sources outside the robotic kitchen 50, such as people. In one example, the transparent material enclosure comprises an automatic glass door (or doors). As shown in this embodiment, the automatic glass doors are positioned to slide up-down or down-up (from bottom section) to close for safety reasons during the cooking process involving the use of robotic arms. A variation in the design of the transparent material enclosure is possible, such as vertically sliding down, vertically sliding up, horizontally from left to right, horizontally from right to left, or any other methods that place allow for the transparent material enclosure in the kitchen to serve as a protection mechanism.

Figure 41C:
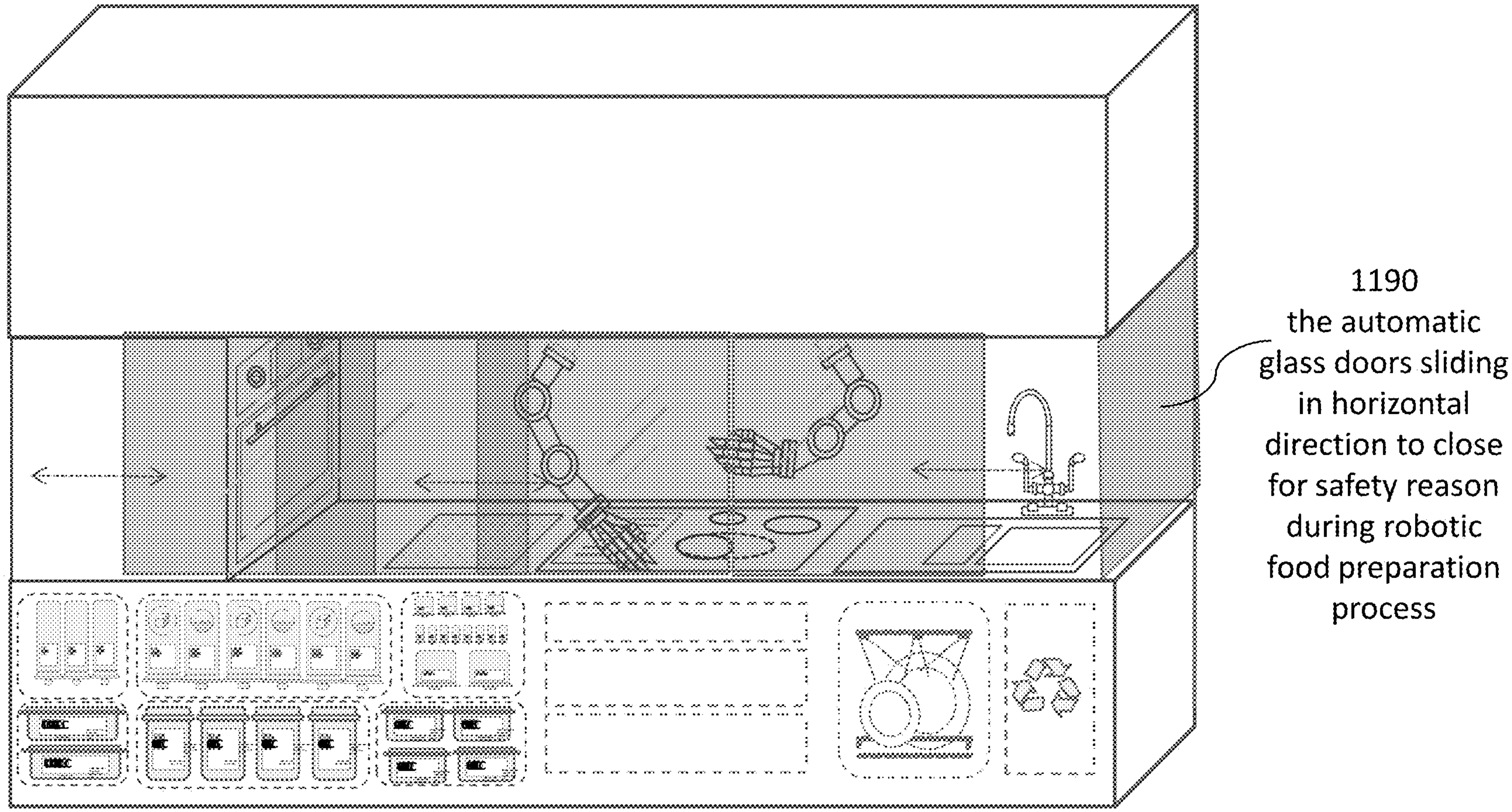

FIG. 41C depicts an embodiment of the standardized robotic kitchen, where the volume prescribed by the countertop surface and the underside of the hood, has horizontally sliding glass doors 1190, that can be manually, or under computer control, moved left or right to separate the workspace of the robotic arms/hands from its surroundings for such purposes as safeguarding any human standing near the kitchen, or limit contamination into/out-of the kitchen work-area, or even allow for better climate control within the enclosed volume. The automatic sliding glass doors slide left-right to close for safety reasons during the cooking processes involving the use of the robotic arms.

Figure 41D:
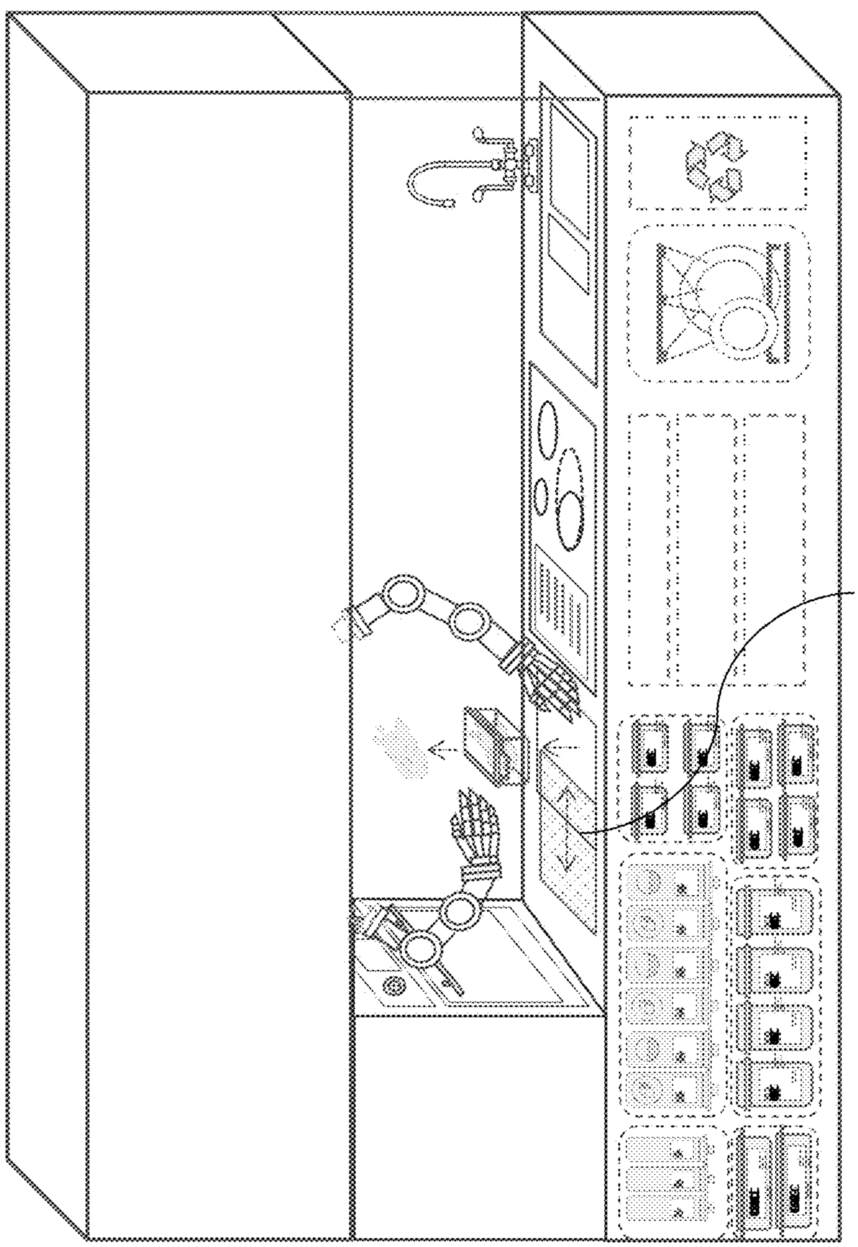

FIG. 41D depicts an embodiment of the standardized robotic kitchen, where the countertop or work-surface includes an area with a sliding-door 1200 access to the ingredient-storage volume in the bottom cabinet volume of the robotic kitchen counter. The doors can be slid open manually, or under computer control, to allow access to the ingredient containers therein. Either manually, or under computer control, one or more specific containers can be fed to countertop level by the ingredient storage-and-supply unit, allowing manual access (in this depiction by the robotic arms/hands) to the container, its lid and thus the contents of the container. The robotic arms/hands can then open the lid, retrieve the ingredient(s) as needed, and place the ingredient(s) in the appropriate place (plate, pan, pot, etc.), before re-sealing, the container and placing it back on or into the ingredient storage-and-supply unit. The ingredient storage-and-supply unit then places the container back into the appropriate location within the unit for later re-use, cleaning or re-stocking. This process of supplying and re-stacking ingredient containers for access by the robotic arms/hands is an integral and repeating process that forms part of the recipe-script as certain steps within the recipe replication process call for one or more ingredients of a certain type, based on the stage of the recipe-script execution the standardized robotic kitchen 50 might be involved in.

To access the ingredients storage-and-supply unit, part of the countertop with sliding doors can be opened, where the recipe software controls the doors and moves designated containers and ingredients to the access location where the robotic arm(s) may pick up the containers, open the lid, remove the ingredients out of the containers to a designated place, reseal the lid and move the containers back into storage. The container is moved from the access location back to its default location in the storage unit, and a new/next container item is then uploaded to the access location to be picked up.

Figure 41E:
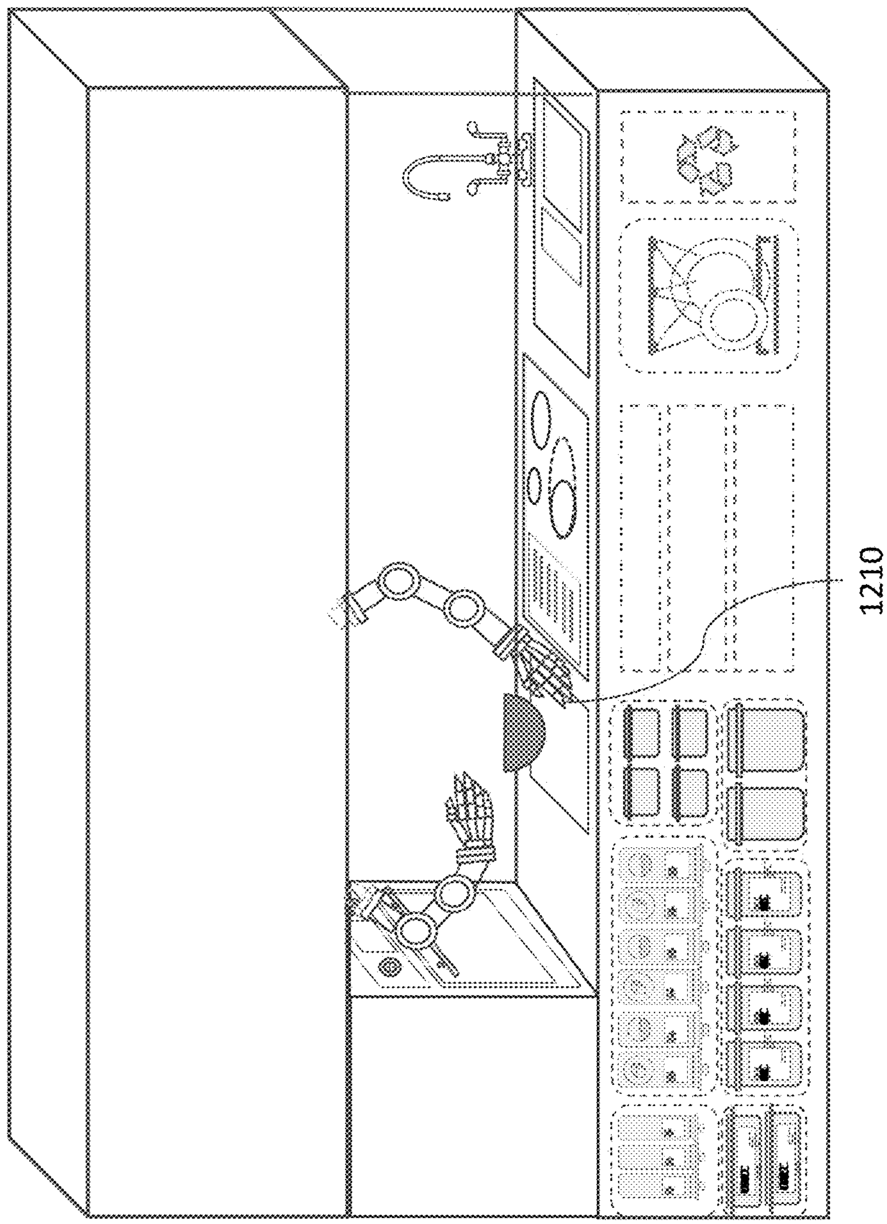

An alternative embodiment for an ingredient storage-and-supply unit 1210 is depicted in FIG. 41E. Specific or repetitively used ingredients (salt, sugar, flour, oil, etc.) can be dispensed using computer-controlled feeding mechanisms or allow for hand-triggered, whether by human or robotic hands or fingers, release of a specified amount of a specific ingredient. The amount of ingredient to be dispensed can be manually entered by the human or robotic hand on a touch-panel, or provided via computer-control. The dispensed ingredient can then be collected or fed into a piece of kitchen equipment (bowl, pan, pot, etc.) at any time during the recipe replication process. This embodiment of an ingredient supply and dispensing system can be thought of as more cost- and space-efficient approach while also reducing container-handling complexity as well as wasted motion-time by the robot arms/hands.

Figure 41F:
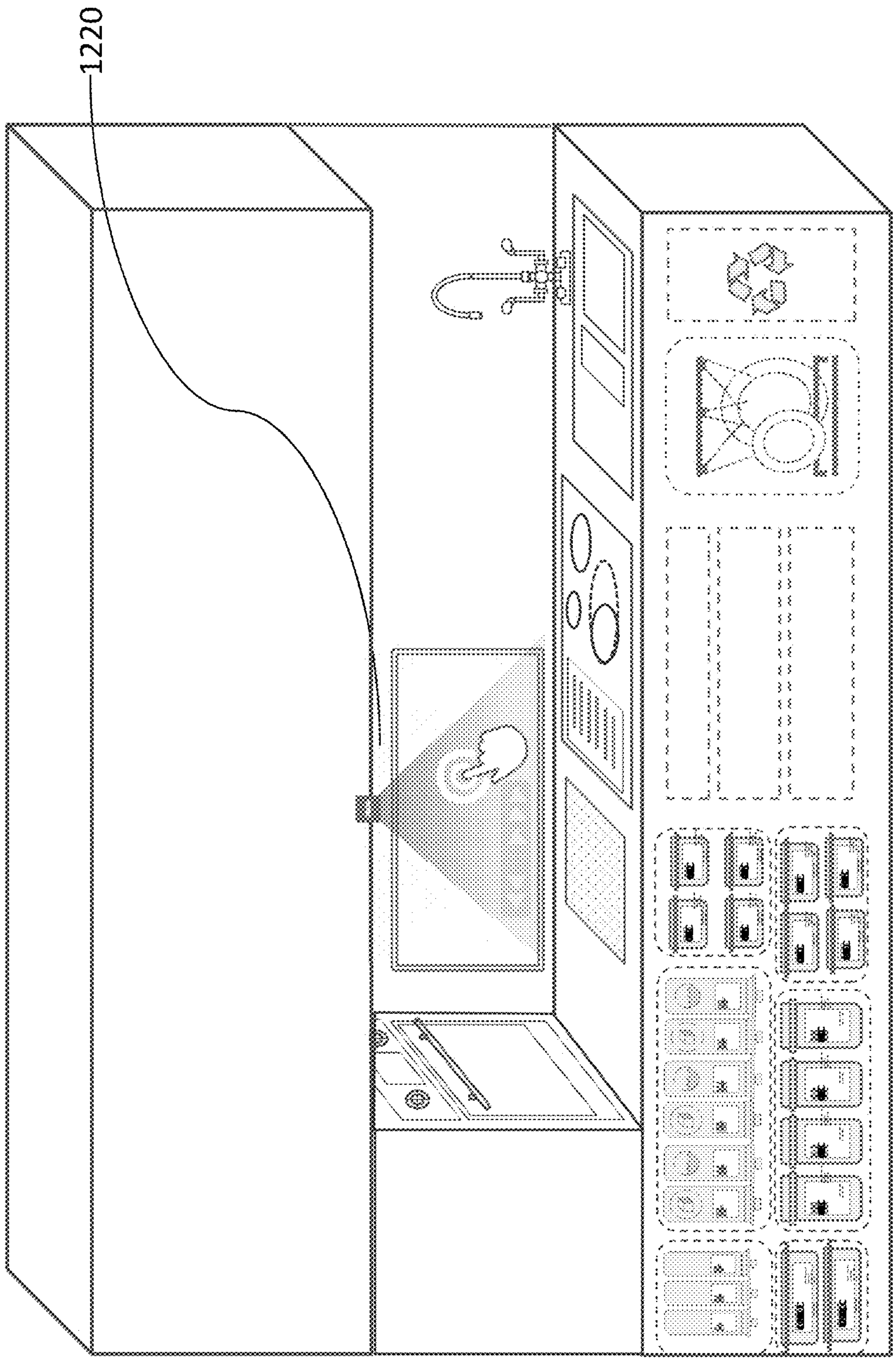

In FIG. 41F an embodiment of the standardized robotic kitchen includes a backsplash area 1220, wherein is mounted a virtual monitor/display with a touchscreen area to allow a human operating the kitchen in manual mode to interact with the robotic kitchen and its elements. A computer-projected image and a separate camera monitoring the projected area can tell where the human hand and its finger are located when making a specific choice based on a location in the projected image, upon which the system then acts accordingly. The virtual touchscreen allows for access to all control and monitoring functions for all aspects of the equipment within the standardized robotic kitchen 50, retrieval and storage of recipes, reviewing stored videos of complete or partial recipe execution steps by a human chef, as well as listening to audible playback of the human chef voicing descriptions and instructions related to a particular step or operation in a particular recipe.

Figure 41G:
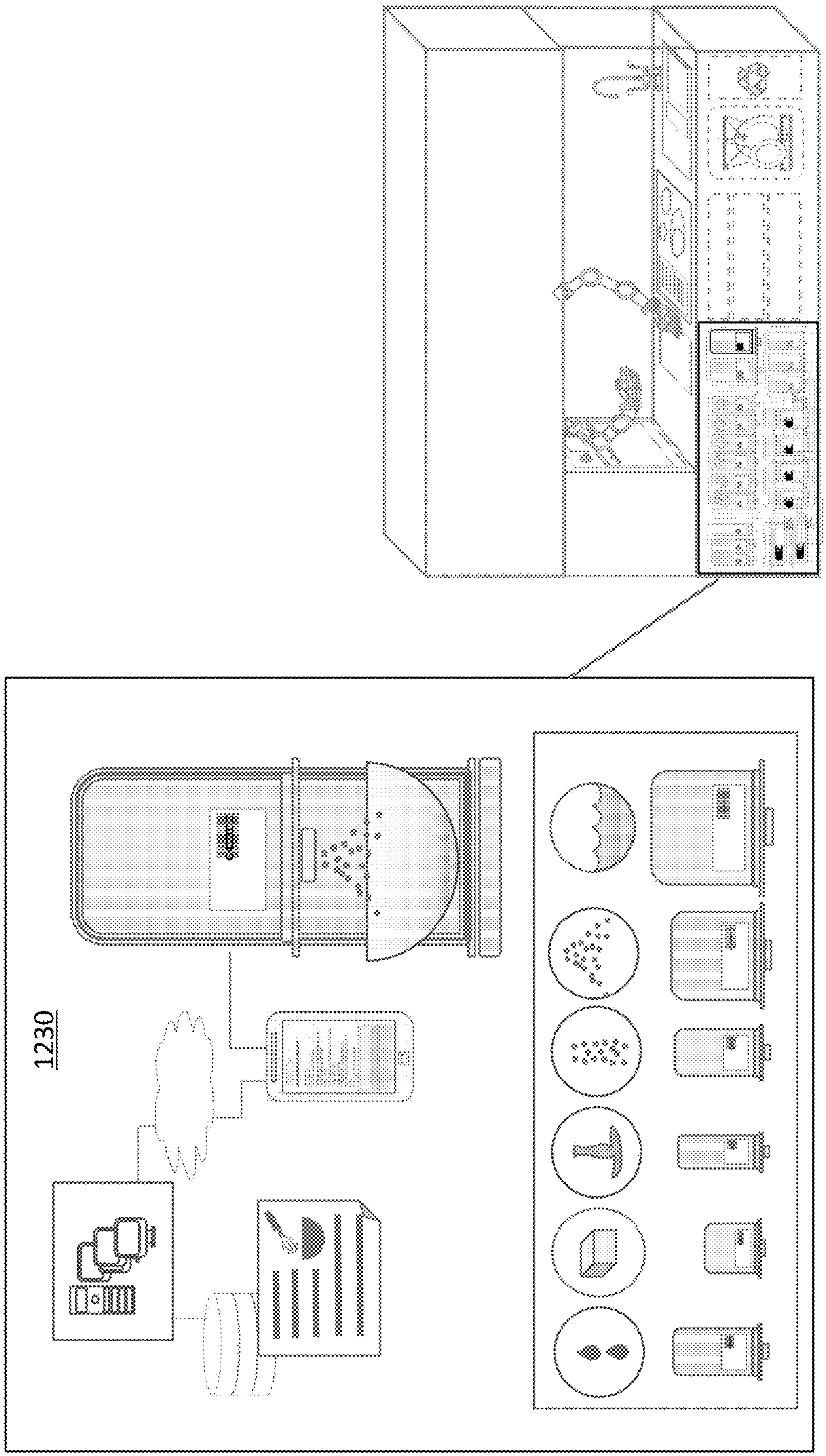

FIG. 41G depicts a single or a series of robotic hard automation device(s) 1230, which are built into the standardized robotic kitchen. The device or devices are programmable and controllable remotely by a computer and are designed to feed or provide pre-packaged or pre-measured amounts of dedicated ingredient elements needed in the recipe replication process, such as spices (salt, pepper, etc.), liquids (water, oil, etc.) or other dry ingredients (flour, sugar, baking powder, etc.). These robotic automation devices 1230 are located to make them readily accessible to the robotic arms/hands to allow them to be used by the robotic arms/hands or those of a human chef, to set and/or trigger the release of a determined amount of an ingredient of choice based on the needs specified in the recipe-script.

Figure 41H:
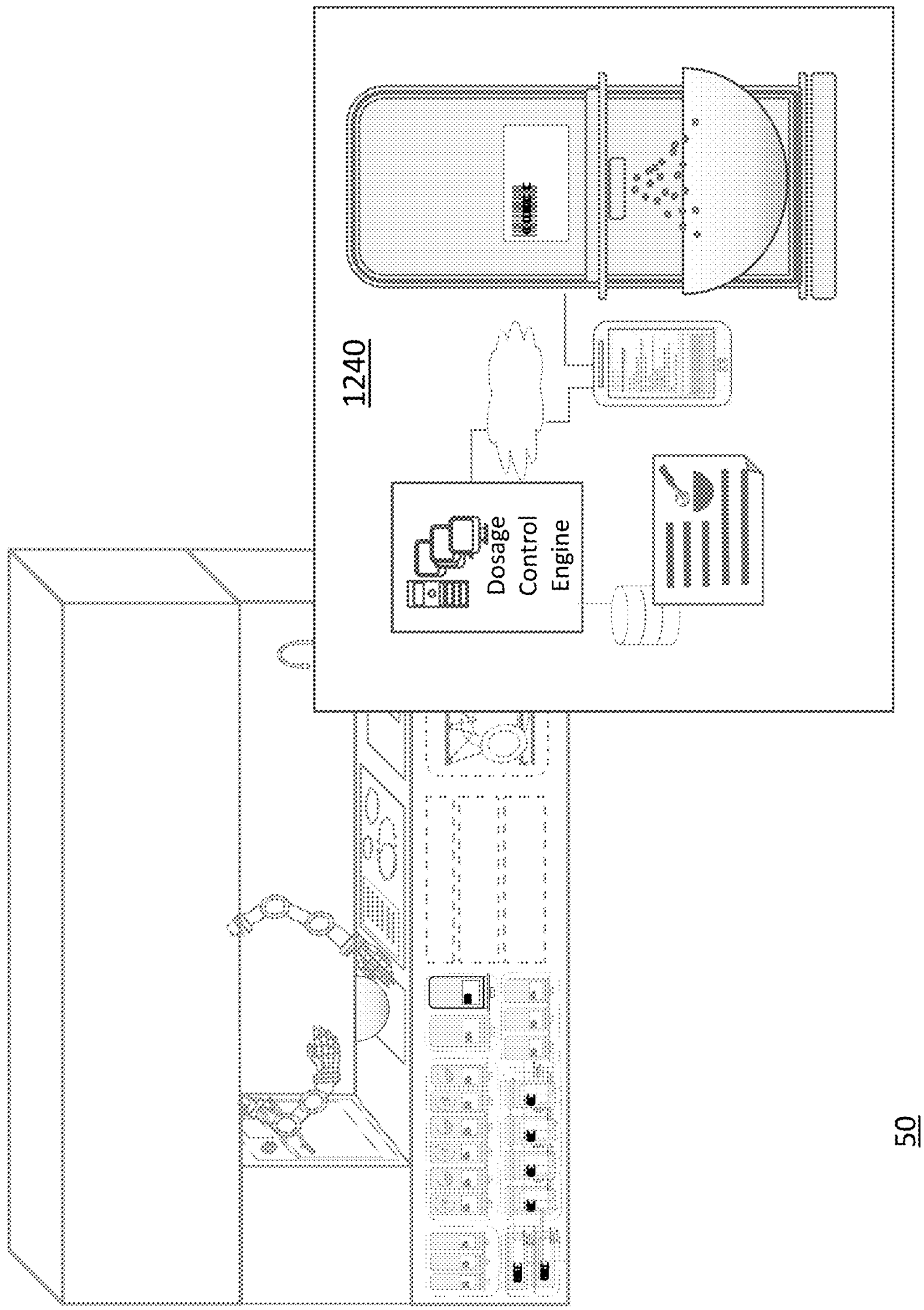

FIG. 41H depicts a single or a series of robotic hard automation device(s) 1240, which are built into the standardized robotic kitchen. The device or devices are programmable and controllable remotely by a computer and are designed to feed or provide pre-packaged or pre-measured amounts of common and repetitively used ingredient elements needed in the recipe replication process, where a dosage control engine/system, is capable of providing just the proper amount to a specific piece of equipment, such as a bowl, pot or pan. These robotic automation devices 1240 are located so as to make them readily accessible to the robotic arms/hands to allow them to be used by the robotic arms/hands or those of a human cook, to set and/or trigger the release of a dosage-engine controlled amount of an ingredient of choice based on the needs specified in the recipe-script. This embodiment of an ingredient supply and dispensing system can be thought of as more cost- and space-efficient approach while also reducing container-handling complexity as well as wasted motion-time by the robot arms/hands.

Figure 41I:
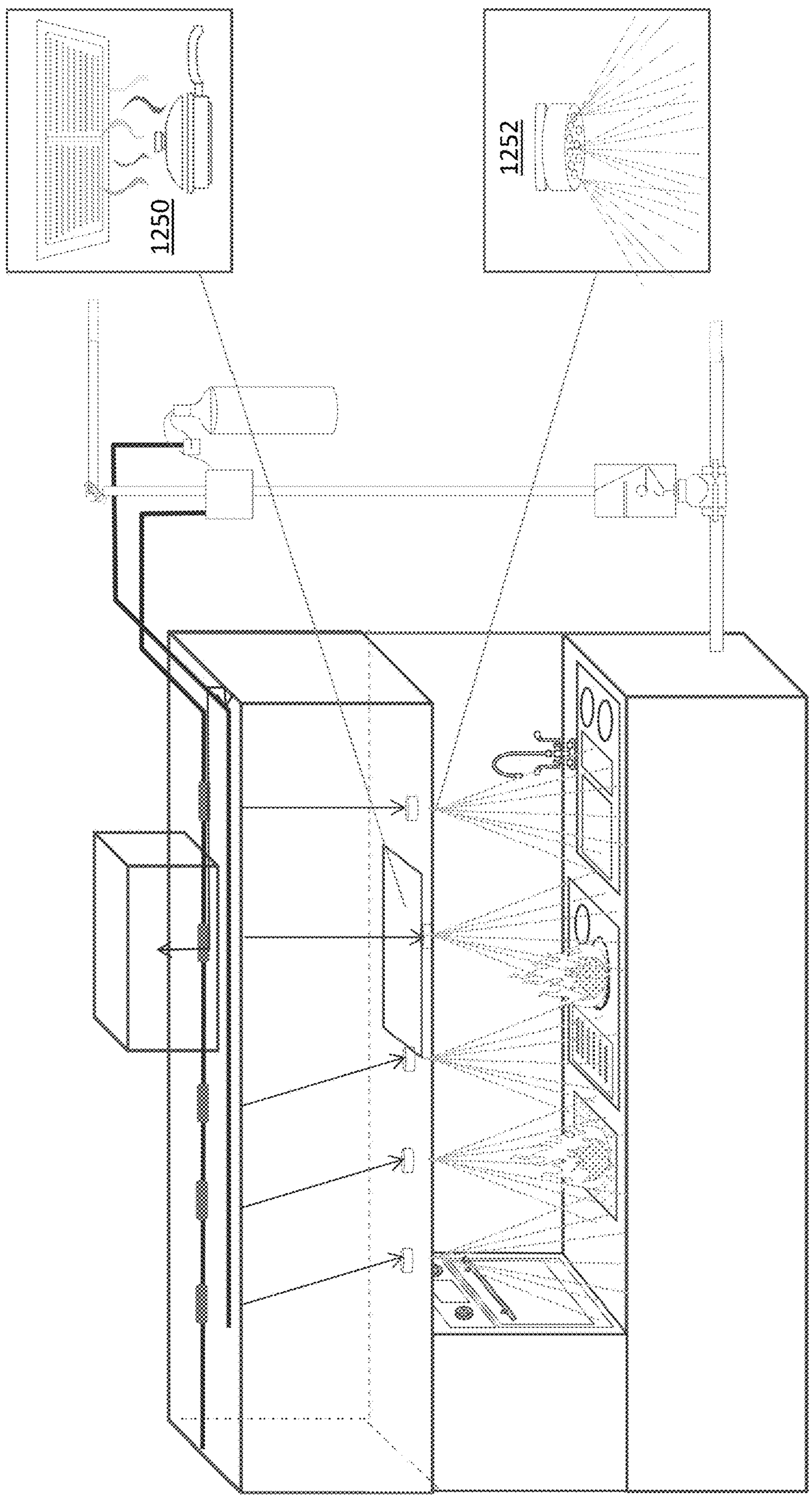

FIG. 41I depicts the standardized robotic kitchen outfitted with both a ventilation system 1250 to extract fumes and steam during the automated cooking process, as well as an automatic smoke/flame detection and suppression system 1252 to extinguish any source of noxious smoke and dangerous fire also allowing the safety glass of the sliding doors to enclose the standardized robotic kitchen 50 to contain the affected space.

Figure 41J:
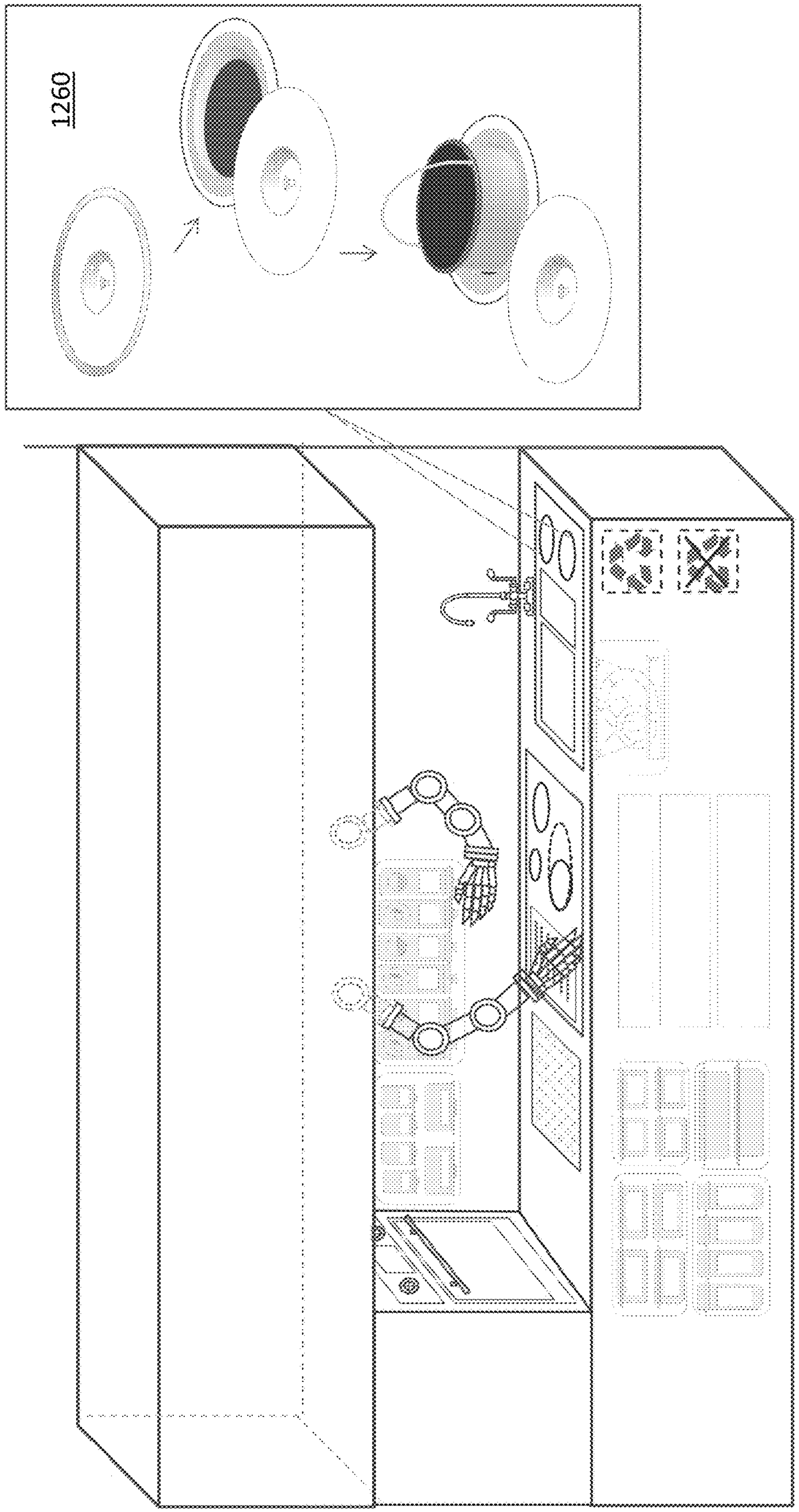

FIG. 41J depicts the standardized robotic kitchen 50 with a waste management system 1260 which is located within a location in the lower cabinet so as to allow for easy and rapid disposal of recyclable (glass, aluminum, etc.) and non-recyclable (food scraps, etc.) items by way of a set of trash containers with removable lids, which contain sealing elements (gaskets, o-rings, etc.) to provide for an airtight seal to keep odors from escaping into the standardized robotic kitchen 50.

Figure 41K:
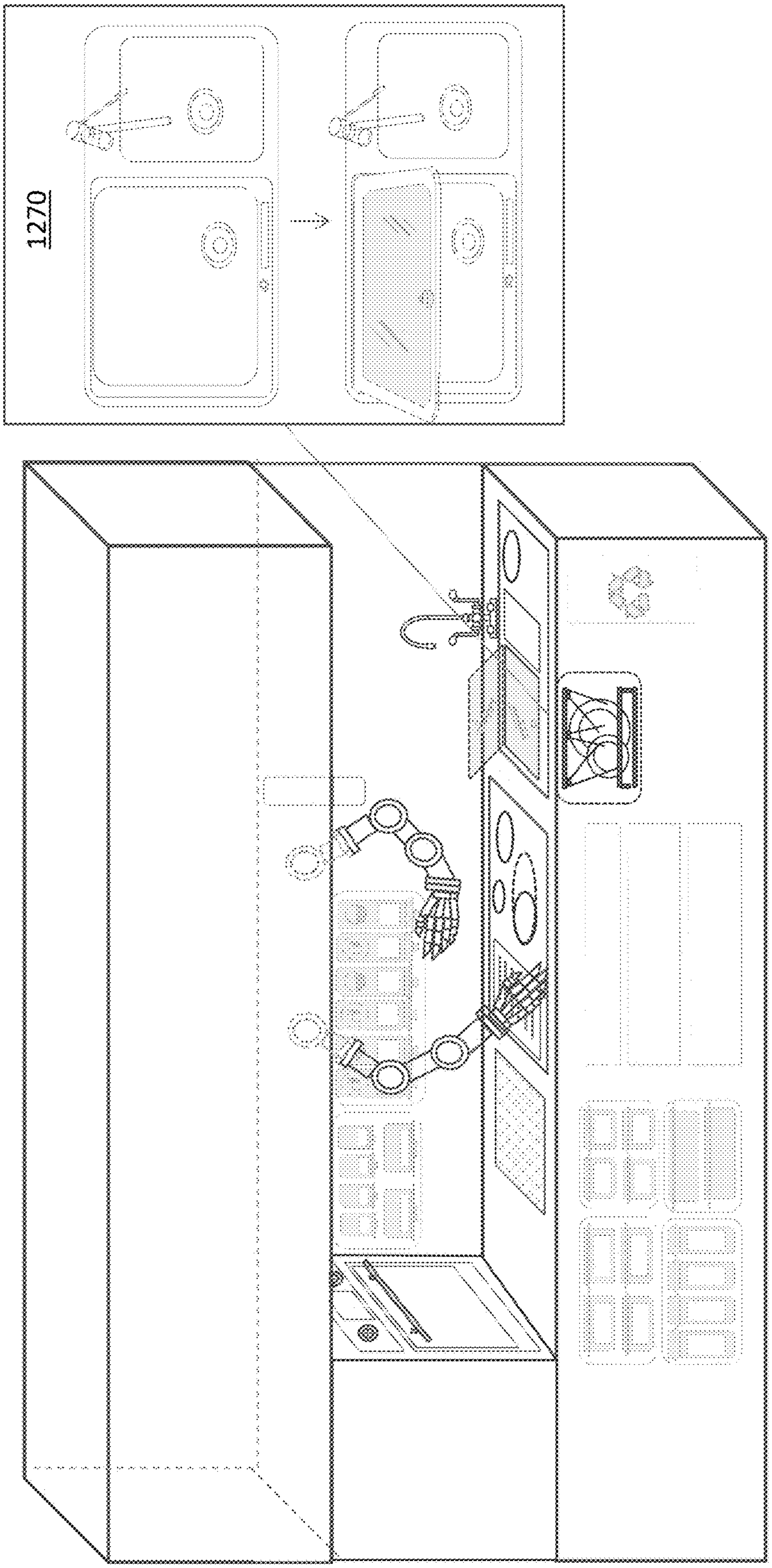

FIG. 41K depicts the standardized robotic kitchen 50 with a top-loaded dishwasher 1270 located within a certain location in the kitchen for ease of robotic loading and unloading. The dishwasher includes a sealing lid, which during automated recipe replication step execution can also be used as a cutting board or workspace with an integral drainage groove.

Figure 41L:
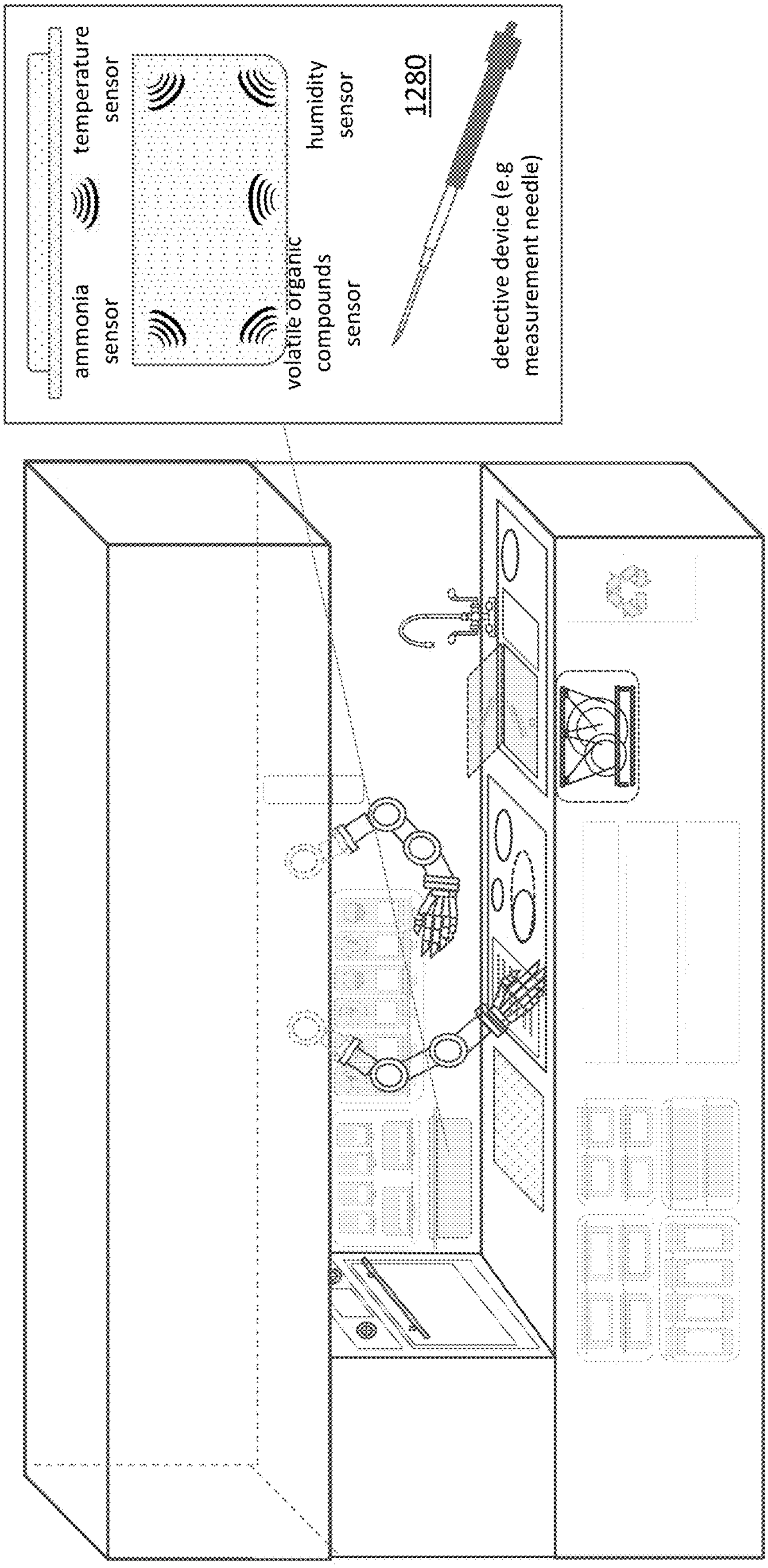

FIG. 41L depicts the standardized kitchen with an instrumented ingredient quality-check system 1280 comprised of an instrumented panel with sensors and a food-probe. The area includes sensors on the backsplash capable of detecting multiple physical and chemical characteristics of ingredients placed within the area, including but not limited to spoilage (ammonia sensor), temperature (thermocouple), volatile organic compounds (emitted upon biomass decomposition), as well as moisture/humidity (hygrometer) content. A food probe using a temperature-sensor (thermocouple) detection device can also be present to be wielded by the robotic arms/hands to probe the internal properties of a particular cooking ingredient or element (such as internal temperature of red meat, poultry, etc.).

Figure 42A:
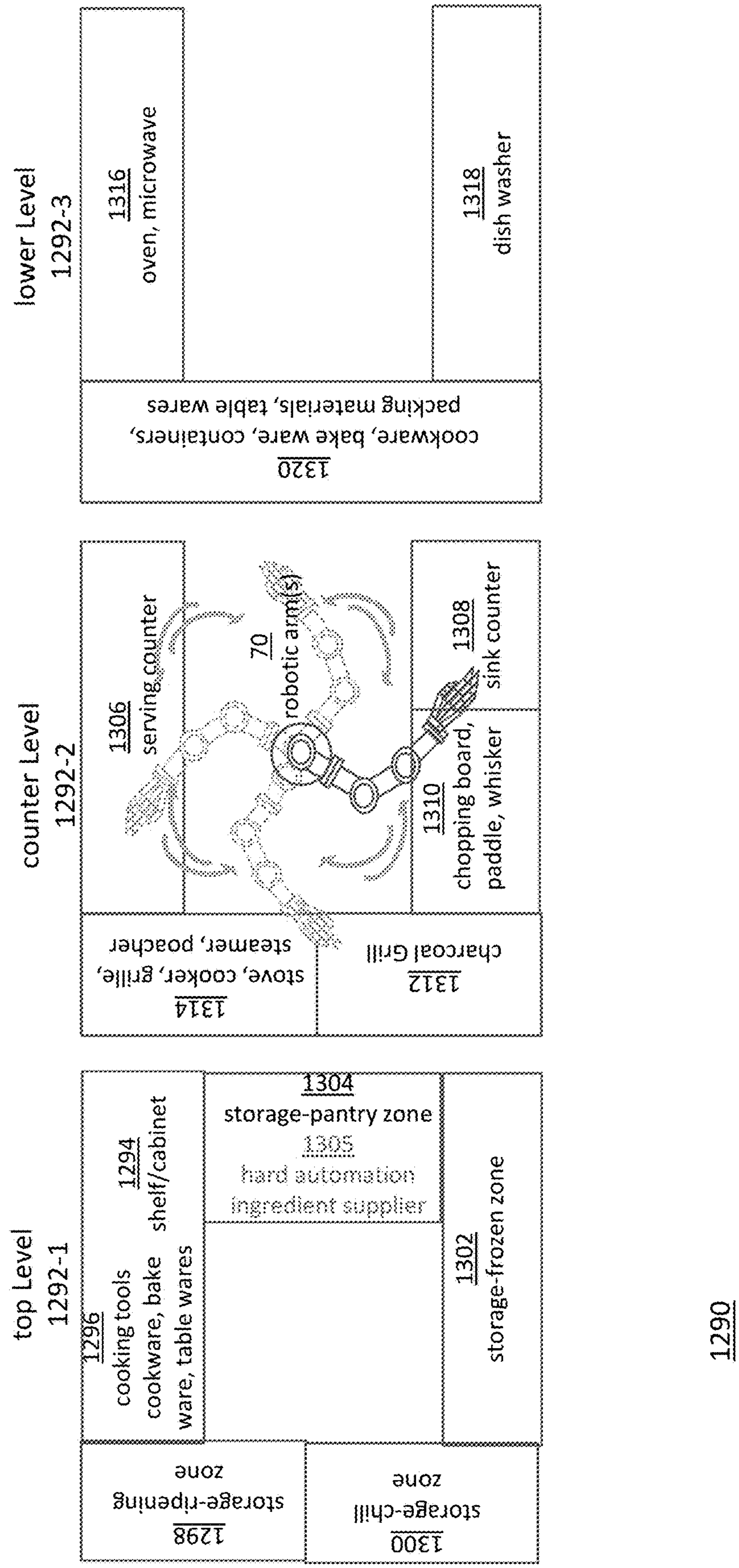
FIG. 42A is block diagram illustrating a top plan view of the standardized robotic kitchen in accordance with the present disclosure.

FIG. 42A depicts one embodiment of a standardized robotic kitchen 50 in plan view 1290, whereby it should be understood that the elements therein could be arranged in a different layout. The standardized robotic kitchen 50 is divided in to three levels, namely the top level 1292-1, the counter level 1292-2 and the lower level 1292-3.

The top level 1292-1 contains multiple cabinet-type modules with different units to perform specific kitchen functions by way of built-in appliances and equipment. At the simplest level a shelf/cabinet storage area 1294 is included, a cabinet volume 1296 used for storing and accessing cooking tools and utensils and other cooking and serving ware (cooking, baking, plating, etc.), a storage ripening cabinet volume 1298 for particular ingredients (e.g. fruit and vegetables, etc.), a chilled storage zone 1300 for such items as lettuce and onions, a frozen storage cabinet volume 1302 for deep-frozen items, another storage pantry zone 1304 for other ingredients and rarely used spices, and a hard automation ingredient supplier 1305, and others.

The counter level 1292-2 not only houses the robotic arms 70, but also includes a serving counter 1306, a counter area with a sink 1308, another counter area 1310 with removable working surfaces (cutting/chopping board, etc.), a charcoal-based slatted grill 1312 and a multi-purpose area for other cooking appliances 1314, including a stove, cooker, steamer and poacher.

The lower level 1292-3 houses the combination convection oven and microwave 1316, the dish-washer 1318 and a larger cabinet volume 1320 that holds and stores additional frequently used cooking and baking ware, as well as tableware and packing materials and cutlery.

Figure 42B:
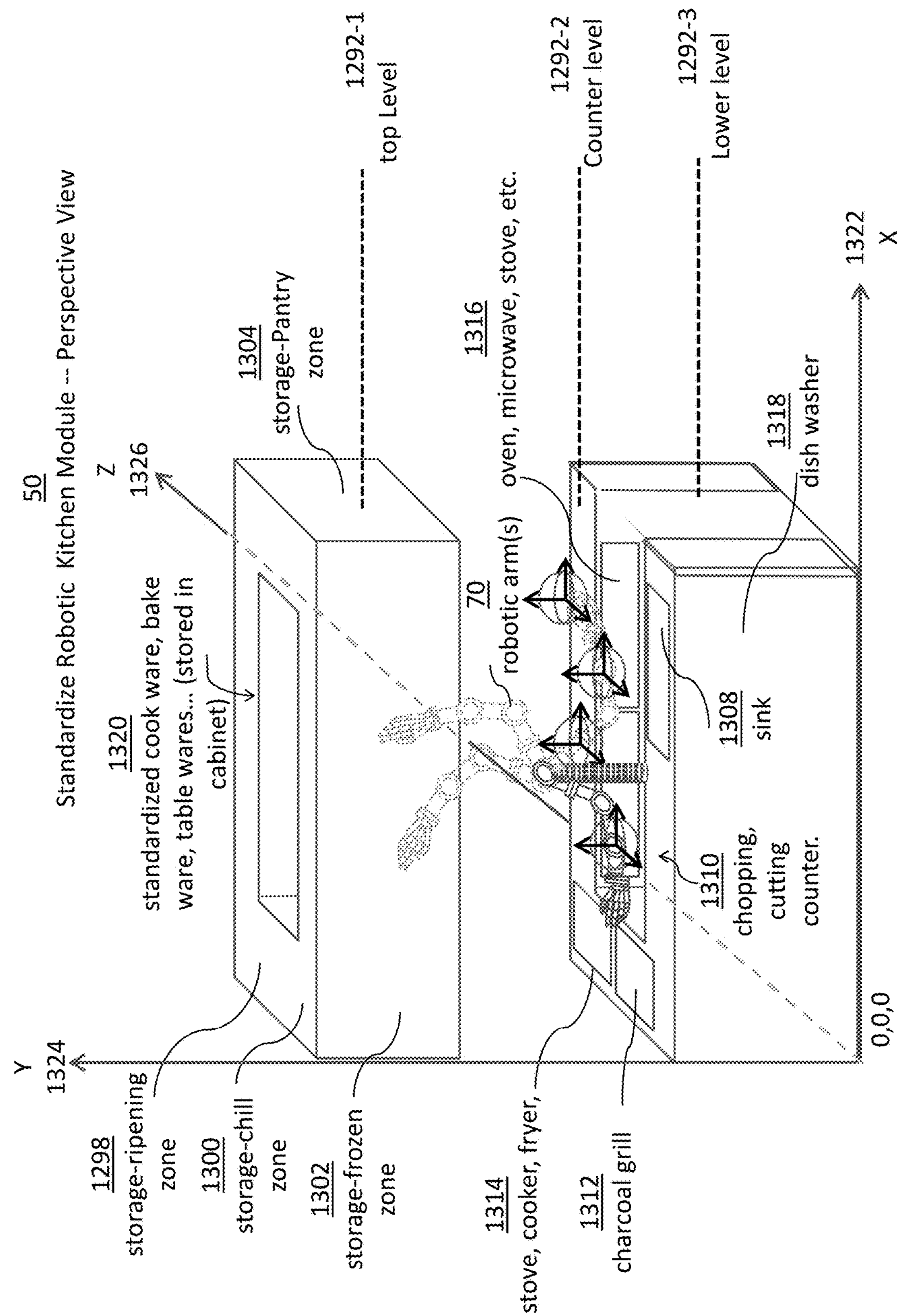
FIG. 42B is a block diagram illustrating a perspective plan view of the standardized robotic kitchen in accordance with the present disclosure.

FIG. 42B depicts a perspective view 50 of the standardized robotic kitchen, depicting the locations of the top level 1292-1, counter level 1292-2 and the lower level 1294-3, within an xyz coordinate frame with axes for x 1322, y 1324 and z 1326 to allow for proper geometric referencing for positioning of the robotic arms 34 within the standardized robotic kitchen.

The perspective view of the robotic kitchen 50 clearly identifies one of the many possible layouts and locations for equipment at all three levels, including the top level 1292-1 (storage pantry 1304, standardized cooking tools and ware 1320, storage ripening zone 1298, chilled storage zone 1300, and frozen storage zone 1302, the counter level 1292-2 (robotic arms 70, sink 1308, chopping/cutting area 1310, charcoal grill 1312, cooking appliances 1314 and serving counter 1306) and the lower level (dish-washer 1318 and oven and microwave 1316).

Figure 43A:
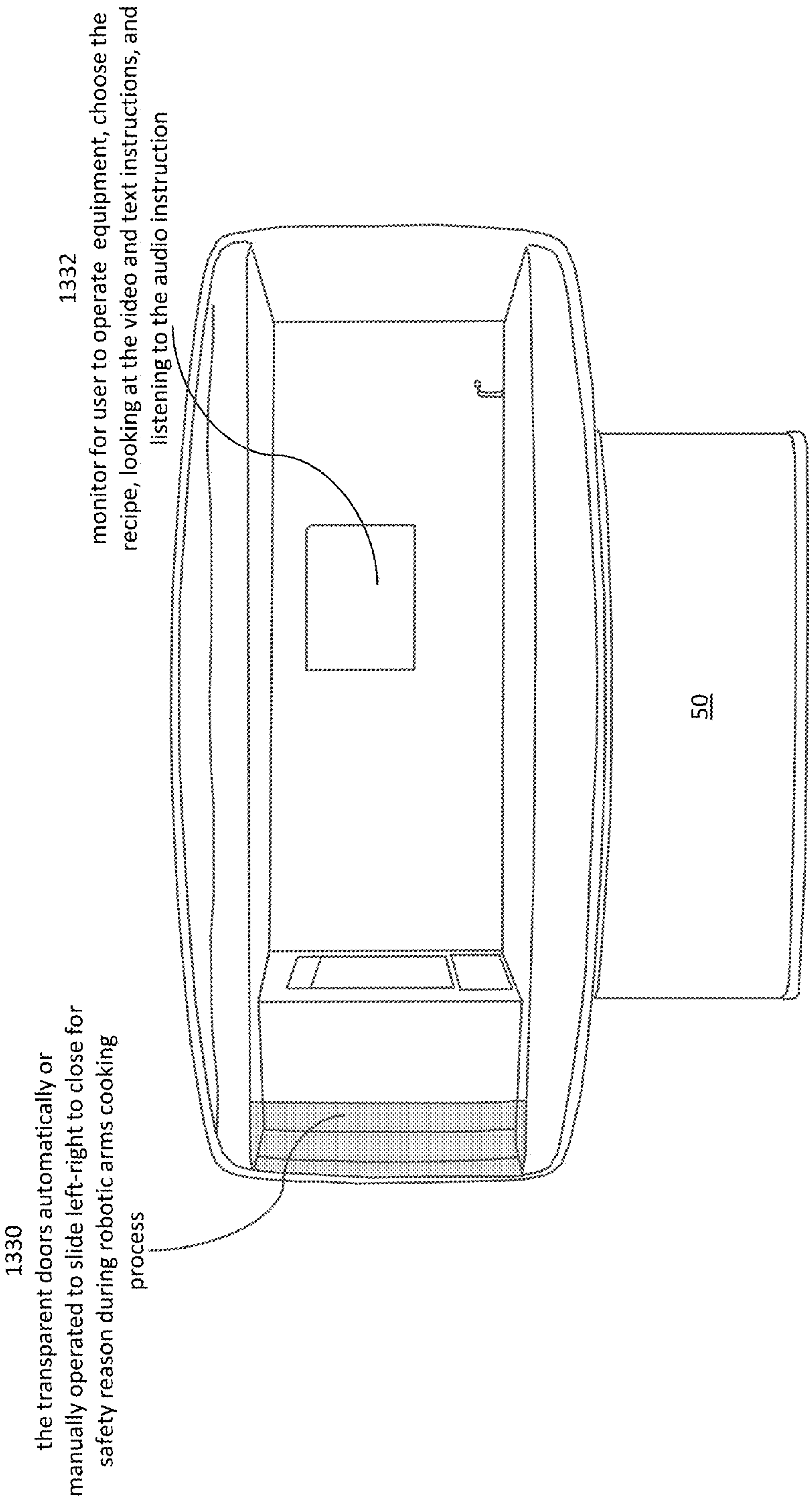
FIGS. 43A-B are block diagrams illustrating a first embodiment of the kitchen module frame with automatic transparent doors in the standardized robotic kitchen in accordance with the present disclosure.

FIG. 43A depicts a plan view of one possible physical embodiment of the standardized robotic kitchen layout, where the kitchen is built into a more linear substantially rectangular horizontal layout depicting a built-in monitor 1332 for a user to operate the equipment, choose a recipe, watch video and listen to the recorded chef's instructions, as well as automatically computer-controlled (or manually operated) left/right movable transparent doors 1330 for enclosing the open faces of the standardized robotic cooking volume during operation of the robotic arms.

Figure 43B:
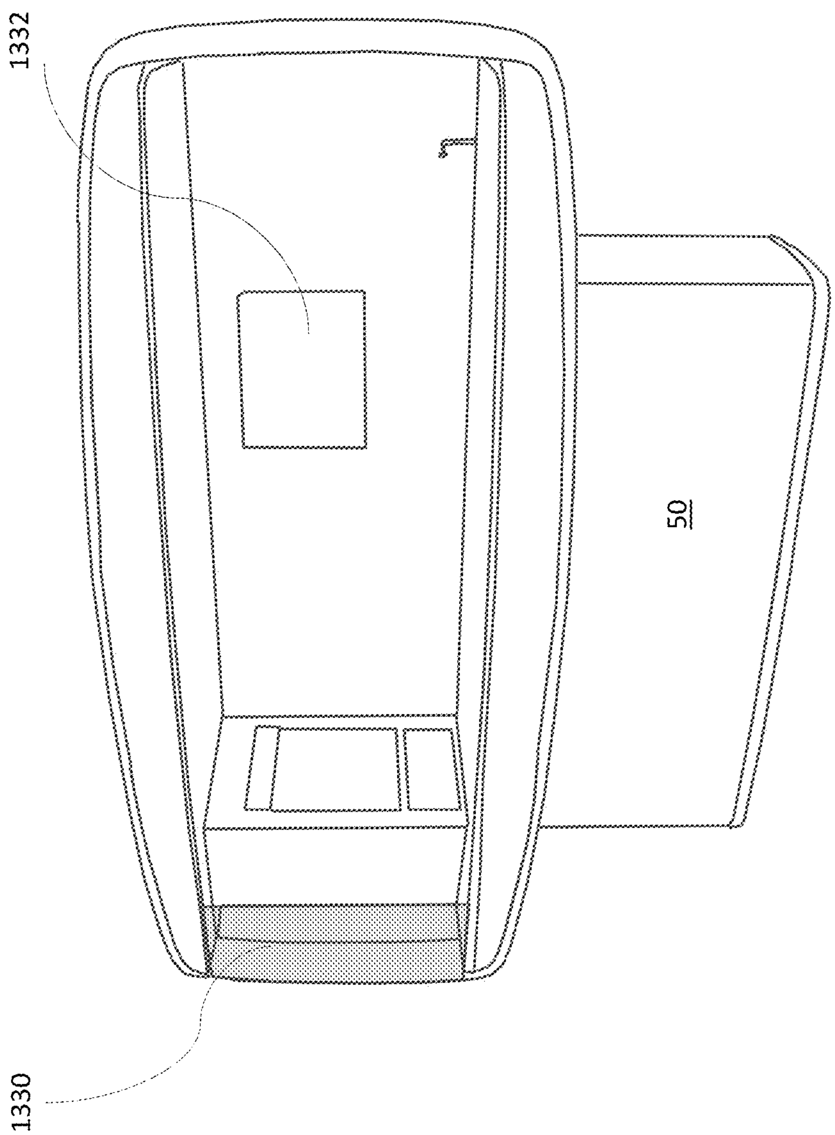

FIG. 43B depicts a perspective view of one physical embodiment of the standardized robotic kitchen layout, where the kitchen is built into a more linear substantially rectangular horizontal layout depicting a built-in monitor 1332 for a user to operate the equipment, choose a recipe, watch video and listen to the recorded chef's instructions, as well as automatically computer-controlled left/right movable transparent doors 1330 for enclosing the open faces of the standardized robotic cooking volume during operation of the robotic arms.

Figure 44A:
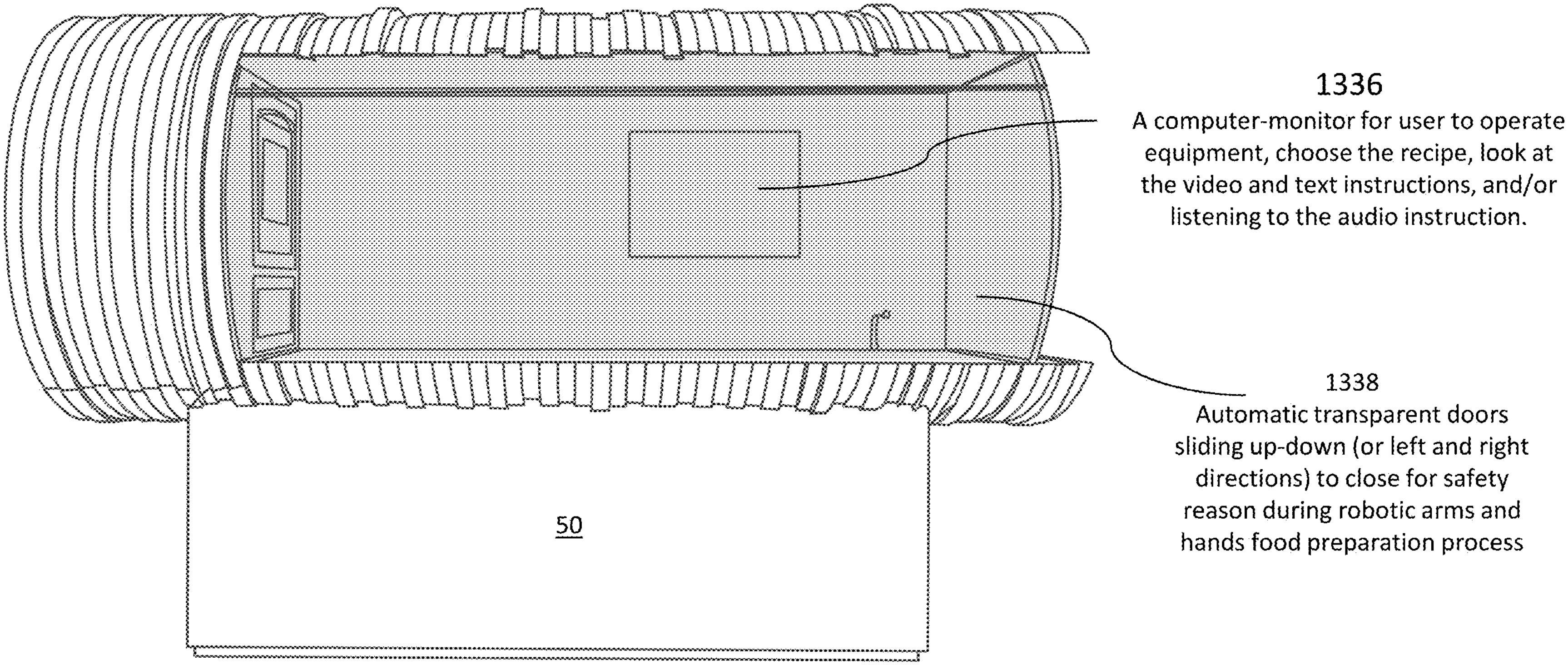
FIGS. 44A-B are block diagrams illustrating a second embodiment of the kitchen module frame with automatic transparent doors in the standardized robotic kitchen in accordance with the present disclosure.

FIG. 44A depicts a plan view of another physical embodiment of the standardized robotic kitchen layout, where the kitchen is built into a more linear substantially rectangular horizontal layout depicting a built-in monitor 1336 for a user to operate the equipment, choose a recipe, watch video and listen to the recorded chef's instructions, as well as automatically computer-controlled up/down movable transparent doors 1338 for enclosing the open faces of the standardized robotic cooking volume during operation of the robotic arms and hands. Alternatively, the movable transparent doors 1338 can be computer-controlled to move in the horizontal left and right directions, which can occur automatically by sensors or pressing of tab or button a human, or voice activated.

Figure 44B:
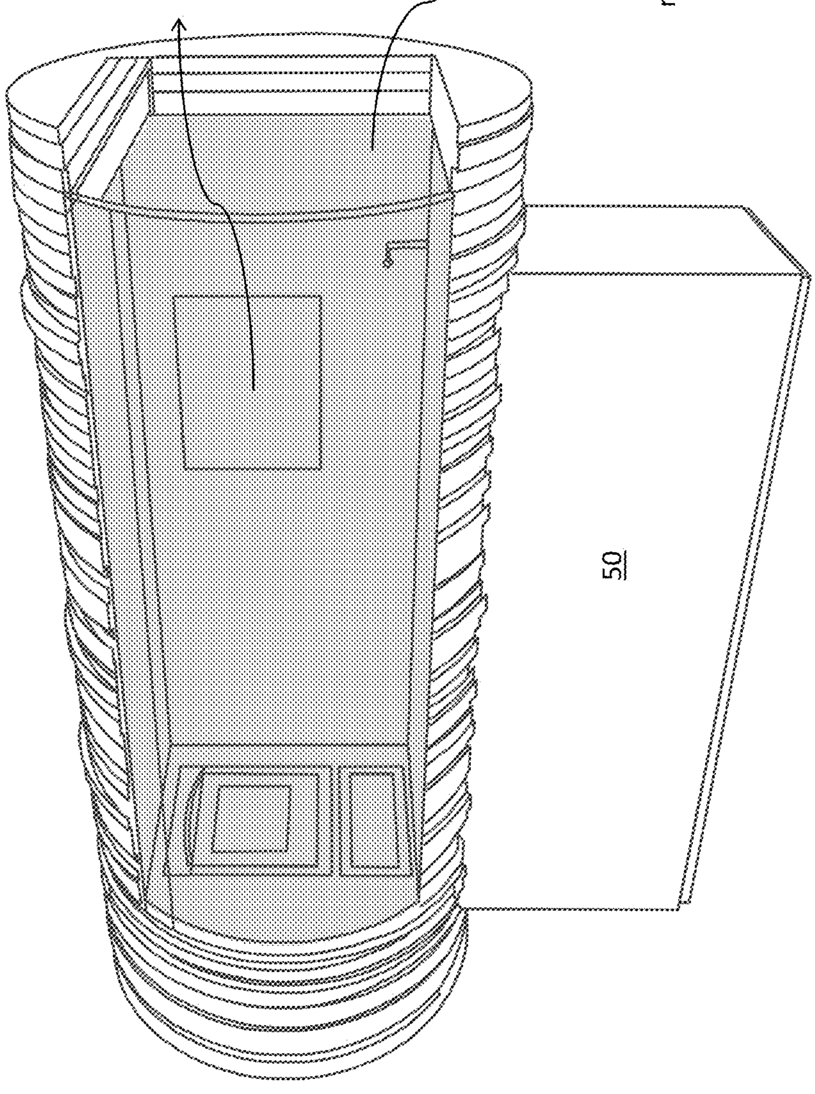

FIG. 44B depicts a perspective view of another possible physical embodiment of the standardized robotic kitchen layout, where the kitchen is built into a more linear substantially rectangular horizontal layout depicting a built-in monitor 1340 for a user to operate the equipment, choose a recipe, watch video and listen to the recorded chef's instructions, as well as automatically computer-controlled up/down movable transparent doors 1342 for enclosing the open faces of the standardized robotic cooking volume during operation of the robotic arms.

Figure 45:
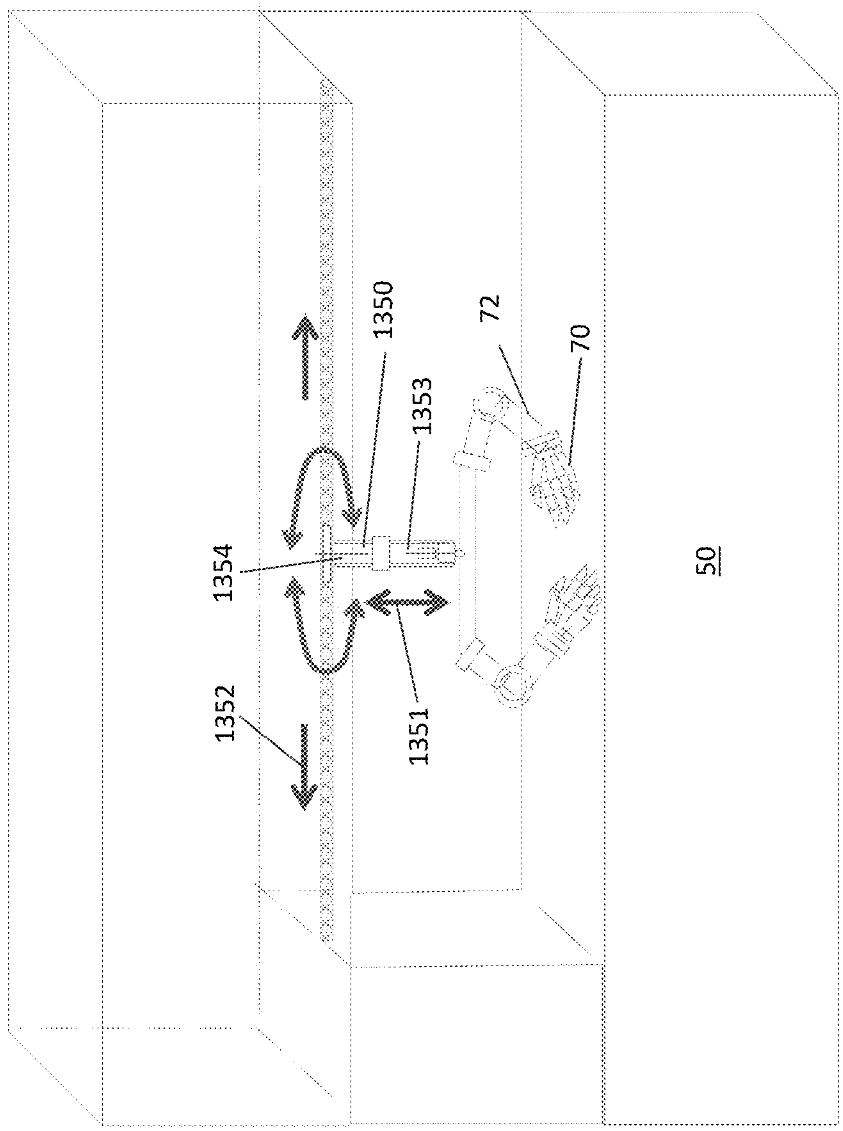
FIG. 45 is a block diagram illustrating the standardized robotic kitchen with a telescopic actuator in accordance with the present disclosure.

FIG. 45 depicts a perspective layout view of a telescopic life 1350 in the standardized robotic kitchen 50 in which a pair of robotic arms, wrists and multi-fingered hands move as a unit on a prismatically (through linear staged extension) and telescopically actuated torso along the vertical y-axis 1351 and the horizontal x-axis 1352, as well as rotationally about the vertical y-axis running through the centerline of its own torso. One or more actuators 1353 are embedded in the torso and upper level to allow the linear and rotary motions to allow the robotic arms 72 and the robotic hands 70 to be moved to different places in the standardized robotic kitchen during all parts of the replication of the recipe spelled out in the recipe script. These multiple motions are necessary to be able to properly replicate the motions of a human chef 49 as observed in the chef studio kitchen setup during the creation of the dish when cooked by the human chef. A panning (rotational) actuator 1354 on the telescopic actuator 1350 at the base of the left/right translational stage allows at least the partial rotation of the robot arms 70, akin to a chef turning its shoulders or torso for dexterity or orientation reasons—otherwise one would be limited to cooking in a single plane.

Figure 46A:
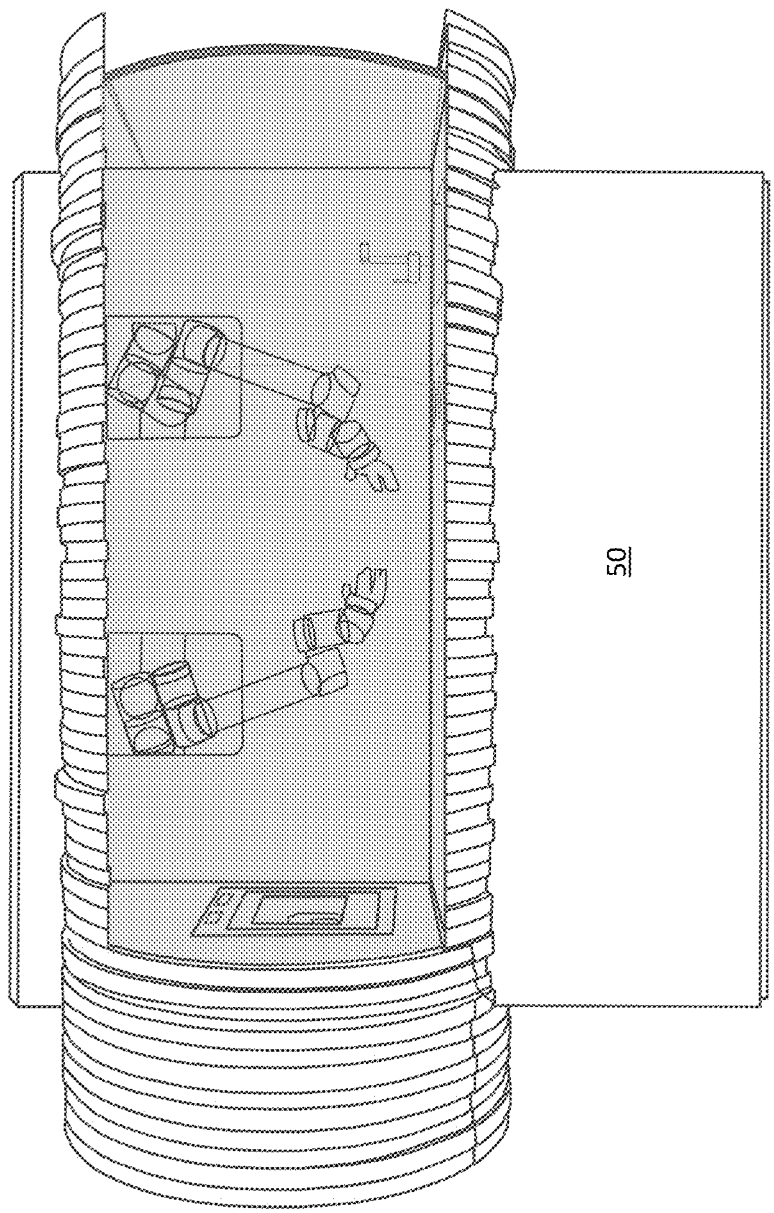
FIG. 46A is a block diagram illustrating a front view of the standardized robotic kitchen with a pair of fixed robotic arms with no moving railings in accordance with the present disclosure.

FIG. 46A depicts a plan view of one physical embodiment 1356 of the standardized robotic kitchen module 50, where the kitchen is built into a more linear substantially rectangular horizontal layout depicting a set of dual robotic arms with wrists and multi-fingered hands, where each of the arm bases is mounted neither on a set of movable rails nor on a rotatable torso, but rather rigidly and unmovably mounted on one and the same of the robotic kitchen vertical surfaces, thereby defining and fixing the location and dimensions of the robotic torso, yet still allowing both robotic arms to work collaboratively and reach all areas of the cooking surfaces and equipment.

Figure 46B:
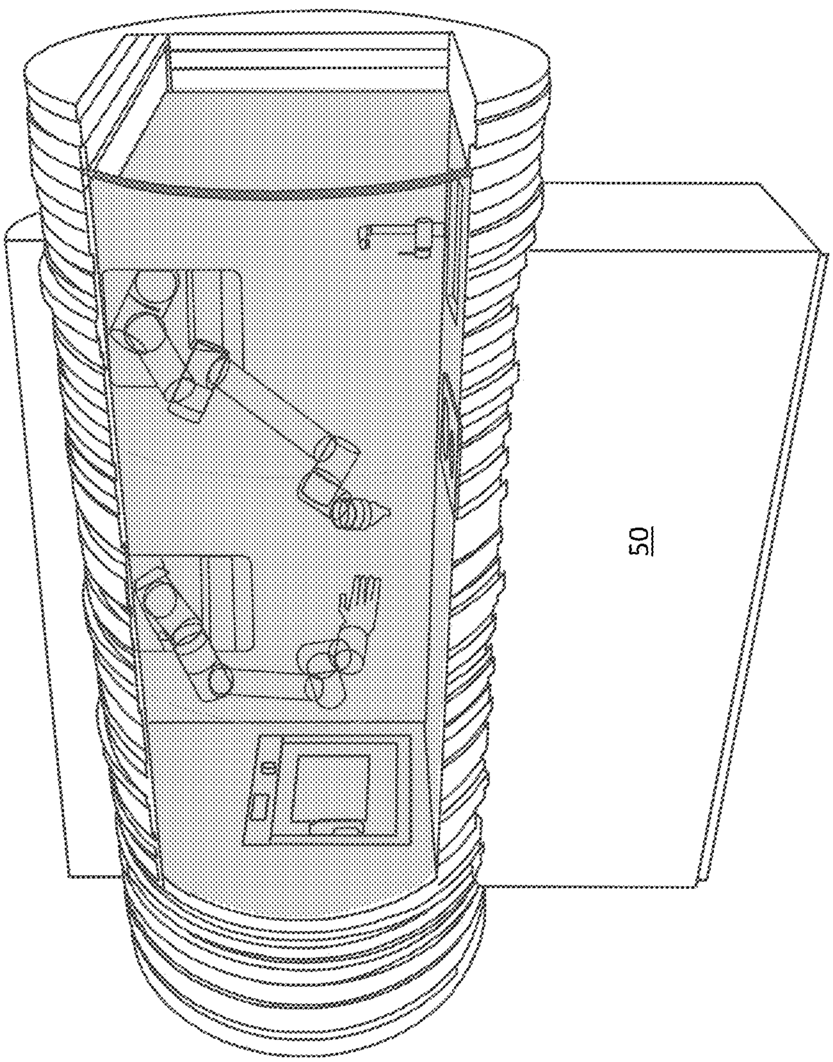
FIG. 46B is a block diagram illustrating an angular view of the standardized robotic kitchen with a pair of fixed robotic arms with no moving railings in accordance with the present disclosure.

FIG. 46B depicts a perspective view of one physical embodiment 1358 of the standardized robotic kitchen layout, where the kitchen is built into a more linear substantially rectangular horizontal layout depicting a set of dual robotic arms with wrists and multi-fingered hands, where each of the arm bases is not mounted neither on a set of movable rails nor on a rotatable torso, but rather rigidly and unmovably mounted on one and the same of the robotic kitchen vertical surfaces, thereby defining and fixing the location and dimensions of the robotic torso, yet still allowing both robotic arms to work collaboratively and reach all areas of the cooking surfaces and equipment (oven on back wall, cooktop beneath the robotic arms and sink to one side of the robotic arms).

Figure 46C:
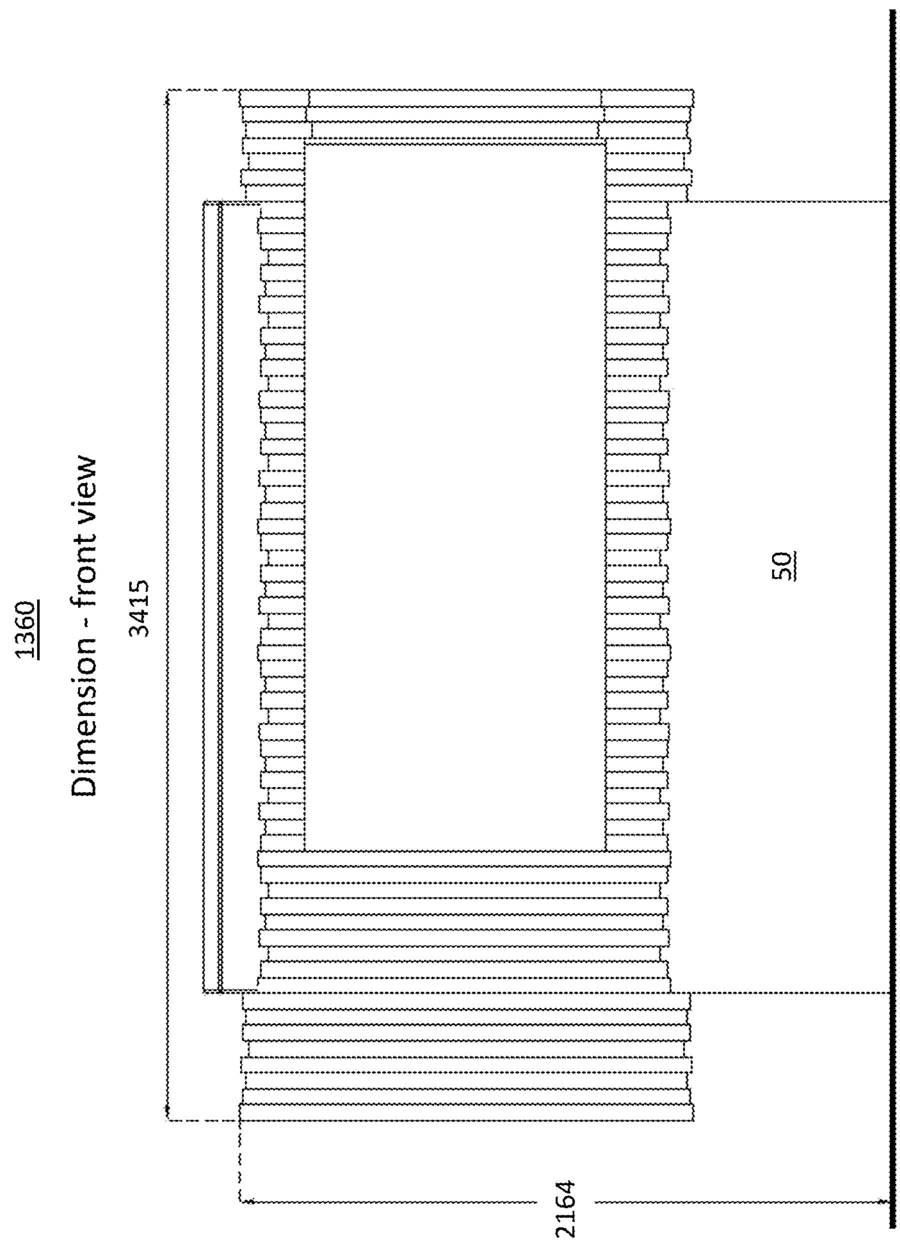
FIGS. 46C-G are block diagrams illustrating examples of various dimensions in the standardized robotic kitchen with a pair of fixed robotic arms with no moving railings in accordance with the present disclosure.
Figure 46D:
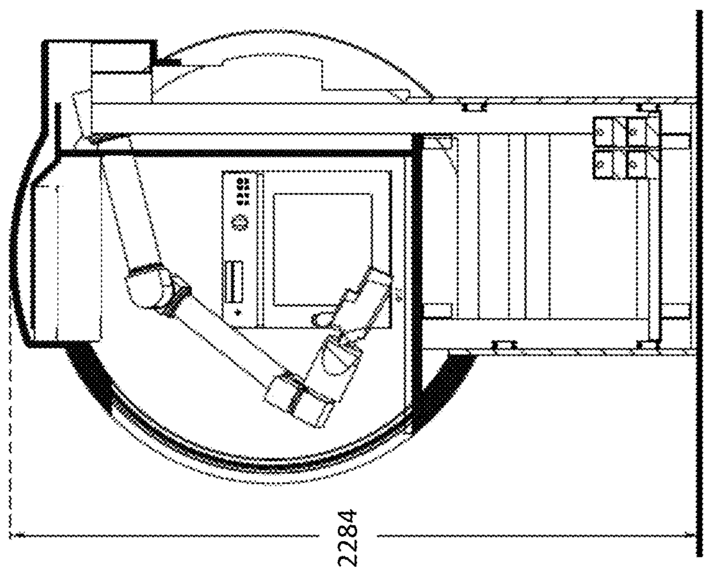
Figure 46E:
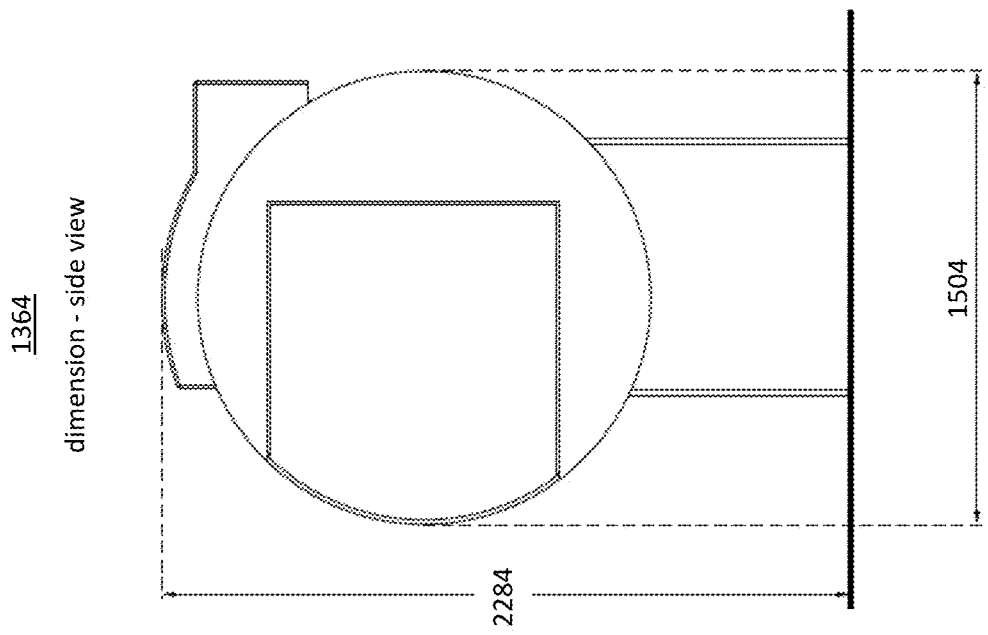
Figure 46F:
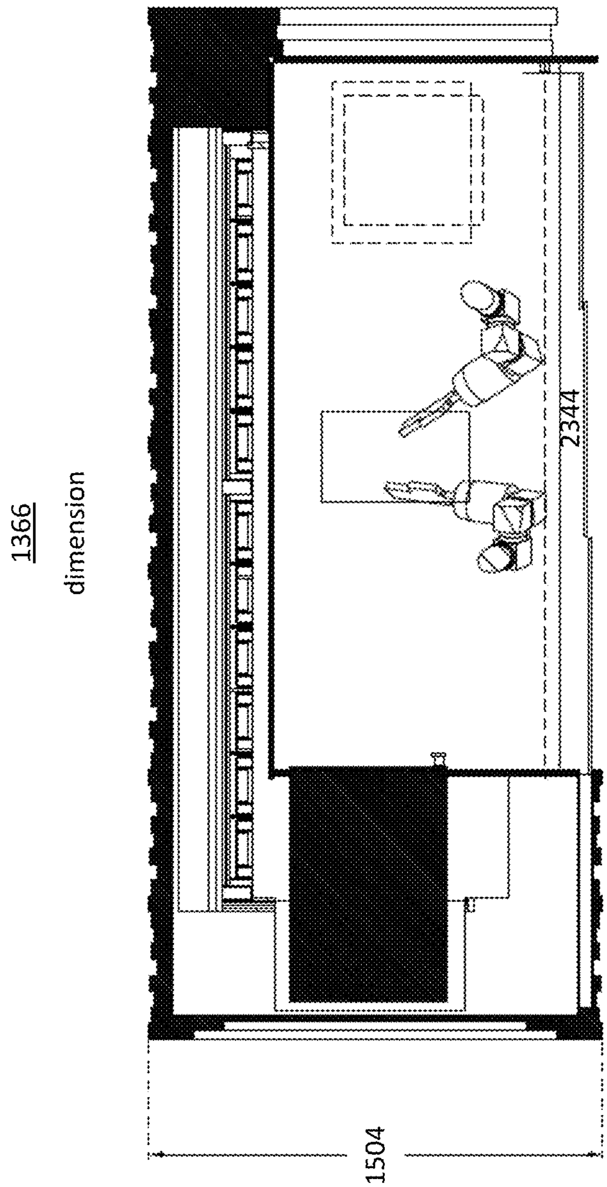
Figure 46G:
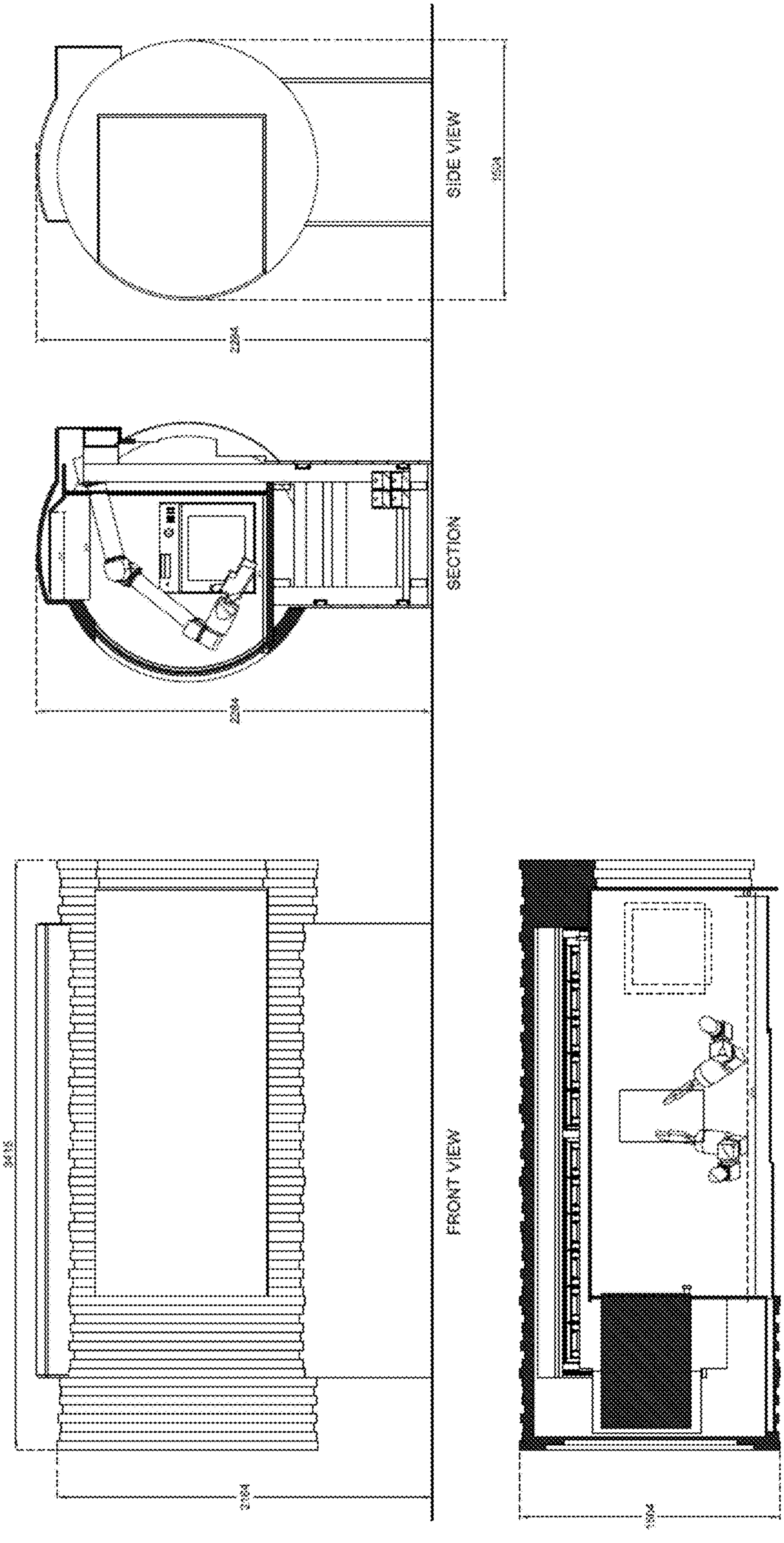

FIG. 46C depicts a dimensioned front view of one possible physical embodiment 1360 of the standardized robotic kitchen, denoting its height along the y-axis and width along the x-axis to be 2284 mm overall. FIG. 46D depicts a dimensioned side section view of one physical embodiment 1362 as an example of the standardized robotic kitchen 50, denoting its height along the y-axis to be 2164 mm and 3415 mm, respectively. This embodiment does not limit the present disclosure but provide one example embodiment. FIG. 46E depicts a dimensioned side view of one physical embodiment 1364 of the standardized robotic kitchen, denoting its height along the y-axis and depth along the z-axis to be 2284 mm and 1504 mm, respectively. FIG. 46F depicts a dimensioned top section view of one physical embodiment 1366 of the standardized robotic kitchen, including a pair of robotic arms 1368, denoting the depth of the entire robotic kitchen module along the z-axis to be 1504 mm overall. FIG. 46G depicts a three-view, augmented by a section-view, of one physical embodiment as another example of the standardized robotic kitchen, showing the overall length along the x-axis to be 3415 mm, the overall height along the y-axis to be 2164 mm, and the overall depth along the z-axis to be 1504 mm, where the overall height in the sectional side-view indicates an overall height along the z-axis of 2284 mm.

Figure 47:
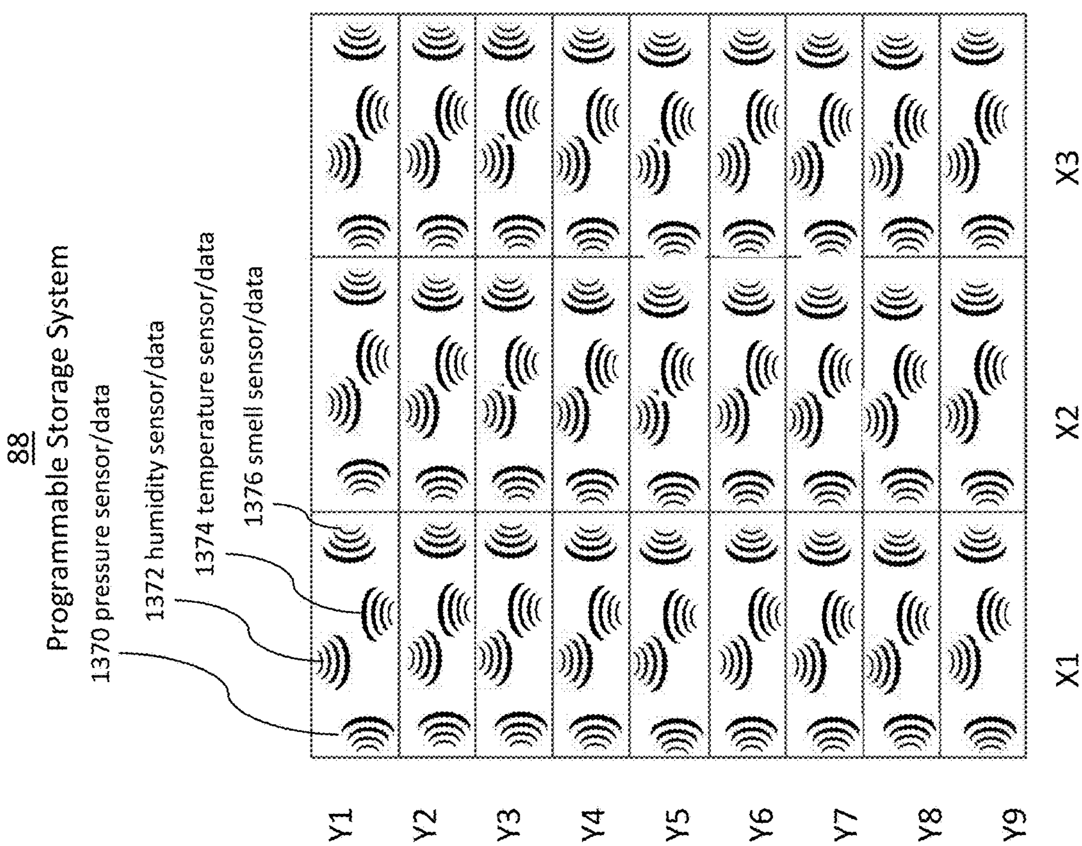
FIG. 47 is a block diagram illustrating a program storage system for use with the standardized robotic kitchen in accordance with the present disclosure.

FIG. 47 is a block diagram illustrating a programmable storage system 88 for use with the standardized robotic kitchen 50. The programmable storage system 88 is structured in the standardized robotic kitchen 50 based on the relative xy position coordinates within the programmable storage system 88. In this example, the programmable storage system 88 has twenty seven (27; arranged in a 9×3 matrix) storage locations that have nine columns and three rows. The programmable storage system 88 can serve as the freezer location or the refrigeration location. In this embodiment, each of the twenty-seven programmable storage locations includes four types of sensors: a pressure sensor 1370, a humidity sensor 1372, a temperature sensor 1374, and a smell (olfactory) sensor 1376. With each storage location recognizable by its xy coordinates, the robotic apparatus 75 is able to access a selected programmable storage location to obtain the necessary food item(s) in the location to prepare a dish. The computer 16 can also monitor each programmable storage location for the proper temperature, proper humidity, proper pressure, and proper smell profiles to ensure optimal storage conditions for particular food items or ingredients are monitored and maintained.

FIG. 48 depicts an elevation view of the container storage station 86, where temperature, humidity and relative oxygen content (and other room conditions) can be monitored and controlled by a computer. Included in this storage container unit can be, but it is not limited to, a pantry/dry storage area 1304, a ripening area 1298 with separately controllable temperature and humidity (for fruit/vegetables), of importance to wine, a chiller unit 1300 for lower temperature storage for produce/fruit/meats so as to optimize shelf life, and a freezer unit 1302 for long-term storage of other items (meats, baked goods, seafood, ice cream, etc.).

Figure 49:
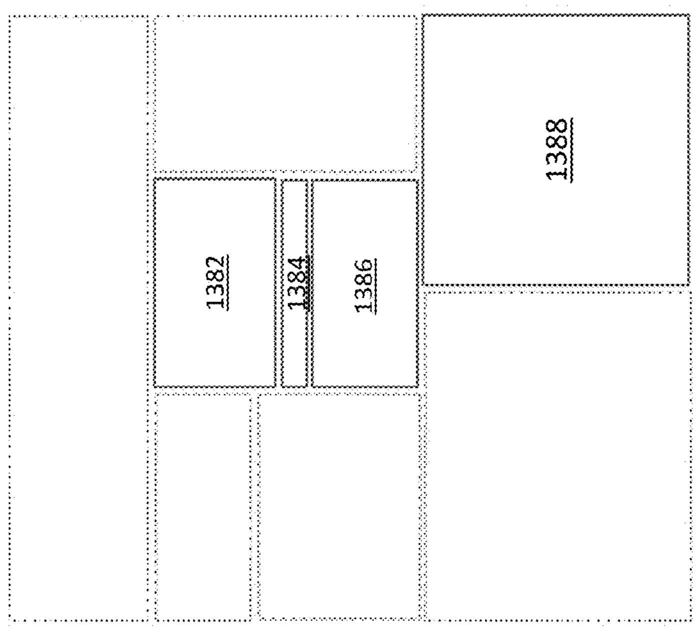
FIG. 49 is a block diagram illustrating an elevation view of ingredient access containers for use with the standardized robotic kitchen in accordance with the present disclosure.

FIG. 49 depicts an elevation view of ingredient containers 1380 to be accessed by a human chef and the robotic arms and multi-fingered hands. This section of the standardized robotic kitchen includes, but is not necessarily limited to, multiple units including an ingredient quality monitoring dashboard (display) 1382, a computerized measurement unit 1384, which includes a barcode scanner, camera and scale, a separate countertop 1386 with automated rack-shelving for ingredient check-in and check-out, and a recycling unit 1388 for disposal of recyclable hard (glass, aluminum, metals, etc.) and soft goods (food rests and scraps, etc.) suitable for recycling.

FIG. 50 depicts the ingredient quality-monitoring dashboard 1390, which is a computer-controlled display for use by the human chef. The display allows the user to view multiple items of importance to the ingredient-supply and ingredient-quality aspect of human and robotic cooking. These include the display of the ingredient inventory overview 1392 outlining what is available, the individual ingredient selected and its nutritional content and relative distribution 1394, the amount and dedicated storage as a function of storage category 1396 (meats, vegetables, etc.), a schedule 1398 depicting pending expiry dates and fulfillment/replenishment dates and items, an area for any kinds of alerts 1400 (sensed spoilage, abnormal temperatures or malfunctions, etc.), and the option of voice-interpreter command input 1402, to allow the human user to interact with the computerized inventory system by way of the dashboard 1390.

Figure 51:
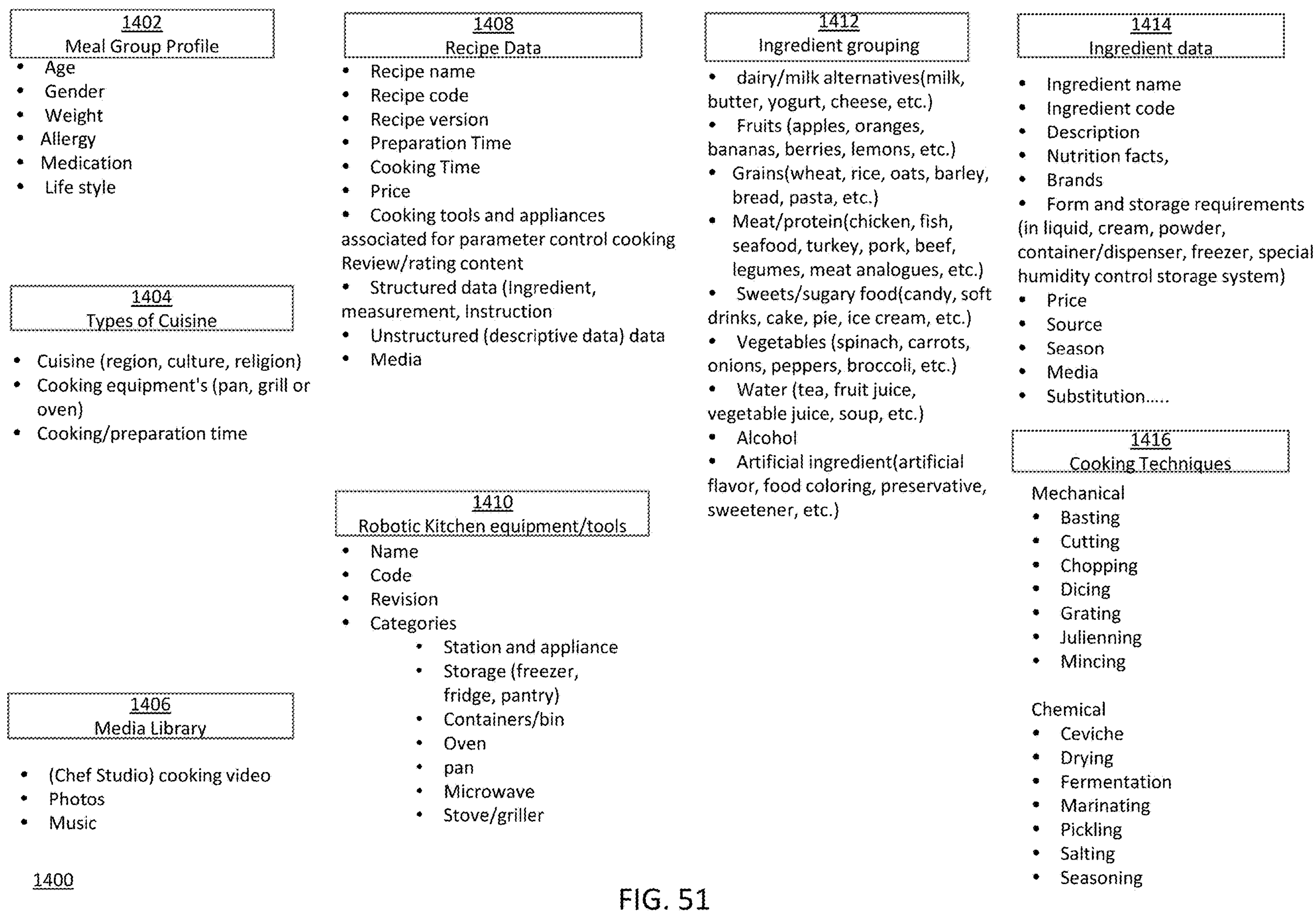
FIG. 51 is a table illustrating a database library of recipe parameters in accordance with the present disclosure.

FIG. 51 is a table illustrating one example of a library database 1400 of recipe parameters. The library database 1400 of recipe parameters includes many categories: a meal grouping profile 1402, types of cuisine 1404, a media library 1406, recipe data 1408, robotic kitchen tools and equipment 1410, ingredient groupings 1412, ingredient data 1414, and cooking techniques 1416. Each of these categories provides a listing of the detailed choices that are available in selecting a recipe. The meal group profile includes parameters like age, gender, weight, allergy, medication and lifestyle. The types of cuisine group profile 1404 include cuisine type by region, culture, or religion, and the types of cooking equipment group profile 1410 include items such as pan, grill, or oven and the cooking duration time. The recipe data grouping profile 1408 contains such items as the recipe name, version, cooking and preparation time, tools and appliances needed, etc. The ingredient grouping profile 1412 contains ingredients grouped into items such as dairy products, fruit and vegetables, grains and other carbohydrates, fluids of various types, and protein of various kinds (meats, beans), etc. The ingredient data group profile 1414 contains ingredient descriptor data such as the name, description, nutritional information, storage and handling instructions, etc. The cooking techniques group profile 1416 contains information on specific cooking techniques grouped into such areas as mechanical techniques (basting, chopping, grating, mincing, etc.) and chemical processing techniques (marinating, pickling, fermenting, smoking, etc.).

Figure 52:
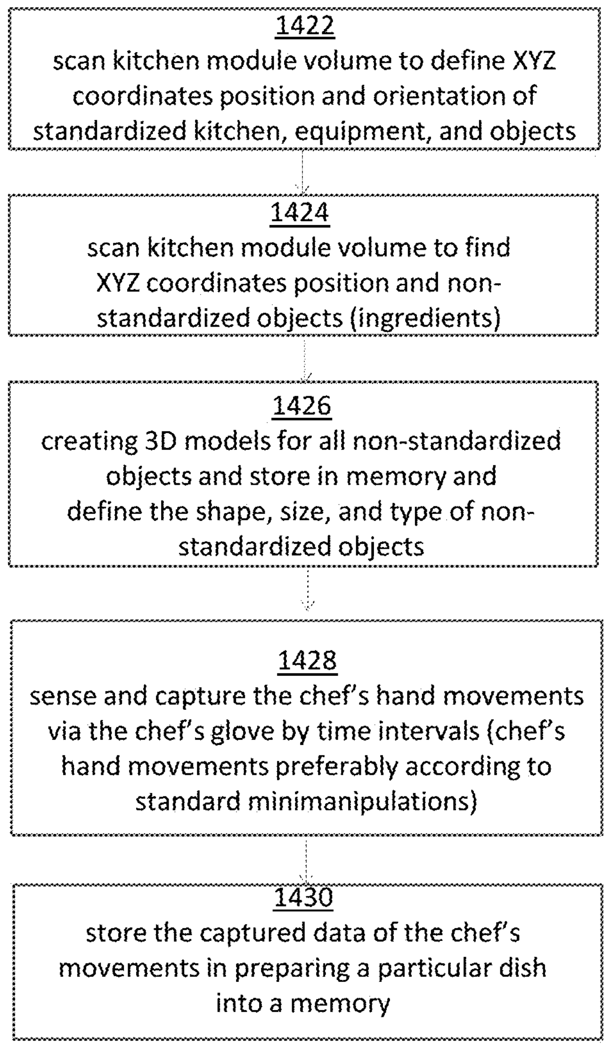
FIG. 52 is a flow diagram illustrating the process of one embodiment of recording a chef's food preparation process in accordance with the present disclosure.

FIG. 52 is a flow diagram illustrating one embodiment of the process 1420 of one embodiment of recording a chef's food preparation process. At step 1422 in the chef studio 44, the multimodal three-dimensional sensors 20 scan the kitchen module volume to define xyz coordinates position and orientation of the standardized kitchen equipment and all objects therein, whether static or dynamic. At step 1424, the multimodal three-dimensional sensors 20 scan the kitchen module's volume to find xyz coordinates position of non-standardized objects, such as ingredients. At step 1426, the computer 16 creates three-dimensional models for all non-standardized objects and stores their type and attributes (size, dimensions, usage, etc.) in the computer's system memory, either on a computing device or on a cloud computing environment, and defines the shape, size and type of the non-standardized objects. At step 1428, the chef movements recording module 98 is configured to sense and capture the chef's arm, wrist and hand movements via the chef's gloves in successive time intervals (chef's hand movements preferably identified and classified according to standard minimanipulations). At step 1430, the computer 16 stores the sensed and captured data of the chef's movements in preparing a food dish into a computer's memory storage device(s).

Figure 53:
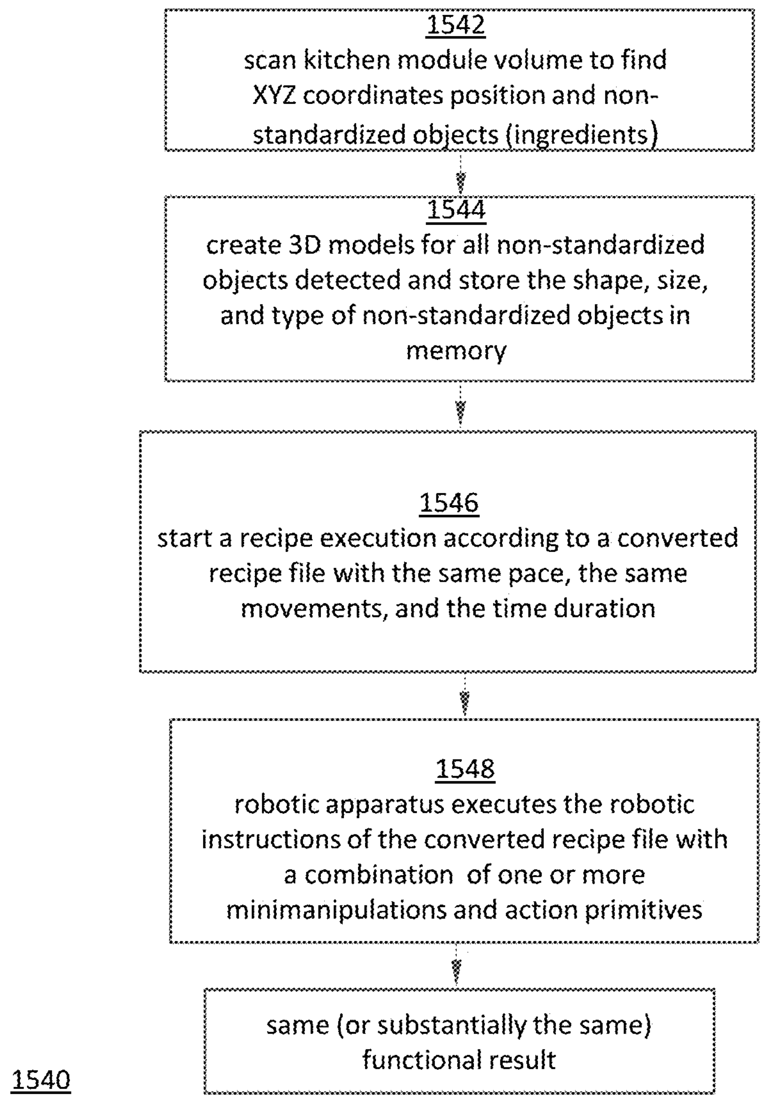
FIG. 53 is a flow diagram illustrating the process of one embodiment of a robotic apparatus preparing a food dish in accordance with the present disclosure.

FIG. 53 is a flow diagram illustrating one embodiment of the process 1440 of one embodiment of a robotic apparatus 75 preparing a food dish. At step 1442, the multimodal three-dimensional sensors 20 in the robotic kitchen 48 scan the kitchen module's volume to find xyz position coordinates of non-standardized objects (ingredients, etc.). At step 1444, the multimodal three-dimensional sensors 20 in the robotic kitchen 48 create three-dimensional models for non-standardized objects detected in the standardized robotic kitchen 50 and store the shape, size and type of non-standardized objects in the computer's memory. At step 1446, the robotic cooking module 110 starts a recipe's execution according to a converted recipe file by replicating the chef's food preparation process with the same pace, with the same movements, and with similar time duration. At step 1448, the robotic apparatus 75 executes the robotic instructions of the converted recipe file with a combination of one or more minimanipulations and action primitives, thereby resulting in the robotic apparatus 75 in the robotic standardized kitchen preparing the food dish with the same result or substantially the same result as if the chef 49 had prepared the food dish himself or herself.

Figure 54:
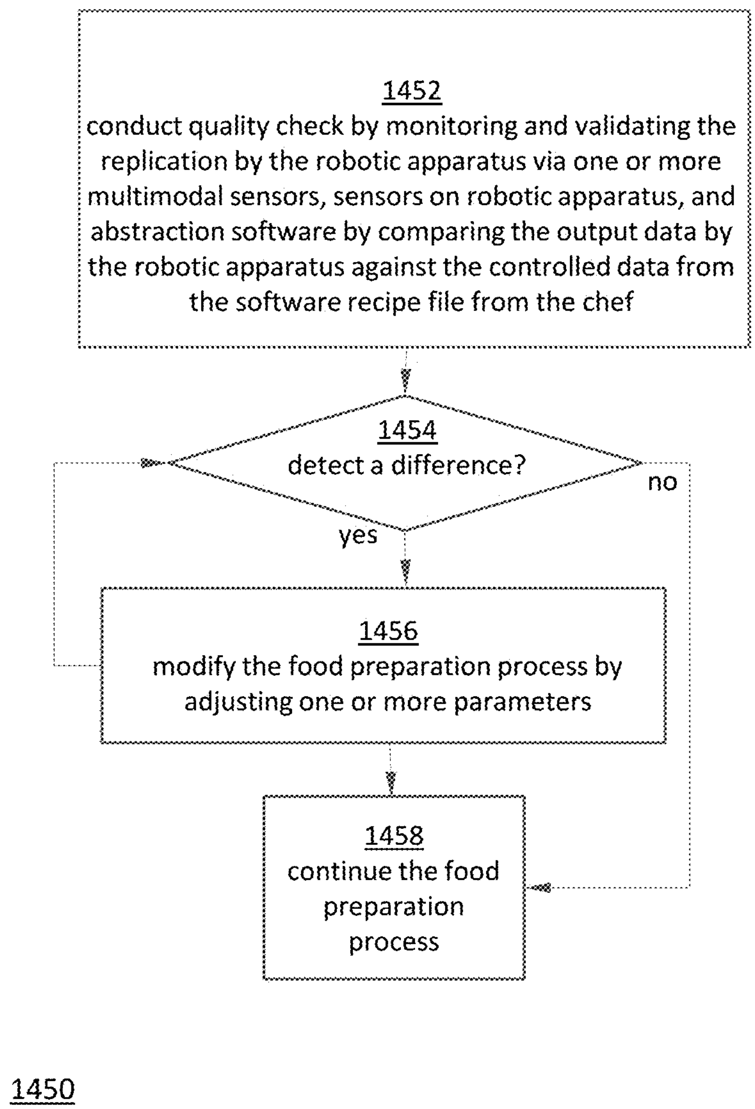
FIG. 54 is a flow diagram illustrating the process of one embodiment in the quality and function adjustment in obtaining the same (or substantially the same result) in a food dish preparation by a robotic relative to a chef in accordance with the present disclosure.

FIG. 54 is a flow diagram illustrating the process of one embodiment in the quality and function adjustment 1450 in obtaining the same or substantially the same result in a food dish preparation by a robotic relative to a chef. At step 1452, the quality check module 56 is configured to conduct a quality check by monitoring and validating the recipe replication process by the robotic apparatus 75 via one or more multimodal sensors, sensors on the robotic apparatus 75, and using abstraction software to compare the output data from the robotic apparatus 75 against the controlled data from the software recipe file created by monitoring and abstracting the cooking processes carried out by the human chef in the chef studio version of the standardized robotic kitchen while executing the same recipe. In step 1454, the robotic food preparation engine 56 is configured to detect and determine any difference(s) that would require the robotic apparatus 75 to adjust the food preparation process, such as at least monitoring for the difference in the size, shape, or orientation of an ingredient. If there is a difference, the robotic food preparation engine 56 is configured to modify the food preparation process by adjusting one or more parameters for that particular food dish processing step based on the raw and processed sensory input data. A determination for acting on a potential difference between the sensed and abstraction process progress compared to the stored process variables in the recipe script is made in step 1454. If the process results of the cooking process in the standardized robotic kitchen are identical to those spelled out in the recipe script for the process step, the food preparation process continues as described in the recipe script. Should a modification or adaptation to the process be required based on raw and processed sensory input data, the adaptation process 1556 is carried out by adjusting any parameters needed to ensure the process variables are brought into compliance with those prescribed in the recipe script for that process step. Upon successful conclusion of the adaptation process 1456, the food preparation process 1458 resumes as specified in the recipe script sequence.

Figure 55:
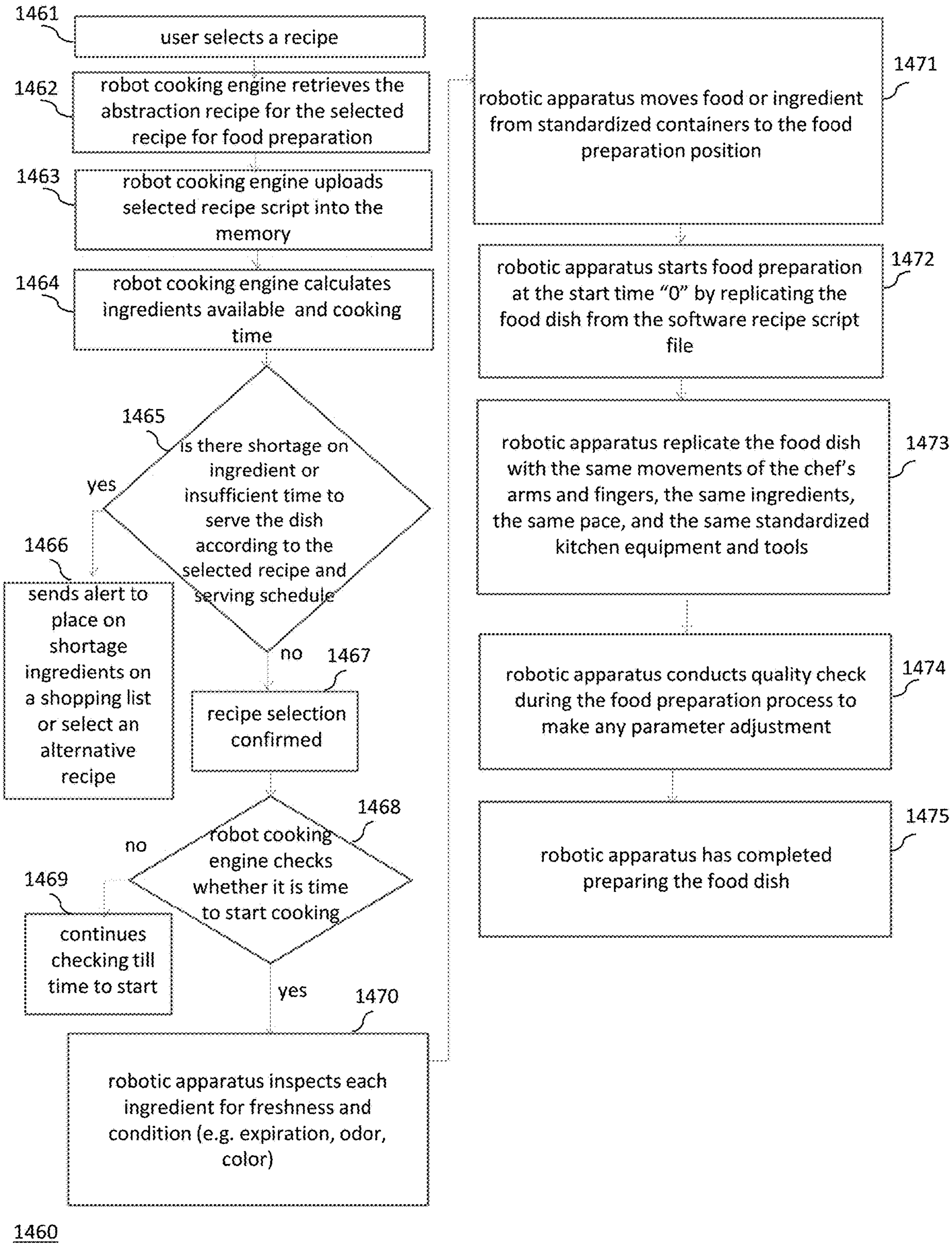
FIG. 55 is a flow diagram illustrating a first embodiment in the process of the robotic kitchen preparing a dish by replicating a chef's movements from a recorded software file in a robotic kitchen in accordance with the present disclosure.

FIG. 55 depicts a flow diagram illustrating a first embodiment in the process 1460 of the robotic kitchen preparing a dish by replicating a chef's movements from a recorded software file in a robotic kitchen. In step 1461, a user, through a computer, selects a particular recipe for the robotic apparatus 75 to prepare the food dish. In step 1462, the robotic food preparation engine 56 is configured to retrieve the abstraction recipe for the selected recipe for food preparation. In step 1463, the robotic food preparation engine 56 is configured to upload the selected recipe script into the computer's memory. In step 1464, the robotic food preparation engine 56 calculates the ingredient availability and the required cooking time. In step 1465, the robotic food preparation engine 56 is configured to raise an alert or notification if there is a shortage of ingredients or insufficient time to prepare the dish according to the selected recipe and serving schedule. The robotic food preparation engine 56 sends an alert to place missing or insufficient ingredients on a shopping list or selects an alternate recipe in step 1466. The recipe selection by the user is confirmed in step 1467. In step 1468, the robotic food preparation engine 56 is configured to check whether it is time to start preparing the recipe. The process 1460 pauses until the start time has arrived in step 1469. In step 1470, the robotic apparatus 75 inspects each ingredient for freshness and condition (e.g. purchase date, expiration date, odor, color). In step 1471, robotic food preparation engine 56 is configured to send instructions to the robotic apparatus 75 to move food or ingredients from standardized containers to the food preparation position. In step 1472, the robotic food preparation engine 56 is configured to instruct the robotic apparatus 75 to start food preparation at the start time "0" by replicating the food dish from the software recipe script file. In step 1473, the robotic apparatus 75 in the standardized kitchen 50 replicates the food dish with the same movement as the chef's arms and fingers, the same ingredients, with the same pace, and using the same standardized kitchen equipment and tools. The robotic apparatus 75 in step 1474 conducts quality checks during the food preparation process to make any necessary parameter adjustment. In step 1475, the robotic apparatus 75 has completed replication and preparation of the food dish, and therefore is ready to plate and serve the food dish.

Figure 56:
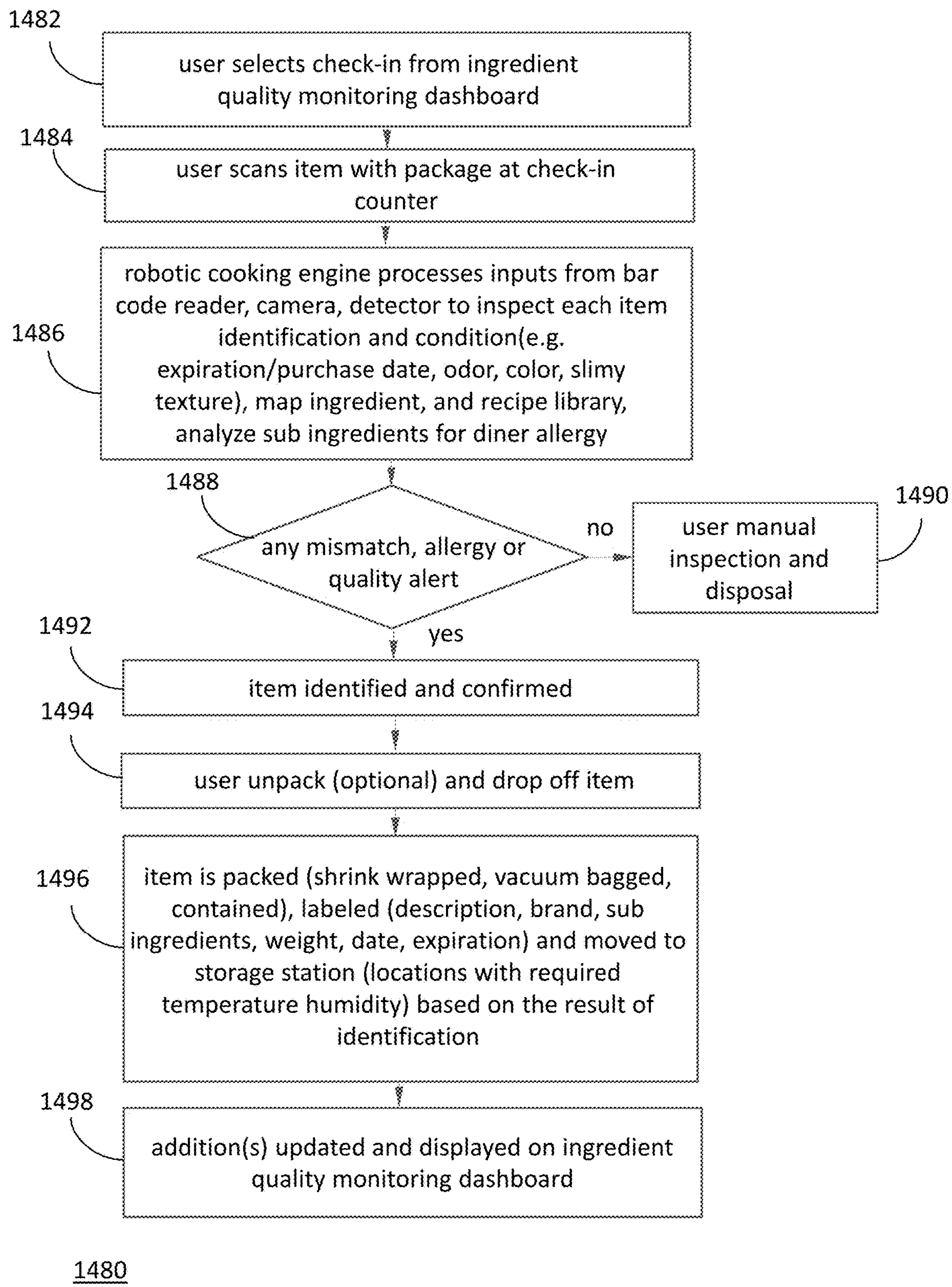
FIG. 56 is a flow diagram illustrating the process of storage check-in and identification in the robotic kitchen in accordance with the present disclosure.

FIG. 56 depicts the process of storage container check-in and identification process 1480. Using the quality-monitoring dashboard, the user selects to check in an ingredient in step 1482. In step 1484, the user then scans the ingredient package at the check-in station or counter. Using additional data from the bar code scanner, weighing scales, camera and laser-scanners, the robotic cooking engine processes the ingredient-specific data and maps the same to its ingredient and recipe library and analyzes it for any potential allergic impact in step 1486. Should an allergic potential exist based on step 1488, the system in step 1490 decides to notify the user and dispose of the ingredient for safety reasons. Should the ingredient be deemed acceptable, it is logged and confirmed by the system in step 1492. The user may in step 1494 unpack (if not unpacked already) and drop off the item. In the succeeding step 1496, the item is packed (foil, vacuum bag, etc.), labeled with a computer-printed label with all necessary ingredient data printed thereon, and moved to a storage container and/or storage location based on the results of the identification. At step 1498, the robotic cooking engine then updates its internal database and displays the available ingredient in its quality-monitoring dashboard.

Figure 57:
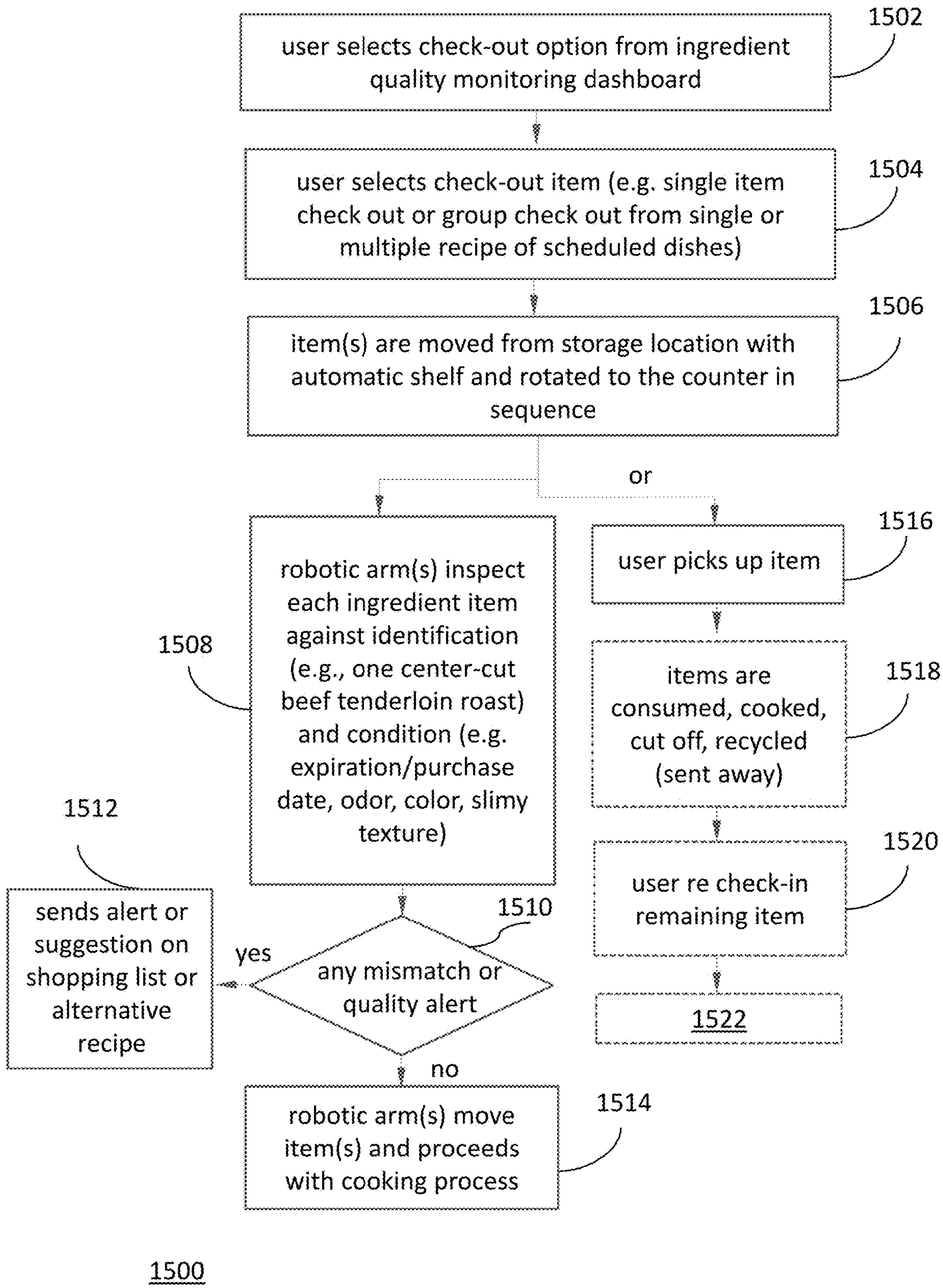
FIG. 57 is a flow diagram illustrating the process of storage checkout and cooking preparation in the robotic kitchen in accordance with the present disclosure.

FIG. 57 depicts an ingredient's check-out from storage and cooking preparation process 1500. In the first step 1502, the user selects to check out an ingredient using the quality-monitoring dashboard. In step 1504, the user selects an item to check out based on a single item needed for one or more recipes. The computerized kitchen then acts in step 1506 to move the specific container containing the selected item from its storage location to the counter area. In case the user picks up the item in step 1508, the user processes the item in step 1510 in one or more of many possible ways (cooking, disposal, recycling, etc.), with any remaining item(s) rechecked back into the system in step 1512, which then concludes the user's interactions with the system 1514. In the case that the robotic arms in a standardized robotic kitchen receive the retrieved ingredient item(s), step 1516 is executed in which the arms and hands inspect each ingredient item in the container against their identification data (type, etc.) and condition (expiration date, color, odor, etc.). In a quality-check step 1518, the robotic cooking engine makes a decision on a potential item mismatch or detected quality condition. In case the item is not appropriate, step 1520 causes an alert to be raised to the cooking engine to follow-up with an appropriate action. Should the ingredient be of acceptable type and quality, the robotic arms move the item(s) to be used in the next cooking process stage in step 1522.

Figure 58:
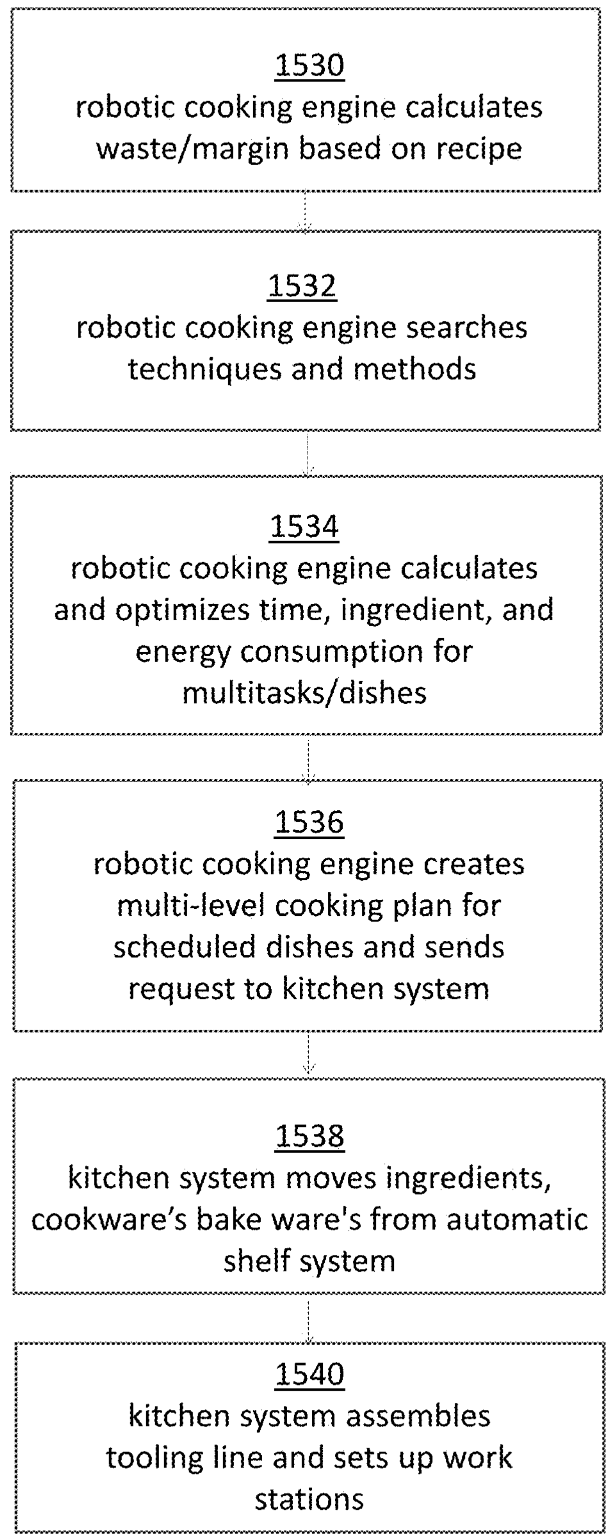
FIG. 58 is a flow diagram illustrating one embodiment of an automated pre-cooking preparation process in the robotic kitchen in accordance with the present disclosure.

FIG. 58 depicts the automated pre-cooking preparation process 1524. In step 1530, the robotic cooking engine calculates the margin and/or wasted ingredient materials based on a particular recipe. Subsequently in step 1532, the robotic cooking engine searches all possible techniques and methods for execution of the recipe with each ingredient. In step 1534, the robotic cooking engine calculates and optimizes the ingredient usage and methods for time and energy consumption, particularly for dish(es) requiring parallel multi-task processes. The robotic cooking engine then creates a multi-level cooking plan 1536 for the scheduled dishes and sends the request for cooking execution to the robotic kitchen system. In the next step 1538, the robotic kitchen system moves the ingredients, cooking/baking ware needed for the cooking processes from its automated shelving system and assembles the tools and equipment and sets up the various work stations in step 1540.

Figure 59:
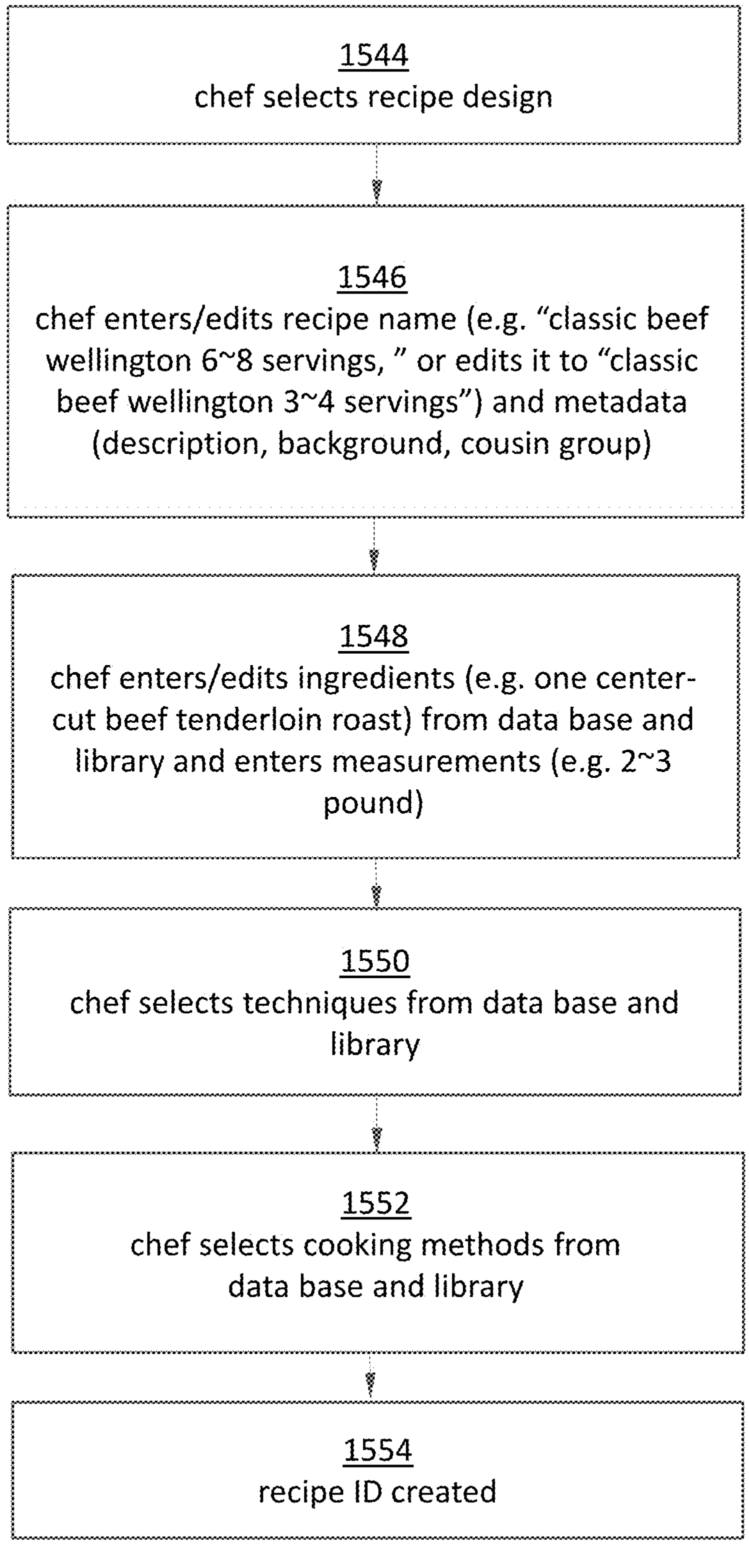
FIG. 59 is a flow diagram illustrating one embodiment of a recipe design and scripting process in the robotic kitchen in accordance with the present disclosure.

FIG. 59 depicts the recipe design and scripting process 1542. As a first step 1544, the chef selects a particular recipe, for which he then enters or edits the recipe data in step 1546, including, but not limited to, the name and other metadata (background, techniques, etc.). In step 1548, the chef enters or edits the necessary ingredients based on the database and associated libraries and enters the respective amounts by weight/volume/units required for the recipe. A selection of the necessary techniques utilized in the preparation of the recipe is made in step 1550 by the chef, based on those available in the database and the associated libraries. In step 1552, the chef performs a similar selection, but this time he or she is focused on the choice of cooking and preparation methods required to execute the recipe for the dish. The concluding step 1554 then allows the system to create a recipe ID that will be useful for later database storage and retrieval.

Figure 60:
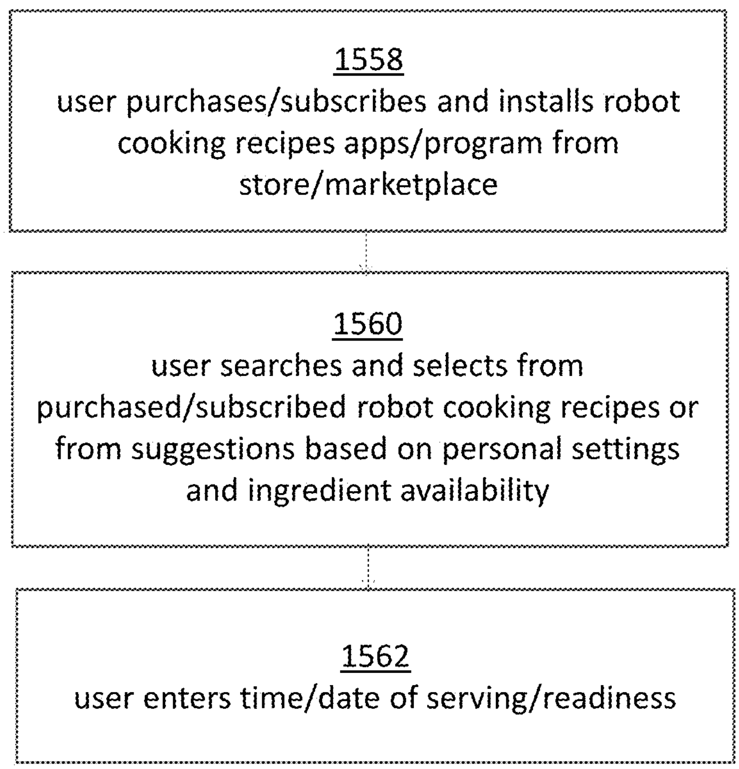
FIG. 60 is a flow diagram illustrating a subscription model for the user to purchase the robotic food preparation recipe in accordance with the present disclosure.

FIG. 60 depicts the process 1556 of how a user might select a recipe. The first step 1558 entails the user purchasing a recipe or subscribing to a recipe-purchase plan from an online marketplace store by way of a computer or mobile application, thereby enabling a download of a recipe script capable of being replicated. In step 1560, the user searches the online database and selects a particular recipe from those purchased or available as part of a subscription, based on personal preference settings and on-site ingredient availability. As a last step 1562, the user enters the time and date when he/she would like the dish to be ready for serving.

Figure 61A:
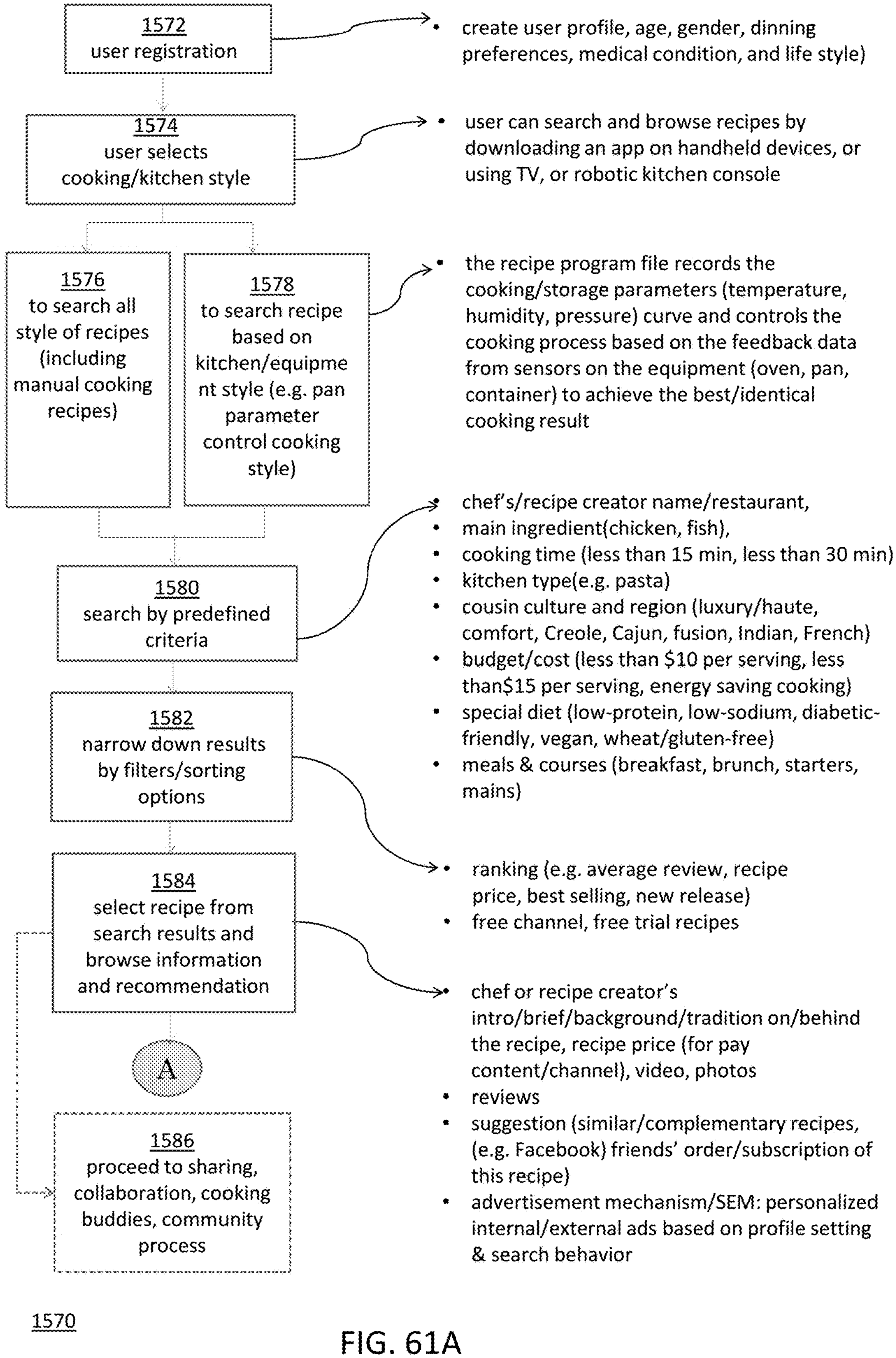
FIGS. 61A-B are flow diagrams illustrating the process of a recipe search and purchase subscription for a recipe commerce platform from a portal in accordance with the present disclosure.

FIG. 61A depicts the process 1570 for the recipe search and purchase and/or subscription process of an online service portal, or so termed recipe commerce platform. As a first step a new user has to register with the system in step 1572 (selecting age, gender, dining preferences, etc., followed by an overall preferred cooking or kitchen style) before a user can search and browse recipes by downloading them via an app on a handheld device or using a TV and/or robotic kitchen module. A user may choose at step 1574 to search using criteria such as style of recipes 1576 (including manually cooked recipes) or based on the particular kitchen or equipment style 1578 (wok, steamer, smoker, etc.). The user can select or set the search to use predefined criteria in step 1580, and using a filtering step 1582 to narrow down the search space and ensuing results. In step 1584, the user selects the recipe from the offered search results, information and recommendation. The user may choose to then share, collaborate or confer with cooking buddies or the community online about the choice and next steps in step 1586.

Figure 61B:
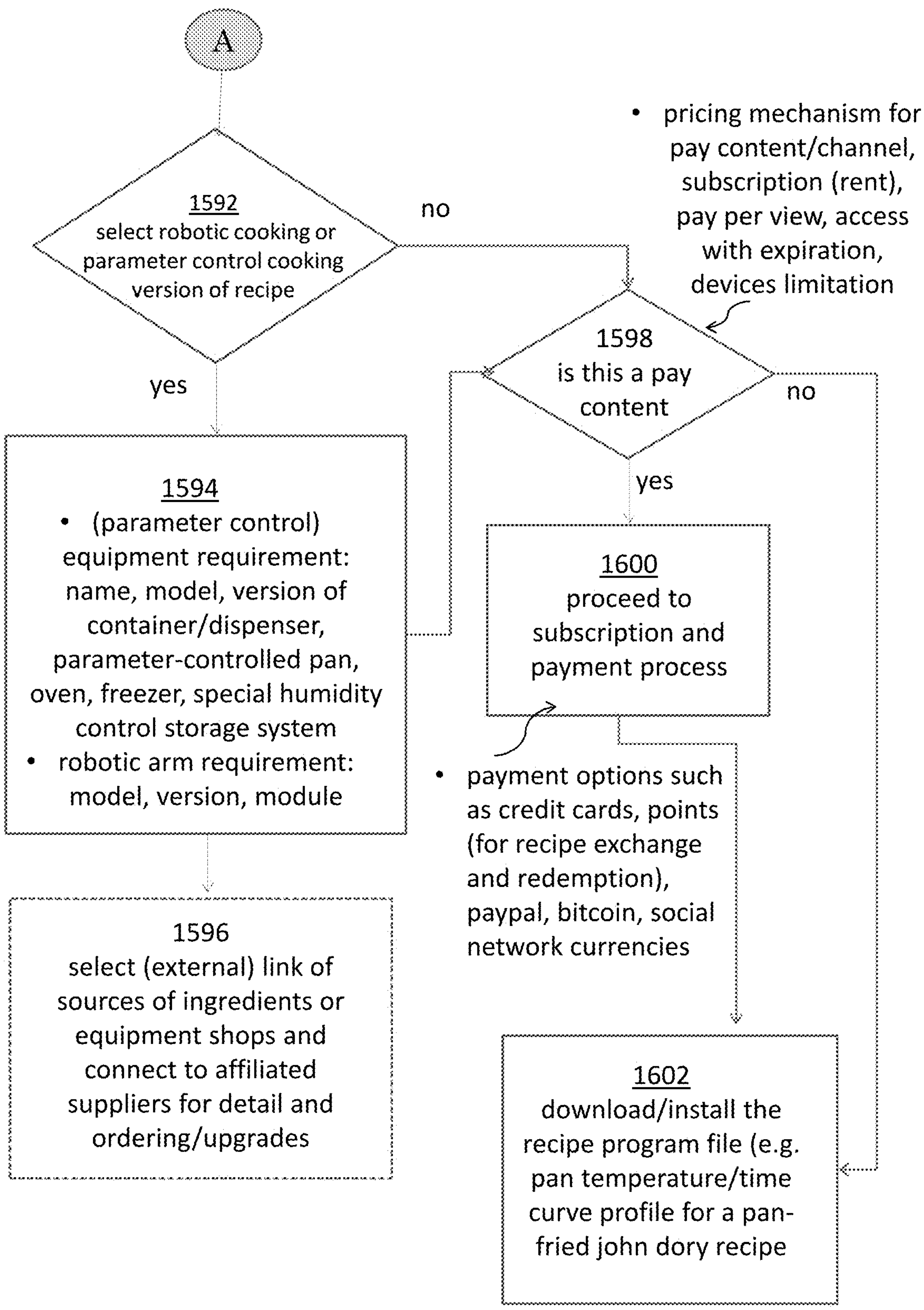

FIG. 61B depicts the continuation from FIG. 61A for the recipe search and purchase/subscription process for a service portal. A user is prompted in step 1592 to select a particular recipe based on either a robotic cooking approach or a parameter-controlled version of the recipe. In the case of a parameter-controlled based recipe, the system provides the required equipment details in step 1594 for such items as all the cookware and appliances as well as the robotic arm requirements, and offers select external links at step 1602 to sources for ingredients and equipment suppliers for detailed ordering instructions. The portal system then executes a recipe-type check 1596, where it allows for a direct download and installation 1598 of the recipe program file on the remote device, or requires the user to enter payment information in step 1600 based on a one-off payment or payment on a subscription basis, using one of many possible payment forms (PayPal, BitCoin, credit card, etc.).

Figure 62:
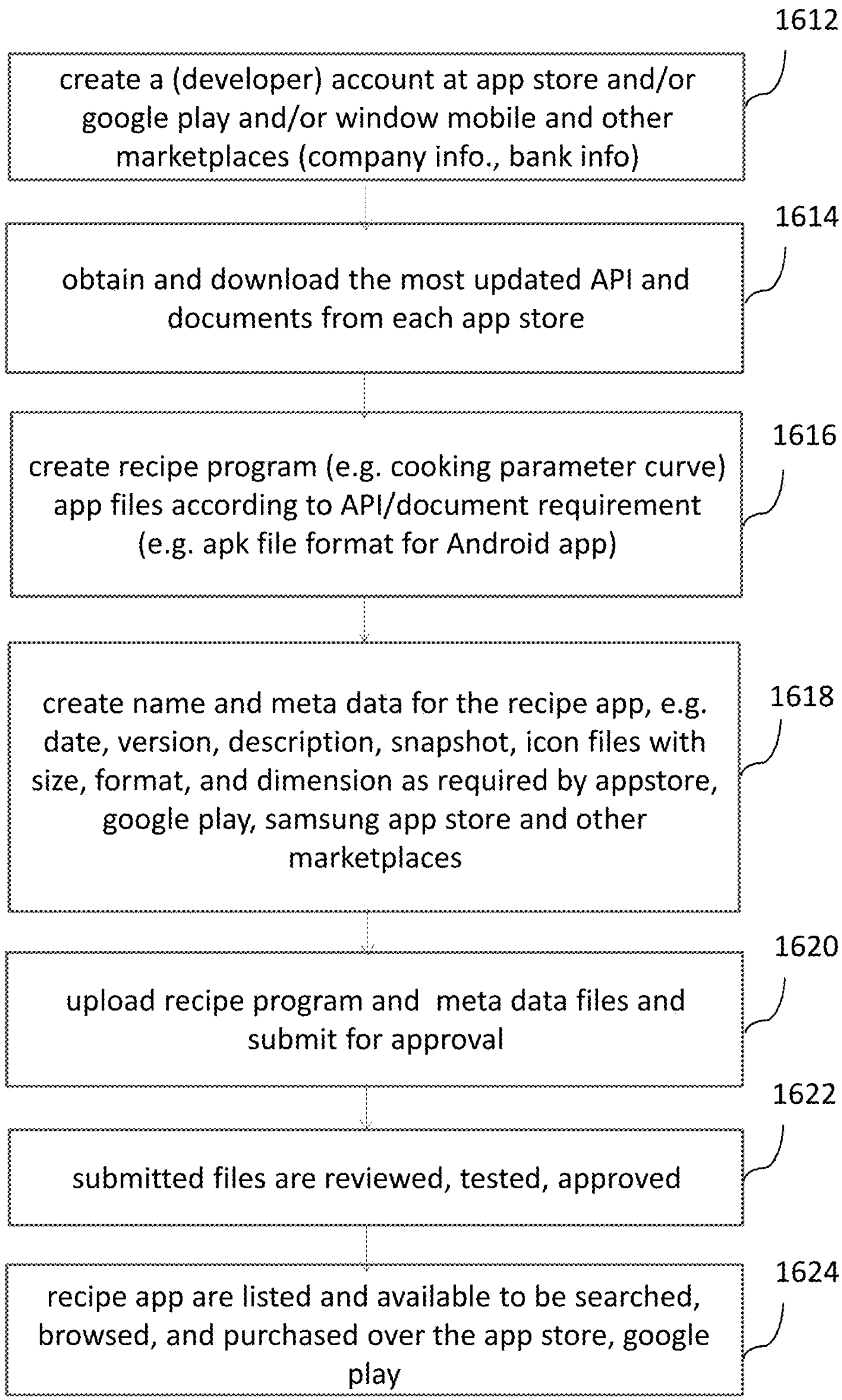
FIG. 62 is a flow diagram illustrating the creation of a robotic cooking recipe app on an app platform in accordance with the present disclosure.

FIG. 62 depicts the process 1610 used in the creation of a robotic recipe cooking application ("App"). As a first step 1612, a developer account needs to be created on such places as the App Store, Google Play or Windows Mobile or other such marketplaces, including the provision of banking and company information. The user is then prompted in step 1614 to obtain and download the most updated Application-Program-Interface (API) documentation specific for each app store. A developer then has to follow the API-requirements spelled out and create a recipe program in step 1618 that meets the API document requirements. In step 1620, the developer needs to provide a name and other metadata for the recipe that are suitable and prescribed by the various sites (Apple, Google, Samsung, etc.). Step 1622 requires the developer to upload the recipe program and metadata files for approval. The respective marketplace sites then review, test and approve the recipe program in step 1624, after which in step 1626 the respective site(s) list and make available the recipe program for online searching, browsing and purchase over their purchase interface.

Figure 63:
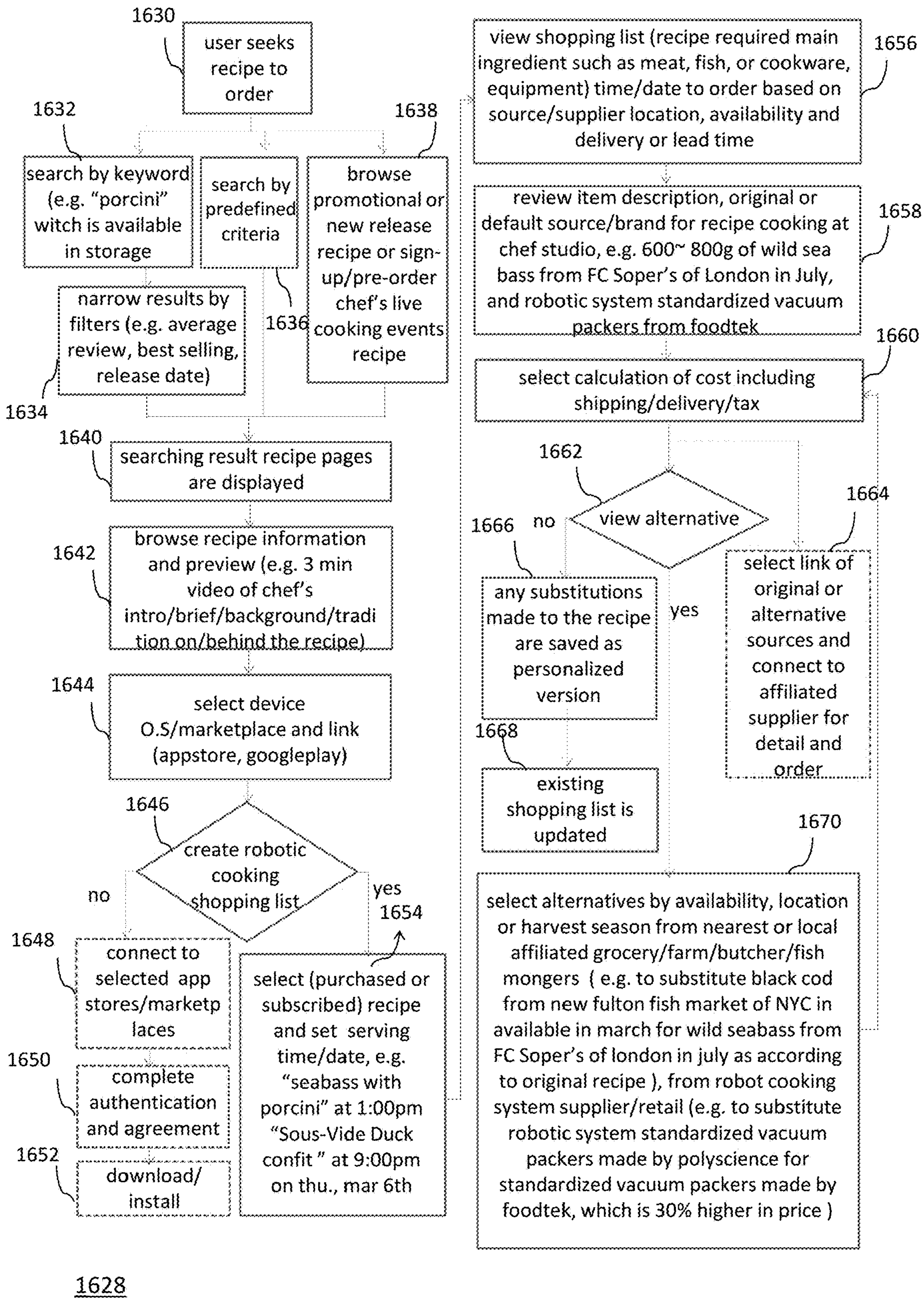
FIG. 63 is a flow diagram illustrating the process of a user search, purchase, and subscription for a cooking recipe in accordance with the present disclosure.

FIG. 63 depicts the process 1628 of purchasing a particular recipe or subscribing to a recipe delivery plan. As a first step 1630, the user searches for a particular recipe to order. The user may choose to browse by keyword at step 1632 with results able to be narrowed down using preference filters at step 1634, browse using other predefined criteria at step 1636 or even browse based on promotional, newly-released or pre-order basis recipes and even live chef cooking events (step 1638). The search results for recipes are displayed to the user in step 1640. The user may then browse these recipe results and preview each recipe in an audio- or short video-clip as part of step 1642. In step 1644, the user then chooses a device and operating system and receives a specific download link for a particular online marketplace application site. Should the user choose at step to connect to a new provider site in task 1648, the site will require the new user to complete an authentication and agreement step 1650, allowing the site to then download and install site-specific interface software in task 1652, to allow the recipe-delivery process to continue. The provider site will query with the user whether to create a robotic cooking shopping list in step 1646, and, if agreed to by the user in step 1654, to select a particular recipe on a single or subscription basis and pick a particular date and time for the dish to be served. In step 1656, the shopping list for the needed ingredients and equipment is provided and displayed to the user, including closest and fastest suppliers and their locations, ingredient and equipment availability and associated delivery lead times and pricing. In step 1658, the user is offered a chance to review each of the items' descriptions and their default or recommended source and brand. The user is then able to view the associated cost of all items on the ingredient and equipment list including all associated line-item costs (shipping, tax, etc.) in step 1660. Should the user or buyer want to view alternatives to the proposed shopping list items in step 1662, a step 1664 is executed to offer the user or buyer links to alternate sources to allow them to connect and view alternative buying and ordering options. If the user or buyer accepts the proposed shopping list, the system not only saves these selections as personalized choices for future purchases at step 1666 and updates the current shopping list at step 1668, but then also moves to step 1670, where it selects the alternatives from the shopping list based on additional criteria such as local/closest providers, item availability based on season and maturation-stage, or even pricing for equipment from different suppliers which has effectively the same performance but differs substantially in delivered cost to the user or buyer.

Figure 64A:
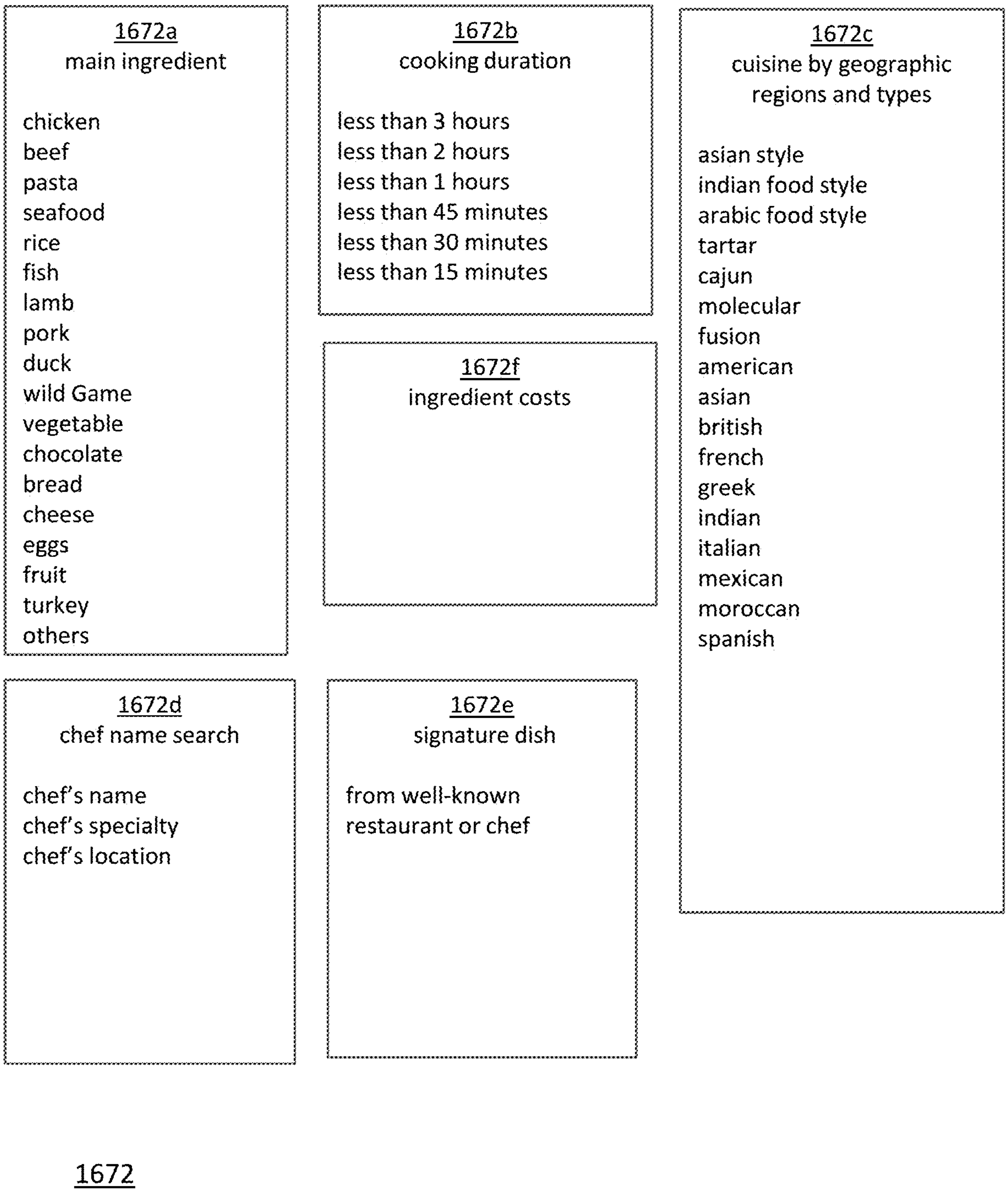

FIGS. 64A-B are block diagrams illustrating an example of a predefined recipe search criterion 1672. The predefined recipe search criteria in this example include categories like main ingredients 1672*a*, cooking duration 1672*b*, cuisine by geographic regions and types 1672*c*, chef's name search 1672*d*, signature dishes 1672*e*, and estimated ingredient cost to prepare a food dish 1672*f*. Other possible recipe search fields Include types of meals 1672*g*, special diet 1672*h*, exclusion ingredient 1672*i*, dish types and cooking methods 1672*j*, occasions and seasons 1672*k*, reviews and suggestions 16721, and rankings 1672*m*.

FIG. 65 is a block diagram illustrating some pre-defined containers in the robotic standardized kitchen 50. Each of the containers in the standardized robotic kitchen 50 has a container number or bar code which reference the specific content that is stored in that container. For example, the first container stores large and bulky products, such as white cabbage, red cabbage, savoy cabbage, turnips and cauliflower. The sixth container stores a large fraction of solids by pieces including items like almond shavings, seeds (sunflower, pumpkin, white), dried apricots pitted, dried papaya and dried apricots.

Figure 66:
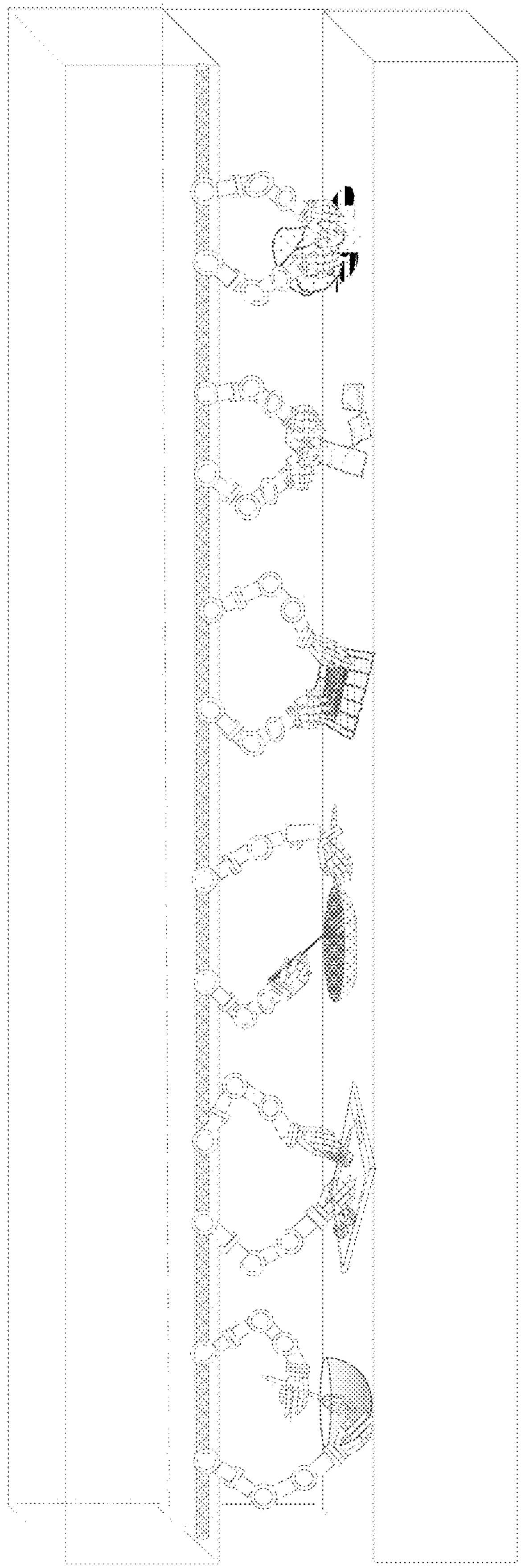
FIG. 66 is a block diagram illustrating a first embodiment of a robotic restaurant kitchen module configured in a rectangular layout with multiple pairs of robotic hands for simultaneous food preparation processing in accordance with the present disclosure.

FIG. 66 is a block diagram illustrating a first embodiment of a robotic restaurant kitchen module 1676 configured in a rectangular layout with multiple pairs of robotic hands for simultaneous food preparation processing. Other types or modification of configuration layout, in addition to the rectangular layout, is contemplated within the spirits of the present disclosure. Another embodiment of the disclosure revolves around a staged configuration for multiple successive or parallel robotic arm and hand stations in a professional or restaurant kitchen setup shown in FIG. 67. The embodiment depicts a more linear configuration, even though any geometric arrangement could be used, showing multiple robotic arm/hand modules, each focused on creating a particular element, dish or recipe script step (e.g. six pairs of robotic arms/hands to serve different roles in a commercial kitchen such as sous-chef, broiler-cook, fry/sauté cook, pantry cook, pastry chef, soup and sauce cook, etc.). The robotic kitchen layout is such that the access/interaction with any human or between neighboring arm/hand modules is along a single forward-facing surface. The setup is capable of being computer-controlled, thereby allowing the entire multi-arm/hand robotic kitchen setup to perform replication cooking tasks respectively, regardless of whether the arm/hand robotic modules execute a single recipe sequentially (end-product from one station gets supplied to the next station for a subsequent step in the recipe script) or multiple recipes/steps in parallel (such as pre-meal food-/ingredient-preparation for later use during dish replication completion to meet the time crunch during rush times).

Figure 67:
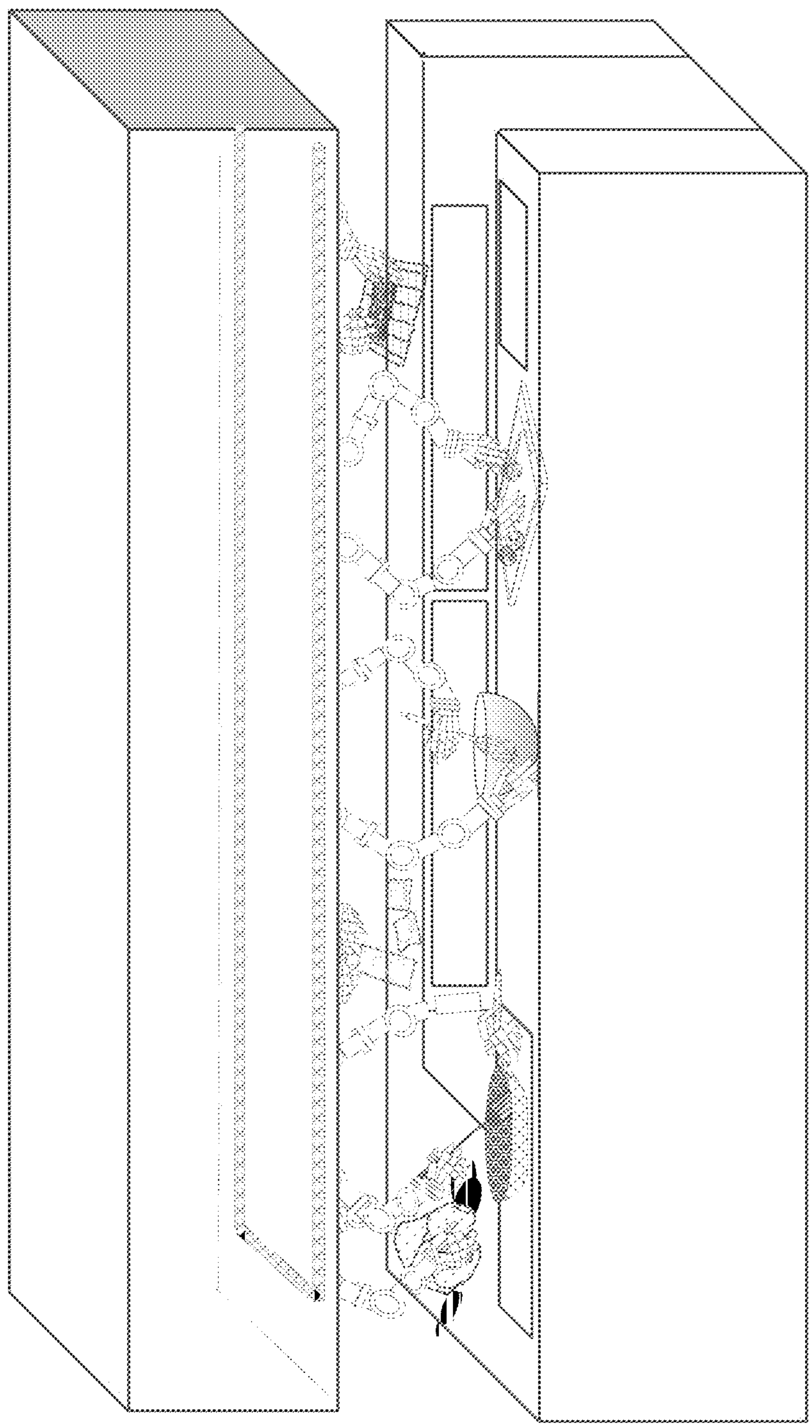
FIG. 67 is a block diagram illustrating a second embodiment of a robotic restaurant kitchen module configured in a U-shape layout with multiple pairs of robotic hands for simultaneous food preparation processing in accordance with the present disclosure.

FIG. 67 is a block diagram illustrating a second embodiment of a robotic restaurant kitchen module 1678 configured in a U-shape layout with multiple pairs of robotic hands for simultaneous food preparation processing. Yet another embodiment of the disclosure revolves around another staged configuration for multiple successive or parallel robotic arm and hand stations in a professional or restaurant kitchen setup shown in FIG. 68. The embodiment depicts a rectangular configuration, even though any geometric arrangement could be used, showing multiple robotic arm/hand modules, each focused on creating a particular element, dish or recipe script step. The robotic kitchen layout is such that the access/interaction with any human or between neighboring arm/hand modules is both along a U-shaped outward-facing set of surfaces and along the central-portion of the U-shape, allowing arm/hand modules to pass/reach over to opposing work areas and interact with their opposing arm/hand modules during the recipe replication stages. The setup is capable of being computer-controlled, thereby allowing the entire multi-arm/hand robotic kitchen setup to perform replication cooking tasks respectively, regardless of whether the arm/hand robotic modules execute a single recipe sequentially (end-product from one station gets supplied to the next station along the U-shaped path for a subsequent step in the recipe script) or multiple recipes/steps in parallel (such as pre-meal food-/ingredient-preparation for later use during dish replication completion to meet the time crunch during rush times, with prepared ingredients possibly stored in containers or appliances (fridge, etc.) contained within the base of the U-shaped kitchen).

Figure 68:
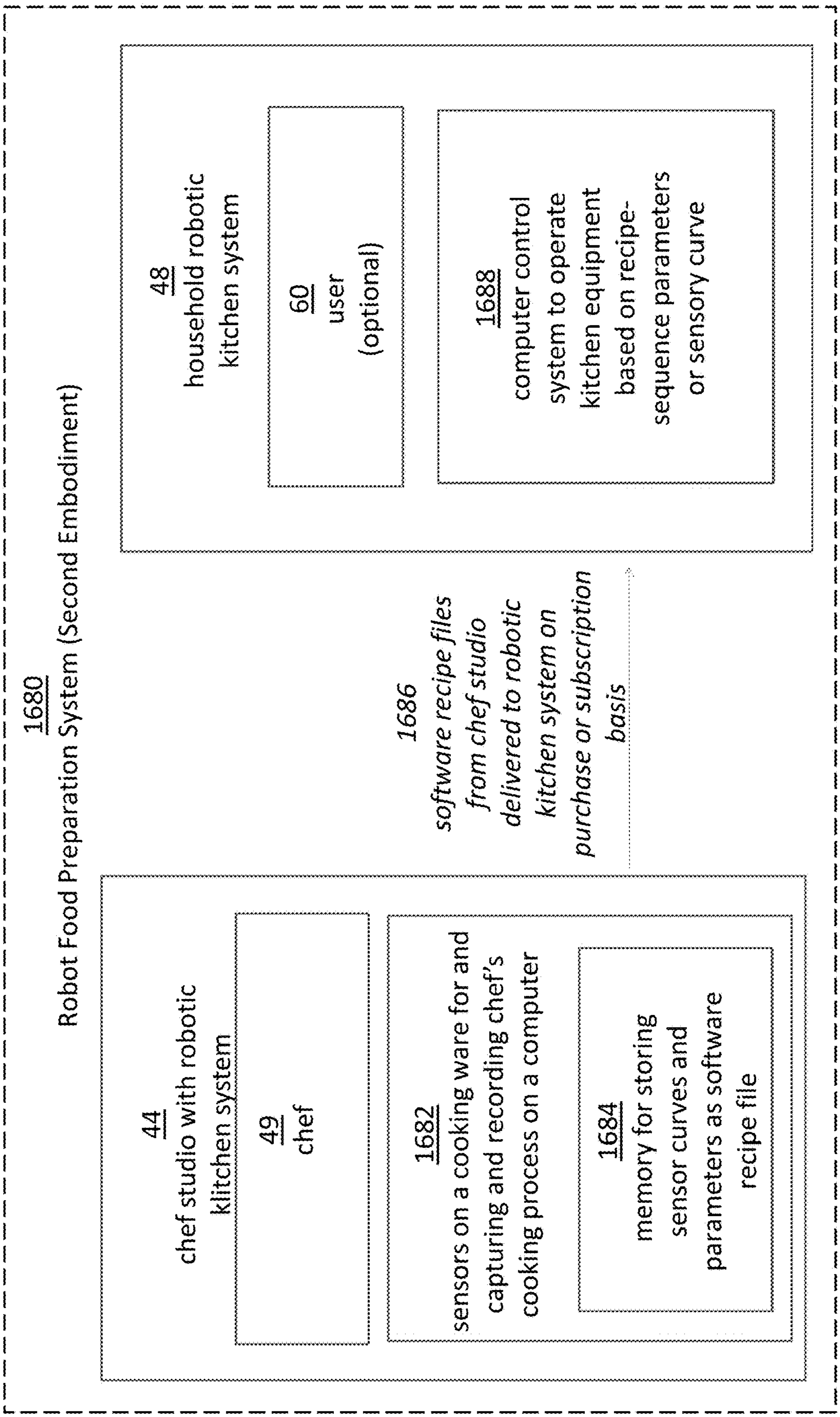
FIG. 68 is a block diagram illustrating a second embodiment of the robotic food preparation system with sensory cookware and curves in accordance with the present disclosure.

FIG. 68 depicts a second embodiment of a robotic food preparation system 1680. The chef studio 44 with the standardized robotic kitchen system 50 includes the human chef 49 preparing or executing a recipe, while sensors on the cookware 1682 record variables (temperature, etc.) over time and store the value of variables in a computer's memory 1684 as sensor curves and parameters that form a part of a recipe script raw data file. The stored sensory curves and parameter software data (or recipe) files from the chef studio 50 are delivered to a standardized (remote) robotic kitchen on a purchase or subscription basis 1686. The standardized robotic kitchen 50 installed in a household includes both the user 48 and the computer controlled system 1688 to operate the automated and/or robotic kitchen equipment based on the received raw data corresponding to the measured sensory curves and parameter data files.

Figure 69:
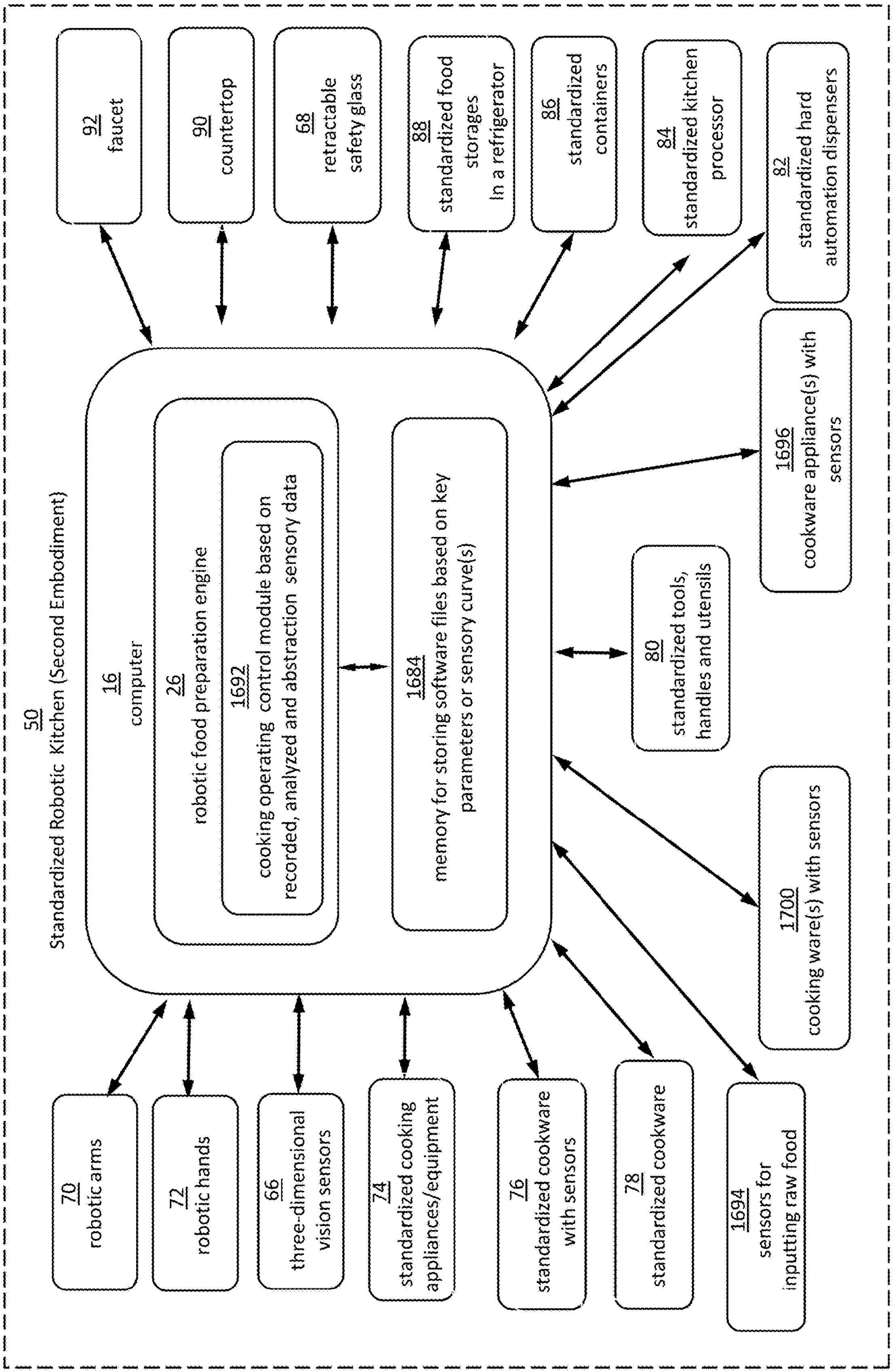
FIG. 69 is a block diagram illustrating some physical elements of a robotic food preparation system in the second embodiment in accordance with the present disclosure.

FIG. 69 depicts a second embodiment of the standardized robotic kitchen 50. The computer 16 that runs the robotic cooking (software) engine 56, which includes a cooking operations control module 1692 that processes recorded, analyzed and abstraction sensory data from the recipe script, and associated storage media and memory 1684 to store software files comprising of sensory curves and parameter data, interfaces with multiple external devices. These external devices include, but are not limited to, sensors for inputting raw data 1694, a retractable safety glass 68, a computer-monitored and computer-controllable storage unit 88, multiple sensors reporting on the process of raw-food quality and supply 198, hard-automation modules 82 to dispense ingredients, standardized containers 86 with ingredients, cook appliances fitted with sensors 1696, and cookware 1700 fitted with sensors.

Figure 70:
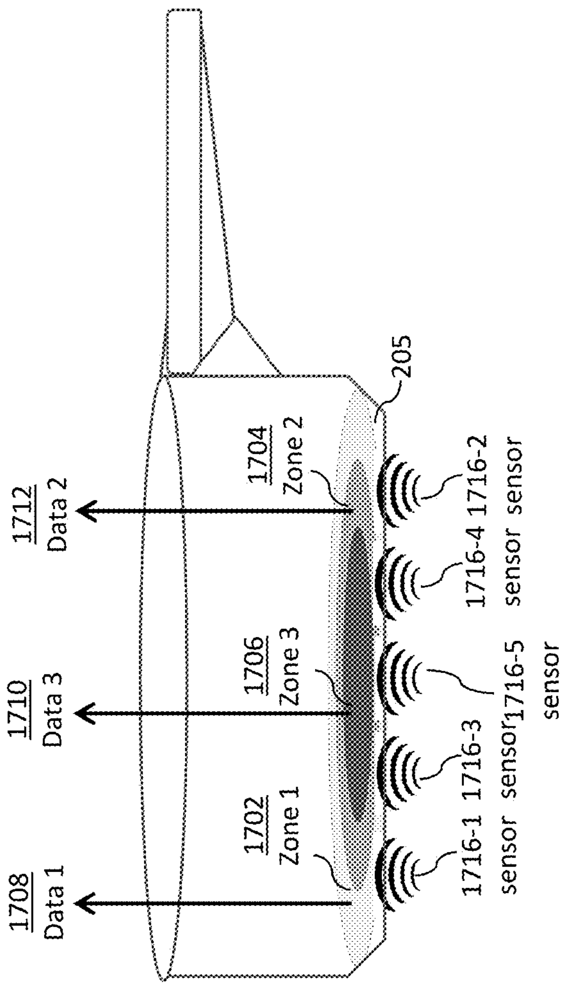
FIG. 70 is a block diagram illustrating sensory cookware for a (smart) pan with real-time temperature sensors for use in the second embodiment in accordance with the present disclosure.

FIG. 70 depicts an intelligent cookware item 1700 (e.g., a sauce-pot in this image) that includes built-in real-time temperature sensors, capable of generating and wirelessly transmitting a temperature profile across the bottom surface of the unit across at least, but not limited to, three planar zones, including zone-1 1702, zone-2 1704 and zone-3 1706, arranged in concentric circles across the entire bottom surface of the cookware unit. Each of these three zones is capable of wirelessly transmitting respective data-1 1708, data-2 1710 and data-3 1712 based on coupled sensors 1716-1, 1716-2, 1716-3, 1716-4 and 1716-5.

Figure 71:
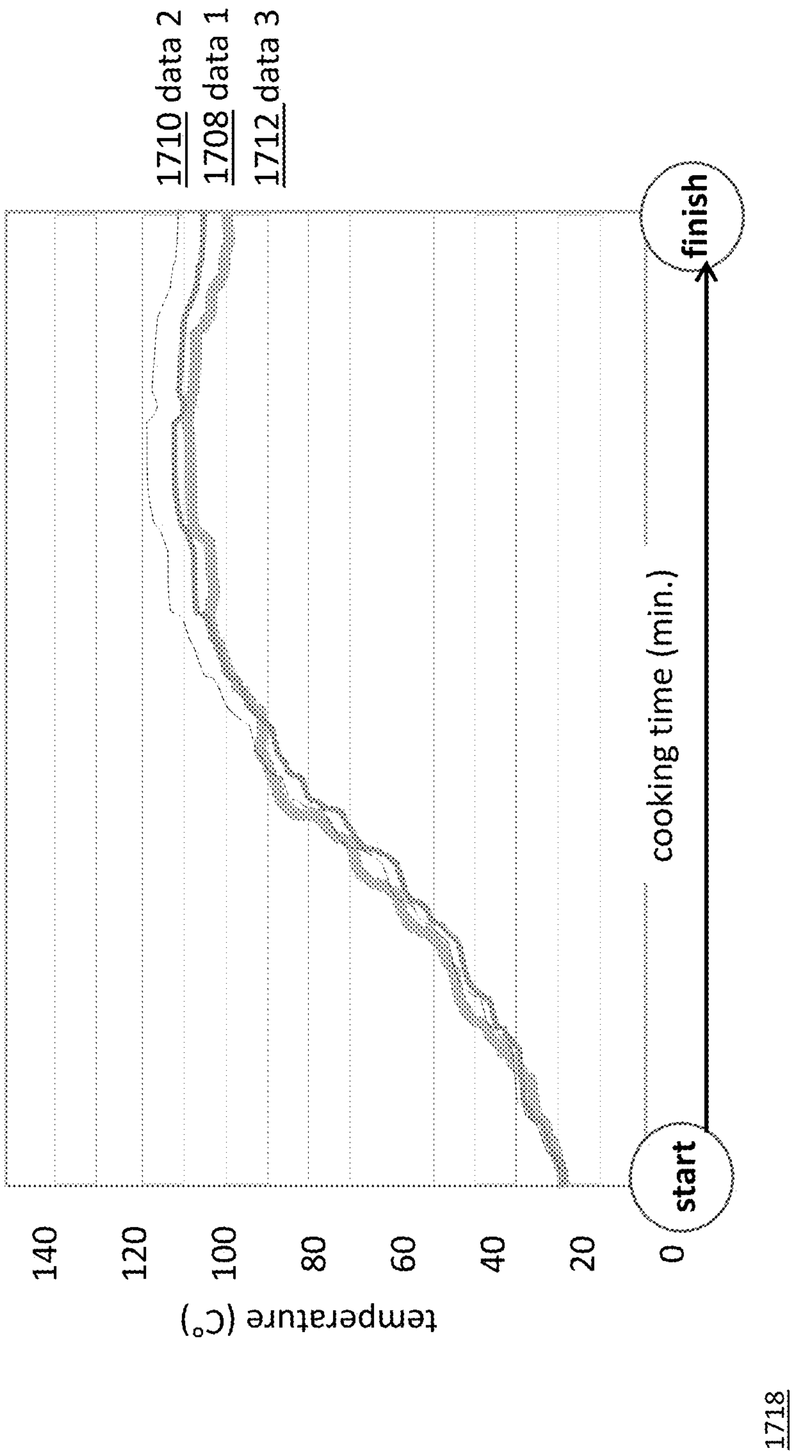
FIG. 71 is a graphical diagram illustrating the recorded temperature curve with multiple data points from the different sensors of the sensory cookware in the chef studio in accordance with the present disclosure.

FIG. 71 depicts a typical set of sensory curves 220 with recorded temperature profiles for data-1 1708, data-2 1710 and data-3 1712, each corresponding to the temperature in each of the three zones at the bottom of a particular area of a cookware unit. The measurement units for time are reflected as cooking time in minutes from start to finish (independent variable), while the temperature is measured in degrees Celsius (dependent variable).

Figure 72:
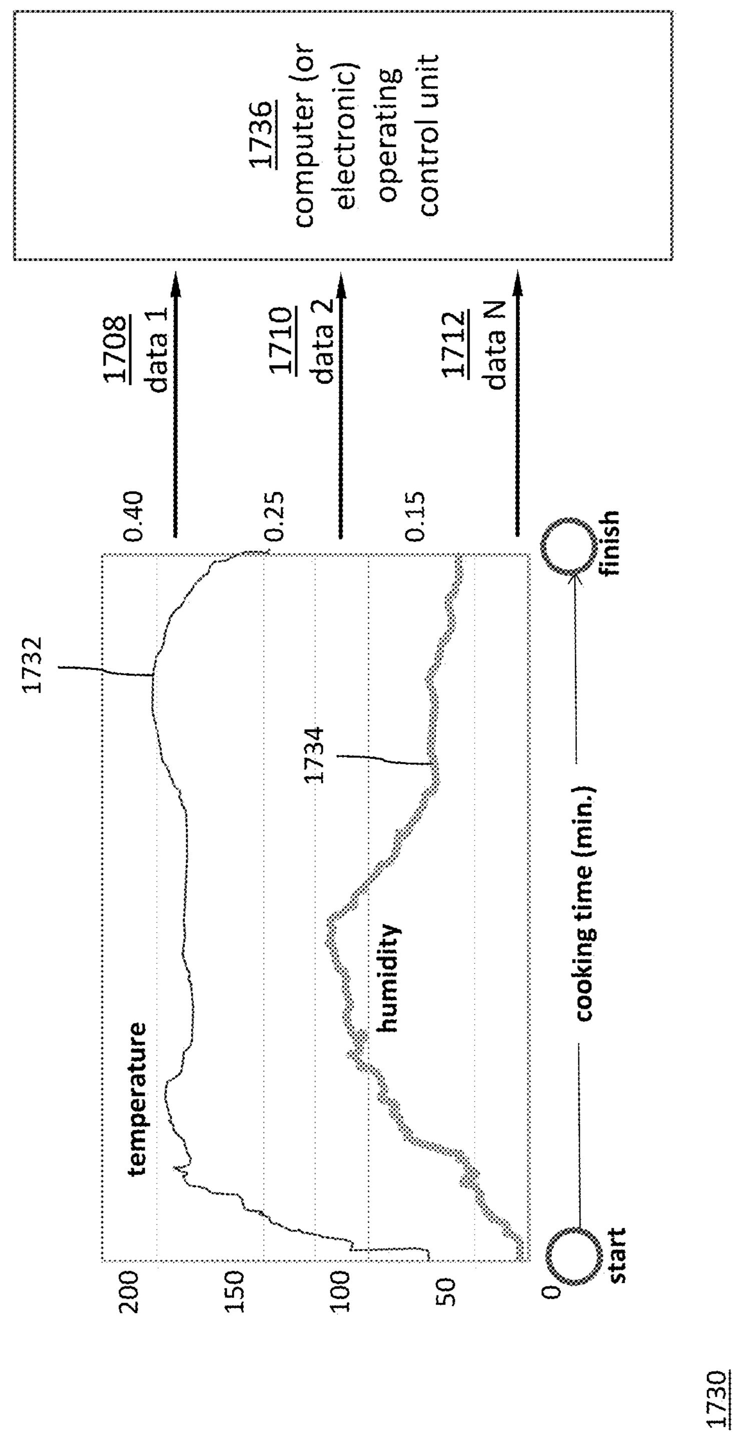
FIG. 72 is a graphical diagram illustrating the recorded temperature and humidity curves from the sensory cookware in the chef studio for transmission to an operating control unit in accordance with the present disclosure.

FIG. 72 depicts a multiple set of sensory curves 1730 with recorded temperature 1732 and humidity 1734 profiles, with the data from each sensor represented as data-1 1708, data-2 1710 all the way to data-N 1712. Streams of raw data are forwarded and processed to and by an electronic (or computer) operating control unit 1736. The measurement units for time are reflected as cooking time in minutes from start to finish (independent variable), while the temperature and humidity values are measured in degrees Celsius and relative humidity, respectively (dependent variables).

Figure 73:
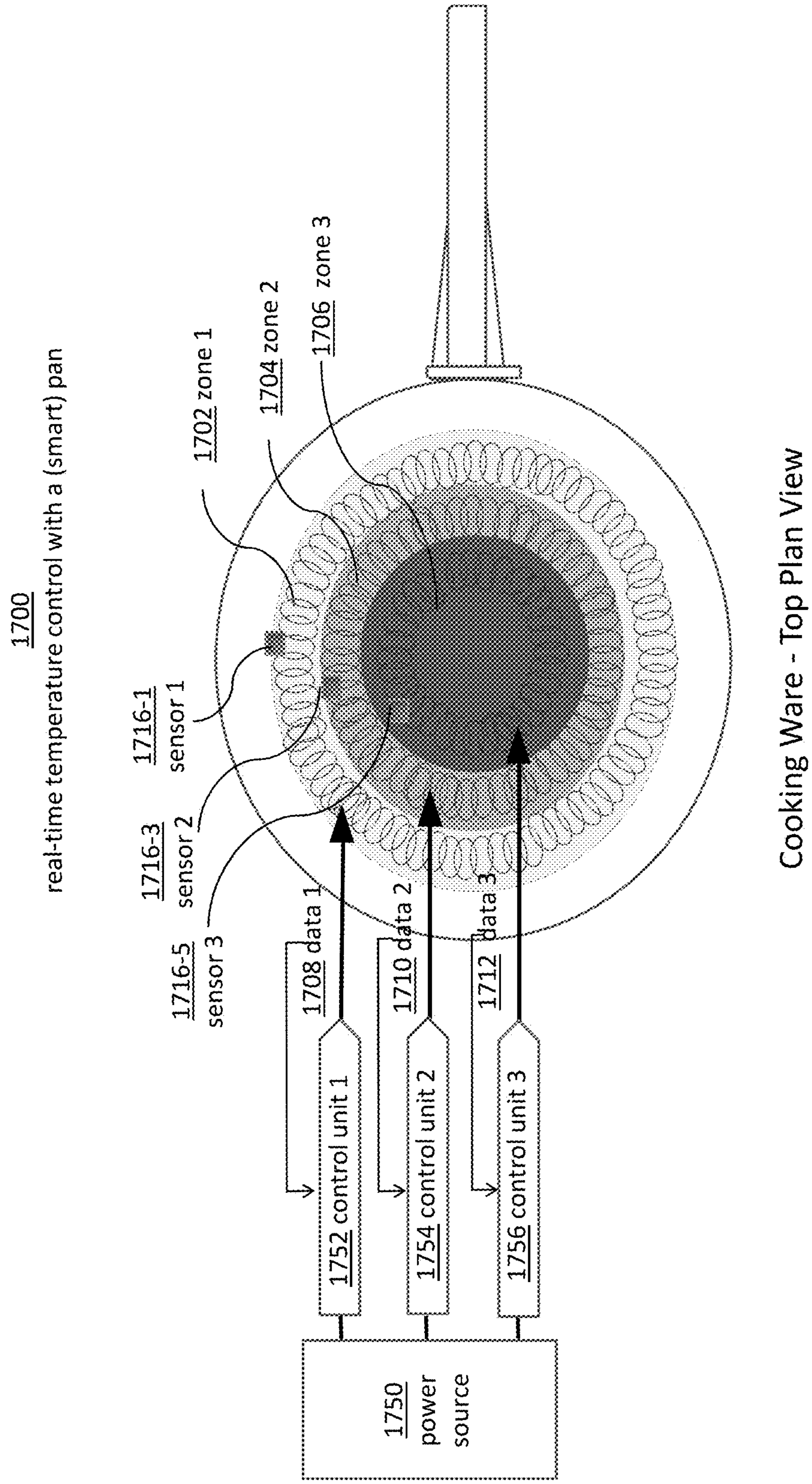
FIG. 73 is a block diagram illustrating sensory cookware for cooking based on the data from a temperature curve for different zones on a pan in accordance with the present disclosure.

FIG. 73 depicts a smart (frying) pan with process setup for real-time temperature control 1700. A power source 1750 uses three separate control units, but need not be limited to such, including control-unit-1 1752, control-unit-2 1754 and control-unit-3 1756, to actively heat a set of inductive coils. The control is in effect a function of the measured temperature values within each of the (three) zones 1702 (Zone 1), 1704 (Zone 2) and 1706 (Zone 3) of the (frying) pan, where temperature sensors 1716-1 (Sensor 1), 1716-3 (Sensor 2) and 1716-5 (Sensor 3) wirelessly provide temperature data via data streams 1708 (Data 1), 1710 (Data 2) and 1712 (Data 3) back to the operating control unit 274, which in turn directs the power source 1750 to independently control the separate zone-heating control units 1752, 1754 and 1756. The goal is to achieve and replicate the desired temperature curves over time, as the sensory curve data logged during the human chef's certain (frying) step during the preparation of a dish.

Figure 74:
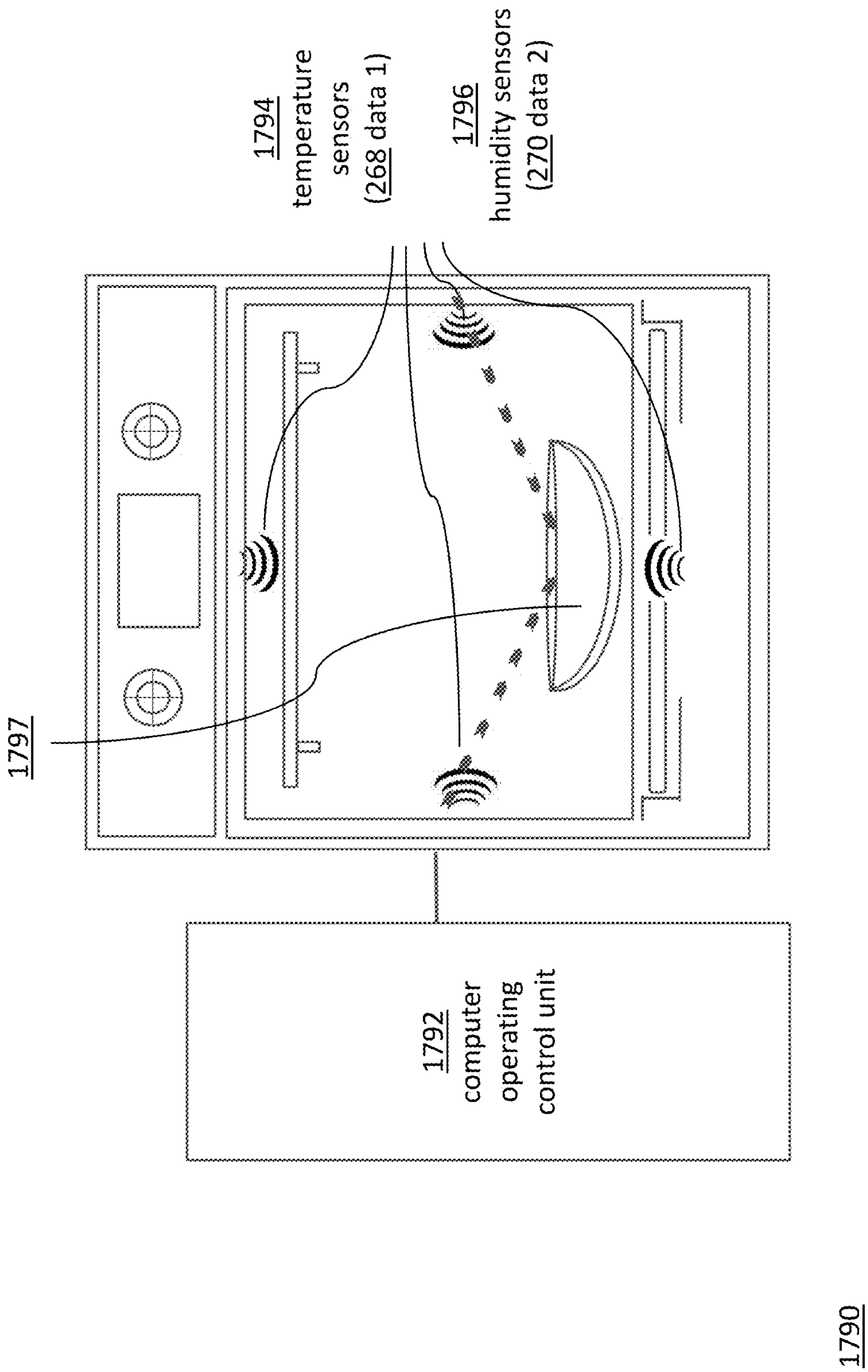
FIG. 74 is a block diagram illustrating sensory cookware of a (smart) oven with real-time temperature and humidity sensors for use in the second embodiment in accordance with the present disclosure.

FIG. 74 depicts a smart oven and computer control system 1790 that are coupled to the operating control unit 1792, allowing it to execute in real time a temperature profile for the oven appliance 1792, based on a previously stored sensory (temperature) curve. The operating control unit 1792 is able to control the doors (open/close) of the oven, track a temperature profile provided to it by a sensory curve, and post-cooking, self-clean. The temperature and humidity inside the oven are monitored through built-in temperature sensors 1794 in various locations generating a data stream 268 (Data 1), a temperature sensor in the form of a probe inserted into the ingredient to be cooked (meat, poultry, etc.) to monitor cooked temperature to infer degree of cooking completion, and additional humidity sensors 1796 (Data 2) creating a data stream. A temperature 1797 may be use for placement inside a meat or a food dish to determine the temperature in the smart oven 1790. The operating control unit 1792 takes in all this sensory data and adjusts the oven parameters to allow it to properly track the sensory curves described in a previously stored and downloaded set of sensory curves for both (dependent) variables.

Figure 75:
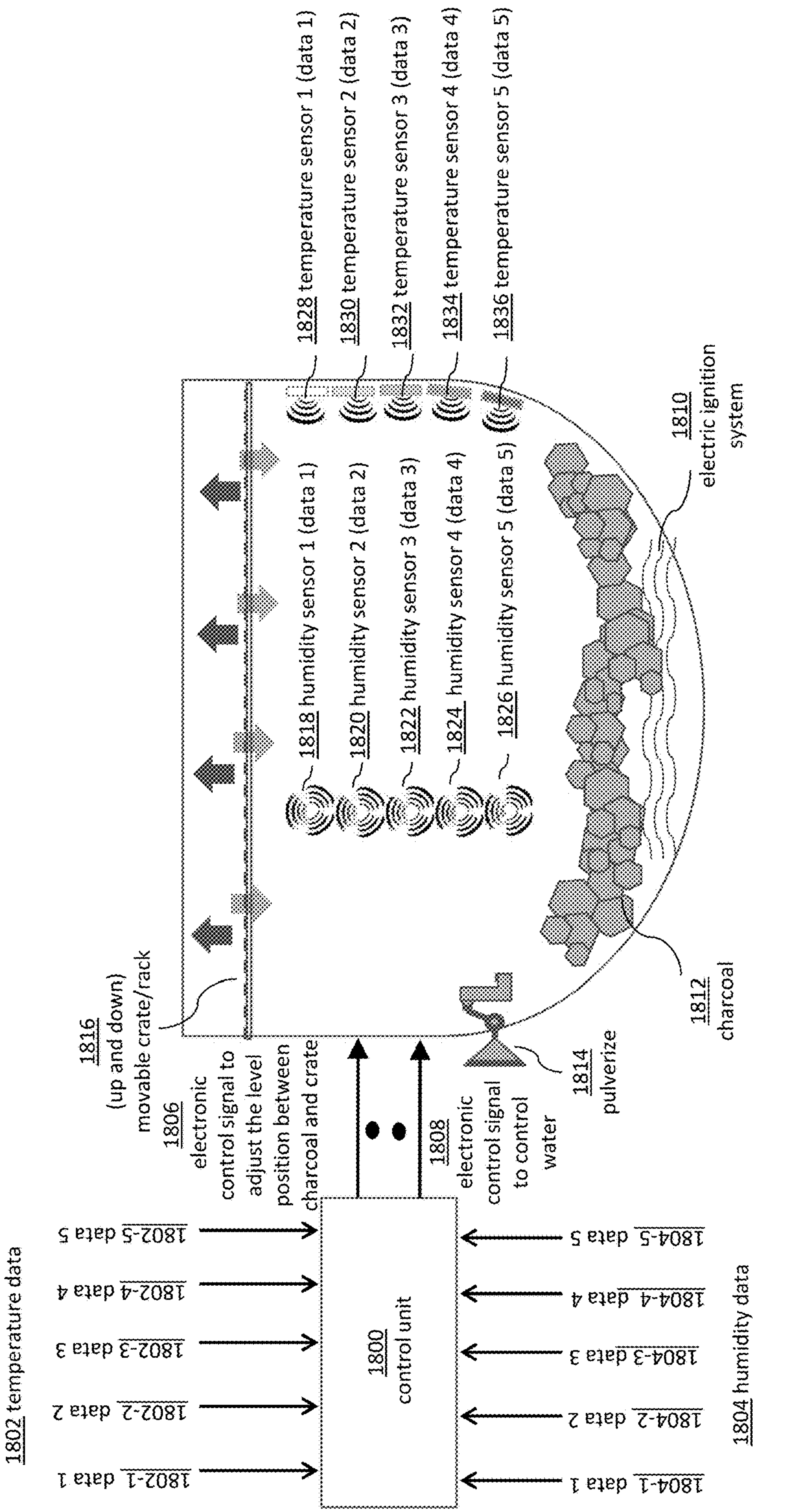
FIG. 75 is a block diagram illustrating a sensory cookware for a (smart) charcoal grill with real-time temperature sensors for use in the second embodiment in accordance with the present disclosure.

FIG. 75 depicts a (smart) charcoal grill computer-controlled ignition and control system setup 1798 for a power control unit 1800 that modulates electric power to a charcoal grill to properly trace a sensory curve for one or more temperature and humidity sensors internally distributed inside the charcoal grill. The power control unit 1800 receives temperature data 1802, which include temperature data 1 (1802-1), 2 (1802-2), 3 (1802-3), 4 (1802-4), 5 (1802-5), and humidity data 1804, which include temperature data 1 (1804-1), 2 (1804-2), 3 (1804-3), 4 (1804-4), 5 (1804-5). The power control unit 1800 uses electronic control signals 1806, 1808 for various control functions, including to start the grill and the electric ignition system 1810, adjust the grill-surface distance to the charcoal and the injection of water mist over the charcoal 1812, pulverize 1814 charcoal, adjust the temperature and humidity of the movable (up/down) rack 1816, respectively. The control unit 1800 bases its output signals 1806, 1808 on a set of (e.g., five pictured here) data streams 1804 for humidity measurement 1804-1, 1804-2, 1804-3, 1804-4, 1804-5 from a set of distributed humidity sensors (1 through 5) 1818, 1820, 1822, 1824 and 1826 inside the charcoal grill, as well as data streams 1802 for temperature measurements 1802-1, 1802-2, 1802-3, 1802-4 and 1802-5 from distributed temperature sensors (1 through 5) 1828, 1830, 1832, 1834 and 1836.

Figure 76:
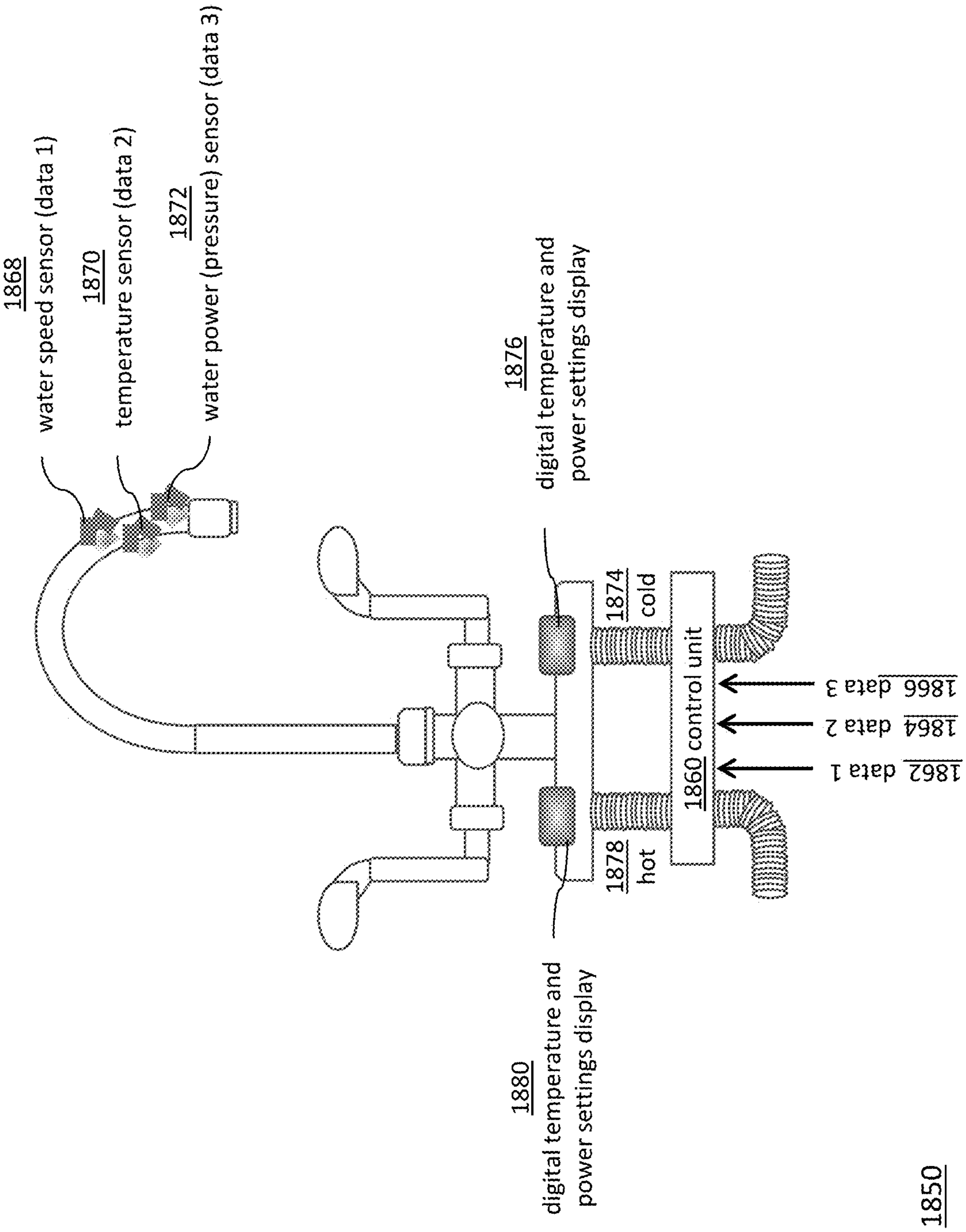
FIG. 76 is a block diagram illustrating sensory cookware for a (smart) faucet with speed, temperature and power control functions for use in the second embodiment in accordance with the present disclosure.

FIG. 76 depicts a computer-controlled faucet 1850 to allow the computer to control flow rate, temperature and pressure of water fed by the faucet into the sink (or cookware). The faucet is controlled by a control unit 1862 that receives separate data streams 1862 (Data 1), 1864 (Data 2) and 1866 (Data 3), which correspond to water flow rate sensor 1868 providing Data 1, temperature sensor 1870 providing Data 2, and water pressure sensor 1872 providing Data 3 sensory data. The control unit 1862 then controls the supply of cold water 1874, with appropriate cold-water temperature and pressure displayed digitally on display 1876, and hot water 1878, with appropriate hot-water temperature and pressure displayed digitally on display 1880, to achieve the desired pressure, flow rate and temperature of water exiting at the spigot.

Figure 77:
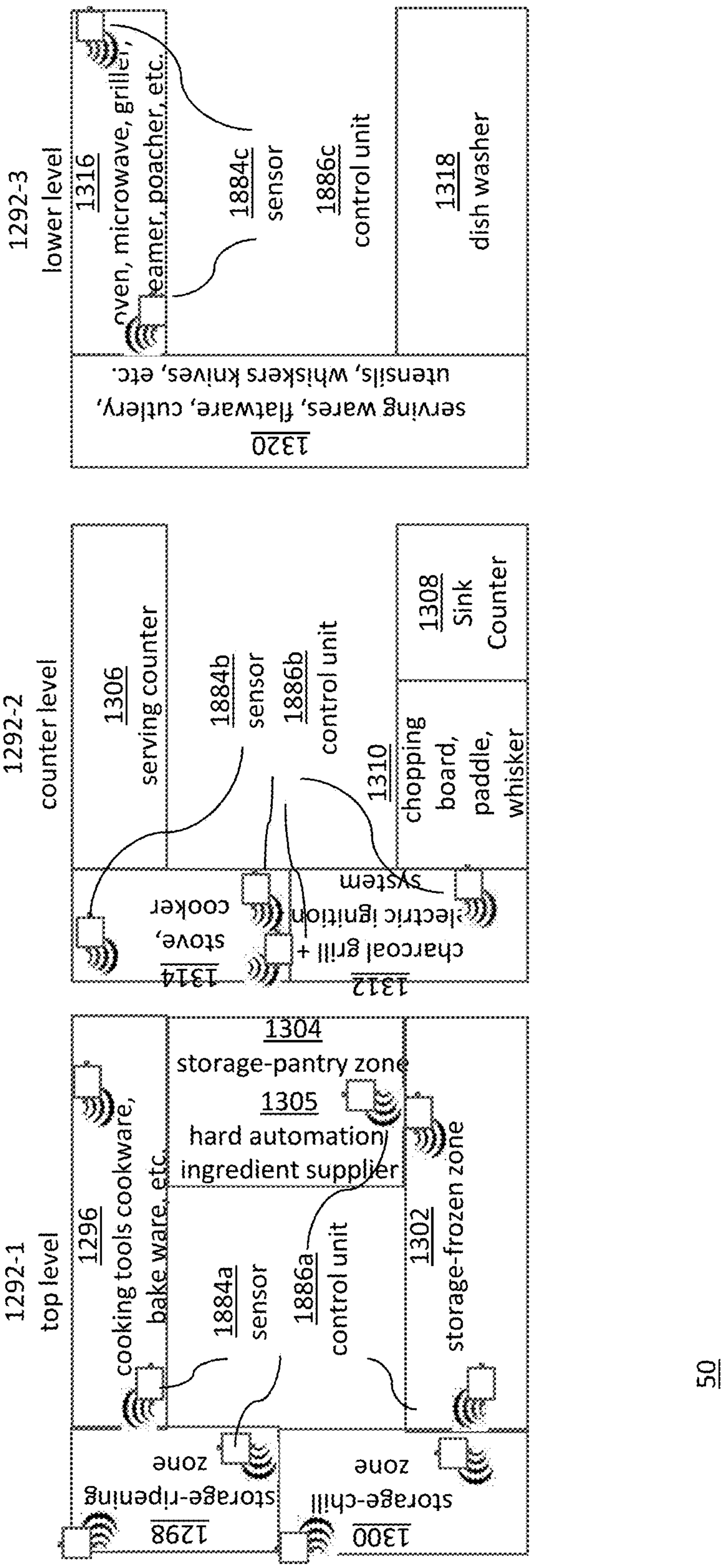
FIG. 77 is a block diagram illustrating a top plan view of a robotic kitchen with sensory cookware in the second embodiment in accordance with the present disclosure.

FIG. 77 depicts an embodiment of an instrumented and standardized robotic kitchen 50 in top plan view. The standardized robotic kitchen is divided in to three levels, namely the top level 1292-1, the counter level 1292-2 and the lower level 1292-3, with each level containing equipment and appliances that have integrally mounted sensors 1884*a*, 1884*b*, 1884*c* and computer-control units 1886*a*, 1886*b*, 1886*c*.

The top level 1292-1 contains multiple cabinet-type modules with different units to perform specific kitchen functions by way of built-in appliances and equipment. At the simplest level a shelf/cabinet storage area 1304 is included with the hard automation ingredient supplier 1305, a cabinet volume 1296 used for storing and accessing cooking tools and utensils and other cooking and serving ware (cooking, baking, plating, etc.), a storage ripening cabinet volume 1298 for particular ingredients (e.g. fruit and vegetables, etc.), a chilled storage zone 1300 for such items as lettuce and onions, a frozen storage cabinet volume 1302 for deep-frozen items, and another storage pantry zone 1304 for other ingredients and rarely used spices, etc. Each of the modules within the top level contains sensor units 1884*a* providing data to one or more control units 1886*a*, either directly or by way of one or more central or distributed control computers, to allow for computer-controlled operations.

The counter level 1292-2 not only houses monitoring sensors 1884*b* and control units 1886*b*, but also includes a serving counter 1306, a counter area with a sink 1308, another counter area 1310 with removable working surfaces (cutting/chopping board, etc.), a charcoal-based slatted grill 1312 and a multi-purpose area for other cooking appliances 1314, including a stove, cooker, steamer and poacher. Each of the modules within the counter level contains sensor units 1884*b* providing data to one or more control units 1886*b*, either directly or by way of one or more central or distributed control computers, to allow for computer-controlled operations.

The lower level 1292-3 houses the combination convection oven and microwave as well as steamer, poacher and grill 1316, the dish-washer 1318 and a larger cabinet volume 1320 that holds and stores additional frequently used cooking and baking ware, as well as tableware, flatware, utensils (whisks, knives, etc.) and cutlery. Each of the modules within the lower level contains sensor units 1884*c* providing data to one or more control units 1886*c*, either directly or by way of one or more central or distributed control computers, to allow for computer-controlled operations.

Figure 78:
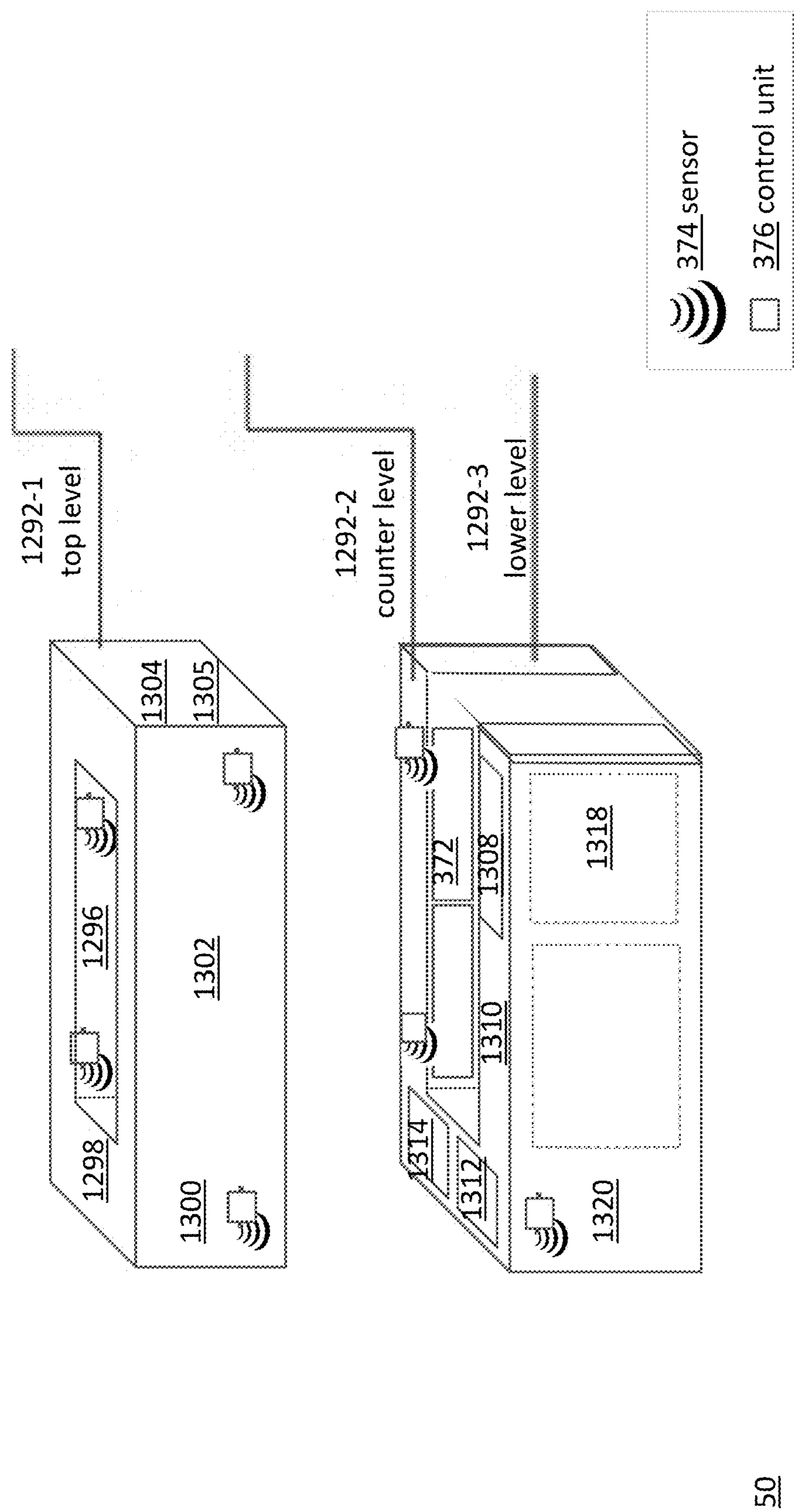
FIG. 78 is a block diagram illustrating a perspective view of a robotic kitchen with sensory cookware in the second embodiment in accordance with the present disclosure.

FIG. 78 depicts a perspective view of one embodiment of a robotic kitchen cooking system 50, with three different levels arranged from top to bottom, each fitted with multiple and distributed sensor units 1892 which feed data directly to one or more control units 1894, or to one or more central computers, which in turn use and process the sensory data to then command one or more control units 376 to act on their commands.

The top level 1292-1 contains multiple cabinet-type modules with different units to perform specific kitchen functions by way of built-in appliances and equipment. At the simplest level a shelf/cabinet storage pantry volume 1294 is included, a cabinet volume 1296 used for storing and accessing cooking tools and utensils and other cooking and serving ware (cooking, baking, plating, etc.), a storage ripening cabinet volume 1298 for particular ingredients (e.g. fruit and vegetables, etc.), a chilled storage zone 88 for such items as lettuce and onions, a frozen storage cabinet volume 1302 for deep-frozen items, and another storage pantry zone 1294 for other ingredients and rarely used spices, etc. Each of the modules within the top level contains sensor units 1892 providing data to one or more control units 1894, either directly or by way of one or more central or distributed control computers, to allow for computer-controlled operations.

The counter level 1292-2 not only houses monitoring sensors 1892 and control units 1894, but also includes a counter area with a sink and electronically controllable faucet 1308, another counter area 1310 with removable working surfaces for cutting/chopping on a board, etc., a charcoal-based slatted grill 1312, and a multi-purpose area for other cooking appliances 1314, including a stove, cooker, steamer and poacher. Each of the modules within the counter level contains sensor units 1892 providing data to one or more control units 1894, either directly or by way of one or more central or distributed control computers, to allow for computer-controlled operations.

The lower level 1292-3 houses the combination convection oven and microwave as well as steamer, poacher and grill 1316, the dish-washer 1318, the hard automation controlled ingredient dispensers 1305, and a larger cabinet volume 1310 that holds and stores additional frequently used cooking and baking ware, as well as tableware, flatware, utensils (whisks, knives, etc.) and cutlery. Each of the modules within the lower level contains sensor units 1892 providing data to one or more control units 1896, either directly or by way of one or more central or distributed control computers, to allow for computer-controlled operations.

Figure 79:
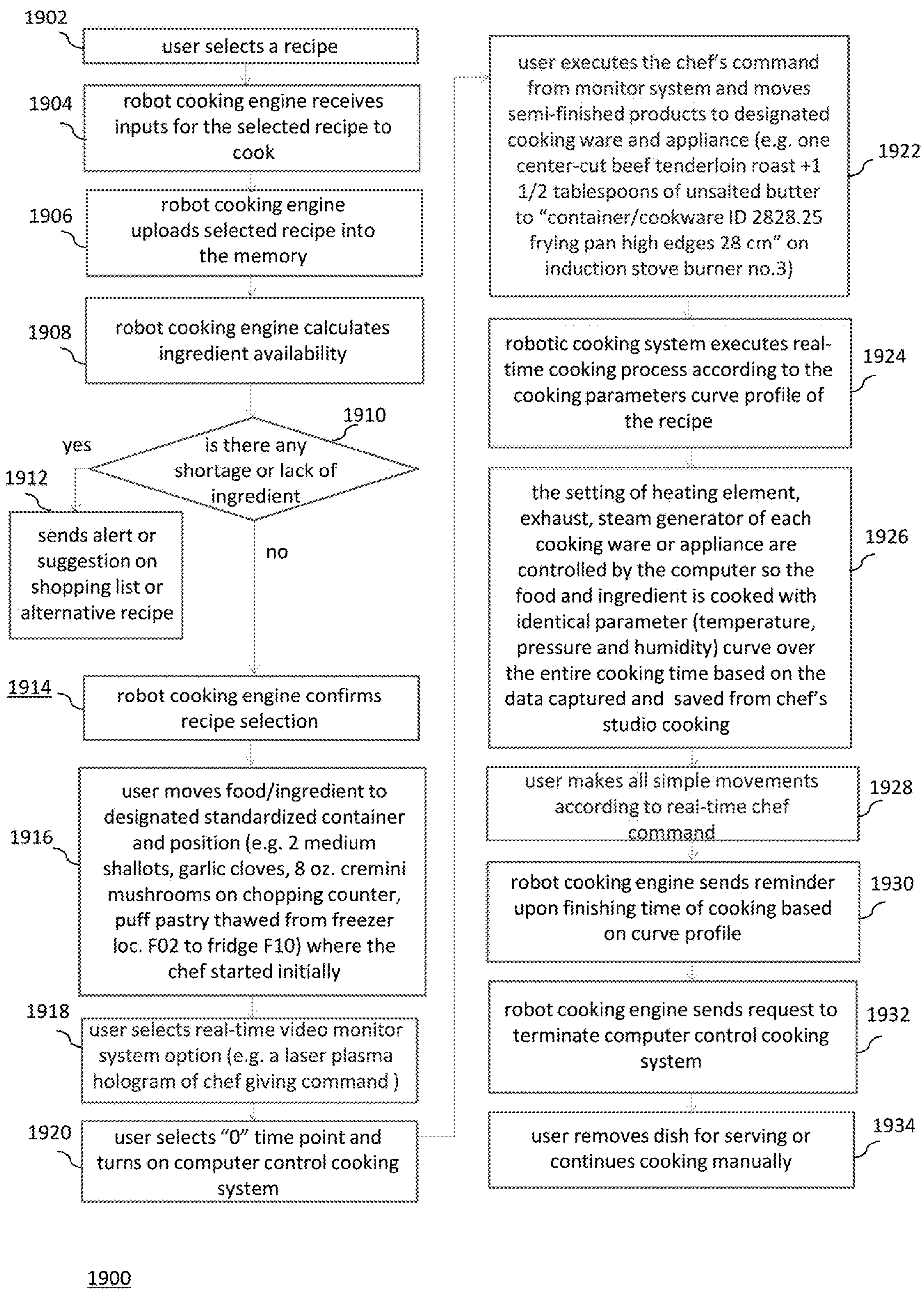
FIG. 79 is a flow diagram illustrating a second embodiment in the process of the robotic kitchen preparing a dish from one or more previously recorded parameter curves in a standardized robotic kitchen in accordance with the present disclosure.

FIG. 79 is a flow diagram illustrating a second embodiment 1900 in the process of the robotic kitchen preparing a dish from one or more previously recorded parameter curves in a standardized robotic kitchen. In step 1902, a user, through a computer, selects a particular recipe for the robotic apparatus 75 to prepare the food dish. In step 1904, the robotic food preparation engine is configured to retrieve the abstraction recipe for the selected recipe for food preparation. In step 1906, the robotic food preparation engine is configured to upload the selected recipe script into the computer's memory. In step 1908, the robotic food preparation engine calculates the ingredient availability. In step 1910, the robotic food preparation engine is configured to evaluate whether there is a shortage or an absence of ingredients to prepare the dish according to the selected recipe and serving schedule. The robotic food preparation engine sends an alert to place missing or insufficient ingredients on a shopping list or selects an alternate recipe in step 1912. The recipe selection by the user is confirmed in step 1914. In step 1916, the robotic food preparation engine is configured to send robotic instructions to the user to place food or ingredients into standardized containers and move them to the proper food preparation position. In step 1918, the user is given the option to select a real-time video-monitor projection, whether on a dedicated monitor or a holographic laser-based projection, to visually see each and every step of the recipe replication process based on all movements and processes executed by the chef while being recorded for playback in this instance. In step 1920, the robotic food preparation engine is configured to allow the user to start food preparation at start time "0" of their choosing and powering on the computerized control system for the standardized robotic kitchen. In step 1922, the user executes a replication of all the chef's actions based on the playback of the entire recipe creation process by the human chef on the monitor/projection screen, whereby semi-finished products are moved to designated cookware and appliances or intermediate storage containers for later use. In step 1924, the robotic apparatus 75 in the standardized kitchen executes the individual processing steps according to sensory data curves or based on cooking parameters recorded when the chef executed the same step in the recipe preparation process in the chef studio's standardized robotic kitchen. In step 1926 the robotic food preparation's computer controls all the cookware and appliance settings in terms of temperature, pressure and humidity to replicate the required data curves over the entire cooking time based on the data captured and saved while the chef was preparing the recipe in the chef's studio standardized robotic kitchen. In step 1928, the user makes all simple movements to replicate the chef's steps and process movements as evidenced through the audio and video instructions relayed to the user over the monitor or projection screen. In step 1930, the robotic kitchen's cooking engine alerts the user when a particular cooking step based on a sensory curve or parameter set has been completed. Once the user and computer controller interactions result in the completion of all cooking steps in the recipe, the robotic cooking engine sends a request to terminate the computer-controlled portion of the replication process in step 1932. In step 1934, the user removes the completed recipe dish, plates and serves it, or continues any remaining cooking steps or processes manually.

Figure 80:
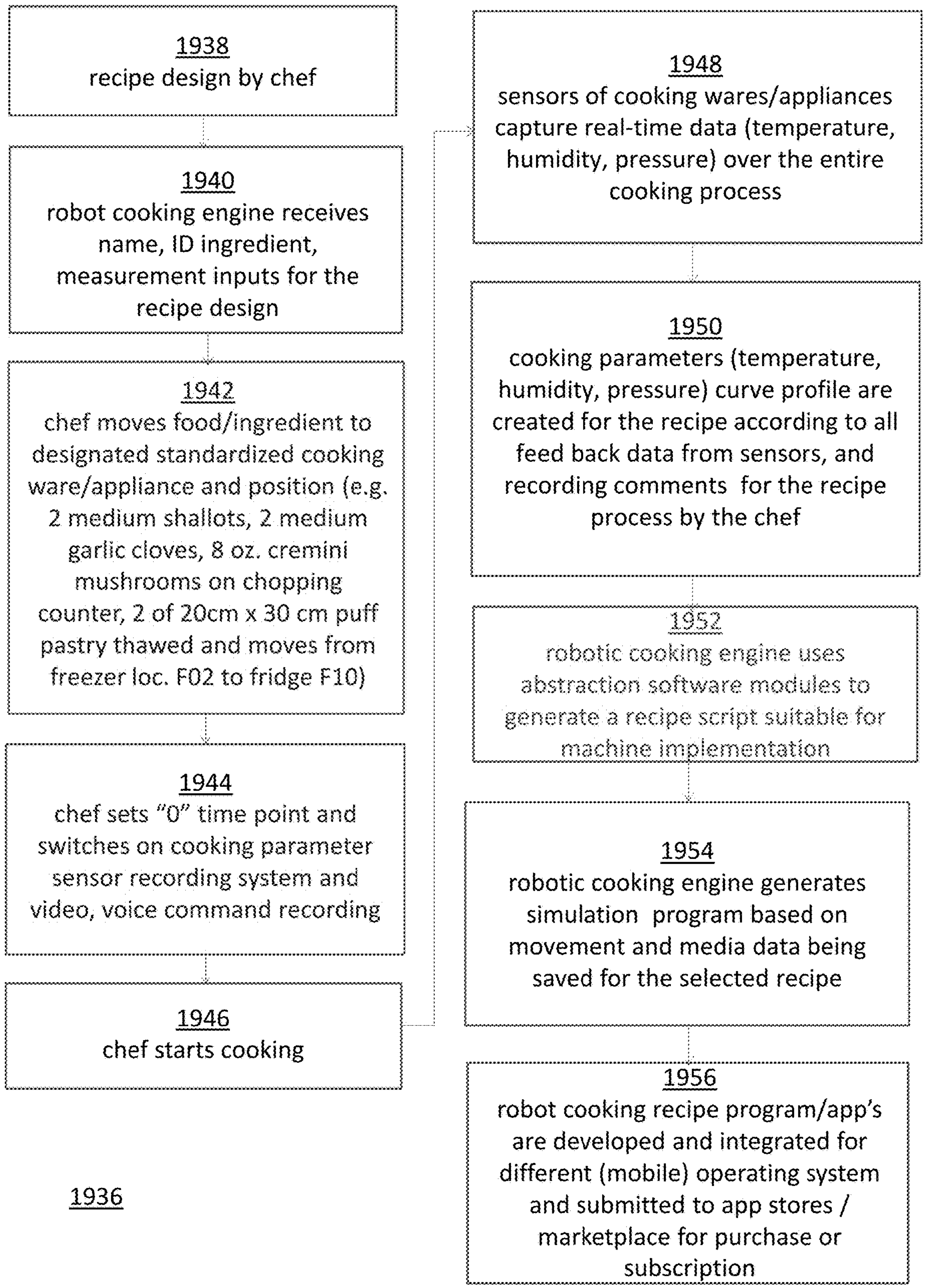
FIG. 80 depicts one embodiment of the sensory data capturing process in the chef studio in accordance with the present disclosure.

FIG. 80 depicts one embodiment of the sensory data capturing process 1936 in the chef studio. The first step 1938 is for the chef to create or design the recipe. A next step 1940 requires that the chef input the name, ingredients, measurement and process descriptions for the recipe into the robotic cooking engine. The chef begins by loading all the required ingredients into designated standardized storage containers, appliances and select appropriate cookware in step 1942. The next step 1944 involves the chef setting the start time and switching on the sensory and processing systems to record all sensed raw data and allow for processing of the same. Once the chef starts cooking in step 1946, all embedded and monitoring sensor units and appliances report and send raw data to the central computer system to allow it to record in real time all relevant data during the entire cooking process 1948. Additional cooking parameters and audible chef comments are further recorded and stored as raw data in step 1950. A robotic cooking module abstraction (software) engine processes all raw data, including two- and three-dimensional geometric motion and object recognition data, to generate a machine-readable and machine-executable recipe script as part of step 1952. Upon completion of the chef studio recipe creation and cooking process by the chef, the robotic cooking engine generates a simulation visualization program 1954 replicating the movement and media data used for later recipe replication by a remote standardized robotic kitchen system. Based on the raw and processed data, and a confirmation of the simulated recipe execution visualization by the chef, hardware-specific applications are developed and integrated for different (mobile) operating systems and submitted to online software-application stores and/or marketplaces in step 1956, for direct single-recipe user purchase or multi-recipe purchase via subscription models.

Figure 81:
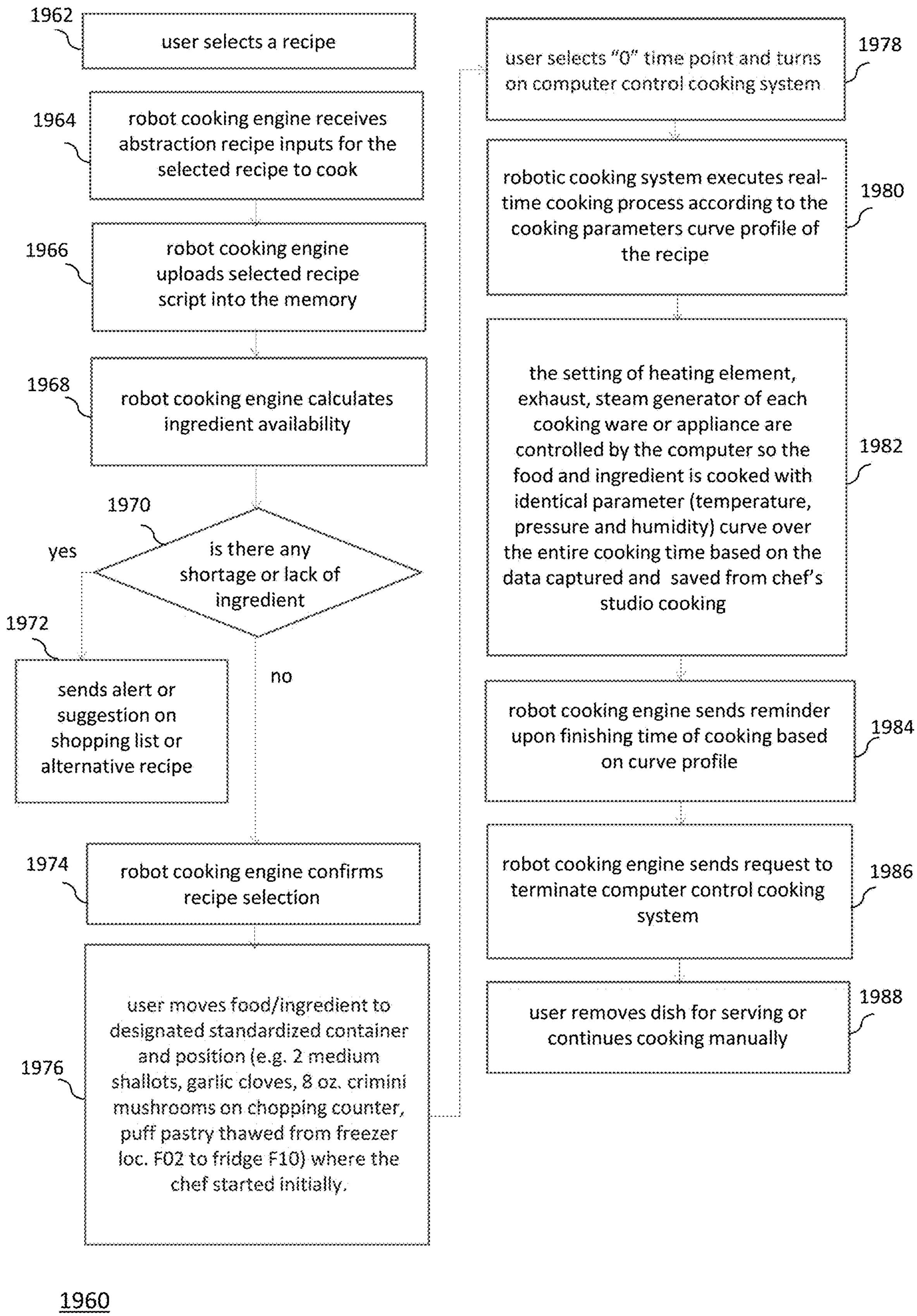
FIG. 81 depicts the process and flow of a household robotic cooking process. The first step involves the user selecting a recipe and acquiring the digital form of the recipe in accordance with the present disclosure.

FIG. 81 depicts the process and flow of a household robotic cooking process 1960. The first step 1962 involves the user selecting a recipe and acquiring the digital form of the recipe. In step 1964, the robotic cooking engine receives the recipe script containing machine-readable commands to cook the selected recipe. The recipe is uploaded in step 1966 to the robotic cooking engine with the script being placed in memory. Once stored, step 1968 calculates the necessary ingredients and determines their availability. In a logic check 1970 the system determines whether to alert the user or send a suggestion in step 1972 urging adding missing items to the shopping list or suggesting an alternative recipe to suit the available ingredients, or to proceed should sufficient ingredients be available. Once ingredient availability is verified in step 1974, the system confirms the recipe and the user is queried in step 1976 to place the required ingredients into designated standardized containers in a position where the chef started the recipe creation process originally (in the chef studio). The user is prompted to set the start time of the cooking process and to set the cooking system to proceed in step 1978. Upon start-up, the robotic cooking system begins the execution of the cooking process 1980 in real time according to sensory curves and cooking parameter data provided in the recipe script data files. During the cooking process 1982, the computer, to replicate the sensory curves and parameter data files originally captured and saved during the chef studio recipe creation process, controls all appliances and equipment. Upon completion of the cooking process, the robotic cooking engine sends a reminder based on having decided the cooking process is finished in step 1984. Subsequently the robotic cooking engine sends a termination request 1986 to the computer-control system to terminate the entire cooking process, and in step 1988, the user removes the dish from the counter for serving or continues any remaining cooking steps manually.

Figure 82:
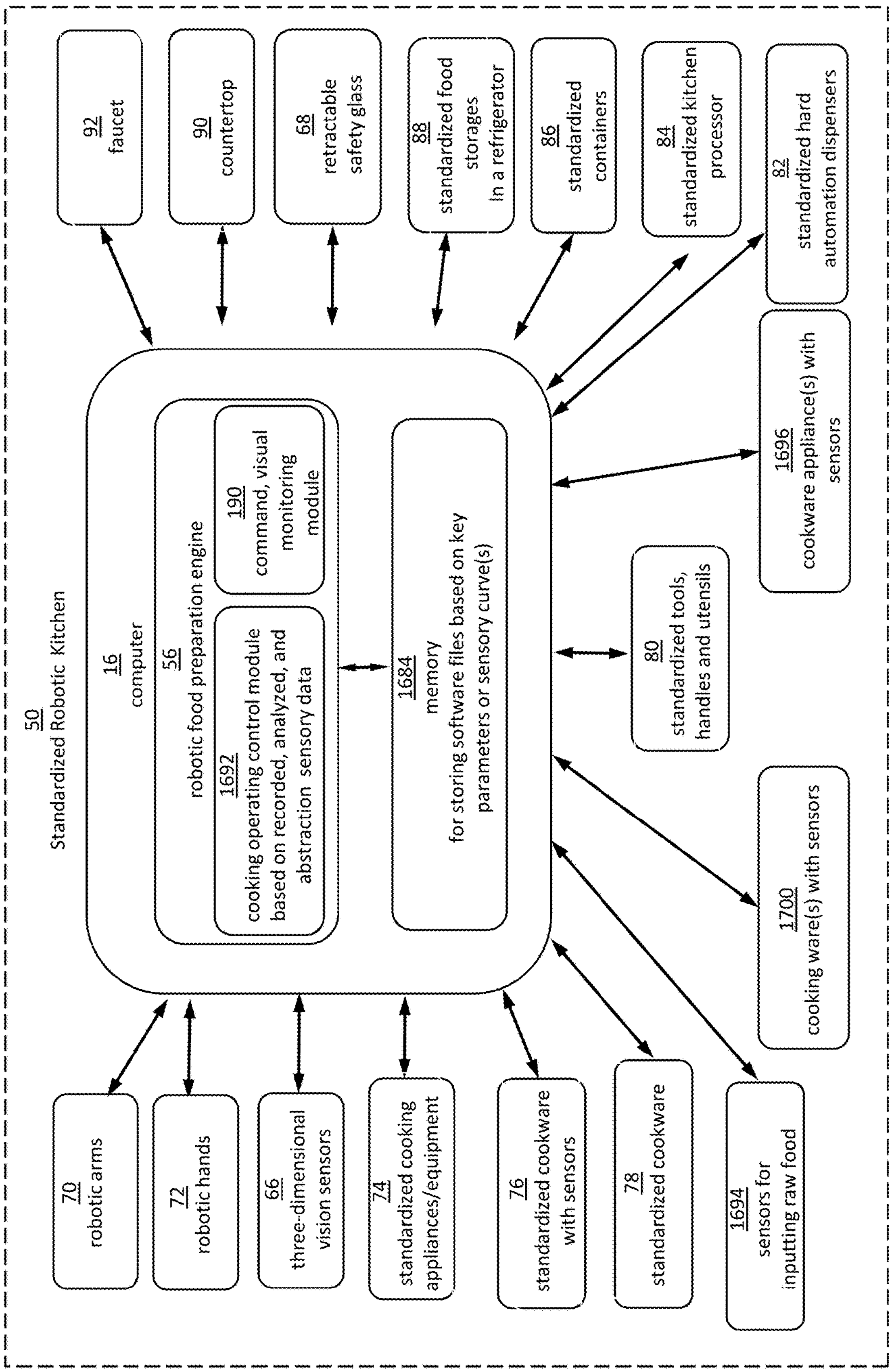
FIG. 82 is a block diagram illustrating a third embodiment of the robotic food preparation kitchen with a cooking operating control module, and a command and visual monitoring module in accordance with the present disclosure.

FIG. 82 depicts one embodiment of a standardized robotic food preparation kitchen system 50 with a command, visual monitoring module 1990. The computer 16 that runs the robotic cooking (software) engine 56, which includes the cooking operations control module 1990 that processes recorded, analyzed and abstraction sensory data from the recipe script, the visual command monitoring module 1990, and associated storage media and memory 1684 to store software files comprising of sensory curves and parameter data, interfaces with multiple external devices. These external devices include, but are not limited to, an instrumented kitchen working counter 90, the retractable safety glass 68, the instrumented faucet 92, cooking appliances with embedded sensors 74, cookware 1700 with embedded sensors (stored on a shelf or in a cabinet), standardized containers and ingredient storage units 78, a computer-monitored and computer-controllable storage unit 88, multiple sensors reporting on the process of raw food quality and supply 1694, hard automation modules 82 to dispense ingredients, and the operations control module 1692.

Figure 83:
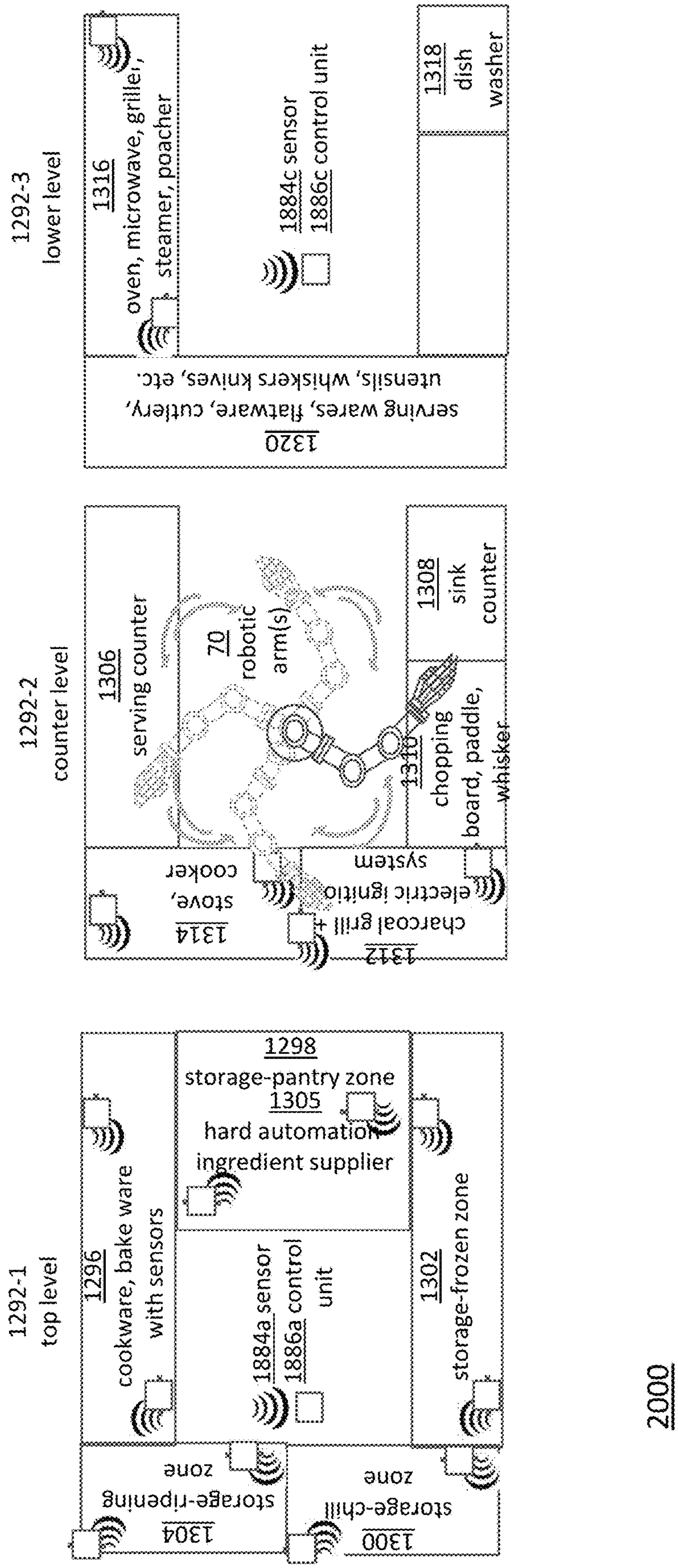
FIG. 83 is a block diagram illustrating a top plan view in the third embodiment of the robotic food preparation kitchen with robotic arm and hand motions in accordance with the present disclosure.

FIG. 83 depicts an embodiment of a fully instrumented robotic kitchen 2000 in top plan view with one or more robotic arms 70. The standardized robotic kitchen is divided into three levels, namely the top level 1292-1, the counter level 1292-2 and the lower level 1292-3, with each level containing equipment and appliances that have integrally mounted sensors 1884*a*, 1884*b*, 1884*c* and computer-control units 1886*a*, 1886*b*, 1886*c*.

The top level 1292-1 contains multiple cabinet-type modules with different units to perform specific kitchen functions by way of built-in appliances and equipment. At the simplest level this includes a cabinet volume 1296 used for storing and accessing cooking tools and utensils and other cooking and serving ware (cooking, baking, plating, etc.), a storage ripening cabinet volume 1298 for particular ingredients (e.g. fruit and vegetables, etc.), the hard automation controlled ingredient dispensers 1305, a chilled storage zone 1300 for such items as lettuce and onions, a frozen storage cabinet volume 1302 for deep-frozen items, and another storage pantry zone 1304 for other ingredients and rarely used spices, etc. Each of the modules within the top level contains sensor units 1884*a* providing data to one or more control units 1886*a*, either directly or by way of one or more central or distributed control computers, to allow for computer-controlled operations.

The counter level 1292-2 not only houses monitoring sensors 1884 and control units 1886, but also includes the one or more robotic arms, wrists and multi-fingered hands 72, a serving counter 1306, a counter area with a sink 1308, another counter area 1310 with removable working surfaces (cutting/chopping board, etc.), a charcoal-based slatted grill 1312 and a multi-purpose area for other cooking appliances 1314, including a stove, cooker, steamer and poacher. In the embodiment, the pair of robotic arms 70 and hands 72 operate to carry out a specific task as controlled by one or more central or distributed control computers, to allow for computer-controlled operations.

The lower level 1292-3 houses the combination convection oven and microwave as well as steamer, poacher and grill 1316, the dish-washer 1318, and a larger cabinet volume 1320 that holds and stores additional frequently used cooking and baking ware, as well as tableware, flatware, utensils (whisks, knives, etc.) and cutlery. Each of the modules within the lower level contains sensor units 1884*c* providing data to one or more control units 1886*c*, either directly or by way of one or more central or distributed control computers, to allow for computer-controlled operations.

Figure 84:
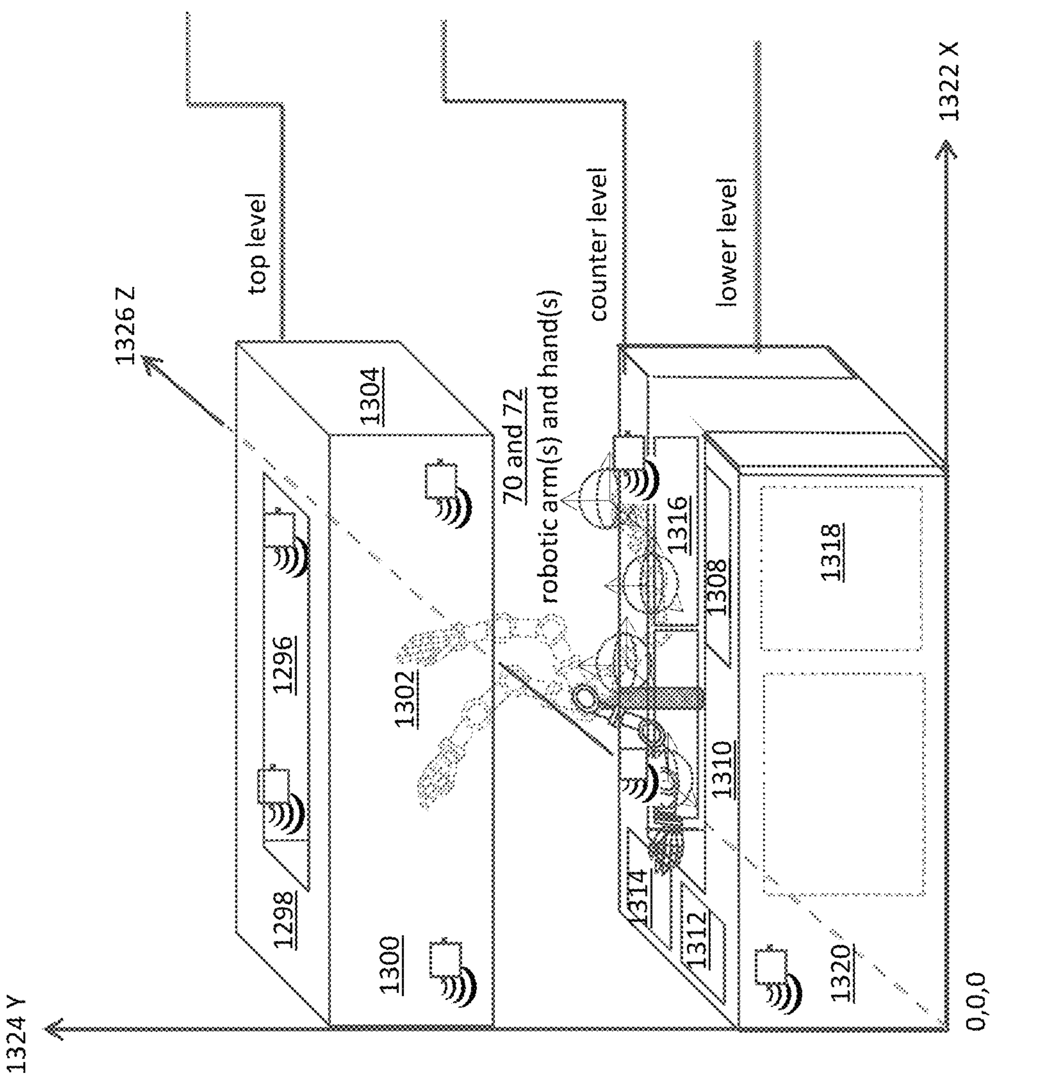
FIG. 84 is a block diagram illustrating a perspective view in the third embodiment of the robotic food preparation kitchen with robotic arm and hand motions in accordance with the present disclosure.

FIG. 84 depicts an embodiment of a fully instrumented robotic kitchen 2000 in perspective view, with an overlaid coordinate frame designating the x-axis 1322, the y-axis 1324 and the z-axis 1326, within which all movements and locations will be defined and referenced to the origin (0,0,0). The standardized robotic kitchen is divided in to three levels, namely the top level, the counter level and the lower level, with each level containing equipment and appliances that have integrally mounted sensors 1884 and computer-control units 1886.

The top level contains multiple cabinet-type modules with different units to perform specific kitchen functions by way of built-in appliances and equipment.

At the simplest level this includes a cabinet volume 1294 used for storing and accessing standardized cooking tools and utensils and other cooking and serving ware (cooking, baking, plating, etc.), a storage ripening cabinet volume 1298 for particular ingredients (e.g. fruit and vegetables, etc.), a chilled storage zone 1300 for such items as lettuce and onions, a frozen storage cabinet volume 86 for deep-frozen items, and another storage pantry zone 1294 for other ingredients and rarely used spices, etc. Each of the modules within the top level contains sensor units 1884*a* providing data to one or more control units 1886*a*, either directly or by way of one or more central or distributed control computers, to allow for computer-controlled operations.

The counter level not only houses monitoring sensors 1884 and control units 1886, but also includes the one or more robotic arms, wrists and multi-fingered hands 72, a counter area with a sink and electronic faucet 1308, another counter area 1310 with removable working surfaces (cutting/chopping board, etc.), a charcoal-based slatted grill 1312 and a multi-purpose area for other cooking appliances 1314, including a stove, cooker, steamer and poacher. The pair of robotic arms 70 and the respective associated robotic hands conduct a specific task as directed by one or more central or distributed control computers, to allow for computer-controlled operations.

The lower level houses the combination convection oven and microwave as well as steamer, poacher and grill 1315, the dish-washer 1318, the hard automation controlled ingredient dispensers 82 (not shown), and a larger cabinet volume 1310 that holds and stores additional frequently used cooking and baking ware, as well as tableware, flatware, utensils (whisks, knives, etc.) and cutlery. Each of the modules within the lower level contains sensor units 1884*c* providing data to one or more control units 1886*c*, either directly or by way of one or more central or distributed control computers, to allow for computer-controlled operations.

Figure 85:
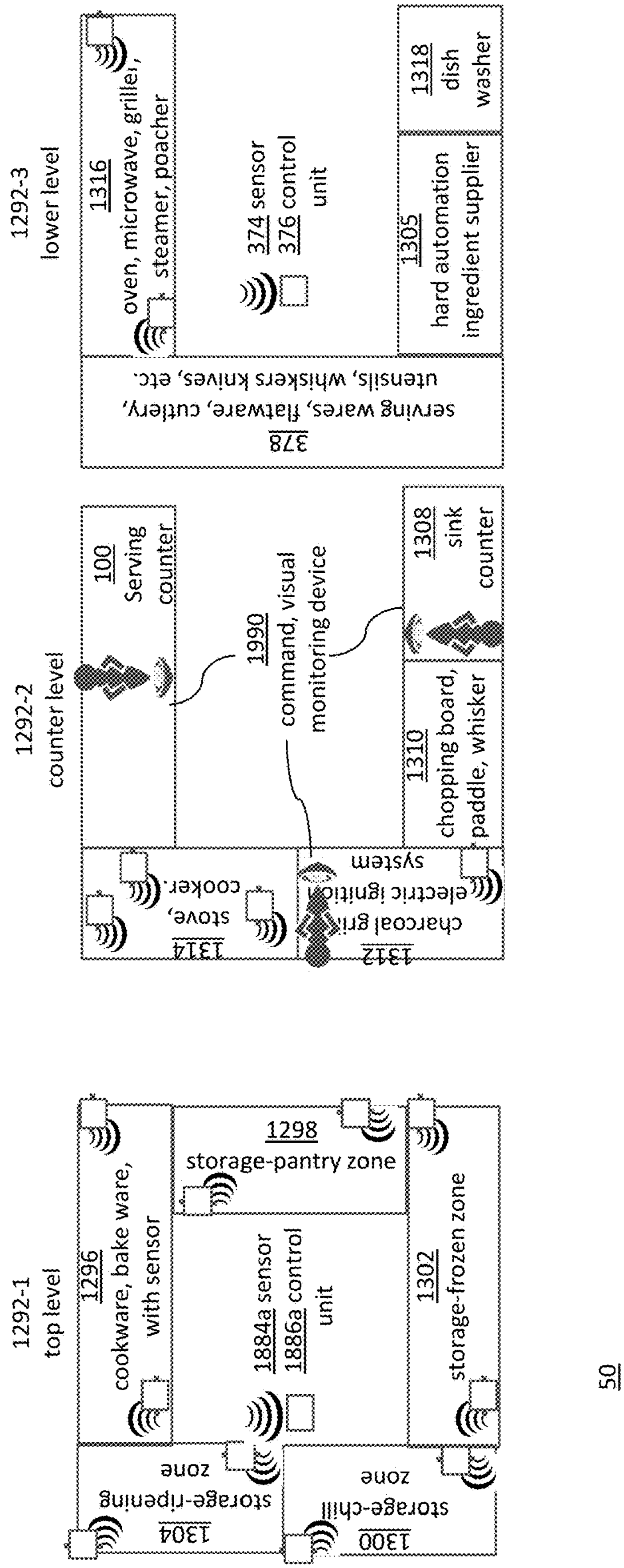
FIG. 85 is a block diagram illustrating a top plan view in the third embodiment of the robotic food preparation kitchen with a command and visual monitoring device in accordance with the present disclosure.

FIG. 85 depicts an embodiment of an instrumented and standardized robotic kitchen 50 in top plan view with a command, visual monitoring module or device 1990. The standardized robotic kitchen is divided into three levels, namely the top level, the counter level and the lower level, with the top and lower levels containing equipment and appliances that have integrally mounted sensors 1884 and computer-control units 1886, and the counter level being fitted with one or more command and visual monitoring devices 2022.

The top level 1292-1 contains multiple cabinet-type modules with different units to perform specific kitchen functions by way of built-in appliances and equipment. At the simplest level this includes a cabinet volume 1296 used for storing and accessing standardized cooking tools and utensils and other cooking and serving ware (cooking, baking, plating, etc.), a storage ripening cabinet volume 1298 for particular ingredients (e.g. fruit and vegetables, etc.), a chilled storage zone 1300 for such items as lettuce and onions, a frozen storage cabinet volume 1302 for deep-frozen items, and another storage pantry zone 1304 for other ingredients and rarely used spices, etc. Each of the modules within the top level contains sensor units 1884 providing data to one or more control units 1886, either directly or by way of one or more central or distributed control computers, to allow for computer-controlled operations.

The counter level 1292-2 houses not only monitoring sensors 1884 and control units 1886, but also visual command monitoring devices 2020 while also including a serving counter 1306, a counter area with a sink 1308, another counter area 1310 with removable working surfaces (cutting/chopping board, etc.), a charcoal-based slatted grill 1312 and a multi-purpose area for other cooking appliances 1314, including a stove, cooker, steamer and poacher. Each of the modules within the counter level contains sensor units 1884 providing data to one or more control units 1886, either directly or by way of one or more central or distributed control computers, to allow for computer-controlled operations. Additionally, one or more visual command monitoring devices 1990 are also provided within the counter level for the purposes of monitoring the visual operations of the human chef in the studio kitchen as well as the robotic arms or human user in the standardized robotic kitchen, where data is fed to one or more central or distributed computers for processing and subsequent corrective or supportive feedback and commands sent back to the robotic kitchen for display or script-following execution.

The lower level 1292-3 houses the combination convection oven and microwave as well as steamer, poacher and grill 1316, the dish-washer 1318, the hard automation controlled ingredient dispensers 86 (not shown), and a larger cabinet volume 1320 that holds and stores additional frequently used cooking and baking ware, as well as tableware, flatware, utensils (whisks, knives, etc.) and cutlery. Each of the modules within the lower level contains sensor units 1884 providing data to one or more control units 1886, either directly or by way of one or more central or distributed control computers, to allow for computer-controlled operations. In this embodiment, the hard automation ingredient supplier 1305 is designed in the lower level 1292-3.

Figure 86:
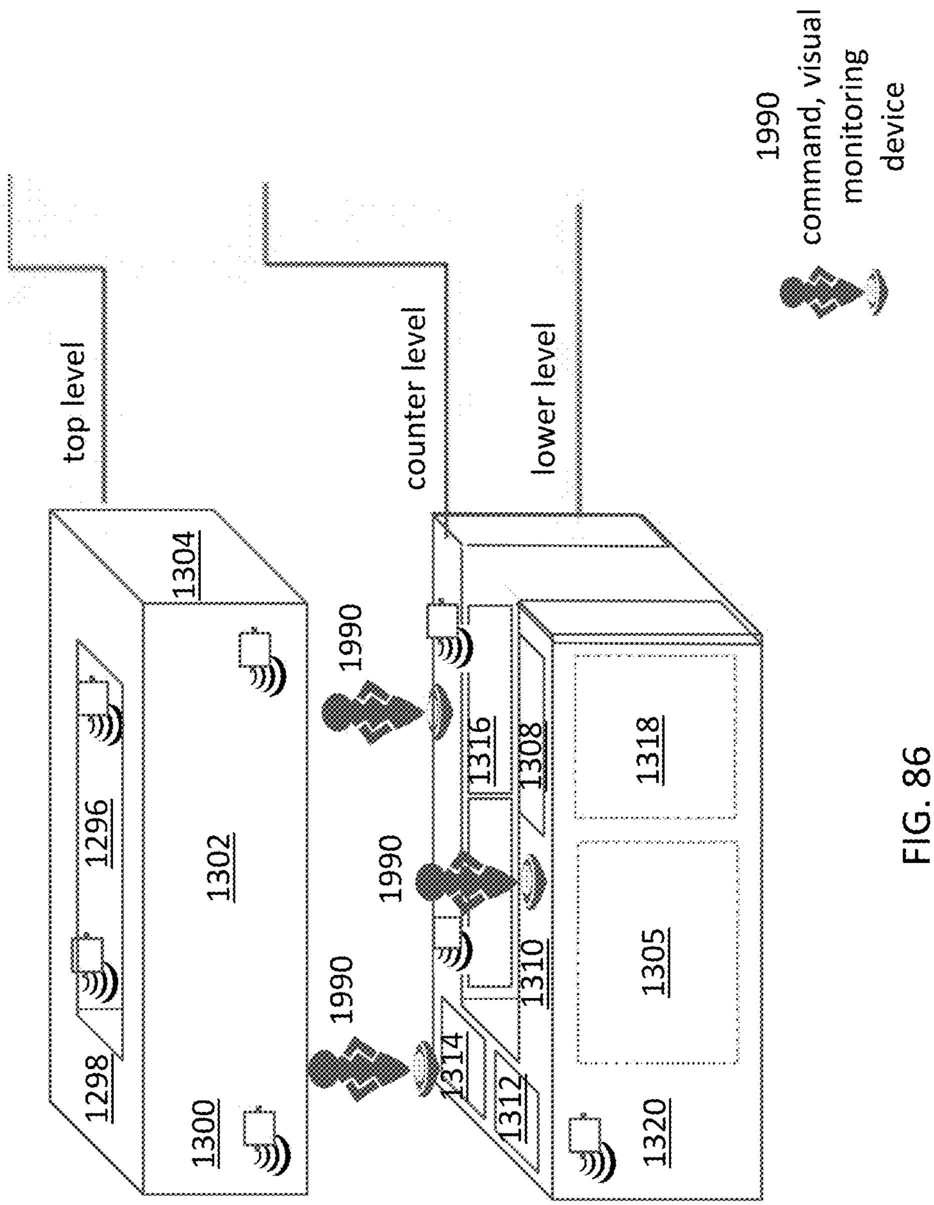
FIG. 86 is a block diagram illustrating a perspective view in the third embodiment of the robotic food preparation kitchen with a command and visual monitoring device in accordance with the present disclosure.

FIG. 86 depicts an embodiment of a fully instrumented robotic kitchen 2020 in perspective view. The standardized robotic kitchen is divided into three levels, namely the top level, the counter level and the lower level, with the top and lower levels containing equipment and appliances that have integrally mounted sensors 1884 and computer-control units 1886, and the counter level being fitted with one or more command and visual monitoring devices 2022.

The top level contains multiple cabinet-type modules with different units to perform specific kitchen functions by way of built-in appliances and equipment. At the simplest level this includes a cabinet volume 1296 used for storing and accessing standardized cooking tools and utensils and other cooking and serving ware (cooking, baking, plating, etc.), a storage ripening cabinet volume 1298 for particular ingredients (e.g. fruit and vegetables, etc.), a chilled storage zone 1300 for such items as lettuce and onions, a frozen storage cabinet volume 86 for deep-frozen items, and another storage pantry zone 1294 for other ingredients and rarely used spices, etc. Each of the modules within the top level contains sensor units 1884 providing data to one or more control units 1886, either directly or by way of one or more central or distributed control computers, to allow for computer-controlled operations.

The counter level 1292-2 houses not only monitoring sensors 1884 and control units 1886, but also visual command monitoring devices 1316 while also including a counter area with a sink and electronic faucet 1308, another counter area 1310 with removable working surfaces (cutting/chopping board, etc.), a (smart) charcoal-based slatted grill 1312 and a multi-purpose area for other cooking appliances 1314, including a stove, cooker, steamer and poacher. Each of the modules within the counter level contains sensor units 1184 providing data to one or more control units 1186, either directly or by way of one or more central or distributed control computers, to allow for computer-controlled operations. Additionally, one or more visual command monitoring devices (not shown) are also provided within the counter level for the purposes of monitoring the visual operations of the human chef in the studio kitchen as well as the robotic arms or human user in the standardized robotic kitchen, where data is fed to one or more central or distributed computers for processing and subsequent corrective or supportive feedback and commands sent back to the robotic kitchen for display or script-following execution.

The lower level 1292-3 houses the combination convection oven and microwave as well as steamer, poacher and grill 1316, the dish-washer 1318, the hard automation controlled ingredient dispensers 86 (not showed)s, and a larger cabinet volume 1309 that holds and stores additional frequently used cooking and baking ware, as well as tableware, flatware, utensils (whisks, knives, etc.) and cutlery. Each of the modules within the lower level contains sensor units 1307 providing data to one or more control units 376, either directly or by way of one or more central or distributed control computers, to allow for computer-controlled operations.

Figure 87A:
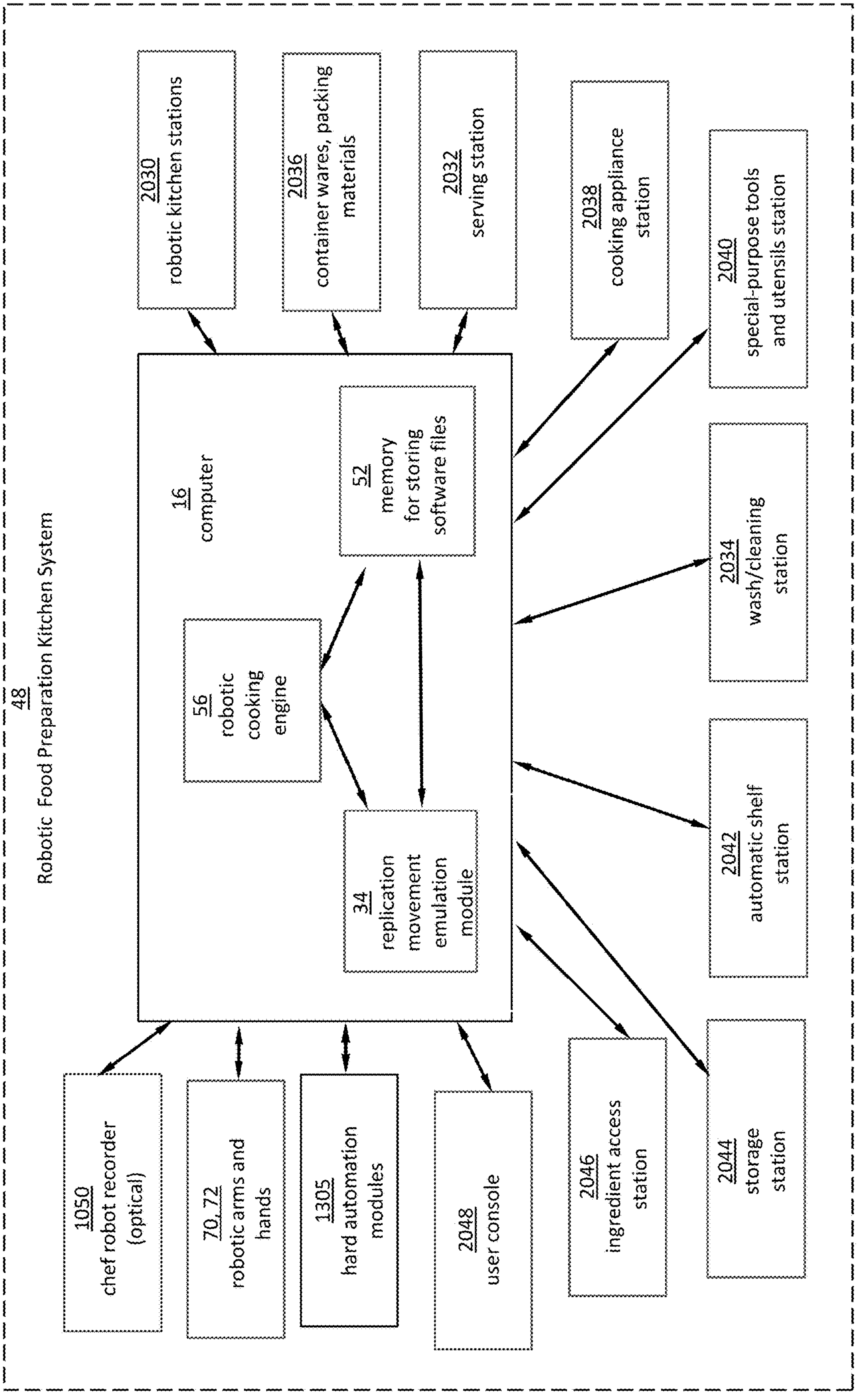
FIG. 87A is a block diagram illustrating a fourth embodiment of the robotic food preparation kitchen with a robot in accordance with the present disclosure.

FIG. 87A depicts another embodiment of the standardized robotic kitchen system 48. The computer 16 that runs the robotic cooking (software) engine 56 and the memory module 52 for storing recipe script data and sensory curves and parameter data files, interfaces with multiple external devices. These external devices include, but are not limited to, instrumented robotic kitchen stations 2030, instrumented serving stations 2032, an instrumented washing and cleaning station 2034, instrumented cookware 2036, computer-monitored and computer-controllable cooking appliances 2038, special-purpose tools and utensils 2040, an automated shelf station 2042, an instrumented storage station 2044, an ingredient retrieval station 2046, a user console interface 2048, dual robotic arms 70 and robotic hands 72, hard automation modules 1305 to dispense ingredients, and an optional chef-recording device 2050.

FIG. 87B depicts one embodiment of a robotic kitchen cooking system 2060 in plan view, where a humanoid 2056 (or the chef 49, a home-cook user or a commercial user 60) can access various cooking stations from multiple (four shown here) sides, where the humanoid would walk around the robotic food preparation kitchen system 2060, as illustrated in FIG. 87B, by accessing the shelves from around a robotic kitchen module 2058. A central storage station 2062 provides for different storage areas for various food items held at different temperatures (chilled/frozen) for optimum freshness, allowing access from all sides. Along the perimeter of the square arrangement of the current embodiment, a humanoid 2052 the chef 49 or user 60 can access various cooking areas with modules that include, but are not limited to, a user/chef console 2064 for laying out the recipe and overseeing the processes, an ingredient access station 2066 including a scanner, camera and other ingredient characterization systems, an automatic shelf station 2068 for cookware/baking ware/tableware, a washing and cleaning station 2070 comprising at least a sink and dish-washer unit, a specialized tool and utensil station 2072 for specialized tools required for particular techniques used in food or ingredient preparation, a warming station 2074 for warming or chilling served dishes and a cooking appliance station 2076 comprising multiple appliances including, but not limited to, an oven, stove, grill, steamer, fryer, microwave, blender, dehydrator, etc.

Figure 87C:
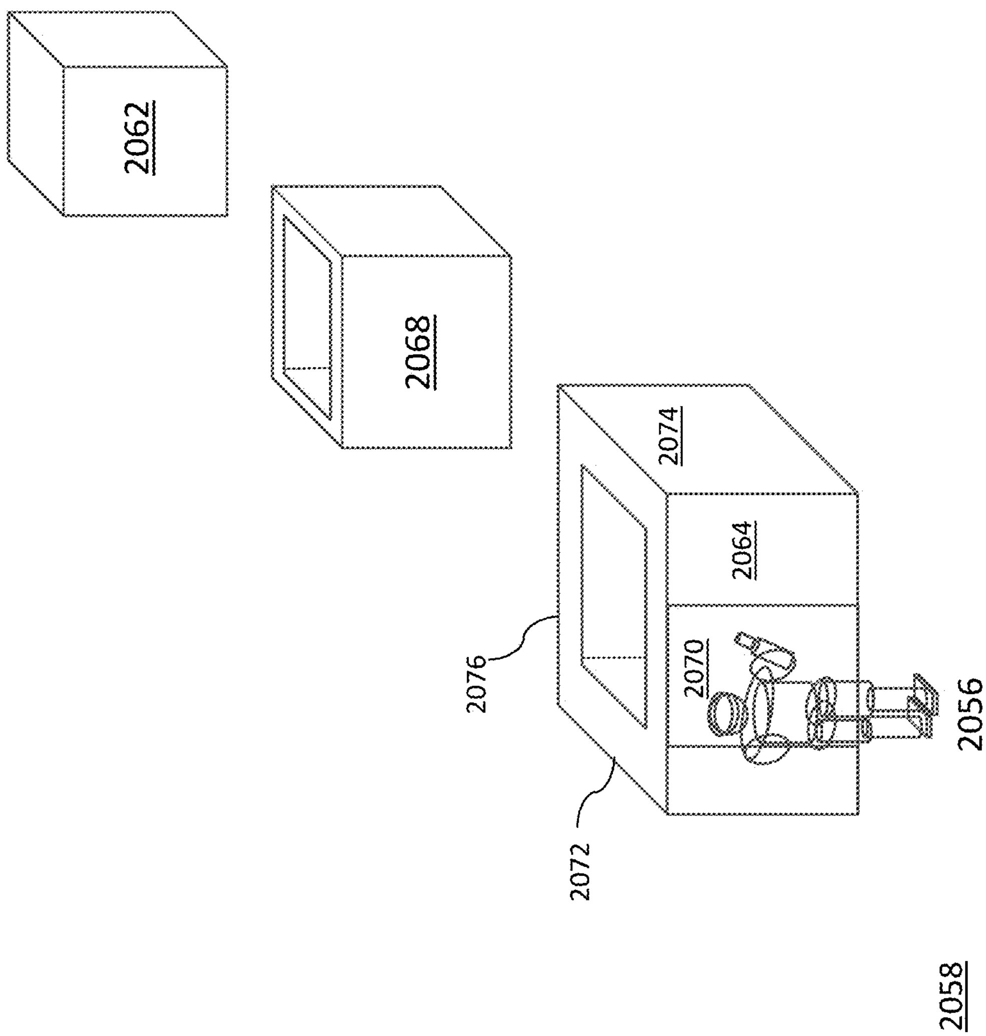
FIG. 87C is a block diagram illustrating a perspective plan view in the fourth embodiment of the robotic food preparation kitchen with the humanoid robot in accordance with the present disclosure.

FIG. 87C depicts a perspective view of the same embodiment of the robotic kitchen 2058, allowing the humanoid 2056 (or a chef 49 or a user 60) to gain access to multiple cooking stations and equipment from at least four different sides. A central storage station 2062 provides for different storage areas for various food items held at different temperatures (chilled/frozen) for optimum freshness, allowing access from all sides, and is located at an elevated level. An automatic shelf station 2068 for cookware/baking ware/tableware is located at a middle level beneath the central storage station 2062. At a lower level an arrangement of cooking stations and equipment is located that includes, but is not limited to, a user/chef console 2064 for laying out the recipe and overseeing the processes, an ingredient access station 2060 including a scanner, camera and other ingredient characterization systems, an automatic shelf station 2068 for cookware/baking ware/tableware, a washing and cleaning station 2070 comprising at least a sink and dish-washer unit, a specialized tool and utensil station 2072 for specialized tools required for particular techniques used in food or ingredient preparation, a warming station 2076 for warming or chilling served dishes and a cooking appliance station 2076 comprising multiple appliances including, but not limited to, an oven, stove, grill, steamer, fryer, microwave, blender, dehydrator, etc.

Figure 88:
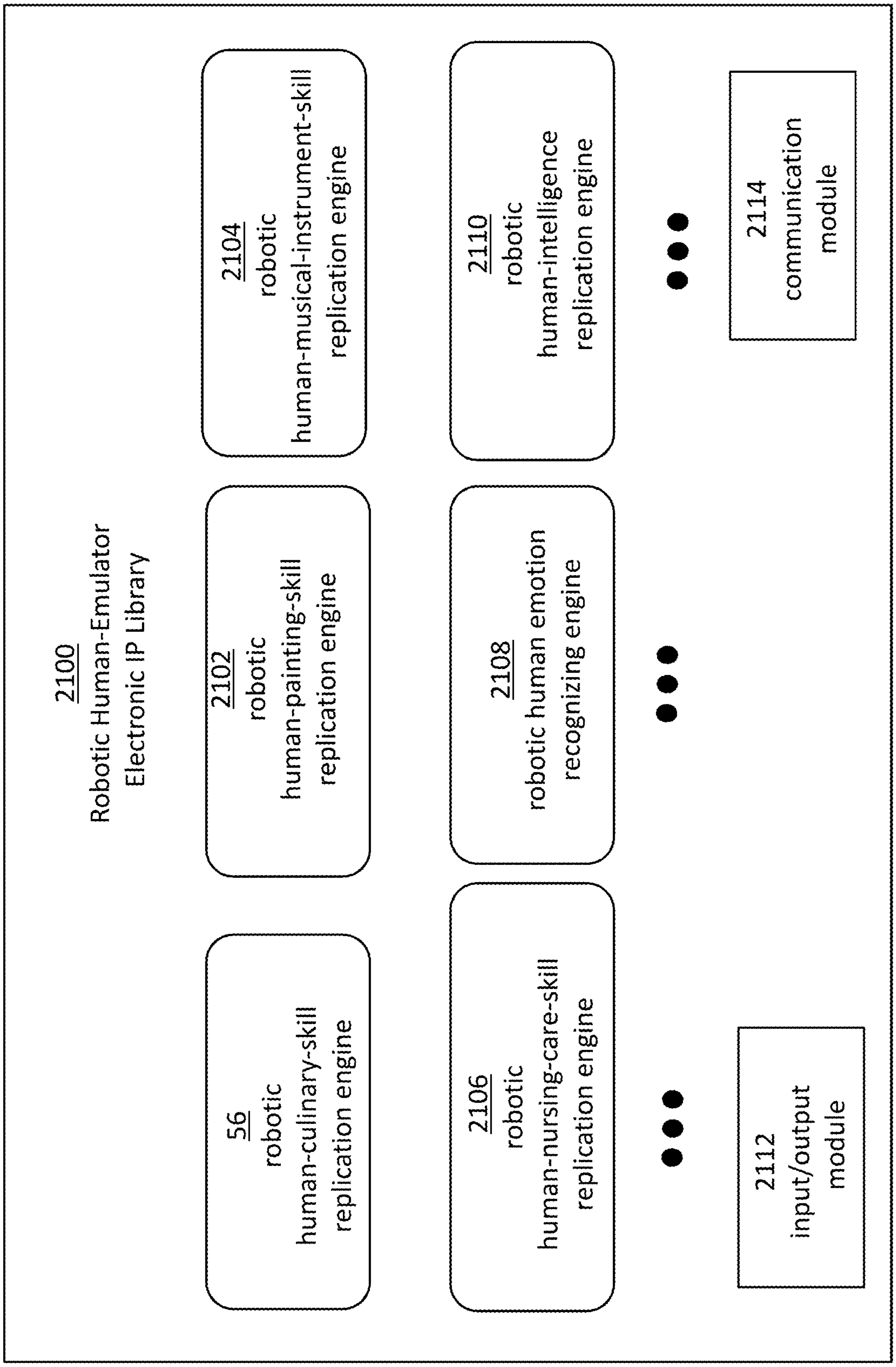
FIG. 88 is a block diagram illustrating a robotic human-emulator electronic intellectual property (IP) library in accordance with the present disclosure.

FIG. 88 is a block diagram Illustrating a robotic human-emulator electronic intellectual property (IP) library 2100. The robotic human-emulator electronic IP library 2100 covers the various concepts in which the robotic apparatus 75 is used as a means to replicate a human's particular skill set. More specifically, the robotic apparatus 75, which includes the pair of robotic hands 70 and the robotic arms 72, serves to replicate a set of specific human skills. In some way, the transfer to intelligence from a human can be captured using the human's hands; the robotic apparatus 75 then replicates the precise movements of the recorded movements in obtaining the same result. The robotic human-emulator electronic IP library 2100 includes a robotic human-culinary-skill replication engine 56, a robotic human-painting-skill replication engine 2102, a robotic human-musical-instrument-skill replication engine 2104, a robotic human-nursing-care-skill replication engine 2106, a robotic human-emotion recognizing engine 2108, a robotic human-intelligence replication engine 2110, an input/output module 2112, and a communication module 2114. The robotic human emotion recognizing engine 1358 is further described with respect to FIGS. 89, 90, 91, 92 and 93.

Figure 89:
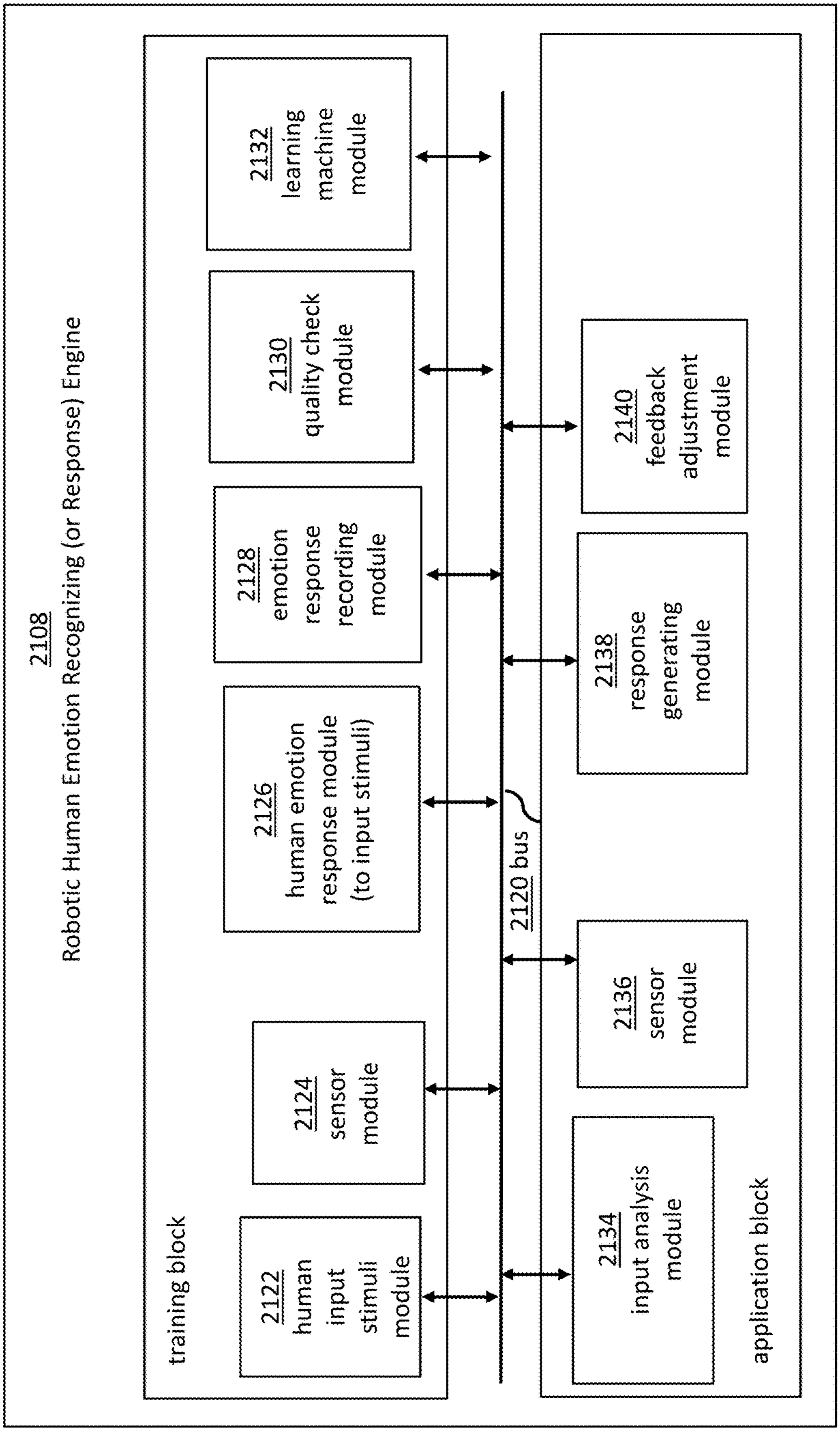
FIG. 89 is a block diagram illustrating a robotic human emotion recognition engine in accordance with the present disclosure.

FIG. 89 is a robotic human-emotion engine recognizing (or response) engine 2108, which includes a training block coupled to an application block via the bus 2120. The training block contains a human input stimuli module 2122, a sensor module 2124, a human emotion response module (to input stimuli) 2126, an emotion response recording module 2128, a quality check module 2130, and a learning machine module 2132. The application block contains an input analysis module 2134, a sensor module 2136, a response generating module 2138, and a feedback adjustment module 2140.

Figure 90:
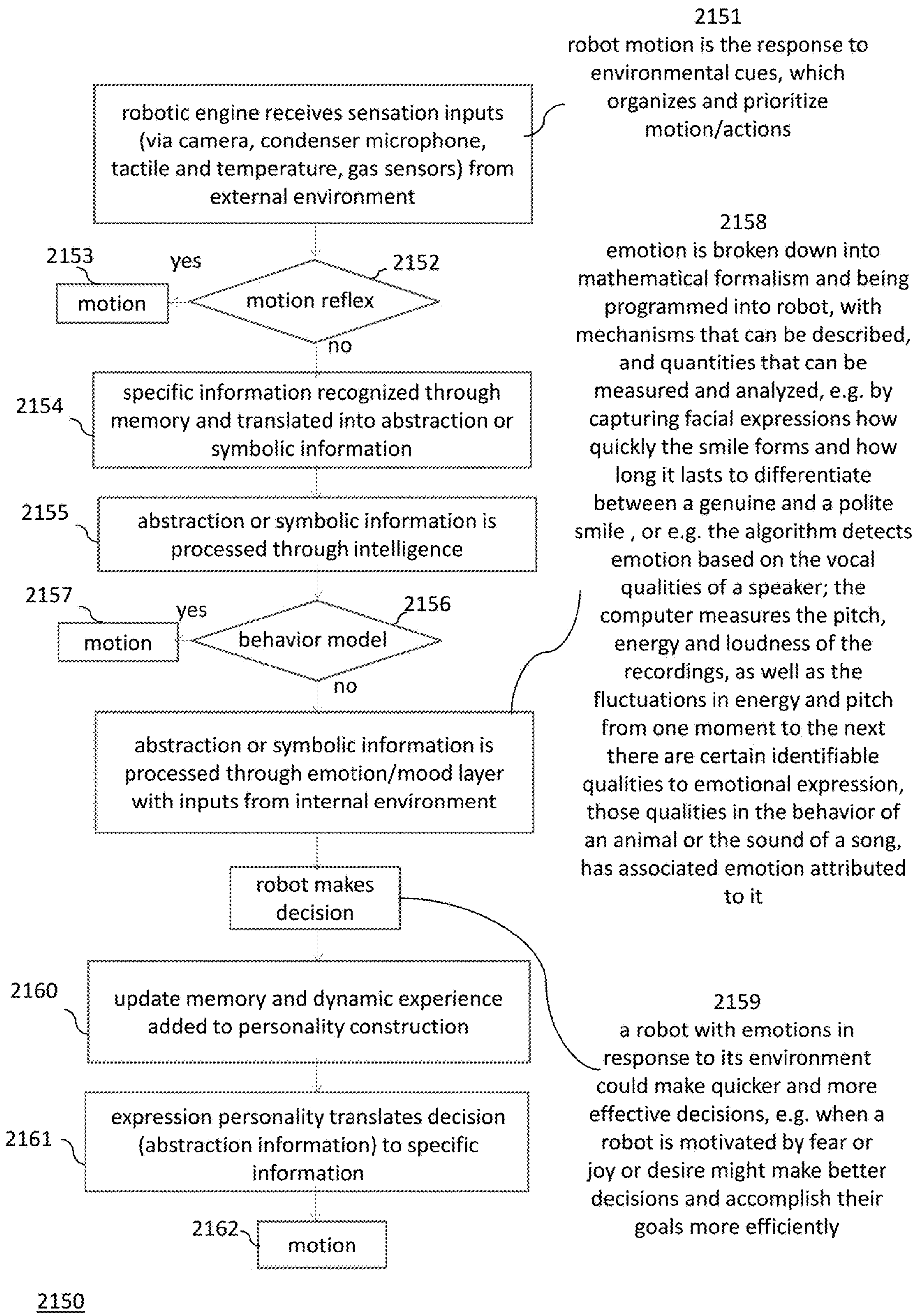
FIG. 90 is a flow diagram illustrating the process of a robotic human emotion engine in accordance with the present disclosure.

FIG. 90 is a flow diagram illustrating the process and logic flow of a robotic human emotion method 250 in the robotic human emotion (computer-operated) engine 2108. In its first step 2151, the (software) engine receives sensory input from a variety of sources akin to the senses of a human, including vision, audible feedback, tactile and olfactory sensor data from the surrounding environment. In the decision step 2152, the decision is made whether to create a motion reflex, either resulting in a reflex motion 2153 or, if no reflex motion is required, step 2154 is executed, where specific input information or patterns or combinations thereof are recognized based on information or patterns stored in memory, which are subsequently translated into abstraction or symbolic representations. The abstraction and/or symbolic information is processed through a sequence of intelligence loops, which can be experience-based. Another decision step 2156 decides on whether a motion-reaction 2157 should be engaged based on a known and pre-defined behavior model and, if not, step 12158 is undertaken. In step 2158 the abstraction and/or symbolic information is then processed through another layer of emotion- and mood-reaction behavior loops with inputs provided from internal memories, which can be formed through learning. Emotion is broken down into a mathematical formalism and programmed into robot, with mechanisms that can be described, and quantities that can be measured and analyzed (e.g. by capturing facial expressions of how quickly a smile forms and how long it lasts to differentiate between a genuine and a polite smile, or by detecting emotion based on the vocal qualities of a speaker, where the computer measures the pitch, energy and volume of the voice, as well as the fluctuations in volume and pitch from one moment to the next). There will thus be certain identifiable and measurable metrics to an emotional expression, where these metrics in the behavior of an animal or the sound of a human speaking or singing will have identifiable and measurable associated emotion attributes. Based on these identifiable and measurable metrics, the emotion engine can make a decision 2159 as to which behavior to engage, whether pre-learned or newly learned. The engaged or executed behavior and its effective result are updated in memory and added to the experience personality and natural behavior database 2160. In a follow-on step 2161, the experience personality data is translated into more human-specific information, which then allows him or her to execute the prescribed or resultant motion 2162.

Figure 91A:
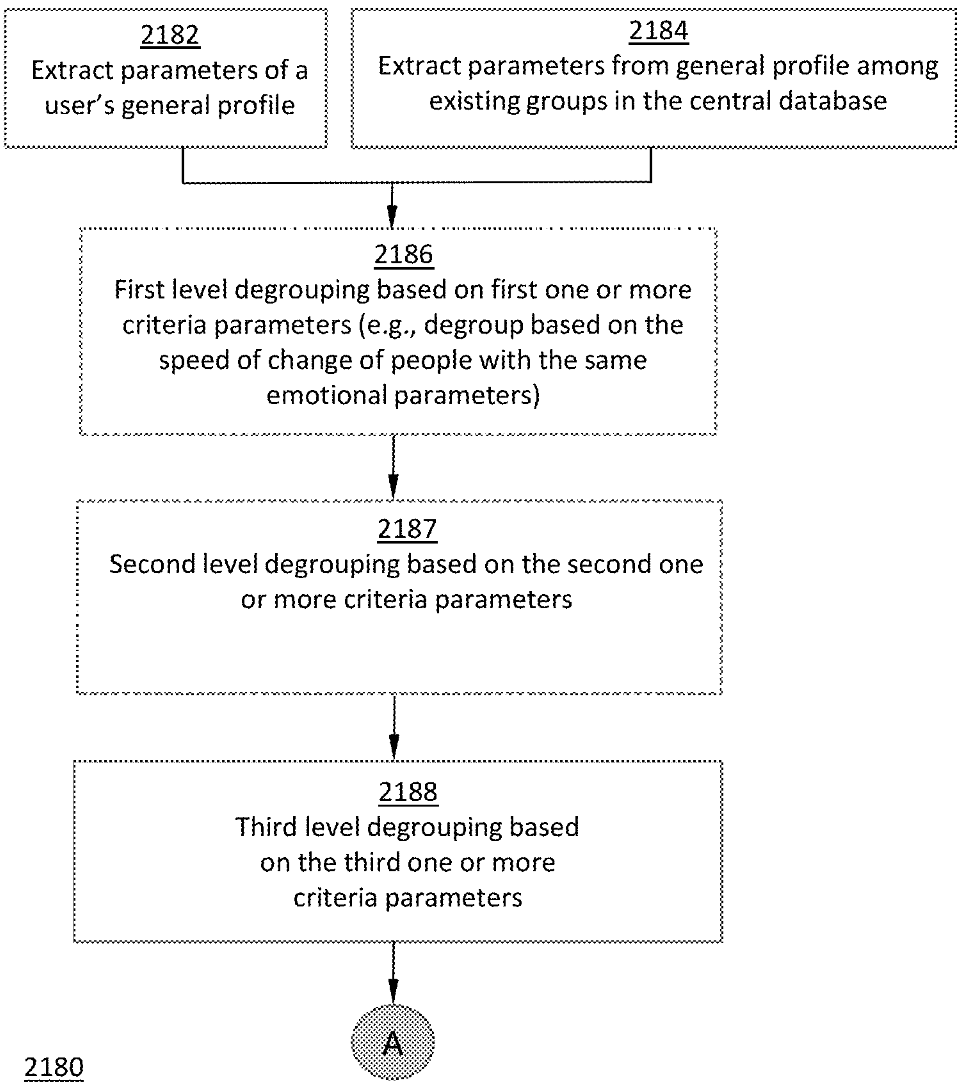
FIGS. 91A-C are flow diagrams illustrating the process of comparing a person's emotional profile against a population of emotional profiles with hormones, pheromones, and other parameters in accordance with the present disclosure.
Figure 91B:
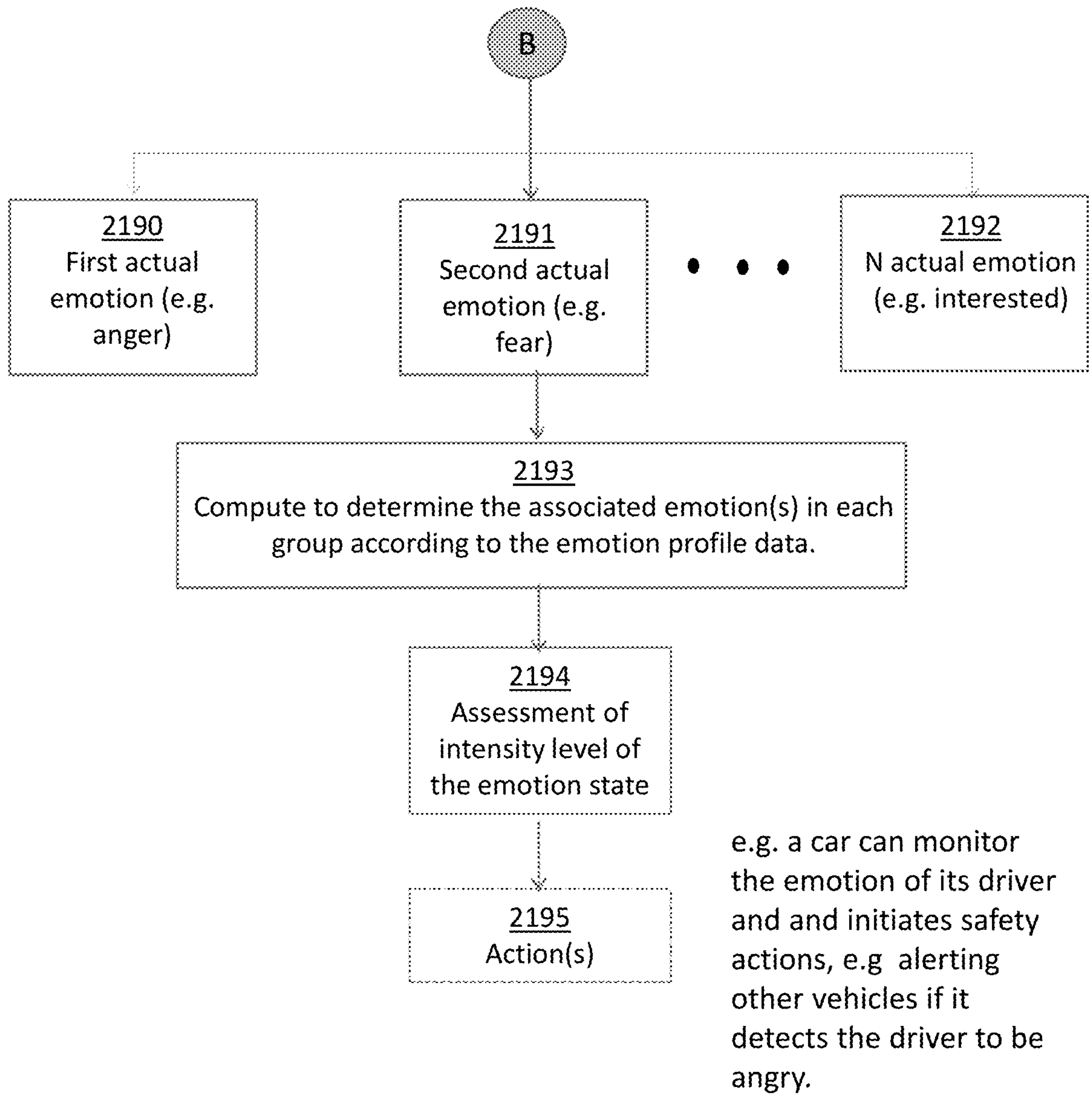
Figure 91C:
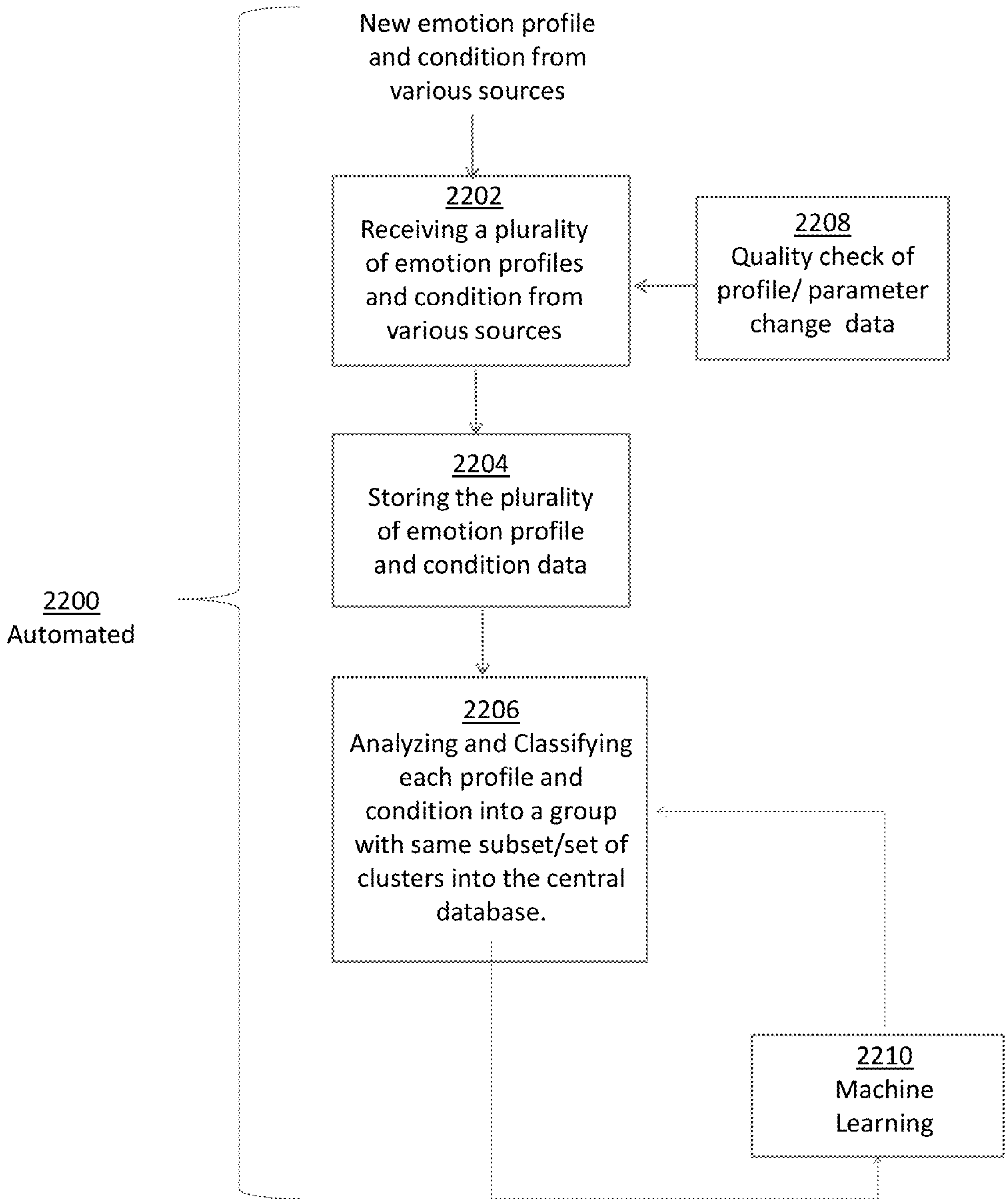

FIGS. 91A-C are flow diagrams illustrating the process 2180 of comparing a person's emotional profile against a population of emotional profiles with hormones, pheromones and others. FIG. 91A describes the process 2182 of the emotional profile application, where a person's emotion parameters are monitored and extracted from a user's general profile 2184, and based on a stimulus input, parameter value changes from a baseline value derived from a segmented timeline, taken and compared to those for an existing larger group under similar conditions. The robotic human emotion engine 2108 is configured to extract parameters from general emotional profile among existing groups in the central database. By monitoring a person's emotion parameters under a defined condition: with a stimulus input, each parameter value changes from baseline to current mean value derived from a segment of timeline. The user's data is compared to the existing profile obtained on a large group under same emotion profile or condition, which through a degrouping process an emotion and it emotional intensity level can be determined. Some potential applications include a robot companion, a dating service, detecting contempt, product market acceptance, under treated pain in kids, e-learning, and children with autism. At step 2186, first level degrouping based on one or more criteria parameters (e.g., degroup based on the speed of change of people with the same emotional parameters). The process continues the emotion parameter degrouping and segregation into further steps of emotional parameter comparisons, as shown in FIG. 92A, which can include continued levels represented by a set of pheromones, a set of micro-expressions 2223, the person's heart rate and perspiration 2225, pupil dilation 2226, observed reflexive movements 2229, awareness of overall body temperature 2224, and perceived situational pressure or reflex movement 2229. The degrouped emotion parameters are then used to determine a similar grouping of parameters 1815 for comparison purposes. In alternative embodiment, the degrouping process can be further refine as illustrated into the second level degrouping 2187 based on the second one or more criteria parameters, and the third level degrouping 2188 based on the third one or more criteria parameters.

FIG. 91B depicts all the individual emotion groupings such as immediate emotions 2190 such as anger, secondary emotions 2191 such as fear, all the way through to N actual emotions 2192. The next step 2193 then computes the associated emotion(s) in each group according to the associated emotional profile data, leading to the assessment 2194 of the intensity level of the emotional state, which allows the engine to then decide on the appropriate action 2195.

FIG. 91C depicts the automated process 2200 of mass group emotional profile development and learning. The process involves receiving new multi-source emotional profile and condition inputs from various sources 2202, with an associated quality-check of profile/parameter data change 2208. The plurality of the emotional profile data is stored in step 2204 and, using multiple machine learning techniques 2206, an iterative loop 2210 of analyzing and classifying each profile and data set into various groupings with matching (sub-)sets in the central database is carried out.

FIG. 92A is a block diagram illustrating the emotional detection and analysis 2220 of a person's emotional state by monitoring a set of hormones, a set of pheromones, and other key parameters. A person's emotional state can be detected by monitoring and analyzing the person's physiological signs, under a defined condition with internal and/or external stimulus, and assessing how these physiological signs change over a certain timeline. One embodiment of the degrouping process is based on one or more criteria parameters (e.g., degroup based on the speed of change of people with the same emotional parameters).

In one embodiment, the emotional profile can be detected via machine learning methods based on statistical classifiers where the inputs are any measured levels of pheromones, hormones, or other features such as visual or auditory cues. If the set of features is $\{x_1, x_2, x_3, \ldots, x_n\}$ represented as a vector and y represents the emotional state, then the general form of an emotion-detection statistical classifier is:

$$y = \underset{j,l}{\arg\min}\left[\left(\sum_i \|y_i - f_{j,p_l}(\vec{x}_i)\|\right) + \beta(f_j, p_l)\right]$$

Where the function f is a decision tree, a neural network, a logistic regressor, or other statistical classifier described in the machine learning literature. The first term minimizes the empirical error (the error detected while training the classifier) and the second term minimizes the complexity—e.g. Occam's razor, finding the simplest function and set of parameters p for that function that yield the desired result.

Additionally, in order to determine which pheromones or other features make the most difference (add the most value) to predicting emotional state, an active-learning criterion can be added, generally expressed as:

$$\underset{\vec{x}_i \in \{\vec{x}_{k+1}, \ldots, \vec{x}_n\}}{\operatorname{argmin}} \left(L\left(\hat{f}(\vec{x}_{test}, \hat{y}_{test})\right) \middle| \vec{x}_i \cup \{\vec{x}_1, \ldots, \vec{x}_k\}\right)$$

Where L is a "loss function", f is the same statistical classifier as in the previous equation, and y-hat is the known outcome. We measure whether the statistical classifier performs better (smaller loss function) by addition new features, and if so keep them, otherwise not.

Parameters, values and quantities that evolve over time can be assessed to create a human emotional profile by detecting the change or transformation from one moment to the next. There are identifiable qualities to an emotional expression. A robot with emotions in response to its environment could make quicker and more effective decisions, e.g. when a robot is motivated by fear or joy or desire it might make better decisions and attain the goals more effectively and efficiently.

The robotic emotion engine replicates the human hormone emotions and pheromone emotions, either individually or in combination. Hormone emotions refer to how hormones change inside of a person's body and how that affects a person's emotions. Pheromone emotions refer to pheromones that are outside a person's body, such as smell, that affect a person's emotions. A person's emotional profile can be constructed by understanding and analyzing the hormone and pheromone emotions. The robotic emotion engine attempts to understand a person's emotions such as anger and fear by using sensors to detect a person's hormone and pheromone profile.

There are nine key physiological sign parameters to be measured in order to build a person's emotional profile: (1) sets of hormones 2221, which are secreted internally and trigger various biochemical pathways that cause certain effects, e.g. adrenalin and insulin are hormones, (2) sets of pheromones 2222, which are secreted externally, and have an effect on another person in a similar way, e.g. androstenol, androstenone and androstadienone, (3) micro expression 2223, which is a brief, involuntary facial expression shown by humans according to emotions experienced, (4) the heart rate 2224 or heart beat, e.g., when a person's heart rate increases, (5) sweat 2225 (e.g., goose bumps) e.g. face blushes and palms get sweaty and in the state of being excited or nervous, (6) pupil dilation 2226 (and iris sphincter, biliary muscle), e.g. pupil dilation for a short time in response to feelings of fear, (7) reflex movement v7, which is the movement/action primarily controlled by the spinal arc, as a response to an external stimulus, e.g. jaw jerk reflex, (8) body temperature 2228 (9) pressure 2229. The analysis 2230 on how these parameters change over a certain time 2231 may reveal a person's emotional state and profile.

Figure 92B:
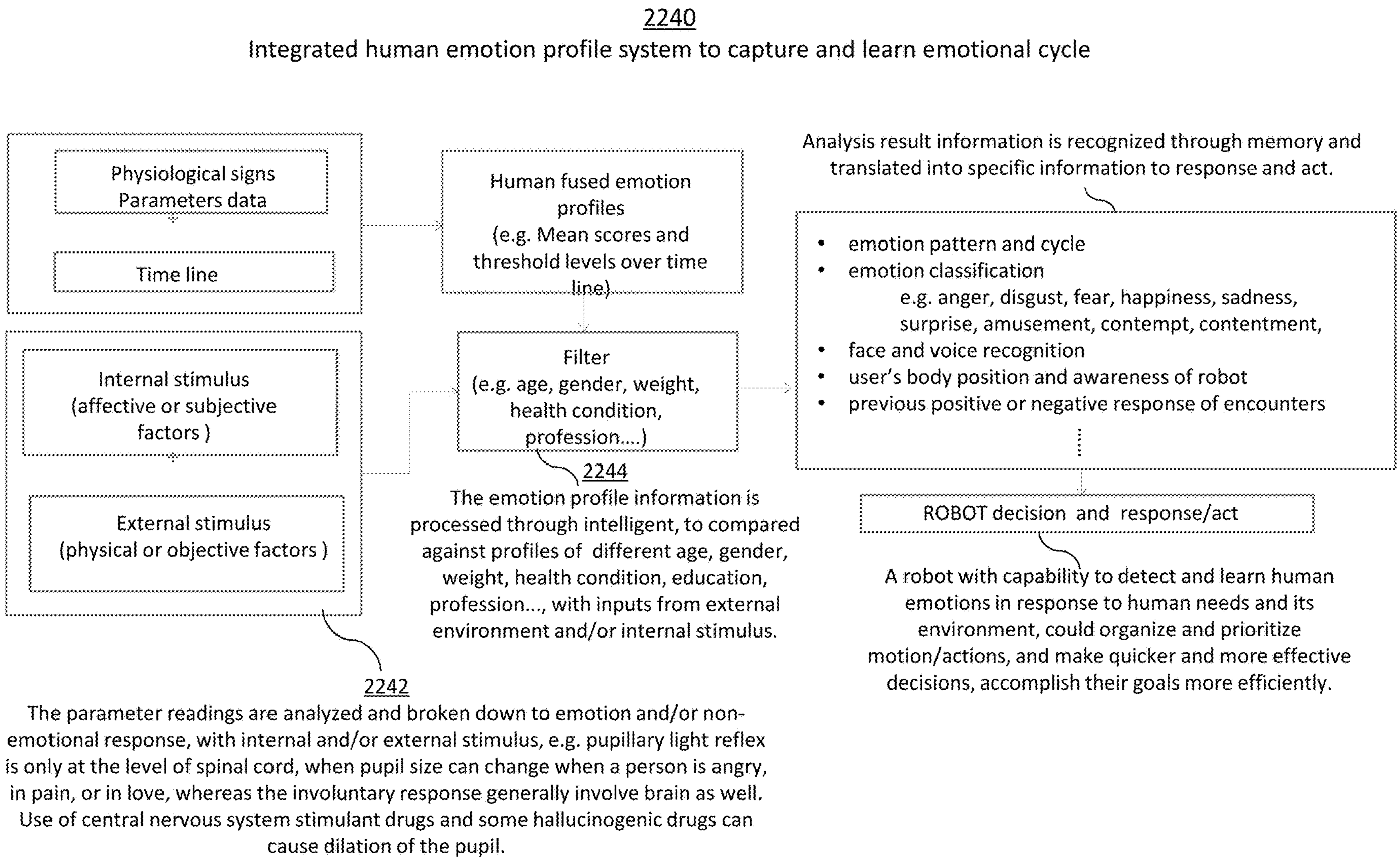
FIG. 92B is a block diagram illustrating a robot assessing and learning about a person's emotional behavior in accordance with the present disclosure.

FIG. 92B is a block diagram illustrating a robot assessing and learning about a person's emotional behavior. The parameter readings are analyzed 2240 and divided into emotion and/or non-emotional responses, with internal stimulus 2242 and/or external stimulus 2244, e.g. pupillary light reflex is only at the level of the spinal cord, pupil size can change when a person is angry, in pain, or in love, whereas involuntary responses generally involve the brain as well. Use of central nervous system stimulant drugs and some hallucinogenic drugs can cause dilation of the pupils.

FIG. 93 is a block diagram illustrating a port device 2230 implanted in a person to detect and record the person's emotional profile. When measuring the physiological signs change, a person can monitor and record the emotional profile for a time period by pressing a button with a first tag on the time at which the change of emotion has started and touch the button again with a second tag when the emotion change has concluded. This process enables a computer to assess and learn about a person's emotional profile based on the change in emotion parameters. With data/information collected from mass amount of users the computer classifies all changes associated with each emotion and mathematically finds the significant and specific parameter changes that are attributable to particular emotion characteristics.

When a user experiences an emotion or mood swing, physiological parameters such as hormone, heart rate, sweat, pheromones can be detected and recorded with a port connecting to a person's body, above the skin and directly to the vein. The start time and end time of the mood change can be determined by the person himself or herself as the person's emotional state changes. For example, a person initiates four manual emotion cycles and creates four timelines within a week, and as determined by the person, the first one lasts 2.8 hour from the time he tags the start till the time he tags the end. The second cycle last for 2 hours, the third one last for 0.8 hours, and the fourth one last for 1.6 hours.

Figure 94A:
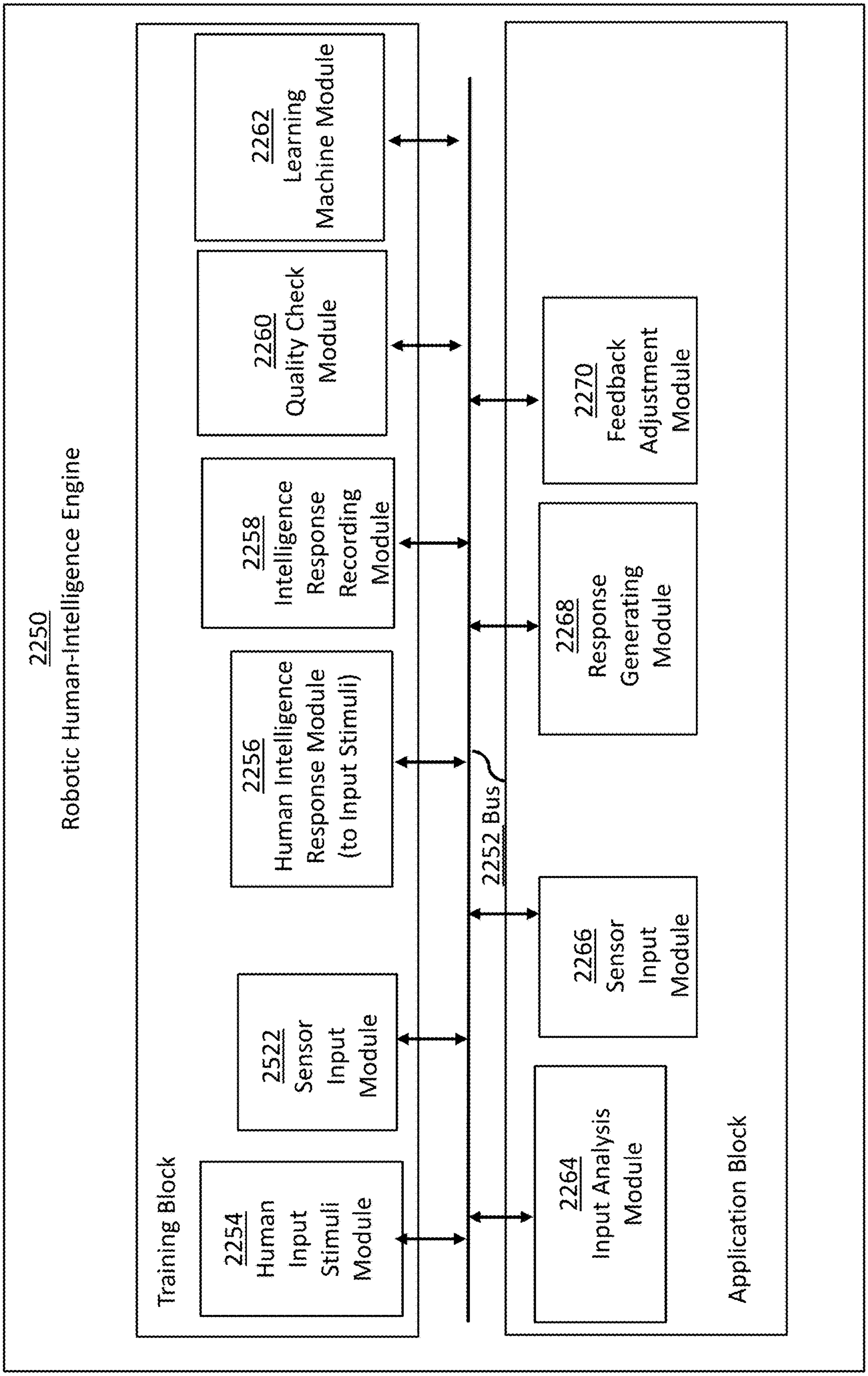
FIG. 94A is a block diagram illustrating a robotic human intelligence engine in accordance with the present disclosure.

FIG. 94A depicts a robotic human-intelligence engine 2250. In the replication engine 1360, there are two main blocks, including a training block and an application block, both containing multiple additional modules all interconnected to each other over a common inter-module communication bus 2252. The training block of the human-intelligence engine contains further modules, including, but not limited to, a sensor input module 2522, a human input stimuli module 2254, a human intelligence response module 2256 that reacts to input stimuli, an intelligence response recording module 2258, a quality check module 2260 and a learning machine module 2262. The application block of the human-intelligence engine contains further modules, including, but not limited to, an input analysis module 2264, a sensor input module 2266, a response generating module 2268, and a feedback adjustment module 2270.

Figure 94B:
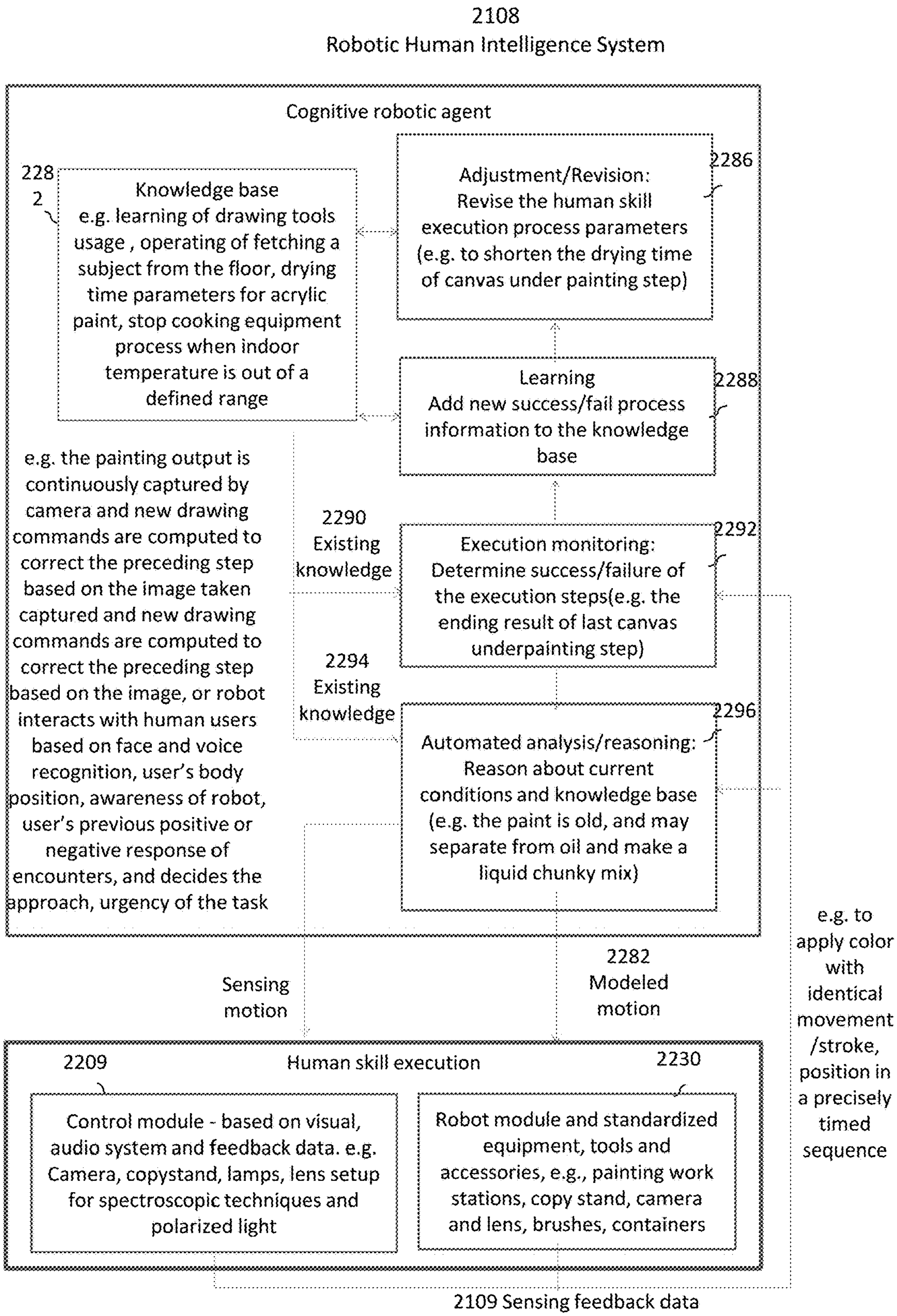
FIG. 94B is a flow diagram illustrating the process of a robotic human intelligence engine in accordance with the present disclosure.

FIG. 94B depicts the architecture of the robotic human intelligence system 2108. The system is split into both the cognitive robotic agent and the human-skill execution module. Both modules share sensing feedback data 2109, as well as sensed motion data and modeled motion data. The cognitive robotic agent module includes, but is not necessarily limited to, modules that represent a knowledge database 2282, interconnected to an adjustment and revision module 2286, with both being updated through a learning module 2288. Existing knowledge 2290 is fed into the execution monitoring module 2292 as well as existing knowledge 2294 being fed into the automated analysis and reasoning module 2296, where both receive sensing feedback data 2109 from the human-skill execution module, with both also providing information to the learning module 2288. The human-skill execution module comprises both a control module 2209 that bases its control signals on collecting and processing multiple sources of feedback (visual and auditory), as well as a module 2230 with a robot utilizing standardized equipment, tools and accessories.

Figure 95A:
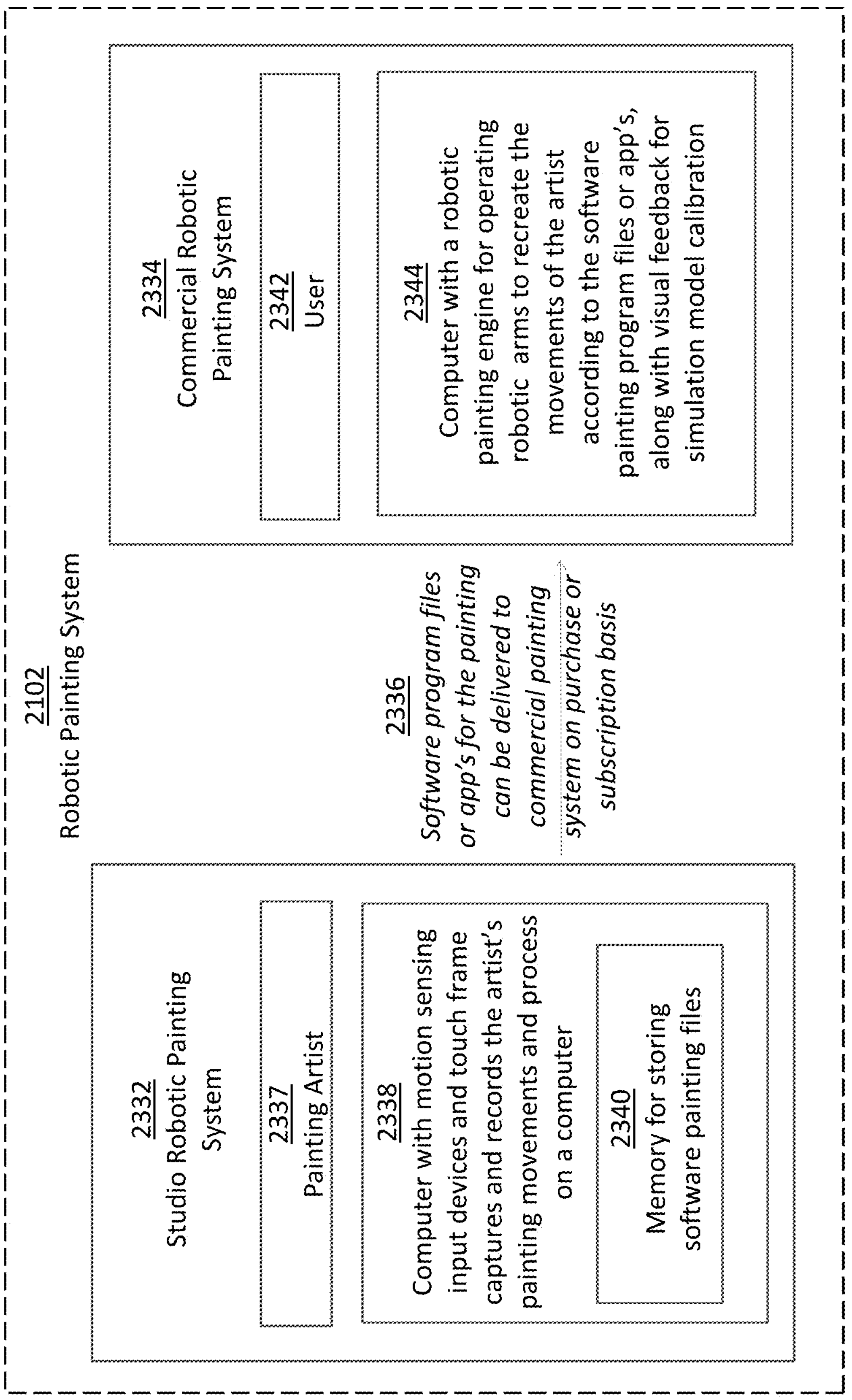
FIG. 95A is a block diagram illustrating a robotic painting system in accordance with the present disclosure.

FIG. 95A depicts the architecture for a robotic painting system 2102. Included in this system are both a studio robotic painting system 2332 and a commercial robotic painting system 2334, communicatively connected to allow software program files or applications 2336 for robotic painting to be delivered from the studio robotic painting system 2332 to the commercial robotic painting system 2334 based on a single-unit purchase or subscription-based payment basis. The studio robotic painting system 2332 comprises a (human) painting artist 2337 and a computer 2338 that is interfaced to motion and action sensing devices and painting-frame capture sensors to capture and record the artist's movements and processes, and store in memory 2340 the associated software painting files. The commercial robotic painting system 2334 is comprised of a user 2342 and a computer 2344 with a robotic painting engine capable of interfacing and controlling robotic arms to recreate the movements of the painting artist 2337 according to the software painting files or applications along with visual feedback for the purpose of calibrating a simulation model.

Figure 95B:
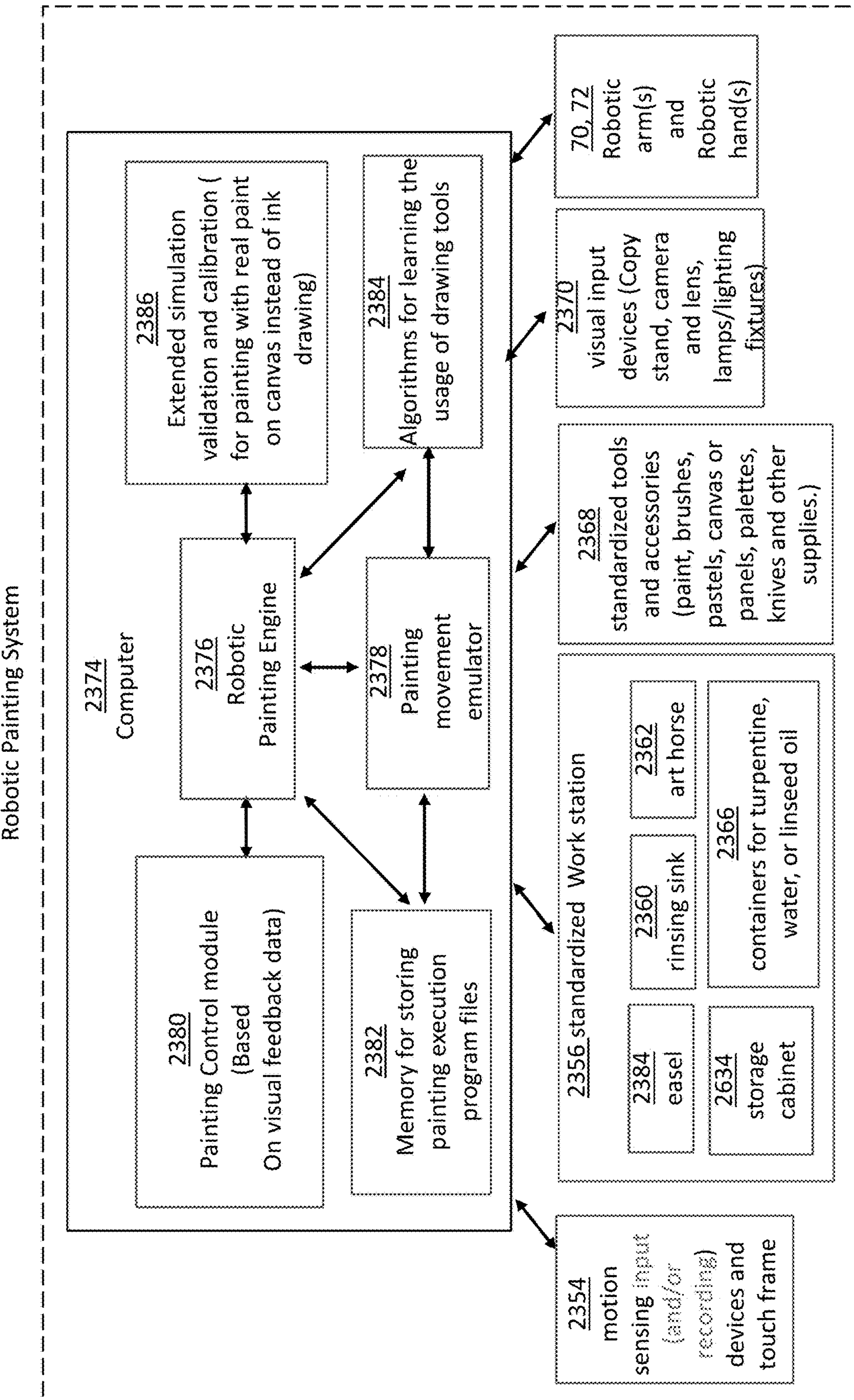
FIG. 95B is a block diagram illustrating the various components of a robotic painting system in accordance with the present disclosure.

FIG. 95B depicts the robotic painting system architecture 2350. The architecture includes a computer 2374, which is interfaced to/with multiple external devices, including, but not limited to, motion sensing input devices and touch-frame 2354, a standardized workstation 2356, including an easel 2384, a rinsing sink 2360, an art horse 2362, a storage cabinet 2634 and material containers 2366 (paint, solvents, etc.), as well as standardized tools and accessories (brushes, paints, etc.) 2368, visual input devices (camera, etc.) 2370, and one or more robotic arms 70 and robotic hands (or at least one gripper) 72.

The computer module 2374 includes modules that include, but are not limited to, a robotic painting engine 2376 interfaced to a painting movement emulator 2378, a painting control module 2380 that acts based on visual feedback of the painting execution processes, a memory module 2382 to store painting execution program files, algorithms 2384 for learning the selection and usage of the appropriate drawing tools, as well as an extended simulation validation and calibration module 2386.

Figure 95C:
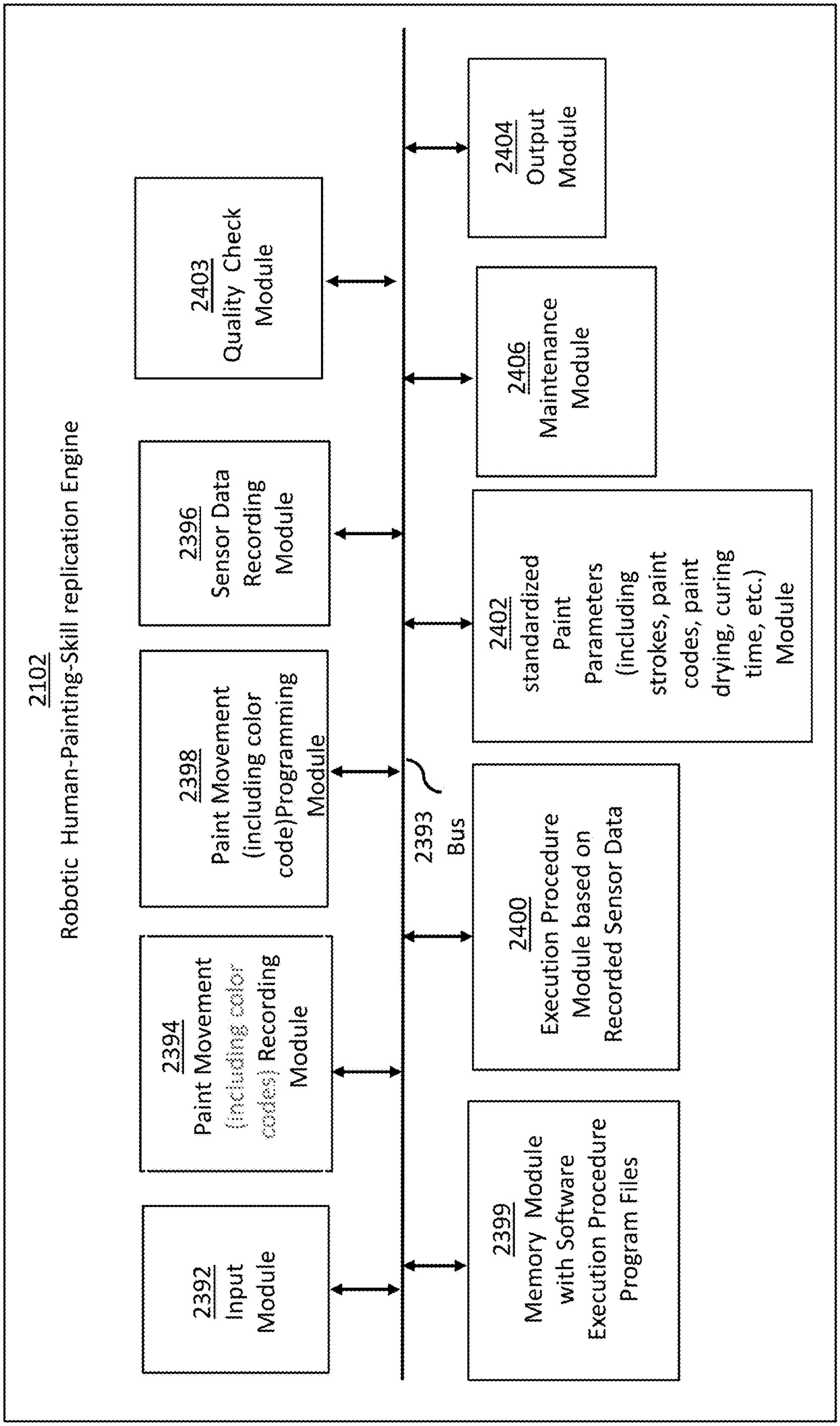
FIG. 95C is a block diagram illustrating the robotic human-painting-skill replication engine in accordance with the present disclosure.

FIG. 95C depicts a robotic human-painting skill-replication engine 2102. In the robotic human-painting skill-replication replication engine 2102, there are multiple additional modules all interconnected to each other over a common inter-module communication bus 2393. The replication engine 2102 contains further modules, including, but not limited to, an input module 2392, a paint movement recording module 2394, an ancillary/additional sensory data recording module 2396, a painting movement programming module 2398, a memory module 2399 containing software execution procedure program files, an execution procedure module 2400 that generates execution commands based on recorded sensor data, a module 2402 containing standardized painting parameters, an output module 2404, and an (output) quality checking module 2403, all overseen by a software maintenance module 2406.

One embodiment of the art platform standardization is defined as follows. First, standardized position and orientation (xyz) of any kind of art tools (brushes, paints, canvas, etc.) in the art platform. Second, standardized operation volume dimensions and architecture in each art platform. Third, standardized art tools set in each art platform. Fourth, standardized robotic arms and hands with a library of manipulations in each art platform. Fifth, standardized three-dimensional vision devices for creating dynamic three-dimensional vision data for painting recording and execution tracking and quality check function in each art platform. Sixth, standardized type/producer/mark/of all using paints during particular painting execution. Seventh, standardized type/producer/mark/size of canvas during particular painting execution.

One main purpose to have Standardized Art Platform is to achieve the same result of the painting process (i.e., the same painting) executing by the original painter and afterward duplicated by robotic Art Platform. Several main points to emphasize in using the standardized Art Platform: (1) have the same timeline (same sequence of manipulations, same initial and ending time of each manipulation, same speed of moving object between manipulations) of Painter and automatic robotic execution; and (2) there are quality checks (3D vision, sensors) to avoid any fail result after each manipulation during the painting process. Therefore, the risk of not having the same result is reduced if the painting was done at the standardized art platform. If a non-standardized art platform is used, this will increase the risk of not having the same result (i.e. not the same painting) because adjustment algorithms may be required when the painting is not executed at not the same volume, with the same art tools, with the same paint or with the same canvas in the painter studio as in the robotic art platform.

Figure 96A:
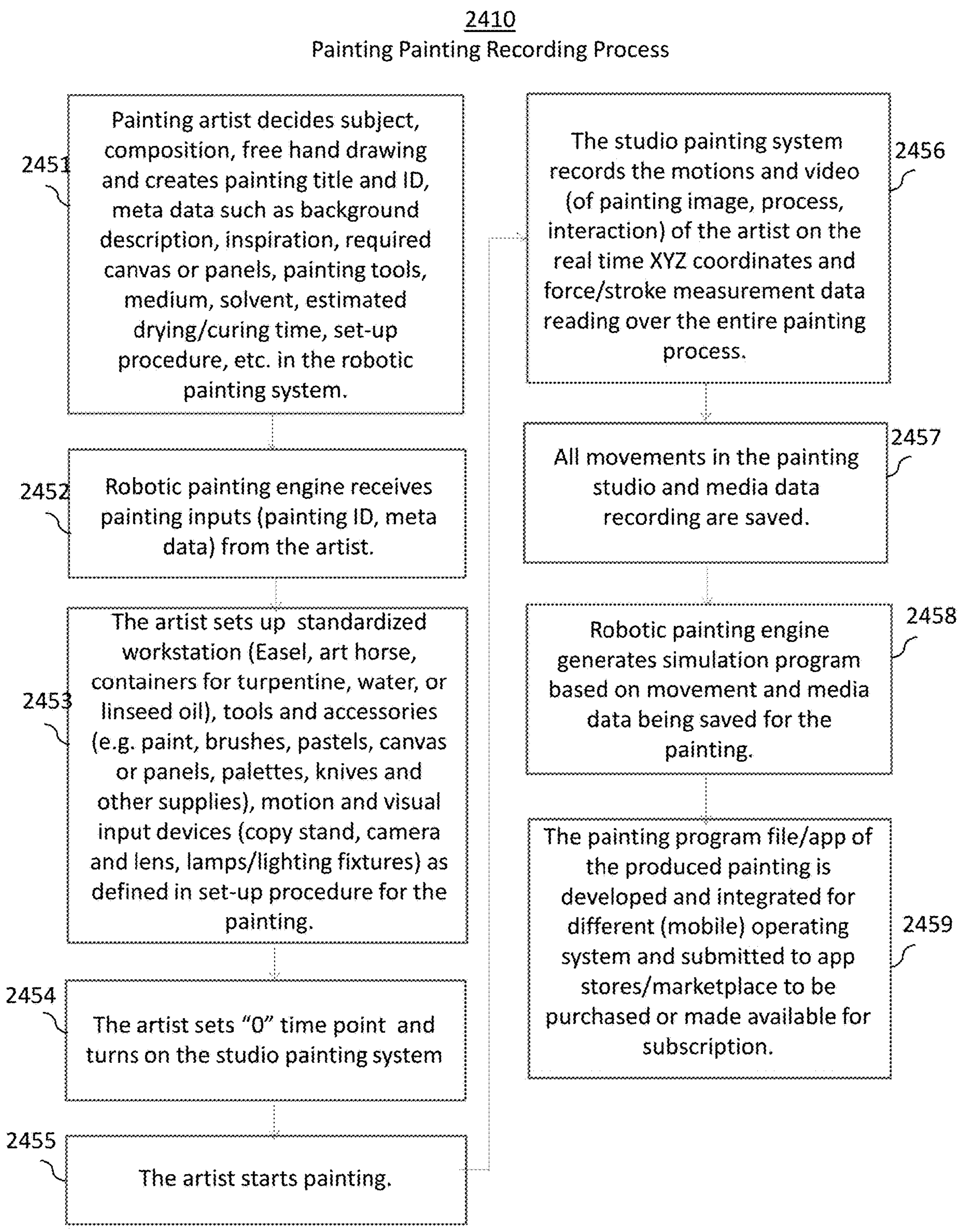
FIG. 96A is a flow diagram illustrating the recording process of an artist at a painting studio in accordance with the present disclosure.

FIG. 96A depicts the studio painting system and program commercialization process 2410. A first step 2451 is for the human painting artist to make decisions pertaining to the artwork to be created in the studio robotic painting system, which includes deciding on such topics as the subject, composition, media, tools and equipment, etc. The artist inputs all this data to the robotic painting engine in step 2452, after which in step 2453 the artist sets up the standardized workstation, tools and equipment and accessories and materials, as well as the motion and visual input devices as required and spelled out in the set-up procedure. The artist sets the starting point of the process and turns on the studio painting system in step 2454, after which the artist then begins step 2455 of actually painting. In step 2456, the studio painting system records the motions and video of the artist's movements in real time and in a known xyz coordinate frame during the entire painting process. The data collected in the painting studio is then stored in step 2457, allowing the robotic painting engine to generate a simulation program 2458 based on the stored movement and media data. At step 2459, the robotic painting program file or application (app) of the produced painting is developed and integrated for use by different operating systems and mobile systems and submitted to App-stores or other marketplace locations for sale as a single-use purchase or on a subscription basis.

Figure 96B:
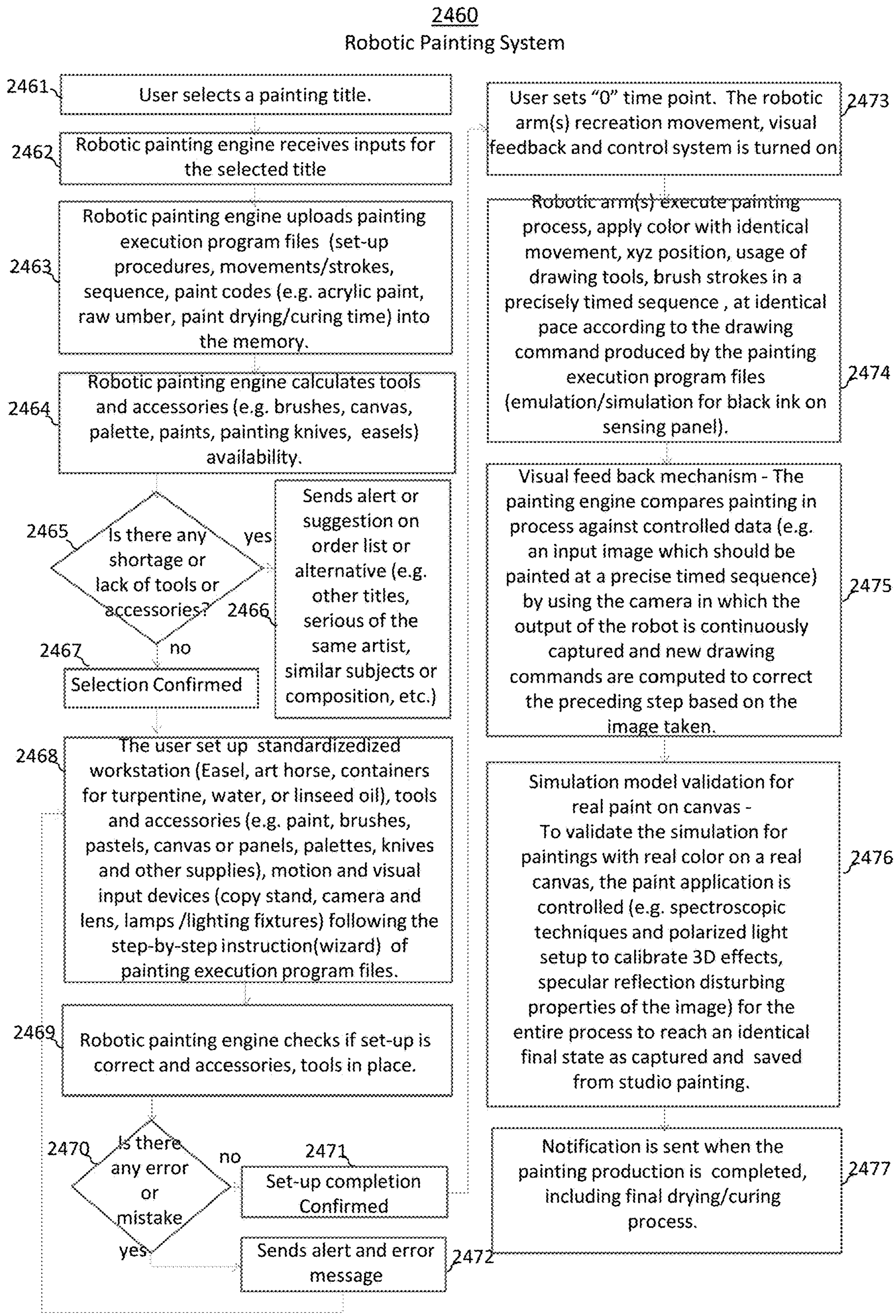
FIG. 96B is a flow diagram illustrating the replication process by a robotic painting system in accordance with the present disclosure.

FIG. 96B depicts the logical execution flow 2460 for the robotic painting engine. As a first step, the user selects a painting title in step 2461, with the input being received by the robotic painting engine in step 2462. The robotic painting engine uploads the painting execution program files in step 2463 into the onboard memory, and then proceeds to step 2464, where it calculates the necessary tools and accessories. A checking step 2465 provides the answers as to whether there is a shortage of tools or accessories and materials; should there be a shortage, the system sends an alert 2466 or a suggestion to the user for an ordering list or an alternate painting. In the case of no shortage, the engine confirms the selection in step 2467, allowing the user to proceed to step 2468, comprised of setting up the standardized workstation, motion and visual input devices using the step-by-step instruction contained within the painting execution program files. Once completed, the robotic painting engine performs a check-up step 2469 to verify the proper setup; should it detect an error through step 2470, the system engine will send an error alert 2472 to the user and prompt the user to re-check the setup and correct any detected deficiencies. If the check passes with no errors detected, the setup will be confirmed by the engine in step 2471, allowing it to prompt the user in step 2473 to set the starting point and power on the replication and visual feedback and control systems. In step 2474, the robotic arm(s) will execute the steps specified in the painting execution program file, including movements, usage of tools and equipment at an identical pace as specified by the painting program execution files. A visual feedback step 2475 monitors the execution of the painting replication process against the controlled parameter data that define a successful execution of the painting process and its outcomes. The robotic painting engine further takes the step 2476 of simulation model verification to increase the fidelity of the replication process, with the goal of the entire replication process to reach an identical final state as captured and saved by the studio painting system. Once the painting is completed, a notification 2477 is sent to the user, including drying and curing time for the applied materials (paint, paste, etc.)

Figure 97A:
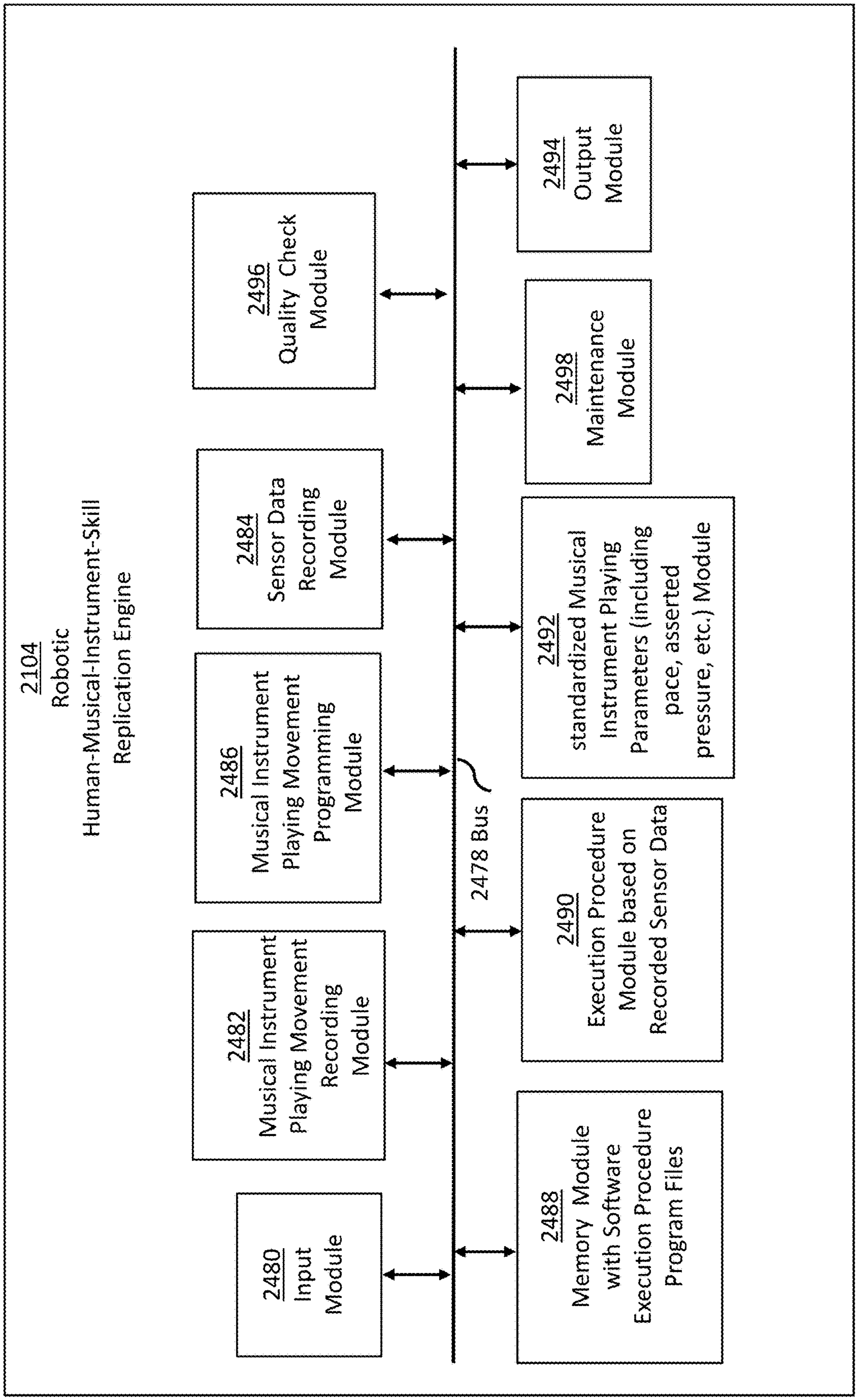
FIG. 97A is block diagram illustrating an embodiment of a musician replication engine in accordance with the present disclosure.

FIG. 97A depicts a robotic human musical-instrument skill-replication engine 2104. In the robotic human musical-instrument skill-replication engine 2104, there are multiple additional modules all interconnected to each other over a common inter-module communication bus 2478. The replication engine contains further modules, including, but not limited to, an audible (digital) audio input module 2480, a human's musical instrument playing movement recording module 2482, an ancillary/additional sensory data recording module 2484, a musical instrument playing movement programming module 12486, a memory module 2488 containing software execution procedure program files, an execution procedure module 2490 that generates execution commands based on recorded sensor data, a module 2492 containing standardized musical instrument playing parameters (e.g. pace, pressure, angles, etc.), an output module 2494, and an (output) quality checking module 2496, all overseen by a software maintenance module 2498.

Figure 97B:
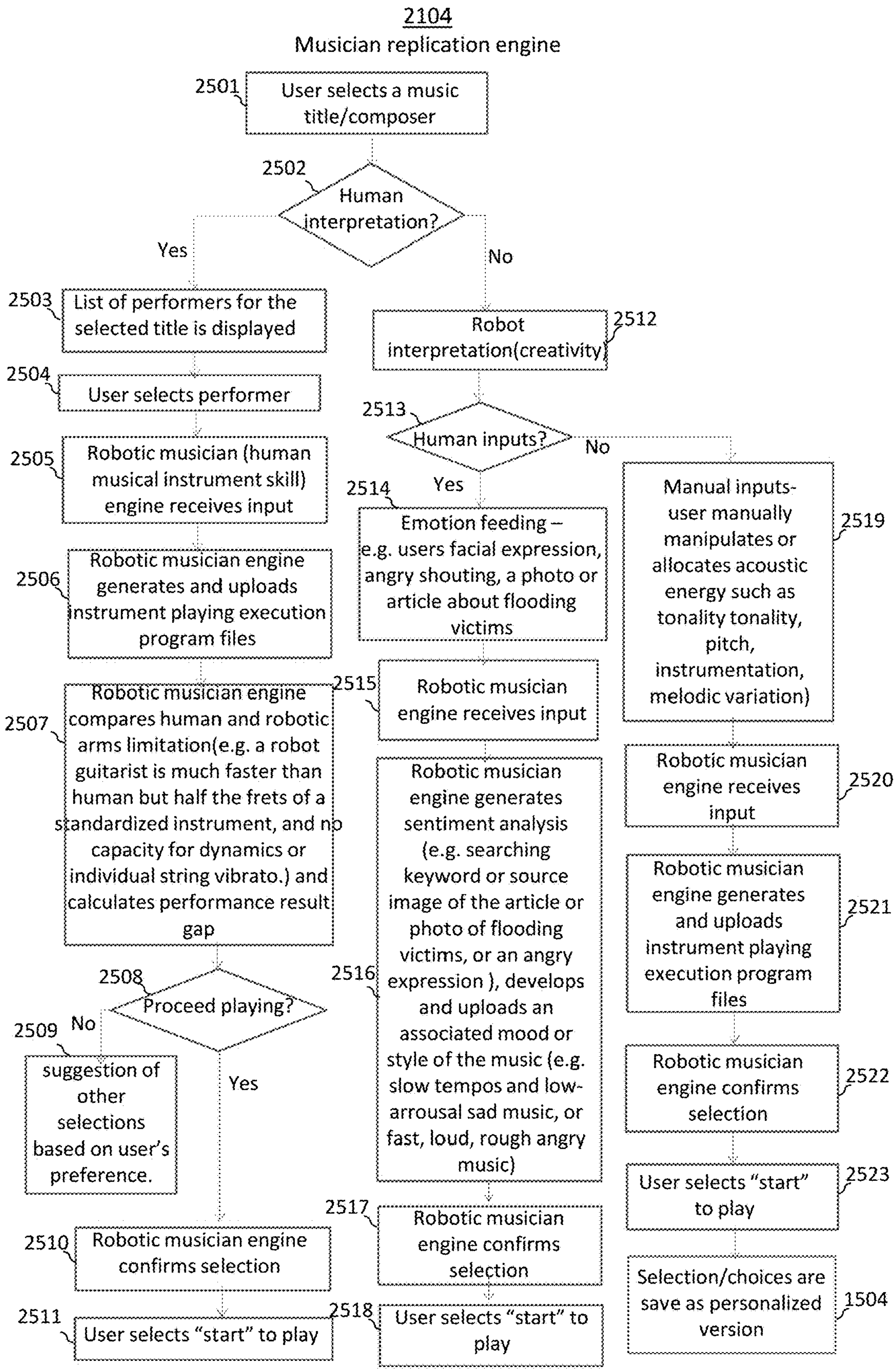
FIG. 97B is block diagram illustrating the process of the musician replication engine in accordance with the present disclosure.

FIG. 97B depicts the process carried out and the logical flow for a musician replication engine 2104. To start, in step 2501 a user selects a music title and/or composer, and is then queried in step 2502 whether the selection should be made by the robotic engine or through interaction with the human. In the case, the user selects the robot engine to select the title/composer in step 2503, the engine 2104 is configured to use its own interpretation of creativity in step 2512, to offer the human user to provide input to the selection process in step 2504. Should the human decline providing input, the robotic musician engine 2104 is configured to use settings such as manual inputs to tonality, pitch and instrumentation as well as melodic variation in step 2519, to gather the necessary input in step 2520 to generate and upload selected instrument playing execution program files in step 2521, allowing the user to select the preferred one in step 2523, after the robotic musician engine has confirmed the selection in step 2522. The choice made by the human is then stored as a personal choice in the personal profile database in step 2524. Should the human decide to provide input to the query in step 2513, the user will be able in step 2513 to provide additional emotional input to the selection process (facial expressions, photo, news article, etc.). The input from step 2514 is received by the robotic musician engine in step 2515, allowing it to proceed to step 2516, where the engine carries out a sentiment analysis related to all available input data and uploads a music selection based on the mood and style appropriate to the emotional input data from the human. Upon confirmation of selection for the uploaded music selection in step 2517 by the robotic musician engine, the user may select the 'start' button to play the program file for the selection in step 2518.

In the case where the human wants to be intimately involved in the selection of the title/composer, the system provides a list of performers for the selected title to the human on a display in step 2503. In step 2504 the user selects the desired performer, a choice input that the system receives in step 2505. In step 2506, the robotic musician engine generates and uploads the instrument playing execution program files, and proceeds in step 2507 to compare potential limitations between a human and a robotic musician's playing performance on a particular instrument, thereby allowing it to calculate a potential performance gap. A checking step 2508 decides whether there exists a gap. Should there be a gap, the system will suggest other selections based on the user's preference profile in step 2509. Should there be no performance gap, the robotic musician engine will confirm the selection in step 2510 and allow the user to proceed to step 2511, where the user may select the 'start' button to play the program file for the selection.

Figure 98:
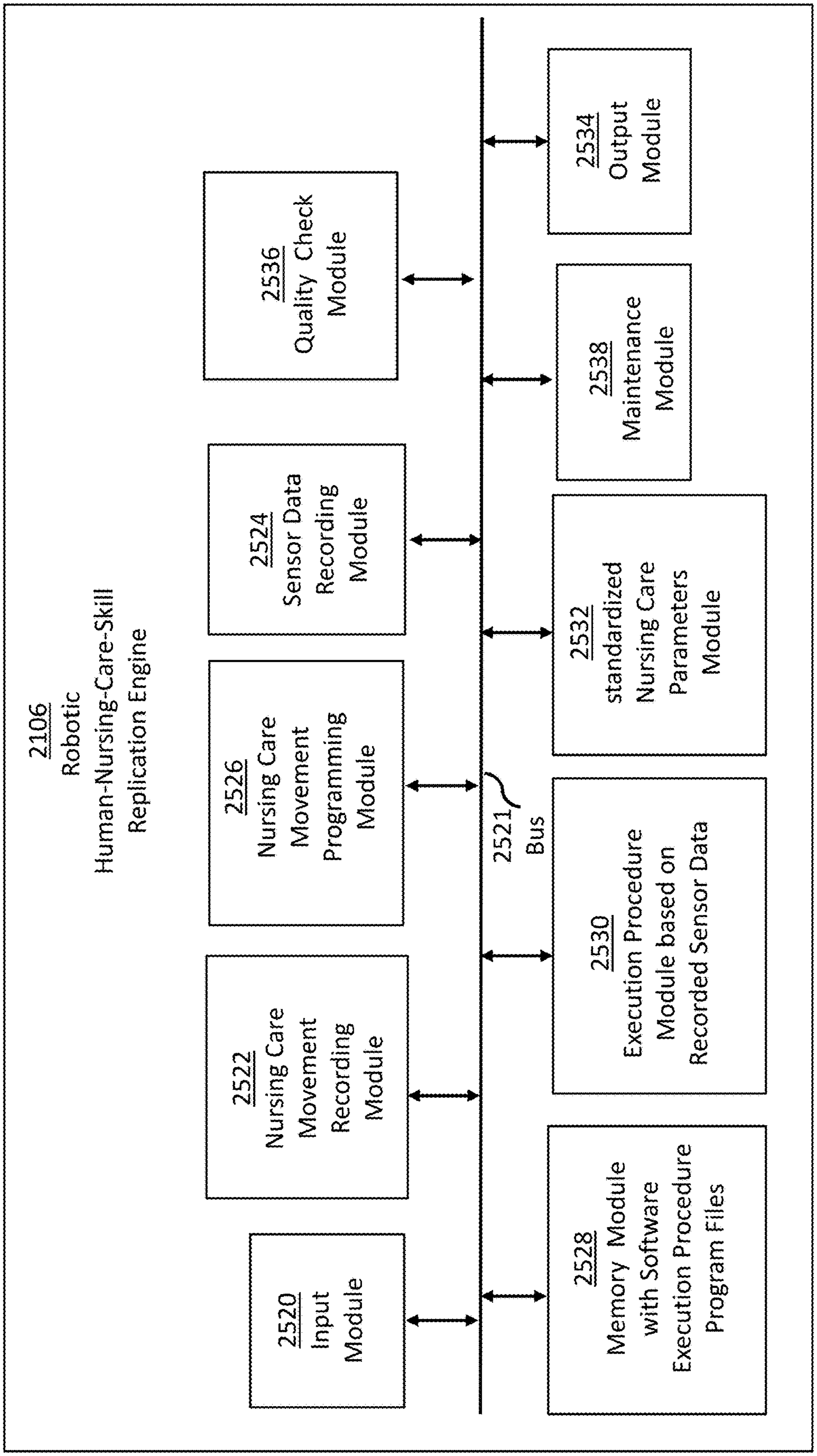
FIG. 98 is block diagram illustrating an embodiment of a nursing replication engine in accordance with the present disclosure.

FIG. 98 depicts a robotic human-nursing-care skill-replication engine 2106. In the robotic human-nursing-care skill-replication engine replication engine 2106, there are multiple additional modules all interconnected to each other over a common inter-module communication bus 2521. The replication engine 2106 contains further modules, including, but not limited to, an input module 2520, a nursing care movement recording module 2522, an ancillary/additional sensory data recording module 2524, a nursing care movement programming module 2526, a memory module 2528 containing software execution procedure program files, an execution procedure module 2530 that generates execution commands based on recorded sensor data, a module 2532 containing standardized nursing care parameters, an output module 2534, and an (output) quality checking module 2536, all overseen by a software maintenance module 2538.

Figure 99A:
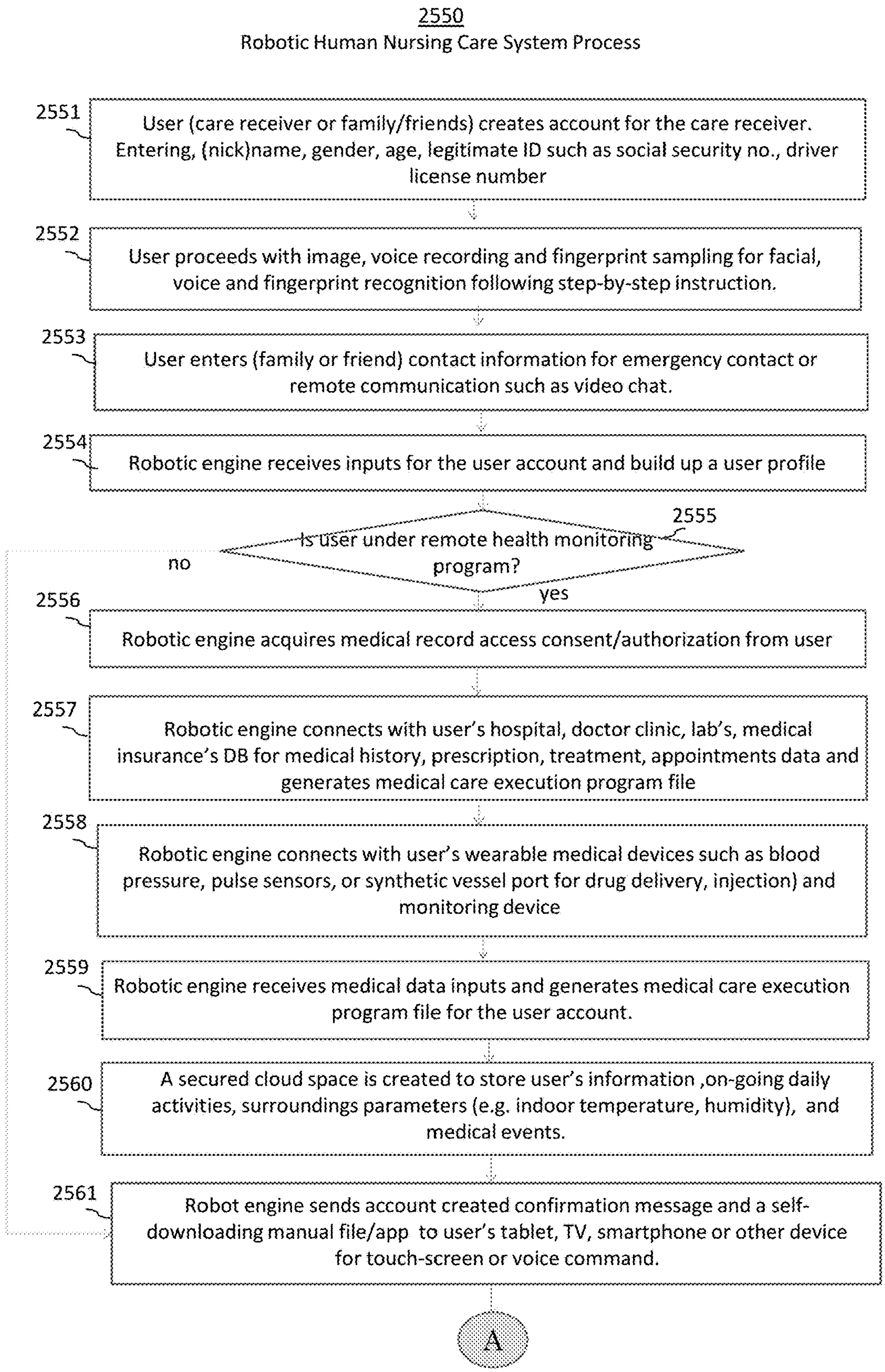
FIGS. 99A-B are flow diagrams illustrating the process of the nursing replication engine in accordance with the present disclosure.

FIG. 99A depicts a robotic human nursing care system process 2550. A first step 2551 involves a user (care receiver or family/friends) creating an account for the care receiver, providing personal data (name, age, ID, etc.). A biometric data collection step 2552 involves the collection of personal data, including facial images, fingerprints, voice samples, etc. The user then enters contact information for emergency contact in step 2553. The robotic engine receives all this input data to build up a user account and profile in step 2554. Should the user not be under a remote health monitoring program as determined in step 2555, the robot engine sends an account creation confirmation message and a self-downloading manual file/app to the user's tablet, TV, smartphone or other device for future touch-screen or voice-based command interface purposes, as part of step 2561. Should the user be part of a remote health-monitoring program, the robot engine will request in step 2556 permission to access medical records. As part of step 2557 the robotic engine connects with the user's hospital and physician's offices, laboratories and medical insurance databases to receive the medical history, prescription, treatment, and appointments data for the user and generates a medical care execution program for storage in a file particular to that user. As a next step 2558, the robotic engine connects with any and all of the user's wearable medical devices (such as blood pressure monitors, pulse and blood-oxygen sensors), or even electronically controllable drug dispensing system (whether oral or by injection) to allow for continuous monitoring. As a follow-on step, the robotic engine receives medical data file and sensory inputs allowing it to generate one or more medical care execution program files for the user's account in step 2559. The next step 2560 involves the creation of a secure cloud storage data space for the user's information, daily activities, associated parameters and any past or future medical events or appointments. As before in step 2561, the robot engine sends an account creation confirmation message and a self-downloading manual file/app to the user's tablet, TV, smartphone or other device for future touch-screen or voice-based command interface purposes.

Figure 99B:
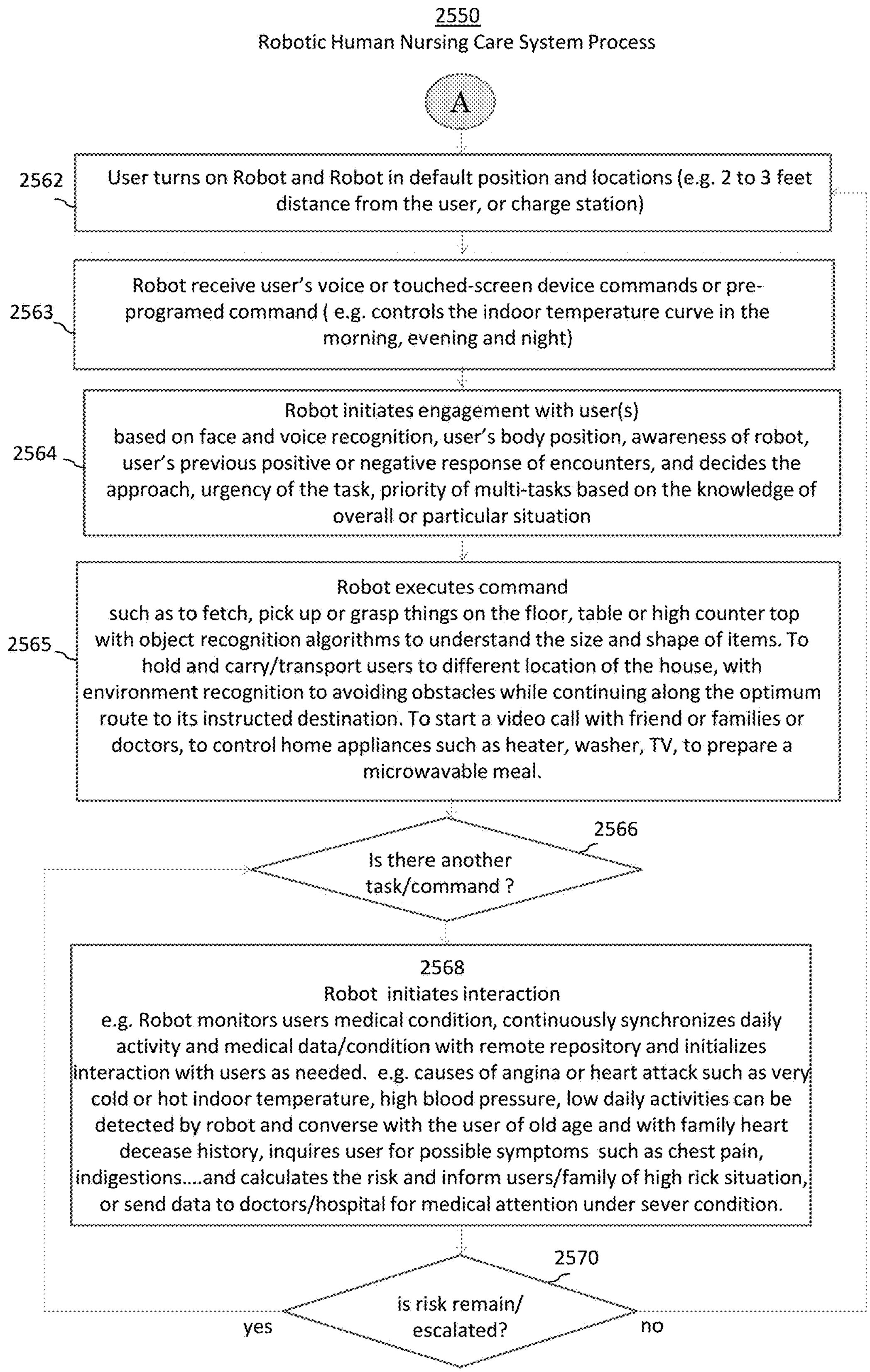

FIG. 99B depicts a continuation of the robotic human nursing care system process 2250 first started with FIG. 99A, but which is now related to a physically present robot in the user's environment. As a first step 2562, the user turns on the robot in a default configuration and location (e.g. charging station). In task 2563, the robot receives a user's voice or touch-screen-based command to execute one specific or groups of commands or actions. In step 2564, the robot carries out particular tasks and activities based on engagement with the user using voice and facial recognition commands and cues, responses or behaviors of the user, basing its decisions on such factors as task-urgency and task-priority based on knowledge of the particular or overall situation. In task 2565 the robot carries out typical fetching, grasping and transportation of one or more items, completing the tasks using object recognition and environmental sensing, localization and mapping algorithms to optimize movements along obstacle-free paths, possibly even to serve as an avatar to provide audio/video teleconferencing ability for the user or interface with any controllable home appliance. At step 2568, the robot is continually monitoring the user's medical condition based on sensory input and the user's profile data, and monitors for possible symptoms of potential medically dangerous conditions, with the ability to inform first responders or family members about any potential situations requiring their immediate attention at step 2570. The robot continually checks in step 2566 for any open or remaining task and always remains ready to react to any user input from step 2522.

In general terms, there may be considered a method of motion capture and analysis for a robotics system, comprising sensing a sequence of observations of a person's movements by a plurality of robotic sensors as the person prepares a product using working equipment; detecting in the sequence of observations minimanipulations corresponding to a sequence of movements carried out in each stage of preparing the product; transforming the sensed sequence of observations into computer readable instructions for controlling a robotic apparatus capable of performing the sequences of minimanipulations; storing at least the sequence of instructions for minimanipulations to electronic media for the product. This may be repeated for multiple products. The sequence of minimanipulations for the product is preferably stored as an electronic record. The minimanipulations may be abstraction parts of a multi-stage process, such as cutting an object, heating an object (in an oven or on a stove with oil or water), or similar. Then, the method may further comprise transmitting the electronic record for the product to a robotic apparatus capable of replicating the sequence of stored minimanipulations, corresponding to the original actions of the person. Moreover, the method may further comprise executing the sequence of instructions for minimanipulations for the product by the robotic apparatus 75, thereby obtaining substantially the same result as the original product prepared by the person.

In another general aspect, there may be considered a method of operating a robotics apparatus, comprising providing a sequence of pre-programmed instructions for standard minimanipulations, wherein each minimanipulation produces at least one identifiable result in a stage of preparing a product; sensing a sequence of observations corresponding to a person's movements by a plurality of robotic sensors as the person prepares the product using equipment; detecting standard minimanipulations in the sequence of observations, wherein a minimanipulation corresponds to one or more observations, and the sequence of minimanipulations corresponds to the preparation of the product; transforming the sequence of observations into robotic instructions based on software implemented methods for recognizing sequences of pre-programmed standard minimanipulations based on the sensed sequence of person motions, the minimanipulations each comprising a sequence of robotic instructions and the robotic instructions including dynamic sensing operations and robotic action operations; storing the sequence of minimanipulations and their corresponding robotic instructions in electronic media. Preferably, the sequence of instructions and corresponding minimanipulations for the product are stored as an electronic record for preparing the product. This may be repeated for multiple products. The method may further include transmitting the sequence of instructions (preferably in the form of the electronic record) to a robotics apparatus capable of replicating and executing the sequence of robotic instructions. The method may further comprise executing the robotic instructions for the product by the robotics apparatus, thereby obtaining substantially the same result as the original product prepared by the human. Where the method is repeated for multiple products, the method may additionally comprise providing a library of electronic descriptions of one or more products, including the name of the product, ingredients of the product and the method (such as a recipe) for making the product from ingredients.

Another generalized aspect provides a method of operating a robotics apparatus comprising receiving an instruction set for a making a product comprising of a series of indications of minimanipulations corresponding to original actions of a person, each indication comprising a sequence of robotic instructions and the robotic instructions including dynamic sensing operations and robotic action operations; providing the instruction set to a robotic apparatus capable of replicating the sequence of minimanipulations; executing the sequence of instructions for minimanipulations for the product by the robotic apparatus, thereby obtaining substantially the same result as the original product prepared by the person.

A further generalized method of operating a robotic apparatus may be considered in a different aspect, comprising executing a robotic instructions script for duplicating a recipe having a plurality of product preparation movements; determining if each preparation movement is identified as a standard grabbing action of a standard tool or a standard object, a standard hand-manipulation action or object, or a non-standard object; and for each preparation movement, one or more of: instructing the robotic cooking device to access a first database library if the preparation movement involves a standard grabbing action of a standard object; instructing the robotic cooking device to access a second database library if the food preparation movement involves a standard hand-manipulation action or object; and instructing the robotic cooking device to create a three-dimensional model of the non-standard object if the food preparation movement involves a non-standard object. The determining and/or instructing steps may be particularly implemented at or by a computer system. The computing system may have a processor and memory.

Another aspect may be found in a method for product preparation by robotic apparatus 75, comprising replicating a recipe by preparing a product (such as a food dish) via the robotic apparatus 75, the recipe decomposed into one or more preparation stages, each preparation stage decomposed into a sequence of minimanipulations and active primitives, each minimanipulation decomposed into a sequence of action primitives. Preferably, each mini manipulation has been (successfully) tested to produce an optimal result for that mini manipulation in view of any variations in positions, orientations, shapes of an applicable object, and one or more applicable ingredients.

A further method aspect may be considered in a method for recipe script generation, comprising receiving filtered raw data from sensors in the surroundings of a standardized working environment module, such as a kitchen environment; generating a sequence of script data from the filtered raw data; and transforming the sequence of script data into machine-readable and machine-executable commands for preparing a product, the machine-readable and machine-executable commands including commands for controlling a pair of robotic arms and hands to perform a function. The function may be from the group comprising one or more cooking stages, one or more minimanipulations, and one or more action primitives. A recipe script generation system comprising hardware and/or software features configured to operate in accordance with this method may also be considered.

In any of these aspects, the following may be considered. The preparation of the product normally uses ingredients. Executing the instructions typically includes sensing properties of the ingredients used in preparing the product. The product may be a food dish in accordance with a (food) recipe (which may be held in an electronic description) and the person may be a chef. The working equipment may comprise kitchen equipment. These methods may be used in combination with any one or more of the other features described herein. One, more than one or all of the features of the aspects may be combined, so a feature from one aspect may be combined with another aspect for example. Each aspect may be computer-implemented and there may be provided a computer program configured to perform each method when operated by a computer or processor. Each computer program may be stored on a computer-readable medium. Additionally or alternatively, the programs may be partially or fully hardware-implemented. The aspects may be combined. There may also be provided a robotics system configured to operate in accordance with the method described in respect of any of these aspects.

In another aspect, there may be provided a robotics system, comprising: a multi-modal sensing system capable of observing human motions and generating human motions data in a first instrumented environment; and a processor (which may be a computer), communicatively coupled to the multi-modal sensing system, for recording the human motions data received from the multi-modal sensing system and processing the human motions data to extract motion primitives, preferably such that the motion primitives define operations of a robotics system. The motion primitives may be minimanipulations, as described herein (for example in the immediately preceding paragraphs) and may have a standard format. The motion primitive may define specific types of action and parameters of the type of action, for example a pulling action with a defined starting point, end point, force and grip type. Optionally, there may be further provided a robotics apparatus, communicatively coupled to the processor and/or multi-modal sensing system. The robotics apparatus may be capable of using the motion primitives and/or the human motions data to replicate the observed human motions in a second instrumented environment.

In a further aspect, there may provided a robotics system, comprising: a processor (which may be a computer), for receiving motion primitives defining operations of a robotics system, the motion primitives being based on human motions data captured from human motions; and a robotics system, communicatively coupled to the processor, capable of using the motion primitives to replicate human motions in an instrumented environment. It will be understood that these aspects may be further combined.

A further aspect may be found in a robotics system comprising: first and second robotic arms; first and second robotic hands, each hand having a wrist coupled to a respective arm, each hand having a palm and multiple articulated fingers, each articulated finger on the respective hand having at least one sensor; and first and second gloves, each glove covering the respective hand having a plurality of embedded sensors. Preferably, the robotics system is a robotic kitchen system.

There may further be provided, in a different but related aspect, a motion capture system, comprising: a standardized working environment module, preferably a kitchen; plurality of multi-modal sensors having a first type of sensors configured to be physically coupled to a human and a second type of sensors configured to be spaced away from the human. One or more of the following may be the case: the first type of sensors may be for measuring the posture of human appendages and sensing motion data of the human appendages; the second type of sensors may be for determining a spatial registration of the three-dimensional configurations of one or more of the environment, objects, movements, and locations of human appendages; the second type of sensors may be configured to sense activity data; the standardized working environment may have connectors to interface with the second type of sensors; the first type of sensors and the second type of sensors measure motion data and activity data, and send both the motion data and the activity data to a computer for storage and processing for product (such as food) preparation.

An aspect may additionally or alternatively be considered in a robotic hand coated with a sensing gloves, comprising: five fingers; and a palm connected to the five fingers, the palm having internal joints and a deformable surface material in three regions; a first deformable region disposed on a radial side of the palm and near the base of the thumb; a second deformable region disposed on a ulnar side of the palm, and spaced apart from the radial side; and a third deformable region disposed on the palm and extend across the base of the fingers. Preferably, the combination of the first deformable region, the second deformable region, the third deformable region, and the internal joints collectively operate to perform a mini manipulation, particularly for food preparation.

In respect of any of the above system, device or apparatus aspects, there may further be provided method aspects comprising steps to carry out the functionality of the system. Additionally or alternatively, optional features may be found based on any one or more of the features described herein with respect to other aspects.

Figure 100:
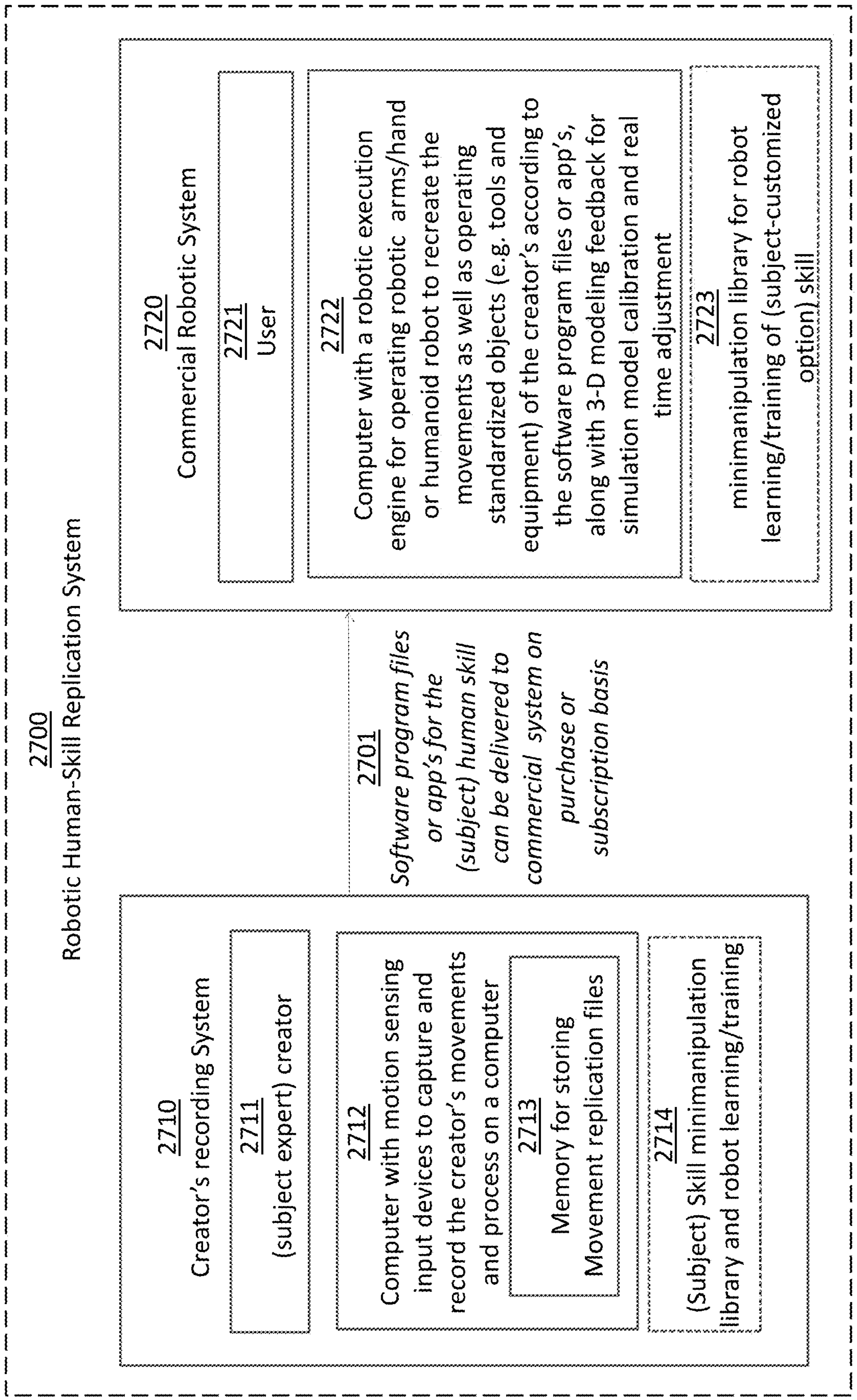
FIG. 100 is a block diagram illustrating the general applicability (or universal) of a robotic human-skill replication system with a creator recording system and a commercial robotic system in accordance with the present disclosure.

FIG. 100 is a block diagram illustrating the general applicability (or universal) of robotic human-skill replication system 2700 with a creator's recording system 2710 and a commercial robotic system 2720. The human-skill replication system 2700 may be used to capture the movements or manipulations of a subject expert or creator 2711. Creator 2711 may be an expert in his/her respective field and may be a professional or someone who has gained the necessary skills to have refined specific tasks, such as cooking, painting, medical diagnostics, or playing a musical instrument. The creator's recording system 2710 comprises a computer 2712 with sensing inputs, e.g. motion sensing inputs, a memory 2713 for storing replication files and a subject/skill library 2714. Creator's recording system 2710 may be a specialized computer or may be a general purpose computer with the ability to record and capture the creator 2711 movements and analyze and refine those movements down into steps that may be processed on computer 2712 and stored in memory 2713. The sensors may be any type of visual, IR, thermal, proximity, temperature, pressure, or any other type of sensor capable of gathering information to refine and perfect the minimanipulations required by the robotic system to perform the task. Memory 2713 may be any type of remote or local memory type storage and may be stored on any type of memory system including magnetic, optical, or any other known electronic storage system. Memory 2713 maybe a public or private cloud based system and may be provided locally or by a third party. Subject/skill library 2714 may be a compilation or collection of previously recorded and captured minimanipulations and may be categorized or arranged in any logical or relational order, such as by task, by robotic components, or by skill.

Commercial robotic system 2720 comprises a user 2721, a computer 2722 with a robotic execution engine and a minimanipulation library 2723. The computer 2722 comprises a general or special purpose computer and may be any compilation of processors and or other standard computing devices. Computer 2722 comprises a robotic execution engine for operating robotic elements such as arms/hands or a complete humanoid robot to recreate the movements captured by the recording system. The Computer 2722 may also operate standardized objects (e.g. tools and equipment) of the creator's 2711 according to the program files or app's captured during the recording process. Computer 2722 may also control and capture 3-D modeling feedback for simulation model calibration and real time adjustments. Minimanipulation library 2723 stores the captured minimanipulations that have been downloaded from the creator's recording system 2710 to the commercial robotic system 2720 via communications link 2701. Minimanipulation library 2723 may store the minimanipulations locally or remotely and may store them in a predetermined or relational basis. Communications link 2701 conveys program files or app's for the (subject) human skill to the commercial robotic system 2720 on a purchase, download, or subscription basis. In operation robotic human-skill replication system 2700 allows a creator 2711 to perform a task or series of tasks which are captured on computer 2712 and stored in memory 2713 creating minimanipulation files or libraries. The minimanipulation files may then be conveyed to the commercial robotic system 2720 via communications link 2701 and executed on computer 2722 causing a set of robotic appendage of hands and arms or a humanoid robot to duplicate the movements of the creator 2711. In this manner, the movements of the creator 2711 are replicated by the robot to complete the required task.

Figure 101:
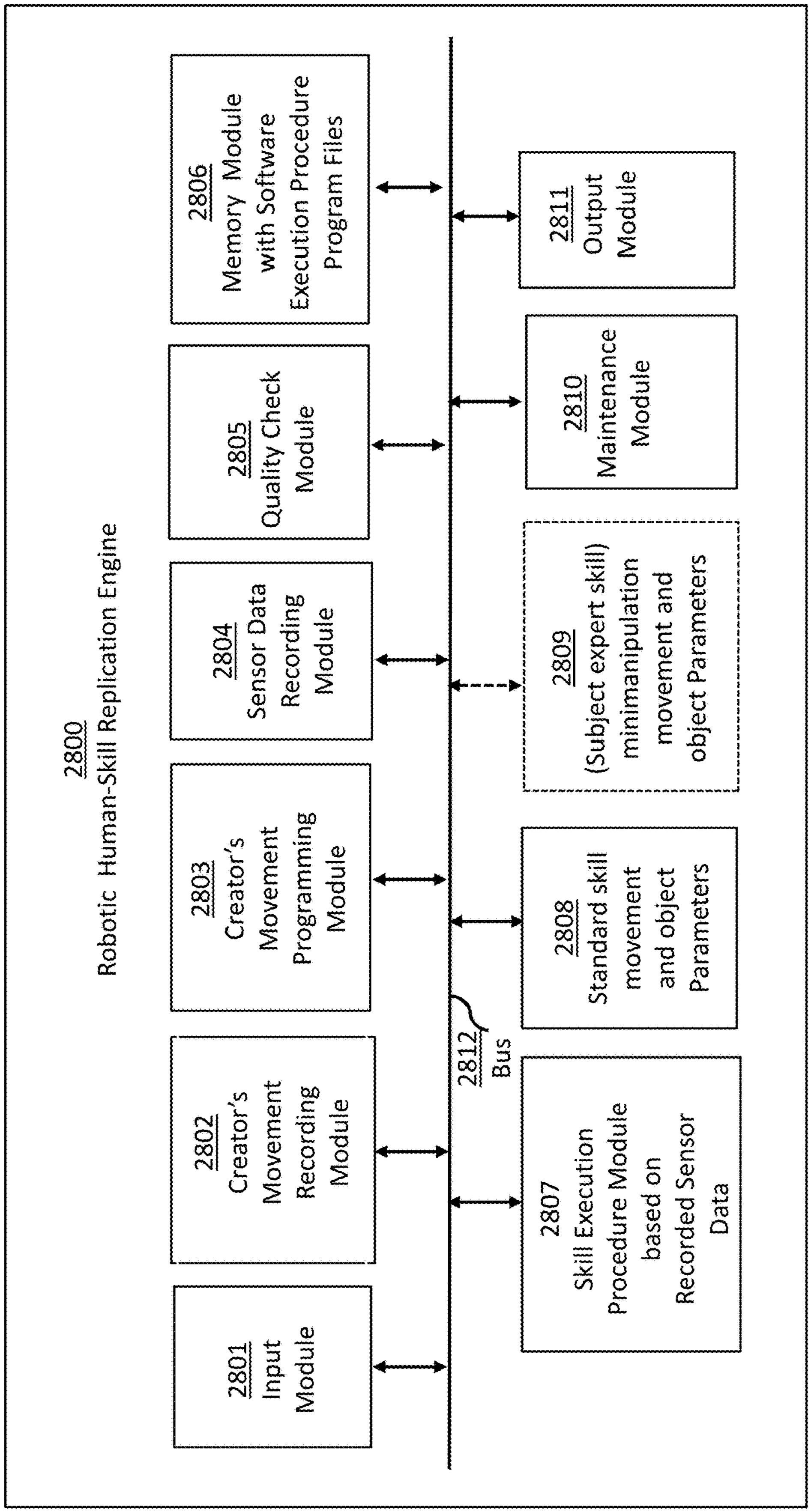
FIG. 101 is a software system diagram illustrating the robotic human-skill replication engine with various modules in accordance with the present disclosure.

FIG. 101 is a software system diagram illustrating the robotic human-skill replication engine 2800 with various modules. Robotic human-skill replication engine 2800 may comprise an input module 2801, a creator's movement recording module 2802, a creator's movement programming module 2803, a sensor data recording module 2804, a quality check module 2805, a memory module 2806 for storing software execution procedure program files, a skill execution procedure module 2807, which may be based on the recorded sensor data, a standard skill movement and object parameter capture module 2808, a minimanipulation movement and object parameter module 2809, a maintenance module 2810 and an output module 2811. Input module 2801 may include any standard inputting device, such as a keyboard, mouse, or other inputting device and may be used for inputting information into robotic human-skill replication engine 2800. Creator movement recording module 2802 records and captures all the movements, and actions of the creator 2711 when robotic human-skill replication engine 2800 is recording the movements or minimanipulations of the creator 2711. The recording module 2802 may record input in any known format and may parse the creator's movements in small incremental movements to make up a primary movement. Creator movement recording module 2802 may comprise hardware or software and may comprise any number or combination of logic circuits. The creator's movement programming module 2803 allows the creator 2711 to program the movements rather then allow the system to capture and transcribe the movements. Creator's movement programming module 2803 may allow for input through both input instructions as well as captured parameters obtained by observing the creator 2711. Creator's movement programming module 2803 may comprise hardware or software and may be implemented utilizing any number or combination of logic circuits. Sensor Data Recording Module 2804 is used to record sensor input data captured during the recording process. Sensor Data Recording Module 2804 may comprise hardware or software and may be implemented utilizing any number or combination of logic circuits. Sensor Data Recording Module 2804 may be utilized when a creator 2711 is performing a task that is being monitored by a series of sensors such as motion, IR, auditory or the like. Sensor Data Recording Module 2804 records all the data from the sensors to be used to create a mini-manipulate of the task being performed. Quality Check Module 2805 may be used to monitor the incoming sensor data, the health of the overall replication engine, the sensors or any other component or module of the system. Quality Check Module 2805 may comprise hardware or software and may be implemented utilizing any number or combination of logic circuits. Memory Module 2806 may be any type of memory element and may be used to store Software Execution Procedure Program Files. It may comprise local or remote memory and may employ short term, permanent or temporary memory storage. Memory module 2806 may utilize any form of magnetic, optic or mechanical memory. Skill Execution Procedure Module 2807 is used to implement the specific skill based on the recorded sensor data. Skill Execution Procedure Module 2807 may utilize the recorded sensor data to execute a series of steps or minimanipulations to complete a task or a portion of a task one such a task has been captured by the robotic replication engine. Skill Execution Procedure Module 2807 may comprise hardware or software and may be implemented utilizing any number or combination of logic circuits.

Standard skill movement and object Parameters module 2802 may be a modules implemented in software or hardware and is intended to define standard movements of objects and or basic skills. It may comprise subject parameters, which provide the robotic replication engine with information about standard objects that may need to be utilized during a robotic procedure. It may also contain instructions and or information related to standard skill movements, which are not unique to any one minimanipulation. Maintenance module 2810 may be any routine or hardware that is used to monitor and perform routine maintenance on the system and the robotic replication engine. Maintenance module 2810 may allow for controlling, updating, monitoring, and troubleshooting any other module or system coupled to the robotic human-skill replication engine. Maintenance module 2810 may comprise hardware or software and may be implemented utilizing any number or combination of logic circuits. Output module 2811 allows for communications from the robotic human-skill replication engine 2800 to any other system component or module. Output module 2811 may be used to export, or convey the captured minimanipulations to a commercial robotic system 2720 or may be used to convey the information into storage. Output module 2811 may comprise hardware or software and may be implemented utilizing any number or combination of logic circuits. Bus 2812 couples all the modules within the robotic human-skill replication engine and may be a parallel bus, serial bus, synchronous or asynchronous. It may allow for communications in any form using serial data, packetized data, or any other known methods of data communication.

Minimanipulation movement and object parameter module 2809 may be used to store and/or categorize the captured minimanipulations and creator's movements. It may be coupled to the replication engine as well as the robotic system under control of the user.

Figure 102:
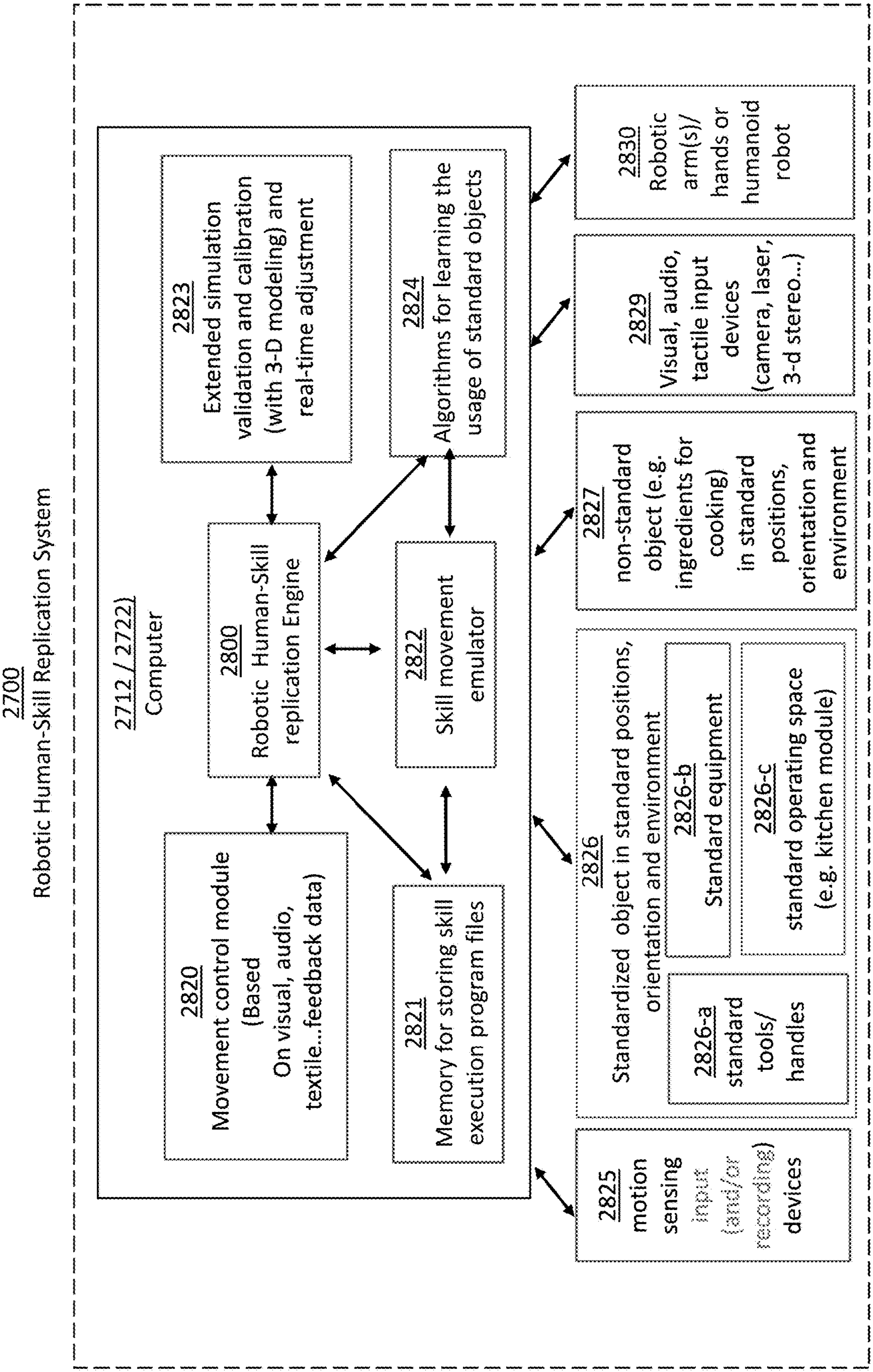
FIG. 102 is a block diagram illustrating one embodiment of the robotic human-skill replication system in accordance with the present disclosure.

FIG. 102 is a block diagram illustrating one embodiment of the robotic human-skill replication system 2700. The robotic human-skill replication system 2700 comprises the computer 2712 (or the computer 2722), motion sensing devices 2825, standardized objects 2826, non standard objects 2827.

Computer 2712 comprises robotic human-skill replication engine 2800, movement control module 2820, memory 2821, skills movement emulator 2822, extended simulation validation and calibration module 2823 and standard object algorithms 2824. As described with respect to FIG. 102, robotic human-skill replication engine 2800 comprises several modules, which enable the capture of creator 2711 movements to create and capture minimanipulations during the execution of a task. The captured minimanipulations are converted from sensor input data to robotic control library data that may be used to complete a task or may be combined in series or parallel with other minimanipulations to create the necessary inputs for the robotic arms/hands or humanoid robot 2830 to complete a task or a portion of a task.

Robotic human-skill replication engine 2800 is coupled to movement control module 2820, which may be used to control or configure the movement of various robotic components based on visual, auditory, tactile or other feedback obtained from the robotic components. Memory 2821 may be coupled to computer 2712 and comprises the necessary memory components for storing skill execution program files. A skill execution program file contains the necessary instructions for computer 2712 to execute a series of instructions to cause the robotic components to complete a task or series of tasks. Skill movement emulator 2822 is coupled to the robotic human-skill replication engine 2800 and may be used to emulate creator skills without actual sensor input. Skill movement emulator 2822 provides alternate input to robotic human-skill replication engine 2800 to allow for the creation of a skill execution program without the use of a creator 2711 providing sensor input. Extended simulation validation and calibration module 2823 may be coupled to robotic human-skill replication engine 2800 and provides for extended creator input and provides for real time adjustments to the robotic movements based on 3-D modeling and real time feedback. Computer 2712 comprises standard object algorithms 2824, which are used to control the robotic hands 72/the robotic arms 70 or humanoid robot 2830 to complete tasks using standard objects. Standard objects may include standard tools or utensils or standard equipment, such as a stove or EKG machine. The algorithms in 2824 are precompiled and do not require individual training using robotic human-skills replication.

Computer 2712 is coupled to one or more motion sensing devices 2825. Motion sensing device 2825 may be visual motion sensors, IR motion sensors, tracking sensors, laser monitored sensors, or any other input or recording device that allows computer 2712 to monitor the position of the tracked device in 3-D space. Motion sensing devices 2825 may comprise a single sensor or a series of sensors that include single point sensors, paired transmitters and receivers, paired markers and sensors or any other type of spatial sensor. Robotic human-skill replication system 2700 may comprise standardized objects 2826 Standardized objects 2826 is any standard object found in a standard orientation and position within the robotic human-skill replication system 2700. These may include standardized tools or tools with standardized handles or grips 2826-*a*, standard equipment 2826-*b*, or a standardized space 2826-*c*. Standardized tools 2826-*a* may be those depicted in FIGS. 12A-C and 152-162S, or may be any standard tool, such as a knife, a pot, a spatula, a scalpel, a thermometer, a violin bow, or any other equipment that may be utilized within the specific environment. Standard equipment 2826-*b* may be any standard kitchen equipment, such as a stove, broiler, microwave, mixer, etc. or may be any standard medical equipment, such as a pulse-ox meter, etc. the space itself, 2826-*c* may be standardized such as a kitchen module or a trauma module or recovery module or piano module. By utilizing these standard tools, equipment and spaces, the robotic hands/arms or humanoid robots may more quickly adjust and learn how to perform their desired function within the standardized space.

Also within the robotic human-skill replication system 2700 may be non standard objects 2827. Non standard objects may be for example, cooking ingredients such as meats and vegetables. These non standard sized, shaped and proportioned objects may be located in standard positions and orientations, such as within drawers or bins but the items themselves may vary from item to item.

Visual, audio, and tactile input devices 2829 may be coupled to computer 2712 as [part of the robotic human-skill replication system 2700. Visual, audio, and tactile input devices 2829 may be cameras, lasers, 3-D steroptics, tactile sensors, mass detectors, or any other sensor or input device that allows computer 21712 to determine an object type and position within 3-D space. It may also allow for the detection of the surface of an object and detect objects properties based on touch sound, density or weight.

Robotic arms/hands or humanoid robot 2830 may be directly coupled to computer 2712 or may be connected over a wired or wireless network and may communicate with robotic human-skill replication engine 2800. Robotic arms/hands or humanoid robot 2830 is capable of manipulating and replicating any of the movements performed by creator 2711 or any of the algorithms for using a standard object.

Figure 103:
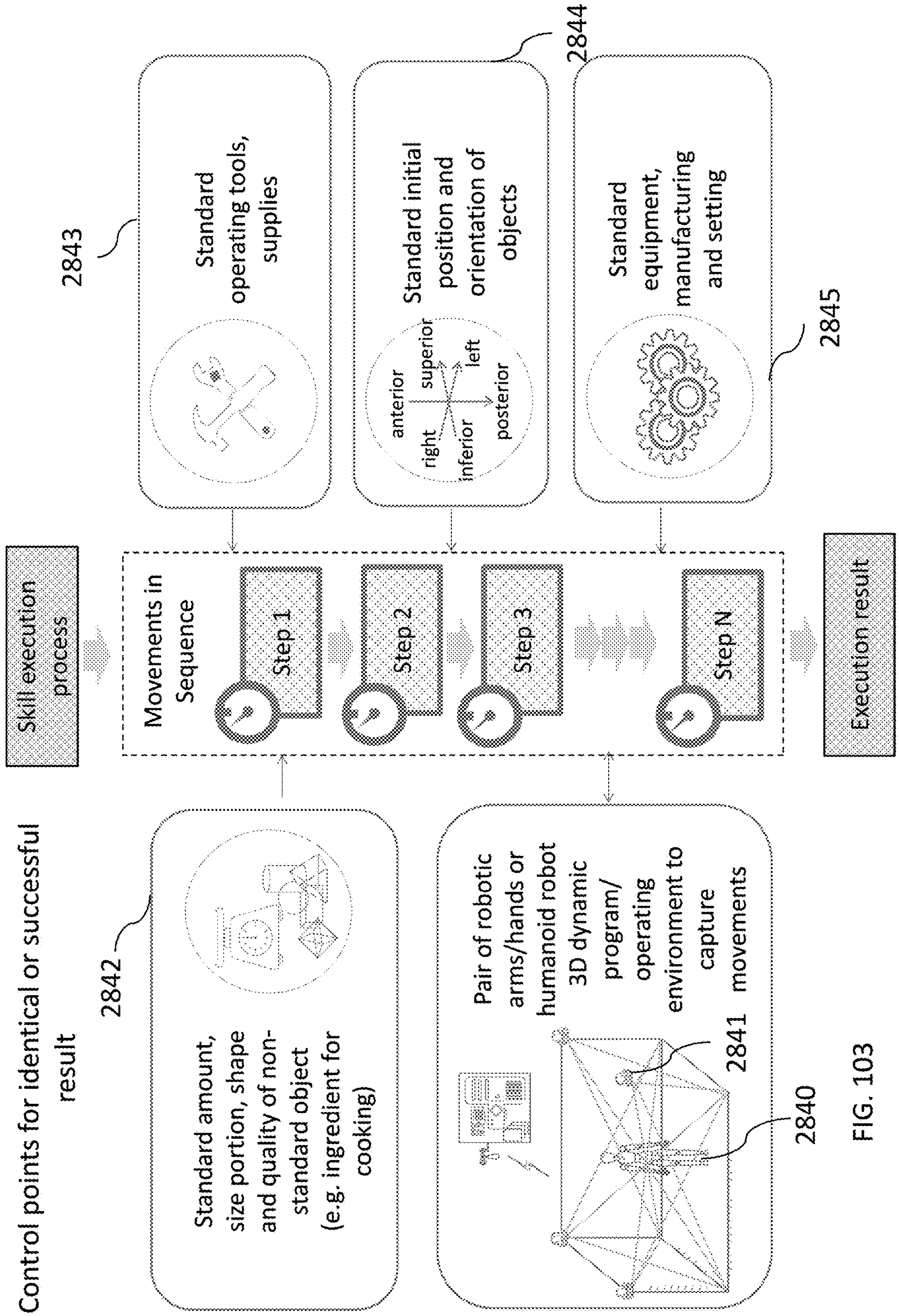
FIG. 103 is a block diagram illustrating a humanoid with controlling points for skill execution or replication process with standardized operating tools, standardized positions, and orientations, and standardized equipment in accordance with the present disclosure.
Figure 104:
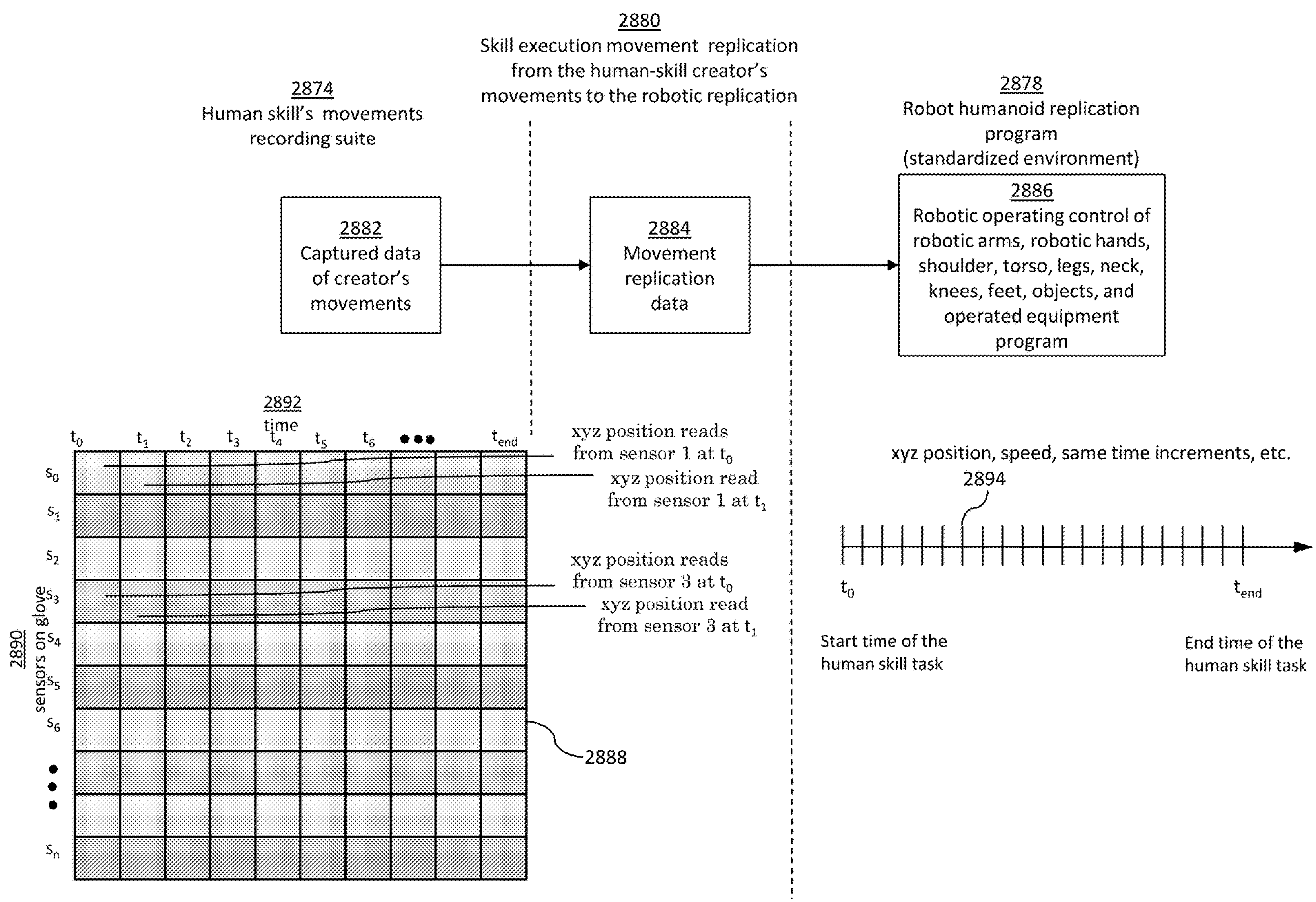
FIG. 104 is a simplified block diagram illustrating a humanoid replication program that replicates the recorded process of human-skill movements by tracking the activity of glove sensors on periodic time intervals in accordance with the present disclosure.

FIG. 103 is a block diagram illustrating a humanoid 2840 with controlling points for skill execution or replication process with standardized operating tools, standardized positions and orientations, and standardized equipment. As seen in FIG. 104, the humanoid 2840 is positioned within a sensor field 2841 as part of the Robotic Human-skill replication system 2700. The humanoid 2840 may be wearing a network of control points or sensors points to enable capture of the movements or minimanipulations made during the execution of a task. Also within the Robotic Human-skill replication system 2700 may be standard tools, 2843, standard equipment 2845 and non standard objects 2842 all arranged in a standard initial position and orientation 2844. As the skills are executed, each step in the skill is recorded within the sensor field 2841. Starting from an initial position humanoid 2840 may execute step 1-step n, all of which is recorded to create a repeatable result that may be implemented by a pair of robotic arms or a humanoid robot. By recording the human creator's movements within the sensor filed 2841, the information may be converted into a series of individual steps 1-n or as a sequence of events to complete a task. Because all the standard and non standard objects are located and oriented in a standard initial position, the robotic component replicating the human movements is able to accurately and consistently perform the recorded task.

FIG. 104 is a block diagram illustrating one embodiment of a conversion algorithm module 2880 between a human or creator's movements and the robotic replication movements. A movement replication data module 2884 converts the captured data from the human's movements in the recording suite 2874 into a machine-readable and machine-executable language 2886 for instructing the robotic arms and the robotic hands to replicate a skill performed by the human's movement in the robotic robot humanoid replication environment 2878. In the recording suite 2874, the computer 2812 captures and records the human's movements based on the sensors on a glove that the human wears, represented by a plurality of sensors $S_0$, $S_1$, $S_2$, $S_3$, $S_4$, $S_5$, $S_6 \ldots S_n$ in the vertical columns, and the time increments $t_0$, $t_1$, $t_2$, $t_3$, $t_4$, $t_5$, $t_6 \ldots t_{end}$ in the horizontal rows, in a table 2888. At time $t_0$, the computer 2812 records the xyz coordinate positions from the sensor data received from the plurality of sensors $S_0$, $S_1$, $S_2$, $S_3$, $S_4$, $S_5$, $S_6 \ldots S_n$. At time $t_1$, the computer 2812 records the xyz coordinate positions from the sensor data received from the plurality of sensors $S_0$, $S_1$, $S_2$, $S_3$, $S_4$, $S_5$, $S_6 \ldots S_n$. At time $t_2$, the computer 2812 records the xyz coordinate positions from the sensor data received from the plurality of sensors $S_0$, $S_1$, $S_2$, $S_3$, $S_4$, $S_5$, $S_6$ . . . $S_n$. This process continues until the entire skill is completed at time $t_{end}$. The duration for each time units $t_0$, $t_1$, $t_2$, $t_3$, $t_4$, $t_5$, $t_6$ . . . $t_{end}$ is the same. As a result of the captured and recorded sensor data, the table 2888 shows any movements from the sensors $S_0$, $S_1$, $S_2$, $S_3$, $S_4$, $S_5$, $S_6$ . . . $S_n$ in the glove in xyz coordinates, which would indicate the differentials between the xyz coordinate positions for one specific time relative to the xyz coordinate positions for the next specific time. Effectively, the table 2888 records how the human's movements change over the entire skill from the start time, to, to the end time, $t_{end}$. The illustration in this embodiment can be extended to multiple sensors, which the human wears to capture the movements while performing the skill. In the standardized environment 2878, the robotic arms and the robotic hands replicate the recorded skill from the recording suite 2874, which is then converted to robotic instructions, where the robotic arms and the robotic hands replicate the skill of the human according to the timeline 2894. The robotic arms and hands carry out the skill with the same xyz coordinate positions, at the same speed, with the same time increments from the start time, to, to the end time, $t_{end}$, as shown in the timeline 2894.

In some embodiments a human performs the same skill multiple times, yielding values of the sensor reading, and parameters in the corresponding robotic instructions that vary somewhat from one time to the next. The set of sensor readings for each sensor across multiple repetitions of the skill provides a distribution with a mean, standard deviation and minimum and maximum values. The corresponding variations on the robotic instructions (also called the effector parameters) across multiple executions of the same skill by the human also defines distributions with mean, standard deviation, minimum and maximum values. These distributions may be used to determine the fidelity (or accuracy) of subsequent robotic skills.

In one embodiment the estimated average accuracy of a robotic skill operation is given by:

$$A(C, R) = 1 - \frac{1}{n}\sum_{n=1, \ldots n} \frac{|c_i - p_i|}{\max(|c_{i,t} - p_{i,t}|}$$

Where C represents the set of human parameters ($1^{st}$ through $n^{th}$) and R represents the set of the robotic apparatus 75 parameters (correspondingly ($1^{st}$ through $n^{th}$). The numerator in the sum represents the difference between robotic and human parameters (i.e. the error) and the denominator normalizes for the maximal difference). The sum gives the total normalized cumulative error (i.e.

$$\left.\sum n = 1, \ldots n \frac{|C_i - p_i|}{\max(|c_{i,t} - p_{i,t}}\right),$$

and multiplying by 1/n gives the average error. The complement of the average error corresponds to the average accuracy.

Another version of the accuracy calculation weighs the parameters for importance, where each coefficient (each αi) represents the importance of the $i^{th}$ parameter, the normalized cumulative error is $$\sum n = 1, \ldots n \frac{\propto_i |C_i - p_i|}{\max(|c_{i,t} - p_{i,t}}$$

and the estimated average accuracy is given by:

$$A(C, R) = 1 - \left(\sum\nolimits_{n=1, \ldots n} \frac{\propto_i |c_i - p_i|}{\max(|c_{i,t} - p_{i,t}}\right) / \sum\nolimits_{i=1, \ldots n} \propto_i$$

Figure 105:
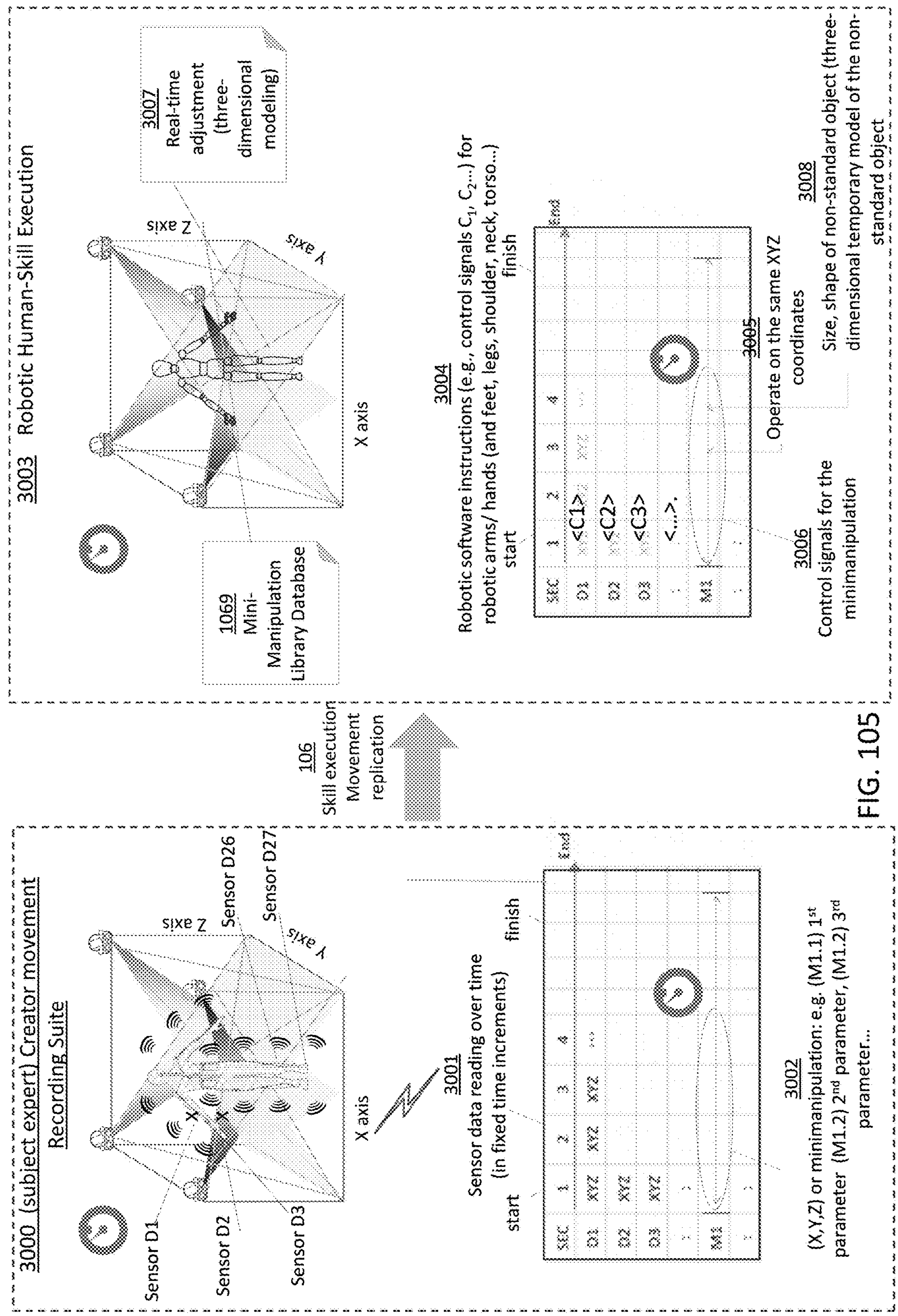
FIG. 105 is a block diagram illustrating the creator movement recording and humanoid replication in accordance with the present disclosure.

FIG. 105 is a block diagram illustrating the creator movement recording and humanoid replication based on the captured sensory data from sensors aligned on the creator. In the In the creator movement recording suite 3000, the creator may wear various body sensors D1-Dn with sensors for capturing the skill, where sensor data 3001 are recorded in a table 3002. In this example, the creator is preforming a task with a tool. These action primitives by the creator, as recorded by the sensors and may constitute a mini-manipulation 3002 that take place over time slots 1, 2, 3 and 4. The skill Movement replication data module 2884 is configured to convert the recorded skills file from the creator recording suite 3000 to robotic instructions for operating robotic components such as arms and the robotic hands in the robotic human-skill execution portion 1063 according to a robotic software instructions 3004. The robotic components perform the skill with control signals 3006 for the mini-manipulation, as pre-defined in the mini-manipulation library 116 from a minimanipulation library database 3009, of performing the skill with a tool. The robotic components operate with the same xyz coordinates 3005 and with possible real-time adjustment to the skill by creating a temporary three-dimensional model 3007 of the skill from a real-time adjustment device.

In order to operate a mechanical robotic mechanism such as the ones described in the embodiments of this disclosure, a skilled artisan realizes that many mechanical and control problems need to be addressed, and the literature in robotics describes methods to do just that. The establishment of static and/or dynamic stability in a robotics system is an important consideration. Especially for robotic manipulation, dynamic stability is a strongly desired property, in order to prevent accidental breakage or movements beyond those desired or programmed.

Figure 106:
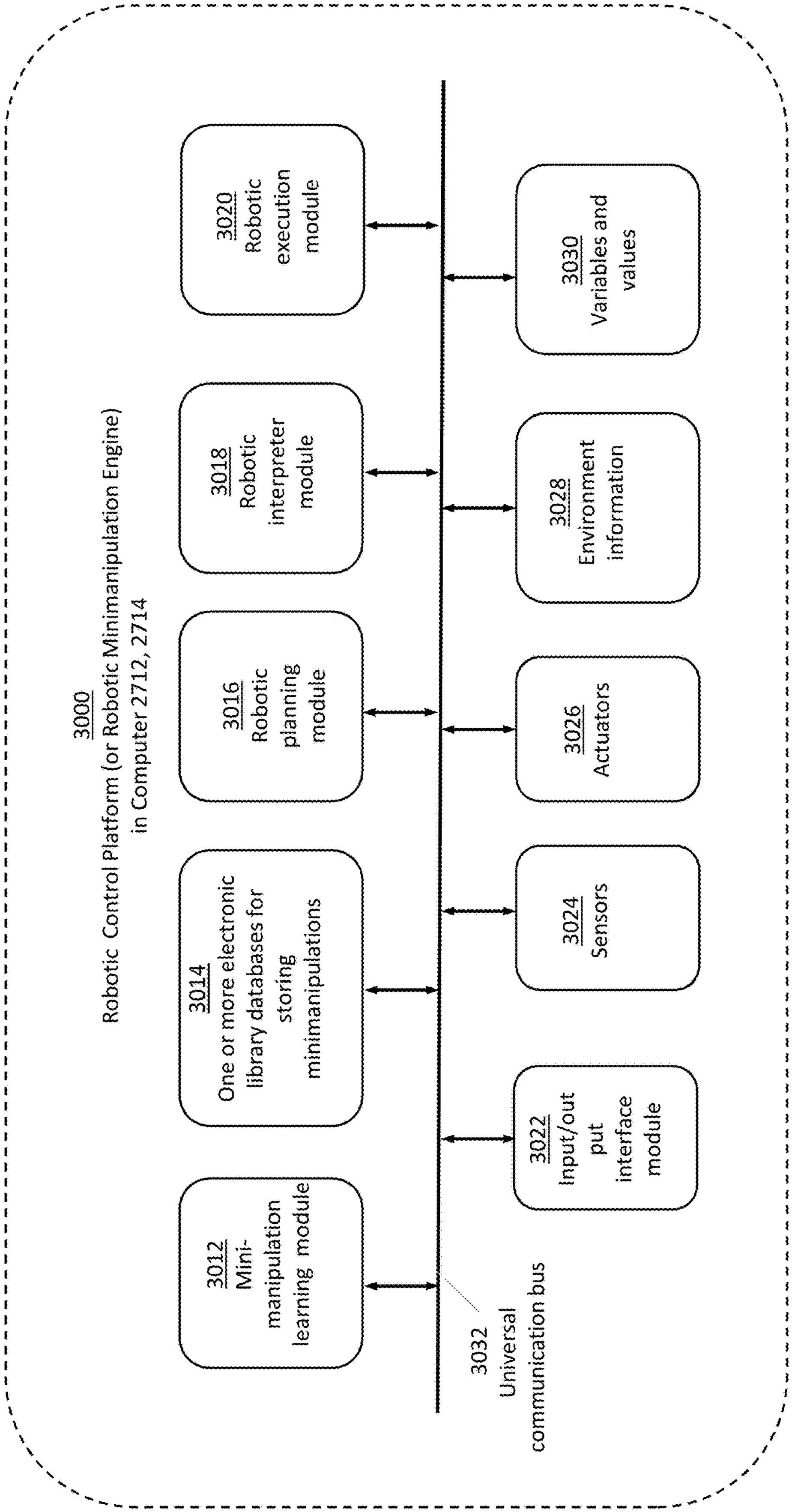
FIG. 106 depicts the overall robotic control platform for a general-purpose humanoid robot at as a high-level description of the functionality of the present disclosure.

FIG. 106 depicts the overall robotic control platform 3010 for a general-purpose humanoid robot at as a high level description of the functionality of the present disclosure. An universal communication bus 3002 serves an electronic conduit for data, including reading from internal and external sensors 3014, variables and their current values 3016 pertinent to the current state of the robot, such as tolerances in its movements, exact location of its hands, etc. and environment information 3018 such as where the robot is or where are the objects that it may need to manipulation. These input sources make the humanoid robot situationally aware and thus able to carry out its tasks, from direct low level actuator commands 3020 to high level robotic end-to-end task plans from the robotic planner 3022 that can reference a large electronic library of component minimanipulations 3024, which are then interpreted to determine whether their preconditions permit application and converted to machine-executable code from a robotic interpreter module 3026 and then sent as the actual command-and-sensing sequences to the robotic execution module 3028.

In addition to the robotic planning, sensing and acting, the robotic control platform can also communicate with humans via icons, language, gestures, etc. via the robot-human interfaces module 3030, and can learn new minimanipulations by observing humans perform building-block tasks corresponding to the minimanipulations and generalizing multiple observations into minimanipulations, i.e., reliable repeatable sensing-action sequences with preconditions and postconditions by a minimanipulation learning module 3032.

Figure 107:
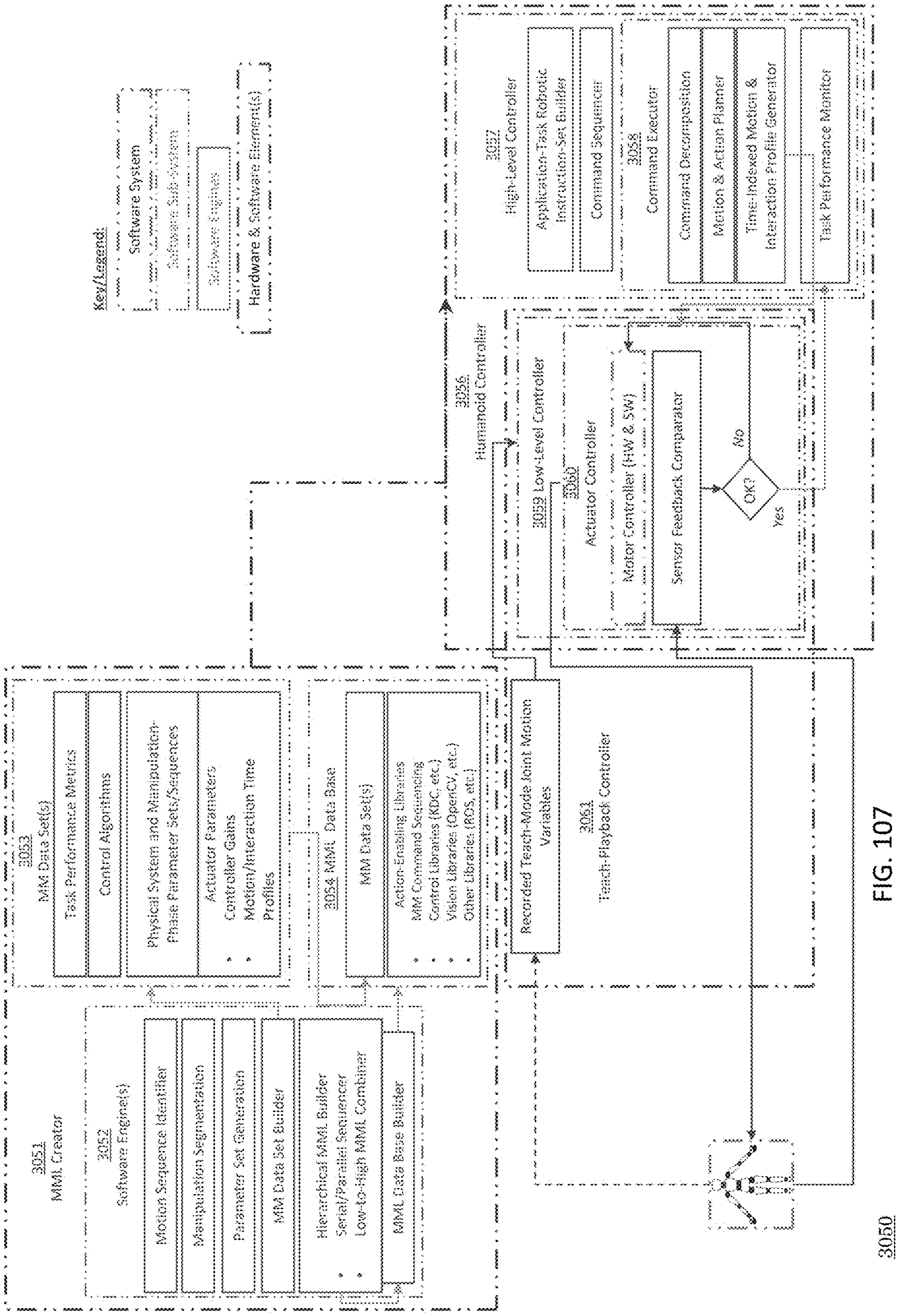
FIG. 107 is a block diagram illustrating the schematic for generation, transfer, implementation, and usage of minimanipulation libraries as part of a humanoid application-task replication process in accordance with the present disclosure.

FIG. 107 is a block diagram illustrating a computer architecture 3050 (or a schematic) for generation, transfer, implementation and usage of minimanipulation libraries as part of a humanoid application-task replication process. The present disclosure relates to a combination of software systems, which include many software engines and datasets and libraries, which when combined with libraries and controller systems, results in an approach to abstracting and recombining computer-based task-execution descriptions to enable a robotic humanoid system to replicate human tasks as well as self-assemble robotic execution sequences to accomplish any required task sequence. Particular elements of the present disclosure relate to a Minimanipulation (MM) Generator 3051, which creates Minimanipulation libraries (MMLs) that are accessible by the humanoid controller 3056 in order to create high-level task-execution command sequences that are executed by a low-level controller residing on/with the humanoid robot itself.

The computer architecture 3050 for executing minimanipulations comprises a combination of disclosure of controller algorithms and their associated controller-gain values as well as specified time-profiles for position/velocity and force/torque for any given motion/actuation unit, as well as the low-level (actuator) controller(s) (represented by both hardware and software elements) that implement these control algorithms and use sensory feedback to ensure the fidelity of the prescribed motion/interaction profiles contained within the respective datasets. These are also described in further detail below and so designated with appropriate color-code in the associated FIG. 107.

The MML generator 3051 is a software system comprising multiple software engines GG2 that create both minimanipulation (MM) data sets GG3 which are in turn used to also become part of one or more MML Data bases GG4.

The MML Generator 3051 contains the aforementioned software engines 3052, which utilize sensory and spatial data and higher-level reasoning software modules to generator parameter-sets that describe the respective manipulation tasks, thereby allowing the system to build a complete MM data set 3053 at multiple levels. A hierarchical MM Library (MML) builder is based on software modules that allow the system to decompose the complete task action set in to a sequence of serial and parallel motion-primitives that are categorized from low- to high-level in terms of complexity and abstraction. The hierarchical breakdown is then used by a MML database builder to build a complete MML database 3054.

The previously mentioned parameter sets 3053 comprise multiple forms of input and data (parameters, variables, etc.) and algorithms, including task performance metrics for a successful completion of a particular task, the control algorithms to be used by the humanoid actuation systems, as well as a breakdown of the task-execution sequence and the associated parameter sets, based on the physical entity/subsystem of the humanoid involved as well as the respective manipulation phases required to execute the task successfully. Additionally, a set of humanoid-specific actuator parameters are included in the datasets to specify the controller-gains for the specified control algorithms, as well as the time-history profiles for motion/velocity and force/torque for each actuation device(s) involved in the task execution.

The MML database 3054 comprises multiple low- to higher-level of data and software modules necessary for a humanoid to accomplish any specific low- to high-level task. The libraries not only contain MM datasets generated previously, but also other libraries, such as currently-existing controller-functionality relating to dynamic control (KDC), machine-vision (OpenCV) and other interaction/inter-process communication libraries (ROS, etc.). The humanoid controller 3056 is also a software system comprising the high-level controller software engine 3057 that uses high-level task-execution descriptions to feed machine-executable instructions to the low-level controller 3059 for execution on, and with, the humanoid robot platform.

The high-level controller software engine 3057 builds the application-specific task-based robotic instruction-sets, which are in turn fed to a command sequencer software engine that creates machine-understandable command and control sequences for the command executor GG8. The software engine 3052 decomposes the command sequence into motion and action goals and develops execution-plans (both in time and based on performance levels), thereby enabling the generation of time-sequenced motion (positions & velocities) and interaction (forces and torques) profiles, which are then fed to the low-level controller 3059 for execution on the humanoid robot platform by the affected individual actuator controllers 3060, which in turn comprise at least their own respective motor controller and power hardware and software and feedback sensors.

The low level controller contain actuator controllers which use digital controller, electronic power-driver and sensory hardware to feed software algorithms with required set-points for position/velocity and force/torque, which the controller is tasked to faithfully replicate along a time-stamped sequence, relying on feedback sensor signals to ensure the required performance fidelity. The controller remains in a constant loop to ensure all set-points are achieved over time until the required motion/interaction step(s)/profile(s) are completed, while higher-level task-performance fidelity is also being monitored by the high-level task performance monitoring software module in the command executor 3058, leading to potential modifications in the high-to-low motion/interaction profiles fed to the low-level controller to ensure task-outcomes fall within required performance bounds and meet specified performance metrics.

In a teach-playback controller 3061, a robot is led through a set of motion profiles, which are continuously stored in a time-synched fashion, and then 'played-back' by the low-level controller by controlling each actuated element to exactly follow the motion profile previously recorded. This type of control and implementation are necessary to control a robot, some of which may be available commercially. While the present described disclosure utilizes a low-level controller to execute machine-readable time-synched motion/interaction profiles on a humanoid robot, embodiments of the present disclosure are directed to techniques that are much more generic than teach-motions, more automated and far more capable process, more complexity, allowing one to create and execute a potentially high number of simple to complex tasks in a far more efficient and cost-effective manner.

Figure 108:
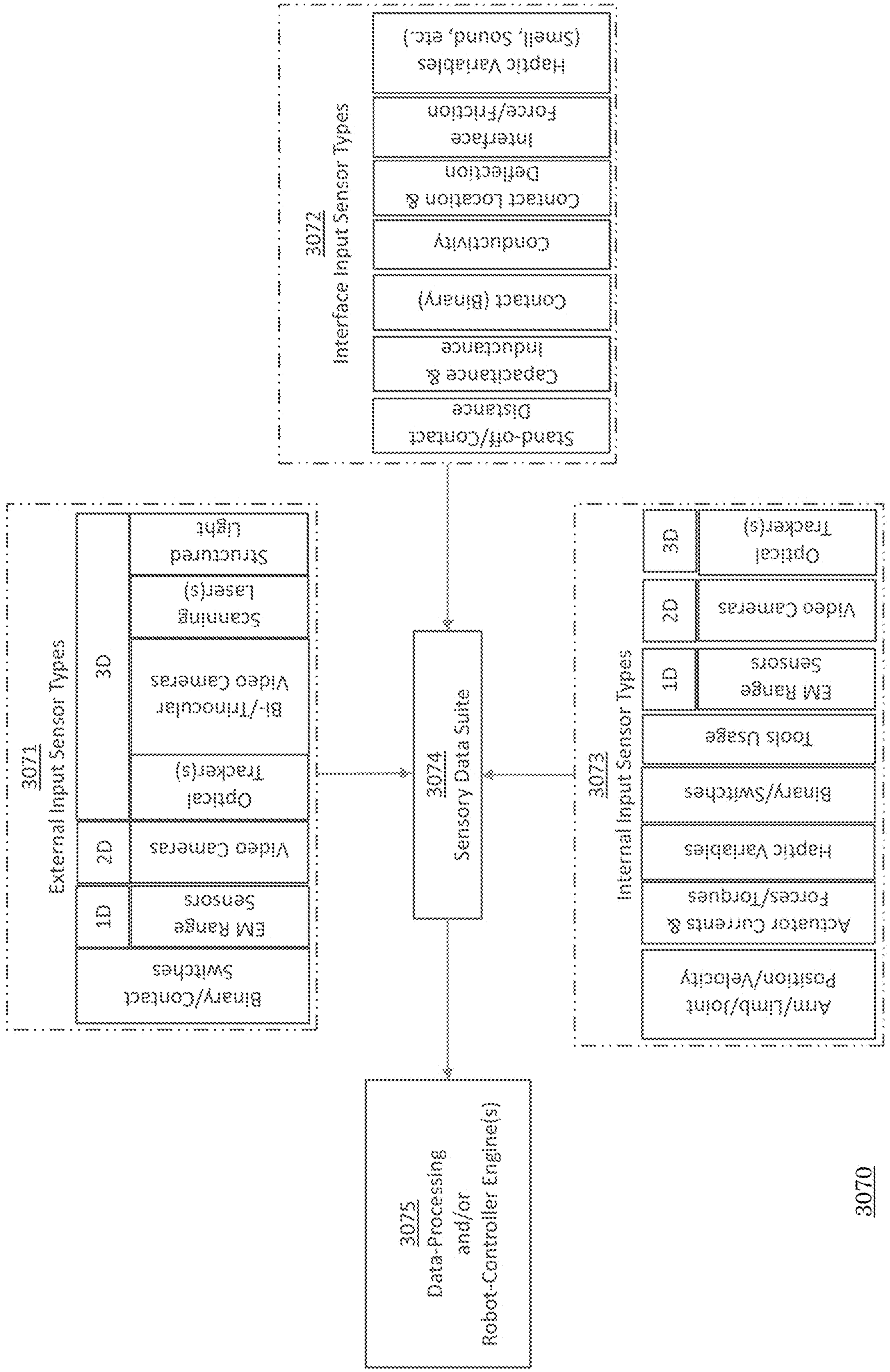
FIG. 108 is a block diagram illustrating studio and robot-based sensory-Data input categories and types in accordance with the present disclosure.

FIG. 108 depicts the different types of sensor categories 3070 and their associated types for studio-based and robot-based sensory data input categories and types, which would be involved in both the creator studio-based recording step and during the robotic execution of the respective task. These sensory data-sets form the basis upon which minimanipulation action-libraries are built, through a multi-loop combination of the different control actions based on particular data and/or to achieve particular data-values to achieve a desired end-result, whether it be very focused 'sub-routine' (grab a knife, strike a piano-key, paint a line on canvas, etc.) or a more generic MM routine (prepare a salad, play Shubert's #5 piano concerto, paint a pastoral scene, etc.); the latter is achievable through a concatenation of multiple serial and parallel combinations of MM subroutines.

Sensors have been grouped in three categories based on their physical location and portion of a particular interaction that will need to be controlled. Three types of sensors (External 3071, Internal 3073, and Interface 3072) feed their data sets into a data-suite process 3074 that forwards the data over the proper communication link and protocol to the data processing and/or robot-controller engine(s) 3075.

External Sensors 3071 comprise sensors typically located/used external to the dual-arm robot torso/humanoid and tend to model the location and configuration of the individual systems in the world as well as the dual-arm torso/humanoid. Sensor types used for such a suite would include simple contact switches (doors, etc.), electromagnetic (EM) spectrum based sensors for one-dimensional range measurements (IR rangers, etc.), video cameras to generate two-dimensional information (shape, location, etc.), and three-dimensional sensors used to generate spatial location and configuration information using bi-/tri-nocular cameras, scanning lasers and structured light, etc.).

Internal Sensors 3073 are sensors internal to the dual-arm torso/humanoid, mostly measuring internal variables, such as arm/limb/joint positions and velocity, actuator currents and joint- and Cartesian forces and torques, haptic variables (sound, temperature, taste, etc.) binary switches (travel limits, etc.) as well as other equipment-specific presence switches. Additional One-/two- and three-dimensional sensor types (such as in the hands) can measure range/distance, two-dimensional layouts via video camera and even built-in optical trackers (such as in a torso-mounted sensor-head).

Interface-sensors 3072 are those kinds of sensors that are used to provide high-speed contact and interaction movements and forces/torque information when the dual-arm torso/humanoid interacts with the real world during any of its tasks. These are critical sensors as they are integral to the operation of critical MM sub-routine actions such as striking a piano-key in just the right way (duration and force and speed, etc.) or using a particular sequence of finger-motions to grab and achieve a safe grab of a knife to orient it to be able for a particular task (cut a tomato, strike an egg, crush garlic gloves, etc.). These sensors (in order of proximity) can provide information related to the stand-off/contact distance between the robot appendages to the world, the associated capacitance/inductance between the end effector and the world measurable immediately prior to contact, the actual contact presence and location and its associated surface properties (conductivity, compliance, etc.) as well as associated interaction properties (force, friction, etc.) and any other haptic variables of importance (sound, heat, smell, etc.).

Figure 109:
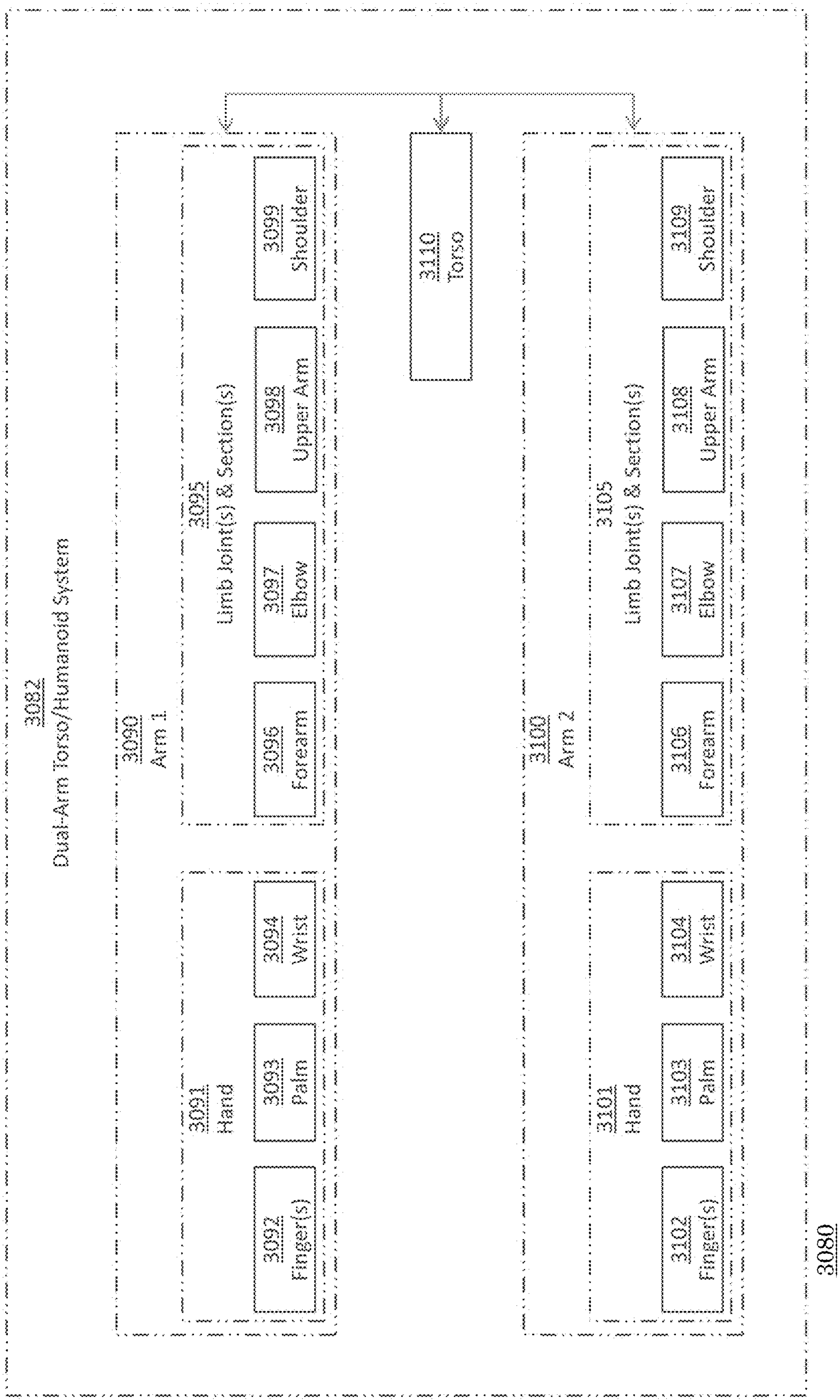
FIG. 109 is a block diagram illustrating physical-/system-based minimanipulation library action-based dual-arm and torso topology in accordance with the present disclosure.

FIG. 109 depicts a block diagram illustrating a system-based minimanipulation library action-based dual-arm and torso topology 3080 for a dual-arm torso/humanoid system 3082 with two individual but identical arms 1 (3090) and 2 (3100), connected through a torso 3110. Each arm 3090 and 3100 are split internally into a hand (3091, 3101) and a limb-joint sections 3095 and 3105. Each hand 3091, 3101 is in turn comprised of a one or more finger(s) 3092 and 3102, a palm 3093 and 3103, and a wrist 3094 and 3104. Each of the limb-joint sections 3095 and 3105 are in turn comprised of a forearm-limb 3096 and 3106, an elbow-joint 3097 and 3107, an upper-arm-limb 3098 and 3108, as well as a shoulder-joint 3099 and 3109.

The interest in grouping the physical layout as shown in FIG. BB is related to the fact that MM actions can readily be split into actions performed mostly by a certain portion of a hand or limb/joint, thereby reducing the parameter-space for control and adaptation/optimization during learning and playback, dramatically. It is a representation of the physical space into which certain subroutine or main minimanipulation (MM) actions can be mapped, with the respective variables/parameters needed to describe each minimanipulation (MM) being both minimal/necessary and sufficient.

A breakdown in the physical space-domain also allows for a simpler breakdown of minimanipulation (MM) actions for a particular task into a set of generic minimanipulation (sub-) routines, dramatically simplifying the building of more complex and higher-level complexity minimanipulation (MM) actions using a combination of serial/parallel generic minimanipulation (MM) (sub-) routines. Note that the physical domain breakdown to readily generate minimanipulation (MM) action primitives (and/or sub-routines), is but one of the two complementary approaches' allowing for simplified parametric descriptions of minimanipulation (MM) (sub-) routines to allow one to properly build a set of generic and task-specific minimanipulation (MM) (sub-) routines or motion primitives to build up a complete (set of) motion-library(ies).

Figure 110:
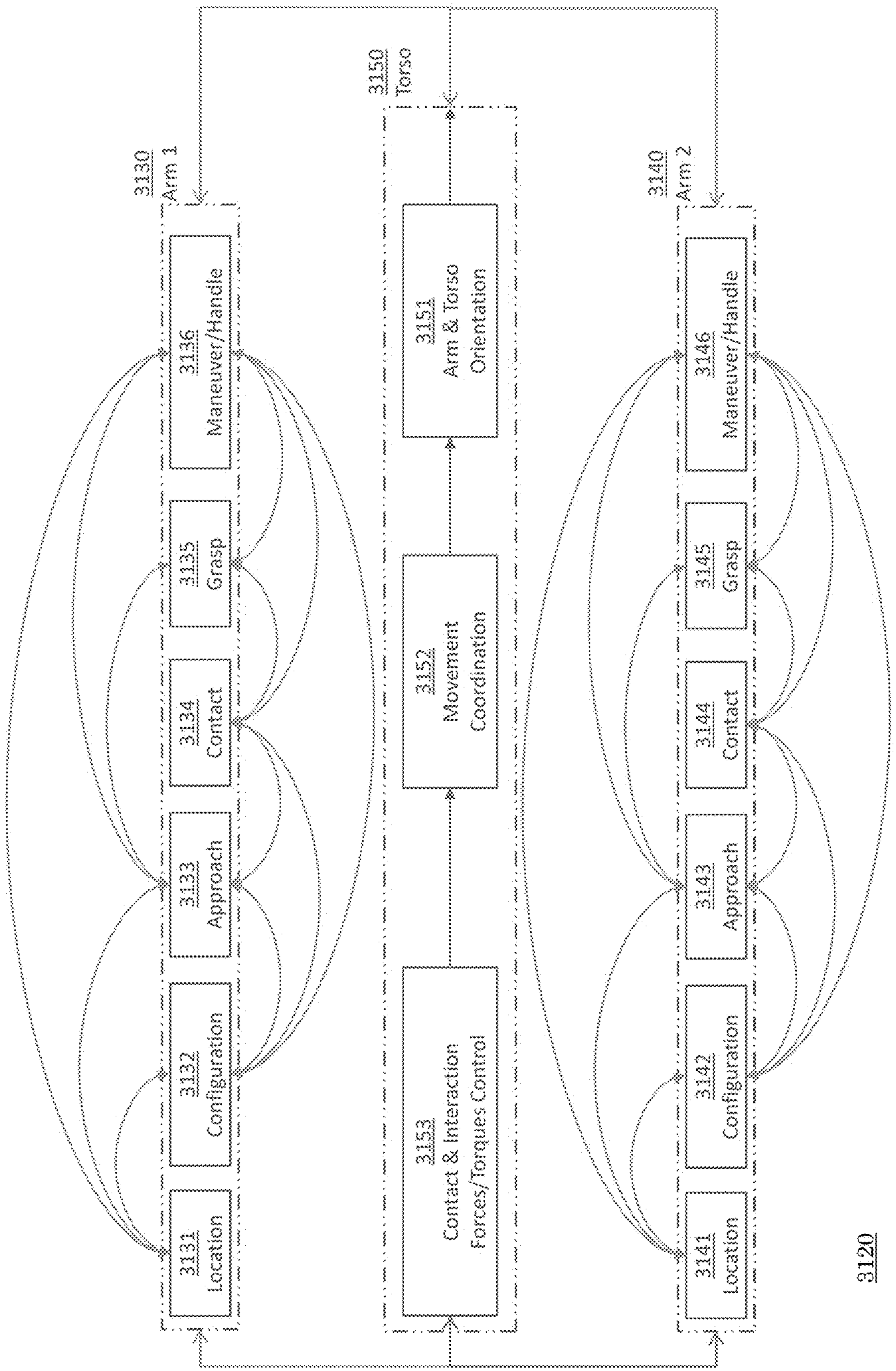
FIG. 110 is a block diagram illustrating minimanipulation library manipulation-phase combinations and transitions for task-specific action-sequences in accordance with the present disclosure.

FIG. 110 depicts a dual-arm torso humanoid robot system 3120 as a set of manipulation function phases associated with any manipulation activity, regardless of the task to be accomplished, for MM library manipulation-phase combinations and transitions for task-specific action-sequences 3120.

Hence in order to build an ever more complex and higher level set of minimanipulation (MM) motion-primitive routines form a set of generic sub-routines, a high-level minimanipulation (MM) can be thought of as a transition between various phases of any manipulation, thereby allowing for a simple concatenation of minimanipulation (MM) sub-routines to develop a higher-level minimanipulation routine (motion-primitive). Note that each phase of a manipulation (approach, grasp, maneuver, etc.) is itself its own low-level minimanipulation described by a set of parameters involved in controlling motions and forces/torques (internal, external as well as interface variables) involving one or more of the physical domain entities [finger(s), palm, wrist, limbs, joints (elbow, shoulder, etc.), torso, etc.].

Arm 1 3131 of a dual-arm system, can be thought of as using external and internal sensors as defined in FIG. 108, to achieve a particular location 3131 of the end effector, with a given configuration 3132 prior to approaching a particular target (tool, utensil, surface, etc.), using interface-sensors to guide the system during the approach-phase 3133, and during any grasping-phase 3035 (if required); a subsequent handling-/maneuvering-phase 3136 allows for the end effector to wield an instrument in it grasp (to stir, draw, etc.). The same description applies to an Arm 2 3140, which could perform similar actions and sequences.

Note that should a minimanipulation (MM) sub-routine action fail (such as needing to re-grasp), all the minimanipulation sequencer has to do is to jump back backwards to a prior phase and repeat the same actions (possibly with a modified set of parameters to ensure success, if needed). More complex sets of actions, such playing a sequence of piano-keys with different fingers, involves a repetitive jumping-loops between the Approach 3133, 3134 and the Contact 3134, 3144 phases, allowing for different keys to be struck in different intervals and with different effect (soft/hard, short/long, etc.); moving to different octaves on the piano key-scale would simply require a phase-backwards to the configuration-phase 3132 to reposition the arm, or possibly even the entire torso 3140 through translation and/or rotation to achieve a different arm and torso orientation 3151.

Arm 2 3140 could perform similar activities in parallel and independent of Arm 3130, or in conjunction and coordination with Arm 3130 and Torso 3150, guided by the movement-coordination phase 315 (such as during the motions of arms and torso of a conductor wielding a baton), and/or the contact and interaction control phase 3153, such as during the actions of dual-arm kneading of dough on a table.

One aspect depicted in FIG. 110, is that minimanipulations (MM) ranging from the lowest-level sub-routine to the more higher level motion-primitives or more complex minimanipulation (MM) motions and abstraction sequences, can be generated from a set of different motions associated with a particular phase which in turn have a clear and well-defined parameter-set (to measure, control and optimize through learning). Smaller parameter-sets allow for easier debugging and sub-routines that an be guaranteed to work, allowing for a higher-level MM routines to be based completely on well-defined and successful lower-level MM sub-routines.

Notice that coupling a minimanipulation (sub-) routine to a not only a set of parameters required to be monitored and controlled during a particular phase of a task-motion as depicted in FIG. 110, but also associated further with a particular physical (set of) units as broken down in FIG. 109, allows for a very powerful set of representations to allow for intuitive minimanipulation (MM) motion-primitives to be generated and compiled into a set of generic and task-specific minimanipulation (MM) motion/action libraries.

Figure 111:
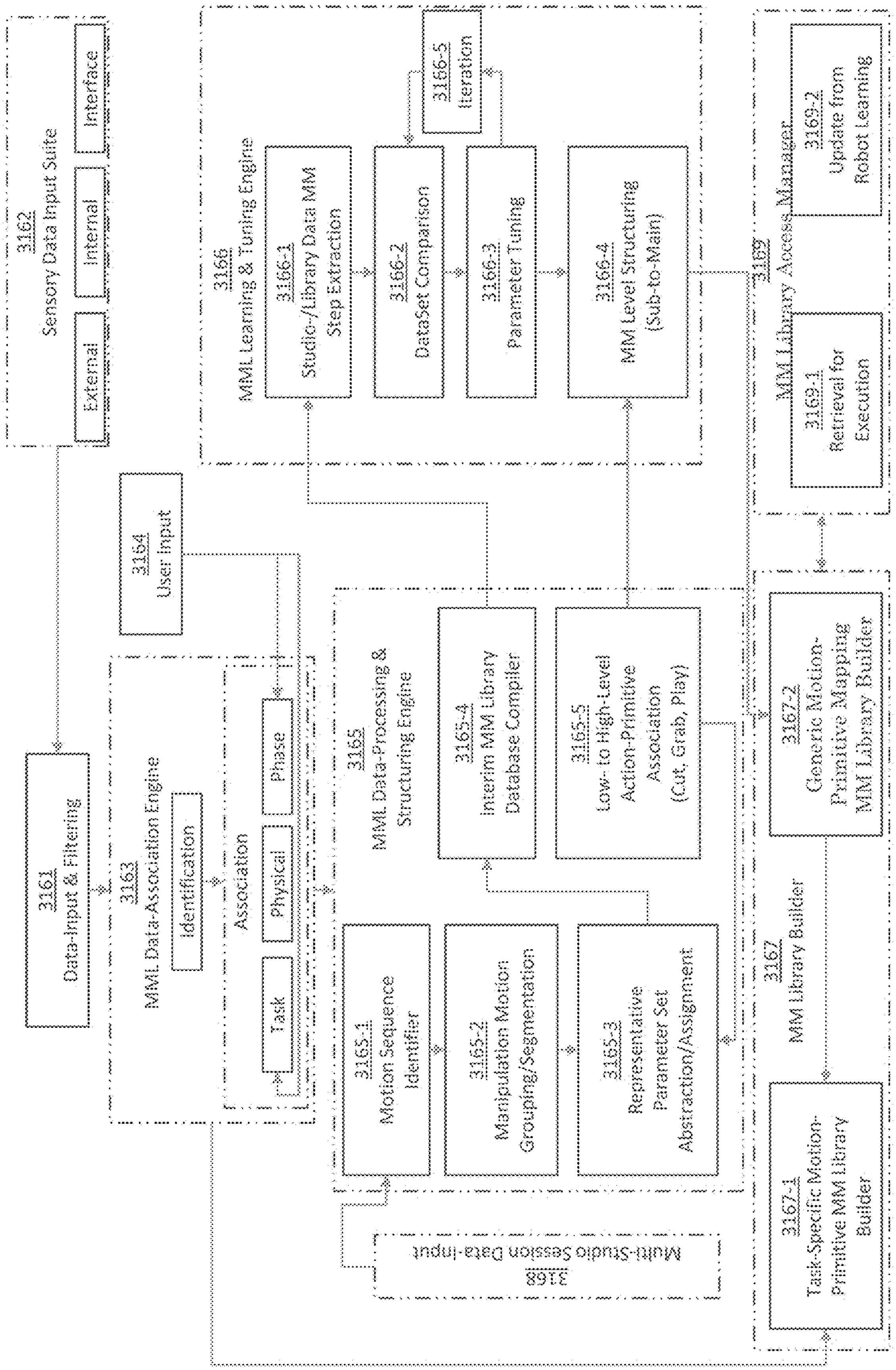
FIG. 111 is a block diagram illustrating one or more minimanipulation libraries, (generic and task-specific) building process from studio data in accordance with the present disclosure.

FIG. 111 depicts a flow diagram illustrating the process 3160 of minimanipulation Library(ies) generation, for both generic and task-specific motion-primitives as part of the studio-data generation, collection and analysis process. This figure depicts how sensory-data is processed through a set of software engines to create a set of minimanipulation libraries containing datasets with parameter-values, time-histories, command-sequences, performance-measures and —metrics, etc. to ensure low- and higher-level minimanipulation motion primitives result in a successful completion of low-to-complex remote robotic task-executions.

In a more detailed view, it is shown how sensory data is filtered and input into a sequence of processing engines to arrive at a set of generic and task-specific minimanipulation motion primitive libraries. The processing of the sensory data 3162 identified in FIG. 108 involves its filtering-step 3161 and grouping it through an association engine 3163, where the data is associated with the physical system elements as identified in FIG. 109 as well as manipulation-phases as described in FIG. 110, potentially even allowing for user input 3164, after which they are processed through two MM software engines.

The MM data-processing and structuring engine 3165 creates an interim library of motion-primitives based on identification of motion-sequences 3165-1, segmented groupings of manipulation steps 3165-2 and then an abstraction-step 3165-3 of the same into a dataset of parameter-values for each minimanipulation step, where motion-primitives are associated with a set of pre-defined low- to high-level action-primitives 3165-5 and stored in an interim library 3165-4. As an example, process 3165-1 might identify a motion-sequence through a dataset that indicates object-grasping and repetitive back-and-forth motion related to a studio-chef grabbing a knife and proceeding to cut a food item into slices. The motion-sequence is then broken down in 3165-2 into associated actions of several physical elements (fingers and limbs/joints) shown in FIG. 109 with a set of transitions between multiple manipulation phases for one or more arm(s) and torso (such as controlling the fingers to grasp the knife, orienting it properly, translating arms and hands to line up the knife for the cut, controlling contact and associated forces during cutting along a cut-plane, re-setting the knife to the beginning of the cut along a free-space trajectory and then repeating the contact/force-control/trajectory-following process of cutting the food-item indexed for achieving a different slice width/angle). The parameters associated with each portion of the manipulation-phase are then extracted and assigned numerical values in 3165-3, and associated with a particular action-primitive offered by 3165-5 with mnemonic descriptors such as 'grab', 'align utensil', 'cut', 'index-over', etc.

The interim library data 3165-4 is fed into a learning-and-tuning engine 3166, where data from other multiple studio-sessions 3168 is used to extract similar minimanipulation actions and their outcomes 3166-1 and comparing their data sets 3166-2, allowing for parameter-tuning 3166-3 within each minimanipulation group using one or more of standard machine-learning/-parameter-tuning techniques in an iterative fashion 3166-5. A further level-structuring process 3166-4 decides on breaking the minimanipulation motion-primitives into generic low-level sub-routines and higher-level minimanipulations made up of a sequence (serial and parallel combinations) of sub-routine action-primitives.

A following library builder 3167 then organizes all generic minimanipulation routines into a set of generic multi-level minimanipulation action-primitives with all associated data (commands, parameter-sets and expected/required performance metrics) as part of a single generic minimanipulation library 3167-2. A separate and distinct library is then also built as a task-specific library 3167-1 that allows for assigning any sequence of generic minimanipulation action-primitives to a specific task (cooking, painting, etc.), allowing for the inclusion of task-specific datasets which only pertain to the task (such as kitchen data and parameters, instrument-specific parameters, etc.) which are required to replicate the studio-performance by a remote robotic system.

A separate MM library access manager 3169 is responsible for checking-out proper libraries and their associated datasets (parameters, time-histories, performance metrics, etc.) 3169-1 to pass onto a remote robotic replication system, as well as checking back in updated minimanipulation motion primitives (parameters, performance metrics, etc.) 3169-2 based on learned and optimized minimanipulation executions by one or more same/different remote robotic systems. This ensures the library continually grows and is optimized by a growing number of remote robotic execution platforms.

Figure 112:
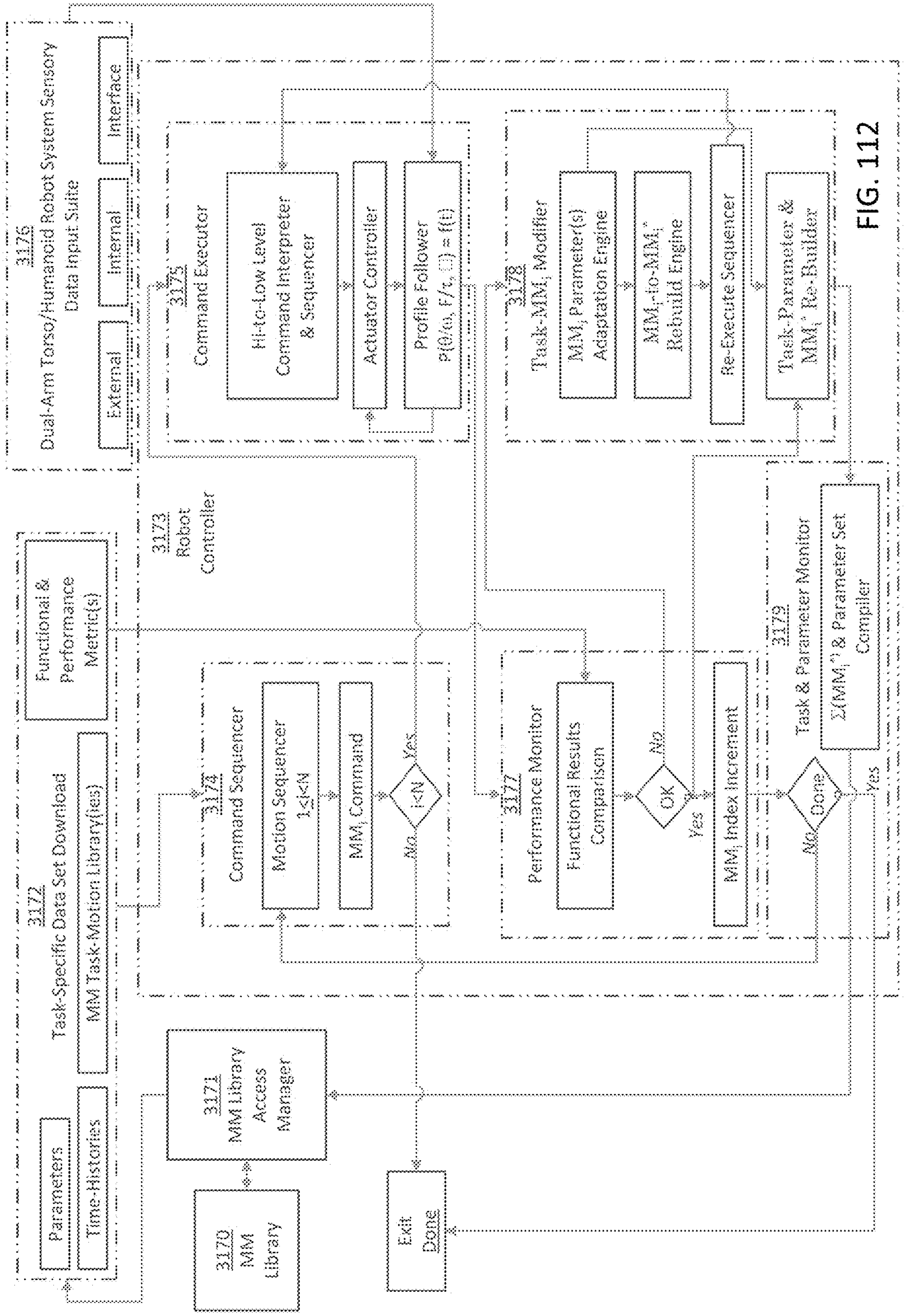
FIG. 112 is a block diagram illustrating robotic task-execution via one or more minimanipulation library data sets in accordance with the present disclosure.

FIG. 112 depicts a block diagram illustrating the process of how a remote robotic system would utilize the minimanipulation (MM) library(ies) to carry out a remote replication of a particular task (cooking, painting, etc.) carried out by an expert in a studio-setting, where the expert's actions were recorded, analyzed and translated into machine-executable sets of hierarchically-structured minimanipulation datasets (commands, parameters, metrics, time-histories, etc.) which when downloaded and properly parsed, allow for a robotic system (in this case a dual-arm torso/humanoid system) to faithfully replicate the actions of the expert with sufficient fidelity to achieve substantially the same end-result as that of the expert in the studio-setting.

At a high level, this is achieved by downloading the task-descriptive libraries containing the complete set of minimanipulation datasets required by the robotic system, and providing them to a robot controller for execution. The robot controller generates the required command and motion sequences that the execution module interprets and carries out, while receiving feedback from the entire system to allow it to follow profiles established for joint and limb positions and velocities as well as (internal and external) forces and torques. A parallel performance monitoring process uses task-descriptive functional and performance metrics to track and process the robot's actions to ensure the required task-fidelity. A minimanipulation learning-and-adaptation process is allowed to take any minimanipulation parameter-set and modify it should a particular functional result not be satisfactory, to allow the robot to successfully complete each task or motion-primitive. Updated parameter data is then used to rebuild the modified minimanipulation parameter set for re-execution as well as for updating/rebuilding a particular minimanipulation routine, which is provided back to the original library routines as a modified/re-tuned library for future use by other robotic systems. The system monitors all minimanipulation steps until the final result is achieved and once completed, exits the robotic execution loop to await further commands or human input.

In specific detail the process outlined above, can be detailed as the sequences described below. The MM library 3170, containing both the generic and task-specific MM-libraries, is accessed via the MM library access manager 3171, which ensures all the required task-specific data sets 3172 required for the execution and verification of interim/end-result for a particular task are available. The data set includes at least, but is not limited to, all necessary kinematic/dynamic and control parameters, time-histories of pertinent variables, functional and performance metrics and values for performance validation and all the MM motion libraries relevant to the particular task at hand.

All task-specific datasets 3172 are fed to the robot controller 3173. A command sequencer 3174 creates the proper sequential/parallel motion sequences with an assigned index-value 'I', for a total of 'i=N' steps, feeding each sequential/parallel motion command (and data) sequence to the command executor 3175. The command executor 3175 takes each motion-sequence and in turn parses it into a set of high-to-low command signals to actuation and sensing systems, allowing the controllers for each of these systems to ensure motion-profiles with required position/velocity and force/torque profiles are correctly executed as a function of time. Sensory feedback data 3176 from the (robotic) dual-arm torso/humanoid system is used by the profile-following function to ensure actual values track desired/commanded values as close as possible.

A separate and parallel performance monitoring process 3177 measures the functional performance results at all times during the execution of each of the individual minimanipulation actions, and compares these to the performance metrics associated with each minimanipulation action and provided in the task-specific minimanipulation data set provided in 3172. Should the functional result be within acceptable tolerance limits to the required metric value(s), the robotic execution is allowed to continue, by way of incrementing the minimanipulation index value to 'i++', and feeding the value and returning control back to the command-sequencer process 3174, allowing the entire process to continue in a repeating loop. Should however the performance metrics differ, resulting in a discrepancy of the functional result value(s), a separate task-modifier process 3178 is enacted.

The minimanipulation task-modifier process 3178 is used to allow for the modification of parameters describing any one task-specific minimanipulation, thereby ensuring that a modification of the task-execution steps will arrive at an acceptable performance and functional result. This is achieved by taking the parameter-set from the 'offending' minimanipulation action-step and using one or more of multiple techniques for parameter-optimization common in the field of machine-learning, to rebuild a specific minimanipulation step or sequence $MM_i$ into a revised minimanipulation step or sequence $MM_i^*$. The revised step or sequence $MM_i^*$ is then used to rebuild a new command-0sequence that is passed back to the command executor 3175 for re-execution. The revised minimanipulation step or sequence $MM_i^*$ is then fed to a re-build function that re-assembles the final version of the minimanipulation dataset, that led to the successful achievement of the required functional result, so it may be passed to the task- and parameter monitoring process 3179.

The task- and parameter monitoring process 3179 is responsible for checking for both the successful completion of each minimanipulation step or sequence, as well as the final/proper minimanipulation dataset considered responsible for achieving the required performance-levels and functional result. As long as the task execution is not completed, control is passed back to the command sequencer 3174. Once the entire sequences have been successfully executed, implying 'i=N', the process exits (and presumably awaits further commands or user input. For each sequence-counter value 'I', the monitoring task 3179 also forwards the sum of all rebuilt minimanipulation parameter sets $\Sigma(MM_i^*)$ back to the MM library access manager 3171 to allow it to update the task-specific library(ies) in the remote MM library 3170 shown in FIG. 111. The remote library then updates its own internal task-specific minimanipulation representation [setting $\Sigma(MM_{i,new})=\Sigma(MM_i^*)$], thereby making an optimized minimanipulation library available for all future robotic system usage.

Figure 113:
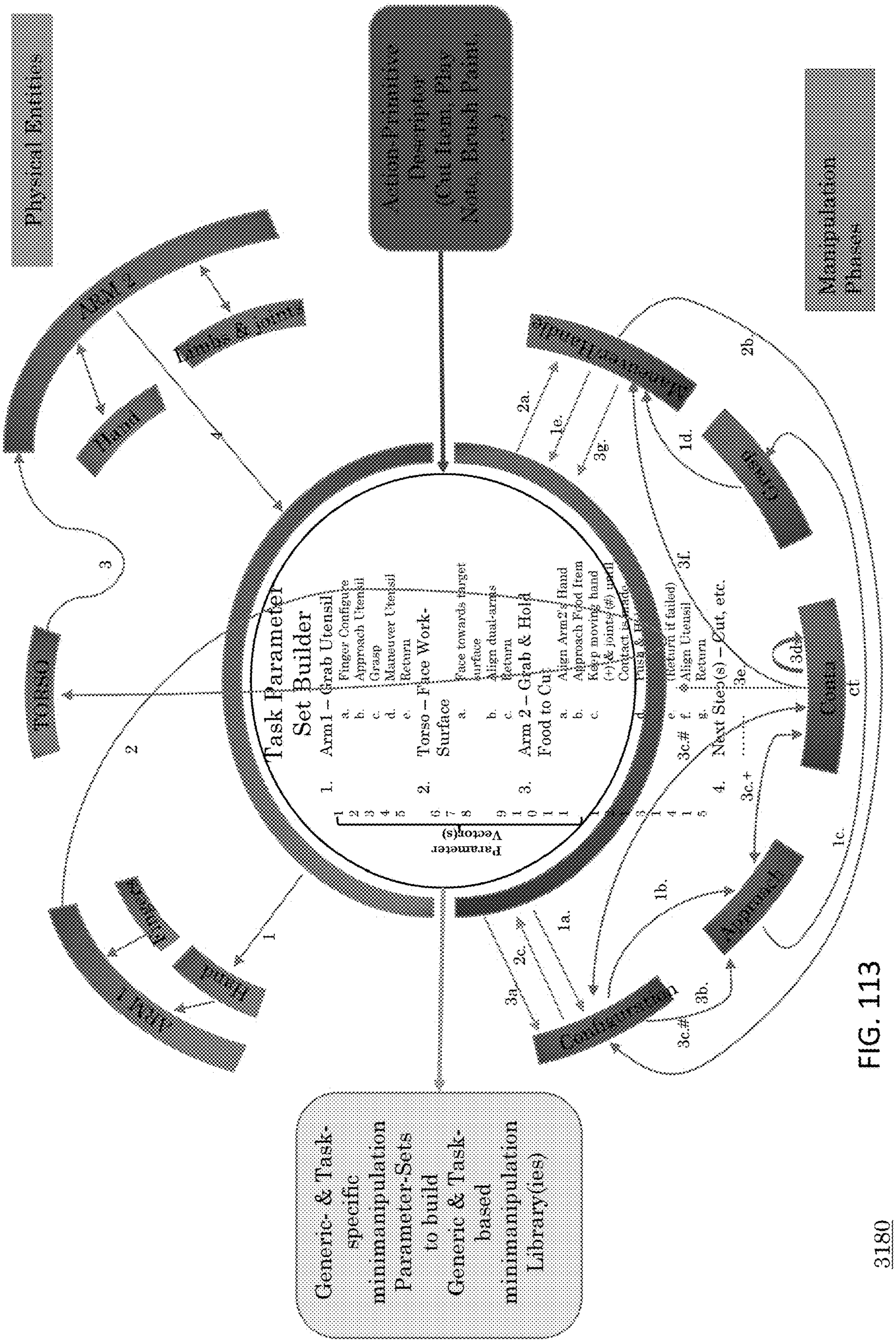
FIG. 113 is a block diagram illustrating a schematic for automated minimanipulation parameter-set building engine in accordance with the present disclosure.

FIG. 113 depicts a block diagram illustrating an automated minimanipulation parameter-set building engine 3180 for a minimanipulation task-motion primitive associated with a particular task. It provides a graphical representation of how the process of building (a) (sub-) routine for a particular minimanipulation of a particular task is accomplished based on using the physical system groupings and different manipulation-phases, where a higher-level minimanipulation routine can be built up using multiple low-level minimanipulation primitives (essentially sub-routines comprised of small and simple motions and closed-loop controlled actions) such as grasp, grasp the tool, etc. This process results in a sequence (basically task- and time-indexed matrices) of parameter values stored in multi-dimensional vectors (arrays) that are applied in a stepwise fashion based on sequences of simple maneuvers and steps/actions. In essence this figure depicts an example for the generation of a sequence of minimanipulation actions and their associated parameters, reflective of the actions encapsulated in the MM Library Processing & Structuring Engine 3160 from FIG. 112.

The example depicted in FIG. 113 shows a portion of how a software engine proceeds to analyze sensory-data to extract multiple steps from a particular studio data set. In this case it is the process of grabbing a utensil (a knife for instance) and proceeding to a cutting-station to grab or hold a particular food-item (such as a loaf of bread) and aligning the knife to proceed with cutting (slices). The system focuses on Arm 1 in Step 1., which involves the grabbing of a utensil (knife), by configuring the hand for grabbing (1.a.), approaching the utensil in a holder or on a surface (1.b.), performing a pre-determined set of grasping-motions (including contact-detection and —force control not shown but incorporated in the GRASP minimanipulation step 1.c.) to acquire the utensil and then move the hand in free-space to properly align the hand/wrist for cutting operations. The system thereby is able to populate the parameter-vectors (1 thru 5) for later robotic control. The system returns to the next step that involves the torso in Step 2., which comprises a sequence of lower-level minimanipulations to face the work (cutting) surface (2.a.), align the dual-arm system (2.b.) and return for the next step (2.c.). In the next Step 3., the Arm2 (the one not holding the utensil/knife), is commanded to align its hand (3.a.) for a larger-object grasp, approach the food item (3.b.; involves possibly moving all limbs and joints and wrist; 3.c.), and then move until contact is made (3.c.) and then push to hold the item with sufficient force (3.d.), prior to aligning the utensil (3.f.) to allow for cutting operations after a return (3.g.) and proceeding to the next step(s) (4. and so on).

The above example illustrates the process of building a minimanipulation routine based on simple sub-routine motions (themselves also minimanipulations) using both a physical entity mapping and a manipulation-phase approach which the computer can readily distinguish and parameterize using external/internal/interface sensory feedback data from the studio-recording process. This minimanipulation library building-process for process-parameters generates 'parameter-vectors' which fully describe a (set of) successful minimanipulation action(s), as the parameter vectors include sensory-data, time-histories for key variables as well as performance data and metrics, allowing a remote robotic replication system to faithfully execute the required task(s). The process is also generic in that it is agnostic to the task at hand (cooking, painting, etc.), as it simply builds minimanipulation actions based on a set of generic motion- and action-primitives. Simple user input and other pre-determined action-primitive descriptors can be added at any level to more generically describe a particular motion-sequence and to allow it to be made generic for future use, or task-specific for a particular application. Having minimanipulation datasets comprised of parameter vectors, also allows for continuous optimization through learning, where adaptions to parameters are possible to improve the fidelity of a particular minimanipulation based on field-data generated during robotic replication operations involving the application (and evaluation) of minimanipulation routines in one or more generic and/or task-specific libraries.

Figure 114A:
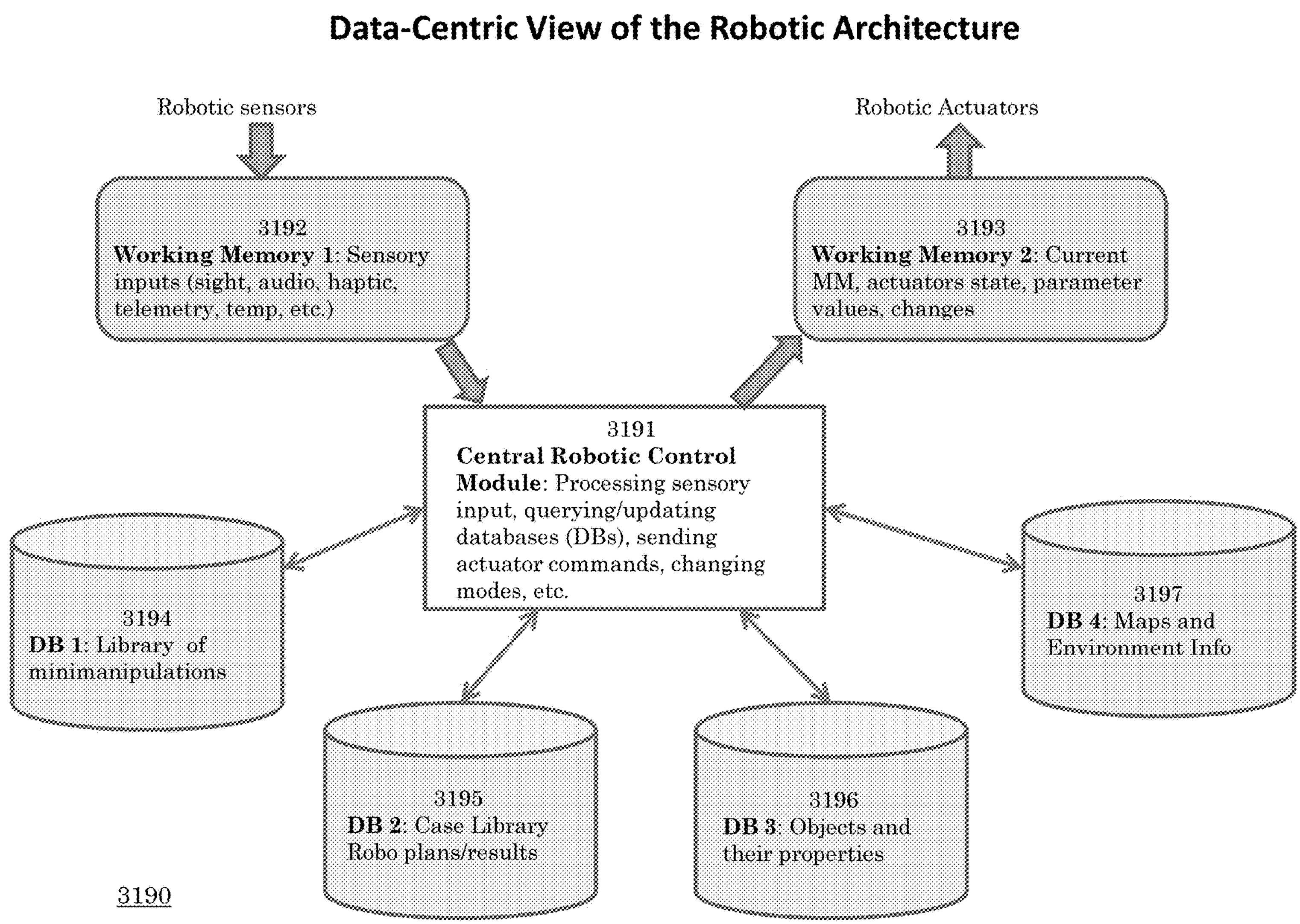
FIG. 114A is a block diagram illustrating a data-centric view of the robotic system in accordance with the present disclosure.

FIG. 114A is a block diagram illustrating a data-centric view of the robotic architecture (or robotic system), with a central robotic control module contained in the central box, in order to focus on the data repositories. The central robotic control module 3191 contains working memory needed by all the processes disclosed in <fill in>. In particular the Central Robotic Control establishes the mode of operation of the Robot, for instance whether it is observing and learning new minimanipulations, from an external teacher, or executing a task or in yet a different processing mode.

A working memory 1 3192 contains all the sensor readings for a period of time until the present: a few seconds to a few hours—depending on how much physical memory, typical would be about 60 seconds. The sensor readings come from the on-board or off-board robotic sensors and may include video from cameras, ladar, sonar, force and pressure sensors (haptic), audio, and/or any other sensors. Sensor readings are implicitly or explicitly time-tagged or sequence-tagged (the latter means the order in which the sensor readings were received).

A working memory 2 3193 contains all of the actuator commands generated by the Central Robotic Control and either passed to the actuators, or queued to be passed to same at a given point in time or based on a triggering event (e.g. the robot completing the previous motion). These include all the necessary parameter values (e.g. how far to move, how much force to apply, etc.).

A first database (database 1) 3194 contains the library of all minimanipulations (MM) known to the robot, including for each MM, a triple <PRE, ACT, POST>, where PRE=($s_1$, $s_2$, . . . , $s_n$ is a set of items in the world state that must be true before the actions ACT=[$a_1$, $a_2$, . . . , $a_k$] can take place, and result in a set of changes to the world state denoted as POST={$p_1$, $p_2$, . . . , $p_m$}. In a preferred embodiment, the MMs are index by purpose, by sensors and actuators they involved, and by any other factor that facilitates access and application. In a preferred embodiment each POST result is associated with a probability of obtaining the desired result if the MM is executed. The Central Robotic Control both accesses the MM library to retrieve and execute MM's and updates it, e.g. in learning mode to add new MMs.

A second database (database 2) 3195 contains the case library, each case being a sequence of minimanipulations to perform a give task, such as preparing a given dish, or fetching an item from a different room. Each case contains variables (e.g. what to fetch, how far to travel, etc.) and outcomes (e.g. whether the particular case obtained the desired result and how close to optimal—how fast, with or without side-effects etc.). The Central Robotic Control both accesses the Case Library to determine if has a known sequence of actions for a current task, and updates the Case Library with outcome information upon executing the task. If in learning mode, the Central Robotic Control adds new cases to the case library, or alternately deletes cases found to be ineffective.

A third database (database 3) 3196 contains the object store, essentially what the robot knows about external objects in the world, listing the objects, their types and their properties. For instance, an knife is of type "tool" and "utensil" it is typically in a drawer or countertop, it has a certain size range, it can tolerate any gripping force, etc. An egg is of type "food", it has a certain size range, it is typically found in the refrigerator, it can tolerate only a certain amount of force in gripping without breaking, etc. The object information is queried while forming new robotic action plans, to determine properties of objects, to recognize objects, and so on. The object store can also be updated when new objects introduce and it can update its information about existing objects and their parameters or parameter ranges.

A fourth database (database 4) 3197 contains information about the environment in which the robot is operating, including the location of the robot, the extent of the environment (e.g. the rooms in a house), their physical layout, and the locations and quantities of specific objects within that environment. Database 4 is queried whenever the robot needs to update object parameters (e.g. locations, orientations), or needs to navigate within the environment. It is updated frequently, as objects are moved, consumed, or new objects brought in from the outside (e.g. when the human returns form the store or supermarket).

Figure 114B:
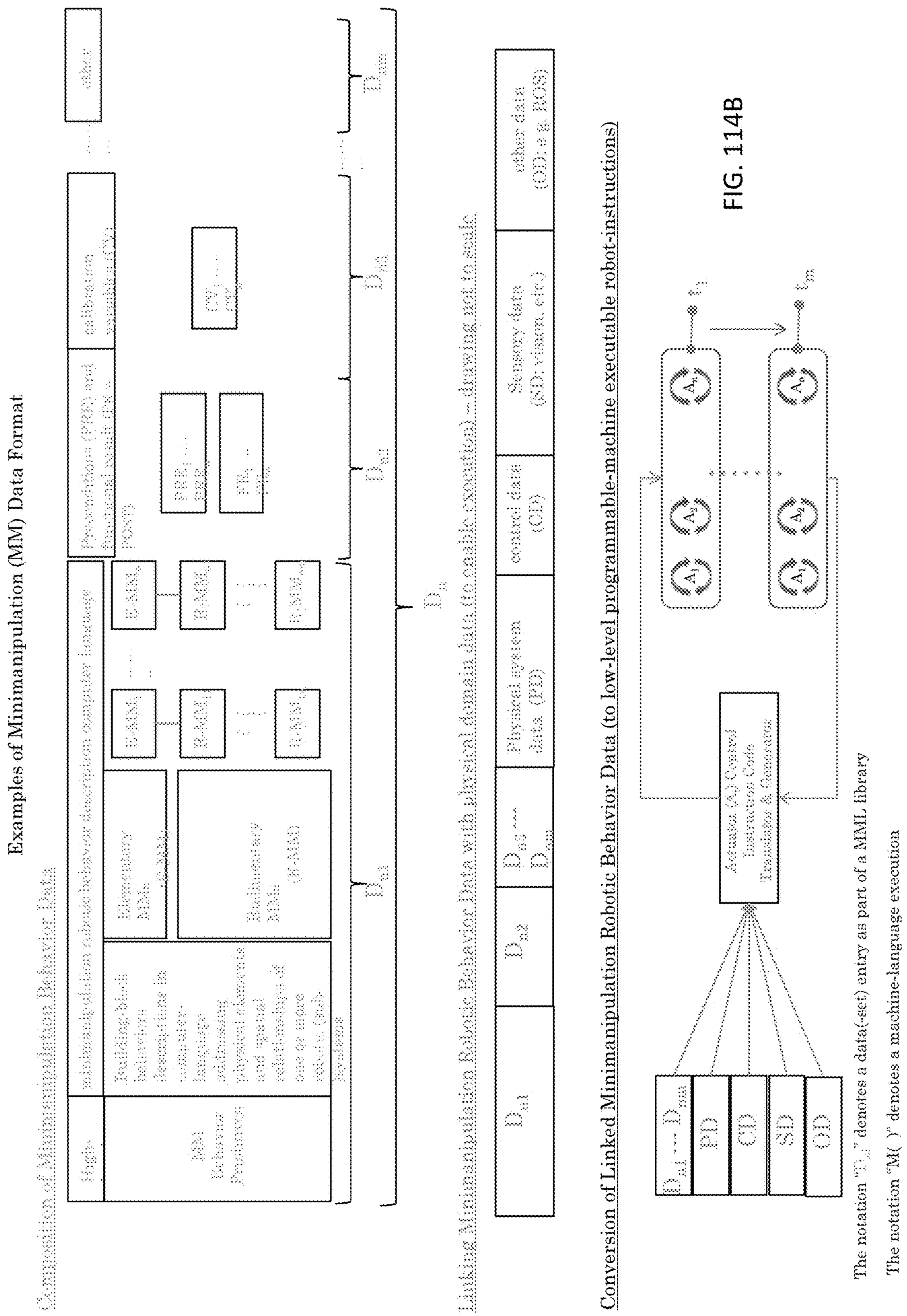
FIG. 114B is a block diagram illustrating examples of various minimanipulation data formats in the composition, linking, and conversion of minimanipulation robotic behavior data accordance with the present disclosure.

FIG. 114B is a block diagram illustrating examples of various minimanipulation data formats in the composition, linking and conversion of minimanipulation robotic behavior data. In composition, high-level MM behavior descriptions in a dedicated/abstraction computer programming language are based on the use of elementary MM primitives which themselves may be described by even more rudimentary MM in order to allow for building behaviors from ever-more complex behaviors.

An example of a very rudimentary behavior might be 'finger-curl', with a motion primitive related to 'grasp' that has all 5 fingers curl around an object, with a high-level behavior termed 'fetch utensil' that would involve arm movements to the respective location and then grasping the utensil with all five fingers. Each of the elementary behaviors (incl. the more rudimentary ones as well) have a correlated functional result and associated calibration variables describing and controlling each.

Linking allows for behavioral data to be linked with the physical world data, which includes data related to the physical system (robot parameters and environmental geometry, etc.), the controller (type and gains/parameters) used to effect movements, as well as the sensory-data (vision, dynamic/static measures, etc.) needed for monitoring and control, as well as other software-loop execution-related processes (communications, error-handling, etc.).

Conversion takes all linked MM data, from one or more databases, and by way of a software engine, termed the Actuator Control Instruction Code Translator & Generator, thereby creating machine-executable (low-level) instruction code for each actuator ($A_1$ thru $A_n$) controller (which themselves run a high-bandwidth control loop in position/velocity and/or force/torque) for each time-period ($t_1$ thru $t_m$), allowing for the robot system to execute commanded instruction in a continuous set of nested loops.

Figure 115:
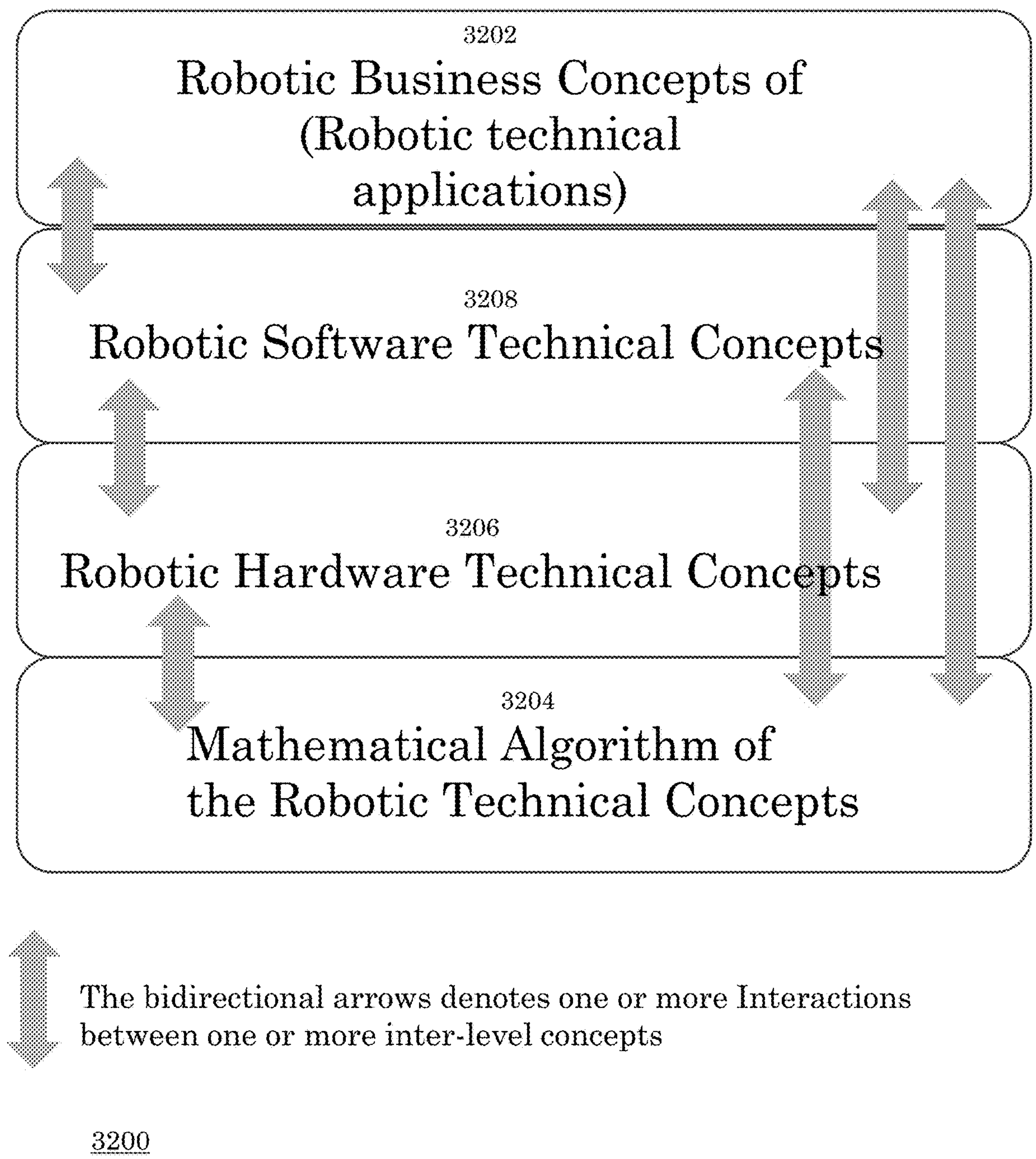
FIG. 115 is a block diagram illustrating the different levels of bidirectional abstractions between the robotic hardware technical concepts, the robotic software technical concepts, the robotic business concepts, and mathematical algorithms for carrying the robotic technical concepts in accordance with the present disclosure.

FIG. 115 is a block diagram illustrating one perspective on the different levels of bidirectional abstractions 3200 between the robotic hardware technical concepts 3206, the robotic software technical concepts 3208, the robotic business concepts 3202, and mathematical algorithms 3204 for carrying the robotic technical concepts. If the robotic concept of the present disclosure is viewed as vertical and horizontal concepts, the robotic business concept comprises business applications of the robotic kitchen at the top level 3202, mathematical algorithm 3204 of the robotic concept at the bottom level, and robotic hardware technical concepts 3206, and robotic software technical concepts 3208 between the robotic business concepts 3202 and mathematical algorithm 3204. Practically speaking, each of the levels in the robotic hardware technical concept, robotic software technical concept, mathematical algorithm, and business concepts interact with any of the levels bidirectionally as shown in FIG. 115. For example, a computer processor for processing software minimanipulations from a database in order to prepare a food dish by sending command instructions to the actuators for controlling the movements of each of the robotic elements on a robot to accomplish an optimal functional result in preparing the food dish. Details of the horizontal perspective of the robotic hardware technical concepts and robotic software technical concepts are described throughout the present disclosure, for example as illustrated in FIG. 100 through FIG. 114.

Figure 116:
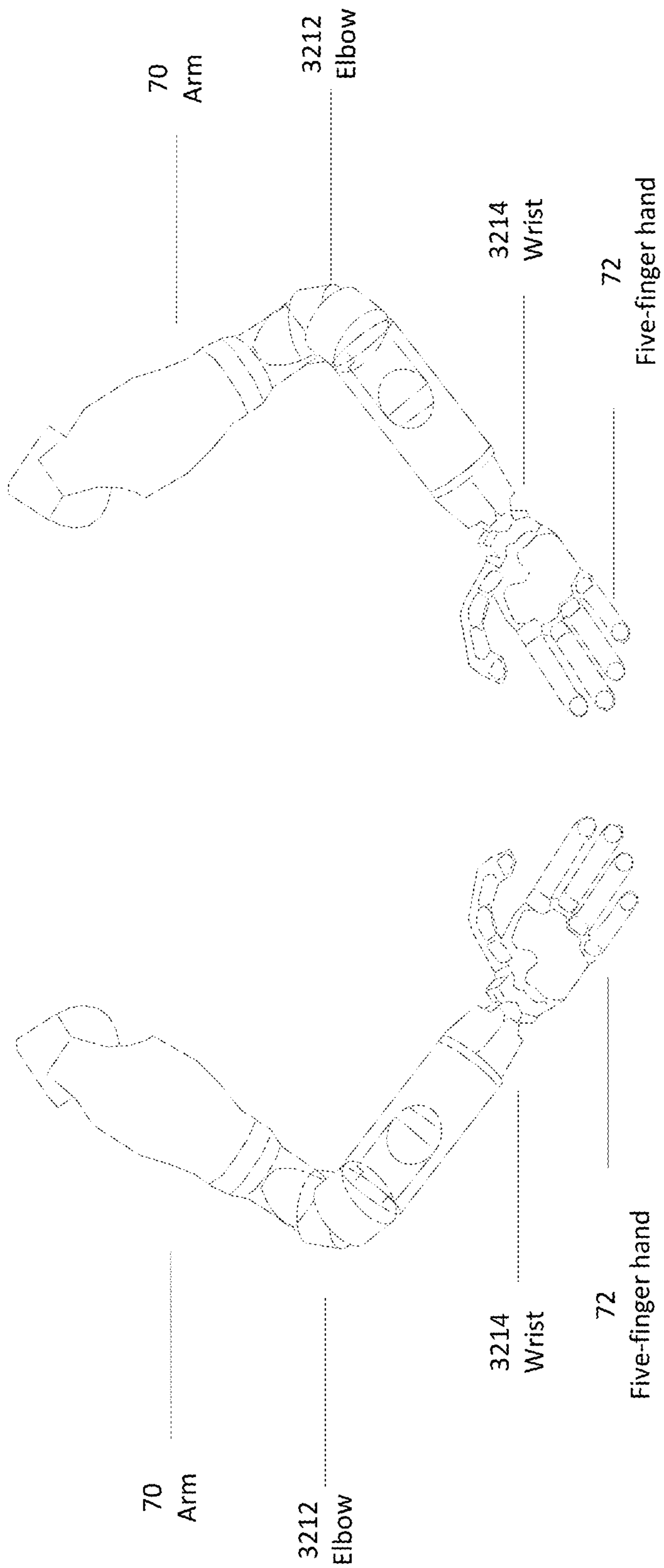
FIG. 116 is a block diagram illustrating a pair of robotic arms and hands, and each hand with five fingers in accordance with the present disclosure.

FIG. 116 is a block diagram illustrating a pair of robotic arms and five-fingered hands 3210. Each robotic arm 70 may be articulated at several joints such as the elbow 3212 and wrist 3214. Each hand 72 may have five fingers to replicate the motions and minimanipulations of a creator.

FIG. 117A is a diagram illustrating one embodiment of a humanoid type robot 3220. Humanoid robot 3220 may have a head 3222 with a camera to receive images of external environment and the ability to detect and detect target object's location, and movement. The humanoid robot 3220 may have a torso 3224 with sensors on body to detect body angle and motion, which may comprise a global positioning sensor or other locational sensor. The humanoid robot 3220 may have one or more dexterous hands 72, fingers and palm with a various sensors (laser, stereo cameras) incorporated into the hand and fingers. The hands 72 are capable of precise hold, grasp, release, finger pressing movements to perform subject expert human skills such as cooking, musical instrument playing, painting, etc. The humanoid robot 3220 may optionally comprise legs 3226 with an actuator on the legs to control speed of operation. Each leg 3226 may have a number of degrees of freedom (DOF) to perform human like walking running, and jumping movements. Similarly, the humanoid robot 3220 may have a foot 3228 with the capability to moving through a variety of terrains and environments.

Additionally, humanoid robot 3220 may have a neck 3230 with a number of DOF for forward/backward, up/down, left/right and rotation movements. It may have shoulder 3232 with a number of DOF for forward/backward, rotation movements, elbow with a number of DOF for forward/backward movements, and wrists 314 with a number of DOF for forward/backward, rotation movements. The humanoid robot 3220 may have hips 3234 with a number of DOF for forward/backward, left/right and rotation movements, knees 3236 with a number of DOF for forward/backward movements, and ankles 3236 with a number of DOF for forward/backward and left/right movements. The humanoid robot 3220 may house a battery 3238 or other power source to allow it to move untethered about its operational space. The battery 3238 may be rechargeable and may be any type of battery or other power source known.

FIG. 117B is a block diagram illustrating one embodiment of humanoid type robot 3220 with a plurality of gyroscope 3240 installed in the robot body in the vicinity or at the location of respective joints. As an orientation sensor, the rotatable gyroscope 3240 shows the different angles for the humanoid to make angular movements with high degree of complexity, such as stooping or sitting down. The set of gyroscopes 3240 provides a method and feedback mechanism to maintain dynamic stability by the whole humanoid robot, as well as individual parts of the humanoid robot 3220. Gyroscopes 3240 may provide real time output data, such as such as euler angles, attitude quaternion, magnetometer, accelerometer, gyro data, GPS altitude, position and velocity.

FIG. 117C is graphical diagram illustrating the creator recording devices on a humanoid, including a body sensing suit, an arm exoskeleton, head gear, and sensing glove. In order to capture a skill and record the human creator's movements, in an embodiment, the creator can wear a body sensing suit or exoskeleton 3250. The suit may include head gear 3252, extremity exoskeletons, such as arm exoskeleton 3254, and gloves 3256. The exoskeletons may be covered with a sensor network 3258 with any numbers of sensor and reference points. These sensors and reference points allow creator recording devices 3260 to capture the creator's movements from the sensor network 3258 as long as the creator remains within the field of the creator recording devices 3260. Specifically, if the creator moves his hand while wearing glove 3256, the position in 3D space with be captured by the numerous sensor data points D1, D2 . . . Dn. Because of the body suit 3250 or the head gear 3252, the creator's movement s are not limited to the head but encompass the entire creator. In this manner, each movement may be broken down and categorized as a minimanipulation as part of the overall skill.

FIG. 118 is a block diagram illustrating a robotic human-skill subject expert electronic IP minimanipulation library 2100. Subject/skill library 2100 comprises any number of minimanipulation skills in a file or folder structure. The library may be arranged in any number of ways including but not limited to, by skill, by occupation, by classification, by environment, or any other catalog or taxonomy. It may be categorized using flat files or in a relational manner and may comprise an unlimited number of folder, and subfolder and a virtually unlimited number of libraries and minimanipulations. As seen in FIG. 118, the library comprises several module IP human-skill replication libraries 56, 2102, 2104, 2106, 3270, 3272, 3274, covering topics such as human culinary skills 56, human painting skills 2102, human musical instrument skills 2104, human nursing skills 2106, human house keeping skills 3270, and human rehab/therapist skills 3272. Additionally and/or alternatively, the robotic human-skill subject matter electronic IP minimanipulation library 2100 may also comprise basic human motion skills such as walking, running, jumping, stair climbing, etc. Although not a skill per se, creating minimanipulation libraries of basic human motions 3274 allows a humanoid robot to function and interact in a real world environment in an easier more human like manner.

FIG. 119 is a block diagram illustrating the creation process of an electronic library of general minimanipulations 3280 for replacing human-hand-skill movements. In this illustration, one general minimanipulation 3290 is described with respect to FIG. 119. The minimanipulation MM1 3292 produces a functional result 3294 for that particular minimanipulation (e.g., successfully hitting a 1st object with a 2nd object). Each minimanipulation can be broken down into sub manipulations or steps, for example, MM1 3292 comprises one or more minimanipulations (sub-minimanipulations), a minimanipulation MM1.1 3296 (e.g., pick up and hold object 1), a minimanipulation MM1.2 3310 (e.g., pick up and hold a 2nd object), a minimanipulation MM1.3 3314 (e.g., strike the 1st object with the 2nd object), a minimanipulation MM1.4*n* 3318 (e.g., open the 1st object). Additional sub-minimanipulations may be added or subtracted that are suitable for a particular minimanipulation that achieves a particular functional result. The definition of a minimanipulation depends in part how it is defined and the granularity used to define such a manipulation, i.e., whether a particular minimanipulation embodies several sub-minimanipulations, or if what was characterized as a sub-minimanipulation may also be defined as a broader minimanipulation in another context. Each of the sub-minimanipulations has a corresponding functional result, where the sub-minimanipulation MM1.1 3296 obtains a sub-functional result 3298, the sub-minimanipulation MM1.2 3310 obtains a sub-functional result 3312, the sub-minimanipulation MM1.3 3314 obtains a sub-functional result 3316, and the sub-minimanipulation MM1.4*n* 3318 obtains a sub-functional result 3294. Similarly, the definition of a functional result depends in part how it is defined, whether a particular functional result embodies several functional results, or if what was characterized as a sub-functional-result may also be defined as a broader functional result is another context. Collectively, the sub-minimanipulation MM1.1 3296, the sub-minimanipulation MM1.2 3310, sub-minimanipulation MM1.3 3314, the sub-minimanipulation MM1.4*n* 3318 accomplishes the overall functional result 3294. In one embodiment, the overall functional result 3294 is the same as the functional result 3319 that is associated with the last sub-minimanipulation 3318.

Various possible parameters for each minimanipulation 1.1-1.*n* are tested to find the best way to execute a specific movement. For example minimanipulation 1.1 (MM1.1) may be holding an object or playing a chord on a piano. For this step of the overall minimanipulation 3290, all the various sub-minimanipulations for the various parameters are explored that complete step 1.1. That is, the different positions, orientations, and ways to hold the object, are tested to find an optimal way to hold the object. How does the robotic arm, hand or humanoid hold their fingers, palms, legs, or any other robotic part during the operation. All the various holding positions and orientations are tested. Next, the robotic hand, arm, or humanoid may pick up a second object to complete minimanipulation 1.2. The 2nd object, i.e., a knife may be picked up and all the different positions, orientations, and the way to hold the object may be tested and explored to find the optimal way to handle the object. This continues until minimanipulation 1.*n* is completed and all the various permutations and combinations for performing the overall minimanipulation are completed. Consequently, the optimal way to execute the mini-manipulation 3290 is stored in the library database of mini-manipulations broken down into sub-minimanipulations 1.1-1.*n*. The saved minimanipulation then comprise the best way to perform the steps, of the desired task, i.e., the best way to hold the first object, the best way to hold the 2nd object, the best way to strike the 1st object with the second object, etc. These top combinations are saved as the best way to perform the overall minimanipulation 3290.

To create the minimanipulation that results in the best way to complete the task, multiple parameter combinations are tested to identify an overall set of parameters that ensure the desired functional result is achieved. The teaching/learning process for the robotic apparatus 75 involves multiple and repetitive tests to identify the necessary parameters to achieve the desired final functional result.

These tests may be performed over varying scenarios. For example, the size of the object can vary. The location at which the object is found within the workspace, can vary. The second object may be at different locations. The minimanipulation must be successful in all of these variable circumstances. Once the learning process has been completed, results are stored as a collection of action primitives that together are known to accomplish the desired functional result.

FIG. 120 is a block diagram illustrating performing a task 3330 by robot by execution in multiple stages 3331-3333 with general minimanipulations. When action plans require sequences of minimanipulations as in FIG. 119, in one embodiment the estimated average accuracy of a robotic plan in terms of achieving its desired result is given by:

$$A(G, P) = 1 - \frac{1}{n} \sum_{n=1, \ldots n} \frac{|g_i - p_i|}{\max(|g_{i,t} - p_{i,t}|}$$

where G represents the set of objective (or "goal") parameters (1st through nth) and P represents the set of Robotic apparatus 75 parameters (correspondingly (1st through nth). The numerator in the sum represents the difference between robotic and goal parameters (i.e. the error) and the denominator normalizes for the maximal difference). The sum gives the total normalized cumulative error $$\left(\text{i.e. } \sum_{n=1, \ldots n} \frac{|g_i - p_i|}{\max(|g_{i,t} - p_{i,t}|}\right),$$

and multiplying by 1/n gives the average error. The complement of the average error (i.e. subtracting it from 1) corresponds to the average accuracy.

In another embodiment the accuracy calculation weighs the parameters for their relative importance, where each coefficient (each αi) represents the importance of the ith parameter, the normalized cumulative error is $$\sum_{n=1, \ldots n} \frac{\alpha_i |g - p_i|}{\max(|g_{i,t} - p_{i,t}|}$$

and the estimated average accuracy is given by:

$$A(G, P) = 1 - \left( \sum_{n=1, \ldots n} \frac{\alpha_i |g - p_i|}{\max(|g_{i,t} - p_{i,t}|} \right) \Big/ \sum_{i=1, \ldots n} \alpha_i$$

In FIG. 120, task 3330 may be broken down into stages which each need to be completed prior to the next stage. For example, stage 3331 must complete the stage result 3331*d* before advancing onto stage 3332. Additionally and/or alternatively, stages 3331 and 3332 may proceed in parallel. Each minimanipulation can be broken down into a series of action primitives which may result in a functional result for example, in stage $S_1$ all the action primitives in the first defined minimanipulation 3331*a* must be completed yielding in a functional result 3331*a*' before proceeding to the second predefined minimanipulation 3331*b* (MM1.2). This in turn yields the functional result 3331*b*' etc. until the desired stage result 3331*d* is achieved. Once stage 1 is completed, the task may proceed to stage $S_2$ 3332. At this point, the action primitives for stage $S_2$ are completed and so on until the task 3330 is completed. The ability to preform the steps in a repetitive fashion yields a predictable and repeatable way to perform the desired task.

FIG. 121 is a block diagram illustrating the real-time parameter adjustment during the execution phase of minimanipulations in accordance with the present disclosure. The performance of a specific task may require adjustments to the stored minimanipulations to replicate actual human skills and movements. In an embodiment, the real-time adjustments may be necessary to address variations in objects. Additionally and or alternatively, adjustments may be required to coordinate left and right hand, arm, or other robotic parts movements. Further, variations in an object requiring a minimanipulation in the right hand may affect the minimanipulation required by the left hand or palm. For example, if a robotic hand is attempting to peel fruit that it grasps with the right hand, the minimanipulations required by the left hand will be impacted by the variations of the object held in the right hand. As seen in FIG. 120, each parameter to complete the minimanipulation to achieve the functional result may require different parameters for the left hand. Specifically, each change in a parameter sensed by the right hand as a result of a parameter in the first object make impact the parameters used by the left hand and the parameters of the object in the left had.

In an embodiment, in order to complete minimanipulations 1-.1-1.3, to yield the functional result, right hand and left hand must sense and receive feedback on the object and the state change of the object in the hand or palm, or leg. This sensed state change may result in an adjustment to the parameters that comprise the minimanipulation. Each change in one parameter may yield in a change to each subsequent parameter and each subsequent required minimanipulation until the desired tasks result is achieved.

FIG. 122 is a block diagram illustrating a set of minimanipulations for making sushi in accordance with the present disclosure. As can be seen from the diagrams of FIG. 122, the functional result of making Nigiri Sushi can be divided into a series of minimanipulations 3351-3355. Each minimanipulation can be broken down further into a series of sub minimanipulations. In this embodiment, the functional result requires about five minimanipulations, which in turn may require additional sub-minimanipulations.

FIG. 123 is a block diagram illustrating a first minimanipulation 3351 of cutting fish in the set of minimanipulations for making sushi in accordance with the present disclosure. For each minimanipulation 3351*a* and 3351*b*, the time, position, and locations of standard ad non-standard objects must be captured and recorded. The initially captured values in the task may be captured in the tasks process or defined by a creator or by obtaining three-dimensional volume scanning of the real time process. In FIG. 122, the first minimanipulation, taking a piece of fish from a container and lying it on a cutting board requires the starting time and position and starting time for the left and right hand to remove the fish from the container and place it on the board. This requires a recording of finger position, pressure, orientation, and relationship to the other fingers, palm, and other hand to yield a coordinated movement. This also requires the determination of position and orientations of both standard and non-standard objects. For example, in this embodiment, the fish fillet is a non-standard object and may be different size, texture, and firmness weight from piece to piece. Its position within its storage container or location may vary and be non-standard as well. Standard objects may be a knife, its position and location, a cutting board, a container and their respective positions.

The second sub-minimanipulation in step 3351 may be 3351*b*. The step 3351*b* requires positioning the standard knife object in a correct orientation and applying the correct pressure, grasp, and orientation to slice the fish on the board. Simultaneously, the left hand, leg, pal, etc. is required to be performing coordinate steps to complement and coordinate the completion of the sub-minimanipulation. All these starting positions, times, and other sensor feedbacks and signals need to be captured and optimized to ensure a successful implementation of the action primitive to complete the sub-minimanipulation.

FIGS. 124-127 are block diagrams illustrating the second through fifth minimanipulations required to complete the task of making sushi, with minimanipulations 3352*a*, 3342*b* in FIG. 124, minimanipulations 3353*a*, 3353*b* in FIG. 125, minimanipulation 3354 in FIG. 126, and minimanipulation 3355 in FIG. 127. The minimanipulations to complete the functional task may require taking rice from a container, picking up a piece of fish, firming up the rice and fish into a desirable shape and pressing the fish to hug the rice to make the sushi in accordance with the present disclosure.

FIG. 128 is a block diagram illustrating a set of minimanipulations 3361-3365 for playing piano 3360 that may occur in any sequence or in any combination in parallel to obtain a functional result 3266. Tasks such as playing the piano may require coordination between the body, arms, hands, fingers, legs, and feet. All of these minimanipulations may be performed individually, collectively, in sequence, in series and/or in parallel.

The minimanipulations required to complete this task may be broken down into a series of techniques for the body and for each hand and foot. For example, there may be a series of right hand minimanipulations that successfully press and hold a series of piano keys according to playing techniques 1-n. Similarly, there may be a series of left hand minimanipulations that successfully press and hold a series of piano keys according to playing techniques 1-n. There may also be a series of minimanipulations identified to successfully press a piano pedal with the right or left foot. As will be understood by one skilled in the art, each minimanipulation for the right and left hands and feet, can be further broken down into sub-minimanipulations to yield the desired functional result, e.g. playing a musical composition on the piano.

FIG. 129 is a block diagram illustrating the first minimanipulation 3361 for the right hand and the second minimanipulation 3362 for the left hand of the set of minimanipulations that occur in parallel for playing piano from the set of minimanipulations for playing piano in accordance with the present disclosure. To create the minimanipulation library for this act, the time each finger starts and ends its pressing on the keys is captured. He piano keys may be defined as standard objects as they will not change from one occurrence to the next. Additionally, the number of pressing techniques for each time period (one time pressing key period, or holding time)—may be defined as a particular time cycle, where the time cycle could be the same time duration or different time durations.

FIG. 130 is a block diagram illustrating the third minimanipulation 3363 for the right foot and the fourth minimanipulation 3364 for the left foot of the set of minimanipulations that occur in parallel from the set of minimanipulations for playing piano in accordance with the present disclosure. To create the minimanipulation library for this act, the time each foot starts and ends its pressing on the pedals is captured. The Pedals may be defined as standard objects. The number of pressing techniques for each time period (one time pressing key period, or holding time)—may be defined as a particular time cycle, where the time cycle could be the same time duration or different time durations for each motion.

FIG. 131 is a block diagram illustrating the fifth minimanipulation 3365 that may be required for playing a piano. The minimanipulation illustrated in FIG. 131 relates to the body movement that may occur in parallel with one or more other minimanipulations from the set of minimanipulations for playing piano in accordance with the present disclosure. For example, the initial starting and ending positions of the body may be captured as well as interim positions captured as periodic intervals.

FIG. 132 is a block diagram illustrating a set of walking minimanipulations 3370 that can occur in any sequence, or in any combination in parallel, for a humanoid to walk in accordance with the present disclosure. As seen the minimanipulation illustrated in FIG. 132 may be divided into a number of segments. Segment 3371, the stride, 3372, the squash, segment 3373 the passing, segment 3374 the stretch and segment 3375, the stride with the other leg. Each segment is an individual minimanipulation that results in the functional result of the humanoid not falling down when walking on an uneven floor, or stairs, ramps or slopes. Each of the individual segments or minimanipulations may be described by how the individual portions of the leg and foot move during the segment. These individual minimanipulations may be captured, programmed, or taught to the humanoid and each may be optimized based on the specific circumstances. In an embodiment, the minimanipulation library is captured from monitoring a creator. In another embodiment, the minimanipulation is created from a series of commands.

FIG. 133 is a block diagram illustrating the first minimanipulation of stride 3371 pose with the right and left leg in the set of minimanipulations for humanoid to walk in accordance with the present disclosure. As can be seen, the left and right leg, knee, and foot are arranged in a XYZ initial target position. The position may be based on the distance to the ground between the foot and the ground, the angle of the knee with respect to the ground and the overall height of the leg depending on the stepping technique and any potential obstacles. These initial starting parameters are recorded or captured for both the right and left, leg, knee and foot at the start of the minimanipulation. The minimanipulation is created and all the interim positions to complete the stride for minimanipulation 3371 are captured. Additional information, such as body position, center of gravity, and joint vectors may be required to be captured to insure the complete data required to complete the minimanipulation.

FIG. 134 is a block diagram illustrating the second minimanipulation of squash 3372 pose with the right and left leg in the set of minimanipulations for humanoid to walk in accordance with the present disclosure. As can be seen, the left and right leg, knee, and foot are arranged in a XYZ initial target position. The position may be based on the distance to the ground between the foot and the ground, the angle of the knee with respect to the ground and the overall height of the leg depending on the stepping technique and any potential obstacles. These initial starting parameters are recorded or captured for both the right and left, leg, knee and foot at the start of the minimanipulation. The minimanipulation is created and all the interim positions to complete the squash for minimanipulation 3372 are captured. Additional information, such as body position, center of gravity, and joint vectors may be required to be captured to insure the complete data required to complete the minimanipulation.

FIG. 135 is a block diagram illustrating the third minimanipulation of passing 3373 pose with the right and left leg in the set of minimanipulations for humanoid to walk in accordance with the present disclosure. As can be seen, the left and right leg, knee, and foot are arranged in a XYZ initial target position. The position may be based on the distance to the ground between the foot and the ground, the angle of the knee with respect to the ground and the overall height of the leg depending on the stepping technique and any potential obstacles. These initial starting parameters are recorded or captured for the right and left, leg, knee and foot at the start of the minimanipulation. The minimanipulation is created and all the interim positions to complete the passing for minimanipulation 3373 are captured. Additional information, such as body position, center of gravity, and joint vectors may be required to be captured to insure the complete data required to complete the minimanipulation.

FIG. 136 is a block diagram illustrating the fourth minimanipulation of stretch pose 3374 pose with the right and left leg in the set of minimanipulations for humanoid to walk in accordance with the present disclosure. As can be seen, the left and right leg, knee, and foot are arranged in a XYZ initial target position. The position may be based on the distance to the ground between the foot and the ground, the angle of the knee with respect to the ground and the overall height of the leg depending on the stepping technique and any potential obstacles. These initial starting parameters are recorded or captured for both the right and left, leg, knee and foot at the start of the minimanipulation. The minimanipulation is created and all the interim positions to complete the stretch for minimanipulation 3374 are captured. Additional information, such as body position, center of gravity, and joint vectors may be required to be captured to insure the complete data required to complete the minimanipulation.

FIG. 137 is a block diagram illustrating the fifth minimanipulation of stride 3375 pose (for the other leg) with the right and left leg in the set of minimanipulations for humanoid to walk in accordance with the present disclosure. As can be seen, the left and right leg, knee, and foot are arranged in a XYZ initial target position. The position may be based on the distance to the ground between the foot and the ground, the angle of the knee with respect to the ground and the overall height of the leg depending on the stepping technique and any potential obstacles. These initial starting parameters are recorded or captured for both the right and left, leg, knee and foot at the start of the minimanipulation. The minimanipulation is created and all the interim positions to complete the stride for the other foot for minimanipulation 3375 are captured. Additional information, such as body position, center of gravity, and joint vectors may be required to be captured to insure the complete data required to complete the minimanipulation.

FIG. 138 is a block diagram illustrating a robotic nursing care module 3381 with a three-dimensional vision system in accordance with the present disclosure. Robotic nursing care module 3381 may be any dimension and size and may be designed for a single patient, multiple patients, patients needing critical care, or patients needing simple assistance. Nursing care module 3381 may be integrated into a nursing facility or may be installed in an assisted living, or home environment. Nursing care module 3381 may comprise a three-dimensional (3D) vision system, medical monitoring devices, computers, medical accessories, drug dispensaries or any other medical or monitoring equipment. Nursing care module 3381 may comprise other equipment and storage 3382 for any other medical equipment, monitoring equipment robotic control equipment. Nursing care module 3381 may house one or more sets of robotic arms, and hands or may include robotic humanoids. The Robotic arms may be mounted on a rail system in the top of the nursing care module 3381 or may be mounted from the walls, or floor. Nursing care module 3381 may comprise a 3D vision system 3383 or any other sensor system which may track and monitor patient and/or robotic movement within the module.

FIG. 139 is a block diagram illustrating a robotic nursing care module 3381 with standardized cabinets 3391 in accordance with the present disclosure. As shown in FIG. 138, nursing care module 3381 comprises 3D vision system 3383, and may further comprise cabinets 3391 for storing mobile medical carts with computers, and/or in imaging equipment, that can be replace by other standardized lab or emergency preparation carts. Cabinets 3391 may be used for housing and storing other medical equipment, which has been standardized for robotic use, such as wheelchairs, walkers, crutches, etc. Nursing care module 3381 may house a standardized bed of various sizes with equipment consoles such as headboard console 3392. Headboard console 3392 may comprise any accessory found in a standard hospital room including but not limited to medical gas outlets, direct, indirect, nightlight, switches, electric sockets, grounding jacks, nurse call buttons, suction equipment, etc.

FIG. 140 is a block diagram illustrating a back view of a robotic nursing care module 3381 with one more standardized storages 3402, a standardized screen 3403, a standardized wardrobe 3404 in accordance with the present disclosure. In addition, FIG. 139 depicts railing system 3401 for robot arms/hands moving and storage/charging dock for robot arms/hands when in manual mode. Railing system 3401 may allow for horizontal movement in any direction and left/right. Front and back. It may be any type of rail or track and may accommodate one or more robot arms and hands. Railing system 3401 may incorporate power and control signals and may include wiring and other control cables necessary to control and or manipulate the installed robotic arms. Standardized storages 3402 may be any size and may be located in any standardized position within module 3381. Standardized storage 3402 may be used for medicines, medical equipment, and accessories or may be use for other patient items and/or equipment. Standardized screen 3403 may be a single or multiple multi purpose screens. It may be utilized for internet usage, equipment monitoring, entertainment, video conferencing, etc. There may be one or more screens 3403 installed within a nursing module 3381. Standardized wardrobe 3404 may be used to house a patient's personal belongings or may be used to store medical or other emergency equipment. Optional module 3405 may be coupled to or otherwise co-located with standardized nursing module 3381 and may include a robotic or manual bathroom module, kitchen module, bathing module or any other configured module that may be required to treat or house a patient within the standard nursing suite 3381. Railing systems 3401 may connect between modules or may be separate and may allow one or more robotic arms to traverse and/or travel between modules.

FIG. 141 is a block diagram illustrating a robotic nursing care module 3381 with a telescopic lift or body 3411 with a pair of robotic arms 3412 and a pair of robotic hands 3413 in accordance with the present disclosure. Robot arms 3412 are attached to the shoulder 3414 with a telescopic lift 3411 that moves vertically (up and down) and horizontally (left and right), as a way to move robotic arms 3412 and hands 3413. The telescopic lift 3411 can be moved as a shorter tube or a longer tube or any other rail system for extending the length of the robotic arms and hands. The arm 1402 and shoulder 3414 can move along the rail system 3401 between any positions within the nursing suite 3381. The robotic arms 3412, hands 3413 may move along the rail 3401 and lift system 3411 to access any point within the nursing suite 3381. In this manner, the robotic arms and hands can access, the bed, the cabinets, the medical carts for treatment or the wheel chairs. The robotic arms 3412 and hands 3413 in conjunction with the lift 3411 and rail 3401 may aide to lift a patient to sit a sitting or standing position or may assist placing the patient in a wheel chair or other medical apparatus.

FIG. 142 is a block diagram illustrating a first example of executing a robotic nursing care module with various movements to aid an elderly patient in accordance with the present disclosure. Step (a) may occur at a predetermined time or may be initiated by a patient. Robot arms 3412 and robotic hands 3413 take the medicine or other test equipment from the designated standardized location (e.g. storage location 3402). During step (b) robot arms 3412, hands 3413, and shoulders 3414 moves to the bed via rail system 3401 and to the lower level and may turn to face the patient in the bed. At step (c) robot arms 3412 and hands 3413 perform the programmed/required minimanipulation of giving medicine to a patient. Because the patient may be moving and is not standardized, 3D real time adjustment based on patient, standard/non standard objects position, orientation may be utilized to ensure successful a result. In this manner, the real time 3D visual system allows for adjustments to the otherwise standardized minimanipulations.

FIG. 143 is a block diagram illustrating a second example of executing a robotic nursing care module with the loading and unloading a wheel chair in accordance with the present disclosure. In position, (a) robot arms 3412 and hands 3413 perform minimanipulations of moving and lifting the senior/patient from a standard object, such as the wheel chair, and placing them on another standard object, such as laying them on the bed, with 3D real time adjustment based on patient, standard/non standard objects position, orientation to ensure successful result. During step (b) the robot arms/hands/shoulder may turn and move the wheelchair back to the storage cabinet after the patient has been removed. Additionally and/or alternatively, if there is more then one set of arms/hands, step (b) may be performed by one set, while step (a) is being completed. Cabinet. During step (c) the robot arms/hands open the cabinet door (standard object), push the wheelchair back in and close the door.

FIG. 144 depicts a humanoid robot 3500 serving as a facilitator between persons A 3502 and B 3504. In this embodiment, the humanoid robot acts as a real time communications facilitator between humans that are no co-located. In the embodiment, person A 3502 and B 3504 may be remotely located from each other. They may be located in different rooms within the same building, such as an office building or hospital, or may be located in different countries. Person A 3502 maybe co-located with a humanoid robot (not shown) or alone. Person B 3504 may also be co-located with a robot 3500. During communications between person A 3502 and person B 3504, the humanoid robot 3500 may emulate the movements and behaviors of person A 3502. Person A 3502 may be fitted with a garment or suit that contains sensors that translate the motions of person A 3502 into the motions of humanoid robot 3500. For example, in an embodiment, person A could wear a suit equipped with sensors that detect hand, torso, head, leg arms and feet movement. When Person B 3504 enters the room at the remote location person A 3502 may rise from a seated position and extend a hand to shake hands with person B 3504. Person A's 3502 movements are captured by the sensors and the information may be conveyed through wired or wireless connections to a system coupled to a wide area network, such as the internet. That sensor data may then be conveyed in real time or near real time via a wired or wireless connection to 3500 regardless of its physical location with respect to Person A 3500, based on the received sensor data will emulate the movements of Person A 3502 in the presence of person B 3504. In an embodiment, Person A 3502 and person B 3504 can shake hands via humanoid robot 3500. In this manner, person B 3504 can feel the same, grip positioning, and alignment of person A's hand through the robotic hand of humanoid robot's 3500 hand. As will be appreciated by those skilled in the art, Humanoid robot 3500 is not limited to shaking hands and may be used for its vision, hearing, speech or other motions. It may be able to assist Person B 3504 in any way that person A could accomplish if person A 3502 were in the room with person B 3504. In one embodiment, the humanoid robot 3500 emulate person A's 3502 movements by minimanipulations for person B to feel the sensation of Person A 3502.

FIG. 145 depicts a humanoid robot 3500 serving as a therapist 3508 on person B 3504 while under the direct control of person A 3502. In this embodiment, the humanoid robot 3500 acts as a therapist for person B based on actual real time or captured movements of person A. In an embodiment, person A 3502 may be a therapist and person B 3504 a patient. In an embodiment, person A performs a therapy session on person B while wearing a sensor suit. The therapy session may be captured via the sensors and converted into a minimanipulation library to be used later by humanoid robot 3500. In an alternative embodiment, person A 3502 and person B 3504 may be remotely located from each other. Person A, the therapist may perform therapy on a stand in patient or an anatomically correct humanoid figure while wearing a sensor suit. Person A's 3502 movements may be captured by the sensors and transmitted to humanoid robot 3500 via recording and network equipment 3506. These captured and recorded movements are then conveyed to humanoid robot 3500 to apply to person B 3504. In this manner, person B may receive therapy from the humanoid robot 3500 based on pre-recorded therapy sessions performed either by person A or in real time remote from person A 3502. Person B will feel the same sensation of Person A's 3502 (therapist) hand (e.g., strong grip of soft grip) through the humanoid robot's 3500's hand. The therapy can be scheduled to perform on same patient in a different time/day (e.g. every other day) or to different patient (person C, D) with each one having his/her pre-recorded program file. In one embodiment, the humanoid robot 3500 emulate person A's 3502 movements by minimanipulations for person B 3504 for replacing the therapy session.

FIG. 146 is a block diagram illustrating the first embodiment in the placement of motors relative to the robotic hand and arm with full torque require to move the arm, while FIG. 147 is a block diagram illustrating the second embodiment in the placement of motors relative to the robotic hand and arm with a reduced torque require to move the arm. A challenge in robotic design is to minimize mass and therefore weight, especially at the extremities of robotic manipulators (robotic arms) where it requires the maximal force to move and generates the maximal torque on the overall system. Electrical motors are a large contributor to the weight at the extremities of manipulators. The disclosure and design of new lighter-weight powerful electric motors is one way to alleviate the problem. Another way, the preferred way given current motor technology, is to change the placement of the motors so that they are as far away as possible from the extremities, but yet transmit the movement energy to the robotic manipulator at the extremity.

One embodiment requires placing a motor 3510 that controls the position of a robotic hand 72 not at the wrist where it would normally be placed in proximity of the hand, but rather further up in the robotic arm 70, preferentially just below the elbow 3212. In that embodiment the advantage of the motor placement closer to the elbow 3212 can be calculated as follows, starting with the original torque on the hand 72 caused by the weight of the hand.

$$T_{original}(\text{hand})=(w_{hand}+w_{motor})d_h(\text{hand,elbow})$$

where weight $w_i=gm_i$ (gravitational constant g times mass of object i), and horizontal distance $d_h$=length(hand, elbow) cos $\theta_v$ for the vertical angle theta. However, if the motor is placed near (epsilon away from the joint), then the new torque is:

$$T_{new}(\text{hand})=(w_{hand})d_h(\text{hand,elbow})+(w_{motor})\epsilon_h$$

Since the motor 3510 next to the elbow-joint 3212 the robotic arm contributes only epsilon-distance to the torque the torque in the new system is dominated by the weight of the hand, including whatever the hand may be carrying. The advantage of this new configuration is that the hand may lift greater weight with the same motor since the motor itself contributes very little to the torque.

A skilled artisan will appreciate the advantage of this aspect of the disclosure, and would also realize that a small corrective factor is needed to account for the mass of the device used to transmit the force exerted by the motor to the hand—such a device could be a set of small axels. Hence, the full new torque with this small corrective factor would be:

$$T_{new}(\text{hand})=(w_{hand})d_h(\text{hand,elbow})+(w_{motor})\epsilon_h+\tfrac{1}{2}w_{axel}d_h(\text{hand,elbow})$$

where the weight of the axel exerts half-torque since its center of gravity is half way between the hand and the elbow. Typically the weight of the axels is much less than the weight of the motor.

FIG. 148A is a pictorial diagrams illustrating robotic arms extending from an overhead mount for use in a robotic kitchen. As will be appreciated, the robotic arms may traverse in any direction along the overhead track and may be raised and lowered in order to perform the required minimanipulations.

FIG. 148B is an overhead pictorial diagrams illustrating robotic arms extending from an overhead mount for use in a robotic kitchen. As seen in FIGS. 148A-B, the placement of equipment, may be standardized. Specifically, in this embodiment, the oven 1316, cooktop 3520, sink 1308, and dishwasher 356 are located such that the robotic arms and hands know their exact location within the standardized kitchen.

FIG. 149A is a pictorial diagrams illustrating robotic arms extending from an overhead mount for use in a robotic kitchen. FIG. 149B is a top view of the embodiment depicted in FIG. 149A. FIGS. 149A-B depict an alternative embodiment of the essential kitchen layout depicted in FIGS. 148A-B. In this embodiment, a "lift oven" 1491, is used. This allows for more space on the worktop and on surrounding surfaces to hang standardized objects containers. It may have the same dimensions as the kitchen module depicted in FIGS. 149A-B.

FIG. 150A is a pictorial diagrams illustrating robotic arms extending from an overhead mount for use in a robotic kitchen. FIG. 150B is a top view of the embodiment depicted in FIG. 150A. In this embodiment, the same external dimension are maintained as the kitchen module depicted in FIGS. 147A-B and 148A-B but with the lift oven 3522 installed. Additionally, in this embodiment, additional "sliding storages" 3524 and 3526 on both side are installed. A customized fridge (not shown) can be installed in one of these "sliding storages" 3524 and 3526.

FIG. 151A is a pictorial diagrams illustrating robotic arms extending from an overhead mount for use in a robotic kitchen. FIG. 151B is an overhead pictorial diagrams illustrating robotic arms extending from an overhead mount for use in a robotic kitchen. IN an embodiment, sliding storage compartments may be included in the kitchen module. As illustrated in FIGS. 151A-B, "sliding storages" 3524 may be installed on both side of the kitchen module. In this embodiment, the overall dimensions remain the same as those depicted in FIGS. 148-150. In an embodiment, a customized refrigerator may be installed in one of these "sliding storages" 3524. As will be appreciated by those skilled in the art, there are many layouts and many embodiments that may be implemented for any standardized robotic module. These variations are not limited to kitchens, or patient care facilities, but may also be used for construction, manufacturing, assembly, food production, etc., without departing from the spirit of the disclosure.

FIGS. 152-161 are pictorial diagrams of the various embodiments of robotic gripping options in accordance with the present disclosure. FIGS. 162A-S are pictorial diagrams illustrating various cookware utensils with standardized handles suitable for the robotic hands. In an embodiment, kitchen handle 580 is designed to be used with the robotic hand 72. One or more ridges 580-1 are placed to allow the robotic hand to grasp the standardized handle in the same position every time and to minimize slippage and enhance grasp. The design of the kitchen handle 580 is intended to be universal (or standardized) so that the same handle 580 can attach to any type of kitchen utensils or other type of tool, e.g. a knife, a medical test probe, a screwdriver, a mop, or other attachment that the robotic hand may be required to grasp. Other types of standardized (or universal) handles may be designed without departing from the spirit of the present disclosure.

FIG. 163 is a pictorial diagram of a blender portion for use in the robotic kitchen. As will be appreciated by those skilled in the art, any number of tool, equipment or appliances may be standardized and designed for use and control by the robotic hands and arms to perform any number of tasks. Once a minimanipulation is created for the operation of any tool or piece of equipment, the robotic hands or arms may repeatedly and consistently use the equipment in a uniform and reliable manner.

FIGS. 164A-C are pictorial diagrams illustrating the various kitchen holders for use in the robotic kitchen. Any one or all of them may be standardized and adopted for use in other environments. As will be appreciated, medical equipment, such as tape dispensers, flasks, bottles, specimen jars, bandage containers, etc. may be designed and implemented for use with the robotic arms and hands. FIGS. 165A-V are block diagram illustrating examples of manipulations but do not limit the present disclosure.

One embodiment of the present disclosure illustrates a universal android-type robotic device that comprises the following features or components. A robotic software engine, such as the robotic food preparation engine 56, is configured to replicate any type of human hands movements and products in an instrumented or standardized environment. The resulting product from the robotic replication can be (1) physical, such as a food dish, a painting, a work of art, etc., and (2) non-physical, such as the robotic apparatus playing a musical piece on a musical instrument, a health care assistant procedure, etc.

Several significant elements in the universal android-type (or other software operating systems) robotic device may include some or all of the following, or in combination with other features. First, the robotic operating or instrumented environment operates a robotic device providing standardized (or "standard") operating volume dimensions and architecture for Creator and Robotic Studios. Second, the robotic operating environment provides standardized position and orientation (xyz) for any standardized objects (tools, equipment, devices, etc.) operating within the environment. Third, the standardized features extend to, but are not limited by, standardized attendant equipment set, standardized attendant tools and devices set, two standardized robotic arms, and two robotic hands that closely resemble functional human hands with access to one or more libraries of minimanipulations, and standardized three-dimensional (3D) vision devices for creating dynamic virtual 3D-vision model of operation volume. This data can be used for hand motion capturing and functional result recognizing. Fourth, hand motion gloves with sensors are provided to capture precise movements of a creator. Fifth, the robotic operating environment provides standardized type/volume/size/weight of the required materials and ingredients during each particular (creator) product creation and replication process. Sixth, one or more types of sensors are use to capture and record the process steps for replication.

Software platform in the robotic operating environment includes the following subprograms. The software engine (e.g., robotic food preparation engine 56) captures and records arms and hands motion script subprograms during the creation process as human hands wear gloves with sensors to provide sensory data. One or more minimanipulations functional library subprograms are created. The operating or instrumented environment records three-dimensional dynamic virtual volume model subprogram based on a timeline of the hand motions by a human (or a robot) during the creation process. The software engine is configured to recognize each functional minimanipulation from the library subprogram during a task creation by human hands. The software engine defines the associated minimanipulations variables (or parameters) for each task creation by human hands for subsequent replication by the robotic apparatus. The software engine records sensor data from the sensors in an operating environment, which quality check procedure can be implemented to verify the accuracy of the robotic execution in replicating the creator's hand motions. The software engine includes an adjustment algorithms subprogram for adapting to any non-standardized situations (such as an object, volume, equipment, tools, or dimensions), which make a conversion from non-standardized parameters to standardized parameters to facilitate the execution of a task (or product) creation script. The software engine stores a subprogram (or sub software program) of a creator's hand motions (which reflect the intellectual property product of the creator) for generating a software script file for subsequent replication by the robotic apparatus. The software engine includes a product or recipe search engine to locate the desirable product efficiently. Filters to the search engine are provided to personalize the particular requirements of a search. An e-commerce platform is also provided for exchanging, buying, and selling any IP script (e.g., software recipe files), food ingredients, tools, and equipment to be made available on a designated website for commercial sale. The e-commerce platform also provides a social network page for users to exchange information about a particular product of interest or zone of interest.

One purpose of the robotic apparatus replicating is to produce the same or substantially the same product result, e.g., the same food dish, the same painting, the same music, the same writing, etc. as the original creator through the creator's hands. A high degree of standardization in an operating or instrumented environment provides a framework, while minimizing variance between the creator's operating environment and the robotic apparatus operating environment, which the robotic apparatus is able to produce substantially the same result as the creator, with some additional factors to consider. The replication process has the same or substantially the same timeline, with preferable the same sequence of minimanipulations, the same initial start time, the same time duration and the same ending time of each minimanipulation, while the robotic apparatus autonomously operates at the same speed of moving an object between minimanipulations. The same task program or mode is used on the standardized kitchen and standardized equipment during the recording and execution of the minimanipulation. A quality check mechanism, such as a three-dimensional vision and sensors, can be used to minimize or avoid any failed result, which adjustments to variables or parameters can be made to cater to non-standardized situations. An omission to use a standardized environment (i.e., not the same kitchen volume, not the same kitchen equipment, not the same kitchen tools, and not the same ingredients between the creator's studio and the robotic kitchen) increases the risk of not obtaining the same result when a robotic apparatus attempts to replicate a creator's motions in hopes of obtaining the same result.

The robotic kitchen can operate in at least two modes, a computer mode and a manual mode. During the manual mode, the kitchen equipment includes buttons on an operating console (without the requirement to recognize information from a digital display or without the requirement to input any control data through touchscreen to avoid any entering mistake, during either recording or execution). In case of touchscreen operation, the robotic kitchen can provide a three-dimensional vision capturing system for recognizing current information of the screen to avoid incorrect operation choice. The software engine is operable with different kitchen equipment, different kitchen tools, and different kitchen devices in a standardized kitchen environment. A creator's limitation is to produce hand motions on sensor gloves that are capable of replication by the robotic apparatus in executing minimanipulations. Thus, in on embodiment, the library (or libraries) of minimanipulations that are capable of execution by the robotic apparatus serves as functional limitations to the creator's motion movements. The software engine creates an electronic library of three-dimensional standardized objects, including kitchen equipment, kitchen tools, kitchen containers, kitchen devices, etc. The pre-stored dimensions and characteristics of each three-dimensional standardized object conserve resources and reduce the amount of time to generate a three-dimensional modeling of the object from the electronic library, rather than having to create a three-dimensional modeling in real time. In one embodiment, the universal android-type robotic device is capable to create a plurality of functional results. The functional results make success or optimal results from the execution of minimanipulations from the robotic apparatus, such as the humanoid walking, the humanoid running, the humanoid jumping, the humanoid (or robotic apparatus) playing musical composition, the humanoid (or robotic apparatus) painting a picture, and the humanoid (or robotic apparatus) making dish. The execution of minimanipulations can occur sequentially, in parallel, or one prior minimanipulation must be completed before the start of the next minimanipulation. To make humans more comfortable with a humanoid, the humanoid would make the same motions (or substantially the same) as a human and at a pace comfortable to the surrounding human(s). For example, if a person likes the way that a Hollywood actor or a model walks, the humanoid can operate with minimanipulations that exhibits the motion characteristics of the Hollywood actor (e.g., Angelina Jolie). The humanoid can also be customized with a standardized human type, including skin-looking cover, male humanoid, female humanoid, physical, facial characteristics, and body shape. The humanoid covers can be produced using three-dimensional printing technology at home.

One example operating environment for the humanoid is a person's home; while some environments are fixed, others are not. The more that the environment of the house can be standardized, the less risk in operating the humanoid. If the humanoid is instructed to bring a book, which does not relate to a creator's intellectual property/intellectual thinking (IP), it requires a functional result without the IP, the humanoid would navigate the pre-defined household environment and execute one or more minimanipulations to bring the book and give the book to the person. Some three-dimensional objects, such as a sofa, have been previously created in the standardized household environment when the humanoid conducts its initial scanning or perform three-dimensional quality check. The humanoid may necessitate creating a three-dimensional modeling for an object that the humanoid does not recognized or that was not previously defined.

Sample types of kitchen equipment are illustrated as Table A in FIGS. 166A-L, which include kitchen accessories, kitchen appliances, kitchen timers, thermometers, mills for spices, measuring utensils, bowls, sets, slicing and cutting products, knives, openers, stands and holders, appliances for peeling and cutting, bottle caps, sieves, salt and pepper shakers, dish dryers, cutlery accessories, decorations and cocktails, molds, measuring containers, kitchen scissors, utensil for storages, potholders, railing with hooks, silicon mats, graters, presses, rubbing machines, knife sharpeners, breadbox, kitchen dishes for alcohol, tableware, utensils for table, dishes for tea, coffee, dessert, cutlery, kitchen appliances, children's dishes, a list of ingredient data, a list of equipment data, and a list of recipe data.

FIGS. 167A-167V illustrate sample types of ingredients in Table B, including meat, meat products, lamb, veal, beef, pork, birds, fish, seafood, vegetables, fruits, grocery, milk products, eggs, mushrooms, cheese, nuts, dried fruits, beverages, alcohol, greens, herbs, cereals, legumes, flours, spices, seasonings, and prepared products.

Sample lists of food preparation, methods, equipment, and cuisine are illustrated as Table C in FIGS. 168A-168Z, with a variety of sample bases illustrated in FIG. 169A-Z15. FIGS. 170A-170C illustrate sample types of cuisine and food dishes in Table D. FIGS. 171A-E illustrate one embodiment of robotic food preparation system.

FIG. 172A-C illustrate sample minimanipulations for a robot making sushi, a robot playing piano, a robot moving a robot by moving from a first position (A-position) to a second position (B-position), a robot moving the robot by running from a first position to a second position, jumping from a first position to a second position, a humanoid taking a book from book shelf, a humanoid brings a bag from a first position to a second position, a robot opening a jar, and a robot putting food in a bowl for a cat to consume.

FIGS. 173A-I illustrate sample multi-level minimanipulations for a robot to perform measurement, lavage, supplemental oxygen, maintenance of body temperature, catheterization, physiotherapy, hygienic procedures, feeding, sampling for analyses, care of stoma and catheters, care of a wound, and methods of administering drugs.

FIG. 174 illustrate sample multi-level minimanipulations for a robot to perform intubation, resuscitation/cardiopulmonary resuscitation, replenishment of blood loss, hemostasis, emergency manipulation on trachea, fracture of bone, and wound closure (excluding sutures). A list of sample medical equipment and medical device list is illustrated FIG. 175.

FIGS. 176A-B illustrate a sample nursery service with minimanipulations. Another sample equipment list is illustrated in FIG. 177.

FIG. 178 is a block diagram illustrating an example of a computer device, as shown in 3624, on which computer-executable instructions to perform the methodologies discussed herein may be installed and run. As alluded to above, the various computer-based devices discussed in connection with the present disclosure may share similar attributes. Each of the computer devices or computers 16 is capable of executing a set of instructions to cause the computer device to perform any one or more of the methodologies discussed herein. The computer devices 16 may represent any or the entire server, or any network intermediary devices. Further, while only a single machine is illustrated, the term "machine" shall also be taken to include any collection of machines that individually or jointly execute a set (or multiple sets) of instructions to perform any one or more of the methodologies discussed herein. The example computer system 3624 includes a processor 3626 (e.g., a central processing unit (CPU), a graphics processing unit (GPU), or both), a main memory 3628 and a static memory 3630, which communicate with each other via a bus 3632. The computer system 3624 may further include a video display unit 3634 (e.g., a liquid crystal display (LCD)). The computer system 3624 also includes an alphanumeric input device 3636 (e.g., a keyboard), a cursor control device 3638 (e.g., a mouse), a disk drive unit 3640, a signal generation device 3642 (e.g., a speaker), and a network interface device 3648.

The disk drive unit 3640 includes a machine-readable medium 244 on which is stored one or more sets of instructions (e.g., software 3646) embodying any one or more of the methodologies or functions described herein. The software 3646 may also reside, completely or at least partially, within the main memory 3644 and/or within the processor 3626 during execution thereof the computer system 3624, the main memory 3628, and the instruction-storing portions of processor 3626 constituting machine-readable media. The software 3646 may further be transmitted or received over a network 3650 via the network interface device 3648.

While the machine-readable medium 3644 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any tangible medium that is capable of storing a set of instructions for execution by the machine and that cause the machine to perform any one or more of the methodologies of the present disclosure. The term "machine-readable medium" shall accordingly be taken to include, but not be limited to, solid-state memories, and optical and magnetic media.

In general, a robotic control platform comprises one or more robotic sensors; one or more robotic actuators; a mechanical robotic structure including at least a robotic head with mounted sensors on an articulated neck, two robotic arms with actuators and force sensors; an electronic library database, communicatively coupled to the mechanical robotic structure, of minimanipulations, each including a sequence of steps to achieve a predefined functional result, each step comprising a sensing operation or a parameterized actuator operation; and a robotic planning module, communicatively coupled to the mechanical robotic structure and the electronic library database, configured for combining a plurality of minimanipulations to achieve one or more domain-specific applications; a robotic interpreter module, communicatively coupled to the mechanical robotic structure and the electronic library database, configured for reading the minimanipulation steps from the minimanipulation library and converting to a machine code; and a robotic execution module, communicatively coupled to the mechanical robotic structure and the electronic library database, configured for executing the minimanipulation steps by the robotic platform to accomplish a functional result associated with the minimanipulation steps.

Another generalized aspect provides a humanoid having a robot computer controller operated by robot operating system (ROS) with robotic instructions comprises a database having a plurality of electronic minimanipulation libraries, each electronic minimanipulation library including a plurality of minimanipulation elements, the plurality of electronic minimanipulation libraries can be combined to create one or more machine executable application-specific instruction sets, the plurality of minimanipulation elements within a electronic minimanipulation library can be combined to create one or more machine executable application-specific instruction sets; a robotic structure having an upper body and a lower body connected to a head through an articulated neck, the upper body including torso, shoulder, arms and hands; and a control system, communicatively coupled to the database, a sensory system, a sensor data interpretation system, a motion planner, and actuators and associated controllers, the control system executing application-specific instruction sets to operate the robotic structure.

A further generalized computer-implemented method for operating a robotic structure through the use of one more controllers, one more sensors, and one more actuators to accomplish one or more tasks comprises providing a database having a plurality of electronic minimanipulation libraries, each electronic minimanipulation library including a plurality of minimanipulation elements, the plurality of electronic minimanipulation libraries can be combined to create one or more machine executable task-specific instruction sets, the plurality of minimanipulation elements within a electronic minimanipulation library can be combined to create one or more machine executable task-specific instruction sets; executing task-specific instruction sets to cause the robotic structure to perform a commanded task, the robotic structure having an upper body connected to a head through an articulated neck, the upper body including torso, shoulder, arms and hands; sending time-indexed high-level commands for position, velocity, force, and torque to the one or more physical portions of the robotic structure; and receiving sensory data from one or more sensors for factoring with the time-indexed high-level commands to generate low-level commands to control the one or more physical portions of the robotic structure.

Another generalized computer-implemented method for generating and executing a robotic task of a robot comprises generating a plurality minimanipulations in combination with parametric minimanipulation (MM) data sets, each minimanipulation being associated with at least one particular parametric MM data set which defines the required constants, variables and time-sequence profile associated with each minimanipulation; generating a database having a plurality of electronic minimanipulation libraries, the plurality of electronic minimanipulation libraries having MM data sets, MM command sequencing, one or more control libraries, one or more machine-vision libraries, and one or more inter-process communication libraries; executing high-level robotic instructions by a high-level controller for performing a specific robotic task by selecting, grouping and organizing the plurality of electronic minimanipulation libraries from the database thereby generating a task-specific command instruction set, the executing step including decomposing high-level command sequences, associated with the task-specific command instruction set, into one more individual machine-executable command sequences for each actuator of a robot; and executing low-level robotic instructions, by a low-level controller, for executing individual machine-executable command sequences for each actuator of a robot, the individual machine-executable command sequences collectively operating the actuators on the robot to carry out the specific robot task.

A generalized computer-implemented method for controlling a robotic apparatus, comprises composing one or more minimanipulation behavior data, each minimanipulation behavior data including one or more elementary minimanipulation primitives for building one or more ever-more complex behaviors, each minimanipulation behavior data having a correlated functional result and associated calibration variables for describing and controlling each minimanipulation behavior data; linking one or more behavior data to a physical environment data from one or more databases to generate a linked minimanipulation data, the physical environment data including physical system data, controller data to effect robotic movements, and sensory data for monitoring and controlling the robotic apparatus 75; and converting the linked minimanipulation (high-level) data from the one or more databases to a machine-executable (low-level) instruction code for each actuator ($A_1$ thru $A_n$,) controller for each time-period ($t_1$ thru $t_m$) to send commands to the robot apparatus for executing one or more commanded instructions in a continuous set of nested loops.

In any of these aspects, the following may be considered. The preparation of the product normally uses ingredients. Executing the instructions typically includes sensing properties of the ingredients used in preparing the product. The product may be a food dish in accordance with a (food) recipe (which may be held in an electronic description) and the person may be a chef. The working equipment may comprise kitchen equipment. These methods may be used in combination with any one or more of the other features described herein. One, more than one, or all of the features of the aspects may be combined, so a feature from one aspect may be combined with another aspect for example. Each aspect may be computer-implemented and there may be provided a computer program configured to perform each method when operated by a computer or processor. Each computer program may be stored on a computer-readable medium. Additionally or alternatively, the programs may be partially or fully hardware-implemented. The aspects may be combined. There may also be provided a robotics system configured to operate in accordance with the method described in respect of any of these aspects.

In another aspect, there may be provided a robotics system, comprising: a multi-modal sensing system capable of observing human motions and generating human motions data in a first instrumented environment; and a processor (which may be a computer), communicatively coupled to the multi-modal sensing system, for recording the human motions data received from the multi-modal sensing system and processing the human motions data to extract motion primitives, preferably such that the motion primitives define operations of a robotics system. The motion primitives may be minimanipulations, as described herein (for example in the immediately preceding paragraphs) and may have a standard format. The motion primitive may define specific types of action and parameters of the type of action, for example a pulling action with a defined starting point, end point, force and grip type. Optionally, there may be further provided a robotics apparatus, communicatively coupled to the processor and/or multi-modal sensing system. The robotics apparatus may be capable of using the motion primitives and/or the human motions data to replicate the observed human motions in a second instrumented environment.

In a further aspect, there may provided a robotics system, comprising: a processor (which may be a computer), for receiving motion primitives defining operations of a robotics system, the motion primitives being based on human motions data captured from human motions; and a robotics system, communicatively coupled to the processor, capable of using the motion primitives to replicate human motions in an instrumented environment. It will be understood that these aspects may be further combined.

A further aspect may be found in a robotics system comprising: first and second robotic arms; first and second robotic hands, each hand having a wrist coupled to a respective arm, each hand having a palm and multiple articulated fingers, each articulated finger on the respective hand having at least one sensor; and first and second gloves, each glove covering the respective hand having a plurality of embedded sensors. Preferably, the robotics system is a robotic kitchen system.

There may further be provided, in a different but related aspect, a motion capture system, comprising: a standardized working environment module, preferably a kitchen; plurality of multi-modal sensors having a first type of sensors configured to be physically coupled to a human and a second type of sensors configured to be spaced away from the human. One or more of the following may be the case: the first type of sensors may be for measuring the posture of human appendages and sensing motion data of the human appendages; the second type of sensors may be for determining a spatial registration of the three-dimensional configurations of one or more of the environment, objects, movements, and locations of human appendages; the second type of sensors may be configured to sense activity data; the standardized working environment may have connectors to interface with the second type of sensors; the first type of sensors and the second type of sensors measure motion data and activity data, and send both the motion data and the activity data to a computer for storage and processing for product (such as food) preparation.

An aspect may additionally or alternatively be considered in a robotic hand coated with a sensing gloves, comprising: five fingers; and a palm connected to the five fingers, the palm having internal joints and a deformable surface material in three regions; a first deformable region disposed on a radial side of the palm and near the base of the thumb; a second deformable region disposed on a ulnar side of the palm, and spaced apart from the radial side; and a third deformable region disposed on the palm and extend across the base of the fingers. Preferably, the combination of the first deformable region, the second deformable region, the third deformable region, and the internal joints collectively operate to perform a mini manipulation, particularly for food preparation.

In respect of any of the above system, device or apparatus aspects there may further be provided method aspects comprising steps to carry out the functionality of the system. Additionally or alternatively, optional features may be found based on any one or more of the features described herein with respect to other aspects.

The present disclosure has been described in particular detail with respect to possible embodiments. Those skilled in the art will appreciate that the disclosure may be practiced in other embodiments. The particular naming of the components, capitalization of terms, the attributes, data structures, or any other programming or structural aspect is not mandatory or significant, and the mechanisms that implement the disclosure or its features may have different names, formats, or protocols. The system may be implemented via a combination of hardware and software, as described, or entirely in hardware elements, or entirely in software elements. The particular division of functionality between the various systems components described herein is merely example and not mandatory; functions performed by a single system component may instead be performed by multiple components, and functions performed by multiple components may instead be performed by a single component.

In various embodiments, the present disclosure can be implemented as a system or a method for performing the above-described techniques, either singly or in any combination. The combination of any specific features described herein is also provided, even if that combination is not explicitly described. In another embodiment, the present disclosure can be implemented as a computer program product comprising a computer-readable storage medium and computer program code, encoded on the medium, for causing a processor in a computing device or other electronic device to perform the above-described techniques.

As used herein, any reference to "one embodiment" or to "an embodiment" means that a particular feature, structure, or characteristic described in connection with the embodiments is included in at least one embodiment of the disclosure. The appearances of the phrase "in one embodiment" in various places in the specification are not necessarily all referring to the same embodiment.

Some portions of the above are presented in terms of algorithms and symbolic representations of operations on data bits within a computer memory. These algorithmic descriptions and representations are the means used by those skilled in the data processing arts to convey most effectively the substance of their work to others skilled in the art. An algorithm is generally perceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared, transformed, and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that, throughout the description, discussions utilizing terms such as "processing" or "computing" or "calculating" or "displaying" or "determining" or the like refer to the action and processes of a computer system, or similar electronic computing module and/or device, that manipulates and transforms data represented as physical (electronic) quantities within the computer system memories or registers or other such information storage, transmission, or display devices.

Certain aspects of the present disclosure include process steps and instructions described herein in the form of an algorithm. It should be noted that the process steps and instructions of the present disclosure could be embodied in software, firmware, and/or hardware, and, when embodied in software, it can be downloaded to reside on, and operated from, different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers and/or other electronic devices referred to in the specification may include a single processor or may be architectures employing multiple processor designs for increased computing capability.

The algorithms and displays presented herein are not inherently related to any particular computer, virtualized system, or other apparatus. Various general-purpose systems may also be used with programs, in accordance with the teachings herein, or the systems may prove convenient to construct more specialized apparatus needed to perform the required method steps. The required structure for a variety of these systems will be apparent from the description provided herein. In addition, the present disclosure is not described with reference to any particular programming language. It will be appreciated that a variety of programming languages may be used to implement the teachings of the present disclosure as described herein, and any references above to specific languages are provided for disclosure of enablement and best mode of the present disclosure.

In various embodiments, the present disclosure can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the disclosure include a mobile phone, personal digital assistant, smartphone, kiosk, desktop computer, laptop computer, consumer electronic device, television, set-top box, or the like. An electronic device for implementing the present disclosure may use an operating system such as, for example, iOS available from Apple Inc. of Cupertino, Calif., Android available from Google Inc. of Mountain View, Calif., Microsoft Windows 7 available from Microsoft Corporation of Redmond, Wash., webOS available from Palm, Inc. of Sunnyvale, Calif., or any other operating system that is adapted for use on the device. In some embodiments, the electronic device for implementing the present disclosure includes functionality for communication over one or more networks, including for example a cellular telephone network, wireless network, and/or computer network such as the Internet.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The terms "a" or "an," as used herein, are defined as one as or more than one. The term "plurality," as used herein, is defined as two or as more than two. The term "another," as used herein, is defined as at least a second or more.

An ordinary artisan should require no additional explanation in developing the methods and systems described herein but may find some possibly helpful guidance in the preparation of these methods and systems by examining standardized reference works in the relevant art.

While the disclosure has been described with respect to a limited number of embodiments, those skilled in the art, having benefit of the above description, will appreciate that other embodiments may be devised which do not depart from the scope of the present disclosure as described herein. It should be noted that the language used in the specification has been principally selected for readability and instructional purposes, and may not have been selected to delineate or circumscribe the inventive subject matter. The terms used should not be construed to limit the disclosure to the specific embodiments disclosed in the specification and the claims, but the terms should be construed to include all methods and systems that operate under the claims set forth herein below. Accordingly, the disclosure is not limited by the disclosure, but instead its scope is to be determined entirely by the following claims.

What is claimed and desired to be secured by Letters Patent of the United States is:

1. A robotic end effector interface system, comprising:

a kitchen tool;

a robotic end effector; and a mechanical coupling interface, wherein the mechanical coupling interface is coupled between the kitchen tool and the robotic end effector,
wherein the robotic end effector is coupled to the mechanical coupling interface in a predetermined position and a predetermined orientation to avoid a displacement between the robotic end effector and the mechanical coupling,
wherein the mechanical coupling interface is coupled to the kitchen tool;
wherein the robotic end effector is configured for operating the kitchen tool for performing a food preparation operation,
wherein the mechanical coupling interface comprises a handle,
wherein the handle has a first end, wherein the first end of the handle has a physical portion that extends outward to serve as a first stopping reference point, wherein the robotic end effector couples the handle when touching the first stopping reference point of the handle.

2. The robotic end effector interface system of claim 1, wherein the handle has a second end, wherein the second end of the handle includes a physical portion that extends outward to serve as a second stopping reference point on an opposite side of the handle when the robotic end effector the handle couples the handle.

3. The robotic end effector interface system of claim 2, wherein the handle has a shaped exterior surface that includes one or more ridges, wherein the robotic end effector is coupled to the one or more ridges of the handle.

4. The robotic end effector interface system of claim 1, wherein the robotic end effector has a deformable palm.

5. The robotic end effector interface system of claim 2, wherein the handle has a shaped exterior surface that includes one or more ridges, the robotic end effectors coupling to the one or more ridges of the handle.

6. The robotic end effector interface system of claim 1, wherein the robotic effector has an interface for forming a male-female attachment to mechanical coupling interface.

7. The robotic end effector interface system of claim 6, wherein the male-female attachment comprises one or more magnets or one or more mechanical fixtures between the robotic effector end effector and the mechanical coupling interface.

8. The robotic end effector interface system of claim 2, wherein the handle has an exterior surface with a plurality of angular surfaces to avoid twisting when the robotic end effector couples the handle, wherein the plurality of angular surfaces include two-dimensional geometric shapes and three-dimensional geometric shapes for example elliptical, rectangular, square, triangle, pentagon, octagon and hexagon shapes.

9. The robotic end effector interface system of claim 1, further comprising a button on the robotic end effector for activating one of a plurality of operational states of the robotic end effector.

10. A kitchen tool modified for robotic use, comprising:
a handle with an interface portion for mechanically coupling an interface of a robotic end effector for operation of the handle without displacement, backlashing, or misorientation between the interface portion of the handle and the robotic end effector,
wherein the interface portion of the handle is mechanically coupled to the interface of the robotic end effector in only one position and in only one orientation,
wherein the robotic end effector is coupled to the handle, wherein the handle is coupled to a kitchen tool to perform a food preparation operation.

11. The kitchen tool of claim 10,
wherein the handle has a first end and a second end, the first end being on the opposite side of the second end,
wherein, the handle further has a shaped exterior surface between the first end and the second end,
wherein the first end has a physical portion that extends outward to serve as a first stopping reference point,
wherein the second end has a physical portion that extends outward to serve as a second stopping reference point,
wherein a robotic end effector grasps the exterior surface of the handle within the first and second ends in a predefined, predetermined position, and orientation; and
wherein the robotic end effector operates the handle coupled to the kitchen tool in a predetermined position and a predetermined orientation, wherein the robotic end effector includes a robotic hand.

12. The kitchen tool of claim 11,
wherein the shaped exterior surface of the end effector grasps and operates the shaped exterior surface of the handle to avoid displacement, twisting or backlashing between the end effector and the handle.

13. The kitchen tool of claim 12,
wherein the first end of the handle serves as a first stopper on one end of the handle when grasped by the robotic end effector.

14. The kitchen tool of claim 12,
wherein the second end of the handle serves as a second stopper on the opposite end of the handle when grasped by the robotic effector.

15. The kitchen tool of claim 12,
wherein the shaped exterior surface of the handle comprises one or more ridges to accommodate the grasping by the robotic end effector.

16. The kitchen tool of claim 12,
wherein the robotic end effector has a deformable palm.

17. A robotic platform, comprising:
(a) one or more robotic arms;
(b) one or more end effectors including a robotic end effector, wherein the robotic arm is coupled to the end effector; and
(c) one or more cooking tools, wherein the one or more cooking tools each includes a first cooking tool having a predetermined coupling interface;
a kitchen tool having a handle and a tool body, wherein the handle has a grooved shaped exterior surface; and
a robotic end effector having a shaped exterior surface,
wherein the robotic end effector grasps and operates the grooved shaped exterior surface of the handle in a predetermined position and a predetermined orientation,
wherein the robotic end effector is coupled to a predetermined coupling interface in the cooking tool,
wherein the robotic end effector operates the first cooking tool in a predetermined position and a predetermined orientation, thereby avoiding misorientation or displacement between the robotic end effector and the predetermined coupling interface of the cooking tool.

18. The robotic platform of claim 17, wherein:
the one or more robotic arms each includes a second robotic arm; and
the one or more end effectors each includes a second end effector, wherein the second robotic end effector is coupled to a second cooking tool in a predetermined position and a predetermined orientation, thereby avoiding a misorientation.

19. The robotic platform of claim 17, wherein:

the one or more robotic arms each includes a second robotic arm; and the one or more robotic end effectors each includes a second robotic end effector, wherein the second robotic end effector is coupled to the second robotic arm, wherein the second robotic end effector comprises a robotic hand.

20. The robotic platform of claim 17, wherein the one or more cooking tools each comprises one or more utensils, one or more cookware, one or more containers, one or more appliances, and/or one or more equipment.

21. The robotic platform of claim 17, wherein the robotic end effector grasps and operates the grooved shaped exterior surface of the handle to avoid an object displacement, twisting or backlashing.

22. The robotic end effector interface system of claim 2, wherein the grooved shaped exterior surface of the handle comprises one or more ridges, wherein the robotic end effector grasps the one or more ridges of the handle in a predetermined position every time to minimize slippage.

23. The robotic end effector interface system of claim 2, wherein the grooved shaped exterior surface of the handle comprises one or more ridges, wherein the robotic end effector grasps the one or more ridges of the handle in a predetermined position every time to enhance the firmness of the grasp.

24. The robotic end effector interface system of claim 2, wherein the robotic end effector grasps a grooved shape of the handle and exerts a force on the handle to avoid a displacement therebetween in the x-axis direction, the y-axis direction, or the z-axis direction.

25. The robotic end effector interface system of claim 1, wherein the robotic end effector grasps a grooved shape of the handle and exerts force on the handle to avoid a displacement therebetween in any rotary axes with respect to the x-axis, the y-axis, or the z-axis.

26. The robotic end effector interface system of claim 1, wherein the kitchen tool comprises a knife, a spatula, a skimmer, a ladle, a draining spoon, or a turner.

27. The robotic end effector interface system of claim 2, wherein the robotic end effector grasps a grooved shaped exterior surface of the handle within the first and second ends in a predetermined position and a predetermined orientation to avoid a displacement therebetween in an x-axis, y-axis, or z-axis direction, wherein the grasping of the robotic end effector matches the grooved shaped exterior surface of the handle.

28. The robotic end effector interface system of claim 2, wherein the robotic end effector grasps a grooved shaped exterior surface of the handle within the first and second ends in a predetermined position and a predetermined orientation to avoid a displacement therebetween in an x-axis, y-axis, or z-axis rotation, wherein the grasping of the robotic end effector matches the grooved shaped exterior surface of the handle.

29. The robotic platform of claim 17, wherein each of the one or more cooking tools comprises the predetermined coupling interface.

* * * * *